US010343527B2

(12) United States Patent
Hatta et al.

(10) Patent No.: US 10,343,527 B2
(45) **Date of Patent: *Jul. 9, 2019**

(54) CELL, CELL PACK, ELECTRONIC DEVICE, ELECTRIC VEHICLE, ELECTRICITY STORAGE APPARATUS, AND POWER SYSTEM

(71) Applicant: Murata Manufacturing Co., Ltd, Kyoto (JP)

(72) Inventors: Kazuhito Hatta, Fukushima (JP); Nobuaki Shimosaka, Fukushima (JP); Masaki Machida, Fukushima (JP); Manabu Aoki, Fukushima (JP); Masahiro Miyamoto, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 261 days.

This patent is subject to a terminal disclaimer.

(21) Appl. No.: 15/109,918

(22) PCT Filed: Jan. 20, 2015

(86) PCT No.: PCT/JP2015/000231

§ 371 (c)(1),
(2) Date: Jul. 6, 2016

(87) PCT Pub. No.: WO2015/107910

PCT Pub. Date: Jul. 23, 2015

(65) Prior Publication Data

US 2016/0336614 A1 Nov. 17, 2016

(30) Foreign Application Priority Data

Jan. 20, 2014 (JP) ................................ 2014-008178
Jan. 20, 2014 (JP) ................................ 2014-008179
(Continued)

(51) Int. Cl.
*H01M 10/058* (2010.01)
*B60K 6/46* (2007.10)
(Continued)

(52) U.S. Cl.
CPC .................. *B60L 7/10* (2013.01); *B60K 6/46* (2013.01); *B60L 50/64* (2019.02);
(Continued)

(58) Field of Classification Search
CPC .. B60L 7/10; B60L 11/1879; B60L 2240/545; B60L 2240/547;
(Continued)

(56) References Cited

U.S. PATENT DOCUMENTS 5,587,871 A * 12/1996 Ue ........................ H01G 9/022 252/62.2
6,532,425 B1 3/2003 Boost et al.
(Continued)

FOREIGN PATENT DOCUMENTS

CN 102163710 A 8/2011
CN 103022562 A 4/2013
(Continued)

OTHER PUBLICATIONS

JP2007220451MT (Year: 2007).*
(Continued)

*Primary Examiner* — Alexander Usyatinsky
(74) *Attorney, Agent, or Firm* — K&L Gates LLP

(57) ABSTRACT

Between an anode active material layer and a separator, a recess impregnation region of an anode side in which electrolytes and solid particles are disposed and including a recess that is located between adjacent anode active material particles positioned on the outermost surface of the anode active material layer is formed. Between a cathode active material layer and a separator, a recess impregnation region
(Continued)

of a cathode side in which electrolytes and solid particles are disposed and including a recess that is located between adjacent cathode active material particles positioned on the outermost surface of the cathode active material layer is formed. The solid particles in the recess impregnation regions of the cathode side and the anode side have a concentration that is 30 volume % or more.

6 Claims, 10 Drawing Sheets

(30) Foreign Application Priority Data

| | | |
|---|---|---|
| Jan. 20, 2014 | (JP) | 2014-008180 |
| Dec. 19, 2014 | (JP) | 2014-257983 |
| Dec. 19, 2014 | (JP) | 2014-257984 |
| Dec. 19, 2014 | (JP) | 2014-257985 |
| Dec. 19, 2014 | (JP) | 2014-257986 |

(51) Int. Cl.

| | |
|---|---|
| ***B60L 7/10*** | (2006.01) |
| ***H01M 10/0566*** | (2010.01) |
| ***H01M 10/0569*** | (2010.01) |
| ***B60L 50/64*** | (2019.01) |
| *H01M 4/36* | (2006.01) |
| *H01M 10/0568* | (2010.01) |

(52) U.S. Cl.

CPC ..... *H01M 10/058* (2013.01); *H01M 10/0566* (2013.01); *H01M 10/0569* (2013.01); *B60L 2240/545* (2013.01); *B60L 2240/547* (2013.01); *B60L 2240/549* (2013.01); *H01M 4/36* (2013.01); *H01M 10/0568* (2013.01); *H01M 2300/0037* (2013.01); *Y02T 10/705* (2013.01); *Y02T 10/7005* (2013.01)

(58) Field of Classification Search

CPC .............. B60L 2240/549; B60K 6/46; H01M 10/0566; H01M 10/0569; H01M 2300/0037; H01M 10/058; H01M 10/0568; H01M 4/36; Y02T 10/7005; Y02T 10/705

See application file for complete search history.

(56) References Cited

U.S. PATENT DOCUMENTS

| | | | | |
|---|---|---|---|---|
| 7,674,559 | B2 | 3/2010 | Min et al. | |
| 7,704,641 | B2 | 4/2010 | Yong et al. | |
| 8,968,935 | B2 | 3/2015 | Kurasawa et al. | |
| 9,225,039 | B2 | 12/2015 | Ihara et al. | |
| 9,246,192 | B2 | 1/2016 | Kishi et al. | |
| 2006/0127772 | A1* | 6/2006 | Ota | H01M 4/0421 429/231.95 |
| 2006/0240290 | A1* | 10/2006 | Holman | H01M 4/134 429/3 |
| 2011/0229751 | A1* | 9/2011 | Yamashita | H01M 2/1653 429/144 |
| 2011/0278170 | A1* | 11/2011 | Chiang | G02F 1/1523 204/483 |
| 2012/0189897 | A1 | 7/2012 | Wakizaka et al. | |
| 2013/0059178 | A1* | 3/2013 | Ihara | H01M 10/052 429/61 |
| 2013/0330610 | A1* | 12/2013 | Shigematsu | H01M 10/0567 429/200 |
| 2015/0004464 | A1* | 1/2015 | Okuno | H01M 2/18 429/143 |
| 2015/0044552 | A1* | 2/2015 | Okita | H01M 4/366 429/188 |

FOREIGN PATENT DOCUMENTS

| | | | |
|---|---|---|---|
| CN | 103178291 | A | 6/2013 |
| JP | 9-283180 | A | 10/1997 |
| JP | 2007-220451 | A | 8/2007 |
| JP | 2007220451 | * | 8/2007 |
| JP | 2008-503049 | A | 1/2008 |
| JP | 4594269 | B2 | 12/2010 |
| JP | 4984339 | B2 | 7/2012 |
| JP | 2013-084575 | A | 5/2013 |
| JP | 2013084575 | * | 5/2013 |
| JP | 2013-134859 | A | 7/2013 |
| WO | 2011/040562 | A1 | 4/2011 |
| WO | 2013108511 | A | 7/2013 |

OTHER PUBLICATIONS

JP6209974MT (Year: 2017).*

Japanese Office Action (with partial English translation) dated Feb. 14, 2017 in corresponding Japanese application No. 2014-008179 (6 pages).

Japanese Office Action (with partial English translation) dated Feb. 14, 2017 in corresponding Japanese application No. 2014-008180 (8 pages).

International Search Report issued in international application No. PCT/JP2015/000231, dated Apr. 28, 2015, 1 page.

* cited by examiner

A

B

CELL, CELL PACK, ELECTRONIC DEVICE, ELECTRIC VEHICLE, ELECTRICITY STORAGE APPARATUS, AND POWER SYSTEM

CROSS-REFERENCE TO RELATED APPLICATIONS

The present application claims the benefit of International Application No. PCT/JP2015/000231, filed Jan. 20, 2015, which claims priority to Japanese Application No. 2014-008178, filed Jan. 20, 2014, and Japanese Application No. 2014-008179, filed Jan. 20, 2014, and Japanese Application 2014-008180, filed Jan. 20, 2014, and Japanese Application No. 2014-257983, filed Dec. 19, 2014, and Japanese Application No. 2014-257984, filed Dec. 19, 2014, and Japanese Application No. 2014-257985, filed Dec. 19, 2014, and Japanese Application No. 2014-257986, filed Dec. 19, 2014, the entire contents of each of which are being incorporated herein by reference.

TECHNICAL FIELD

The present technology relates to a battery, a battery pack, an electronic device, an electric vehicle, a power storage device, and a power system each using the battery.

BACKGROUND ART

In recent years, electronic devices typified by mobile phones or portable information terminal devices have become widespread, and reducing a size and a weight and increasing a lifespan have been strongly demanded. Accordingly, as a power source, a battery, and particularly, a small and lightweight secondary battery capable of obtaining a high energy density has been under development.

In recent years, applications of the secondary battery have not been limited to the electronic devices described above, but various applications typified by electric tools such as an electric drill, electric vehicles such as an electric car, and power storage systems such as a home power server have been studied. As a power source thereof, the development of a high output and high capacity secondary battery is proceeding.

In the secondary battery, in order to increase performance, particles are disposed on a surface of a separator or in electrolytes (Patent Literature 1 to Patent Literature 3).

In the secondary battery, in order to increase performance, an additive is added to an electrolyte solution (refer to Patent Literature 4).

CITATION LIST

Patent Literature

Patent Literature 1: JP 4984339B
Patent Literature 2: JP 4594269B
Patent Literature 3: JP 2008-503049T
Patent Literature 4: JP 2013-134859A

SUMMARY OF INVENTION

Technical Problem

The present technology is provided to achieve any of the following objects.

In a battery, it is necessary to improve a low temperature characteristic.

Therefore, the present technology provides a battery, a battery pack, an electronic device, an electric vehicle, a power storage device and a power system through which it is possible to improve a low temperature characteristic.

In the battery, it is necessary to provide a high capacity and suppress capacity deterioration when charging and discharging are repeated at a high output discharge.

Therefore, the present technology provides a battery, a battery pack, an electronic device, an electric vehicle, a power storage device and a power system through which it is possible to provide a high capacity and suppress capacity deterioration when charging and discharging are repeated at a high output discharge.

In the battery, it is necessary to provide a high capacity and improve a rapid charging characteristic.

Therefore, the present technology provides a battery, a battery pack, an electronic device, an electric vehicle, a power storage device and a power system through which it is possible to provide a high capacity and improve a rapid charging characteristic.

In the battery, it is necessary to suppress a discharge capacity from decreasing during high output.

Therefore, the present technology provides a battery, a battery pack, an electronic device, an electric vehicle, a power storage device and a power system through which it is possible to suppress a high output discharge capacity from decreasing.

In the battery, it is necessary to improve a resistance to a chemical short circuit caused by a chemical reaction such as metal precipitation inside the battery.

Therefore, the present technology provides a battery, a battery pack, an electronic device, an electric vehicle, a power storage device and a power system through which it is possible to improve a resistance to a chemical short circuit.

In the battery, it is necessary to improve an overcharge resistance.

Therefore, the present technology provides a battery, a battery pack, an electronic device, an electric vehicle, a power storage device and a power system through which it is possible to improve an overcharge resistance.

Solution to Problem

To solve any of the problems, the present technology is a battery including: a cathode including a cathode active material layer comprising cathode active material particles; a anode including a anode active material layer comprising anode active material particles; a separator that is located between the cathode active material layer and the anode active material layer; electrolytes comprising an electrolyte solution; and solid particles. At least one of a recess impregnation region of a anode side and a recess impregnation region of a cathode side, and at least one of a deep region of the anode side and a deep region of the cathode side are included. The recess impregnation region of the anode side refers to a region in which the electrolytes and the solid particles are disposed and that includes a recess that is located between adjacent anode active material particles positioned on the outermost surface of the anode active material layer. The deep region of the anode side refers to a region in which the electrolytes or the electrolytes and the solid particles are disposed and that is inside the anode active material layer, which is deeper than the recess impregnation region of the anode side. The recess impregnation region of the cathode side refers to a region in which the electrolytes and the solid particles are disposed and that includes a recess that is located between adjacent cathode active material particles positioned on the outermost surface of the cathode active material layer. The deep region of the cathode side refers to a region in which the electrolytes or the electrolytes and the solid particles are disposed and that is inside the cathode active material layer, which is deeper than the recess impregnation region of the cathode side. The solid particles in the recess impregnation region of the anode side have a concentration that is 30 volume % or more. The solid particles in the recess impregnation region of the cathode side have a concentration that is 30 volume % or more.

To solve any of the problems, the present technology is a battery including: a cathode including a cathode active material layer comprising cathode active material particles; a anode including a anode active material layer comprising anode active material particles; a separator that is located between the cathode active material layer and the anode active material layer; electrolytes comprising an electrolyte solution; and solid particles. A recess impregnation region of a anode side and a deep region of the anode side are included, or the recess impregnation region of the anode side and the deep region of the anode side and a recess impregnation region of a cathode side and a deep region of the cathode side are included. The recess impregnation region of the anode side refers to a region in which the electrolytes and the solid particles are disposed and that includes a recess that is located between adjacent anode active material particles positioned on the outermost surface of the anode active material layer. The deep region of the anode side refers to a region in which the electrolytes or the electrolytes and the solid particles are disposed and that is inside the anode active material layer, which is deeper than the recess impregnation region of the anode side. The recess impregnation region of the cathode side refers to a region in which the electrolytes and the solid particles are disposed and that includes a recess that is located between adjacent cathode active material particles positioned on the outermost surface of the cathode active material layer. The deep region of the cathode side refers to a region in which the electrolytes or the electrolytes and the solid particles are disposed and that is inside the cathode active material layer, which is deeper than the recess impregnation region of the cathode side. The solid particles in the recess impregnation region of the anode side have a concentration that is 30 volume % or more. The solid particles in the recess impregnation region of the cathode side have a concentration that is 30 volume % or more. The electrolyte solution comprises at least one kind of an unsaturated cyclic carbonate ester represented by Formula (1) and halogenated carbonate esters represented by Formula (2) and Formula (3).

[Chem. 1]

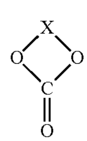

(1)

(where, in Formula (1), X represents any one divalent group selected from the group consisting of —C(═R1)-C(═R2)-, —C(═R1)-C(═R2)-C(═R3)-, —C(═R1)-C(R4)(R5)-, —C(═R1)-C(R4)(R5)-C(R6)(R7)-, —C(R4)(R5)-C(═R1)-C(R6)(R7)-, —C(═R1)-C(═R2)-C(R4)(R5)-, —C(═R1)-C(R4)(R5)-C(═R2)-, —C(═R1)-O—C(R4)(R5)-, —C(═R1)-O—C(═R2)-, —C(═R1)-C(═R8)-, and —C(═R1)-C(═R2)-C(═R8)-. R1, R2 and R3 each independently represent a divalent hydrocarbon group having one carbon atom or a divalent halogenated hydrocarbon group having one carbon atom. R4, R5, R6 and R7 each independently represent a monovalent hydrogen group (—H), a monovalent hydrocarbon group having 1 to 8 carbon atoms, a monovalent halogenated hydrocarbon group having 1 to 8 carbon atoms or a monovalent oxygen-comprising hydrocarbon group having 1 to 6 carbon atoms. R8 represents an alkylene group having 2 to 5 carbon atoms or a halogenated alkylene group having 2 to 5 carbon atoms)

(2)

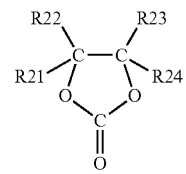

(where, in Formula (2), R21 to R24 each independently represent a hydrogen group, a halogen group, an alkyl group or a halogenated alkyl group, and at least one of R21 to R24 represents a halogen group or a halogenated alkyl group)

(3)

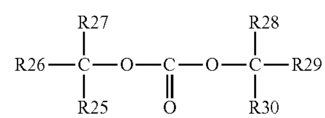

(where, in Formula (3), R25 to R30 each independently represent a hydrogen group, a halogen group, an alkyl group or a halogenated alkyl group, and at least one of R25 to R30 represents a halogen group or a halogenated alkyl group.)

A battery pack, an electronic device, an electric vehicle, a power storage device, and a power system each according to an embodiment of the present technology include the above-described battery.

To solve any of the problems, the present technology is a battery including: a cathode including a cathode active material layer comprising cathode active material particles; a anode including a anode active material layer comprising anode active material particles; a separator that is located between the cathode active material layer and the anode active material layer; electrolytes comprising an electrolyte solution; and solid particles. At least one of a recess impregnation region of a anode side and a recess impregnation region of a cathode side, and at least one of a deep region of the anode side and a deep region of the cathode side are included. The recess impregnation region of the anode side refers to a region in which the electrolytes and the solid particles are disposed and that includes a recess that is located between adjacent anode active material particles positioned on the outermost surface of the anode active material layer. The deep region of the anode side refers to a region in which the electrolytes or the electrolytes and the solid particles are disposed and that is inside the anode active material layer, which is deeper than the recess impregnation region of the anode side. The recess impregnation region of the cathode side refers to a region in which the electrolytes and the solid particles are disposed and that includes a recess that is located between adjacent cathode active material particles positioned on the outermost surface of the cathode active material layer. The deep region of the cathode side refers to a region in which the electrolytes or the electrolytes and the solid particles are disposed and that is inside the cathode active material layer, which is deeper than the recess impregnation region of the cathode side. The solid particles in the recess impregnation region of the anode side have a concentration that is 30 volume % or more. The solid particles in the recess impregnation region of the cathode side have a concentration that is 30 volume % or more. The electrolyte solution comprises sulfinyl or sulfonyl compounds represented by Formula (1A) to Formula (8A).

[Chem. 2]

(1A)

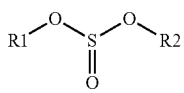

(2A)

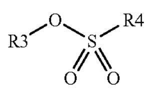

(3A)

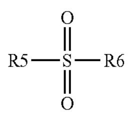

(4A)

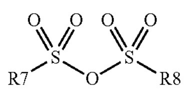

(5A)

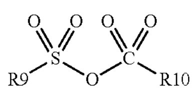

(6A)

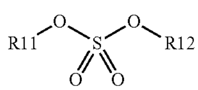

(7A)

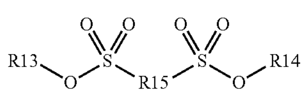

(8A)

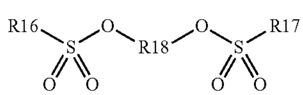

(R1 to R14, and R16 and R17 each independently represent a monovalent hydrocarbon group or a monovalent halogenated hydrocarbon group, R15 and R18 each independently represent a divalent hydrocarbon group or a divalent halogenated hydrocarbon group. R1 and R2, R3 and R4, R5 and R6, R7 and R8, R9 and R10, R11 and R12, and any two or more of R13 to R15 or any two or more of R16 to R18 may be bound to each other.)

To solve any of the problems, the present technology is a battery including: a cathode including a cathode active material layer comprising cathode active material particles; a anode including a anode active material layer comprising anode active material particles; a separator that is located between the cathode active material layer and the anode active material layer; electrolytes comprising an electrolyte solution; and solid particles. At least one of a recess impregnation region of a anode side and a recess impregnation region of a cathode side, and at least one of a deep region of the anode side and a deep region of the cathode side are included. The recess impregnation region of the anode side refers to a region in which the electrolytes and the solid particles are disposed and that includes a recess that is located between adjacent anode active material particles positioned on the outermost surface of the anode active material layer. The deep region of the anode side refers to a region in which the electrolytes or the electrolytes and the solid particles are disposed and that is inside the anode active material layer, which is deeper than the recess impregnation region of the anode side. The recess impregnation region of the cathode side refers to a region in which the electrolytes and the solid particles are disposed and that includes a recess that is located between adjacent cathode active material particles positioned on the outermost surface of the cathode active material layer. The deep region of the cathode side refers to a region in which the electrolytes or the electrolytes and the solid particles are disposed and that is inside the cathode active material layer, which is deeper than the recess impregnation region of the cathode side. The solid particles of the at least one of the impregnation regions have a concentration that is 30 volume % or more. The electrolyte solution comprises at least one kind of aromatic compounds represented by Formula (1B) to Formula (4B).

[Chem. 3]

(1B)

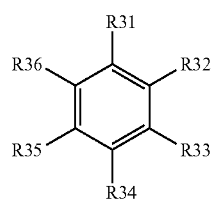

(2B)

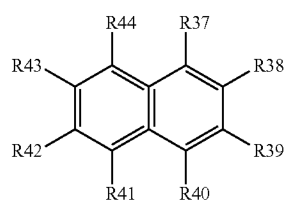

(3B)

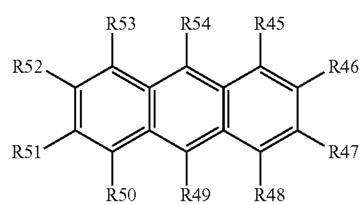

(4B)

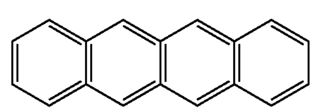

(in the formula, R31 to R54 each independently represent a hydrogen group, a halogen group, a monovalent hydrocarbon group, a monovalent halogenated hydrocarbon group, a monovalent oxygen-comprising hydrocarbon group or a monovalent halogenated oxygen-comprising hydrocarbon group, and any two or more of R31 to R36, any two or more of R37 to R44, or any two or more of R45 to R54 may be bound to each other. However, a total number of carbon atoms in aromatic compounds represented by Formula (1) to Formula (4) is 7 to 18.)

To solve any of the problems, the present technology is a battery including: a cathode including a cathode active material layer comprising cathode active material particles; a anode including a anode active material layer comprising anode active material particles; a separator that is located between the cathode active material layer and the anode active material layer; electrolytes comprising an electrolyte solution; and solid particles. At least one of a recess impregnation region of a anode side and a recess impregnation region of a cathode side, and at least one of a deep region of the anode side and a deep region of the cathode side are included. The recess impregnation region of the anode side refers to a region in which the electrolytes and the solid particles are disposed and that includes a recess that is located between adjacent anode active material particles positioned on the outermost surface of the anode active material layer. The deep region of the anode side refers to a region in which the electrolytes or the electrolytes and the solid particles are disposed and that is inside the anode active material layer, which is deeper than the recess impregnation region of the anode side. The recess impregnation region of the cathode side refers to a region in which the electrolytes and the solid particles are disposed and that includes a recess that is located between adjacent cathode active material particles positioned on the outermost surface of the cathode active material layer. The deep region of the cathode side refers to a region in which the electrolytes or the electrolytes and the solid particles are disposed and that is inside the cathode active material layer, which is deeper than the recess impregnation region of the cathode side. The solid particles of the at least one of the recess impregnation regions have a concentration that is 30 volume % or more. The electrolyte solution comprises at least one kind of a dinitrile compound represented by Formula (1C).

[Chem. 4]

NC—R61-CN (1C)

(where, in the formula, R61 represents a divalent hydrocarbon group or a divalent halogenated hydrocarbon group.)

To solve any of the problems, the present technology is a battery including: a cathode including a cathode active material layer comprising cathode active material particles; a anode including a anode active material layer comprising anode active material particles; a separator that is located between the cathode active material layer and the anode active material layer; electrolytes comprising an electrolyte solution; and solid particles. At least one of a recess impregnation region of a anode side and a recess impregnation region of a cathode side, and at least one of a deep region of the anode side and a deep region of the cathode side are included. The recess impregnation region of the anode side refers to a region in which the electrolytes and the solid particles are disposed and that includes a recess that is located between adjacent anode active material particles positioned on the outermost surface of the anode active material layer. The deep region of the anode side refers to a region in which the electrolytes or the electrolytes and the solid particles are disposed and that is inside the anode active material layer, which is deeper than the recess impregnation region of the anode side. The recess impregnation region of the cathode side refers to a region in which the electrolytes and the solid particles are disposed and that includes a recess that is located between adjacent cathode active material particles positioned on the outermost surface of the cathode active material layer. The deep region of the cathode side refers to a region in which the electrolytes or the electrolytes and the solid particles are disposed and that is inside the cathode active material layer, which is deeper than the recess impregnation region of the cathode side. The solid particles of the at least one of the recess impregnation regions have a concentration that is 30 volume % or more. The electrolyte solution comprises at least one kind of metal salts represented by Formula (1D) to Formula (7D).

(1D)

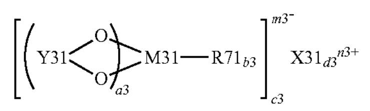

(where, in the formula, X31 represents a Group 1 element or a Group 2 element in a long-period type periodic table, or A1. M31 represents a transition metal, or a Group 13 element, a Group 14 element or a Group 15 element in the long-period type periodic table. R71 represents a halogen group. Y31 represents —C(═O)—R72-C(═O)—, —C(═O)—$CR73_2$-, or —C(═O)—C(═O)—, where R72 represents an alkylene group, a halogenated alkylene group, an arylene group or a halogenated arylene group, and R73 represents an alkyl group, a halogenated alkyl group, an aryl group or a halogenated aryl group. Note that a3 is an integer of 1 to 4, b3 is an integer of 0, 2 or 4, and c3, d3, m3 and n3 each are an integer of 1 to 3)

(2D)

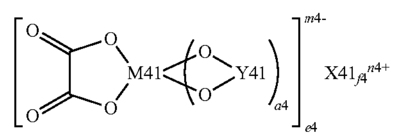

(where, in the formula, X41 represents a Group 1 element or a Group 2 element in the long-period type periodic table. M41 represents a transition metal, or a Group 13 element, a Group 14 element or a Group 15 element in the long-period type periodic table. Y41 represents —C(═O)—$(CR81_2)_{b4}$-C(═O)—, —$R83_2$C—$(CR82_2)_{c4}$—C(═O)—, —$R83_2$C—$(CR82_2)_{c4}$-$CR83_2$-, —$R83_2$C—$(CR82_2)_{c4}$-$S(═O)_2$—, —$S(═O)_2$—$(CR82_2)_{d4}$-$S(═O)_2$—, or —C(═O)—$(CR82_2)_{d4}$-$S(═O)_2$—, where R81 and R83 represent a hydrogen group, an alkyl group, a halogen group or a halogenated alkyl group, and at least one thereof is a halogen group or a halogenated alkyl group, and R82 represents a hydrogen group, an alkyl group, a halogen group or a halogenated alkyl group. Note that a4, e4 and n4 each are an integer of 1 or 2, b4 and d4 each are an integer of 1 to 4, c4 is an integer of 0 to 4, and f4 and m4 each are an integer of 1 to 3)

(3D)

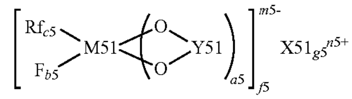

(where, in the formula, X51 represents a Group 1 element or a Group 2 element in the long-period type periodic table. M51 represents a transition metal, or a Group 13 element, a Group 14 element or a Group 15 element in the long-period type periodic table. Rf represents a fluorinated alkyl group or a fluorinated aryl group, each having 1 to 10 carbon atoms. Y51 represents —C(=O)—$(CR91_2)_{d5}$-C(=O)—, —$R92_2$C—$(CR91_2)_{d5}$-C(=O)—, —$R92_2$C—$(CR91_2)_{d5}$-$CR92_2$-, —$R92_2$C—$(CR91_2)_{d5}$-$S(=O)_2$—, —$S(=O)_2$—$(CR91_2)_{e5}$-$S(=O)_2$—, or —C(=O)—$(CR91_2)_{e5}$-$S(=O)_2$—, where R91 represents a hydrogen group, an alkyl group, a halogen group or a halogenated alkyl group, and R92 represents a hydrogen group, an alkyl group, a halogen group or a halogenated alkyl group, and at least one thereof is a halogen group or a halogenated alkyl group. Note that a5, f5 and n5 each are an integer of 1 or 2, b5, c5 and e5 each are an integer of 1 to 4, d5 is an integer of 0 to 4, and g5 and m5 each are an integer of 1 to 3)

(4D)

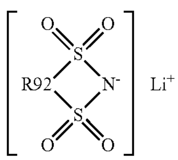

(in the formula, R92 represents a divalent halogenated hydrocarbon group)

$$M^+[(ZY)_2N]^- \quad (5D)$$

(in the formula, $M^+$ represents a monovalent cation, Y represents $SO_2$ or CO, and Z each independently represents a halogen group or an organic group)

$$LiC(C_pF_{2p+1}SO_2)(C_qF_{2q+1}SO_2)(C_rF_{2r+1}SO_2) \quad (6D)$$

(in the formula, p, q and r each are an integer of 1 or more)

(7D)

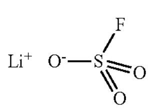

A battery pack, an electronic device, an electric vehicle, a power storage device, and a power system each according to an embodiment of the present technology include the above-described battery.

Advantageous Effects of Invention

According to the present technology, it is possible to obtain any of the following effects.

According to the present technology, it is possible to obtain an effect of improving a low temperature characteristic.

According to the present technology, it is possible to obtain an effect of providing a high capacity and suppressing capacity deterioration when charging and discharging are repeated at a high output discharge.

According to the present technology, it is possible to obtain an effect of providing a high capacity and improving a rapid charging characteristic.

According to the present technology, it is possible to obtain an effect of suppressing a high output discharge capacity from decreasing.

According to the present technology, it is possible to obtain an effect of improving a resistance to a chemical short circuit.

According to the present technology, it is possible to obtain an effect of improving an overcharge resistance.

DESCRIPTION OF EMBODIMENT(S)

<First Embodiment to Third Embodiment>

(Overview of the Present Technology)

Figure 1:
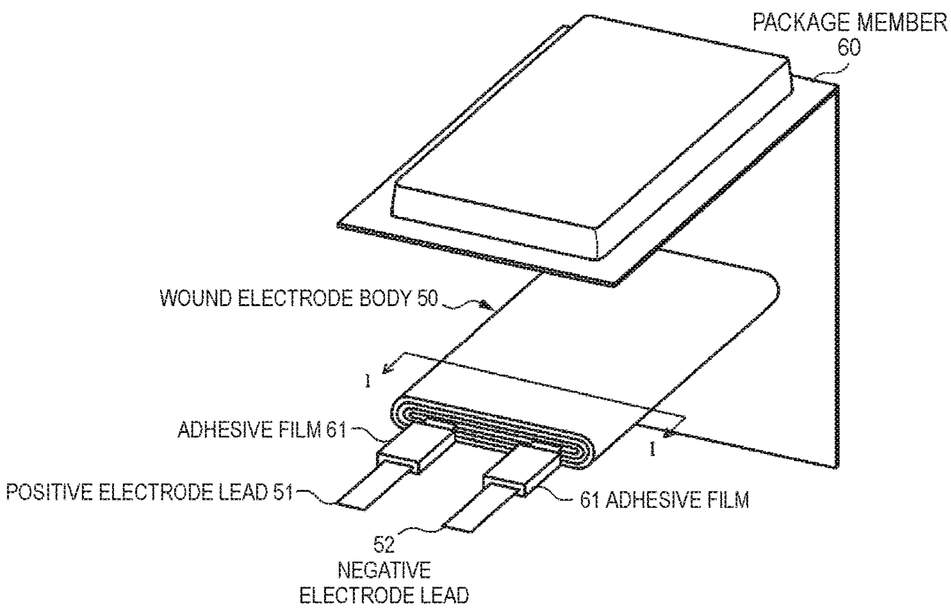
FIG. 1 is a disassembled perspective view showing the configuration of a non-aqueous electrolyte battery of a laminated film type according to an embodiment of the present technology.

First, in order to facilitate understanding of the present technology, an overview of the present technology will be described. In order to provide a higher capacity, an electrode becomes thicker and has a higher density. A winding path of electrolytes filling gaps becomes thinner and longer and has a smaller volume with respect to an input and output of the electrode. Depletion or congestion of lithium ions during rapid charge or high output discharge causes a bottleneck.

When a concentration of a salt increases, electrolytes improve instantaneous charge and discharge performance, but ligands of ions form a cluster and congestion is likely to occur. When a concentration of a salt decreases, no congestion occurs, but the number of ions necessary for charging is insufficient, and charge and discharge performance is accordingly reduced.

In order to compensate for such a situation, disposing a high dielectric substance such as barium titanate into electrolytes (refer to Patent Literature 1 (JP 4984339B)) and disposing particles having ionic conductivity through which lithium ions can move alone (refer to Patent Literature 2 (JP 4594269B)) have been attempted to increase a degree of dissociation of ions. However, there are problems in that the viscosity of an entire electrolyte solution increases due to ions attracted around particles, a charge and discharge input and output characteristic decreases due to an increased internal resistance of a battery, and a capacity deterioration is caused due to occlusion of lithium ions when a cycle is repeated. In a low temperature state, the viscosity of a liquid component decreases, and the mobility of ions further decreases, and it is difficult to maintain an output.

Use of a separator coated with alumina has also been attempted in order to improve safety (JP 2008-503049T), but it has the same problems.

In view of such problems, the inventors have conducted extensive studies and found that, in a high viscosity electrolyte solution in which a solvent having a boiling point of 200° C. or more such as ethylene carbonate (EC) and propylene carbonate (PC) is comprised at 30 mass % or more with respect to a composition of the electrolyte solution, when specific solid particles are added, a cluster of ions in the electrolyte solution is disintegrated. However, when solid particles are put into the electrode, electrolytes themselves decrease and a resistance increases. It was found that, in order to avoid such a situation, solid particles are disposed at an appropriate concentration in a recess between adjacent particles positioned on a surface of an electrode, which serves as an inlet or an outlet when lithium ions move between electrodes, and accordingly it is possible to improve a low temperature characteristic.

Hereinbelow, embodiments of the present technology are described with reference to the drawings. The description is given in the following order.

1. First embodiment (example of a laminated film-type battery)
2. Second embodiment (example of a cylindrical battery)
3. Third embodiment (example of a rectangular battery)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

1. First Embodiment

In a first embodiment of the present technology, an example of a laminated film-type battery is described. The battery is, for example, a non-aqueous electrolyte battery, a secondary battery in which charging and discharging are possible, or a lithium-ion secondary battery.

(1-1) Configuration Example of the Non-aqueous Electrolyte Battery

FIG. 1 shows the configuration of a non-aqueous electrolyte battery according to the first embodiment. The non-aqueous electrolyte battery is of what is called a laminated film type; and in the battery, a wound electrode body 50 equipped with a cathode lead 51 and an anode lead 52 is housed in a film-shaped package member 60.

Each of the cathode lead 51 and the anode lead 52 is led out from the inside of the package member 60 toward the outside in the same direction, for example. The cathode lead 51 and the anode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the cathode lead 51 and the anode lead 52 for the purpose of increasing the adhesion between the inner resin layer of the package member 60 and each of the cathode lead 51 and the anode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

Figure 2:
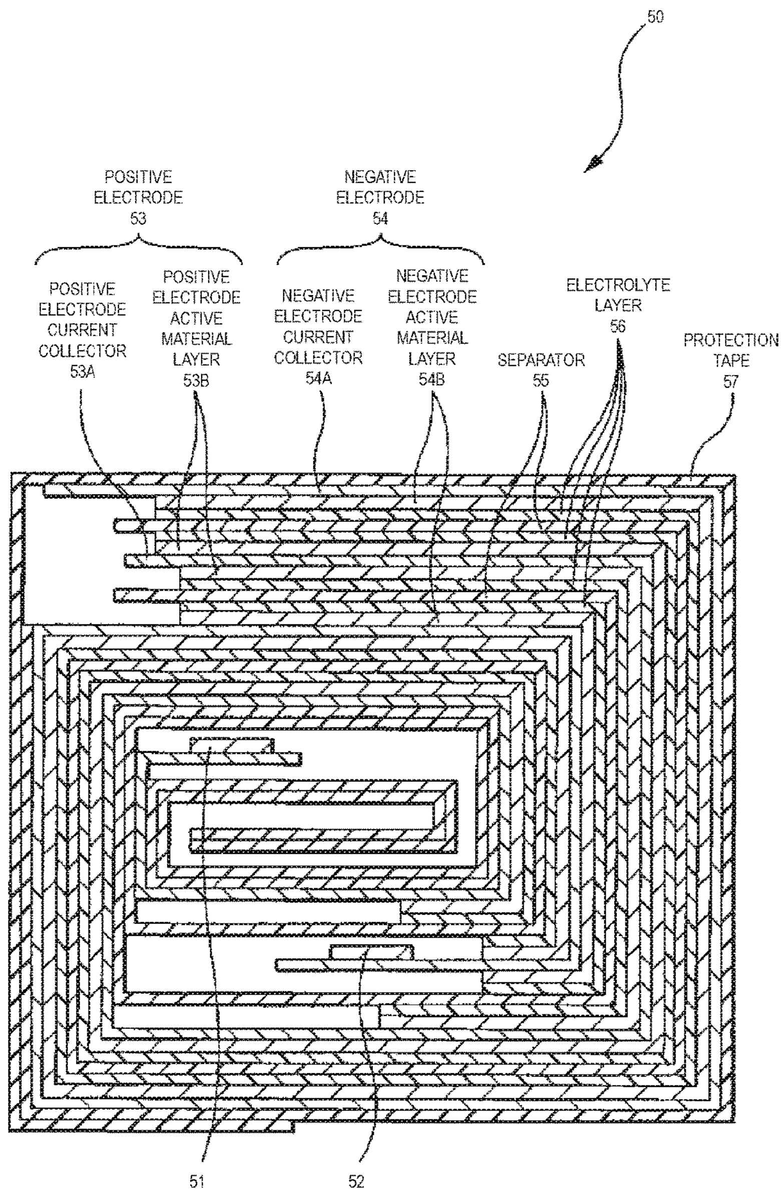
FIG. 2 is a cross-sectional view showing a cross-sectional configuration along line I-I of the wound electrode body shown in FIG. 1.

FIG. 2 shows a cross-sectional structure along line I-I of the wound electrode body 50 shown in FIG. 1. As shown in FIG. 1, the wound electrode body 50 is a body in which a band-like cathode 53 and a band-like anode 54 are stacked and wound via a band-like separator 55 and an electrolyte layer 56, and the outermost peripheral portion is protected by a protection tape 57 as necessary.

(Cathode)

The cathode 53 has a structure in which a cathode active material layer 53B is provided on one surface or both surfaces of a cathode current collector 53A.

The cathode 53 is an electrode in which the cathode active material layer 53B comprising a cathode active material is formed on both surfaces of the cathode current collector 53A. As the cathode current collector 53A, for example, a metal foil such as aluminum (Al) foil, nickel (Ni) foil, or stainless steel (SUS) foil may be used.

The cathode active material layer 53B is configured to comprise, for example, a cathode active material, an electrically conductive agent, and a binder. As the cathode active material, one or more cathode materials that can occlude and release lithium may be used, and another material such as a binder or an electrically conductive agent may be comprised as necessary.

As the cathode material that can occlude and release lithium, for example, a lithium-comprising compound is preferable. This is because a high energy density is obtained. As the lithium-comprising compound, for example, a composite oxide comprising lithium and a transition metal element, a phosphate compound comprising lithium and a transition metal element, or the like is given. Of them, a material comprising at least one of the group consisting of cobalt (Co), nickel (Ni), manganese (Mn), and iron (Fe) as a transition metal element is preferable. This is because a higher voltage is obtained.

As the cathode material, for example, a lithium-comprising compound expressed by $Li_xM1O_2$ or $Li_yM2PO_4$ may be used. In the formula, M1 and M2 represent one or more transition metal elements. The values of x and y vary with the charging and discharging state of the battery, and are usually $0.05 \leq x \leq 1.10$ and $0.05 \leq y \leq 1.10$. As the composite oxide comprising lithium and a transition metal element, for example, a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ ($0<z<1$)), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}Ni_tO_4$ ($0<t<2$)) having the spinel structure, or the like is given. Of them, a composite oxide comprising cobalt is preferable. This is because a high capacity is obtained and also excellent cycle characteristics are obtained. As the phosphate compound comprising lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-comprising compounds mentioned above is coated with minute particles made of another of the lithium-comprising compounds may be used.

Other than these, as the cathode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not comprising lithium such as niobium diselenide ($NbSe_2$) (in particular, a layered compound or a spinel-type compound), and a lithium-comprising compound comprising lithium, and also an electrically conductive polymer such as sulfur, polyaniline, polythiophene, polyacetylene, or polypyrrole are given. The cathode material that can occlude and release lithium may be a material other than the above as a matter of course. The cathode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The cathode 53 includes a cathode lead 51 connected to an end portion of the cathode current collector 53A by spot welding or ultrasonic welding. The cathode lead 51 is preferably formed of net-like metal foil, but there is no problem when a non-metal material is used as long as an electrochemically and chemically stable material is used and an electric connection is obtained. Examples of materials of the cathode lead 51 include aluminum (Al), nickel (Ni), and the like.

(Anode)

The anode 54 has a structure in which an anode active material layer 54B is provided on one of or both surfaces of an anode current collector 54A, and is disposed such that the anode active material layer 54B is opposed to the cathode active material layer 53B.

Although not shown, the anode active material layer 54B may be provided only on one surface of the anode current collector 54A. The anode current collector 54A is formed of, for example, a metal foil such as copper foil.

The anode active material layer 54B is configured to comprise, as the anode active material, one or more anode materials that can occlude and release lithium, and may be configured to comprise another material such as a binder or an electrically conductive agent similar to that of the cathode active material layer 53B, as necessary.

In the non-aqueous electrolyte battery, the electrochemical equivalent of the anode material that can occlude and release lithium is set larger than the electrochemical equivalent of the cathode 53, and theoretically lithium metal is prevented from being precipitated on the anode 54 in the course of charging.

In the non-aqueous electrolyte battery, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the anode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the cathode active material is the same; and thus the amounts of the cathode active material and the anode active material are adjusted accordingly. Thereby, a high energy density is obtained.

As the anode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another anode material that can occlude and release lithium and can be increased in capacity, a material that can occlude and release lithium and comprises at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The anode material may be a simple substance, an alloy, or a compound of a metal element or a semi-metal element, or may be a material that includes a phase of one or more of them at least partly. Note that in the present technology, the alloy includes a material formed with two or more kinds of metal elements and a material comprising one or more kinds of metal elements and one or more kinds of semi-metal elements. Further, the alloy may comprise a non-metal element. Examples of its texture include a solid solution, a eutectic (eutectic mixture), an intermetallic compound, and one in which two or more kinds thereof coexist.

Examples of the metal element or semi-metal element comprised in this anode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the anode material, it is preferable to use a material comprising, as a constituent element, a metal element or a semi-metal element of 4B group in the short periodical table. It is more preferable to use a material comprising at least one of silicon (Si) and tin (Sn) as a constituent element. It is even more preferable to use a material comprising at least silicon. This is because silicon (Si) and tin (Sn) each have a high capability of occluding and releasing lithium, so that a high energy density can be obtained. Examples of the anode material comprising at least one of silicon and tin include a simple substance, an alloy, or a compound of silicon, a simple substance, an alloy, or a compound of tin, and a material comprising, at least partly, a phase of one or more kinds thereof.

Examples of the alloy of silicon include alloys comprising, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys comprising, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds comprising oxygen (O) or carbon (C), which may comprise any of the above-described second constituent elements in addition to tin (Sn) or silicon (Si).

Among them, as the anode material, an SnCoC-comprising material is preferable which comprises cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-comprising material may also comprise another constituent element as necessary. For example, it is preferable to comprise, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be comprised. This is because the capacity characteristics or cycling characteristics can be further increased.

Note that the SnCoC-comprising material has a phase comprising tin (Sn), cobalt (Co), and carbon (C), and this phase preferably has a low crystalline structure or an amorphous structure. Further, in the SnCoC-comprising material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-comprising material appears in a region lower than 284.5 eV, at least a part of carbon comprised in the SnCoC-comprising material is bound to a metal element or a semi-metal element, which is another constituent element In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-comprising material, the peak of the surface contamination carbon and the peak of the carbon in the SnCoC-comprising material are separated from each other by means of analysis using, for example, a commercially available software program. In the analysis of the waveform, the position of a main peak existing on the lowest binding energy side is used as an energy reference (284.8 eV).

As the anode material that can occlude and release lithium, for example, also a metal oxide, a polymer compound, or other materials that can occlude and release lithium are given. As the metal oxide, for example, a lithium titanium oxide comprising titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

(Separator)

The separator 55 is a porous membrane formed of an insulating membrane that has a large ion permeability and a prescribed mechanical strength. A non-aqueous electrolyte solution is retained in the pores of the separator 55.

As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material comprising a porous membrane made of a polyolefin resin has good separability between the cathode 53 and the anode 54, and can further reduce the possibility of an internal short circuit.

Any thickness can be set as the thickness of the separator 55 to the extent that it is not less than the thickness that can keep necessary strength. The separator 55 is preferably set to such a thickness that the separator 55 provides insulation between the cathode 53 and the anode 54 to prevent a short circuit etc., has ion permeability for producing battery reaction via the separator 55 favorably, and can make the volumetric efficiency of the active material layer that contributes to battery reaction in the battery as high as possible. Specifically, the thickness of the separator 55 is preferably not less than 4 μm and not more than 20 μm, for example.

(Electrolyte Layer)

The electrolyte layer 56 includes a matrix polymer compound, a non-aqueous electrolyte solution and solid particles. The electrolyte layer 56 is a layer in which the non-aqueous electrolyte solution is retained by, for example, the matrix polymer compound, and is, for example, a layer formed of so-called gel-like electrolytes. Note that the solid particles may be comprised inside the anode active material layer 54B and/or inside a cathode active material layer 53B. In addition, while details will be described in the following modification examples, a non-aqueous electrolyte solution, which comprises liquid electrolytes, may be used in place of the electrolyte layer 56. In this case, the non-aqueous electrolyte battery includes a wound body having a configuration in which the electrolyte layer 56 is removed from the wound electrode body 50 in place of the wound electrode body 50. The wound body is impregnated with the non-aqueous electrolyte solution, which comprises liquid electrolytes filled in the package member 60.

(Matrix Polymer Compound)

A resin having the property of compatibility with the solvent, or the like may be used as the matrix polymer compound (resin) that retains the electrolyte solution. As such a matrix polymer compound, a fluorine-comprising resin such as polyvinylidene difluoride or polytetrafluoroethylene, a fluorine-comprising rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C. or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

(Non-aqueous Electrolyte Solution)

The non-aqueous electrolyte solution comprises an electrolyte salt and a non-aqueous solvent in which the electrolyte salt is dissolved.

(Electrolyte Salt)

The electrolyte salt comprises, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

(Non-aqueous Solvent)

(Cyclic Alkylene Carbonate)

The non-aqueous electrolyte solution preferably comprises a non-aqueous solvent having a high boiling point such as a boiling point of 200° C. or more as a main solvent of the non-aqueous solvent. Examples of the non-aqueous solvent having a high boiling point include a cyclic alkylene carbonate.

The cyclic alkylene carbonate is a cyclic carbonate ester having no carbon-carbon multiple bond and no halogen. Specific examples of the cyclic alkylene carbonate include ethylene carbonate, propylene carbonate, 1,2-butylene carbonate, 2,3-butylene carbonate, tert-butyl ethylene carbonate, and trimethylene carbonate. In view of stability and viscosity, among these carbonates, the ethylene carbonate and/or the propylene carbonate are preferably used as the main solvent. The ethylene carbonate and the propylene carbonate have a high dielectric constant, promote dissociation into cations and anions, and can increase the number of ions in a state in which they can contribute to a discharge reaction, thereby preferably used. Note that dimethyl carbonate or the like promotes the movement of ions that decrease the viscosity, but does not promote dissociation so that it is not possible to significantly improve a low temperature characteristic. The ethylene carbonate and the propylene carbonate increase the number of valid ions, have a strong mutual attraction force, and easily form a cluster, and when a ratio thereof increases, it is not possible to significantly improve a low temperature characteristic. However, in the present technology, since solid particles are disposed in an appropriate region inside the battery at an appropriate concentration, the viscosity of the electrolyte solution decreases and the low temperature characteristic can be further improved without decreasing a concentration of EC or PC or a dissociation effect, EC or PC is preferable. When the cyclic alkylene carbonate is used as the non-aqueous solvent, one kind may be used alone or a mixture of a plurality of kinds may be used.

(Content of Cyclic Alkylene Carbonate)

In view of obtaining a more excellent effect, with respect to a total mass of the non-aqueous solvent, as a content of the cyclic alkylene carbonate comprised in the non-aqueous electrolyte solution, 30 mass % or more is preferable, 30 mass % or more and 100 mass % or less is preferable, 30 mass % or more and 80 mass % or less is more preferable, and 35 mass % or more and 60 mass % or less is most preferable.

(Other Solvents)

The non-aqueous electrolyte solution may comprise a solvent other than the solvent having a high boiling point exemplified above as the non-aqueous solvent Examples of the other solvent include a chain carbonate ester such as dimethyl carbonate (DMC), diethyl carbonate (DEC), and ethyl methyl carbonate (EMC), a lactone such as γ-butyrolactone and γ-valerolactone, and a lactam such as N-methyl-2-pyrrolidone.

(Solid Particles)

As the solid particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide ($Al(OH)_3$, (bayerite or gibbsite)), zinc hydroxide ($Zn(OH)_2$), or the like, an oxide hydroxide or a hydrated oxide such as boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), or magnesium oxide hydrate ($MgO_a.mH_2O$ (a=0.8 to 1.2, m=0.5 to 10)), a hydroxide hydrate such as magnesium hydroxide octahydrate, or the like may be preferably used. As the metal carbide, boron carbide ($B_4C$) or the like may be preferably used. As the metal nitride, silicon nitride ($Si_3N_4$), boron nitride (BN), aluminum nitride (AlN), titanium nitride (TIN), or the like may be preferably used.

As the metal fluoride, lithium fluoride (LiF), aluminum fluoride ($AlF_3$), calcium fluoride ($CaF_2$), barium fluoride ($BaF_2$), magnesium fluoride, or the like may be preferably used. As the phosphate compound, trilithium phosphate ($Li_3PO_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ($[SiO_4]^{4-}$). As the nesosilicate mineral, one that falls under olivines or garnets, or the like is given. As the nesosilicate mineral, more specifically, an olivine (a continuous solid solution of $Mg_2SiO_4$ (forsterite) and $Fe_2SiO_4$ (fayalite)), magnesium silicate (forsterite, $Mg_2SiO_4$), aluminum silicate ($Al_2SiO_5$; sillimanite, andalusite, or kyanite), zinc silicate (willemite, $Zn_2SiO_4$), zirconium silicate (zircon, $ZrSiO_4$), mullite ($3Al_2O_3.2SiO_2$ to $2Al_2O_3.SiO_2$), or the like is given.

The sorosilicate mineral is a group-structured silicate mineral formed of composite bond groups of Si—O tetrahedrons ($[Si_2O_7]^{6-}$ or $[Si_5O_{16}]^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ($[Si_3O_9]^{6-}$, $[Si_4O_{12}]^{8-}$, or $[Si_6O_{18}]^{12-}$). As the cyclosilicate mineral, beryl, tourmalines, or the like is given.

The inosilicate mineral is a fibrous silicate mineral having a chain-like form ($[Si_2O_6]^{4-}$) and a band-like form ($[Si_3O_9]^{6-}$, $[Si_4O_{11}]^{6-}$, $[Si_5O_{15}]^{10-}$, or $[Si_7O_{21}]^{14-}$) in which the linkage of Si—O tetrahedrons extends infinitely. As the inosilicate mineral, for example, one that falls under pyroxenes such as calcium silicate (wollastonite, $CaSiO_3$), one that falls under amphiboles, or the like is given.

The layered silicate mineral is a layer-like silicate mineral having network bonds of Si—O tetrahedrons ($[SiO_4]^{4-}$). Specific examples of the layered silicate mineral are described later.

The tectosilicate mineral is a silicate mineral of a three-dimensional network structure in which Si—O tetrahedrons ($[SiO_4]^{4-}$) form three-dimensional network bonds. As the tectosilicate mineral, quartz, feldspars, zeolites, or the like, an aluminosilicate ($aM_2O.bAl_2O_3.cSiO_2.dH_2O$; M being a metal element; a, b, c, and d each being an integer of 1 or more) such as a zeolite ($M_{2/n}O.Al_2O_3.xSiO_2.yH_2O$; M being a metal element; n being the valence of M; x≥2; y≥0), or the like is given.

As the asbestos, chrysotile, amosite, anthophyllite, or the like is given.

As the carbonate mineral, dolomite ($CaMg(CO_3)_2$), hydrotalcite ($Mg_6Al_2(CO_3)(OH)_{16}.4(H_2O)$), or the like is given.

As the oxide mineral, spinel ($MgAl_2O_4$) or the like is given.

As other minerals, strontium titanate ($SrTiO_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral comprises a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite ($Al_2Si_2O_5(OH)_4$), dickite, or the like is given. As one that falls under the pyrophyllite-talc group, for example, talc ($Mg_3Si_4O_{10}(OH)_2$), willemseite, pyrophyllite ($Al_2Si_4O_{10}(OH)_2$), or the like is given. As one that falls under the smectite group, for example, saponite [$(Ca/2,Na)_{0.33}(Mg,Fe^{2+})_3(Si,Al)_4O_{10}(OH)_2.4H_2O$], hectorite, sauconite, montmorillonite {$(Na,Ca)_{0.33}(Al,Mg)2Si_4O_{10}(OH)_2.nH_2O$; a clay comprising montmorillonite as a main component is called bentonite}, beidellite, nontronite, or the like is given. As one that falls under the mica group, for example, muscovite ($KAl_2(AlSi_3)O_{10}(OH)_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite ($Mg_9Si_{12}O_{30}(OH)_6(OH_2)_4.6H_2O$), palygorskite, or the like is given.

As other silicate minerals, a porous aluminosilicate such as a zeolite ($M_{2/n}O.Al_2O_3.xSiO_2.yH_2O$; M being a metal element; n being the valence of M; x≥2; y≥0), attapulgite [$(Mg,Al)2Si_4O_{10}(OH).6H_2O$], or the like is given.

As the layered carbonate mineral, hydrotalcite ($Mg_6Al_2(CO_3)(OH)_{16}.4(H_2O)$) or the like is given.

As the amorphous or quasicrystalline clay mineral, hisingerite, imogolite ($Al_2SiO_3(OH)$), allophane, or the like is given.

These inorganic particles may be used singly, or two or more of them may be mixed for use. The inorganic particle has also oxidation resistance; and when the electrolyte layer 56 is provided between the cathode 53 and the separator 55, the inorganic particle has strong resistance to the oxidizing environment near the cathode during charging.

The solid particle may be also an organic particle. As the material that forms the organic particle, melamine, melamine cyanurate, melamine polyphosphate, cross-linked polymethyl methacrylate (cross-linked PMMA), polyolefin, polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

In view of obtaining a more excellent effect, among such solid particles, particles of boehmite, aluminum hydroxide, magnesium hydroxide, and a silicate salt are preferable. Such solid particles are preferable since a deviation in the battery due to —O—H arranged in a sheet form in a crystal structure strongly causes the cluster to be disintegrated, and ions that rapidly move at low temperatures can be effectively concentrated at a recess between active material particles.

(Configuration of an Inside of a Battery)

Figure 3:
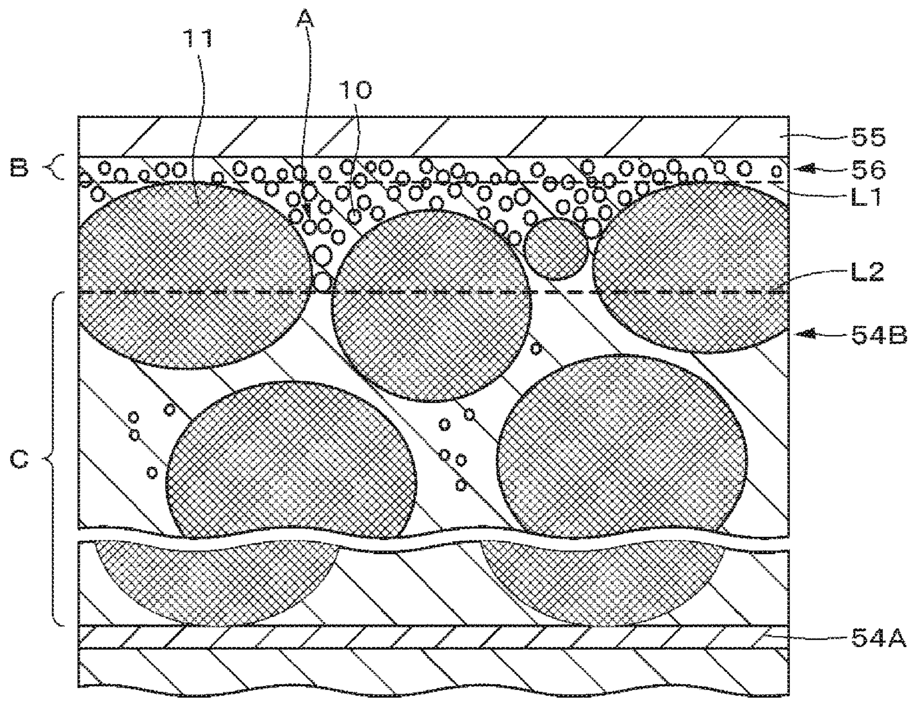
FIG. 3A and FIG. 3B are schematic cross-sectional views showing a configuration of an inside of a non-aqueous electrolyte battery.
Figure 3:
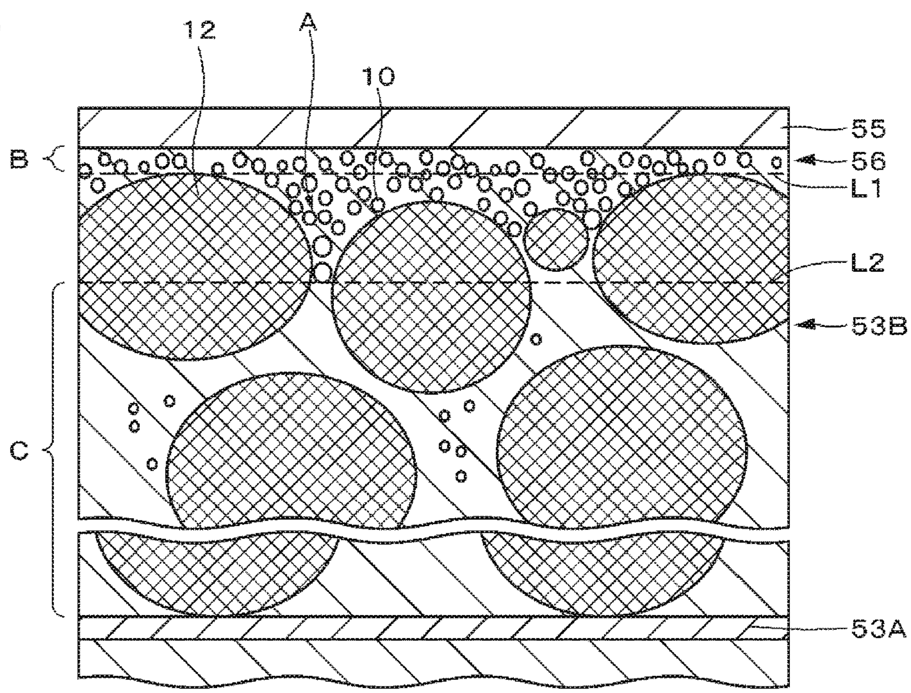

FIG. 3A and FIG. 3B are schematic cross-sectional views of an enlarged part of an inside of the non-aqueous electrolyte battery according to the first embodiment of the present technology. Note that the binder, the conductive agent and the like comprised in the active material layer are not shown.

As shown in FIG. 3A, the non-aqueous electrolyte battery according to the first embodiment of the present technology has a configuration in which particles 10, which are the solid particles described above, are disposed between the separator 55 and the anode active material layer 54B and inside the anode active material layer 54B at an appropriate concentration in appropriate regions. In such a configuration, three regions divided into a recess impregnation region A of an anode side, a top coat region B of an anode side and a deep region C of an anode side are formed.

Also, similarly, as shown in FIG. 3B, the non-aqueous electrolyte battery according to the first embodiment of the present technology has a configuration in which particles 10, which are the solid particles described above, are disposed between the separator 55 and the cathode active material layer 53B and inside the cathode active material layer 53B at an appropriate concentration in appropriate regions. In such a configuration, three regions divided into a recess impregnation region A of a cathode side, a top coat region B of a cathode side and a deep region C of a cathode side are formed.

(Recess Impregnation Region A, Top Coat Region B, and Deep Region C)

For example, the recess impregnation regions A of the anodethe anode side and the cathode side, the top coat regions B of the anodethe anode side and the cathode side, and the deep regions C of the anodethe anode side and the cathode side are formed as follows.

(Recess Impregnation Region A)

(Recess Impregnation Region of an Anode Side)

The recess impregnation region A of the anodethe anode side refers to a region including a recess between the adjacent anode active material particles 11 positioned on the outermost surface of the anodethe anode active material layer 54B comprising anode active material particles 11 serving as anode active materials. The recess impregnation region A is impregnated with the particles 10 and electrolytes comprising the cyclic alkylene carbonate. Accordingly, the recess impregnation region A of the anodethe anode side is filled with the electrolytes comprising the cyclic alkylene carbonate. In addition, the particles 10, which serve as solid particles to be included in the electrolytes, are comprised in the recess impregnation region A of the anode side. Note that the electrolytes may be gel-like electrolytes or liquid electrolytes including the non-aqueous electrolyte solution.

A region other than a cross section of the anode active material particles 11 inside a region between two parallel lines L1 and L2 shown in FIG. 3A is classified as the recess impregnation region A of the anode side including the recess in which the electrolytes and the particles 10 are disposed. The two parallel lines L1 and L2 are drawn as follows. Within a predetermined visual field width (typically, a visual field width of 50 μm) shown in FIG. 3A, cross sections of the separator 55, the anode active material layer 54B, and a region between the separator 55 and the anode active material layer 54B are observed. In this observation field of view, the two parallel lines L1 and L2 perpendicular to a thickness direction of the separator 55 are drawn. The parallel line L1 is a line that passes through a position closest to the separator 55 in a cross-sectional image of the anode active material particles 11. The parallel line L2 is a line that passes through the deepest part in a cross-sectional image of the particles 10 included in the recess between the adjacent anode active material particles 11. The deepest part refers to a position farthest from the separator 55 in a thickness direction of the separator 55. Also, the cross section can be observed using, for example, a scanning electron microscope (SEM).

(Recess Impregnation Region of a Cathode Side)

The recess impregnation region A of the cathode side refers to a region including a recess between adjacent cathode active material particles 12 positioned on the outermost surface of the cathode active material layer 53B comprising the cathode active material particles 12 serving as cathode active materials. The recess impregnation region A is impregnated with the particles 10 serving as solid particles and electrolytes comprising the cyclic alkylene carbonate. Accordingly, the recess impregnation region A of the cathode side is filled with the electrolytes comprising the cyclic alkylene carbonate. In addition, the particles 10, which serve as solid particles to be included in the electrolytes, are comprised in the recess impregnation region A of the cathode side. Note that the electrolytes may be gel-like electrolytes or liquid electrolytes including the non-aqueous electrolyte solution.

A region other than a cross section of the cathode active material particles 12 inside a region between two parallel lines L1 and L2 shown in FIG. 3B is classified as the recess impregnation region A of the cathode side including the recess in which the electrolytes and the particles 10 are disposed. The two parallel lines L1 and L2 are drawn as follows. Within a predetermined visual field width (typically, a visual field width of 50 μm) shown in FIG. 3B, cross sections of the separator 55, the cathode active material layer 53B and a region between the separator 55 and the cathode active material layer 53B are observed. In this observation field of view, the two parallel lines L1 and L2 perpendicular to a thickness direction of the separator 55 are drawn. The parallel line L1 is a line that passes through a position closest to the separator 55 in a cross-sectional image of the cathode active material particles 12. The parallel line L2 is a line that passes through the deepest part in a cross-sectional image of the particles 10 included in the recess between the adjacent cathode active material particles 12. Note that the deepest part refers to a position farthest from the separator 55 in a thickness direction of the separator 55.

(Top Coat Region B)

(Top Coat Region of an Anode Side)

The top coat region B of the anode side refers to a region between the recess impregnation region A of the anode side and the separator 55. The top coat region B is filled with the electrolytes comprising the cyclic alkylene carbonate. The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3A is classified as the top coat region B of the anode side.

(Top Coat Region of a Cathode Side)

The top coat region B of the cathode side refers to a region between the recess impregnation region A of the cathode side and the separator 55. The top coat region B is filled with the electrolytes comprising the cyclic alkylene carbonate. The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3B is classified as the top coat region B of the cathode side.

(Deep Region C)

(Deep Region of an Anode Side)

The deep region C of the anode side refers to a region inside the anode active material layer 54B, which is deeper than the recess impregnation region A of the anode side. A gap between the anode active material particles 11 of the deep region C is filled with the electrolytes comprising the cyclic alkylene carbonate. The particles 10 to be included in the electrolytes are comprised in the deep region C. Note that the particles 10 may not be comprised in the deep region C.

A region of the anode active material layer 54B other than the recess impregnation region A and the top coat region B within the same predetermined observation field of view shown in FIG. 3A is classified as the deep region C of the anode side. For example, a region between the above-described parallel line L2 and anode current collector 54A within the same predetermined observation field of view shown in FIG. 3A is classified as the deep region C of the anode side.

(Deep Region of a Cathode Side)

The deep region C of the cathode side refers to a region inside the cathode active material layer 53B, which is deeper than the recess impregnation region A of the cathode side. A gap between the cathode active material particles 12 of the deep region C of the cathode side is filled with the electrolytes comprising the cyclic alkylene carbonate. The particles 10 to be included in the electrolytes are comprised in the deep region C. Note that the particles 10 may not be comprised in the deep region C.

A region of the cathode active material layer 53B other than the recess impregnation region A and the top coat region B within the same predetermined observation field of view shown in FIG. 3B is classified as the deep region C of the cathode side. For example, a region between the above-described parallel line L2 and cathode current collector 53A within the same predetermined observation field of view shown in FIG. 3B is classified as the deep region C of the cathode side.

(Concentration of Solid Particles)

A concentration of solid particles of the recess impregnation region A of the anode side is 30 volume % or more. Furthermore, 30 volume % or more and 90 volume % or less is preferable, and 40 volume % or more and 80 volume % or less is more preferable. When the concentration of the solid particles of the recess impregnation region A of the anode side is in the above range, more solid particles are disposed in the recess between adjacent particles. A cluster of ion ligands is disintegrated by the solid particles, and it is possible to quickly supply ions to the deep region C inside the anode active material layer even under a low temperature environment.

For the same reason as above, a concentration of solid particles of the recess impregnation region A of the cathode side is 30 volume % or more. Furthermore, 30 volume % or more and 90 volume % or less is preferable, and 40 volume % or more and 80 volume % or less is more preferable.

The concentration of the solid particles of the recess impregnation region A of the anode side is preferably 10 times a concentration of solid particles of the deep region C of the anode side or more. The concentration of the particles of the deep region C of the anode side is preferably 3 volume % or less. When the concentration of the solid particles of the deep region C of the anode side is too high, since too many solid particles are between active material particles, the solid particles cause resistance, a side reaction occurs, and an internal resistance increases.

For the same reason, the concentration of the solid particles of the recess impregnation region A of the cathode side is preferably 10 times a concentration of solid particles of the deep region C of the cathode side or more. A concentration of particles of the deep region C of the cathode side is preferably 3 volume % or less. When the concentration of the solid particles of the deep region C of the cathode side is too high, since too many solid particles are between active material particles, the solid particles cause a resistance, a side reaction occurs, and an internal resistance increases.

(Concentration of Solid Particles)

The concentration of solid particles described above refers to a volume concentration (volume %) of solid particles, which is defined as an area percentage ((“total area of particle cross section”÷“area of observation field of view”)×100)(%) of a total area of cross sections of particles when an observation field of view is 2 μm×2 μm. Note that, when a concentration of solid particles of the recess impregnation region A is defined, the observation field of view is set, for example, in the vicinity of a center of a recess formed between adjacent particles in a width direction. Observation is performed using, for example, the SEM, an image obtained by photography is processed, and therefore it is possible to calculate the above areas.

(Thickness of the Recess Impregnation Region A, the Top Coat Region B, and the Deep Region C)

The thickness of the recess impregnation region A of the anode side is preferably 10% or more and 40% or less of the thickness of the anode active material layer 54B. When the thickness of the recess impregnation region A of the anode side is in the above range, it is possible to ensure an amount of necessary solid particles to be disposed in the recess and maintain a state in which too many of the solid particles do not enter the deep region C. When the thickness of the recess impregnation region A of the anode side is less than 10% of the thickness of the anode active material layer 54B, ion clusters are insufficiently disintegrated, and a rapid charge characteristic tends to decrease. When the thickness of the recess impregnation region A of the anode side is more than 40% of the thickness of the anode active material layer 54B, solid particles enter the deep region C, a resistance increases, and a rapid charge characteristic tends to decrease. Further, the thickness of the recess impregnation region A of the anode side is in the above range, and more preferably, is twice the thickness of the top coat region B of the anode side or more. This is because it is possible to prevent a distance between electrodes from increasing and further improve an energy density. In addition, for the same reason, the thickness of the recess impregnation region A of the cathode side is more preferably twice the thickness of the top coat region B of the cathode side or the like.

(Method of Measuring a Thickness of Regions)

When the thickness of the recess impregnation region A is defined, an average value of thicknesses of the recess impregnation region A in four different observation fields of view is set as the thickness of the recess impregnation region A. When the thickness of the top coat region B is defined, an average value of thicknesses of the top coat region B in four different observation fields of view is set as the thickness of the top coat region B. When the thickness of the deep region C is defined, an average value of thicknesses of the deep region C in four different observation fields of view is set as the thickness of the deep region C.

(Particle Size of Solid Particles)

As a particle size of solid particles, a particle size D50 is preferably “$2/\sqrt{3}-1$” times a particle size D50 of active material particles or less. In addition, as the particle size of the solid particles, a particle size D50 is more preferably 0.1 μm or more. As the particle size of the solid particles, a particle size D95 is preferably “$2/\sqrt{3}-1$” times a particle size D50 of active material particles or more. Particles having a large particle size block an interval between adjacent active material particles at a bottom of the recess and it is possible to suppress too many of the solid particles from entering the deep region C and a negative influence on a battery characteristic.

(Measurement of a Particle Size)

A particle size D50 of solid particles is, for example, a particle size at which 50% of particles having a smaller particle size are cumulated (a cumulative volume of 50%) in a particle size distribution in which solid particles after components other than solid particles are removed from electrolytes comprising solid particles are measured by a laser diffraction method. In addition, based on the measured particle size distribution, it is possible to obtain a value of a particle size D95 at a cumulative volume 95%. A particle size D50 of active materials is a particle size at which 50% of particles having a smaller particle size are cumulated (a cumulative volume of 50%) in a particle size distribution in which active material particles after components other than active material particles are removed from an active material layer comprising active material particles are measured by a laser diffraction method.

(Specific Surface Area of Solid Particles)

The specific surface area ($m^2/g$) is a BET specific surface area ($m^2/g$) measured by a BET method, which is a method of measuring a specific surface area. The BET specific surface area of solid particles is preferably 1 $m^2/g$ or more and 60 $m^2/g$ or less. When the BET specific surface area is in the above range, it is possible to obtain a more excellent effect. On the other hand, when the BET specific surface area is too large, a force for attracting ions and the solvent becomes stronger, and a low temperature characteristic tends to decrease. Note that the specific surface area of the solid particles can be measured using, for example, solid particles after components other than solid particles are removed from electrolytes comprising solid particles in the same manner as described above.

(Volume Ratio of Solid Particles)

In view of obtaining a more excellent effect, with respect to a volume of electrolytes, as a volume ratio of solid particles, 1 volume % or more and 50% volume % or less is preferable, 2 volume % or more and 40 volume % or less is more preferable, and 3 volume % or more and 30 volume % or less is most preferable.

(Configuration Including the Recess Impregnation Region A, the Top Coat Region B, and the Deep Region C, which are Only on the Anode Side or the Cathode Side)

Note that, as will be described below, the electrolyte layer 56 comprising solid particles may be formed only on both principal surfaces of the anode 54. In addition, the electrolyte layer 56 comprising no solid particles may be applied to and formed on both principal surfaces of the cathode 53. Similarly, the electrolyte layer 56 comprising solid particles may be formed only on both principal surfaces of the cathode 53. In addition, the electrolyte layer 56 without solid particles may be applied to and formed on both principal surfaces of the anode 54. In such cases, only the recess impregnation region A of the anode side, the top coat region B of the anode side, and the deep region C of the anode side are formed, and these regions are not formed on the cathode side or only the recess impregnation region A of the cathode side, the top coat region B of the cathode side, and the deep region C of the cathode side are formed, and these regions are not formed on the anode side.

(1-2) Method of Manufacturing an Exemplary Non-aqueous Electrolyte Battery

An exemplary non-aqueous electrolyte battery can be manufactured, for example, as follows.

(Method of Manufacturing a Cathode)

Cathode active materials, the conductive agent, and the binder are mixed to prepare a cathode mixture. The cathode mixture is dispersed in a solvent such as N-methyl-2-pyrrolidone to prepare a cathode mixture slurry in a paste form. Next, the cathode mixture slurry is applied to the cathode current collector 53A, the solvent is dried, and compression molding is performed by, for example, a roll press device. Therefore, the cathode active material layer 53B is formed and the cathode 53 is fabricated.

(Method of Manufacturing an Anode)

Anode active materials and the binder are mixed to prepare an anode mixture. The anode mixture is dispersed in a solvent such as N-methyl-2-pyrrolidone to prepare an anode mixture slurry in a paste form. Next, the anode mixture slurry is applied to the anode current collector 54A, the solvent is dried, and compression molding is performed by, for example, a roll press device. Therefore, the anode active material layer 54B is formed and the anode 54 is fabricated.

(Preparation of a Non-aqueous Electrolyte Solution)

An electrolyte salt is dissolved in a non-aqueous solvent comprising the cyclic alkylene carbonate to prepare a non-aqueous electrolyte solution.

(Solution Coating)

A coating solution comprising a non-aqueous electrolyte solution, a matrix polymer compound, solid particles, and a dilution solvent (for example, dimethyl carbonate) is heated and applied to both principal surfaces of each of the cathode 53 and the anode 54. Then, the dilution solvent is evaporated and the electrolyte layer 56 is formed.

When the coating solution is heated and applied, electrolytes comprising solid particles can be impregnated into a recess between adjacent anode active material particles positioned on the outermost surface of the anode active material layer 54B and the deep region C inside the anode active material layer 54B. In this case, when solid particles are filtered in the recess between adjacent particles, a concentration of particles in the recess impregnation region A of the anode side increases. Accordingly, it is possible to set a difference of concentrations of particles between the recess impregnation region A and the deep region C. Similarly, when the coating solution is heated and applied, electrolytes comprising solid particles can be impregnated into a recess between adjacent cathode active material particles positioned on the outermost surface of the cathode active material layer 53B and the deep region C inside the cathode active material layer 53B. In this case, when solid particles are filtered in the recess between adjacent particles, a concentration of particles in the recess impregnation region A of the cathode side increases. Accordingly, it is possible to set a difference of concentrations of particles between the recess impregnation region A and the deep region C. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of solid particles or more, which are preferably used as the solid particles. Accordingly, an interval between particles at a bottom of the recess is filled with some solid particles having a large particle size and the solid particles can be easily filtered.

When the excess coating solution is scraped off after the coating solution is applied, it is possible to prevent a distance between electrodes from extending unintentionally. In addition, by scraping a surface of the coating solution, it is possible to dispose more solid particles in the recess between adjacent active material particles, and a ratio of solid particles of the top coat region B decreases. Accordingly, most of the solid particles can be intensively disposed in the recess impregnation region A.

Note that solution coating may be performed in the following manner. A coating solution (a coating solution excluding particles) comprising a non-aqueous electrolyte solution, a matrix polymer compound, and a dilution solvent (for example, dimethyl carbonate) is applied to both principal surfaces of the cathode 53, and the electrolyte layer 56 comprising no solid particles may be formed. In addition, no electrolyte layer 56 is formed on one principal surface or both principal surfaces of the cathode 53, and the electrolyte layer 56 comprising the same solid particles may be formed only on both principal surfaces of the anode 54.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 on which the electrolyte layer 56 is formed and the anode 54 on which the electrolyte layer 56 is formed are laminated through the separator 55 to prepare a laminated body. Then, the laminated body is wound in a longitudinal direction, the protection tape 57 is adhered to the outermost peripheral portion and the wound electrode body 50 is formed.

Finally, for example, the wound electrode body 50 is inserted into the package member 60, and outer periphery portions of the package member 60 are enclosed in close contact with each other by thermal fusion bonding. In this case, the adhesive film 61 is inserted between the package member 60 and each of the cathode lead 51 and the anode lead 52. Accordingly, the non-aqueous electrolyte battery shown in FIG. 1 and FIG. 2 is completed.

[Modification Example 1-1]

The non-aqueous electrolyte battery according to the first embodiment may also be fabricated as follows. The fabrication method is the same as the method of manufacturing an exemplary non-aqueous electrolyte battery described above except that, in the solution coating process of the method of manufacturing an exemplary non-aqueous electrolyte battery, in place of applying the coating solution to both surfaces of at least one electrode of the cathode 53 and the anode 54, the coating solution is formed on at least one principal surface of both principal surfaces of the separator 55, and then a heating and pressing process is additionally performed.

[Method of Manufacturing a Non-aqueous Electrolyte Battery of Modification Example 1-1]

(Fabrication of a Cathode, an Anode, and a Separator, and Preparation of a Non-Aqueous Electrolyte Solution)

In the same manner as in the method of manufacturing an exemplary non-aqueous electrolyte battery, the cathode 53, the anode 54 and the separator 55 are fabricated and the non-aqueous electrolyte solution is prepared.

(Solution Coating)

A coating solution comprising a non-aqueous electrolyte solution, a matrix polymer compound, solid particles, and a dilution solvent (for example, dimethyl carbonate) is applied to at least one surface of both surfaces of the separator 55. Then, the dilution solvent is evaporated and the electrolyte layer 56 is formed.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54, and the electrolyte layer 56 are laminated through the formed separator 55 to prepare a laminated body. Then, the laminated body is wound in a longitudinal direction, the protection tape 57 is adhered to the outermost peripheral portion, and the wound electrode body 50 is formed.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Finally, a depression portion is formed by deep drawing the package member 60 formed of a laminated film, the wound electrode body 50 is inserted into the depression portion, an unprocessed part of the package member 60 is folded at an upper part of the depression portion, and a peripheral portion of the depression portion is thermally welded. In this case, the adhesive film 61 is inserted between the package member 60 and each of the cathode lead 51 and the anode lead 52. In this manner, the desired non-aqueous electrolyte battery can be obtained.

[Modification Example 1-2]

While the configuration using gel-like electrolytes has been exemplified in the first embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 1-2]

(Preparation of a Cathode, an Anode, and a Non-aqueous electrolyte solution)

In the same manner as in the method of manufacturing an exemplary non-aqueous electrolyte battery, the cathode 53 and the anode 54 are fabricated and the non-aqueous electrolyte solution is prepared.

(Coating and Formation of a Solid Particle Layer)

Next, paint is applied to at least one principal surface of both principal surfaces of the anode 54 by a coating method, the solvent is then removed by drying and a solid particle layer is formed. As the paint, for example, a mixture of solid particles, a binder polymer compound and a solvent can be used. On the outermost surface of the anode active material layer 54B on which the solid particle layer is applied and formed, solid particles are filtered in the recess between adjacent anode active material particles positioned on the outermost surface of the anode active material layer 54B, and a concentration of particles of the recess impregnation region A of the anode side increases. Similarly, the same paint as described above is applied to both principal surfaces of the cathode 53 by a coating method, the solvent is then removed by drying, and a solid particle layer is formed. On the outermost surface of the cathode active material layer 53B on which the solid particle layer is applied and formed, solid particles are filtered in the recess between adjacent cathode active material particles positioned on the outermost surface of the cathode active material layer 53B, and a concentration of particles of the recess impregnation region A of the cathode side increases. Solid particles having a particle size D95 that is adjusted to be, for example, a predetermined times a particle size D50 or more, are preferably used. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval between particles at a bottom of the recess filled with particles having a large particle size, and solid particles can be easily filtered.

Note that, when the solid particle layer is applied and formed, if extra paint is scraped off, it is possible to prevent a distance between electrodes from extending unintentionally. In addition, by scraping a surface of the paint, it is possible to dispose more particles in the recess between adjacent active material particles, and a ratio of the particles of the top coat region B decreases. Accordingly, most of the solid particles are intensively disposed in the recess impregnation region, and therefore it is possible to obtain a more excellent effect.

(Assembly of the Non-aqueousnon-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54 are laminated through the separator 55 and wound, the protection tape 57 is adhered to the outermost peripheral portion, and a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the non-aqueousnon-aqueous electrolyte solution is injected into the package member 60, and the wound body is impregnated with the non-aqueous electrolyte solution. Then, an opening of the package member 60 is sealed by thermal fusion bonding under a vacuum atmosphere. In this manner, the desired non-electrolyte secondary battery can be obtained.

[Modification Example 1-3]

The non-aqueous electrolyte battery according to the first embodiment may be fabricated as follows.

[Method of Manufacturing a Non-aqueous Electrolyte Battery of Modification Example 1-3]

(Fabrication of a Cathode and an Anode)

In the same manner as in the method of manufacturing an exemplary non-aqueous electrolyte battery, the cathode 53 and the anode 54 are fabricated.

(Coating and Formation of a Solid Particle Layer)

Next, in the same manner as in Modification Example 1-2, a solid particle layer is formed on at least one principal surface of both principal surfaces of the anode. In the same manner, a solid particle layer is formed on at least one principal surface of both principal surfaces of the cathode.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Assembly of the Non-aqueous Electrolyte Battery)

Next, in the same manner as in Modification Example 1-2, a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 1-4]

The non-aqueous electrolyte battery according to the first embodiment may be fabricated as follows.

[Method of Manufacturing a Non-aqueous Electrolyte Battery of Modification Example 1-4]

(Fabrication of a Cathode and an Anode, and Preparation of a Non-aqueous electrolyte solution)

First, in the same manner as in the method of manufacturing an exemplary non-aqueous electrolyte battery, the cathode 53 and the anode 54 are fabricated and the non-aqueous electrolyte solution is prepared.

(Formation of a Solid Particle Layer)

Next, in the same manner as in Modification Example 1-2, a solid particle layer is formed on at least one principal surface of both principal surfaces of the anode 54. In the same manner, a solid particle layer is formed on at least one principal surface of both principal surfaces of the cathode 53.

(Coating and Formation of a Matrix Resin Layer)

Next, a coating solution comprising a non-aqueous electrolyte solution, a matrix polymer compound, and a dispersing solvent such as N-methyl-2-pyrrolidone is applied to at least one principal surface of both principal surfaces of the separator 55, and drying is then performed to form a matrix resin layer.

(Assembly of the Non-aqueous electrolyte battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 1-5]

While the configuration using gel-like electrolytes has been exemplified in the first embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous electrolyte battery of Modification Example 1-5]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated, and the non-aqueous electrolyte solution is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, the cathode 53 and the anode 54 are laminated and wound through the separator 55, the protection tape 57 is adhered to the outermost peripheral portion, and a wound body serving as a precursor of the wound electrode body 50 is formed.

(Heating and Pressing Process)

Next, before the electrolyte solution is injected into the package member 60, the wound body is put into a packaging material such as a latex tube and sealed, and subjected to warm pressing under hydrostatic pressure. Accordingly, solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape. Next, the non-aqueous electrolyte solution is prepared and injected into the package member 60. The wound body is impregnated with the non-aqueous electrolyte solution, and an opening of the package member 60 is then sealed by thermal fusion bonding under a vacuum atmosphere. In this manner, the desired non-aqueous electrolyte battery can be obtained.

[Modification Example 1-6]

The non-aqueous electrolyte battery according to the first embodiment may be fabricated as follows.

[Method of Manufacturing a Non-aqueous Electrolyte Battery of Modification Example 1-6]

(Fabrication of a Cathode and an Anode)

First, in the same manner as in the method of manufacturing an exemplary non-aqueous electrolyte battery, the cathode 53 and the anode 54 are fabricated.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, in the same manner as in Modification Example 1-2, a wound body serving as a precursor of the wound electrode body 50 is formed.

(Heating and Pressing Process)

Next, before the non-aqueous electrolyte solution is injected into the package member 60, the wound body is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 1-7]

The non-aqueous electrolyte battery according to the first embodiment may be fabricated as follows.

[Method of Manufacturing a Non-aqueous Electrolyte Battery of Modification Example 1-7]

(Fabrication of a Cathode and an Anode)

First, in the same manner as in the method of manufacturing an exemplary non-aqueous electrolyte battery, the cathode 53 and the anode 54 are fabricated. Next, solid particles and the matrix polymer compound are applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 1-8]

Figure 4:
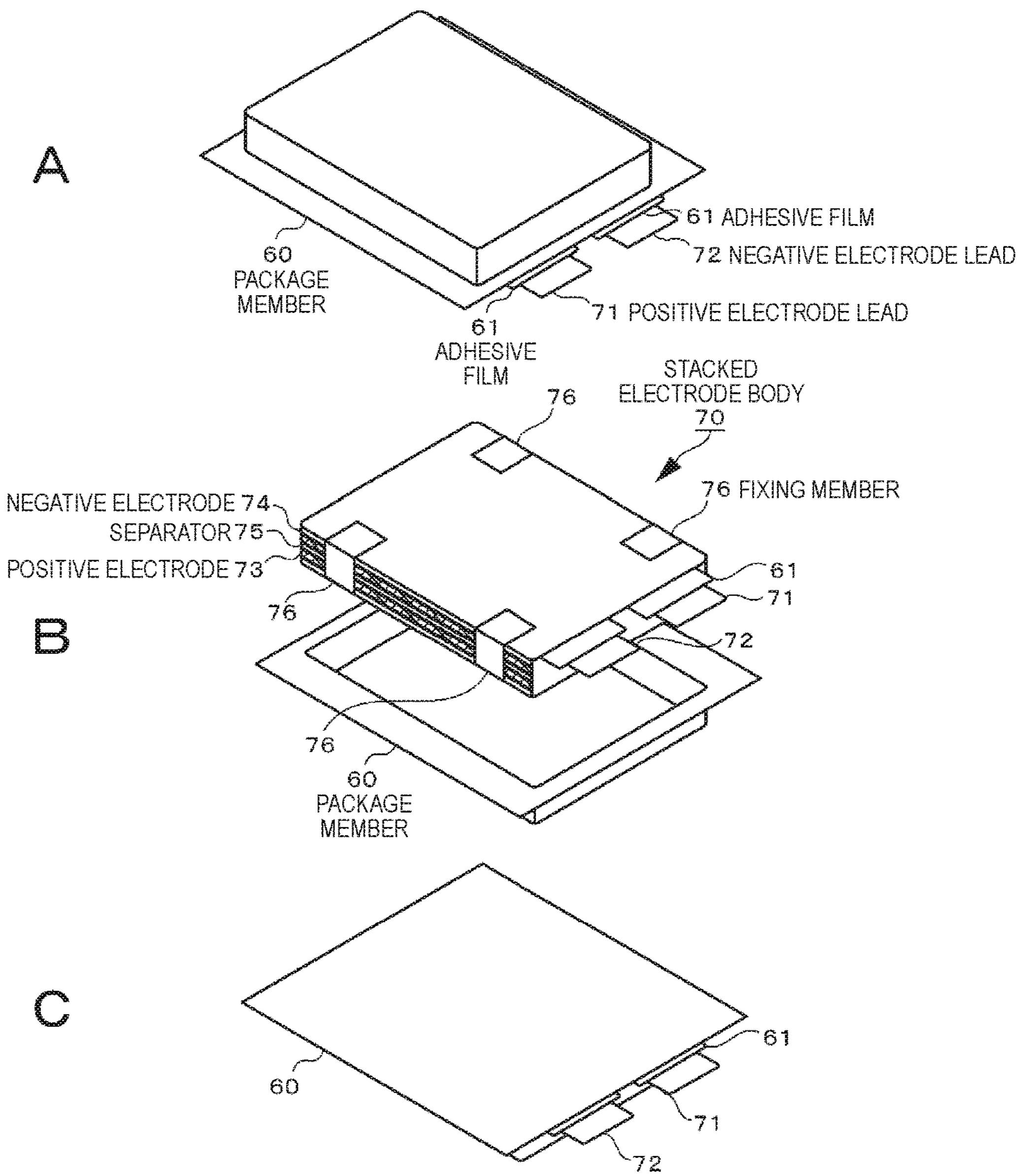
FIG. 4A to FIG. 4C are disassembled perspective views showing the configuration of a non-aqueous electrolyte battery of a laminated film type using a stacked electrode body.

In the example of the first embodiment and Modification Example 1-1 to Modification Example 1-7 described above, the non-aqueous electrolyte battery in which the wound electrode body 50 is packaged with the package member 60 has been described. However, as shown in FIGS. 4A to 4C, a stacked electrode body 70 may be used in place of the wound electrode body 50. FIG. 4A is an external view of the non-aqueous electrolyte battery in which the stacked electrode body 70 is housed. FIG. 4B is a dissembled perspective view showing a state in which the stacked electrode body 70 is housed in the package member 60. FIG. 4C is an external view showing an exterior of the non-aqueous electrolyte battery shown in FIG. 4A seen from a bottom side.

As the stacked electrode body 70, the stacked electrode body 70 in which a rectangular cathode 73 and a rectangular anode 74 are laminated through a rectangular separator 75, and fixed by a fixing member 76 is used. Although not shown, when the electrolyte layer is formed, the electrolyte layer is provided in contact with the cathode 73 and the anode 74. For example, the electrolyte layer (not shown) is provided between the cathode 73 and the separator 75, and between the anode 74 and the separator 75. The electrolyte layer is the same as the electrolyte layer 56 described above. A cathode lead 71 connected to the cathode 73 and an anode lead 72 connected to the anode 74 are led out from the stacked electrode body 70. The adhesive film 61 is provided between the package member 60 and each of the cathode lead 71 and the anode lead 72.

Note that a method of manufacturing a non-aqueous electrolyte battery is the same as the method of manufacturing a non-aqueous electrolyte battery in the example of the first embodiment and Modification Example 1-1 to Modification Example 1-7 described above except that a stacked electrode body is fabricated in place of the wound electrode body 70, and a laminated body (having a configuration in which the electrolyte layer is removed from the stacked electrode body 70) is fabricated in place of the wound body.

2. Second Embodiment

In the second embodiment of the present technology, a cylindrical non-aqueous electrolyte battery (a battery) will be described. The non-aqueous electrolyte battery is, for example, a non-aqueous electrolyte secondary battery in which charging and discharging are possible. Also, a lithium ion secondary battery is exemplified.

(2-1) Configuration of an Example of the Non-aqueous Electrolyte Battery

Figure 5:
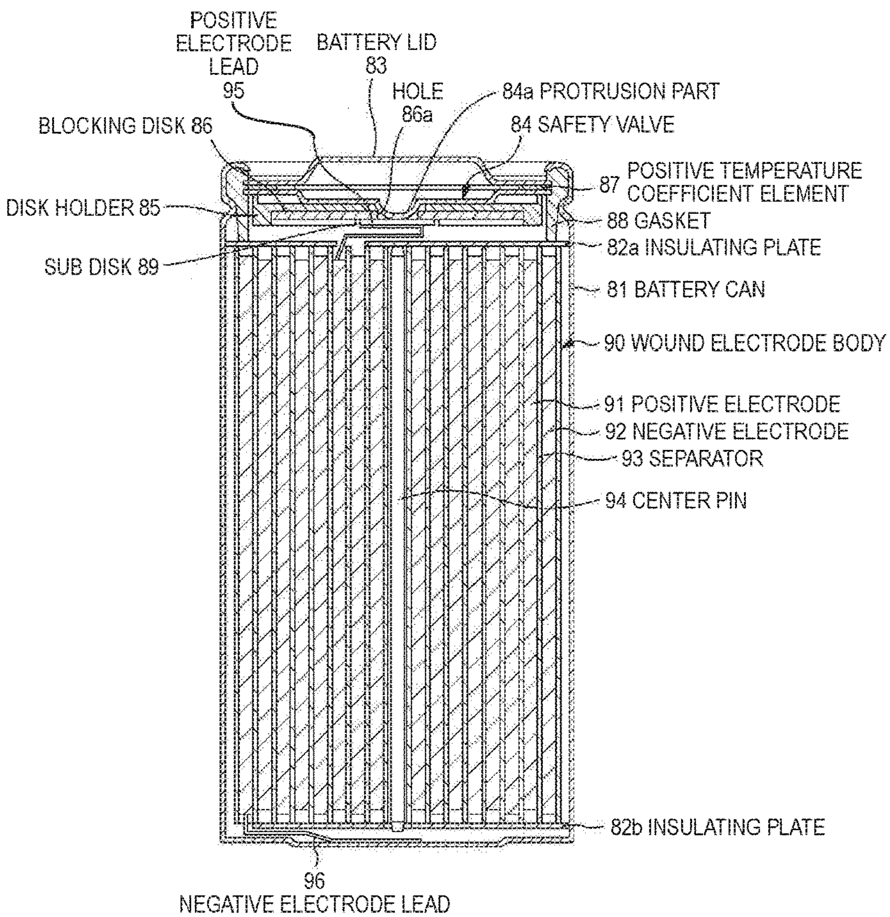
FIG. 5 is a cross-sectional view showing a configuration of a cylindrical non-aqueous electrolyte battery according to an embodiment of the present technology.

FIG. 5 is a cross-sectional view of an example of the non-aqueous electrolyte battery according to the second embodiment. The non-aqueous electrolyte battery is, for example, a non-aqueous electrolyte secondary battery in which charging and discharging are possible. The non-aqueous electrolyte battery, which is a so-called cylindrical type, includes non-aqueous liquid electrolytes, which are not shown, (hereinafter, appropriately referred to as the non-aqueous electrolyte solution) and a wound electrode body 90 in which a band-like cathode 91 and a band-like anode 92 are wound through a separator 93 inside a substantially hollow cylindrical battery can 81.

The battery can 81 is made of, for example, nickel-plated iron, and includes one end that is closed and the other end that is opened. A pair of insulating plates 82*a* and 82*b* perpendicular to a winding peripheral surface are disposed inside the battery can 81 so as to interpose the wound electrode body 90 therebetween.

Exemplary materials of the battery can 81 include iron (Fe), nickel (Ni), stainless steel (SUS), aluminum (Al), and titanium (Ti). In order to prevent electrochemical corrosion by the non-aqueous electrolyte solution according to charge and discharge of the non-aqueous electrolyte battery, the battery can 81 may be subjected to plating of, for example, nickel. At an open end of the battery can 81, a battery lid 83 serving as a cathode lead plate, a safety valve mechanism, and a positive temperature coefficient (PTC) element 87 provided inside the battery lid 83 are attached by being caulked through a gasket 88 for insulation sealing.

The battery lid 83 is made of, for example, the same material as that of the battery can 81, and an opening for discharging a gas generated inside the battery is provided. In the safety valve mechanism, a safety valve 84, a disk holder 85 and a blocking disk 86 are sequentially stacked. A protrusion part 84*a* of the safety valve 84 is connected to a cathode lead 95 that is led out from the wound electrode body 90 through a sub disk 89 disposed to cover a hole 86*a* provided at a center of the blocking disk 86. Since the safety valve 84 and the cathode lead 95 are connected through the sub disk 89, the cathode lead 95 is prevented from being drawn from the hole 86*a* when the safety valve 84 is reversed. In addition, the safety valve mechanism is electrically connected to the battery lid 83 through the positive temperature coefficient element 87.

When an internal pressure of the non-aqueous electrolyte battery becomes a predetermined level or more due to an internal short circuit of the battery or heat from the outside of the battery, the safety valve mechanism reverses the safety valve 84, and disconnects an electrical connection of the protrusion part 84*a*, the battery lid 83 and the wound electrode body 90. That is, when the safety valve 84 is reversed, the cathode lead 95 is pressed by the blocking disk 86, and a connection of the safety valve 84 and the cathode lead 95 is released. The disk holder 85 is made of an insulating material. When the safety valve 84 is reversed, the safety valve 84 and the blocking disk 86 are insulated.

In addition, when a gas is additionally generated inside the battery and an internal pressure of the battery further increases, a part of the safety valve 84 is broken and a gas can be discharged to the battery lid 83 side.

In addition, for example, a plurality of gas vent holes (not shown) are provided in the vicinity of the hole 86*a* of the blocking disk 86. When a gas is generated from the wound electrode body 90, the gas can be effectively discharged to the battery lid 83 side.

When a temperature increases, the positive temperature coefficient element 87 increases a resistance value, disconnects an electrical connection of the battery lid 83 and the wound electrode body 90 to block a current, and therefore prevents abnormal heat generation due to an excessive current. The gasket 88 is made of, for example, an insulating material, and has a surface to which asphalt is applied.

The wound electrode body 90 housed inside the non-aqueous electrolyte battery is wound around a center pin 94. In the wound electrode body 90, the cathode 91 and the anode 92 are sequentially laminated and wound through the separator 93 in a longitudinal direction. The cathode lead 95 is connected to the cathode 91. An anode lead 96 is connected to the anode 92. As described above, the cathode lead 95 is welded to the safety valve 84 and electrically connected to the battery lid 83, and the anode lead 96 is welded and electrically connected to the battery can 81.

Figure 6:
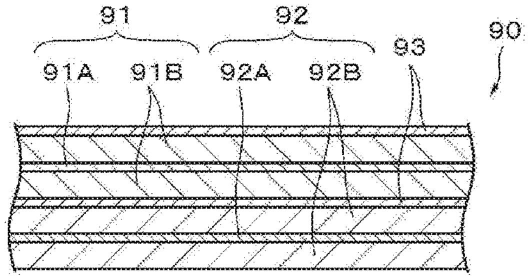
FIG. 6 is a cross-sectional view showing an enlarged part of a wound electrode body housed in a cylindrical non-aqueous electrolyte battery.

FIG. 6 shows an enlarged part of the wound electrode body 90 shown in FIG. 5.

Hereinafter, the cathode 91, the anode 92, and the separator 93 will be described in detail.

[Cathode]

In the cathode 91, a cathode active material layer 91B comprising a cathode active material is formed on both surfaces of a cathode current collector 91A. As the cathode current collector 91A, for example, a metal foil such as aluminum (Al) foil, nickel (Ni) foil or stainless steel (SUS) foil, can be used.

The cathode active material layer 91B is configured to comprise one, two or more kinds of cathode materials that can occlude and release lithium as cathode active materials, and may comprise another material such as a binder or a conductive agent as necessary. Note that the same cathode active material, conductive agent and binder used in the first embodiment can be used.

The cathode 91 includes the cathode lead 95 connected to one end portion of the cathode current collector 91A by spot welding or ultrasonic welding. The cathode lead 95 is preferably formed of net-like metal foil, but there is no problem when a non-metal material is used as long as an electrochemically and chemically stable material is used and an electric connection is obtained. Examples of materials of the cathode lead 95 include aluminum (Al) and nickel (Ni).

[Anode]

The anode 92 has, for example, a structure in which an anode active material layer 92B is provided on both surfaces of an anode current collector 92A having a pair of opposed surfaces. Although not shown, the anode active material layer 92B may be provided only on one surface of the anode current collector 92A. The anode current collector 92A is formed of, for example, a metal foil such as copper foil.

The anode active material layer 92B is configured to comprise one, two or more kinds of anode materials that can occlude and release lithium as anode active materials, and may be configured to comprise another material such as a binder or a conductive agent, which is the same as in the cathode active material layer 91B, as necessary. Note that the same anode active material, conductive agent and binder used in the first embodiment can be used.

[Separator]

The separator 93 is the same as the separator 55 of the first embodiment.

[Non-aqueous Electrolyte Solution]

The non-aqueous electrolyte solution is the same as in the first embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the first embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B of the anode side and the deep region C of the anode side, which are only on the anode side, may be formed or the recess impregnation region A of the cathode side, the top coat region B of the cathode side and the deep region C of the cathode side, which are only on the cathode side, may be formed.

(Formation of a Solid Particle Layer)

Next, paint is applied to at least one principal surface of both principal surfaces of the anode 92 by a coating method, the solvent is then removed by drying and a solid particle layer is formed. As the paint, for example, a mixture of solid particles, a binder polymer compound (a resin) and a solvent can be used. On the outermost surface of the anode active material layer 92B on which the solid particle layer is applied and formed, solid particles are filtered in the recess between adjacent anode active material particles positioned on the outermost surface of the anode active material layer 92B, and a concentration of particles of the recess impregnation region A of the anode side increases. Similarly, the solid particle layer is formed on both principal surfaces of the cathode 91 by a coating method. On the outermost surface of the cathode active material layer 91B on which the solid particle layer is applied and formed, solid particles are filtered in the recess between adjacent cathode active material particles positioned on the outermost surface of the cathode active material layer 91B, and a concentration of particles of the recess impregnation region A of the cathode side increases. Solid particles having a particle size D95 that is adjusted to be a predetermined times a particle size D50 or more are preferably used. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval at a bottom of the recess is filled with particles having a large particle size, and solid particles can be easily filtered.

Note that, when the solid particle layer is applied and formed, if extra paint is scraped off, it is possible to prevent a distance between electrodes from extending unintentionally. In addition, by scraping a surface of the paint, more particles are sent to the recess between adjacent active material particles, and a ratio of the top coat region B decreases. Accordingly, most of the solid particles are intensively disposed in the recess impregnation region A and a more excellent effect can be obtained.

(Method of Manufacturing a Separator)

Next, the separator 93 is prepared.

(Preparation of a Non-aqueous Electrolyte Solution)

An electrolyte salt is dissolved in a non-aqueous solvent to prepare the non-aqueous electrolyte solution.

(Assembly of the Non-aqueous Electrolyte Battery)

The cathode lead 95 is attached to the cathode current collector 91A by welding and the anode lead 96 is attached to the anode current collector 92A by welding. Then, the cathode 91 and the anode 92 are wound through the separator 93 to prepare the wound electrode body 90.

A distal end portion of the cathode lead 95 is welded to the safety valve mechanism and a distal end portion of the anode lead 96 is welded to the battery can 81. Then, a winding surface of the wound electrode body 90 is inserted between a pair of insulating plates 82*a* and 82*b* and accommodated inside the battery can 81. The wound electrode body 90 is accommodated inside the battery can 81, and the non-aqueous electrolyte solution is then injected into the battery can 81 and impregnated into the separator 93. Then, at the opened end of the battery can 81, the safety valve mechanism including the battery lid 83, the safety valve 84 and the like, and the positive temperature coefficient element 87 are caulked and fixed through the gasket 88. Accordingly, the non-aqueous electrolyte battery of the present technology shown in FIG. 5 is formed.

In the non-aqueous electrolyte battery, when charge is performed, for example, lithium ions are released from the cathode active material layer 91B, and occluded in the anode active material layer 92B through the non-aqueous electrolyte solution impregnated into the separator 93. In addition, when discharge is performed, for example, lithium ions are released from the anode active material layer 92B, and occluded in the cathode active material layer 91B through the non-aqueous electrolyte solution impregnated into the separator 93.

[Modification Example 2-1]

The non-aqueous electrolyte battery according to the second embodiment may be fabricated as follows.

(Fabrication of a Cathode and an Anode)

First, in the same manner as in the example of the non-aqueous electrolyte battery, the cathode 91 and the anode 92 are fabricated.

(Formation of a Solid Particle Layer)

Next, paint is applied to at least one principal surface of both principal surfaces of the separator 93 by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 90 is formed.

(Heating and Pressing Process)

Before the wound electrode body 90 is accommodated inside the battery can 81, the wound electrode body 90 is put into a packaging material such as a latex tube and sealed, and subjected to warm pressing under hydrostatic pressure. Accordingly, solid particles move to the recess between adjacent anode active material particles positioned on the outermost surface of the anode active material layer 92B, and the concentration of the solid particles of the recess impregnation region A of the anode side increases. The solid particles move to the recess between adjacent cathode active material particles positioned on the outermost surface of the cathode active material layer 91B and the concentration of the solid particles of the recess impregnation region A of the cathode side increases.

Processes thereafter are the same as those in the example described above, and the desired non-aqueous electrolyte battery can be obtained.

3. Third Embodiment

In the third embodiment, a rectangular non-aqueous electrolyte battery will be described.

(3-1) Configuration of an Example of the Non-aqueous Electrolyte Battery

Figure 7:
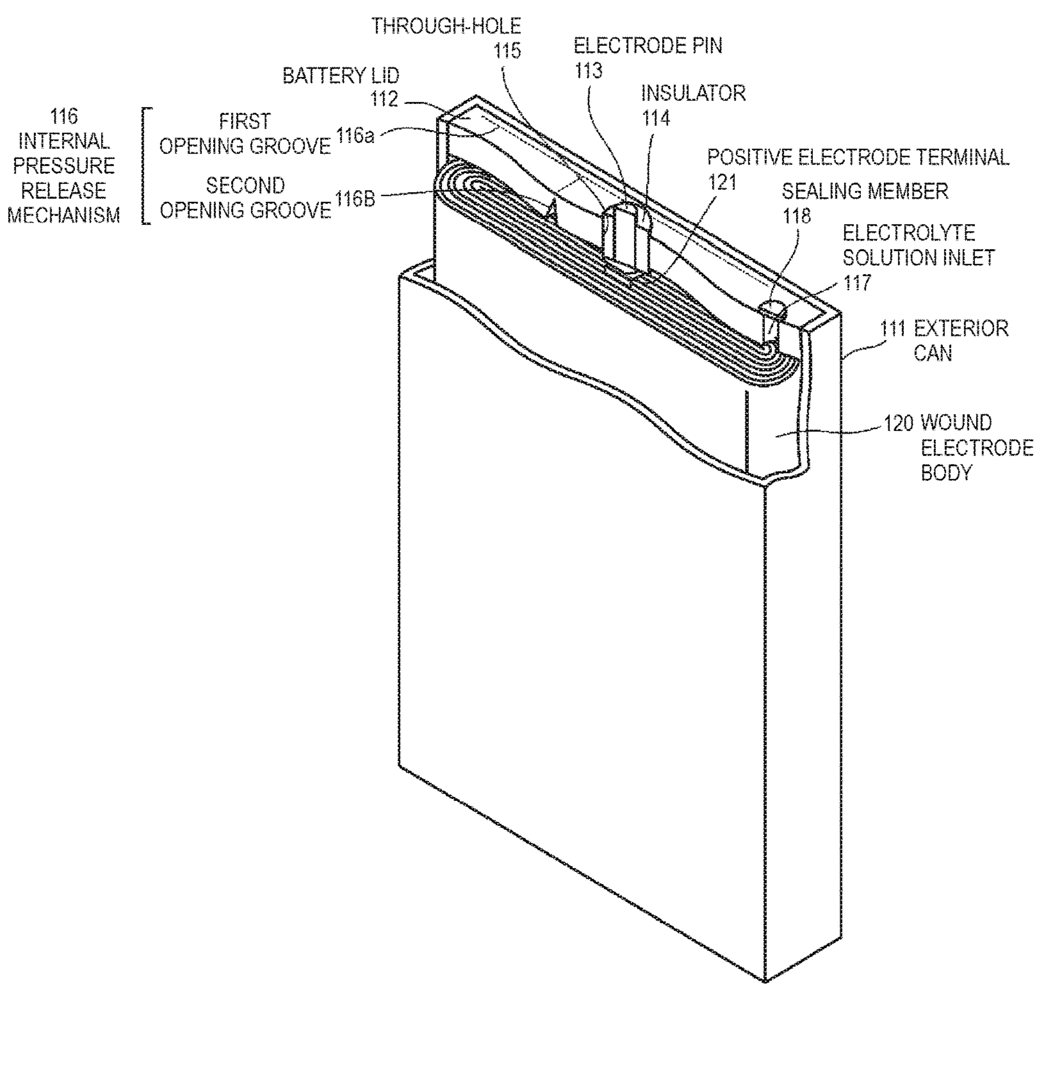
FIG. 7 is a perspective view showing a configuration of a rectangular non-aqueous electrolyte battery according to an embodiment of the present technology.

FIG. 7 shows a configuration of an example of the non-aqueous electrolyte battery according to the third embodiment. The non-aqueous electrolyte battery is a so-called rectangular battery, and a wound electrode body 120 is housed inside a rectangular exterior can 111.

The non-aqueous electrolyte battery includes the rectangular exterior can 111, the wound electrode body 120 serving as a power generation element accommodated inside the exterior can 111, a battery lid 112 configured to close an opening of the exterior can 111, an electrode pin 113 provided at substantially the center of the battery lid 112, and the like.

The exterior can 111 is formed as a hollow rectangular tubular body with a bottom using, for example, a metal having conductivity such as iron (Fe). The exterior can 111 preferably has a configuration in which, for example, nickel-plating is performed on or a conductive paint is applied to an inner surface so that conductivity of the exterior can 111 increases. In addition, an outer peripheral surface of the exterior can 111 is covered with an exterior label formed by, for example, a plastic sheet or paper, and an insulating paint may be applied thereto for protection. The battery lid 112 is made of, for example, a metal having conductivity such as iron (Fe), the same as in the exterior can 111.

The cathode and the anode are laminated and wound through the separator in an elongated oval shape, and therefore the wound electrode body 120 is obtained. Since the cathode, the anode, the separator and the non-aqueous electrolyte solution are the same as those in the first embodiment, detailed descriptions thereof will be omitted.

In the wound electrode body 120 having such a configuration, a plurality of cathode terminals 121 connected to the cathode current collector and a plurality of anode terminals connected to the anode current collector are provided. All of the cathode terminals 121 and the anode terminals are led out to one end of the wound electrode body 120 in an axial direction. Then, the cathode terminals 121 are connected to a lower end of the electrode pin 113 by a fixing method such as welding. In addition, the anode terminals are connected to an inner surface of the exterior can 111 by a fixing method such as welding.

The electrode pin 113 is made of a conductive shaft member, and is maintained by an insulator 114 while a head thereof protrudes from an upper end. The electrode pin 113 is fixed to substantially the center of the battery lid 112 through the insulator 114. The insulator 114 is formed of a high insulating material, and is engaged with a through-hole 115 provided at a surface side of the battery lid 112. In addition, the electrode pin 113 passes through the through-hole 115, and a distal end portion of the cathode terminal 121 is fixed to a lower end surface thereof.

The battery lid 112 to which the electrode pin 113 or the like is provided is engaged with the opening of the exterior can 111, and a contact surface of the exterior can 111 and the battery lid 112 are bonded by a fixing method such as welding. Accordingly, the opening of the exterior can 111 is sealed by the battery lid 112 and is in an air tight and liquid tight state. At the battery lid 112, an internal pressure release mechanism 116 configured to release (dissipate) an internal pressure to the outside by breaking a part of the battery lid 112 when a pressure inside the exterior can 111 increases to a predetermined value or more is provided.

The internal pressure release mechanism 116 includes two first opening grooves **116*a* (one of the first opening grooves 116*a* is not shown) that linearly extend in a longitudinal direction on an inner surface of the battery lid 112 and a second opening groove 116*b* that extends in a width direction perpendicular to a longitudinal direction on the same inner surface of the battery lid 112 and whose both ends communicate with the two first opening grooves 116*a*. The two first opening grooves 116*a* are provided in parallel to each other along a long side outer edge of the battery lid 112 in the vicinity of an inner side of two sides of a long side positioned to oppose the battery lid 112 in a width direction. In addition, the second opening groove 116*b* is provided to be positioned at substantially the center between one short side outer edge in one side in a longitudinal direction of the electrode pin 113 and the electrode pin 113**.

The first opening groove **116*a* and the second opening groove 116*b* have, for example, a V-shape whose lower surface side is opened in a cross sectional shape. Note that the shape of the first opening groove 116*a* and the second opening groove 116*b* is not limited to the V-shape shown in this embodiment. For example, the shape of the first opening groove 116*a* and the second opening groove 116*b*** may be a U-shape or a semicircular shape.

An electrolyte solution inlet 117 is provided to pass through the battery lid 112. After the battery lid 112 and the exterior can 111 are caulked, the electrolyte solution inlet 117 is used to inject the non-aqueous electrolyte solution, and is sealed by a sealing member 118 after the non-aqueous electrolyte solution is injected. For this reason, when gel electrolytes are formed between the separator and each of the cathode and the anode in advance to fabricate the wound electrode body, the electrolyte solution inlet 117 and the sealing member 118 may not be provided.

[Separator]

As the separator, the same separator as in the first embodiment is used.

[Non-aqueous Electrolyte Solution]

The non-aqueous electrolyte solution is the same as in the first embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the first embodiment That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B and the deep region C, which are only on the anode side, may be formed or the recess impregnation region A of the cathode side, the top coat region B of the cathode side and the deep region C of the cathode side, which are only on the cathode side, may be formed.

(3-2) Method of Manufacturing a Non-aqueous Electrolyte Battery

The non-aqueous electrolyte battery can be manufactured, for example, as follows.

[Method of Manufacturing a Cathode and an Anode]

The cathode and the anode can be fabricated by the same method as in the first embodiment.

(Formation of a Solid Particle Layer)

Next, paint is applied to at least one principal surface of both principal surfaces of the anode by a coating method, the solvent is then removed by drying and a solid particle layer is formed. As the paint, for example, a mixture of solid particles, a binder polymer compound and a solvent can be used. On the outermost surface of the anode active material layer on which the solid particle layer is applied and formed, solid particles are filtered in the recess between adjacent anode active material particles positioned on the outermost surface of the anode active material layer, and a concentration of particles of the recess impregnation region A of the anode side increases. Similarly, a solid particle layer is formed on both principal surfaces of the cathode by a coating method. On the outermost surface of the cathode active material layer on which the solid particle layer is applied and formed, solid particles are filtered in the recess between adjacent cathode active material particles positioned on the outermost surface of the cathode active material layer, and a concentration of particles of the recess impregnation region A of the cathode side increases. Solid particles having a particle size D95 that is adjusted to be a predetermined times a particle size D50 or more are preferably used as the solid particles. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of the top coat region B decreases. Accordingly, most of the solid particles are intensively disposed in the recess impregnation region and it is possible to obtain a more excellent effect.

(Assembly of the Non-aqueous Electrolyte Battery)

The cathode, the anode, and the separator (in which a particle-comprising resin layer is formed on at least one surface of a base material) are sequentially laminated and wound to fabricate the wound electrode body 120 that is wound in an elongated oval shape. Next, the wound electrode body 120 is housed in the exterior can 111.

Then, the electrode pin 113 provided in the battery lid 112 and the cathode terminal 121 led out from the wound electrode body 120 are connected. Also, although not shown, the anode terminal led out from the wound electrode body 120 and the battery can are connected. Then, the exterior can 111 and the battery lid 112 are engaged, the non-aqueous electrolyte solution is injected though the electrolyte solution inlet 117, for example, under reduced pressure and sealing is performed by the sealing member 118. In this manner, the non-aqueous electrolyte battery can be obtained.

[Modification Example 3-1]

The non-aqueous electrolyte battery according to the third embodiment may be fabricated as follows.

(Fabrication of a Cathode and an Anode)

First, in the same manner as in the example of the non-aqueous electrolyte battery, the cathode and the anode are fabricated.

(Formation of a Solid Particle Layer)

Next, paint is applied to at least one principal surface of both principal surfaces of the separator by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 120 is formed. Next, before the wound electrode body 120 is housed inside the exterior can 111, the wound electrode body 120 is put into a packaging material such as a latex tube and sealed, and subjected to warm pressing under hydrostatic pressure. Accordingly, solid particles move (are pushed) to the recess between adjacent anode active material particles positioned on the outermost surface of the anode active material layer, and the concentration of the solid particles of the recess impregnation region A of the anode side increases. The solid particles move to the recess between adjacent cathode active material particles positioned on the outermost surface of the cathode active material layer, and the concentration of the solid particles of the recess impregnation region A of the cathode side increases.

Then, similarly to the example described above, the desired non-aqueous electrolyte battery can be obtained.

<Fourth Embodiment to Sixth Embodiment>

(Overview of the Present Technology)

First, in order to facilitate understanding of the present technology, an overview of the present technology will be described. As described above, in the secondary battery, an additive is put into the electrolyte solution to improve battery performance.

However, as will be described below, a cycle characteristic, an output characteristic and a capacity have a trade-off relation. When performance of one improves, performance of the others decreases. For this reason, when the additive is used to improve battery performance, it is difficult to obtain a battery having excellent cycle characteristic, output characteristic and capacity performance.

For example, the additive is put into the electrolyte solution, an additive-derived coating film is formed on a surface of the electrode active material, decomposition of the electrolyte solution due to a side reaction is suppressed, and capacity deterioration according to a charge and discharge cycle can be suppressed. On the other hand, the coating film serves as a resistance and becomes a factor that reduces an output characteristic. The reduced output characteristic can be compensated for by reducing a resistance with a thinner electrode mixture layer. On the other hand, in this case, since a ratio of the foil (the current collector) or the separator that does not contribute to the capacity becomes higher, it serves as a factor that reduces the capacity.

The additive-derived coating film suppresses a side reaction caused by a crack that mainly occurs in active material particles when the electrode is pressed. For this reason, the additive-derived coating film may be formed on a crack surface. Since the additive-derived coating film in a part other than the crack surface serves as a factor that increases a resistance when Li ions are inserted and detached, the addition of an excessive amount of the additive is avoided. In addition, depending on a kind of the additive, a thick coating film may be effectively formed. However, since the coating film serves as a resistor in a part other than the crack of the active material, there are many materials that are not easily actually used. In addition, when an amount of the additive added decreases, the resistance decreases, but an effect on the crack part is insufficient.

The inventors have conducted extensive studies and found that, as an additive that is used to effectively form a coating film on the crack, but serves as a factor that deteriorates a high output characteristic in a part other than the crack, at least one kind of the unsaturated cyclic carbonate ester represented by Formula (1), and the halogenated carbonate esters represented by Formula (2) and Formula (3), which will be described below, are used.

When the additive is intensively provided to the crack part only at a necessary amount, since a small amount is added, an extra thick coating film can be avoided. Therefore, it is possible to provide a high capacity and high output battery having capacity deterioration according to a cycle that is low.

In order to obtain such action effects, the inventors have further conducted extensive studies and found the followings as a result. That is, the crack mainly occurs in active material particles positioned on the outermost surface of the electrode by a pressing process when the electrode is formed. In particular, many cracks occur in the vicinity of surfaces of particles that form the recess between adjacent active material particles positioned on the outermost surface of the electrode. When specific solid particles are disposed in the recess, an effect in which at least one kind of the unsaturated cyclic carbonate ester represented by Formula (1) and the halogenated carbonate esters represented by Formula (2) and Formula (3), which will be described below, can selectively accumulate at the crack part can be obtained.

In the battery of the present technology obtained based on the result of the above extensive studies, by disposing specific solid particles in the recess between adjacent active material particles inside the battery, a film forming agent is intensively disposed at a necessary minimum amount in a necessary part inside the battery. Accordingly, in the present technology, it is possible to provide a high capacity and suppress capacity deterioration when charging and discharging are repeated at a high output discharge.

Hereinbelow, embodiments of the present technology are described with reference to the drawings. The description is given in the following order.

4. Fourth embodiment (example of a laminated film-type battery)
5. Fifth embodiment (example of a cylindrical battery)
6. Sixth embodiment (example of a rectangular battery)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

4. Fourth Embodiment

In a fourth embodiment of the present technology, an example of a laminated film-type battery is described. The battery is, for example, a non-aqueous electrolyte battery, a secondary battery in which charging and discharging are possible, or a lithium-ion secondary battery.

(4-1) Configuration Example of the Non-aqueous Electrolyte Battery

FIG. 1 shows the configuration of a non-aqueous electrolyte battery according to the fourth embodiment. The non-aqueous electrolyte battery is of what is called a laminated film type; and in the battery, a wound electrode body 50 equipped with a cathode lead 51 and an anode lead 52 is housed in a film-shaped package member 60.

Each of the cathode lead 51 and the anode lead 52 is led out from the inside of the package member 60 toward the outside in the same direction, for example. The cathode lead 51 and the anode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the cathode lead 51 and the anode lead 52 for the purpose of increasing the adhesion between the inner resin layer of the package member 60 and each of the cathode lead 51 and the anode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

FIG. 2 shows a cross-sectional structure along line I-I of the wound electrode body 50 shown in FIG. 1. As shown in FIG. 1, the wound electrode body 50 is a body in which a band-like cathode 53 and a band-like anode 54 are stacked and wound via a band-like separator 55 and an electrolyte layer 56, and the outermost peripheral portion is protected by a protection tape 57 as necessary.

(Cathode)

The cathode 53 has a structure in which a cathode active material layer 53B is provided on one surface or both surfaces of a cathode current collector 53A.

In the cathode 53, the cathode active material layer 53B comprising a cathode active material is formed on both surfaces of the cathode current collector 53A. Also, although not shown, the cathode active material layer 53B may be provided only on one surface of the cathode current collector 53A. As the cathode current collector 53A, for example, a metal foil such as aluminum (Al) foil, nickel (Ni) foil or stainless steel (SUS) foil can be used.

The cathode active material layer 53B is configured to comprise, for example, a cathode active material, an electrically conductive agent, and a binder. As the cathode active material, one or more cathode materials that can occlude and release lithium may be used, and another material such as a binder or an electrically conductive agent may be comprised as necessary.

As the cathode material that can occlude and release lithium, for example, a lithium-comprising compound is preferable. This is because a high energy density is obtained. As the lithium-comprising compound, for example, a composite oxide comprising lithium and a transition metal element, a phosphate compound comprising lithium and a transition metal element, or the like is given. Of them, a material comprising at least one of the group consisting of cobalt (Co), nickel (Ni), manganese (Mn), and iron (Fe) as a transition metal element is preferable. This is because a higher voltage is obtained.

As the cathode material, for example, a lithium-comprising compound expressed by $Li_xM1O_2$ or $Li_yM2PO_4$ may be used. In the formula, M1 and M2 represent one or more transition metal elements. The values of x and y vary with the charging and discharging state of the battery, and are usually $0.05 \le x \le 1.10$ and $0.05 \le y \le 1.10$. As the composite oxide comprising lithium and a transition metal element, for example, a lithium cobalt composite oxide ($Li_xCoO_2$), a lithium nickel composite oxide ($Li_1NiO_2$), a lithium nickel cobalt composite oxide ($Li_xNi_{1-z}Co_zO_2$ ($0<z<1$)), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}Ni_tO_4$ ($0<t<2$)) having the spinel structure, or the like is given. Of them, a composite oxide comprising cobalt is preferable. This is because a high capacity is obtained and also excellent cycle characteristics are obtained. As the phosphate compound comprising lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-comprising compounds mentioned above is coated with minute particles made of another of the lithium-comprising compounds may be used.

Other than these, as the cathode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not comprising lithium such as niobium diselenide ($NbSe_2$) (in particular, a layered compound or a spinel-type compound), and a lithium-comprising compound comprising lithium, and also an electrically conductive polymer such as sulfur, polyaniline, polythiophene, polyacetylene, or polypyrrole are given. The cathode material that can occlude and release lithium may be a material other than the above as a matter of course. The cathode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The cathode 53 includes a cathode lead 51 connected to an end portion of the cathode current collector 53A by spot welding or ultrasonic welding. The cathode lead 51 is preferably formed of net-like metal foil, but there is no problem when a non-metal material is used as long as an electrochemically and chemically stable material is used and an electric connection is obtained. Examples of materials of the cathode lead 51 include aluminum (Al), nickel (Ni), and the like.

(Anode)

The anode 54 has a structure in which an anode active material layer 54B is provided on one of or both surfaces of an anode current collector 54A, and is disposed such that the anode active material layer 54B is opposed to the cathode active material layer 53B.

Although not shown, the anode active material layer 54B may be provided only on one surface of the anode current collector 54A. The anode current collector 54A is formed of, for example, a metal foil such as copper foil.

The anode active material layer 54B is configured to comprise, as the anode active material, one or more anode materials that can occlude and release lithium, and may be configured to comprise another material such as a binder or an electrically conductive agent similar to that of the cathode active material layer 53B, as necessary.

In the non-aqueous electrolyte battery, the electrochemical equivalent of the anode material that can occlude and release lithium is set larger than the electrochemical equivalent of the cathode 53, and theoretically lithium metal is prevented from being precipitated on the anode 54 in the course of charging.

In the non-aqueous electrolyte battery, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the anode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the cathode active material is the same; and thus the amounts of the cathode active material and the anode active material are adjusted accordingly. Thereby, a high energy density is obtained.

As the anode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another anode material that can occlude and release lithium and can be increased in capacity, a material that can occlude and release lithium and comprises at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The anode material may be a simple substance, an alloy, or a compound of a metal element or a semi-metal element, or may be a material that includes a phase of one or more of them at least partly. Note that in the present technology, the alloy includes a material formed with two or more kinds of metal elements and a material comprising one or more kinds of metal elements and one or more kinds of semi-metal elements. Further, the alloy may comprise a non-metal element. Examples of its texture include a solid solution, a eutectic (eutectic mixture), an intermetallic compound, and one in which two or more kinds thereof coexist.

Examples of the metal element or semi-metal element comprised in this anode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the anode material, it is preferable to use a material comprising, as a constituent element, a metal element or a semi-metal element of 4B group in the short periodical table. It is more preferable to use a material comprising at least one of silicon (Si) and tin (Sn) as a constituent element. It is even more preferable to use a material comprising at least silicon. This is because silicon (Si) and tin (Sn) each have a high capability of occluding and releasing lithium, so that a high energy density can be obtained. Examples of the anode material comprising at least one of silicon and tin include a simple substance, an alloy, or a compound of silicon, a simple substance, an alloy, or a compound of tin, and a material comprising, at least partly, a phase of one or more kinds thereof.

Examples of the alloy of silicon include alloys comprising, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys comprising, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds comprising oxygen (O) or carbon (C), which may comprise any of the above-described second constituent elements in addition to tin (Sn) or silicon (Si).

Among them, as the anode material, an SnCoC-comprising material is preferable which comprises cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-comprising material may also comprise another constituent element as necessary. For example, it is preferable to comprise, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be comprised. This is because the capacity characteristics or cycling characteristics can be further increased.

Note that the SnCoC-comprising material has a phase comprising tin (Sn), cobalt (Co), and carbon (C), and this phase preferably has a low crystalline structure or an amorphous structure. Further, in the SnCoC-comprising material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-comprising material appears in a region lower than 284.5 eV, at least a part of carbon comprised in the SnCoC-comprising material is bound to a metal element or a semi-metal element, which is another constituent element In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-comprising material, the peak of the surface contamination carbon and the peak of the carbon in the SnCoC-comprising material are separated from each other by means of analysis using, for example, a commercially available software program. In the analysis of the waveform, the position of a main peak existing on the lowest binding energy side is used as an energy reference (284.8 eV).

As the anode material that can occlude and release lithium, for example, also a metal oxide, a polymer compound, or other materials that can occlude and release lithium are given. As the metal oxide, for example, a lithium titanium oxide comprising titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

(Separator)

The separator 55 is a porous membrane formed of an insulating membrane that has a large ion permeability and a prescribed mechanical strength. A non-aqueous electrolyte solution is retained in the pores of the separator 55.

The separator 55 is a porous membrane made of, for example, a resin. The porous membrane made of the resin is a membrane obtained by stretching a material such as a resin to be thinner and has a porous structure. For example, the porous membrane made of a resin is obtained when a material such as a resin is formed by a stretching and perforating method, a phase separation method, or the like. For example, in a stretching and opening method, first, a melt polymer is extruded from a T-die or a circular die and additionally subjected to heat treatment, and a crystal structure having high regularity is formed. Then, stretching is performed at low temperatures, and further high temperature stretching is performed. A crystal interface is detached to create an interval part between lamellas, and a porous structure is formed. In the phase separation method, a homogeneous solution prepared by mixing a polymer and a solvent at high temperature is used to form a film by a T-die method, an inflation method or the like, the solvent is then extracted by another volatile solvent, and therefore the porous membrane made of a resin can be obtained. Note that a method of preparing the porous membrane made of a resin is not limited to such methods, and methods proposed in the related art can be widely used. As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material comprising a porous membrane made of a polyolefin resin has good separability between the cathode 53 and the anode 54, and can further reduce the possibility of an internal short circuit.

The separator 55 may be a nonwoven fabric. The nonwoven fabric is a structure made by bonding or entangling or bonding and entangling fibers using a mechanical method, a chemical method and a solvent, or in a combination thereof, without weaving or knitting fibers. Most substances that can be processed into fibers can be used as a source material of the nonwoven fabric. By adjusting a shape such as a length and a thickness, the fiber can have a function according to an object and an application. A method of manufacturing the nonwoven fabric typically includes two processes, a process in which a laminate layer of fibers, which is a so-called fleece, is formed, and a bonding process in which fibers of the fleece are bonded. In each of the processes, various manufacturing methods are used and selected according to a source material, an object, and an application of the nonwoven fabric. For example, in the process in which the fleece is formed, a dry method, a wet method, a spun bond method, a melt blow method, and the like can be used. In the bonding process in which fibers of the fleece are bonded, a thermal bond method, a chemical bond method, a needle punching method, a spunlace method (a hydroentanglement method), a stitch bond method, and a steam jet method can be used.

As the nonwoven fabric, for example, a polyethylene terephthalate permeable membrane (a polyethylene terephthalate nonwoven fabric) using a polyethylene terephthalate (PET) fiber is used. Note that the permeable membrane refers to a membrane having permeability. Additionally, nonwoven fabrics using an aramid fiber, a glass fiber, a cellulose fiber, a polyolefin fiber, or a nylon fiber may be exemplified. The nonwoven fabric may be a fabric using two or more kinds of fibers.

Any thickness can be set as the thickness of the separator 55 to the extent that it is not less than the thickness that can maintain necessary strength. The separator 55 is preferably set to such a thickness that the separator 55 provides insulation between the cathode 53 and the anode 54 to prevent a short circuit or the like, has ion permeability for producing a battery reaction through the separator 55 appropriately, and can make the volumetric efficiency of the active material layer that contributes to the battery reaction in the battery as high as possible. Specifically, the thickness of the separator 55 is preferably, for example, 4 μm or more and 20 μm or less.

(Electrolyte Layer)

The electrolyte layer 56 includes a matrix polymer compound, a non-aqueous electrolyte solution and solid particles. The electrolyte layer 56 is a layer in which the non-aqueous electrolyte solution is retained by, for example, the matrix polymer compound, and is, for example, a layer formed of so-called gel-like electrolytes. Note that the solid particles may be comprised inside the anode active material layer 54B and/or inside a cathode active material layer 53B. In addition, while details will be described in the following modification examples, a non-aqueous electrolyte solution, which comprises liquid electrolytes, may be used in place of the electrolyte layer 56. In this case, the non-aqueous electrolyte battery includes a wound body having a configuration in which the electrolyte layer 56 is removed from the wound electrode body 50 in place of the wound electrode body 50. The wound body is impregnated with the non-aqueous electrolyte solution, which comprises liquid electrolytes filled in the package member 60.

(Matrix Polymer Compound)

A resin having the property of compatibility with the solvent, or the like may be used as the matrix polymer compound (resin) that retains the electrolyte solution. As such a matrix polymer compound, a fluorine-comprising resin such as polyvinylidene difluoride or polytetrafluoroethylene, a fluorine-comprising rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C. or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

(Non-aqueous Electrolyte Solution)

The non-aqueous electrolyte solution comprises an electrolyte salt, a non-aqueous solvent in which the electrolyte salt is dissolved, and an additive.

(Electrolyte Salt)

The electrolyte salt comprises, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

(Non-aqueous Solvent)

As the non-aqueous solvent, for example, a lactone-based solvent such as γ-butyrolactone, γ-valerolactone, δ-valerolactone or ε-caprolactone, a carbonate ester-based solvent such as ethylene carbonate, propylene carbonate, butylene carbonate, vinylene carbonate, dimethyl carbonate, ethyl methyl carbonate or diethyl carbonate, an ether-based solvent such as 1,2-dimethoxyethane, 1-ethoxy-2-methoxy ethane, 1,2-diethoxyethane, tetrahydrofuran or 2-methyltetrahydrofuran, a nitrile-based solvent such as acetonitrile, a sulfolane-based solvent, a phosphoric acids solvent, a phosphate ester solvent, or a non-aqueous solvent such as a pyrrolidone may be used. As the solvent, any one kind may be used alone or a mixture of two or more kinds may be used.

(Additive)

The non-aqueous electrolyte solution includes the unsaturated cyclic carbonate ester represented by the following Formula (1). The unsaturated cyclic carbonate ester is a cyclic carbonate ester having one, two or more carbon-carbon double bonds (>C═C<).

[Chem. 5]

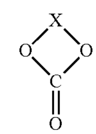

(1)

(in Formula (1), X represents any one divalent group selected from the group consisting of —C(═R1)-C(═R2)-, —C(═R1)-C(═R2)-C(═R3)-, —C(═R1)-C(R4)(R5)-, —C(═R1)-C(R4)(R5)-C(R6)(R7)-, —C(R4)(R5)-C(═R1)-C(R6)(R7)-, —C(═R1)-C(═R2)-C(R4)(R5)-, —C(═R1)-C(R4)(R5)-C(═R2)-, —C(═R1)-O—C(R4)(R5)-, —C(═R1)-O—C(═R2)-, —C(═R1)-C(═R8)-, and —C(═R1)-C(═R2)-C(═R8)-. R1, R2 and R3 each independently represent a divalent hydrocarbon group having one carbon atom or a divalent halogenated hydrocarbon group having one carbon atom. R4, R5, R6 and R7 each independently represent a monovalent hydrogen group (—H), a monovalent hydrocarbon group having 1 to 8 carbon atoms, a monovalent halogenated hydrocarbon group having 1 to 8 carbon atoms or a monovalent oxygen-comprising hydrocarbon group having 1 to 6 carbon atoms. R8 represents an alkylene group having 2 to 5 carbon atoms or a halogenated alkylene group having 2 to 5 carbon atoms.)

The unsaturated cyclic carbonate ester has a structure of —C═R1, R2, R3 or R8, and therefore is easily attracted to solid particles. In addition, since the monovalent group, —R4, R5, R6 or R7, is a group including a predetermined number of carbon atoms, a hydrogen group, or a group including a halogen, it is more effective.

The term "hydrocarbon group" generally refers to a group including carbon and hydrogen, and may be a straight type or a branched type having one, two or more side chains. The monovalent hydrocarbon group is, for example, an alkyl group having 1 to 8 carbon atoms, an alkenyl group having 2 to 8 carbon atoms, an alkynyl group having 2 to 8 carbon atoms, an aryl group having 6 to 8 carbon atoms, or a cycloalkyl group having 3 to 8 carbon atoms. The divalent hydrocarbon group having one carbon atom is, for example, a methylene group (═$CH_2$). The alkylene group having 2 to 5 carbon atoms is, for example, an ethylene group (—$CH_2$═$CH_2$), and n-propylene group (—$CH_2CH_2CH_2$—).

More specifically, the alkyl group is, for example, a methyl group (—$CH_3$), an ethyl group (—$C_2H_5$) or a propyl group (—$C_3H_7$). The alkenyl group is, for example, a vinyl group (—CH═$CH_2$) or an allyl group (—$CH_2$—CH═$CH_2$). The alkynyl group is, for example, an ethynyl group (—C≡CH). The aryl group is, for example, a phenyl group or a benzyl group. The cycloalkyl group is, for example, a cyclopropyl group, a cyclobutyl group, a cyclopentyl group, a cyclohexyl group, a cycloheptyl group or a cyclooctyl group.

The term "oxygen-comprising hydrocarbon group" refers to a group including oxygen in addition to carbon and hydrogen. The monovalent oxygen-comprising hydrocarbon group is, for example, an alkoxy group having 1 to 12 carbon atoms. This is because the above-described advantage can be obtained while ensuring the solubility and compatibility of the unsaturated cyclic carbonate ester. More specifically, the alkoxy group is, for example, a methoxy group (—$OCH_3$) or an ethoxy group (—$OC_2H_5$).

The term "monovalent halogenated hydrocarbon group" refers to a group in which at least some hydrogen groups (—H) of the above monovalent hydrocarbon group are substituted with a halogen group (halogenated), and a kind of the halogen group is the same as described above. Similarly, the term "monovalent halogenated oxygen-comprising hydrocarbon group" refers to a group in which at least some hydrogen groups of the above monovalent oxygen-comprising hydrocarbon group are substituted with a halogen group, and a kind of the halogen group is the same as described above. The term "divalent halogenated hydrocarbon group having one carbon atom" refers to a halogenated methylene group (═CH(X') or ═CX,' where X' refers to a halogen group).

More specifically, a group in which an alkyl group is halogenated is, for example, a trifluoromethyl group (—$CF_3$) or a pentafluoroethyl group (—$C_2F_5$). In addition, the monovalent halogenated oxygen-comprising hydrocarbon group refers to, for example, a group in which at least some hydrogen groups of the above alkoxy group are substituted with a halogen group. More specifically, a group in which an alkoxy group is halogenated is, for example, a trifluoromethoxy group (—$OCF_3$) or a pentafluoroethoxy group (—$OC_2F_5$).

Specific examples of the unsaturated cyclic carbonate ester represented by Formula (1) are represented by the following Formula (1-1) to Formula (1-56). The unsaturated cyclic carbonate ester also includes a geometric isomer. However, the specific examples of the unsaturated cyclic carbonate ester are not limited to the following listed examples.

[Chem. 6]

(1-1)

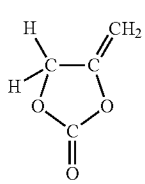

-continued (1-2)

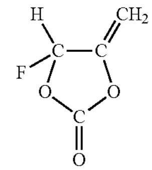

(1-3)

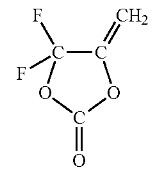

(1-4)

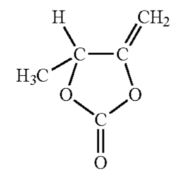

(1-5)

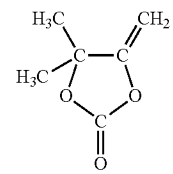

(1-6)

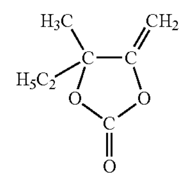

(1-7)

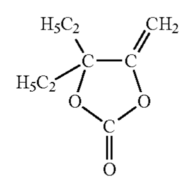

(1-8)

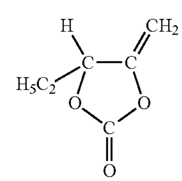

(1-9)

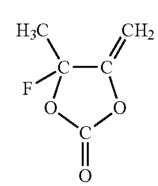

(1-10)

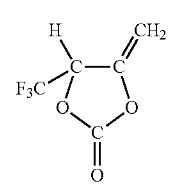

(1-11)
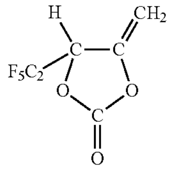
(1-12)
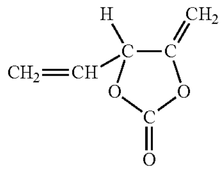
(1-13)
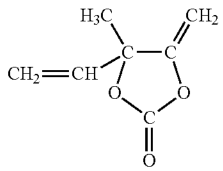
(1-14)
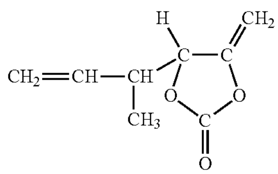
(1-15)
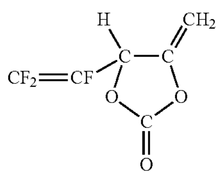
(1-16)
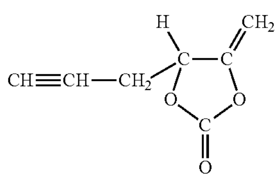
(1-17)
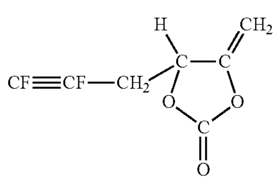
(1-18)
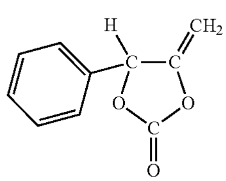
(1-19)
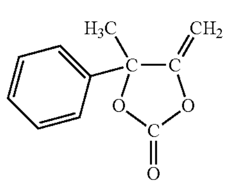
(1-20)
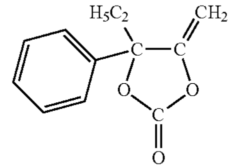
(1-21)
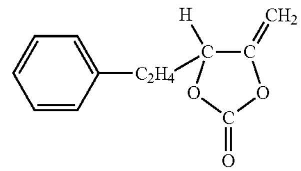
(1-22)
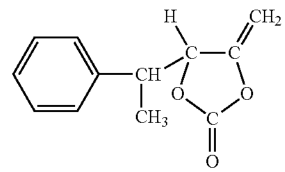
(1-23)
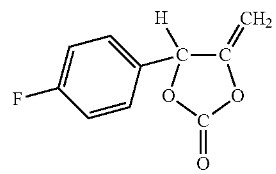
(1-24)
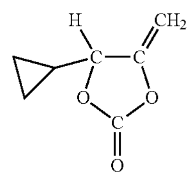
(1-25)
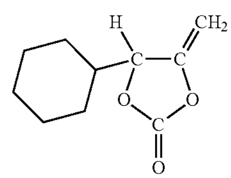
(1-26)
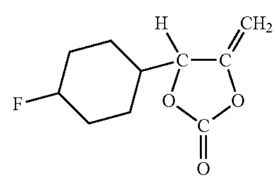
(1-27)
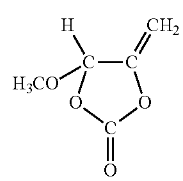
(1-28)
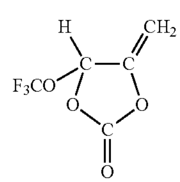

-continued
(1-29)
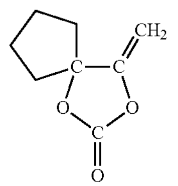
(1-30)
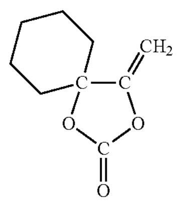
(1-31)
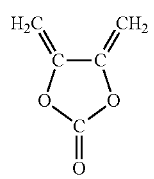
(1-32)
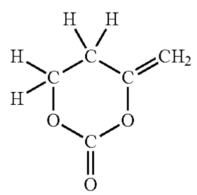
(1-33)
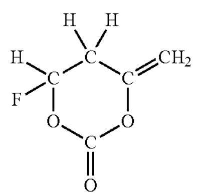
(1-34)
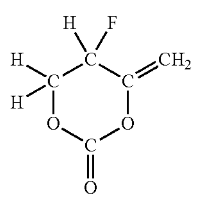
(1-35)
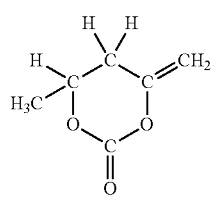
(1-36)
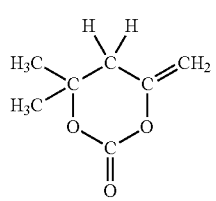
-continued
(1-37)
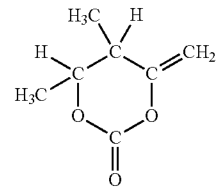
(1-38)
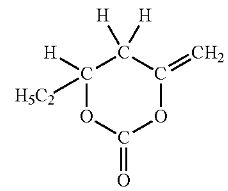
(1-39)
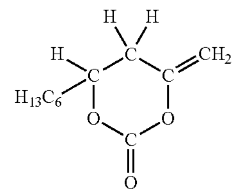
(1-40)
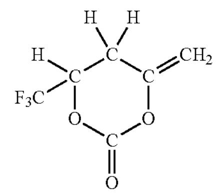
(1-41)
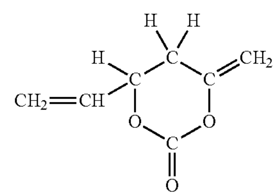
(1-42)
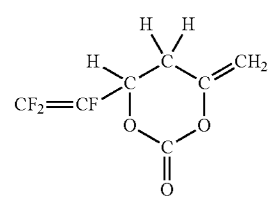
(1-43)
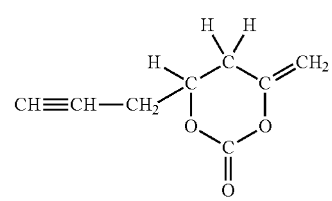
(1-44)
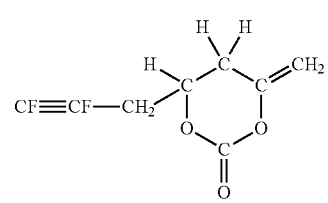

-continued (1-45)

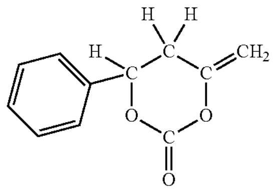

(1-46)

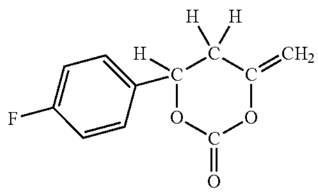

(1-47)

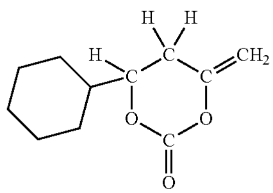

(1-48)

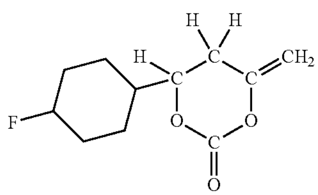

(1-49)

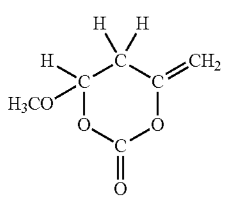

(1-50)

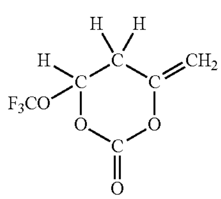

(1-51)

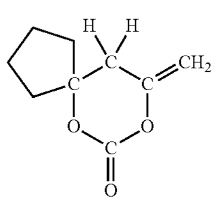

(1-52)

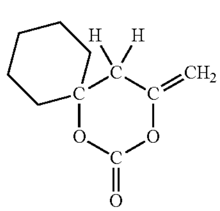

-continued (1-53)

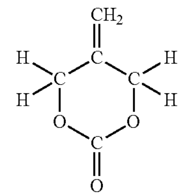

(1-54)

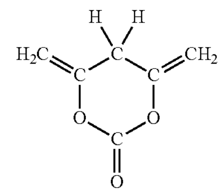

(1-55)

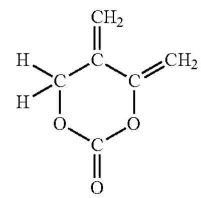

(1-56)

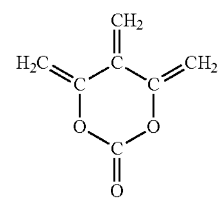

(Content of the Unsaturated Cyclic Carbonate Ester)

In view of obtaining a more excellent effect, with respect to the non-aqueous electrolyte solution, as a content of the unsaturated cyclic carbonate ester represented by Formula (1), 0.01 mass % or more and 10 mass % or less is preferable, 0.02 mass % or more and 9 mass % or less is more preferable, and 0.03 mass % or more and 8 mass % or less is most preferable.

(Halogenated Carbonate Ester)

The non-aqueous electrolyte solution may include at least one kind of the halogenated carbonate esters represented by Formula (2) and Formula (3) in place of the unsaturated cyclic carbonate ester represented by Formula (1). In addition, the non-aqueous electrolyte solution may include at least one kind of the unsaturated cyclic carbonate ester represented by Formula (1) as well as the halogenated carbonate esters represented by Formula (2) and Formula (3). That is, the non-aqueous electrolyte solution includes at least one kind of the unsaturated cyclic carbonate ester represented by Formula (1) and the halogenated carbonate esters represented by Formula (2) and Formula (3).

[Chem. 7]

(2)

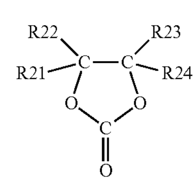

(where, in Formula (2), R21 to R24 each independently represent a hydrogen group, a halogen group, an alkyl group or a halogenated alkyl group, and at least one of R21 to R24 represents a halogen group or a halogenated alkyl group)

[Chem. 8]

(3)

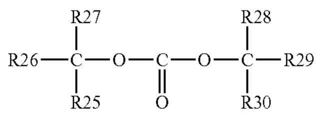

(where, in Formula (3), R25 to R30 each independently represent a hydrogen group, a halogen group, an alkyl group or a halogenated alkyl group, and at least one of R25 to R30 represents a halogen group or a halogenated alkyl group.)

The halogenated carbonate ester represented by Formula (2) refers to a cyclic carbonate ester including one, two or more halogen atoms as constituent elements (a halogenated cyclic carbonate ester). The halogenated carbonate ester represented by Formula (3) refers to a chain carbonate ester including one, two or more halogen atoms as constituent elements (a halogenated chain carbonate ester).

A kind of the halogen is not particularly limited. Among them, fluorine (F), chlorine (Cl) or bromine (Br) is preferable, and fluorine is more preferable. This is because it is possible to obtain a greater effect than with the other halogens. However, as the number of halogen atoms, two is more preferable than one. Further, three or more may be used. This is because since an ability to form a protection film increases and a stronger and more stable protection film is formed, a decomposition reaction of the electrolyte solution is further suppressed.

The halogenated cyclic carbonate ester represented by Formula (2) is, for example, the compounds represented by the following Formula (2-1) to Formula (2-21). However, specific examples of the halogenated carbonate ester are not limited to the following listed examples. The halogenated cyclic carbonate ester also includes a geometric isomer. Among them, 4-fluoro-1,3-dioxolan-2-one represented by Formula (2-1) or 4, 5-difluoro-1,3-dioxolan-2-one represented by Formula (2-3) is preferable, and the latter is more preferable. In addition, as 4,5-difluoro-1,3-dioxolan-2-one, a trans isomer is more preferable than a cis isomer. This is because it is easily available and it is possible to obtain a greater effect. The halogenated chain carbonate ester is, for example, fluoromethyl methyl carbonate, bis(fluoromethyl) carbonate or difluoromethyl methyl carbonate. However, specific examples of the halogenated chain carbonate ester are not limited thereto.

[Chem. 9]

(2-1)

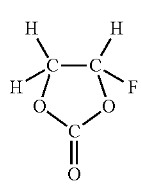

-continued (2-2)

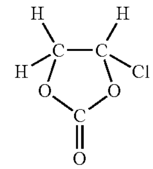

(2-3)

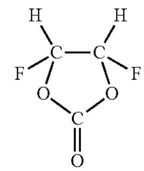

(2-4)

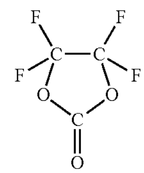

(2-5)

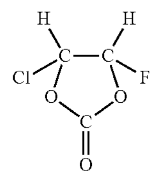

(2-6)

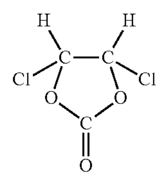

(2-7)

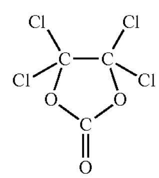

(2-8)

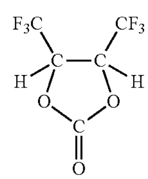

(2-9)

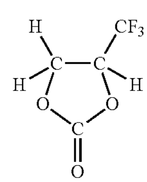

(2-10)

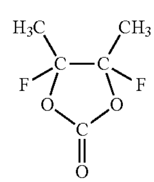

-continued (2-11)

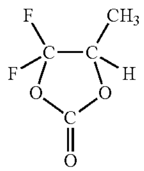

(2-12)

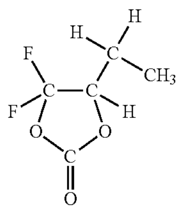

(2-13)

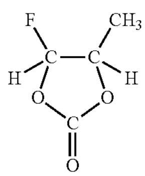

(2-14)

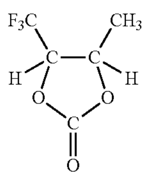

(2-15)

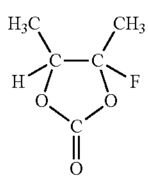

(2-16)

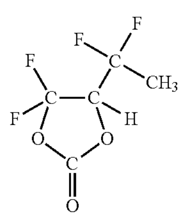

(2-17)

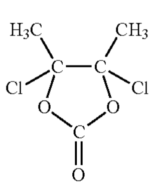

(2-18)

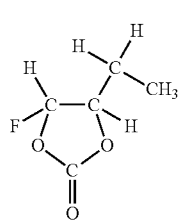

-continued (2-19)

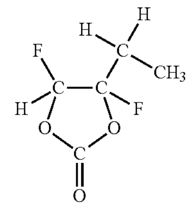

(2-20)

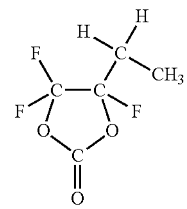

(2-21)

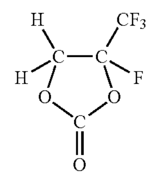

(Content of a Halogenated Carbonate Ester)

In view of obtaining a more excellent effect, with respect to the non-aqueous electrolyte solution, as a content of the halogenated carbonate esters represented by Formula (2) and Formula (3), 0.01 mass % or more and 50 mass % or less is preferable, 0.02 mass % or more and 25 mass % or less is more preferable, and 0.03 mass % or more and 10 mass % or less is most preferable.

(Solid Particles)

As the solid particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide ($Al(OH)_3$, (bayerite or gibbsite)), zinc hydroxide ($Zn(OH)_2$), or the like, an oxide hydroxide or a hydrated oxide such as boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), or magnesium oxide hydrate ($MgO_a.mH_2O$ (a=0.8 to 1.2, m=0.5 to 10)), a hydroxide hydrate such as magnesium hydroxide octahydrate, or the like may be preferably used. As the metal carbide, boron carbide ($B_4C$) or the like may be preferably used. As the metal nitride, silicon nitride ($Si_3N_4$), boron nitride (BN), aluminum nitride (AlN), titanium nitride (TiN), or the like may be preferably used.

As the metal fluoride, lithium fluoride (LiF), aluminum fluoride ($AlF_3$), calcium fluoride ($CaF_2$), barium fluoride ($BaF_2$), magnesium fluoride, or the like may be preferably used. As the phosphate compound, trilithium phosphate ($Li_3PO_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ($[SiO_4]^{4-}$). As the nesosilicate mineral, one that falls under olivines or garnets, or the like is given. As the nesosilicate mineral, more specifically, an olivine (a continuous solid solution of $Mg_2SiO_4$ (forsterite) and $Fe_2SiO_4$ (fayalite)), magnesium silicate (forsterite, $Mg_2SiO_4$), aluminum silicate ($Al_2SiO_5$; sillimanite, andalusite, or kyanite), zinc silicate (willemite, $Zn_2SiO_4$), zirconium silicate (zircon, $ZrSiO_4$), mullite ($3Al_2O_3.2SiO_2$ to $2Al_2O_3.SiO_2$), or the like is given.

The sorosilicate mineral is a group-structured silicate mineral formed of composite bond groups of Si—O tetrahedrons ($[Si_2O_7]^{6-}$ or $[Si_5O_{16}]^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ($[Si_3O_9]^{6-}$, $[Si_4O_{12}]^{8-}$, or $[Si_6O_{15}]^{12-}$). As the cyclosilicate mineral, beryl, tourmalines, or the like is given.

The inosilicate mineral is a fibrous silicate mineral having a chain-like form ($[Si_2O_6]^{4-}$) and a band-like form ($[Si_3O_9]^{6-}$, $[Si_4O_{11}]^{6-}$, $[Si_5O_{15}]^{10-}$, or $[Si_7O_{21}]^{14-}$) in which the linkage of Si—O tetrahedrons extends infinitely. As the inosilicate mineral, for example, one that falls under pyroxenes such as calcium silicate (wollastonite, $CaSiO_3$), one that falls under amphiboles, or the like is given.

The layered silicate mineral is a layer-like silicate mineral having network bonds of Si—O tetrahedrons ($[SiO_4]^{4-}$). Specific examples of the layered silicate mineral are described later.

The tectosilicate mineral is a silicate mineral of a three-dimensional network structure in which Si—O tetrahedrons ($[SiO_4]^{4-}$) form three-dimensional network bonds. As the tectosilicate mineral, quartz, feldspars, zeolites, or the like, an aluminosilicate ($aM_2O.bAl_2O_3.cSiO_2.dH_2O$; M being a metal element; a, b, c, and d each being an integer of 1 or more) such as a zeolite ($M_{2/n}O.Al_2O_3.xSiO_2.yH_2O$; M being a metal element; n being the valence of M; x≥2; y≥0), or the like is given.

As the asbestos, chrysotile, amosite, anthophyllite, or the like is given.

As the carbonate mineral, dolomite ($CaMg(CO_3)_2$), hydrotalcite ($Mg_6Al_2(CO_3)(OH)_{16}.4(H_2O)$), or the like is given.

As the oxide mineral, spinel ($MgAl_2O_4$) or the like is given.

As other minerals, strontium titanate ($SrTiO_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral comprises a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite ($Al_2Si_2O_5(OH)_4$), dickite, or the like is given. As one that falls under the pyrophyllite-talc group, for example, talc ($Mg_3Si_4O_{10}(OH)_2$), willemseite, pyrophyllite ($Al_2Si_4O_{10}(OH)_2$), or the like is given. As one that falls under the smectite group, for example, saponite $[(Ca/2,Na)_{0.33}(Mg,Fe^{2+})_3(Si,Al)_4O_{10}(OH)_2.4H_2O]$, hectorite, sauconite, montmorillonite {$(Na,Ca)_{0.33}(Al,Mg)2Si_4O_{10}(OH)_2.nH_2O$; a clay comprising montmorillonite as a main component is called bentonite}, beidellite, nontronite, or the like is given. As one that falls under the mica group, for example, muscovite ($KAl_2(AlSi_3)O_{10}(OH)_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite ($Mg_9Si_{12}O_{30}(OH)_6(OH_2)_4.6H_2O$), palygorskite, or the like is given.

As other silicate minerals, a porous aluminosilicate such as a zeolite ($M_{2/n}O.Al_2O_3.xSiO_2.yH_2O$; M being a metal element; n being the valence of M; x≥2; y≥0), attapulgite $[(Mg,Al)2Si_4O_{10}(OH).6H_2O]$, or the like is given.

As the layered carbonate mineral, hydrotalcite ($Mg_6Al_2(CO_3)(OH)_{16}.4(H_2O)$) or the like is given.

As the amorphous or quasicrystalline clay mineral, hisingerite, imogolite ($Al_2SiO_3(OH)$), allophane, or the like is given.

These inorganic particles may be used singly, or two or more of them may be mixed for use. The inorganic particle has also oxidation resistance; and when the electrolyte layer

56 is provided between the cathode 53 and the separator 55, the inorganic particle has strong resistance to the oxidizing environment near the cathode during charging.

The solid particle may be also an organic particle. As the material that forms the organic particle, melamine, melamine cyanurate, melamine polyphosphate, cross-linked polymethyl methacrylate (cross-linked PMMA), polyolefin, polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

In view of obtaining a more excellent effect, among such solid particles, particles of boehmite, aluminum hydroxide, magnesium hydroxide, and a silicate salt are preferable. In such solid particles, a deviation in the battery due to —O—H arranged in a sheet form in the crystal structure strongly selectively attracts the additive. Accordingly, it is possible to intensively accumulate the additive at the recess between active material particles more effectively.

(Configuration of an Inside of a Battery)

FIG. 3A and FIG. 3B are schematic cross-sectional views of an enlarged part of an inside of the non-aqueous electrolyte battery according to the fourth embodiment of the present technology. Note that the binder, the conductive agent and the like comprised in the active material layer are not shown.

As shown in FIG. 3A, the non-aqueous electrolyte battery according to the fourth embodiment of the present technology has a configuration in which particles 10, which are the solid particles described above, are disposed between the separator 55 and the anode active material layer 54B and inside the anode active material layer 54B at an appropriate concentration in appropriate regions. In such a configuration, three regions divided into a recess impregnation region A of an anode side, a top coat region B of an anode side and a deep region C of an anode side are formed.

Also, similarly, as shown in FIG. 3B, the non-aqueous electrolyte battery according to the fourth embodiment of the present technology has a configuration in which particles 10, which are the solid particles described above, are disposed between the separator 55 and the cathode active material layer 53B and inside the cathode active material layer 53B at an appropriate concentration in appropriate regions. In such a configuration, three regions divided into a recess impregnation region A of a cathode side, a top coat region B of a cathode side and a deep region C of a cathode side are formed.

(Recess Impregnation Region A, Top Coat Region B, and Deep Region C)

For example, the recess impregnation regions A of the anode side and the cathode side, the top coat regions B of the anode side and the cathode side, and the deep regions C of the anode side and the cathode side are formed as follows.

(Recess Impregnation Region A)

(Recess Impregnation Region of an Anode Side)

The recess impregnation region A of the anode side refers to a region including a recess between the adjacent anode active material particles 11 positioned on the outermost surface of the anode active material layer 54B comprising the anode active material particles 11 serving as anode active materials. The recess impregnation region A is impregnated with the particles 10 and electrolytes comprising at least one kind of the unsaturated cyclic carbonate ester represented by Formula (1) and the halogenated carbonate esters represented by Formula (2) and Formula (3). Accordingly, the recess impregnation region A of the anode side is filled with the electrolytes comprising at least one kind of the unsaturated cyclic carbonate ester represented by Formula (1) and the halogenated carbonate esters represented by Formula (2) and Formula (3). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the anode active material particles 11 inside a region between two parallel lines L1 and L2 shown in FIG. 3A is classified as the recess impregnation region A of the anode side including the recess in which the electrolytes and the particles 10 are disposed. The two parallel lines L1 and L2 are drawn as follows. Within a predetermined visual field width (typically, a visual field width of 50 μm) shown in FIG. 3A, cross sections of the separator 55, the anode active material layer 54B, and a region between the separator 55 and the anode active material layer 54B are observed. In this observation field of view, the two parallel lines L1 and L2 perpendicular to a thickness direction of the separator 55 are drawn. The parallel line L1 is a line that passes through a position closest to the separator 55 in a cross-sectional image of the anode active material particles 11. The parallel line L2 is a line that passes through the deepest part in a cross-sectional image of the particles 10 included in the recess between the adjacent anode active material particles 11. The deepest part refers to a position farthest from the separator 55 in a thickness direction of the separator 55. Also, the cross section can be observed using, for example, a scanning electron microscope (SEM).

(Recess Impregnation Region of a Cathode Side)

The recess impregnation region A of the cathode side refers to a region including a recess between the adjacent cathode active material particles 12 positioned on the outermost surface of the cathode active material layer 53B comprising cathode active material particles 12 serving as cathode active materials. The recess impregnation region A is impregnated with the particles 10 serving as solid particles and electrolytes comprising at least one kind of the unsaturated cyclic carbonate ester represented by Formula (1) and the halogenated carbonate esters represented by Formula (2) and Formula (3). Accordingly, the recess impregnation region A of the cathode side is filled with the electrolytes comprising at least one kind of the unsaturated cyclic carbonate ester represented by Formula (1) and the halogenated carbonate esters represented by Formula (2) and Formula (3). In addition, the particles 10 are comprised in the recess impregnation region A of the cathode side as solid particles to be included in the electrolytes. Note that the electrolytes may be gel-like electrolytes or liquid electrolytes including the non-aqueous electrolyte solution.

A region other than a cross section of the cathode active material particles 12 inside a region between two parallel lines L1 and L2 shown in FIG. 3B is classified as the recess impregnation region A of the cathode side including the recess in which the electrolytes and the particles 10 are disposed. The two parallel lines L1 and L2 are drawn as follows. Within a predetermined visual field width (typically, a visual field width of 50 μm) shown in FIG. 3B, cross sections of the separator 55, the cathode active material layer 53B and a region between the separator 55 and the cathode active material layer 53B are observed. In this observation field of view, the two parallel lines L1 and L2 perpendicular to a thickness direction of the separator 55 are drawn. The parallel line L1 is a line that passes through a position closest to the separator 55 in a cross-sectional image of the cathode active material particles 12. The parallel line L2 is a line that passes through the deepest part in a cross-sectional image of the particles 10 included in the recess between the adjacent cathode active material particles 12. Note that the deepest part refers to a position farthest from the separator 55 in a thickness direction of the separator 55.

(Top Coat Region B)

(Top Coat Region of an Anode Side)

The top coat region B of the anode side refers to a region between the recess impregnation region A of the anode side and the separator 55. The top coat region B is filled with electrolytes comprising at least one kind of the unsaturated cyclic carbonate ester represented by Formula (1) and the halogenated carbonate esters represented by Formula (2) and Formula (3). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3A is classified as the top coat region B of the anode side.

(Top Coat Region of a Cathode Side)

The top coat region B of the cathode side refers to a region between the recess impregnation region A of the cathode side and the separator 55. The top coat region B is filled with electrolytes comprising at least one kind of the unsaturated cyclic carbonate ester represented by Formula (1) and the halogenated carbonate esters represented by Formula (2) and Formula (3). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3B is classified as the top coat region B of the cathode side.

(Deep Region C)

(Deep Region of an Anode Side)

The deep region C of the anode side refers to a region inside the anode active material layer 54B, which is deeper than the recess impregnation region A of the anode side. The gap between the anode active material particles 11 of the deep region C is filled with electrolytes comprising at least one kind of the unsaturated carbonate ester represented by Formula (1) and the halogenated carbonate esters represented by Formula (2) and Formula (3). The particles 10 to be included in the electrolytes are comprised in the deep region C. Note that the particles 10 may not be comprised in the deep region C.

A region of the anode active material layer 54B other than the recess impregnation region A and the top coat region B within the same predetermined observation field of view shown in FIG. 3A is classified as the deep region C of the anode side. For example, a region between the above-described parallel line L2 and anode current collector 54A within the same predetermined observation field of view shown in FIG. 3A is classified as the deep region C of the anode side.

(Deep Region of a Cathode Side)

The deep region C of the cathode side refers to a region inside the cathode active material layer 53B, which is deeper than the recess impregnation region A of the cathode side. The gap between the cathode active material particles 12 of the deep region C of the cathode side is filled with electrolytes comprising at least one kind of the unsaturated carbonate ester represented by Formula (1) and the halogenated carbonate esters represented by Formula (2) and Formula (3). The particles 10 to be included in the electrolytes are comprised in the deep region C. Note that the particles 10 may not be comprised in the deep region C.

A region of the cathode active material layer 53B other than the recess impregnation region A and the top coat region B within the same predetermined observation field of view shown in FIG. 3B is classified as the deep region C of the cathode side. For example, a region between the above-described parallel line L2 and cathode current collector 53A within the same predetermined observation field of view shown in FIG. 3B is classified as the deep region C of the cathode side.

(Concentration of Solid Particles)

A concentration of the solid particles of the recess impregnation region A of the anode side is 30 volume % or more. Furthermore, 30 volume % or more and 90 volume % or less is preferable, and 40 volume % or more and 80 volume % or less is more preferable. When the concentration of the solid particles of the recess impregnation region A of the anode side is in the above range, more solid particles are disposed in the recess between adjacent particles in which many cracks occur. At least one kind of the unsaturated cyclic carbonate ester represented by Formula (1) (or a compound derived therefrom), and the halogenated carbonate esters represented by Formula (2) and Formula (3) is captured by the solid particles, and the additive is likely to be retained in the recess between adjacent active material particles. For this reason, an abundance ratio of the additive in the recess between adjacent particles can be higher than in the other parts. Accordingly, it is possible to form an effective coating film for the crack that occurs in the active material particles. As a result, it is possible to implement a battery that has a high capacity and low cycle deterioration at a high output discharge. Also, since at least one kind of the unsaturated cyclic carbonate ester represented by Formula (1) and the halogenated carbonate esters represented by Formula (2) and Formula (3) in the electrolytes can selectively accumulate in the crack part, an effect of at least one kind of the unsaturated cyclic carbonate ester represented by Formula (1) and the halogenated carbonate esters represented by Formula (2) and Formula (3) can be obtained by adding a necessary minimum amount. In addition, by selectively accumulating at least one kind of the unsaturated cyclic carbonate ester represented by Formula (1) and the halogenated carbonate esters represented by Formula (2) and Formula (3) in the crack part, formation of a coating film in a part other than the crack part is suppressed. Therefore, even when an amount added increases, it is possible to suppress a resistance from increasing due to a coating film derived from at least one kind of the unsaturated cyclic carbonate ester represented by Formula (1) and the halogenated carbonate esters represented by Formula (2) and Formula (3) formed in a part other than the crack part.

Although action effects are different from those described above, in view of obtaining a more excellent effect, the concentration of the solid particles of the recess impregnation region A of the cathode side is 30 volume % or more, where 30 volume % or more and 90 volume % or less is preferable, and 40 volume % or more and 80 volume % or less is more preferable. When the concentration of the solid particles of the recess impregnation region A of the cathode side is in the above range, more solid particles are disposed in the recess between adjacent particles in which many cracks occur. At least one kind of the unsaturated cyclic carbonate ester represented by Formula (1) (or a compound derived therefrom), and the halogenated carbonate esters represented by Formula (2) and Formula (3) is captured by the solid particles, and the additive is likely to be retained in the recess between adjacent cathode active material particles positioned on the outermost surface of the cathode active material layer. For this reason, it is possible to further suppress at least one kind of the unsaturated cyclic carbonate ester represented by Formula (1) and the halogenated carbonate esters represented by Formula (2) and Formula (3) from moving to the deep region C of the cathode side or the deep region C of the anode side, which results in a side reaction. In addition, in the anode, when at least one kind of the unsaturated cyclic carbonate ester represented by Formula (1) and the halogenated carbonate esters represented by Formula (2) and Formula (3) is consumed in the crack that occurs in the anode active material particles, at least one kind of the unsaturated cyclic carbonate ester represented by Formula (1) and the halogenated carbonate esters represented by Formula (2) and Formula (3) that are retained and accumulated in the recess between adjacent active material particles of the cathode side can be supplied to the recess between adjacent active material particles of the anode side.

The concentration of the solid particles of the recess impregnation region A of the anode side is preferably 10 times the concentration of the solid particles of the deep region C of the anode side or more. A concentration of the particles of the deep region C of the anode side is preferably 3 volume % or less. When the concentration of the solid particles of the deep region C of the anode side is too high, since too many solid particles are between active material particles, the solid particles cause a resistance, the captured additive causes a side reaction, and an internal resistance increases.

For the same reason, the concentration of the solid particles of the recess impregnation region A of the cathode side is preferably 10 times the concentration of the solid particles of the deep region C of the cathode side or more. The concentration of particles of the deep region C of the cathode side is preferably 3 volume % or less. When the concentration of the solid particles of the deep region C of the cathode side is too high, since too many solid particles are between active material particles, the solid particles cause a resistance, the captured additive causes a side reaction, and an internal resistance increases.

(Concentration of Solid Particles)

The concentration of solid particles described above refers to a volume concentration (volume %) of solid particles, which is defined as an area percentage ((“total area of particle cross section”÷“area of observation field of view”)×100)(%) of a total area of cross sections of particles when an observation field of view is 2 μm×2 μm. Note that, when a concentration of solid particles of the recess impregnation region A is defined, the observation field of view is set, for example, in the vicinity of a center of a recess formed between adjacent particles in a width direction. Observation is performed using, for example, the SEM, an image obtained by photography is processed, and therefore it is possible to calculate the above areas.

(Thickness of the Recess Impregnation Region A, the Top Coat Region B, and the Deep Region C)

The thickness of the recess impregnation region A of the anode side is preferably 10% or more and 40% or less of the thickness of the anode active material layer 54B. When the thickness of the recess impregnation region A of the anode side is in the above range, it is possible to ensure an amount of necessary solid particles to be disposed in the recess and maintain a state in which too many of the additive do not enter the deep region C. Further, the thickness of the recess impregnation region A of the anode side is in the above range, and more preferably, is twice the thickness of the top coat region B of the anode side or more. This is because it is possible to prevent a distance between electrodes from increasing and further improve an energy density. In addition, for the same reason, the thickness of the recess impregnation region A of the cathode side is more preferably twice the thickness of the top coat region B of the cathode side or the like.

(Method of Measuring a Thickness of Regions)

When the thickness of the recess impregnation region A is defined, an average value of thicknesses of the recess impregnation region A in four different observation fields of view is set as the thickness of the recess impregnation region A. When the thickness of the top coat region B is defined, an average value of thicknesses of the top coat region B in four different observation fields of view is set as the thickness of the top coat region B. When the thickness of the deep region C is defined, an average value of thicknesses of the deep region C in four different observation fields of view is set as the thickness of the deep region C.

(Particle Size of Solid Particles)

As a particle size of solid particles, a particle size D50 is preferably “2/√3−1” times a particle size D50 of active material particles or less. In addition, as the particle size of the solid particles, a particle size D50 is more preferably 0.1 μm or more. As the particle size of the solid particles, a particle size D95 is preferably “2/√3−1” times a particle size D50 of active material particles or more. Particles having a large particle size block an interval between adjacent active material particles at a bottom of the recess and it is possible to suppress too many of the solid particles from entering the deep region C and a negative influence on a battery characteristic.

(Measurement of a Particle Size)

A particle size D50 of solid particles is, for example, a particle size at which 50% of particles having a smaller particle size are cumulated (a cumulative volume of 50%) in a particle size distribution in which solid particles after components other than solid particles are removed from electrolytes comprising solid particles are measured by a laser diffraction method. In addition, based on the measured particle size distribution, it is possible to obtain a value of a particle size D95 at a cumulative volume 95%. A particle size D50 of active materials is a particle size at which 50% of particles having a smaller particle size are cumulated (a cumulative volume of 50%) in a particle size distribution in which active material particles after components other than active material particles are removed from an active material layer comprising active material particles are measured by a laser diffraction method.

(Specific Surface Area of Solid Particles)

The specific surface area ($m^2/g$) is a BET specific surface area ($m^2/g$) measured by a BET method, which is a method of measuring a specific surface area. The BET specific surface area of solid particles is preferably 1 $m^2/g$ or more and 60 $m^2/g$ or less. When the BET specific surface area is in the above numerical range, an action of solid particles capturing at least one kind of the unsaturated cyclic carbonate ester represented by Formula (1) and the halogenated carbonate esters represented by Formula (2) and Formula (3) increases, which is preferable. On the other hand, when the BET specific surface area is too large, since lithium ions are also captured, an output characteristic tends to decrease. Note that measurement can be performed using, for example, solid particles after components other than solid particles are removed from electrolytes comprising solid particles in the same manner as described above.

(Configuration Including the Recess Impregnation Region A, the Top Coat Region B, and the Deep Region C, which are Only on the Anode Side)

Note that, as will be described below, the electrolyte layer 56 comprising solid particles may be formed only on both principal surfaces of the anode 54. In addition, the electrolyte layer 56 comprising no solid particles may be applied to and formed on both principal surfaces of the cathode 53. In such a case, only the recess impregnation region A of the anode side, the top coat region B of the anode side, and the deep region C of the anode side are formed, and these regions are not formed on the cathode side. In the present technology, the recess impregnation region A of the anode side, the top coat region B of the anode side, and the deep region C of the anode side may be formed only on at least the anode side.

(4-2) Method of Manufacturing an Exemplary Non-aqueous Electrolyte Battery

An exemplary non-aqueous electrolyte battery can be manufactured, for example, as follows.

(Method of Manufacturing a Cathode)

Cathode active materials, the conductive agent, and the binder are mixed to prepare a cathode mixture. The cathode mixture is dispersed in a solvent such as N-methyl-2-pyrrolidone to prepare a cathode mixture slurry in a paste form. Next, the cathode mixture slurry is applied to the cathode current collector 53A, the solvent is dried, and compression molding is performed by, for example, a roll press device. Therefore, the cathode active material layer 53B is formed and the cathode 53 is fabricated.

(Method of Manufacturing an Anode)

Anode active materials and the binder are mixed to prepare an anode mixture. The anode mixture is dispersed in a solvent such as N-methyl-2-pyrrolidone to prepare an anode mixture slurry in a paste form. Next, the anode mixture slurry is applied to the anode current collector 54A, the solvent is dried, and compression molding is performed by, for example, a roll press device. Therefore, the anode active material layer 54B is formed and the anode 54 is fabricated.

(Preparation of a Non-aqueous Electrolyte Solution)

An electrolyte salt is dissolved in a non-aqueous solvent to prepare the non-aqueous electrolyte solution.

(Solution Coating)

A coating solution comprising a non-aqueous electrolyte solution, a matrix polymer compound, solid particles, and a dilution solvent (for example, dimethyl carbonate) is heated and applied to both principal surfaces of each of the cathode 53 and the anode 54. Then, the dilution solvent is evaporated and the electrolyte layer 56 is formed.

When the coating solution is heated and applied, electrolytes comprising solid particles can be impregnated into a recess between adjacent anode active material particles positioned on the outermost surface of the anode active material layer 54B and the deep region C inside the anode active material layer 54B. In this case, when solid particles are filtered in the recess between adjacent particles, a concentration of particles in the recess impregnation region A of the anode side increases. Accordingly, it is possible to set a difference of concentrations of particles between the recess impregnation region A and the deep region C. Similarly, when the coating solution is heated and applied, electrolytes comprising solid particles can be impregnated into a recess between adjacent cathode active material particles positioned on the outermost surface of the cathode active material layer 53B and the deep region C inside the cathode active material layer 53B. In this case, when solid particles are filtered in the recess between adjacent particles, a concentration of particles in the recess impregnation region A of the cathode side increases. Accordingly, it is possible to set a difference of concentrations of particles between the recess impregnation region A and the deep region C. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval between particles at a bottom of the recess is filled with some solid particles having a large particle size and the solid particles can be easily filtered.

When the excess coating solution is scraped off after the coating solution is applied, it is possible to prevent a distance between electrodes from extending unintentionally. In addition, by scraping a surface of the coating solution, it is possible to dispose more solid particles in the recess between adjacent active material particles, and a ratio of solid particles of the top coat region B decreases. Accordingly, most of the solid particles are intensively disposed in the recess impregnation region A, and at least one kind of the unsaturated cyclic carbonate ester represented by Formula (1) and the halogenated carbonate esters represented by Formula (2) and Formula (3) can further accumulate in the vicinity of the crack that occurs in the active material particles.

Note that solution coating may be performed in the following manner. A coating solution (a coating solution excluding particles) comprising a non-aqueous electrolyte solution, a matrix polymer compound, and a dilution solvent (for example, dimethyl carbonate) is applied to both principal surfaces of the cathode 53, and the electrolyte layer 56 comprising no solid particles may be formed. In addition, no electrolyte layer 56 is formed on one principal surface or both principal surfaces of the cathode 53, and the electrolyte layer 56 comprising the same solid particles may be formed only on both principal surfaces of the anode 54.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 on which the electrolyte layer 56 is formed and the anode 54 on which the electrolyte layer 56 is formed are laminated through the separator 55 to prepare a laminated body. Then, the laminated body is wound in a longitudinal direction, the protection tape 57 is adhered to the outermost peripheral portion and the wound electrode body 50 is formed.

Finally, for example, the wound electrode body 50 is inserted into the package member 60, and outer periphery portions of the package member 60 are enclosed in close contact with each other by thermal fusion bonding. In this case, the adhesive film 61 is inserted between the package member 60 and each of the cathode lead 51 and the anode lead 52. Accordingly, the non-aqueous electrolyte battery shown in FIG. 1 and FIG. 2 is completed.

[Modification Example 4-1]

The non-aqueous electrolyte battery according to the fourth embodiment may also be fabricated as follows. The fabrication method is the same as the method of manufacturing an exemplary non-aqueous electrolyte battery described above except that, in the solution coating process of the method of manufacturing an exemplary non-aqueous electrolyte battery, in place of applying the coating solution to both surfaces of at least one electrode of the cathode 53 and the anode 54, the coating solution is formed on at least one principal surface of both principal surfaces of the separator 55, and then a heating and pressing process is additionally performed.

[Method of Manufacturing a Non-aqueous Electrolyte Battery of Modification Example 4-1]

(Fabrication of a Cathode, an Anode, and a Separator, and Preparation of a Non-Aqueous Electrolyte Solution)

In the same manner as in the method of manufacturing an exemplary non-aqueous electrolyte battery, the cathode 53, the anode 54 and the separator 55 are fabricated and the non-aqueous electrolyte solution is prepared.

(Solution Coating)

A coating solution comprising a non-aqueous electrolyte solution, a matrix polymer compound, solid particles, and a dilution solvent (for example, dimethyl carbonate) is applied to at least one principal surface of both surfaces of the separator 55. Then, the dilution solvent is evaporated and the electrolyte layer 56 is formed.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54, and the electrolyte layer 56 are laminated through the formed separator 55 to prepare a laminated body. Then, the laminated body is wound in a longitudinal direction, the protection tape 57 is adhered to the outermost peripheral portion, and the wound electrode body 50 is formed.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Finally, a depression portion is formed by deep drawing the package member 60 formed of a laminated film, the wound electrode body 50 is inserted into the depression portion, an unprocessed part of the package member 60 is folded at an upper part of the depression portion, and a peripheral portion of the depression portion is thermally welded. In this case, the adhesive film 61 is inserted between the package member 60 and each of the cathode lead 51 and the anode lead 52. In this manner, the desired non-aqueous electrolyte battery can be obtained.

[Modification Example 4-2]

While the configuration using gel-like electrolytes has been exemplified in the fourth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 4-2]

(Preparation of a Cathode, an Anode, and a Non-aqueous Electrolyte Solution)

In the same manner as in the method of manufacturing an exemplary non-aqueous electrolyte battery, the cathode 53 and the anode 54 are fabricated and the non-aqueous electrolyte solution is prepared.

(Coating and Formation of a Solid Particle Layer)

Next, paint is applied to at least one principal surface of both principal surfaces of the anode 54 by a coating method, the solvent is then removed by drying and a solid particle layer is formed. As the paint, for example, a mixture of solid particles, a binder polymer compound and a solvent can be used. On the outermost surface of the anode active material layer 54B on which the solid particle layer is applied and formed, solid particles are filtered in the recess between adjacent anode active material particles positioned on the outermost surface of the anode active material layer 54B, and a concentration of particles of the recess impregnation region A of the anode side increases. Similarly, the same paint as described above is applied to both principal surfaces of the cathode 53 by a coating method, the solvent is then removed by drying, and a solid particle layer is formed. On the outermost surface of the cathode active material layer 53B on which the solid particle layer is applied and formed, solid particles are filtered in the recess between adjacent cathode active material particles positioned on the outermost surface of the cathode active material layer 53B, and a concentration of particles of the recess impregnation region A of the cathode side increases. For example, solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval between particles at a bottom of the recess is filled with particles having a large particle size and solid particles can be easily filtered.

Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of the solid particles of the top coat region B decreases. Accordingly, most of the solid particles are intensively disposed in the recess impregnation region and at least one kind of the unsaturated cyclic carbonate ester represented by Formula (1) and the halogenated carbonate esters represented by Formula (2) and Formula (3) can further accumulate in the vicinity of the crack that occurs in the active material particles.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54 are laminated through the separator 55 and wound, the protection tape 57 is adhered to the outermost peripheral portion, and a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the non-aqueous electrolyte solution is injected into the package member 60, and the wound body is impregnated with the non-aqueous electrolyte solution. Then, an opening of the package member 60 is sealed by thermal fusion bonding under a vacuum atmosphere. In this manner, the desired non-electrolyte secondary battery can be obtained.

[Modification Example 4-3]

The non-aqueous electrolyte battery according to the fourth embodiment may be fabricated as follows.

[Method of Manufacturing a Non-aqueous Electrolyte Battery of Modification Example 4-3]

(Fabrication of a Cathode and an Anode)

In the same manner as in the method of manufacturing an exemplary non-aqueous electrolyte battery, the cathode 53 and the anode 54 are fabricated.

(Coating and Formation of a Solid Particle Layer)

Next, in the same manner as in Modification Example 4-2, a solid particle layer is formed on at least one principal surface of both principal surfaces of the anode. In the same manner, a solid particle layer is formed on at least one principal surface of both principal surfaces of the cathode.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Assembly of the Non-aqueous Electrolyte Battery)

Next, in the same manner as in Modification Example 4-2, a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 4-4]

The non-aqueous electrolyte battery according to the fourth embodiment may be fabricated as follows.

[Method of Manufacturing a Non-aqueous Electrolyte Battery of Modification Example 4-4]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated and the non-aqueous electrolyte solution is prepared.

(Formation of a Solid Particle Layer)

Next, in the same manner as in Modification Example 4-2, a solid particle layer is formed on at least one principal surface of both principal surfaces of the anode 54. In the same manner, a solid particle layer is formed on at least one principal surface of both principal surfaces of the cathode 53.

(Coating and Formation of a Matrix Resin Layer)

Next, a coating solution comprising a non-aqueous electrolyte solution, a matrix polymer compound, and a dispersing solvent such as N-methyl-2-pyrrolidone is applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 4-5]

While the configuration using gel-like electrolytes has been exemplified in the fourth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 4-5]

(Fabrication of a Cathode and an Anode, and Preparation of a Non-Aqueous Electrolyte Solution)

First, in the same manner as in the method of manufacturing an exemplary non-aqueous electrolyte battery, the cathode 53 and the anode 54 are fabricated, and the non-aqueous electrolyte solution is prepared.

(Formation of a Solid Particle Layer)

Next, paint is applied to at least one principal surface of both principal surfaces of the separator 55 by a coating method, the solvent is then removed by drying and a solid particle layer is formed. As the paint, for example, a mixture of solid particles, a binder polymer compound (a resin) and a solvent can be used.

(Assembly of the Non-aqueous Electrolyte Battery)

Next, the cathode 53 and the anode 54 are laminated and wound through the separator 55, the protection tape 57 is adhered to the outermost peripheral portion, and a wound body serving as a precursor of the wound electrode body 50 is formed.

(Heating and Pressing Process)

Next, before the electrolyte solution is injected into the package member 60, the wound body is put into a packaging material such as a latex tube and sealed, and subjected to warm pressing under hydrostatic pressure. Accordingly, solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape. Next, the non-aqueous electrolyte solution is prepared and injected into the package member 60. The wound body is impregnated with the non-aqueous electrolyte solution, and an opening of the package member 60 is then sealed by thermal fusion bonding under a vacuum atmosphere. In this manner, the desired non-aqueous electrolyte battery can be obtained.

[Modification Example 4-6]

The non-aqueous electrolyte battery according to the fourth embodiment may be fabricated as follows.

[Method of Manufacturing a Non-aqueous Electrolyte Battery of Modification Example 4-6]

(Fabrication of a Cathode and an Anode)

First, in the same manner as in the method of manufacturing an exemplary non-aqueous electrolyte battery, the cathode 53 and the anode 54 are fabricated.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Formation of a Solid Particle Layer)

Next, in the same manner as in Modification Example 4-5, a solid particle layer is formed on at least one principal surface of both principal surfaces of the separator 55.

(Assembly of the Non-aqueous Electrolyte Battery)

Next, in the same manner as in Modification Example 4-2, a wound body serving as a precursor of the wound electrode body 50 is formed.

(Heating and Pressing Process)

Next, before the non-aqueous electrolyte solution is injected into the package member 60, the wound body is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 4-7]

The non-aqueous electrolyte battery according to the fourth embodiment may be fabricated as follows.

[Method of Manufacturing a Non-aqueous Electrolyte Battery of Modification Example 4-7]

(Fabrication of a Cathode and an Anode)

First, in the same manner as in the method of manufacturing an exemplary non-aqueous electrolyte battery, the cathode 53 and the anode 54 are fabricated. Next, solid particles and the matrix polymer compound are applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 4-8]

In the example of the fourth embodiment and Modification Example 4-1 to Modification Example 4-7 described above, the non-aqueous electrolyte battery in which the wound electrode body 50 is packaged with the package member 60 has been described. However, as shown in FIGS. 4A to 4C, a stacked electrode body 70 may be used in place of the wound electrode body 50. FIG. 4A is an external view of the non-aqueous electrolyte battery in which the stacked electrode body 70 is housed. FIG. 4B is a dissembled perspective view showing a state in which the stacked electrode body 70 is housed in the package member 60. FIG.

4C is an external view showing an exterior of the non-aqueous electrolyte battery shown in FIG. 4A seen from a bottom side.

As the stacked electrode body 70, the stacked electrode body 70 in which a rectangular cathode 73 and a rectangular anode 74 are laminated through a rectangular separator 75, and fixed by a fixing member 76 is used. Although not shown, when the electrolyte layer is formed, the electrolyte layer is provided in contact with the cathode 73 and the anode 74. For example, the electrolyte layer (not shown) is provided between the cathode 73 and the separator 75, and between the anode 74 and the separator 75. The electrolyte layer is the same as the electrolyte layer 56 described above. A cathode lead 71 connected to the cathode 73 and an anode lead 72 connected to the anode 74 are led out from the stacked electrode body 70. The adhesive film 61 is provided between the package member 60 and each of the cathode lead 71 and the anode lead 72.

Note that a method of manufacturing a non-aqueous electrolyte battery is the same as the method of manufacturing a non-aqueous electrolyte battery in the example of the fourth embodiment and Modification Example 4-1 to Modification Example 4-7 described above except that a stacked electrode body is fabricated in place of the wound electrode body 70, and a laminated body (having a configuration in which the electrolyte layer is removed from the stacked electrode body 70) is fabricated in place of the wound body.

5. Fifth Embodiment

In the fifth embodiment of the present technology, a cylindrical non-aqueous electrolyte battery (a battery) will be described. The non-aqueous electrolyte battery is, for example, a non-aqueous electrolyte secondary battery in which charging and discharging are possible. Also, a lithium ion secondary battery is exemplified.

(5-1) Configuration of an Example of the Non-aqueous Electrolyte Battery

FIG. 5 is a cross-sectional view of an example of the non-aqueous electrolyte battery according to the fifth embodiment. The non-aqueous electrolyte battery is, for example, a non-aqueous electrolyte secondary battery in which charging and discharging are possible. The non-aqueous electrolyte battery, which is a so-called cylindrical type, includes non-aqueous liquid electrolytes, which are not shown, (hereinafter, appropriately referred to as the non-aqueous electrolyte solution) and a wound electrode body 90 in which a band-like cathode 91 and a band-like anode 92 are wound through a separator 93 inside a substantially hollow cylindrical battery can 81.

The battery can 81 is made of, for example, nickel-plated iron, and includes one end that is closed and the other end that is opened. A pair of insulating plates 82*a* and 82*b* perpendicular to a winding peripheral surface are disposed inside the battery can 81 so as to interpose the wound electrode body 90 therebetween.

Exemplary materials of the battery can 81 include iron (Fe), nickel (Ni), stainless steel (SUS), aluminum (Al), and titanium (Ti). In order to prevent electrochemical corrosion by the non-aqueous electrolyte solution according to charge and discharge of the non-aqueous electrolyte battery, the battery can 81 may be subjected to plating of, for example, nickel. At an open end of the battery can 81, a battery lid 83 serving as a cathode lead plate, a safety valve mechanism, and a positive temperature coefficient (PTC) element 87 provided inside the battery lid 83 are attached by being caulked through a gasket 88 for insulation sealing.

The battery lid 83 is made of, for example, the same material as that of the battery can 81, and an opening for discharging a gas generated inside the battery is provided. In the safety valve mechanism, a safety valve 84, a disk holder 85 and a blocking disk 86 are sequentially stacked. A protrusion part 84*a* of the safety valve 84 is connected to a cathode lead 95 that is led out from the wound electrode body 90 through a sub disk 89 disposed to cover a hole 86*a* provided at a center of the blocking disk 86. Since the safety valve 84 and the cathode lead 95 are connected through the sub disk 89, the cathode lead 95 is prevented from being drawn from the hole 86*a* when the safety valve 84 is reversed. In addition, the safety valve mechanism is electrically connected to the battery lid 83 through the positive temperature coefficient element 87.

When an internal pressure of the non-aqueous electrolyte battery becomes a predetermined level or more due to an internal short circuit of the battery or heat from the outside of the battery, the safety valve mechanism reverses the safety valve 84, and disconnects an electrical connection of the protrusion part 84*a*, the battery lid 83 and the wound electrode body 90. That is, when the safety valve 84 is reversed, the cathode lead 95 is pressed by the blocking disk 86, and a connection of the safety valve 84 and the cathode lead 95 is released. The disk holder 85 is made of an insulating material. When the safety valve 84 is reversed, the safety valve 84 and the blocking disk 86 are insulated.

In addition, when a gas is additionally generated inside the battery and an internal pressure of the battery further increases, a part of the safety valve 84 is broken and a gas can be discharged to the battery lid 83 side.

In addition, for example, a plurality of gas vent holes (not shown) are provided in the vicinity of the hole 86*a* of the blocking disk 86. When a gas is generated from the wound electrode body 90, the gas can be effectively discharged to the battery lid 83 side.

When a temperature increases, the positive temperature coefficient element 87 increases a resistance value, disconnects an electrical connection of the battery lid 83 and the wound electrode body 90 to block a current, and therefore prevents abnormal heat generation due to an excessive current. The gasket 88 is made of, for example, an insulating material, and has a surface to which asphalt is applied.

The wound electrode body 90 housed inside the non-aqueous electrolyte battery is wound around a center pin 94. In the wound electrode body 90, the cathode 91 and the anode 92 are sequentially laminated and wound through the separator 93 in a longitudinal direction. The cathode lead 95 is connected to the cathode 91. An anode lead 96 is connected to the anode 92. As described above, the cathode lead 95 is welded to the safety valve 84 and electrically connected to the battery lid 83, and the anode lead 96 is welded and electrically connected to the battery can 81.

FIG. 6 shows an enlarged part of the wound electrode body 90 shown in FIG. 5.

Hereinafter, the cathode 91, the anode 92, and the separator 93 will be described in detail.

[Cathode]

In the cathode 91, a cathode active material layer 91B comprising a cathode active material is formed on both surfaces of a cathode current collector 91A. As the cathode current collector 91A, for example, a metal foil such as aluminum (Al) foil, nickel (Ni) foil or stainless steel (SUS) foil, can be used.

The cathode active material layer 91B is configured to comprise one, two or more kinds of cathode materials that can occlude and release lithium as cathode active materials, and may comprise another material such as a binder or a conductive agent as necessary. Note that the same cathode active material, conductive agent and binder used in the fourth embodiment can be used.

The cathode 91 includes the cathode lead 95 connected to one end portion of the cathode current collector 91A by spot welding or ultrasonic welding. The cathode lead 95 is preferably formed of net-like metal foil, but there is no problem when a non-metal material is used as long as an electrochemically and chemically stable material is used and an electric connection is obtained. Examples of materials of the cathode lead 95 include aluminum (Al) and nickel (Ni).

[Anode]

The anode 92 has, for example, a structure in which an anode active material layer 92B is provided on both surfaces of an anode current collector 92A having a pair of opposed surfaces. Although not shown, the anode active material layer 92B may be provided only on one surface of the anode current collector 92A. The anode current collector 92A is formed of, for example, a metal foil such as copper foil.

The anode active material layer 92B is configured to comprise one, two or more kinds of anode materials that can occlude and release lithium as anode active materials, and may be configured to comprise another material such as a binder or a conductive agent, which is the same as in the cathode active material layer 91B, as necessary. Note that the same anode active material, conductive agent and binder used in the fourth embodiment can be used.

[Separator]

The separator 93 is the same as the separator 55 of the fourth embodiment.

[Non-aqueous Electrolyte Solution]

The non-aqueous electrolyte solution is the same as in the fourth embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the fourth embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B of the anode side and the deep region C of the anode side, which are only on the anode side, may be formed.

(5-2) Method of Manufacturing a Non-aqueous Electrolyte Battery (Method of Manufacturing a Cathode and Method of Manufacturing an Anode)

In the same manner as in the fourth embodiment, the cathode 91 and the anode 92 are fabricated.

(Formation of a Solid Particle Layer)

Next, paint is applied to at least one principal surface of both principal surfaces of the anode 92 by a coating method, the solvent is then removed by drying and a solid particle layer is formed. As the paint, for example, a mixture of solid particles, a binder polymer compound and a solvent can be used. On the outermost surface of the anode active material layer 92B on which the solid particle layer is applied and formed, solid particles are filtered in the recess between adjacent anode active material particles positioned on the outermost surface of the anode active material layer 92B, and a concentration of particles of the recess impregnation region A of the anode side increases. Similarly, the solid particle layer is formed on both principal surfaces of the cathode 91 by a coating method. On the outermost surface of the cathode active material layer 91B on which the solid particle layer is applied and formed, solid particles are filtered in the recess between adjacent cathode active material particles positioned on the outermost surface of the cathode active material layer 91B, and a concentration of particles of the recess impregnation region A of the cathode side increases. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval at a bottom of the recess is filled with particles having a large particle size, and solid particles can be easily filtered.

Note that, when the solid particle layer is applied and formed, if extra paint is scraped off, it is possible to prevent a distance between electrodes from extending unintentionally. In addition, by scraping a surface of the paint, more particles are sent to the recess between adjacent active material particles, and a ratio of the top coat region B decreases. Accordingly, most of the solid particles are intensively disposed in the recess impregnation region and at least one kind of the unsaturated cyclic carbonate ester represented by Formula (1) and the halogenated carbonate esters represented by Formula (2) and Formula (3) can further accumulate in the vicinity of the crack that occurs in the active material particles.

(Method of Manufacturing a Separator)

Next, the separator 93 is prepared.

(Preparation of a Non-aqueous Electrolyte Solution)

An electrolyte salt is dissolved in a non-aqueous solvent to prepare the non-aqueous electrolyte solution.

(Assembly of the Non-aqueous Electrolyte Battery)

The cathode lead 95 is attached to the cathode current collector 91A by welding and the anode lead 96 is attached to the anode current collector 92A by welding. Then, the cathode 91 and the anode 92 are wound through the separator 93 to prepare the wound electrode body 90.

A distal end portion of the cathode lead 95 is welded to the safety valve mechanism and a distal end portion of the anode lead 96 is welded to the battery can 81. Then, a winding surface of the wound electrode body 90 is inserted between a pair of insulating plates 82*a* and 82*b* and accommodated inside the battery can 81. The wound electrode body 90 is accommodated inside the battery can 81, and the non-aqueous electrolyte solution is then injected into the battery can 81 and impregnated into the separator 93. Then, at the opened end of the battery can 81, the safety valve mechanism including the battery lid 83, the safety valve 84 and the like, and the positive temperature coefficient element 87 are caulked and fixed through the gasket 88. Accordingly, the non-aqueous electrolyte battery of the present technology shown in FIG. 5 is formed.

In the non-aqueous electrolyte battery, when charge is performed, for example, lithium ions are released from the cathode active material layer 91B, and occluded in the anode active material layer 92B through the non-aqueous electrolyte solution impregnated into the separator 93. In addition, when discharge is performed, for example, lithium ions are released from the anode active material layer 92B, and occluded in the cathode active material layer 91B through the non-aqueous electrolyte solution impregnated into the separator 93.

[Modification Example 5-1]

The non-aqueous electrolyte battery according to the fifth embodiment may be fabricated as follows.

(Fabrication of a Cathode and an Anode)

First, in the same manner as in the example of the non-aqueous electrolyte battery, the cathode 91 and the anode 92 are fabricated.

(Formation of a Solid Particle Layer)

Next, paint is applied to at least one principal surface of both principal surfaces of the separator 93 by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 90 is formed.

(Heating and Pressing Process)

Before the wound electrode body 90 is accommodated inside the battery can 81, the wound electrode body 90 is put into a packaging material such as a latex tube and sealed, and subjected to warm pressing under hydrostatic pressure. Accordingly, solid particles move to the recess between adjacent anode active material particles positioned on the outermost surface of the anode active material layer 92B, and the concentration of the solid particles of the recess impregnation region A of the anode side increases. The solid particles move to the recess between adjacent cathode active material particles positioned on the outermost surface of the cathode active material layer 91B and the concentration of the solid particles of the recess impregnation region A of the cathode side increases.

Processes thereafter are the same as those in the example described above, and the desired non-aqueous electrolyte battery can be obtained.

6. Sixth Embodiment

In the sixth embodiment, a rectangular non-aqueous electrolyte battery will be described.

(6-1) Configuration of an Example of the Non-aqueous Electrolyte Battery

FIG. 7 shows a configuration of an example of the non-aqueous electrolyte battery according to the sixth embodiment. The non-aqueous electrolyte battery is a so-called rectangular battery, and a wound electrode body 120 is housed inside a rectangular exterior can 111.

The non-aqueous electrolyte battery includes the rectangular exterior can 111, the wound electrode body 120 serving as a power generation element accommodated inside the exterior can 111, a battery lid 112 configured to close an opening of the exterior can 111, an electrode pin 113 provided at substantially the center of the battery lid 112, and the like.

The exterior can 111 is formed as a hollow rectangular tubular body with a bottom using, for example, a metal having conductivity such as iron (Fe). The exterior can 111 preferably has a configuration in which, for example, nickel-plating is performed on or a conductive paint is applied to an inner surface so that conductivity of the exterior can 111 increases. In addition, an outer peripheral surface of the exterior can 111 is covered with an exterior label formed by, for example, a plastic sheet or paper, and an insulating paint may be applied thereto for protection. The battery lid 112 is made of, for example, a metal having conductivity such as iron (Fe), the same as in the exterior can 111.

The cathode and the anode are laminated and wound through the separator in an elongated oval shape, and therefore the wound electrode body 120 is obtained. Since the cathode, the anode, the separator and the non-aqueous electrolyte solution are the same as those in the fourth embodiment, detailed descriptions thereof will be omitted.

In the wound electrode body 120 having such a configuration, a plurality of cathode terminals 121 connected to the cathode current collector and a plurality of anode terminals connected to the anode current collector are provided. All of the cathode terminals 121 and the anode terminals are led out to one end of the wound electrode body 120 in an axial direction. Then, the cathode terminals 121 are connected to a lower end of the electrode pin 113 by a fixing method such as welding. In addition, the anode terminals are connected to an inner surface of the exterior can 111 by a fixing method such as welding.

The electrode pin 113 is made of a conductive shaft member, and is maintained by an insulator 114 while a head thereof protrudes from an upper end. The electrode pin 113 is fixed to substantially the center of the battery lid 112 through the insulator 114. The insulator 114 is formed of a high insulating material, and is engaged with a through-hole 115 provided at a surface side of the battery lid 112. In addition, the electrode pin 113 passes through the through-hole 115, and a distal end portion of the cathode terminal 121 is fixed to a lower end surface thereof.

The battery lid 112 to which the electrode pin 113 or the like is provided is engaged with the opening of the exterior can 111, and a contact surface of the exterior can 111 and the battery lid 112 are bonded by a fixing method such as welding. Accordingly, the opening of the exterior can 111 is sealed by the battery lid 112 and is in an air tight and liquid tight state. At the battery lid 112, an internal pressure release mechanism 116 configured to release (dissipate) an internal pressure to the outside by breaking a part of the battery lid 112 when a pressure inside the exterior can 111 increases to a predetermined value or more is provided.

The internal pressure release mechanism 116 includes two first opening grooves 116*a* (one of the first opening grooves 116*a* is not shown) that linearly extend in a longitudinal direction on an inner surface of the battery lid 112 and a second opening groove 116*b* that extends in a width direction perpendicular to a longitudinal direction on the same inner surface of the battery lid 112 and whose both ends communicate with the two first opening grooves 116*a*. The two first opening grooves 116*a* are provided in parallel to each other along a long side outer edge of the battery lid 112 in the vicinity of an inner side of two sides of a long side positioned to oppose the battery lid 112 in a width direction. In addition, the second opening groove 116*b* is provided to be positioned at substantially the center between one short side outer edge in one side in a longitudinal direction of the electrode pin 113 and the electrode pin 113.

The first opening groove 116*a* and the second opening groove 116*b* have, for example, a V-shape whose lower surface side is opened in a cross sectional shape. Note that the shape of the first opening groove 116*a* and the second opening groove 116*b* is not limited to the V-shape shown in this embodiment. For example, the shape of the first opening groove 116*a* and the second opening groove 116*b* may be a U-shape or a semicircular shape.

An electrolyte solution inlet 117 is provided to pass through the battery lid 112. After the battery lid 112 and the exterior can 111 are caulked, the electrolyte solution inlet 117 is used to inject the non-aqueous electrolyte solution, and is sealed by a sealing member 118 after the non-aqueous electrolyte solution is injected. For this reason, when gel electrolytes are formed between the separator and each of the cathode and the anode in advance to fabricate the wound electrode body, the electrolyte solution inlet 117 and the sealing member 118 may not be provided.

[Separator]

As the separator, the same separator as in the fourth embodiment is used.

[Non-aqueous Electrolyte Solution]

The non-aqueous electrolyte solution is the same as in the fourth embodiment (Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the fourth embodiment. That is, the impregnation region A of the anode side, the top coat region B of the anode side, and the deep region C of the anode side are formed. The impregnation region A of the cathode side, the top coat region B of the cathode side, and the deep region C of the cathode side are formed. Note that the impregnation region A of the anode side, the top coat region B and the deep region C, which are only on the anode side, may be formed.

(6-2) Method of Manufacturing a Non-aqueous Electrolyte Battery

The non-aqueous electrolyte battery can be manufactured, for example, as follows.

[Method of Manufacturing a Cathode and an Anode]

The cathode and the anode can be fabricated by the same method as in the fourth embodiment.

(Formation of a Solid Particle Layer)

Next, paint is applied to at least one principal surface of both principal surfaces of the anode by a coating method, the solvent is then removed by drying and a solid particle layer is formed. As the paint, for example, a mixture of solid particles, a binder polymer compound and a solvent can be used. On the outermost surface of the anode active material layer on which the solid particle layer is applied and formed, solid particles are filtered in the recess between adjacent anode active material particles positioned on the outermost surface of the anode active material layer, and a concentration of particles of the recess impregnation region A of the anode side increases. Similarly, the solid particle layer is formed on both principal surfaces of the cathode 91 by a coating method. On the outermost surface of the cathode active material layer on which the solid particle layer is applied and formed, solid particles are filtered in the recess between adjacent cathode active material particles positioned on the outermost surface of the cathode active material layer, and a concentration of particles of the recess impregnation region A of the cathode side increases. Solid particles having a particle size D95 that is adjusted to be a predetermined times a particle size D50 of active materials or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of solid particles of the top coat region B decreases. Accordingly, most of the solid particles are intensively disposed in the recess impregnation region, and at least one kind of the unsaturated cyclic carbonate ester represented by Formula (1) and the halogenated carbonate esters represented by Formula (2) and Formula (3) can further accumulate in the vicinity of the crack that occurs in the active material particles.

(Assembly of the Non-aqueous Electrolyte Battery)

The cathode, the anode, and the separator (in which a particle-comprising resin layer is formed on at least one surface of a base material) are sequentially laminated and wound to fabricate the wound electrode body 120 that is wound in an elongated oval shape. Next, the wound electrode body 120 is housed in the exterior can 111.

Then, the electrode pin 113 provided in the battery lid 112 and the cathode terminal 121 led out from the wound electrode body 120 are connected. Also, although not shown, the anode terminal led out from the wound electrode body 120 and the battery can are connected. Then, the exterior can 111 and the battery lid 112 are engaged, the non-aqueous electrolyte solution is injected though the electrolyte solution inlet 117, for example, under reduced pressure and sealing is performed by the sealing member 118. In this manner, the non-aqueous electrolyte battery can be obtained.

[Modification Example 6-1]

The non-aqueous electrolyte battery according to the sixth embodiment may be fabricated as follows.

(Fabrication of a Cathode and an Anode)

First, in the same manner as in the example of the non-aqueous electrolyte battery, the cathode and the anode are fabricated.

(Formation of a Solid Particle Layer)

Next, paint is applied to at least one principal surface of both principal surfaces of the separator by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 120 is formed. Next, before the wound electrode body 120 is housed inside the exterior can 111, the wound electrode body 120 is put into a packaging material such as a latex tube and sealed, and subjected to warm pressing under hydrostatic pressure. Accordingly, solid particles move (are pushed) to the recess between adjacent anode active material particles positioned on the outermost surface of the anode active material layer, and the concentration of the solid particles of the recess impregnation region A of the anode side increases. The solid particles move to the recess between adjacent cathode active material particles positioned on the outermost surface of the cathode active material layer, and the concentration of the solid particles of the recess impregnation region A of the cathode side increases.

Then, similarly to the example described above, the desired non-aqueous electrolyte battery can be obtained.

<Seventh Embodiment to Ninth Embodiment>

(Overview of the Present Technology)

First, in order to facilitate understanding of the present technology, an overview of the present technology will be described. As will be described below, a capacity and rapid charge performance (a rapid charging characteristic) have a trade-off relation. When performance of one improves, performance of the other decreases. For this reason, it is difficult to obtain a battery having both excellent capacity and rapid charging characteristic performance.

For example, the rapid charge performance can be compensated for by reducing a resistance with a thinner electrode mixture layer. On the other hand, in this case, since a ratio of the foil (the current collector) or the separator that does not contribute to the capacity becomes higher, it serves as a factor that reduces the capacity.

Pores between electrodes or in the separator have a large volume, and do not control a rate of ion permeability during rapid charging. However, since an inside of the mixture layer is narrow, ions are saturated and congested in the vicinity of an exit of the gap in a cathode surface layer during charging, and ions are likely to be depleted in the anode. In particular, an amount and a speed of ions that can pass through a bottom of the recess between adjacent active material particles, which is the vicinity of the exit from which lithium ions come out, become rate limiting factors. When an amount and a speed of ions are insufficient, an internal resistance increases, a voltage reaches a predetermined level, and charging is stopped. A constant current charge is not sustainable, and the original capacity is only partially charged within a predetermined time. When a concentration of ions increases, it is possible to address ion depletion, but there is a problem in that a movement speed of ions decreases.

Ions around which electrolyte solvent molecules are coordinated remain in a dissolved state. However, when a concentration of ions increases, since a concentration of ligands also increases and the ligands accumulate and easily form a cluster, a speed decreases. In addition, the cluster of ligands incorporates free molecules of the main solvent into the cluster, captures a solvent in which original ions are dissolved, and a concentration of ions decreases.

The inventors have conducted extensive studies and found that, when the sulfinyl or sulfonyl compounds represented by Formula (1A) to Formula (8A) to be described below are added to electrolytes, one of molecules of the main solvent to be coordinated is substituted, a repulsive force between clusters is generated, and the clusters can be disintegrated. However, there is a problem in that the ligand has a high resistance to a charge and discharge reaction between active materials and is difficult to be coordinated at low concentrations.

The inventors have conducted further extensive studies and found that, when specific solid particles are disposed in the recess between adjacent active material particles, the sulfinyl or sulfonyl compounds represented by Formula (1A) to Formula (8A) to be described below are concentrated at the recess, the cluster of ion ligands is disintegrated, and it is possible to supply ions to a gap of an electrode mixture at a high concentration and a high speed.

Inside the mixture layer, ions are consumed, a concentration of ions decreases, a cluster of ion ligands are hardly formed, and ions become distant from solid particles. Therefore, a resistance caused by detached additive molecules during charging and discharging is eliminated.

In the present technology, by disposing solid particles in the recess part between adjacent active material particles, since a solvent of the additive, which has an effect of disintegrating a cluster of ion ligands, can be intensively disposed in a necessary part at a necessary minimum amount, it is possible to supply ions to a deep side of the electrode at a high concentration and high speed. Also, it is possible to provide a battery that can be used without increasing a resistance and provide a high capacity even when rapid charge is performed.

In addition, by disposing solid particles in the recess, the diffusion of ions into the electrode is accelerated. In a part other than the recess, ions form ligands with the main solvent again, and can contribute to a charge and discharge reaction.

The effect obtained when solid particles are disposed can be obtained not only in the anode, but also the effect can be obtained by disposing solid particles in the recess of the cathode serving as the exit for most lithium ions generated during charging. It is possible to obtain the effect when solid particles are disposed in only the anode, only the cathode, and both of the cathode and the anode.

Hereinbelow, embodiments of the present technology are described with reference to the drawings. The description is given in the following order.

7. Seventh embodiment (example of a laminated film-type battery)
8. Eighth embodiment (example of a cylindrical battery)
9. Ninth embodiment (example of a rectangular battery)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

7. Seventh Embodiment

In a seventh embodiment of the present technology, an example of a laminated film-type battery is described. The battery is, for example, a non-aqueous electrolyte battery, a secondary battery in which charging and discharging are possible, or a lithium-ion secondary battery.

(7-1) Configuration Example of the Non-aqueous Electrolyte Battery

FIG. 1 shows the configuration of a non-aqueous electrolyte battery according to the seventh embodiment. The non-aqueous electrolyte battery is of what is called a laminated film type; and in the battery, a wound electrode body 50 equipped with a cathode lead 51 and an anode lead 52 is housed in a film-shaped package member 60.

Each of the cathode lead 51 and the anode lead 52 is led out from the inside of the package member 60 toward the outside in the same direction, for example. The cathode lead 51 and the anode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the cathode lead 51 and the anode lead 52 for the purpose of increasing the adhesion between the inner resin layer of the package member 60 and each of the cathode lead 51 and the anode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

FIG. 2 shows a cross-sectional structure along line I-I of the wound electrode body 50 shown in FIG. 1. As shown in FIG. 1, the wound electrode body 50 is a body in which a band-like cathode 53 and a band-like anode 54 are stacked and wound via a band-like separator 55 and an electrolyte layer 56, and the outermost peripheral portion is protected by a protection tape 57 as necessary.

(Cathode)

The cathode 53 has a structure in which a cathode active material layer 53B is provided on one surface or both surfaces of a cathode current collector 53A.

The cathode 53 is an electrode in which the cathode active material layer 53B comprising a cathode active material is formed on both surfaces of the cathode current collector 53A. As the cathode current collector 53A, for example, a metal foil such as aluminum (Al) foil, nickel (Ni) foil, or stainless steel (SUS) foil may be used.

The cathode active material layer 53B is configured to comprise, for example, a cathode active material, an electrically conductive agent, and a binder. As the cathode active material, one or more cathode materials that can occlude and release lithium may be used, and another material such as a binder or an electrically conductive agent may be comprised as necessary.

As the cathode material that can occlude and release lithium, for example, a lithium-comprising compound is preferable. This is because a high energy density is obtained. As the lithium-comprising compound, for example, a composite oxide comprising lithium and a transition metal element, a phosphate compound comprising lithium and a transition metal element, or the like is given. Of them, a material comprising at least one of the group consisting of cobalt (Co), nickel (Ni), manganese (Mn), and iron (Fe) as a transition metal element is preferable. This is because a higher voltage is obtained.

As the cathode material, for example, a lithium-comprising compound expressed by $Li_xM1O_2$ or $Li_yM2PO_4$ may be used. In the formula, M1 and M2 represent one or more transition metal elements. The values of x and y vary with the charging and discharging state of the battery, and are usually $0.05 \leq x \leq 1.10$ and $0.05 \leq y \leq 1.10$. As the composite oxide comprising lithium and a transition metal element, for example, a lithium cobalt composite oxide ($Li_xCoO_2$), a lithium nickel composite oxide ($Li_xNiO_2$), a lithium nickel cobalt composite oxide ($Li_xNi_{1-z}CoO_2(0<z<1)$), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}Ni_tO_4$ ($0<t<2$)) having the spinel structure, or the like is given. Of them, a composite oxide comprising cobalt is preferable. This is because a high capacity is obtained and also excellent cycle characteristics are obtained. As the phosphate compound comprising lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-comprising compounds mentioned above is coated with minute particles made of another of the lithium-comprising compounds may be used.

Other than these, as the cathode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not comprising lithium such as niobium diselenide ($NbSe_2$) (in particular, a layered compound or a spinel-type compound), and a lithium-comprising compound comprising lithium, and also an electrically conductive polymer such as sulfur, polyaniline, polythiophene, polyacetylene, or polypyrrole are given. The cathode material that can occlude and release lithium may be a material other than the above as a matter of course. The cathode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The cathode 53 includes a cathode lead 51 connected to an end portion of the cathode current collector 53A by spot welding or ultrasonic welding. The cathode lead 51 is preferably formed of net-like metal foil, but there is no problem when a non-metal material is used as long as an electrochemically and chemically stable material is used and an electric connection is obtained. Examples of materials of the cathode lead 51 include aluminum (Al), nickel (Ni), and the like.

(Anode)

The anode 54 has a structure in which an anode active material layer 54B is provided on one of or both surfaces of an anode current collector 54A, and is disposed such that the anode active material layer 54B is opposed to the cathode active material layer 53B.

Although not shown, the anode active material layer 54B may be provided only on one surface of the anode current collector 54A. The anode current collector 54A is formed of, for example, a metal foil such as copper foil.

The anode active material layer 54B is configured to comprise, as the anode active material, one or more anode materials that can occlude and release lithium, and may be configured to comprise another material such as a binder or an electrically conductive agent similar to that of the cathode active material layer 53B, as necessary.

In the non-aqueous electrolyte battery, the electrochemical equivalent of the anode material that can occlude and release lithium is set larger than the electrochemical equivalent of the cathode 53, and theoretically lithium metal is prevented from being precipitated on the anode 54 in the course of charging.

In the non-aqueous electrolyte battery, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the anode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the cathode active material is the same; and thus the amounts of the cathode active material and the anode active material are adjusted accordingly. Thereby, a high energy density is obtained.

As the anode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another anode material that can occlude and release lithium and can be increased in capacity, a material that can occlude and release lithium and comprises at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The anode material may be a simple substance, an alloy, or a compound of a metal element or a semi-metal element, or may be a material that includes a phase of one or more of them at least partly. Note that in the present technology, the alloy includes a material formed with two or more kinds of metal elements and a material comprising one or more kinds of metal elements and one or more kinds of semi-metal elements. Further, the alloy may comprise a non-metal element. Examples of its texture include a solid solution, a eutectic (eutectic mixture), an intermetallic compound, and one in which two or more kinds thereof coexist.

Examples of the metal element or semi-metal element comprised in this anode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the anode material, it is preferable to use a material comprising, as a constituent element, a metal element or a semi-metal element of 4B group in the short periodical table. It is more preferable to use a material comprising at least one of silicon (Si) and tin (Sn) as a constituent element. It is even more preferable to use a material comprising at least silicon. This is because silicon (Si) and tin (Sn) each have a high capability of occluding and releasing lithium, so that a high energy density can be obtained. Examples of the anode material comprising at least one of silicon and tin include a simple substance, an alloy, or a compound of silicon, a simple substance, an alloy, or a compound of tin, and a material comprising, at least partly, a phase of one or more kinds thereof.

Examples of the alloy of silicon include alloys comprising, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys comprising, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds comprising oxygen (O) or carbon (C), which may comprise any of the above-described second constituent elements in addition to tin (Sn) or silicon (Si).

Among them, as the anode material, an SnCoC-comprising material is preferable which comprises cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-comprising material may also comprise another constituent element as necessary. For example, it is preferable to comprise, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be comprised. This is because the capacity characteristics or cycling characteristics can be further increased.

Note that the SnCoC-comprising material has a phase comprising tin (Sn), cobalt (Co), and carbon (C), and this phase preferably has a low crystalline structure or an amorphous structure. Further, in the SnCoC-comprising material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-comprising material appears in a region lower than 284.5 eV, at least a part of carbon comprised in the SnCoC-comprising material is bound to a metal element or a semi-metal element, which is another constituent element In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-comprising material, the peak of the surface contamination carbon and the peak of the carbon in the SnCoC-comprising material are separated from each other by means of analysis using, for example, a commercially available software program. In the analysis of the waveform, the position of a main peak existing on the lowest binding energy side is used as an energy reference (284.8 eV).

As the anode material that can occlude and release lithium, for example, also a metal oxide, a polymer compound, or other materials that can occlude and release lithium are given. As the metal oxide, for example, a lithium titanium oxide comprising titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

(Separator)

The separator 55 is a porous membrane formed of an insulating membrane that has a large ion permeability and a prescribed mechanical strength. A non-aqueous electrolyte solution is retained in the pores of the separator 55.

As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material comprising a porous membrane made of a polyolefin resin has good separability between the cathode 53 and the anode 54, and can further reduce the possibility of an internal short circuit.

Any thickness can be set as the thickness of the separator 55 to the extent that it is not less than the thickness that can keep necessary strength. The separator 55 is preferably set to such a thickness that the separator 55 provides insulation between the cathode 53 and the anode 54 to prevent a short circuit etc., has ion permeability for producing battery reaction via the separator 55 favorably, and can make the volumetric efficiency of the active material layer that contributes to battery reaction in the battery as high as possible. Specifically, the thickness of the separator 55 is preferably not less than 4 μm and not more than 20 μm, for example.

(Electrolyte Layer)

The electrolyte layer 56 includes a matrix polymer compound, a non-aqueous electrolyte solution and solid particles. The electrolyte layer 56 is a layer in which the non-aqueous electrolyte solution is retained by, for example, the matrix polymer compound, and is, for example, a layer formed of so-called gel-like electrolytes. Note that the solid particles may be comprised inside the anode active material layer 54B and/or inside a cathode active material layer 53B. In addition, while details will be described in the following modification examples, a non-aqueous electrolyte solution, which comprises liquid electrolytes, may be used in place of the electrolyte layer 56. In this case, the non-aqueous electrolyte battery includes a wound body having a configuration in which the electrolyte layer 56 is removed from the wound electrode body 50 in place of the wound electrode body 50. The wound body is impregnated with the non-aqueous electrolyte solution, which comprises liquid electrolytes filled in the package member 60.

(Matrix Polymer Compound)

A resin having the property of compatibility with the solvent, or the like may be used as the matrix polymer compound (resin) that retains the electrolyte solution. As such a matrix polymer compound, a fluorine-comprising resin such as polyvinylidene difluoride or polytetrafluoroethylene, a fluorine-comprising rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C.

or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

(Non-aqueous Electrolyte Solution)

The non-aqueous electrolyte solution comprises an electrolyte salt, a non-aqueous solvent in which the electrolyte salt is dissolved, and an additive.

(Electrolyte Salt)

The electrolyte salt comprises, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

(Non-aqueous Solvent)

As the non-aqueous solvent, for example, a lactone-based solvent such as γ-butyrolactone, γ-valerolactone, δ-valerolactone or ε-caprolactone, a carbonate ester-based solvent such as ethylene carbonate, propylene carbonate, butylene carbonate, vinylene carbonate, dimethyl carbonate, ethyl methyl carbonate or diethyl carbonate, an ether-based solvent such as 1,2-dimethoxyethane, 1-ethoxy-2-methoxy ethane, 1,2-diethoxyethane, tetrahydrofuran or 2-methyltetrahydrofuran, a nitrile-based solvent such as acetonitrile, a sulfolane-based solvent, a phosphoric acids solvent, a phosphate ester solvent, or a non-aqueous solvent such as a pyrrolidone may be used. As the solvent, any one kind may be used alone or a mixture of two or more kinds may be used.

(Additive)

The non-aqueous electrolyte solution comprises at least one kind of the sulfinyl or sulfonyl compounds represented by the following Formula (1A) to Formula (8A). The sulfinyl or sulfonyl compound refers to a chain or cyclic compound that includes one or two sulfinyl groups (—S(═O)—) or one or two sulfonyl groups (—S(═O)$_2$—). Note that, among such sulfinyl or sulfonyl compounds, a compound having more structures of S═O tends to have a stronger reaction with solid particles, and a compound having a smaller molecular weight tends to have a more excellent effect, which are preferable.

[Chem. 10]

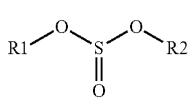
(1A)

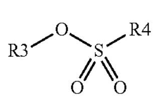
(2A)

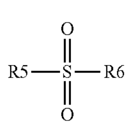
(3A)

-continued

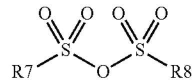
(4A)

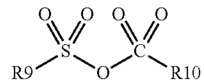
(5A)

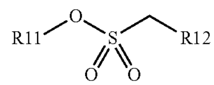
(6A)

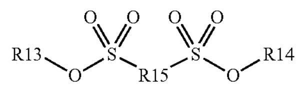
(7A)

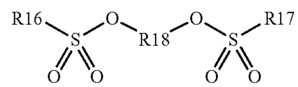
(8A)

(R1 to R14, R16 and R17 each independently represent a monovalent hydrocarbon group or a monovalent halogenated hydrocarbon group, and R15 and R18 each independently represent a divalent hydrocarbon group or a divalent halogenated hydrocarbon group. Any two or more of R1 and R2, R3 and R4, R5 and R6, R7 and R8, R9 and R10, R11 and R12, and R13 to R15 or any two or more of R16 to R18 may be bound to each other.)

Formula (1A) shows a state in which R1 and R2 of both terminals are not bound to each other, that is, a sulfinyl compound is a chain type. However, R1 and R2 are bound to form a ring so that a sulfinyl compound may be a cyclic type. This is the same as in the sulfinyl or sulfonyl compounds represented by Formula (2A) to Formula (8A).

The term "hydrocarbon group" generally refers to a group including carbon and hydrogen, and may be a straight type or a branched type having one, two or more side chains. The monovalent hydrocarbon group is, for example, an alkyl group having 1 to 12 carbon atoms, an alkenyl group having 2 to 12 carbon atoms, an alkynyl group having 2 to 12 carbon atoms, an aryl group having 6 to 18 carbon atoms, or a cycloalkyl group having 3 to 18 carbon atoms. The divalent hydrocarbon group is, for example, an alkylene group having 1 to 3 carbon atoms.

More specifically, the alkyl group is, for example, a methyl group (—$CH_3$), an ethyl group (—$C_2H_5$) or a propyl group (—$C_3H_7$). The alkenyl group is, for example, a vinyl group (—CH═$CH_2$) or an allyl group (—$CH_2$—CH═$CH_2$). The alkynyl group is, for example, an ethynyl group (—C≡CH). The aryl group is, for example, a phenyl group, or a benzyl group. The cycloalkyl group is, for example, a cyclopropyl group, a cyclobutyl group, a cyclopentyl group, a cyclohexyl group, a cycloheptyl group or a cyclooctyl group. The alkylene group is, for example, a methylene group (—$CH_2$—).

The term "monovalent halogenated hydrocarbon group" refers to a group in which at least some hydrogen groups (—H) of the above monovalent hydrocarbon group are substituted with a halogen group (halogenated), and a kind of the halogen group is the same as described above. The term "divalent halogenated hydrocarbon group" refers to a group in which at least some hydrogen groups (—H) of the above divalent hydrocarbon group are substituted with a halogen group (halogenated).

More specifically, a group in which an alkyl group is halogenated is, for example, a trifluoromethyl group (—$CF_3$) or a pentafluoroethyl group (—$C_2F_5$). A group in which an alkylene group is halogenated is, for example, a difluoromethylene group (—$CF_2$—).

Here, specific examples of the sulfinyl or sulfonyl compound are represented by the following Formula (1A-1) to Formula (1A-10), Formula (2A-1) to Formula (2A-6), Formula (3A-1) to Formula (3A-5), Formula (4A-1) to Formula (4A-17), Formula (5A-1) to Formula (5A-18), Formula (6A-1) to Formula (6A-9), and Formula (7A-1) to Formula (7A-14). However, the specific examples of the sulfinyl or sulfonyl compound are not limited to the following listed examples.

[Chem. 11]

(1A-1)

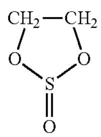

(1A-2)

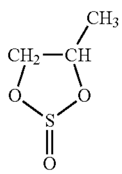

(1A-3)

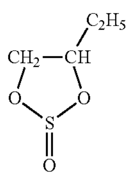

(1A-4)

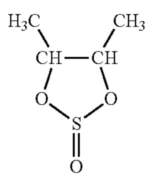

(1A-5)

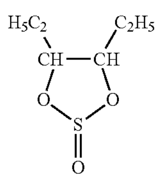

(1A-6)

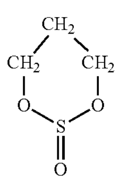

(1A-7)

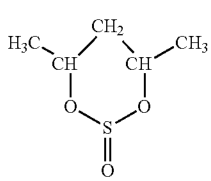

-continued (1A-8)

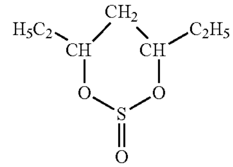

(1A-9)

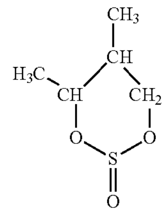

(1A-10)

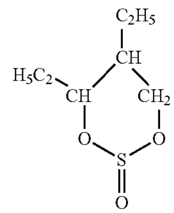

(2A-1)

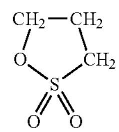

(2A-2)

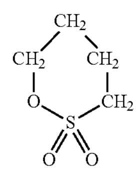

(2A-3)

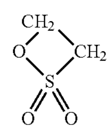

(2A-4)

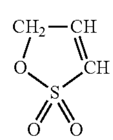

(2A-5)

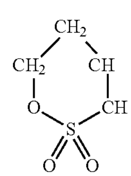

(2A-6)

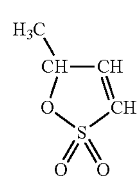

-continued
(3A-1)
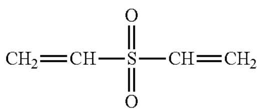
(3A-2)
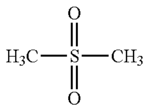
(3A-3)
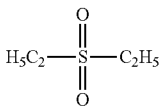
(3A-4)
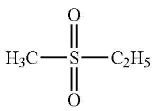
(3A-5)
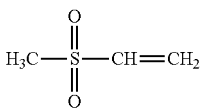
(4A-1)
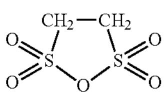
(4A-2)
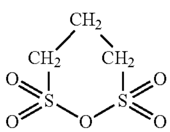
(4A-3)
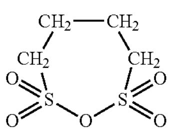
(4A-4)
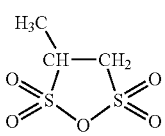
(4A-5)
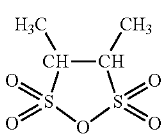
(4A-6)
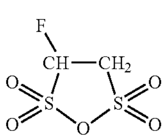
(4A-7)
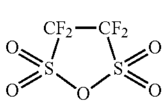
-continued
(4A-8)
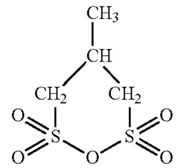
(4A-9)
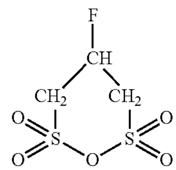
(4A-10)
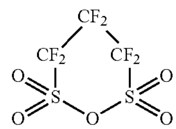
(4A-11)
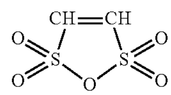
(4A-12)
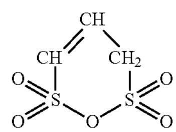
(4A-13)
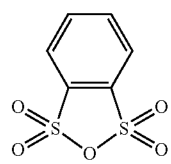
(4A-14)
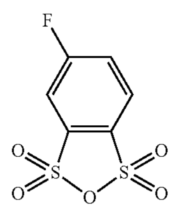
(4A-15)
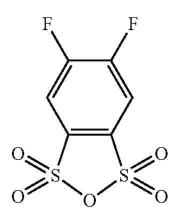
(4A-16)
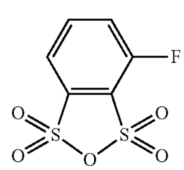

-continued
(4A-17)
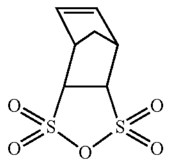
(5A-1)
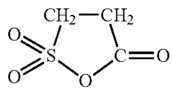
(5A-2)
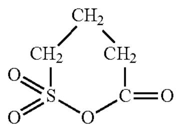
(5A-3)
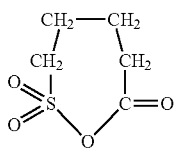
(5A-4)
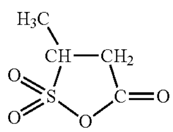
(5A-5)
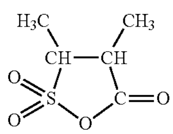
(5A-6)
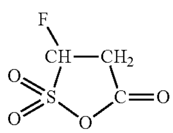
(5A-7)
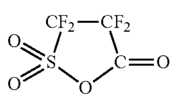
(5A-8)
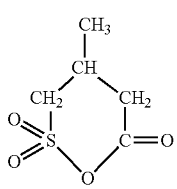
(5A-9)
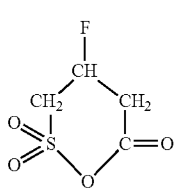
(5A-10)
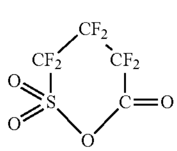
-continued
(5A-11)
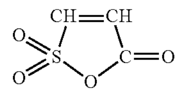
(5A-12)
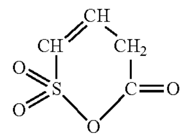
(5A-13)
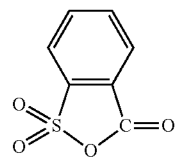
(5A-14)
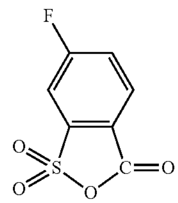
(5A-15)
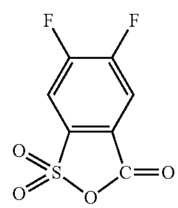
(5A-16)
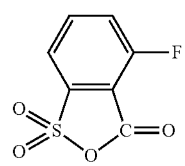
(5A-17)
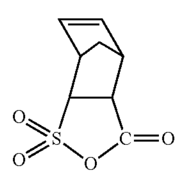
(5A-18)
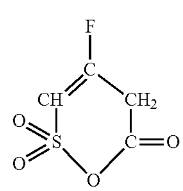
(6A-1)
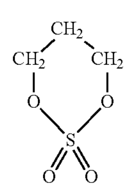

-continued
(6A-2)
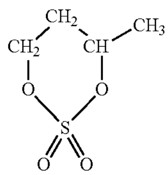
(6A-3)
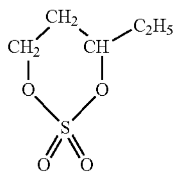
(6A-4)
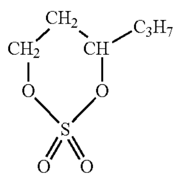
(6A-5)
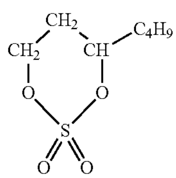
(6A-6)
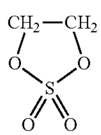
(6A-7)
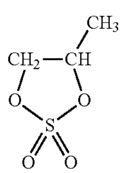
(6A-8)
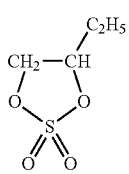
(6A-9)
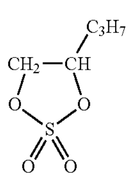
(7A-1)
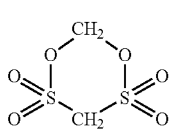
-continued
(7A-2)
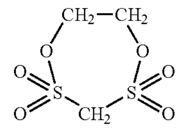
(7A-3)
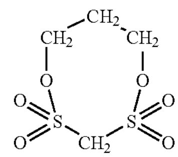
(7A-4)
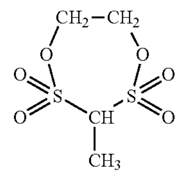
(7A-5)
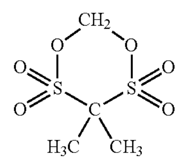
(7A-6)
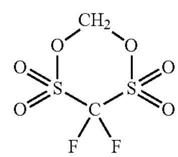
(7A-7)
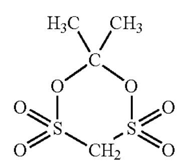
(7A-8)
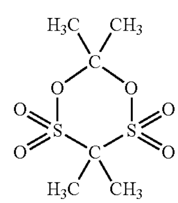
(7A-9)
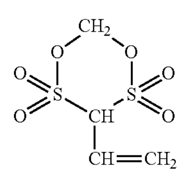
(7A-10)
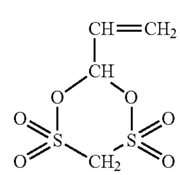

-continued (7A-11)

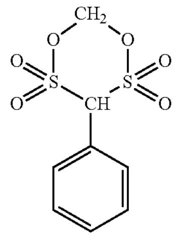

(7A-12)

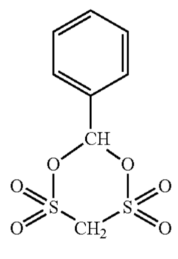

(7A-13)

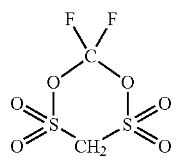

(7A-14)

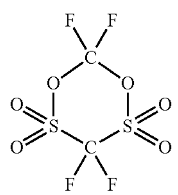

(Content of a Sulfinyl or Sulfonyl Compound)

In view of obtaining a more excellent effect, with respect to the non-aqueous electrolyte solution, as a content of the sulfinyl or sulfonyl compounds represented by Formula (1A) to Formula (8A), 0.01 mass % or more and 10 mass % or less is preferable, 0.02 mass % or more and 9 mass % or less is more preferable, and 0.03 mass % or more and 8 mass % or less is most preferable.

(Solid Particles)

As the solid particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide ($Al(OH)_3$, (bayerite or gibbsite)), zinc hydroxide ($Zn(OH)_2$), or the like, an oxide hydroxide or a hydrated oxide such as boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), or magnesium oxide hydrate ($MgO_a.mH_2O$ (a=0.8 to 1.2, m=0.5 to 10)), a hydroxide hydrate such as magnesium hydroxide octahydrate, or the like may be preferably used. As the metal carbide, boron carbide ($B_4C$) or the like may be preferably used. As the metal nitride, silicon nitride ($Si_3N_4$), boron nitride (BN), aluminum nitride (AlN), titanium nitride (TiN), or the like may be preferably used.

As the metal fluoride, lithium fluoride (LiF), aluminum fluoride ($AlF_3$), calcium fluoride ($CaF_2$), barium fluoride ($BaF_2$), magnesium fluoride, or the like may be preferably used. As the phosphate compound, trilithium phosphate ($Li_3PO_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ($[SiO_4]^{4-}$). As the nesosilicate mineral, one that falls under olivines or garnets, or the like is given. As the nesosilicate mineral, more specifically, an olivine (a continuous solid solution of $Mg_2SiO_4$ (forsterite) and $Fe_2SiO_4$ (fayalite)), magnesium silicate (forsterite, $Mg_2SiO_4$), aluminum silicate ($Al_2SiO_5$; sillimanite, andalusite, or kyanite), zinc silicate (willemite, $Zn_2SiO_4$), zirconium silicate (zircon, $ZrSiO_4$), mullite ($3Al_2O_3.2SiO_2$ to $2Al_2O_3.SiO_2$), or the like is given.

The sorosilicate mineral is a group-structured silicate mineral formed of composite bond groups of Si—O tetrahedrons ($[Si_2O_7]^{6-}$ or $[Si_5O_{16}]^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ($[Si_3O_9]^{6-}$, $[Si_4O_{12}]^{8-}$, or $[Si_6O_{18}]^{12-}$). As the cyclosilicate mineral, beryl, tourmalines, or the like is given.

The inosilicate mineral is a fibrous silicate mineral having a chain-like form ($[Si_2O_6]^{4-}$) and a band-like form ($[Si_3O_9]^{6-}$, $[Si_4O_{11}]^{6-}$, $[Si_5O_{15}]^{10-}$, or $[Si_7O_{21}]^{14-}$) in which the linkage of Si—O tetrahedrons extends infinitely. As the inosilicate mineral, for example, one that falls under pyroxenes such as calcium silicate (wollastonite, $CaSiO_3$), one that falls under amphiboles, or the like is given.

The layered silicate mineral is a layer-like silicate mineral having network bonds of Si—O tetrahedrons ($[SiO_4]^{4-}$). Specific examples of the layered silicate mineral are described later.

The tectosilicate mineral is a silicate mineral of a three-dimensional network structure in which Si—O tetrahedrons ($[SiO_4]^{4-}$) form three-dimensional network bonds. As the tectosilicate mineral, quartz, feldspars, zeolites, or the like, an aluminosilicate ($aM_2O.bAl_2O_3.cSiO_2.dH_2O$; M being a metal element; a, b, c, and d each being an integer of 1 or more) such as a zeolite ($M_{2/n}O.Al_2O_3.xSiO_2.yH_2O$; M being a metal element; n being the valence of M; x≥2; y≥0), or the like is given.

As the asbestos, chrysotile, amosite, anthophyllite, or the like is given.

As the carbonate mineral, dolomite ($CaMg(CO_3)_2$), hydrotalcite ($Mg_6Al_2(CO_3)(OH)_{16}.4(H_2O)$), or the like is given.

As the oxide mineral, spinel ($MgAl_2O_4$) or the like is given.

As other minerals, strontium titanate ($SrTiO_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral comprises a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite ($Al_2Si_2O_5(OH)_4$), dickite, or the like is given. As one that falls under the pyrophyllite-talc group, for example, talc ($Mg_3Si_4O_{10}(OH)_2$), willemseite, pyrophyllite ($Al_2Si_4O_{10}(OH)_2$), or the like is given. As one that falls under the smectite group, for example, saponite $[(Ca/2,Na)_{0.33}(Mg,Fe^{2+})_3(Si,Al)_4O_{10}(OH)_2.4H_2O]$, hectorite, sauconite, montmorillonite {$(Na,Ca)_{0.33}(Al,Mg)2Si_4O_{10}(OH)_2.nH_2O$; a clay comprising montmorillonite as a main component is called bentonite}, beidellite, nontronite, or the like is given. As one that falls under the mica group, for example, muscovite ($KAl_2(AlSi_3)O_{10}(OH)_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite ($Mg_9Si_{12}O_{30}(OH)_6(OH_2)_4.6H_2O$), palygorskite, or the like is given.

As other silicate minerals, a porous aluminosilicate such as a zeolite ($M_{2/n}O.Al_2O_3.xSiO_2.yH_2O$; M being a metal element; n being the valence of M; x≥2; y≥0), attapulgite $[(Mg,Al)2Si_4O_{10}(OH).6H_2O]$, or the like is given.

As the layered carbonate mineral, hydrotalcite ($Mg_6Al_2(CO_3)(OH)_{16}.4(H_2O)$) or the like is given.

As the amorphous or quasicrystalline clay mineral, hisingerite, imogolite ($Al_2SiO_3(OH)$), allophane, or the like is given.

These inorganic particles may be used singly, or two or more of them may be mixed for use. The inorganic particle has also oxidation resistance; and when the electrolyte layer 56 is provided between the cathode 53 and the separator 55, the inorganic particle has strong resistance to the oxidizing environment near the cathode during charging.

The solid particle may be also an organic particle. As the material that forms the organic particle, melamine, melamine cyanurate, melamine polyphosphate, cross-linked polymethyl methacrylate (cross-linked PMMA), polyolefin, polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

In view of obtaining a more excellent effect, among such solid particles, particles of boehmite, aluminum hydroxide, magnesium hydroxide, and a silicate salt are preferable. In such solid particles, a deviation in the battery due to —O—H arranged in a sheet form in the crystal structure strongly selectively attracts the additive. Accordingly, it is possible to intensively accumulate the additive at the recess between active material particles more effectively.

(Configuration of an Inside of a Battery)

FIG. 3A and FIG. 3B are schematic cross-sectional views of an enlarged part of an inside of the non-aqueous electrolyte battery according to the seventh embodiment of the present technology. Note that the binder, the conductive agent and the like comprised in the active material layer are not shown.

As shown in FIG. 3A, the non-aqueous electrolyte battery according to the seventh embodiment of the present technology has a configuration in which particles 10, which are the solid particles described above, are disposed between the separator 55 and the anode active material layer 54B and inside the anode active material layer 54B at an appropriate concentration in appropriate regions. In such a configuration, three regions divided into a recess impregnation region A of an anode side, a top coat region B of an anode side and a deep region C of an anode side are formed.

Also, similarly, as shown in FIG. 3B, the non-aqueous electrolyte battery according to the seventh embodiment of the present technology has a configuration in which particles 10, which are the solid particles described above, are disposed between the separator 55 and the cathode active material layer 53B and inside the cathode active material layer 53B at an appropriate concentration in appropriate regions. In such a configuration, three regions divided into a recess impregnation region A of a cathode side, a top coat region B of a cathode side and a deep region C of a cathode side are formed.

(Recess Impregnation Region A, Top Coat Region B, and Deep Region C)

For example, the recess impregnation regions A of the anode side and the cathode side, the top coat regions B of the anode side and the cathode side, and the deep regions C of the anode side and the cathode side are formed as follows.

(Recess Impregnation Region A)

(Recess Impregnation Region of an Anode Side)

The recess impregnation region A of the anode side refers to a region including a recess between the adjacent anode active material particles 11 positioned on the outermost surface of the anode active material layer 54B comprising the anode active material particles 11 serving as anode active materials. The recess impregnation region A is impregnated with the particles 10 and electrolytes comprising the sulfinyl or sulfonyl compounds represented by Formula (1A) to Formula (8A). Accordingly, the recess impregnation region A of the anode side is filled with the electrolytes comprising the sulfinyl or sulfonyl compounds represented by Formula (1A) to Formula (8A). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the anode active material particles 11 inside a region between two parallel lines L1 and L2 shown in FIG. 3A is classified as the recess impregnation region A of the anode side including the recess in which the electrolytes and the particles 10 are disposed. The two parallel lines L1 and L2 are drawn as follows. Within a predetermined visual field width (typically, a visual field width of 50 μm) shown in FIG. 3A, cross sections of the separator 55, the anode active material layer 54B, and a region between the separator 55 and the anode active material layer 54B are observed. In this observation field of view, the two parallel lines L1 and L2 perpendicular to a thickness direction of the separator 55 are drawn. The parallel line L1 is a line that passes through a position closest to the separator 55 in a cross-sectional image of the anode active material particles 11. The parallel line L2 is a line that passes through the deepest part in a cross-sectional image of the particles 10 included in the recess between the adjacent anode active material particles 11. The deepest part refers to a position farthest from the separator 55 in a thickness direction of the separator 55. Also, the cross section can be observed using, for example, a scanning electron microscope (SEM).

(Recess Impregnation Region of a Cathode Side)

The recess impregnation region A of the cathode side refers to a region including a recess between the adjacent cathode active material particles 12 positioned on the outermost surface of the cathode active material layer 53B comprising cathode active material particles 12 serving as cathode active materials. The recess impregnation region A is impregnated with the particles 10 serving as solid particles and electrolytes comprising the sulfinyl or sulfonyl compounds represented by Formula (1A) to Formula (8A). Accordingly, the recess impregnation region A of the cathode side is filled with the electrolytes comprising the sulfinyl or sulfonyl compounds represented by Formula (1A) to Formula (8A). In addition, the particles 10 are comprised in the recess impregnation region A of the cathode side as solid particles to be included in the electrolytes. Note that the electrolytes may be gel-like electrolytes or liquid electrolytes including the non-aqueous electrolyte solution.

A region other than a cross section of the cathode active material particles 12 inside a region between two parallel lines L1 and L2 shown in FIG. 3B is classified as the recess impregnation region A of the cathode side including the recess in which the electrolytes and the particles 10 are disposed. The two parallel lines L1 and L2 are drawn as follows. Within a predetermined visual field width (typically, a visual field width of 50 μm) shown in FIG. 3B, cross sections of the separator 55, the cathode active material layer 53B and a region between the separator 55 and the cathode active material layer 53B are observed. In this observation field of view, the two parallel lines L1 and L2 perpendicular to a thickness direction of the separator 55 are drawn. The parallel line L1 is a line that passes through a position closest to the separator 55 in a cross-sectional image of the cathode active material particles 12. The parallel line L2 is a line that passes through the deepest part in a cross-sectional image of the particles 10 included in the recess between the adjacent cathode active material particles 12. Note that the deepest part refers to a position farthest from the separator 55 in a thickness direction of the separator 55.

(Top Coat Region B)

(Top Coat Region of an Anode Side)

The top coat region B of the anode side refers to a region between the recess impregnation region A of the anode side and the separator 55. The top coat region B is filled with the electrolytes comprising the sulfinyl or sulfonyl compounds represented by Formula (1A) to Formula (8A). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3A is classified as the top coat region B of the anode side.

(Top Coat Region of a Cathode Side)

The top coat region B of the cathode side refers to a region between the recess impregnation region A of the cathode side and the separator 55. The top coat region B is filled with the electrolytes comprising the sulfinyl or sulfonyl compounds represented by Formula (1A) to Formula (8A). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3B is classified as the top coat region B of the cathode side.

(Deep Region C)

(Deep Region of an Anode Side)

The deep region C of the anode side refers to a region inside the anode active material layer 54B, which is deeper than the recess impregnation region A of the anode side. The gap between the anode active material particles 11 of the deep region C is filled with the electrolytes comprising the sulfinyl or sulfonyl compounds represented by Formula (1A) to Formula (8A). The particles 10 to be included in the electrolytes are comprised in the deep region C. Note that the particles 10 may not be comprised in the deep region C.

A region of the anode active material layer 54B other than the recess impregnation region A and the top coat region B within the same predetermined observation field of view shown in FIG. 3A is classified as the deep region C of the anode side. For example, a region between the above-described parallel line L2 and anode current collector 54A within the same predetermined observation field of view shown in FIG. 3A is classified as the deep region C of the anode side.

(Deep Region of a Cathode Side)

The deep region C of the cathode side refers to a region inside the cathode active material layer 53B, which is deeper than the recess impregnation region A of the cathode side. The gap between the cathode active material particles 12 of the deep region C of the cathode side is filled with the electrolytes comprising the sulfinyl or sulfonyl compounds represented by Formula (1A) to Formula (8A). The particles 10 to be included in the electrolytes are comprised in the deep region C. Note that the particles 10 may not be comprised in the deep region C.

A region of the cathode active material layer 53B other than the recess impregnation region A and the top coat region B within the same predetermined observation field of view shown in FIG. 3B is classified as the deep region C of the cathode side. For example, a region between the above-described parallel line L2 and cathode current collector 53A within the same predetermined observation field of view shown in FIG. 3B is classified as the deep region C of the cathode side.

(Concentration of Solid Particles)

The concentration of the solid particles of the recess impregnation region A of the anode side is 30 volume % or more. Furthermore, 30 volume % or more and 90 volume % or less is preferable, and 40 volume % or more and 80 volume % or less is more preferable. When the concentration of the solid particles of the recess impregnation region A of the anode side is in the above range, more solid particles are disposed in the recess between adjacent particles positioned on the outermost surface of the anode active material layer. Accordingly, the sulfinyl or sulfonyl compounds represented by Formula (1A) to Formula (8A) (or compounds derived therefrom) are captured by the solid particles, and the additive is likely to be retained in the recess between adjacent active material particles. For this reason, an abundance ratio of the additive in the recess between adjacent particles can be higher than in the other parts. When the sulfinyl or sulfonyl compounds represented by Formula (1A) to Formula (8A) disposed in the recess partially substitute for molecules of the main solvent to be coordinated with ions of ion ligands, a repulsive force between clusters of ion ligands is generated, the clusters of ion ligands are disintegrated, and it is possible to supply ions to the deep region C inside the anode active material layer at a high concentration and high speed. Note that, in the deep region C, ions are consumed, a concentration of ions decreases, a cluster is hardly formed, and ions become distant from particles. Therefore, a resistance caused by detached additive molecules during charging and discharging is eliminated.

For the same reason as above, the concentration of the solid particles of the recess impregnation region A of the cathode side is 30 volume % or more. Furthermore, 30 volume % or more and 90 volume % or less is preferable, and 40 volume % or more and 80 volume % or less is more preferable.

The concentration of the solid particles of the recess impregnation region A of the anode side is preferably 10 times the concentration of the solid particles of the deep region C of the anode side or more. A concentration of the particles of the deep region C of the anode side is preferably 3 volume % or less. When the concentration of the solid particles of the deep region C of the anode side is too high, since too many solid particles are between active material particles, the solid particles cause a resistance, the captured additive causes a side reaction, and an internal resistance increases.

For the same reason, the concentration of the solid particles of the recess impregnation region A of the cathode side is preferably 10 times the concentration of the solid particles of the deep region C of the cathode side or more. The concentration of particles of the deep region C of the cathode side is preferably 3 volume % or less. When the concentration of the solid particles of the deep region C of the cathode side is too high, since too many solid particles are between active material particles, the solid particles cause a resistance, the captured additive causes a side reaction, and an internal resistance increases.

(Concentration of Solid Particles)

The concentration of solid particles described above refers to a volume concentration (volume %) of solid particles, which is defined as an area percentage ((“total area of particle cross section”÷“area of observation field of view”)×100)(%) of a total area of cross sections of particles when an observation field of view is 2 μm×2 μm. Note that, when a concentration of solid particles of the recess impregnation region A is defined, the observation field of view is set, for example, in the vicinity of a center of a recess formed between adjacent particles in a width direction. Observation is performed using, for example, the SEM, an image obtained by photography is processed, and therefore it is possible to calculate the above areas.

(Thickness of the Recess Impregnation Region A, the Top Coat Region B, and the Deep Region C)

The thickness of the recess impregnation region A of the anode side is preferably 10% or more and 40% or less of the thickness of the anode active material layer 54. When the thickness of the recess impregnation region A of the anode side is in the above range, it is possible to ensure an amount of necessary solid particles to be disposed in the recess and maintain a state in which too many of the solid particles and the additive do not enter the deep region C. When the thickness of the recess impregnation region A of the anode side is less than 10% of the thickness of the anode active material layer 54B, ion clusters are insufficiently disintegrated, and a rapid charge characteristic tends to decrease. When the thickness of the recess impregnation region A of the anode side is more than 40% of the thickness of the anode active material layer 54B, solid particles and the additive enter the deep region C, a resistance increases, and a rapid charge characteristic tends to decrease. Further, the thickness of the recess impregnation region A of the anode side is in the above range, and more preferably, is twice the thickness of the top coat region B of the anode side or more. This is because it is possible to prevent a distance between electrodes from increasing and further improve an energy density. In addition, for the same reason, the thickness of the recess impregnation region A of the cathode side is more preferably twice the thickness of the top coat region B of the cathode side or the like.

(Method of Measuring a Thickness of Regions)

When the thickness of the recess impregnation region A is defined, an average value of thicknesses of the recess impregnation region A in four different observation fields of view is set as the thickness of the recess impregnation region A. When the thickness of the top coat region B is defined, an average value of thicknesses of the top coat region B in four different observation fields of view is set as the thickness of the top coat region B. When the thickness of the deep region C is defined, an average value of thicknesses of the deep region C in four different observation fields of view is set as the thickness of the deep region C.

(Particle Size of Solid Particles)

As a particle size of solid particles, a particle size D50 is preferably “$2/\sqrt{3}-1$” times a particle size D50 of active material particles or less. In addition, as the particle size of the solid particles, a particle size D50 is more preferably 0.1 μm or more. As the particle size of the solid particles, a particle size D95 is preferably “$2/\sqrt{3}-1$” times a particle size D50 of active material particles or more. Particles having a large particle size block an interval between adjacent active material particles at a bottom of the recess and it is possible to suppress too many of the solid particles from entering the deep region C and a negative influence on a battery characteristic.

(Measurement of a Particle Size)

A particle size D50 of solid particles is, for example, a particle size at which 50% of particles having a smaller particle size are cumulated (a cumulative volume of 50%) in a particle size distribution in which solid particles after components other than solid particles are removed from electrolytes comprising solid particles are measured by a laser diffraction method. In addition, based on the measured particle size distribution, it is possible to obtain a value of a particle size D95 at a cumulative volume 95%. A particle size D50 of active materials is a particle size at which 50% of particles having a smaller particle size are cumulated (a cumulative volume of 50%) in a particle size distribution in which active material particles after components other than active material particles are removed from an active material layer comprising active material particles are measured by a laser diffraction method.

(Specific Surface Area of Solid Particles)

The specific surface area ($m^2/g$) is a BET specific surface area ($m^2/g$) measured by a BET method, which is a method of measuring a specific surface area. The BET specific surface area of solid particles is preferably 1 $m^2/g$ or more and 60 $m^2/g$ or less. When the BET specific surface area is in the above numerical range, an action of solid particles capturing the sulfinyl or sulfonyl compounds represented by Formula (1A) to Formula (8A) increases, which is preferable. On the other hand, when the BET specific surface area is too large, since lithium ions are also captured, an output characteristic tends to decrease. Note that the specific surface area of the solid particles can be measured using, for example, solid particles after components other than solid particles are removed from electrolytes comprising solid particles in the same manner as described above.

(Configuration Including the Recess Impregnation Region A, the Top Coat Region B, and the Deep Region C, which are Only on the Anode Side or the Cathode Side)

Note that, the electrolyte layer 56 comprising solid particles may be formed only on both principal surfaces of the anode 54. In addition, the electrolyte layer 56 comprising no solid particles may be applied to and formed on both principal surfaces of the cathode 53. Similarly, the electrolyte layer 56 comprising solid particles may be formed only on both principal surfaces of the cathode 53. In addition, the electrolyte layer 56 without solid particles may be applied to and formed on both principal surfaces of the anode 54. In such cases, only the recess impregnation region A of the anode side, the top coat region B of the anode side, and the deep region C of the anode side are formed, and these regions are not formed on the cathode side or only the recess impregnation region A of the cathode side, the top coat region B of the cathode side, and the deep region C of the cathode side are formed, and these regions are not formed on the anode side.

(7-2) Method of Manufacturing an Exemplary Non-aqueous Electrolyte Battery

An exemplary non-aqueous electrolyte battery can be manufactured, for example, as follows.

(Method of Manufacturing a Cathode)

Cathode active materials, the conductive agent, and the binder are mixed to prepare a cathode mixture. The cathode mixture is dispersed in a solvent such as N-methyl-2-pyrrolidone to prepare a cathode mixture slurry in a paste form. Next, the cathode mixture slurry is applied to the cathode current collector 53A, the solvent is dried, and compression molding is performed by, for example, a roll press device. Therefore, the cathode active material layer 53B is formed and the cathode 53 is fabricated.

(Method of Manufacturing an Anode)

Anode active materials and the binder are mixed to prepare an anode mixture. The anode mixture is dispersed in a solvent such as N-methyl-2-pyrrolidone to prepare an anode mixture slurry in a paste form. Next, the anode mixture slurry is applied to the anode current collector 54A, the solvent is dried, and compression molding is performed by, for example, a roll press device. Therefore, the anode active material layer 54B is formed and the anode 54 is fabricated.

(Preparation of a Non-aqueous Electrolyte Solution)

An electrolyte salt is dissolved in a non-aqueous solvent and the sulfinyl or sulfonyl compounds represented by Formula (1A) to Formula (8A) are added to prepare the non-aqueous electrolyte solution.

(Solution Coating)

A coating solution comprising a non-aqueous electrolyte solution, a matrix polymer compound, solid particles, and a dilution solvent (for example, dimethyl carbonate) is heated and applied to both principal surfaces of each of the cathode 53 and the anode 54. Then, the dilution solvent is evaporated and the electrolyte layer 56 is formed.

When the coating solution is heated and applied, electrolytes comprising solid particles can be impregnated into a recess between adjacent anode active material particles positioned on the outermost surface of the anode active material layer 54B and the deep region C inside the anode active material layer 54B. In this case, when solid particles are filtered in the recess between adjacent particles, a concentration of particles in the recess impregnation region A of the anode side increases. Accordingly, it is possible to set a difference of concentrations of particles between the recess impregnation region A and the deep region C. Similarly, when the coating solution is heated and applied, electrolytes comprising solid particles can be impregnated into a recess between adjacent cathode active material particles positioned on the outermost surface of the cathode active material layer 53B and the deep region C inside the cathode active material layer 53B. In this case, when solid particles are filtered in the recess between adjacent particles, a concentration of particles in the recess impregnation region A of the cathode side increases. Accordingly, it is possible to set a difference of concentrations of particles between the recess impregnation region A and the deep region C.

When the excess coating solution is scraped off after the coating solution is applied, it is possible to prevent a distance between electrodes from extending unintentionally. In addition, by scraping a surface of the coating solution, it is possible to dispose more solid particles in the recess between adjacent active material particles, and a ratio of solid particles of the top coat region B decreases. Accordingly, most of the solid particles are intensively disposed in the recess impregnation region A, and the additive can further accumulate in the recess impregnation region A.

Note that solution coating may be performed in the following manner. A coating solution (a coating solution excluding particles) comprising a non-aqueous electrolyte solution, a matrix polymer compound, and a dilution solvent (for example, dimethyl carbonate) is applied to both principal surfaces of the cathode 53, and the electrolyte layer 56 comprising no solid particles may be formed. In addition, no electrolyte layer 56 is formed on one principal surface or both principal surfaces of the cathode 53, and the electrolyte layer 56 comprising the same solid particles may be formed only on both principal surfaces of the anode 54. A coating solution (a coating solution excluding particles) comprising a non-aqueous electrolyte solution, a matrix polymer compound, and a dilution solvent (for example, dimethyl carbonate) is applied to both principal surfaces of the anode 54, and the electrolyte layer 56 comprising no solid particles may be formed. In addition, no electrolyte layer 56 is formed on one principal surface or both principal surfaces of the anode 54, and the electrolyte layer 56 comprising the same solid particles may be formed only on both principal surfaces of the cathode 53.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 on which the electrolyte layer 56 is formed and the anode 54 on which the electrolyte layer 56 is formed are laminated through the separator 55 to prepare a laminated body. Then, the laminated body is wound in a longitudinal direction, the protection tape 57 is adhered to the outermost peripheral portion and the wound electrode body 50 is formed.

Finally, for example, the wound electrode body 50 is inserted into the package member 60, and outer periphery portions of the package member 60 are enclosed in close contact with each other by thermal fusion bonding. In this case, the adhesive film 61 is inserted between the package member 60 and each of the cathode lead 51 and the anode lead 52. Accordingly, the non-aqueous electrolyte battery shown in FIG. 1 and FIG. 2 is completed.

[Modification Example 7-11]

The non-aqueous electrolyte battery according to the seventh embodiment may also be fabricated as follows. The fabrication method is the same as the method of manufacturing an exemplary non-aqueous electrolyte battery described above except that, in the solution coating process of the method of manufacturing an exemplary non-aqueous electrolyte battery, in place of applying the coating solution to both surfaces of at least one electrode of the cathode 53 and the anode 54, the coating solution is formed on at least one principal surface of both principal surfaces of the separator 55, and then a heating and pressing process is additionally performed.

[Method of Manufacturing a Non-aqueous Electrolyte Battery of Modification Example 7-1]

(Fabrication of a Cathode, an Anode, and a Separator, and Preparation of a Non-aqueous Electrolyte Solution)

In the same manner as in the method of manufacturing an exemplary non-aqueous electrolyte battery, the cathode 53, the anode 54 and the separator 55 are fabricated and the non-aqueous electrolyte solution is prepared.

(Solution Coating)

A coating solution comprising a non-aqueous electrolyte solution, a resin, solid particles, and a dilution solvent (for example, dimethyl carbonate) is applied to at least one surface of both surfaces of the separator 55. Then, the dilution solvent is evaporated and the electrolyte layer 56 is formed.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54, and the electrolyte layer 56 are laminated through the formed separator 55 to prepare a laminated body. Then, the laminated body is wound in a longitudinal direction, the protection tape 57 is adhered to the outermost peripheral portion, and the wound electrode body 50 is formed.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Finally, a depression portion is formed by deep drawing the package member 60 formed of a laminated film, the wound electrode body 50 is inserted into the depression portion, an unprocessed part of the package member 60 is folded at an upper part of the depression portion, and a peripheral portion of the depression portion is thermally welded. In this case, the adhesive film 61 is inserted between the package member 60 and each of the cathode lead 51 and the anode lead 52. In this manner, the desired non-aqueous electrolyte battery can be obtained.

[Modification Example 7-2]

While the configuration using gel-like electrolytes has been exemplified in the seventh embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 7-2]

(Preparation of a Cathode, an Anode, and a Non-aqueous Electrolyte Solution)

In the same manner as in the method of manufacturing an exemplary non-aqueous electrolyte battery, the cathode 53 and the anode 54 are fabricated and the non-aqueous electrolyte solution is prepared.

(Coating and Formation of a Solid Particle Layer)

Next, paint is applied to at least one principal surface of both principal surfaces of the anode 54 by a coating method, the solvent is then removed by drying and a solid particle layer is formed. As the paint, for example, a mixture of solid particles, a binder polymer compound (resin) and a solvent can be used. On the outermost surface of the anode active material layer 54B on which the solid particle layer is applied and formed, solid particles are filtered in the recess between adjacent anode active material particles positioned on the outermost surface of the anode active material layer 54B, and a concentration of particles of the recess impregnation region A of the anode side increases. Similarly, the same paint as described above is applied to both principal surfaces of the cathode 53 by a coating method, the solvent is then removed by drying, and a solid particle layer is formed. On the outermost surface of the cathode active material layer 53B on which the solid particle layer is applied and formed, solid particles are filtered in the recess between adjacent cathode active material particles positioned on the outermost surface of the cathode active material layer 53B, and a concentration of particles of the recess impregnation region A of the cathode side increases. Solid particles having a particle size D95 that is adjusted to be, for example, a predetermined times a particle size D50 or more, are preferably used. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval between particles at a bottom of the recess filled with solid particles having a large particle size, and solid particles can be easily filtered.

Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of solid particles of the top coat region B decreases. Accordingly, most of the solid particles are intensively disposed in the recess impregnation region, and the sulfinyl or sulfonyl compounds represented by Formula (1A) to Formula (8A) can further accumulate in the recess impregnation region A.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54 are laminated through the separator 55 and wound, the protection tape 57 is adhered to the outermost peripheral portion, and a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the non-aqueous electrolyte solution is injected into the package member 60, and the wound body is impregnated with the non-aqueous electrolyte solution. Then, an opening of the package member 60 is sealed by thermal fusion bonding under a vacuum atmosphere. In this manner, the desired non-electrolyte secondary battery can be obtained.

[Modification Example 7-3]

The non-aqueous electrolyte battery according to the seventh embodiment may be fabricated as follows.

[Method of Manufacturing a Non-aqueous Electrolyte Battery of Modification Example 7-3]

(Fabrication of a Cathode and an Anode)

In the same manner as in the method of manufacturing an exemplary non-aqueous electrolyte battery, the cathode 53 and the anode 54 are fabricated.

(Coating and Formation of a Solid Particle Layer)

Next, in the same manner as in Modification Example 7-2, a solid particle layer is formed on at least one principal surface of both principal surfaces of the anode. In the same manner, a solid particle layer is formed on at least one principal surface of both principal surfaces of the cathode.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Assembly of the Non-aqueous Electrolyte Battery)

Next, in the same manner as in Modification Example 7-2, a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 7-4]

The non-aqueous electrolyte battery according to the seventh embodiment may be fabricated as follows.

[Method of Manufacturing a Non-aqueous Electrolyte Battery of Modification Example 7-4]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated and the non-aqueous electrolyte solution is prepared.

(Formation of a Solid Particle Layer)

Next, in the same manner as in Modification Example 7-2, a solid particle layer is formed on at least one principal surface of both principal surfaces of the anode 54. In the same manner, a solid particle layer is formed on at least one principal surface of both principal surfaces of the cathode 53.

(Coating and Formation of a Matrix Resin Layer)

Next, a coating solution comprising a non-aqueous electrolyte solution, a matrix polymer compound, and a dispersing solvent such as N-methyl-2-pyrrolidone is applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 7-5]

While the configuration using gel-like electrolytes has been exemplified in the seventh embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 4-5]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated, and the non-aqueous electrolyte solution is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, the cathode 53 and the anode 54 are laminated and wound through the separator 55, the protection tape 57 is adhered to the outermost peripheral portion, and a wound body serving as a precursor of the wound electrode body 50 is formed.

(Heating and Pressing Process)

Next, before the electrolyte solution is injected into the package member 60, the wound body is put into a packaging material such as a latex tube and sealed, and subjected to warm pressing under hydrostatic pressure. Accordingly, solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape. Next, the non-aqueous electrolyte solution is prepared and injected into the package member 60. The wound body is impregnated with the non-aqueous electrolyte solution, and an opening of the package member 60 is then sealed by thermal fusion bonding under a vacuum atmosphere. In this manner, the desired non-aqueous electrolyte battery can be obtained.

[Modification Example 7-6]

The non-aqueous electrolyte battery according to the seventh embodiment may be fabricated as follows.

[Method of Manufacturing a Non-aqueous Electrolyte Battery of Modification Example 7-6]

(Fabrication of a Cathode and an Anode)

First, in the same manner as in the method of manufacturing an exemplary non-aqueous electrolyte battery, the cathode 53 and the anode 54 are fabricated.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, in the same manner as in Modification Example 7-2, a wound body serving as a precursor of the wound electrode body 50 is formed.

(Heating and Pressing Process)

Next, before the non-aqueous electrolyte solution is injected into the package member 60, the wound body is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 7-7]

The non-aqueous electrolyte battery according to the seventh embodiment may be fabricated as follows.

[Method of Manufacturing a Non-aqueous Electrolyte Battery of Modification Example 7-7]

(Fabrication of a Cathode and an Anode)

First, in the same manner as in the method of manufacturing an exemplary non-aqueous electrolyte battery, the cathode 53 and the anode 54 are fabricated. Next, solid particles and the matrix polymer compound are applied to at least one principal surface of both principal surfaces of the separator 56, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 7-8]

In the example of the seventh embodiment and Modification Example 7-1 to Modification Example 7-7 described above, the non-aqueous electrolyte battery in which the wound electrode body 50 is packaged with the package member 60 has been described. However, as shown in FIGS. 4A to 4C, a stacked electrode body 70 may be used in place of the wound electrode body 50. FIG. 4A is an external view of the non-aqueous electrolyte battery in which the stacked electrode body 70 is housed. FIG. 4B is a dissembled perspective view showing a state in which the stacked electrode body 70 is housed in the package member 60. FIG. 4C is an external view showing an exterior of the non-aqueous electrolyte battery shown in FIG. 4A seen from a bottom side.

As the stacked electrode body 70, the stacked electrode body 70 in which a rectangular cathode 73 and a rectangular anode 74 are laminated through a rectangular separator 75, and fixed by a fixing member 76 is used. Although not shown, when the electrolyte layer is formed, the electrolyte layer is provided in contact with the cathode 73 and the anode 74. For example, the electrolyte layer (not shown) is provided between the cathode 73 and the separator 75, and between the anode 74 and the separator 75. The electrolyte layer is the same as the electrolyte layer 56 described above. A cathode lead 71 connected to the cathode 73 and an anode lead 72 connected to the anode 74 are led out from the stacked electrode body 70. The adhesive film 61 is provided between the package member 60 and each of the cathode lead 71 and the anode lead 72.

Note that a method of manufacturing a non-aqueous electrolyte battery is the same as the method of manufacturing a non-aqueous electrolyte battery in the example of the seventh embodiment and Modification Example 7-1 to Modification Example 7-7 described above except that a stacked electrode body is fabricated in place of the wound electrode body 70, and a laminated body (having a configuration in which the electrolyte layer is removed from the stacked electrode body 70) is fabricated in place of the wound body.

8. Eighth Embodiment

In the eighth embodiment of the present technology, a cylindrical non-aqueous electrolyte battery (a battery) will be described. The non-aqueous electrolyte battery is, for example, a non-aqueous electrolyte secondary battery in which charging and discharging are possible. Also, a lithium ion secondary battery is exemplified.

(8-1) Configuration of an Example of the Non-aqueous Electrolyte Battery

FIG. 5 is a cross-sectional view of an example of the non-aqueous electrolyte battery according to the eighth embodiment. The non-aqueous electrolyte battery is, for example, a non-aqueous electrolyte secondary battery in which charging and discharging are possible. The non-aqueous electrolyte battery, which is a so-called cylindrical type, includes non-aqueous liquid electrolytes, which are not shown, (hereinafter, appropriately referred to as the non-aqueous electrolyte solution) and a wound electrode body 90 in which a band-like cathode 91 and a band-like anode 92 are wound through a separator 93 inside a substantially hollow cylindrical battery can 81.

The battery can 81 is made of, for example, nickel-plated iron, and includes one end that is closed and the other end that is opened. A pair of insulating plates 82*a* and 82*b* perpendicular to a winding peripheral surface are disposed inside the battery can 81 so as to interpose the wound electrode body 90 therebetween.

Exemplary materials of the battery can 81 include iron (Fe), nickel (Ni), stainless steel (SUS), aluminum (Al), and titanium (Ti). In order to prevent electrochemical corrosion by the non-aqueous electrolyte solution according to charge and discharge of the non-aqueous electrolyte battery, the battery can 81 may be subjected to plating of, for example, nickel. At an open end of the battery can 81, a battery lid 83 serving as a cathode lead plate, a safety valve mechanism, and a positive temperature coefficient (PTC) element 87 provided inside the battery lid 83 are attached by being caulked through a gasket 88 for insulation sealing.

The battery lid 83 is made of, for example, the same material as that of the battery can 81, and an opening for discharging a gas generated inside the battery is provided. In the safety valve mechanism, a safety valve 84, a disk holder 85 and a blocking disk 86 are sequentially stacked. A protrusion part 84*a* of the safety valve 84 is connected to a cathode lead 95 that is led out from the wound electrode body 90 through a sub disk 89 disposed to cover a hole 86*a* provided at a center of the blocking disk 86. Since the safety valve 84 and the cathode lead 95 are connected through the sub disk 89, the cathode lead 95 is prevented from being drawn from the hole 86*a* when the safety valve 84 is reversed. In addition, the safety valve mechanism is electrically connected to the battery lid 83 through the positive temperature coefficient element 87.

When an internal pressure of the non-aqueous electrolyte battery becomes a predetermined level or more due to an internal short circuit of the battery or heat from the outside of the battery, the safety valve mechanism reverses the safety valve 84, and disconnects an electrical connection of the protrusion part 84*a*, the battery lid 83 and the wound electrode body 90. That is, when the safety valve 84 is reversed, the cathode lead 95 is pressed by the blocking disk 86, and a connection of the safety valve 84 and the cathode lead 95 is released. The disk holder 85 is made of an insulating material. When the safety valve 84 is reversed, the safety valve 84 and the blocking disk 86 are insulated.

In addition, when a gas is additionally generated inside the battery and an internal pressure of the battery further increases, a part of the safety valve 84 is broken and a gas can be discharged to the battery lid 83 side.

In addition, for example, a plurality of gas vent holes (not shown) are provided in the vicinity of the hole 86*a* of the blocking disk 86. When a gas is generated from the wound electrode body 90, the gas can be effectively discharged to the battery lid 83 side.

When a temperature increases, the positive temperature coefficient element 87 increases a resistance value, disconnects an electrical connection of the battery lid 83 and the wound electrode body 90 to block a current, and therefore prevents abnormal heat generation due to an excessive current. The gasket 88 is made of, for example, an insulating material, and has a surface to which asphalt is applied.

The wound electrode body 90 housed inside the non-aqueous electrolyte battery is wound around a center pin 94. In the wound electrode body 90, the cathode 91 and the anode 92 are sequentially laminated and wound through the separator 93 in a longitudinal direction. The cathode lead 95 is connected to the cathode 91. An anode lead 96 is connected to the anode 92. As described above, the cathode lead 95 is welded to the safety valve 84 and electrically connected to the battery lid 83, and the anode lead 96 is welded and electrically connected to the battery can 81.

FIG. 6 shows an enlarged part of the wound electrode body 90 shown in FIG. 5.

Hereinafter, the cathode 91, the anode 92, and the separator 93 will be described in detail.

[Cathode]

In the cathode 91, a cathode active material layer 91B comprising a cathode active material is formed on both surfaces of a cathode current collector 91A. As the cathode current collector 91A, for example, a metal foil such as aluminum (Al) foil, nickel (Ni) foil or stainless steel (SUS) foil, can be used.

The cathode active material layer 91B is configured to comprise one, two or more kinds of cathode materials that can occlude and release lithium as cathode active materials, and may comprise another material such as a binder or a conductive agent as necessary. Note that the same cathode active material, conductive agent and binder used in the seventh embodiment can be used.

The cathode 91 includes the cathode lead 95 connected to one end portion of the cathode current collector 91A by spot welding or ultrasonic welding. The cathode lead 95 is preferably formed of net-like metal foil, but there is no problem when a non-metal material is used as long as an electrochemically and chemically stable material is used and an electric connection is obtained. Examples of materials of the cathode lead 95 include aluminum (Al) and nickel (Ni).

[Anode]

The anode 92 has, for example, a structure in which an anode active material layer 92B is provided on both surfaces of an anode current collector 92A having a pair of opposed surfaces. Although not shown, the anode active material layer 92B may be provided only on one surface of the anode current collector 92A. The anode current collector 92A is formed of, for example, a metal foil such as copper foil.

The anode active material layer 92B is configured to comprise one, two or more kinds of anode materials that can occlude and release lithium as anode active materials, and may be configured to comprise another material such as a binder or a conductive agent, which is the same as in the cathode active material layer 91B, as necessary. Note that the same anode active material, conductive agent and binder used in the seventh embodiment can be used.

[Separator]

The separator 93 is the same as the separator 55 of the seventh embodiment.

[Non-aqueous Electrolyte Solution]

The non-aqueous electrolyte solution is the same as in the seventh embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the seventh embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B of the anode side and the deep region C of the anode side, which are only on the anode side, may be formed or the recess impregnation region A of the cathode side, the top coat region B of the cathode side and the deep region C of the cathode side, which are only on the cathode side, may be formed.

(8-2) Method of Manufacturing a Non-aqueous Electrolyte Battery (Method of Manufacturing a Cathode and Method of Manufacturing an Anode)

In the same manner as in the seventh embodiment, the cathode 91 and the anode 92 are fabricated.

(Formation of a Solid Particle Layer)

Next, paint is applied to at least one principal surface of both principal surfaces of the anode 92 by a coating method, the solvent is then removed by drying and a solid particle layer is formed. As the paint, for example, a mixture of solid particles, a binder polymer compound and a solvent can be used. On the outermost surface of the anode active material layer 92B on which the solid particle layer is applied and formed, solid particles are filtered in the recess between adjacent anode active material particles positioned on the outermost surface of the anode active material layer 92B, and a concentration of particles of the recess impregnation region A of the anode side increases. Similarly, the solid particle layer is formed on both principal surfaces of the cathode 91 by a coating method. On the outermost surface of the cathode active material layer 91B on which the solid particle layer is applied and formed, solid particles are filtered in the recess between adjacent cathode active material particles positioned on the outermost surface of the cathode active material layer 91B, and a concentration of particles of the recess impregnation region A of the cathode side increases. Solid particles having a particle size D95 that is adjusted to be a predetermined times a particle size D50 or more are preferably used. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval at a bottom of the recess is filled with solid particles having a large particle size, and solid particles can be easily filtered.

Note that, when the solid particle layer is applied and formed, if extra paint is scraped off, it is possible to prevent a distance between electrodes from extending unintentionally. In addition, by scraping a surface of the paint, more solid particles are sent to the recess between adjacent active material particles, and a ratio of the top coat region B decreases. Accordingly, most of the solid particles are intensively disposed in the recess impregnation region, and the sulfinyl or sulfonyl compounds represented by Formula (1A) to Formula (8A) can further accumulate in the recess impregnation region A.

(Method of Manufacturing a Separator)

Next, the separator 93 is prepared.

(Preparation of a Non-aqueous Electrolyte Solution)

An electrolyte salt is dissolved in a non-aqueous solvent to prepare the non-aqueous electrolyte solution.

(Assembly of the Non-aqueous Electrolyte Battery)

The cathode lead 95 is attached to the cathode current collector 91A by welding and the anode lead 96 is attached to the anode current collector 92A by welding. Then, the cathode 91 and the anode 92 are wound through the separator 93 to prepare the wound electrode body 90.

A distal end portion of the cathode lead 95 is welded to the safety valve mechanism and a distal end portion of the anode lead 96 is welded to the battery can 81. Then, a winding surface of the wound electrode body 90 is inserted between a pair of insulating plates 82*a* and 82*b* and accommodated inside the battery can 81. The wound electrode body 90 is accommodated inside the battery can 81, and the non-aqueous electrolyte solution is then injected into the battery can 81 and impregnated into the separator 93. Then, at the opened end of the battery can 81, the safety valve mechanism including the battery lid 83, the safety valve 84 and the like, and the positive temperature coefficient element 87 are caulked and fixed through the gasket 88. Accordingly, the non-aqueous electrolyte battery of the present technology shown in FIG. 5 is formed.

In the non-aqueous electrolyte battery, when charge is performed, for example, lithium ions are released from the cathode active material layer 91B, and occluded in the anode active material layer 92B through the non-aqueous electrolyte solution impregnated into the separator 93. In addition, when discharge is performed, for example, lithium ions are released from the anode active material layer 92B, and occluded in the cathode active material layer 91B through the non-aqueous electrolyte solution impregnated into the separator 93.

[Modification Example 8-1]

The non-aqueous electrolyte battery according to the eighth embodiment may be fabricated as follows.

(Fabrication of a Cathode and an Anode)

First, in the same manner as in the example of the non-aqueous electrolyte battery, the cathode 91 and the anode 92 are fabricated.

(Formation of a Solid Particle Layer)

Next, paint is applied to at least one principal surface of both principal surfaces of the separator 93 by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 90 is formed.

(Heating and Pressing Process)

Before the wound electrode body 90 is accommodated inside the battery can 81, the wound electrode body 90 is put into a packaging material such as a latex tube and sealed, and subjected to warm pressing under hydrostatic pressure. Accordingly, solid particles move to the recess between adjacent anode active material particles positioned on the outermost surface of the anode active material layer 92B, and the concentration of the solid particles of the recess impregnation region A of the anode side increases. The solid particles move to the recess between adjacent cathode active material particles positioned on the outermost surface of the cathode active material layer 91B and the concentration of the solid particles of the recess impregnation region A of the cathode side increases.

Processes thereafter are the same as those in the example described above, and the desired non-aqueous electrolyte battery can be obtained.

9. Ninth Embodiment

In the ninth embodiment, a rectangular non-aqueous electrolyte battery will be described.

(9-1) Configuration of an Example of the Non-aqueous Electrolyte Battery

FIG. 7 shows a configuration of an example of the non-aqueous electrolyte battery according to the ninth embodiment. The non-aqueous electrolyte battery is a so-called rectangular battery, and a wound electrode body 120 is housed inside a rectangular exterior can 111.

The non-aqueous electrolyte battery includes the rectangular exterior can 111, the wound electrode body 120 serving as a power generation element accommodated inside the exterior can 111, a battery lid 112 configured to close an opening of the exterior can 111, an electrode pin 113 provided at substantially the center of the battery lid 112, and the like.

The exterior can 111 is formed as a hollow rectangular tubular body with a bottom using, for example, a metal having conductivity such as iron (Fe). The exterior can 111 preferably has a configuration in which, for example, nickel-plating is performed on or a conductive paint is applied to an inner surface so that conductivity of the exterior can 111 increases. In addition, an outer peripheral surface of the exterior can 111 is covered with an exterior label formed by, for example, a plastic sheet or paper, and an insulating paint may be applied thereto for protection. The battery lid 112 is made of, for example, a metal having conductivity such as iron (Fe), the same as in the exterior can 111.

The cathode and the anode are laminated and wound through the separator in an elongated oval shape, and therefore the wound electrode body 120 is obtained. Since the cathode, the anode, the separator and the non-aqueous electrolyte solution are the same as those in the seventh embodiment, detailed descriptions thereof will be omitted.

In the wound electrode body 120 having such a configuration, a plurality of cathode terminals 121 connected to the cathode current collector and a plurality of anode terminals connected to the anode current collector are provided. All of the cathode terminals 121 and the anode terminals are led out to one end of the wound electrode body 120 in an axial direction. Then, the cathode terminals 121 are connected to a lower end of the electrode pin 113 by a fixing method such as welding. In addition, the anode terminals are connected to an inner surface of the exterior can 111 by a fixing method such as welding.

The electrode pin 113 is made of a conductive shaft member, and is maintained by an insulator 114 while a head thereof protrudes from an upper end. The electrode pin 113 is fixed to substantially the center of the battery lid 112 through the insulator 114. The insulator 114 is formed of a high insulating material, and is engaged with a through-hole 115 provided at a surface side of the battery lid 112. In addition, the electrode pin 113 passes through the through-hole 115, and a distal end portion of the cathode terminal 121 is fixed to a lower end surface thereof.

The battery lid 112 to which the electrode pin 113 or the like is provided is engaged with the opening of the exterior can 111, and a contact surface of the exterior can 111 and the battery lid 112 are bonded by a fixing method such as welding. Accordingly, the opening of the exterior can 111 is sealed by the battery lid 112 and is in an air tight and liquid tight state. At the battery lid 112, an internal pressure release mechanism 116 configured to release (dissipate) an internal pressure to the outside by breaking a part of the battery lid 112 when a pressure inside the exterior can 111 increases to a predetermined value or more is provided.

The internal pressure release mechanism 116 includes two first opening grooves 116*a* (one of the first opening grooves 116*a* is not shown) that linearly extend in a longitudinal direction on an inner surface of the battery lid 112 and a second opening groove 116*b* that extends in a width direction perpendicular to a longitudinal direction on the same inner surface of the battery lid 112 and whose both ends communicate with the two first opening grooves 116*a*. The two first opening grooves 116*a* are provided in parallel to each other along a long side outer edge of the battery lid 112 in the vicinity of an inner side of two sides of a long side positioned to oppose the battery lid 112 in a width direction. In addition, the second opening groove 116*b* is provided to be positioned at substantially the center between one short side outer edge in one side in a longitudinal direction of the electrode pin 113 and the electrode pin 113.

The first opening groove 116*a* and the second opening groove 116*b* have, for example, a V-shape whose lower surface side is opened in a cross sectional shape. Note that the shape of the first opening groove 116*a* and the second opening groove 116*b* is not limited to the V-shape shown in this embodiment. For example, the shape of the first opening groove 116*a* and the second opening groove 116*b* may be a U-shape or a semicircular shape.

An electrolyte solution inlet 117 is provided to pass through the battery lid 112. After the battery lid 112 and the exterior can 111 are caulked, the electrolyte solution inlet 117 is used to inject the non-aqueous electrolyte solution, and is sealed by a sealing member 118 after the non-aqueous electrolyte solution is injected. For this reason, when gel electrolytes are formed between the separator and each of the cathode and the anode in advance to fabricate the wound electrode body, the electrolyte solution inlet 117 and the sealing member 118 may not be provided.

[Separator]

As the separator, the same separator as in the seventh embodiment is used.

[Non-aqueous Electrolyte Solution]

The non-aqueous electrolyte solution is the same as in the seventh embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the seventh embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B and the deep region C, which are only on the anode side, may be formed or the recess impregnation region A of the cathode side, the top coat region B of the cathode side and the deep region C of the cathode side, which are only on the cathode side, may be formed.

(9-2) Method of Manufacturing a Non-aqueous Electrolyte Battery

The non-aqueous electrolyte battery can be manufactured, for example, as follows.

[Method of Manufacturing a Cathode and an Anode]

The cathode and the anode can be fabricated by the same method as in the ninth embodiment.

(Formation of a Solid Particle Layer)

Next, paint is applied to at least one principal surface of both principal surfaces of the anode by a coating method, the solvent is then removed by drying and a solid particle layer is formed. As the paint, for example, a mixture of solid particles, a binder polymer compound and a solvent can be used. On the outermost surface of the anode active material layer on which the solid particle layer is applied and formed, solid particles are filtered in the recess between adjacent anode active material particles positioned on the outermost surface of the anode active material layer, and a concentration of particles of the recess impregnation region A of the anode side increases. Similarly, a solid particle layer is formed on both principal surfaces of the cathode by a coating method. On the outermost surface of the cathode active material layer on which the solid particle layer is applied and formed, solid particles are filtered in the recess between adjacent cathode active material particles positioned on the outermost surface of the cathode active material layer, and a concentration of particles of the recess impregnation region A of the cathode side increases. Solid particles having a particle size D95 that is adjusted to be a predetermined times a particle size D50 or more are preferably used as the solid particles. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of the top coat region B decreases. Accordingly, most of the solid particles are intensively disposed in the recess impregnation region A, and the sulfinyl or sulfonyl compounds represented by Formula (1A) to Formula (8A) can further accumulate in the recess impregnation region A.

(Assembly of the Non-aqueous Electrolyte Battery)

The cathode, the anode, and the separator (in which a particle-comprising resin layer is formed on at least one surface of a base material) are sequentially laminated and wound to fabricate the wound electrode body 120 that is wound in an elongated oval shape. Next, the wound electrode body 120 is housed in the exterior can 111.

Then, the electrode pin 113 provided in the battery lid 112 and the cathode terminal 121 led out from the wound electrode body 120 are connected. Also, although not shown, the anode terminal led out from the wound electrode body 120 and the battery can are connected. Then, the exterior can 111 and the battery lid 112 are engaged, the non-aqueous electrolyte solution is injected though the electrolyte solution inlet 117, for example, under reduced pressure and sealing is performed by the sealing member 118. In this manner, the non-aqueous electrolyte battery can be obtained.

[Modification Example 9-1]

The non-aqueous electrolyte battery according to the ninth embodiment may be fabricated as follows.

(Fabrication of a Cathode and an Anode)

First, in the same manner as in the example of the non-aqueous electrolyte battery, the cathode and the anode are fabricated.

(Formation of a Solid Particle Layer)

Next, paint is applied to at least one principal surface of both principal surfaces of the separator by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 120 is formed. Next, before the wound electrode body 120 is housed inside the exterior can 111, the wound electrode body 120 is put into a packaging material such as a latex tube and sealed, and subjected to warm pressing under hydrostatic pressure. Accordingly, solid particles move (are pushed) to the recess between adjacent anode active material particles positioned on the outermost surface of the anode active material layer, and the concentration of the solid particles of the recess impregnation region A of the anode side increases. The solid particles move to the recess between adjacent cathode active material particles positioned on the outermost surface of the cathode active material layer, and the concentration of the solid particles of the recess impregnation region A of the cathode side increases.

Then, similarly to the example described above, the desired non-aqueous electrolyte battery can be obtained.

<Tenth Embodiment to Twelfth Embodiment>

(Overview of the Present Technology)

First, in order to facilitate understanding of the present technology, an overview of the present technology will be described. As will be described below, a capacity and output performance have a trade-off relation. When performance of one improves, performance of the other decreases. For this reason, it is difficult to obtain a battery having both excellent capacity and output performance.

For example, the output performance can be compensated for by reducing a resistance with a thinner electrode mixture layer. On the other hand, in this case, since a ratio of the foil (the current collector) or the separator that does not contribute to the capacity becomes higher, it serves as a factor that reduces the capacity.

Pores between electrodes or in the separator have a large volume, and do not control a rate of ion permeability during high output. However, since an inside of the mixture layer is narrow, ions released during high output are likely to be saturated. In particular, a concentration of ions increases and ions are likely to be congested in a surface layer recess in a valley between active materials in the vicinity of the exit. In this state, an internal resistance increases, a voltage below a predetermined level is cut off and discharge is stopped. Therefore, discharge is not sustainable, and the original capacity is only partially used.

Ions are coordinated with electrolyte solvent molecules and remain in a dissolved state. However, the number of molecules to be coordinated is large, a size of the ligand increases, and a movement speed decreases. A solvent having a small coordination number can dissolve a great amount of ions in a limited volume. However, a degree of dissociation of the ligand is low in many cases and a resistance when ions are exchanged between active materials increases. Therefore, it is not used as the main solvent.

In the present technology, by disposing solid particles in the recess between adjacent active material particles of the outermost surface of the electrode serving as the exit for congested ions, at least one kind of the aromatic compounds represented by Formula (1B) to Formula (4B) is concentrated at the recess, a great amount of saturated ions moved from the inside are dissolved, the congestion of the ions is mitigated, and a high output is sustainable.

In the present technology, by disposing solid particles in the recess part, a solvent having high solubility of ions can be intensively disposed in a necessary part at a necessary minimum amount. Accordingly, it is possible to provide a high output and high capacity battery that can be used without increasing a resistance in a part in which a high degree of dissociation is necessary. By disposing solid particles at a high concentration, the recess part has a function of an ion compression device compressing ions. In a part other than the recess, ions form ligands with the main solvent again, and can contribute to a charge and discharge reaction. The same effect is obtained not only in the recess of the anode but also in the recess of the cathode side serving as an entrance of a cathode mixture layer into which most lithium ions generated during discharging enter. It is effective when solid particles are disposed only in the recess of the cathode side alone, and when solid particles are disposed in both recesses of the cathode side and the anode side.

Hereinbelow, embodiments of the present technology are described with reference to the drawings. The description is given in the following order.

10. Tenth embodiment (example of a laminated film-type battery)

11. Eleventh embodiment (example of a cylindrical battery)

12. Twelfth embodiment (example of a rectangular battery)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

10. Tenth Embodiment

In a tenth embodiment of the present technology, an example of a laminated film-type battery is described. The battery is, for example, a non-aqueous electrolyte battery, a secondary battery in which charging and discharging are possible, or a lithium-ion secondary battery.

(10-1) Configuration Example of the Non-Aqueous Electrolyte Battery

FIG. 1 shows the configuration of a non-aqueous electrolyte battery according to the tenth embodiment. The non-aqueous electrolyte battery is of what is called a laminated film type; and in the battery, a wound electrode body 50 equipped with a cathode lead 51 and an anode lead 52 is housed in a film-shaped package member 60.

Each of the cathode lead 51 and the anode lead 52 is led out from the inside of the package member 60 toward the outside in the same direction, for example. The cathode lead 51 and the anode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the cathode lead 51 and the anode lead 52 for the purpose of increasing the adhesion between the inner resin layer of the package member 60 and each of the cathode lead 51 and the anode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

FIG. 2 shows a cross-sectional structure along line I-I of the wound electrode body 50 shown in FIG. 1. As shown in FIG. 1, the wound electrode body 50 is a body in which a band-like cathode 53 and a band-like anode 54 are stacked and wound via a band-like separator 55 and an electrolyte layer 56, and the outermost peripheral portion is protected by a protection tape 57 as necessary.

(Cathode)

The cathode 53 has a structure in which a cathode active material layer 53B is provided on one surface or both surfaces of a cathode current collector 53A.

In the cathode 53, the cathode active material layer 53B comprising a cathode active material is formed on both surfaces of the cathode current collector 53A. Also, although not shown, the cathode active material layer 53B may be provided only on one surface of the cathode current collector 53A. As the cathode current collector 53A, for example, a metal foil such as aluminum (Al) foil, nickel (Ni) foil or stainless steel (SUS) foil can be used.

The cathode active material layer 53B is configured to comprise, for example, a cathode active material, an electrically conductive agent, and a binder. As the cathode active material, one or more cathode materials that can occlude and release lithium may be used, and another material such as a binder or an electrically conductive agent may be comprised as necessary.

As the cathode material that can occlude and release lithium, for example, a lithium-comprising compound is preferable. This is because a high energy density is obtained. As the lithium-comprising compound, for example, a composite oxide comprising lithium and a transition metal element, a phosphate compound comprising lithium and a transition metal element, or the like is given. Of them, a material comprising at least one of the group consisting of cobalt (Co), nickel (Ni), manganese (Mn), and iron (Fe) as a transition metal element is preferable. This is because a higher voltage is obtained.

As the cathode material, for example, a lithium-comprising compound expressed by $Li_xM1O_2$ or $Li_yM2PO_4$ may be used. In the formula, M1 and M2 represent one or more transition metal elements. The values of x and y vary with the charging and discharging state of the battery, and are usually $0.05 \le x \le 1.10$ and $0.05 \le y \le 1.10$. As the composite oxide comprising lithium and a transition metal element, for example, a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ ($0<z<1$)), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}NiO_4$ ($0<t<2$)) having the spinel structure, or the like is given. Of them, a composite oxide comprising cobalt is preferable. This is because a high capacity is obtained and also excellent cycle characteristics are obtained. As the phosphate compound comprising lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-comprising compounds mentioned above is coated with minute particles made of another of the lithium-comprising compounds may be used.

Other than these, as the cathode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not comprising lithium such as niobium diselenide ($NbSe_2$) (in particular, a layered compound or a spinel-type compound), and a lithium-comprising compound comprising lithium, and also an electrically conductive polymer such as sulfur, polyaniline, polythiophene, polyacetylene, or polypyrrole are given. The cathode material that can occlude and release lithium may be a material other than the above as a matter of course. The cathode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The cathode 53 includes a cathode lead 51 connected to an end portion of the cathode current collector 53A by spot welding or ultrasonic welding. The cathode lead 51 is preferably formed of net-like metal foil, but there is no problem when a non-metal material is used as long as an electrochemically and chemically stable material is used and an electric connection is obtained. Examples of materials of the cathode lead 51 include aluminum (Al), nickel (Ni), and the like.

(Anode)

The anode 54 has a structure in which an anode active material layer 54B is provided on one of or both surfaces of an anode current collector 54A, and is disposed such that the anode active material layer 54B is opposed to the cathode active material layer 53B.

Although not shown, the anode active material layer 54B may be provided only on one surface of the anode current collector 54A. The anode current collector 54A is formed of, for example, a metal foil such as copper foil.

The anode active material layer 54B is configured to comprise, as the anode active material, one or more anode materials that can occlude and release lithium, and may be configured to comprise another material such as a binder or an electrically conductive agent similar to that of the cathode active material layer 53B, as necessary.

In the non-aqueous electrolyte battery, the electrochemical equivalent of the anode material that can occlude and release lithium is set larger than the electrochemical equivalent of the cathode 53, and theoretically lithium metal is prevented from being precipitated on the anode 54 in the course of charging.

In the non-aqueous electrolyte battery, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the anode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the cathode active material is the same; and thus the amounts of the cathode active material and the anode active material are adjusted accordingly. Thereby, a high energy density is obtained.

As the anode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another anode material that can occlude and release lithium and can be increased in capacity, a material that can occlude and release lithium and comprises at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The anode material may be a simple substance, an alloy, or a compound of a metal element or a semi-metal element, or may be a material that includes a phase of one or more of them at least partly. Note that in the present technology, the alloy includes a material formed with two or more kinds of metal elements and a material comprising one or more kinds of metal elements and one or more kinds of semi-metal elements. Further, the alloy may comprise a non-metal element. Examples of its texture include a solid solution, a eutectic (eutectic mixture), an intermetallic compound, and one in which two or more kinds thereof coexist.

Examples of the metal element or semi-metal element comprised in this anode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the anode material, it is preferable to use a material comprising, as a constituent element, a metal element or a semi-metal element of 4B group in the short periodical table. It is more preferable to use a material comprising at least one of silicon (Si) and tin (Sn) as a constituent element. It is even more preferable to use a material comprising at least silicon. This is because silicon (Si) and tin (Sn) each have a high capability of occluding and releasing lithium, so that a high energy density can be obtained. Examples of the anode material comprising at least one of silicon and tin include a simple substance, an alloy, or a compound of silicon, a simple substance, an alloy, or a compound of tin, and a material comprising, at least partly, a phase of one or more kinds thereof.

Examples of the alloy of silicon include alloys comprising, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys comprising, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds comprising oxygen (O) or carbon (C), which may comprise any of the above-described second constituent elements in addition to tin (Sn) or silicon (Si).

Among them, as the anode material, an SnCoC-comprising material is preferable which comprises cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-comprising material may also comprise another constituent element as necessary. For example, it is preferable to comprise, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be comprised. This is because the capacity characteristics or cycling characteristics can be further increased.

Note that the SnCoC-comprising material has a phase comprising tin (Sn), cobalt (Co), and carbon (C), and this phase preferably has a low crystalline structure or an amorphous structure. Further, in the SnCoC-comprising material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-comprising material appears in a region lower than 284.5 eV, at least a part of carbon comprised in the SnCoC-comprising material is bound to a metal element or a semi-metal element, which is another constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-comprising material, the peak of the surface contamination carbon and the peak of the carbon in the SnCoC-comprising material are separated from each other by means of analysis using, for example, a commercially available software program. In the analysis of the waveform, the position of a main peak existing on the lowest binding energy side is used as an energy reference (284.8 eV).

As the anode material that can occlude and release lithium, for example, also a metal oxide, a polymer compound, or other materials that can occlude and release lithium are given. As the metal oxide, for example, a lithium titanium oxide comprising titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

(Separator)

The separator 55 is a porous membrane formed of an insulating membrane that has a large ion permeability and a prescribed mechanical strength. A non-aqueous electrolyte solution is retained in the pores of the separator 55.

The separator 55 is a porous membrane made of, for example, a resin. The porous membrane made of the resin is a membrane obtained by stretching a material such as a resin to be thinner and has a porous structure. For example, the porous membrane made of a resin is obtained when a material such as a resin is formed by a stretching and perforating method, a phase separation method, or the like. For example, in a stretching and opening method, first, a melt polymer is extruded from a T-die or a circular die and additionally subjected to heat treatment, and a crystal structure having high regularity is formed. Then, stretching is performed at low temperatures, and further high temperature stretching is performed. A crystal interface is detached to create an interval part between lamellas, and a porous structure is formed. In the phase separation method, a homogeneous solution prepared by mixing a polymer and a solvent at high temperature is used to form a film by a T-die method, an inflation method or the like, the solvent is then extracted by another volatile solvent, and therefore the porous membrane made of a resin can be obtained. Note that a method of preparing the porous membrane made of a resin is not limited to such methods, and methods proposed in the related art can be widely used. As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material comprising a porous membrane made of a polyolefin resin has good separability between the cathode 53 and the anode 54, and can further reduce the possibility of an internal short circuit.

The separator 55 may be a nonwoven fabric. The nonwoven fabric is a structure made by bonding or entangling or bonding and entangling fibers using a mechanical method, a chemical method and a solvent, or in a combination thereof, without weaving or knitting fibers. Most substances that can be processed into fibers can be used as a source material of the nonwoven fabric. By adjusting a shape such as a length and a thickness, the fiber can have a function according to an object and an application. A method of manufacturing the nonwoven fabric typically includes two processes, a process in which a laminate layer of fibers, which is a so-called fleece, is formed, and a bonding process in which fibers of the fleece are bonded. In each of the processes, various manufacturing methods are used and selected according to a source material, an object, and an application of the nonwoven fabric. For example, in the process in which the fleece is formed, a dry method, a wet method, a spun bond method, a melt blow method, and the like can be used. In the bonding process in which fibers of the fleece are bonded, a thermal bond method, a chemical bond method, a needle punching method, a spunlace method (a hydroentanglement method), a stitch bond method, and a steam jet method can be used.

As the nonwoven fabric, for example, a polyethylene terephthalate permeable membrane (a polyethylene terephthalate nonwoven fabric) using a polyethylene terephthalate (PET) fiber is used. Note that the permeable membrane refers to a membrane having permeability. Additionally, nonwoven fabrics using an aramid fiber, a glass fiber, a cellulose fiber, a polyolefin fiber, or a nylon fiber may be exemplified. The nonwoven fabric may be a fabric using two or more kinds of fibers.

Any thickness can be set as the thickness of the separator 55 to the extent that it is not less than the thickness that can keep necessary strength. The separator 55 is preferably set to such a thickness that the separator 55 provides insulation between the cathode 53 and the anode 54 to prevent a short circuit etc., has ion permeability for producing battery reaction via the separator 55 favorably, and can make the volumetric efficiency of the active material layer that contributes to battery reaction in the battery as high as possible. Specifically, the thickness of the separator 55 is preferably not less than 4 μm and not more than 20 μm, for example.

(Electrolyte Layer)

The electrolyte layer 56 includes a matrix polymer compound, a non-aqueous electrolyte solution and solid particles. The electrolyte layer 56 is a layer in which the non-aqueous electrolyte solution is retained by, for example, the matrix polymer compound, and is, for example, a layer formed of so-called gel-like electrolytes. Note that the solid particles may be comprised inside the anode active material layer 54B and/or inside a cathode active material layer 53B. In addition, while details will be described in the following modification examples, a non-aqueous electrolyte solution, which comprises liquid electrolytes, may be used in place of the electrolyte layer 56. In this case, the non-aqueous electrolyte battery includes a wound body having a configuration in which the electrolyte layer 56 is removed from the wound electrode body 50 in place of the wound electrode body 50. The wound body is impregnated with the non-aqueous electrolyte solution, which comprises liquid electrolytes filled in the package member 60.

(Matrix Polymer Compound)

A resin having the property of compatibility with the solvent, or the like may be used as the matrix polymer compound (resin) that retains the electrolyte solution. As such a matrix polymer compound, a fluorine-comprising resin such as polyvinylidene difluoride or polytetrafluoroethylene, a fluorine-comprising rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C. or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

(Non-aqueous Electrolyte Solution)

The non-aqueous electrolyte solution comprises an electrolyte salt, a non-aqueous solvent in which the electrolyte salt is dissolved, and an additive.

(Electrolyte Salt)

The electrolyte salt comprises, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

(Non-aqueous Solvent)

As the non-aqueous solvent, for example, a lactone-based solvent such as γ-butyrolactone, γ-valerolactone, δ-valerolactone or ε-caprolactone, a carbonate ester-based solvent such as ethylene carbonate, propylene carbonate, butylene carbonate, vinylene carbonate, dimethyl carbonate, ethyl methyl carbonate or diethyl carbonate, an ether-based solvent such as 1,2-dimethoxyethane, 1-ethoxy-2-methoxy ethane, 1,2-diethoxyethane, tetrahydrofuran or 2-methyltetrahydrofuran, a nitrile-based solvent such as acetonitrile, a sulfolane-based solvent, a phosphoric acids solvent, a phosphate ester solvent, or a non-aqueous solvent such as a pyrrolidone may be used. As the solvent, any one kind may be used alone or a mixture of two or more kinds may be used.

(Additive)

The non-aqueous electrolyte solution comprises at least one kind of the aromatic compounds represented by the following Formula (1B) to Formula (4B).

[Chem. 12]

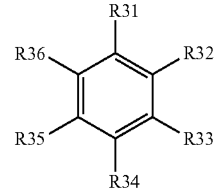

(1B)

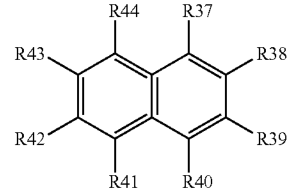

(2B)

-continued (3B)

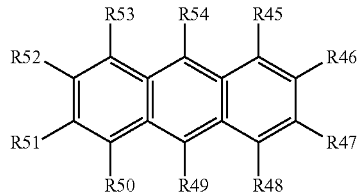

(4B)

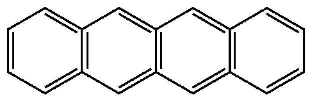

(in the formula, R31 to R54 each independently represent a hydrogen group, a halogen group, a monovalent hydrocarbon group, a monovalent halogenated hydrocarbon group, a monovalent oxygen-comprising hydrocarbon group or a monovalent halogenated oxygen-comprising hydrocarbon group, and any two or more of R31 to R36, any two or more of R37 to R44, or any two or more of R45 to R54 may be bound to each other. However, a total number of carbon atoms in each of the aromatic compounds represented by Formula (1B) to Formula (4B) is 7 to 18.)

The aromatic compound is a compound including a single ring (a single benzene ring) or a fused ring (a condensed ring of 2 to 4 benzene rings) as a main part (a parent). However, as will be described below, a total number of carbon atoms included in each of the aromatic compounds is 7 to 18 without depending on the kind of the parent A kind of R31 to R54 is not particularly limited as long as it is a hydrogen group, a halogen group, a monovalent hydrocarbon group, a monovalent halogenated hydrocarbon group, a monovalent oxygen-comprising hydrocarbon group or a monovalent halogenated oxygen-comprising hydrocarbon group. This is because, when a single ring or condensed ring parent is included and a total number of carbon atoms is 7 to 18, the above-described advantage can be obtained without depending on the kind of R31 to R54.

The aromatic compounds represented by Formula (1B) include a single ring (a benzene ring) as a parent. R31 to R36 may be a group of the same kind or a group of different kinds, and some of R31 to R36 may be a group of the same kind. In the aromatic compound, the number of carbon atoms of the parent is 6. Therefore, in order to increase a total number of carbon atoms to 7 or more, it is necessary for at least one of R31 to R36 to be a monovalent hydrocarbon group, a monovalent halogenated hydrocarbon group, a monovalent oxygen-comprising hydrocarbon group or a monovalent halogenated oxygen-comprising hydrocarbon group.

The aromatic compounds represented by Formula (2B) include a condensed ring (naphthalene) as a parent. R37 to R44 may be a group of the same kind or a group of different kinds, and some of R37 to R44 may be a group of the same kind. In the aromatic compound, since a total number of carbon atoms of the parent is 10, all of R37 to R44 may be a hydrogen group.

The aromatic compounds represented by Formula (3B) include a condensed ring (anthracene) as a parent. R45 to R54 may be a group of the same kind or a group of different kinds, and some of R45 to R54 may be a group of the same kind. In the aromatic compound, since a total number of carbon atoms of the parent is 14, all of R45 to R54 may be a hydrogen group.

The aromatic compounds represented by Formula (4B) include a condensed ring (tetracene), and a total number of carbon atoms thereof is 18.

The total number of carbon atoms is 7 to 18. This is because it is possible to obtain the above-described advantage and excellent solubility and compatibility. Specifically, when the total number of carbon atoms is less than 7, the aromatic compound can include at least one benzene ring, but is unable to include a substituent such as an alkyl group. When the total number of carbon atoms is greater than 18, solubility of the aromatic compound in a solvent that is generally used for a secondary battery decreases and compatibility also decreases.

The term "hydrocarbon group" generally refers to a group including carbon and hydrogen, and may be a straight type or a branched type having one, two or more side chains. The monovalent hydrocarbon group is, for example, an alkyl group having 1 to 12 carbon atoms, an alkenyl group having 2 to 12 carbon atoms, an alkynyl group having 2 to 12 carbon atoms, an aryl group having 6 to 18 carbon atoms, or a cycloalkyl group having 3 to 18 carbon atoms. The divalent hydrocarbon group is, for example, an alkylene group having 1 to 3 carbon atoms.

More specifically, the alkyl group is, for example, a methyl group ($-CH_3$), an ethyl group ($-C_2H_5$) or a propyl group ($-C_3H_7$). The alkenyl group is, for example, a vinyl group ($-CH{=}CH_2$) or an allyl group ($-CH_2-CH{=}CH_2$). The alkynyl group is, for example, an ethynyl group ($-C{\equiv}CH$). The aryl group is, for example, a phenyl group or a benzyl group. The cycloalkyl group is, for example, a cyclopropyl group, a cyclobutyl group, a cyclopentyl group, a cyclohexyl group, a cycloheptyl group or a cyclooctyl group. The alkylene group is, for example, a methylene group ($-CH_2-$).

The term "oxygen-comprising hydrocarbon group" refers to a group including oxygen in addition to carbon and hydrogen. The monovalent oxygen-comprising hydrocarbon group is, for example, an alkoxy group having 1 to 12 carbon atoms. This is because the above-described advantage can be obtained while ensuring the solubility and compatibility of the unsaturated cyclic carbonate ester. More specifically, the alkoxy group is, for example, a methoxy group ($-OCH_3$) or an ethoxy group ($-OC_2H_5$).

The term "group in which two or more kinds are bound" is, for example, a group in which two or more kinds of the above-described alkyl groups are bound to be monovalent as a whole. A group in which an alkyl group and an aryl group are bound or a group in which an alkyl group and a cycloalkyl group are bound is exemplified. More specifically, the group in which an alkyl group and an aryl group are bound is, for example, a benzyl group.

The term "monovalent halogenated hydrocarbon group" refers to a group in which at least some hydrogen groups ($-H$) of the above monovalent hydrocarbon group are substituted with a halogen group (halogenated). The term "divalent halogenated hydrocarbon group" refers to a group in which at least some hydrogen groups ($-H$) of the above divalent hydrocarbon group are substituted with a halogen group (halogenated).

More specifically, a group in which an alkyl group is halogenated is, for example, a trifluoromethyl group ($-CF_3$) or a pentafluoroethyl group ($-C_2F_5$). A group in which an alkylene group is halogenated is, for example, a difluoromethylene group ($-CF_2-$).

Here, specific examples of the aromatic compound include aromatic compounds represented by the following Formula (1B-1) to Formula (1B-14), and Formula (2B-1) or Formula (3B-1). However, the specific examples of the aromatic compound are not limited to the following listed examples.

[Chem. 13]

(1B-1)

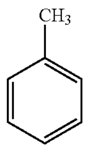

(1B-2)

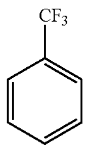

(1B-3)

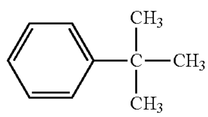

(1B-4)

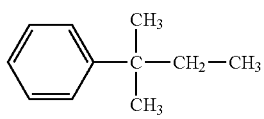

(1B-5)

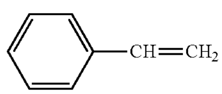

(1B-6)

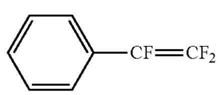

(1B-7)

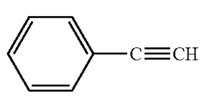

(1B-8)

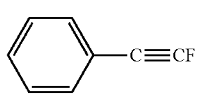

(1B-9)

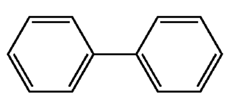

(1B-10)

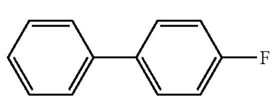

(1B-11)

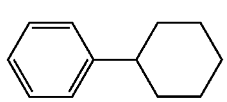

(1B-12)

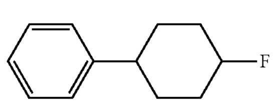

-continued (1B-13)

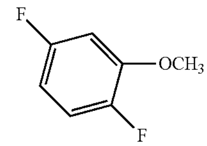

(1B-14)

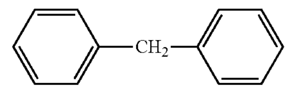

(2B-1)

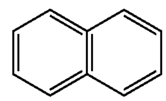

(3B-1)

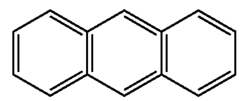

(Content of an Aromatic Compound)

In view of obtaining a more excellent effect, with respect to the non-aqueous electrolyte solution, as a content of the aromatic compounds represented by Formula (1B) to Formula (4B), 0.01 mass % or more and 10 mass % or less is preferable, 0.02 mass % or more and 9 mass % or less is more preferable, and 0.03 mass % or more and 8 mass % or less is most preferable.

(Solid Particles)

As the solid particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide ($Al(OH)_3$, (bayerite or gibbsite)), zinc hydroxide ($Zn(OH)_2$), or the like, an oxide hydroxide or a hydrated oxide such as boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), or magnesium oxide hydrate ($MgO_a.mH_2O$ (a=0.8 to 1.2, m=0.5 to 10)), a hydroxide hydrate such as magnesium hydroxide octahydrate, or the like may be preferably used. As the metal carbide, boron carbide ($B_4C$) or the like may be preferably used. As the metal nitride, silicon nitride ($Si_3N_4$), boron nitride (BN), aluminum nitride (AlN), titanium nitride (TIN), or the like may be preferably used.

As the metal fluoride, lithium fluoride (LiF), aluminum fluoride ($AlF_3$), calcium fluoride ($CaF_2$), barium fluoride ($BaF_2$), magnesium fluoride, or the like may be preferably used. As the phosphate compound, trilithium phosphate ($Li_3PO_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ($[SiO_4]^{4-}$). As the nesosilicate mineral, one that falls under olivines or garnets, or the like is given. As the nesosilicate mineral, more specifically, an olivine (a continuous solid solution of $Mg_2SiO_4$ (forsterite) and $Fe_2SiO_4$ (fayalite)), magnesium silicate (forsterite, $Mg_2SiO_4$), aluminum silicate ($Al_2SiO_5$; sillimanite, andalusite, or kyanite), zinc silicate (willemite, $Zn_2SiO_4$), zirconium silicate (zircon, $ZrSiO_4$), mullite ($3Al_2O_3.2SiO_2$ to $2Al_2O_3.SiO_2$), or the like is given.

The sorosilicate mineral is a group-structured silicate mineral formed of composite bond groups of Si—O tetrahedrons ($[Si_2O_7]^{6-}$ or $[Si_5O_{16}]^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ($[Si_3O_9]^{6-}$, $[Si_4O_{12}]^{8-}$, or $[Si_6O_{18}]^{12-}$). As the cyclosilicate mineral, beryl, tourmalines, or the like is given.

The inosilicate mineral is a fibrous silicate mineral having a chain-like form ($[Si_2O_6]^{4-}$) and a band-like form ($[Si_3O_9]^{6-}$, $[Si_4O_{11}]^{6-}$, $[Si_5O_{15}]^{10-}$, or $[Si_7O_{21}]^{4-}$) in which the linkage of Si—O tetrahedrons extends infinitely. As the inosilicate mineral, for example, one that falls under pyroxenes such as calcium silicate (wollastonite, $CaSiO_3$), one that falls under amphiboles, or the like is given.

The layered silicate mineral is a layer-like silicate mineral having network bonds of Si—O tetrahedrons ($[SiO_4]^{4-}$). Specific examples of the layered silicate mineral are described later.

The tectosilicate mineral is a silicate mineral of a three-dimensional network structure in which Si—O tetrahedrons ($[SiO_4]^{4-}$) form three-dimensional network bonds. As the tectosilicate mineral, quartz, feldspars, zeolites, or the like, an aluminosilicate ($aM_2O.bAl_2O_3.cSiO_2.dH_2O$; M being a metal element; a, b, c, and d each being an integer of 1 or more) such as a zeolite ($M_{2/n}O.Al_2O_3.xSiO_2.yH_2O$; M being a metal element; n being the valence of M; $x \geq 2$; $y \geq 0$), or the like is given.

As the asbestos, chrysotile, amosite, anthophyllite, or the like is given.

As the carbonate mineral, dolomite ($CaMg(CO_3)_2$), hydrotalcite ($Mg_6Al_2(CO_3)(OH)_{16}.4(H_2O)$), or the like is given.

As the oxide mineral, spinel ($MgAl_2O_4$) or the like is given.

As other minerals, strontium titanate ($SrTiO_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral comprises a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite ($Al_2Si_2O_5(OH)_4$), dickite, or the like is given. As one that falls under the pyrophyllite-talc group, for example, talc ($Mg_3Si_4O_{10}(OH)_2$), willemseite, pyrophyllite ($Al_2Si_4O_{10}(OH)_2$), or the like is given. As one that falls under the smectite group, for example, saponite $[(Ca/2,Na)_{0.33}(Mg,Fe^{2+})_3(Si,Al)_4O_{10}(OH)_2.4H_2O]$, hectorite, sauconite, montmorillonite {$(Na,Ca)_{0.33}(Al,Mg)2Si_4O_{10}(OH)_2.nH_2O$; a clay comprising montmorillonite as a main component is called bentonite}, beidellite, nontronite, or the like is given. As one that falls under the mica group, for example, muscovite ($KAl_2(AlSi_3)O_{10}(OH)_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite ($Mg_9Si_{12}O_{30}(OH)_6(OH_2)_4.6H_2O$), palygorskite, or the like is given.

As other silicate minerals, a porous aluminosilicate such as a zeolite ($M_{2/n}O.Al_2O_3.xSiO_2.yH_2O$; M being a metal element; n being the valence of M; $x \geq 2$; $y \geq 0$), attapulgite $[(Mg,Al)2Si_4O_{10}(OH).6H_2O]$, or the like is given.

As the layered carbonate mineral, hydrotalcite ($Mg_6Al_2(CO_3)OH)_{16}.4(H_2O)$) or the like is given.

As the amorphous or quasicrystalline clay mineral, hisingerite, imogolite ($Al_2SiO_3(OH)$), allophane, or the like is given.

These inorganic particles may be used singly, or two or more of them may be mixed for use. The inorganic particle has also oxidation resistance; and when the electrolyte layer 56 is provided between the cathode 53 and the separator 55, the inorganic particle has strong resistance to the oxidizing environment near the cathode during charging.

The solid particle may be also an organic particle. As the material that forms the organic particle, melamine, melamine cyanurate, melamine polyphosphate, cross-linked polymethyl methacrylate (cross-linked PMMA), polyolefin, polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

In view of obtaining a more excellent effect, among such solid particles, particles of boehmite, aluminum hydroxide, magnesium hydroxide, and a silicate salt are preferable. In such solid particles, a deviation in the battery due to —O—H arranged in a sheet form in the crystal structure strongly selectively attracts the additive. Accordingly, it is possible to intensively accumulate the additive at the recess between active material particles more effectively.

(Configuration of an Inside of a Battery)

FIG. 3A and FIG. 3B are schematic cross-sectional views of an enlarged part of an inside of the non-aqueous electrolyte battery according to the tenth embodiment of the present technology. Note that the binder, the conductive agent and the like comprised in the active material layer are not shown.

As shown in FIG. 3A, the non-aqueous electrolyte battery according to the tenth embodiment of the present technology has a configuration in which particles 10, which are the solid particles described above, are disposed between the separator 55 and the anode active material layer 54B and inside the anode active material layer 54B at an appropriate concentration in appropriate regions. In such a configuration, three regions divided into a recess impregnation region A of an anode side, a top coat region B of an anode side and a deep region C of an anode side are formed.

Also, similarly, as shown in FIG. 3B, the non-aqueous electrolyte battery according to the tenth embodiment of the present technology has a configuration in which particles 10, which are the solid particles described above, are disposed between the separator 55 and the cathode active material layer 53B and inside the cathode active material layer 53B at an appropriate concentration in appropriate regions. In such a configuration, three regions divided into a recess impregnation region A of a cathode side, a top coat region B of a cathode side and a deep region C of a cathode side are formed.

(Recess Impregnation Region A, Top Coat Region B, and Deep Region C)

For example, the recess impregnation regions A of the anode side and the cathode side, the top coat regions B of the anode side and the cathode side, and the deep regions C of the anode side and the cathode side are formed as follows.

(Recess Impregnation Region A)

(Recess Impregnation Region of an Anode Side)

The recess impregnation region A of the anode side refers to a region including a recess between the adjacent anode active material particles 11 positioned on the outermost surface of the anode active material layer 54B comprising anode active material particles 11 serving as anode active materials. The recess impregnation region A is impregnated with the particles 10 and electrolytes comprising at least one kind of the aromatic compounds represented by Formula (1B) to Formula (4B). Accordingly, the recess impregnation region A of the anode side is filled with the electrolytes comprising at least one kind of the aromatic compounds represented by Formula (1B) to Formula (4B). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the anode active material particles 11 inside a region between two parallel lines L1 and L2 shown in FIG. 3A is classified as the recess impregnation region A of the anode side including the recess in which the electrolytes and the particles 10 are disposed. The two parallel lines L1 and L2 are drawn as follows. Within a predetermined visual field width (typically, a visual field width of 50 μm) shown in FIG. 3A, cross sections of the separator 55, the anode active material layer 54B, and a region between the separator 55 and the anode active material layer 54B are observed. In this observation field of view, the two parallel lines L1 and L2 perpendicular to a thickness direction of the separator 55 are drawn. The parallel line L1 is a line that passes through a position closest to the separator 55 in a cross-sectional image of the anode active material particles 11. The parallel line L2 is a line that passes through the deepest part in a cross-sectional image of the particles 10 included in the recess between the adjacent anode active material particles 11. The deepest part refers to a position farthest from the separator 55 in a thickness direction of the separator 55. Also, the cross section can be observed using, for example, a scanning electron microscope (SEM).

(Recess Impregnation Region of a Cathode Side)

The recess impregnation region A of the cathode side refers to a region including a recess between the adjacent cathode active material particles 12 positioned on the outermost surface of the cathode active material layer 53B comprising cathode active material particles 12 serving as cathode active materials. The recess impregnation region A is impregnated with the particles 10 serving as solid particles and the electrolytes comprising at least one kind of the aromatic compounds represented by Formula (1B) to Formula (4B). Accordingly, the recess impregnation region A of the cathode side is filled with the electrolytes comprising at least one kind of the aromatic compounds represented by Formula (1B) to Formula (4B). In addition, the particles 10 are comprised in the recess impregnation region A of the cathode side as solid particles to be included in the electrolytes. Note that the electrolytes may be gel-like electrolytes or liquid electrolytes including the non-aqueous electrolyte solution.

A region other than a cross section of the cathode active material particles 12 inside a region between two parallel lines L1 and L2 shown in FIG. 3B is classified as the recess impregnation region A of the cathode side including the recess in which the electrolytes and the particles 10 are disposed. The two parallel lines L1 and L2 are drawn as follows. Within a predetermined visual field width (typically, a visual field width of 50 μm) shown in FIG. 3B, cross sections of the separator 55, the cathode active material layer 53B and a region between the separator 55 and the cathode active material layer 53B are observed. In this observation field of view, the two parallel lines L1 and L2 perpendicular to a thickness direction of the separator 55 are drawn. The parallel line L1 is a line that passes through a position closest to the separator 55 in a cross-sectional image of the cathode active material particles 12. The parallel line L2 is a line that passes through the deepest part in a cross-sectional image of the particles 10 included in the recess between the adjacent cathode active material particles 12. Note that the deepest part refers to a position farthest from the separator 55 in a thickness direction of the separator 55.

(Top Coat Region B)

(Top Coat Region of an Anode Side)

The top coat region B of the anode side refers to a region between the recess impregnation region A of the anode side and the separator 55. The top coat region B is filled with the electrolytes comprising at least one kind of the aromatic compounds represented by Formula (1B) to Formula (4B). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3A is classified as the top coat region B of the anode side.

(Top Coat Region of a Cathode Side)

The top coat region B of the cathode side refers to a region between the recess impregnation region A of the cathode side and the separator 55. The top coat region B is filled with the electrolytes comprising at least one kind of the aromatic compounds represented by Formula (1B) to Formula (4B). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3B is classified as the top coat region B of the cathode side.

(Deep Region C)

(Deep Region of an Anode Side)

The deep region C of the anode side refers to a region inside the anode active material layer 54B, which is deeper than the recess impregnation region A of the anode side. The gap between the anode active material particles 11 of the deep region C is filled with the electrolytes comprising at least one kind of the aromatic compounds represented by Formula (1B) to Formula (4B). The particles 10 to be included in the electrolytes are comprised in the deep region C. Note that the particles 10 may not be comprised in the deep region C.

A region of the anode active material layer 54B other than the recess impregnation region A and the top coat region B within the same predetermined observation field of view shown in FIG. 3A is classified as the deep region C of the anode side. For example, a region between the above-described parallel line L2 and anode current collector 54A within the same predetermined observation field of view shown in FIG. 3A is classified as the deep region C of the anode side.

(Deep Region of a Cathode Side)

The deep region C of the cathode side refers to a region inside the cathode active material layer 53B, which is deeper than the recess impregnation region A of the cathode side. The gap between the cathode active material particles 12 of the deep region C of the cathode side is filled with the electrolytes comprising at least one kind of the aromatic compounds represented by Formula (1B) to Formula (4B). The particles 10 to be included in the electrolytes are comprised in the deep region C. Note that the particles 10 may not be comprised in the deep region C.

A region of the cathode active material layer 53B other than the recess impregnation region A and the top coat region B within the same predetermined observation field of view shown in FIG. 3B is classified as the deep region C of the cathode side. For example, a region between the above-described parallel line L2 and cathode current collector 53A within the same predetermined observation field of view shown in FIG. 3B is classified as the deep region C of the cathode side.

(Concentration of Solid Particles)

A concentration of solid particles of the recess impregnation region A of the anode side is 30 volume % or more.

Furthermore, 30 volume % or more and 90 volume % or less is preferable, and 40 volume % or more and 80 volume % or less is more preferable. When the concentration of the solid particles of the recess impregnation region A of the anode side is in the above range, more solid particles are disposed in the recess between adjacent particles positioned on the outermost surface of the anode active material layer. Accordingly, at least one kind of the aromatic compounds represented by Formula (1B) to Formula (4B) is captured by the solid particles, and the additive is likely to be retained in the recess between adjacent active material particles. For this reason, an abundance ratio of the additive in the recess between adjacent particles can be higher than in the other parts. At least one kind of the aromatic compounds represented by Formula (1B) to Formula (4B) is concentrated at the recess, a great amount of saturated ions moved from the inside are dissolved, the congestion of ions is mitigated, and a high output is sustainable.

For the same reason as above, the concentration of the solid particles of the recess impregnation region A of the cathode side is 30 volume % or more. Furthermore, 30 volume % or more and 90 volume % or less is preferable, and 40 volume % or more and 80 volume % or less is more preferable. The same effect is obtained in the recess impregnation region A of the cathode side serving as an entrance of a cathode mixture layer into which most lithium ions generated during discharging enter.

The concentration of the solid particles of the recess impregnation region A of the anode side is preferably 10 times the concentration of the solid particles of the deep region C of the anode side or more. A concentration of the particles of the deep region C of the anode side is preferably 3 volume % or less. When the concentration of the solid particles of the deep region C of the anode side is too high, since too many solid particles are between active material particles, the solid particles cause a resistance, the captured additive causes a side reaction, and an internal resistance increases.

For the same reason, the concentration of the solid particles of the recess impregnation region A of the cathode side is preferably 10 times the concentration of the solid particles of the deep region C of the cathode side or more. The concentration of particles of the deep region C of the cathode side is preferably 3 volume % or less. When the concentration of the solid particles of the deep region C of the cathode side is too high, since too many solid particles are between active material particles, the solid particles cause a resistance, the captured additive causes a side reaction, and an internal resistance increases.

(Concentration of Solid Particles)

The concentration of solid particles described above refers to a volume concentration (volume %) of solid particles, which is defined as an area percentage (("total area of particle cross section"÷"area of observation field of view")×100)(%) of a total area of cross sections of particles when an observation field of view is 2 μm×2 μm. Note that, when a concentration of solid particles of the recess impregnation region A is defined, the observation field of view is set, for example, in the vicinity of a center of a recess formed between adjacent particles in a width direction. Observation is performed using, for example, the SEM, an image obtained by photography is processed, and therefore it is possible to calculate the above areas.

(Thickness of the Recess Impregnation Region A, the Top Coat Region B, and the Deep Region C)

The thickness of the recess impregnation region A of the anode side is preferably 10% or more and 40% or less of the thickness of the anode active material layer 54B. When the thickness of the recess impregnation region A of the anode side is in the above range, it is possible to ensure an amount of necessary solid particles to be disposed in the recess and maintain a state in which an excess of the solid particles and the additive do not enter the deep region C. Further, more preferably, the thickness of the recess impregnation region A of the anode side is in the above range, and is twice the thickness of the top coat region B of the anode side or more. This is because it is possible to prevent a distance between electrodes from increasing and further improve an energy density. In addition, for the same reason, the thickness of the recess impregnation region A of the cathode side is more preferably twice the thickness of the top coat region B of the cathode side or more.

(Method of Measuring a Thickness of Regions)

When the thickness of the recess impregnation region A is defined, an average value of thicknesses of the recess impregnation region A in four different observation fields of view is set as the thickness of the recess impregnation region A. When the thickness of the top coat region B is defined, an average value of thicknesses of the top coat region B in four different observation fields of view is set as the thickness of the top coat region B. When the thickness of the deep region C is defined, an average value of thicknesses of the deep region C in four different observation fields of view is set as the thickness of the deep region C.

(Particle Size of Solid Particles)

As a particle size of solid particles, a particle size D50 is preferably "$2/\sqrt{3}-1$" times a particle size D50 of active material particles or less. In addition, as the particle size of the solid particles, a particle size D50 is more preferably 0.1 μm or more. As the particle size of the solid particles, a particle size D95 is preferably "$2/\sqrt{3}-1$" times a particle size D50 of active material particles or more. Particles having a large particle size block an interval between adjacent active material particles at a bottom of the recess and it is possible to suppress too many of the solid particles from entering the deep region C and a negative influence on a battery characteristic.

(Measurement of a Particle Size)

A particle size D50 of solid particles is, for example, a particle size at which 50% of particles having a smaller particle size are cumulated (a cumulative volume of 50%) in a particle size distribution in which solid particles after components other than solid particles are removed from electrolytes comprising solid particles are measured by a laser diffraction method. In addition, based on the measured particle size distribution, it is possible to obtain a value of a particle size D95 at a cumulative volume 95%. A particle size D50 of active materials is a particle size at which 50% of particles having a smaller particle size are cumulated (a cumulative volume of 50%) in a particle size distribution in which active material particles after components other than active material particles are removed from an active material layer comprising active material particles are measured by a laser diffraction method.

(Specific Surface Area of Solid Particles)

The specific surface area ($m^2/g$) is a BET specific surface area ($m^2/g$) measured by a BET method, which is a method of measuring a specific surface area. The BET specific surface area of solid particles is preferably 1 $m^2/g$ or more and 60 $m^2/g$ or less. When the BET specific surface area is in the above numerical range, an action of solid particles capturing at least one kind of the aromatic compounds represented by Formula (1B) to Formula (4B) increases, which is preferable. On the other hand, when the BET specific surface area is too large, since lithium ions are also captured, an output characteristic tends to decrease. Note that the specific surface area of the solid particles can be measured using, for example, solid particles after components other than solid particles are removed from electrolytes comprising solid particles in the same manner as described above.

(Amount of Solid Particles Added)

In view of obtaining a more excellent effect, with respect to electrolytes, as an amount of solid particles added, 1 mass % or more and 60 mass % or less is preferable, 2 mass % or more and 50 mass % or less is more preferable, and 5 mass % or more and 40 mass % or less is most preferable.

(Configuration Including the Recess Impregnation Region A, the Top Coat Region B, and the Deep Region C, which are Only on the Anode Side or the Cathode Side)

Note that the electrolyte layer 56 comprising solid particles may be formed only on both principal surfaces of the anode 54. In addition, the electrolyte layer 56 comprising no solid particles may be applied to and formed on both principal surfaces of the cathode 53. Similarly, the electrolyte layer 56 comprising solid particles may be formed only on both principal surfaces of the cathode 53. In addition, the electrolyte layer 56 without solid particles may be applied to and formed on both principal surfaces of the anode 54. In such cases, only the recess impregnation region A of the anode side, the top coat region B of the anode side, and the deep region C of the anode side are formed, and these regions are not formed on the cathode side or only the recess impregnation region A of the cathode side, the top coat region B of the cathode side, and the deep region C of the cathode side are formed, and these regions are not formed on the anode side.

(10-2) Method of Manufacturing an Exemplary Non-aqueous Electrolyte Battery

An exemplary non-aqueous electrolyte battery can be manufactured, for example, as follows.

(Method of Manufacturing a Cathode)

Cathode active materials, the conductive agent, and the binder are mixed to prepare a cathode mixture. The cathode mixture is dispersed in a solvent such as N-methyl-2-pyrrolidone to prepare a cathode mixture slurry in a paste form. Next, the cathode mixture slurry is applied to the cathode current collector 53A, the solvent is dried, and compression molding is performed by, for example, a roll press device. Therefore, the cathode active material layer 53B is formed and the cathode 53 is fabricated.

(Method of Manufacturing an Anode)

Anode active materials and the binder are mixed to prepare an anode mixture. The anode mixture is dispersed in a solvent such as N-methyl-2-pyrrolidone to prepare an anode mixture slurry in a paste form. Next, the anode mixture slurry is applied to the anode current collector 54A, the solvent is dried, and compression molding is performed by, for example, a roll press device. Therefore, the anode active material layer 54B is formed and the anode 54 is fabricated.

(Preparation of a Non-aqueous Electrolyte Solution)

An electrolyte salt in dissolved in a non-aqueous solvent and at least one kind of the aromatic compounds represented by Formula (1B) to Formula (4B) is added to prepare the non-aqueous electrolyte solution.

(Solution Coating)

A coating solution comprising a non-aqueous electrolyte solution, a matrix polymer compound, solid particles, and a dilution solvent (for example, dimethyl carbonate) is heated and applied to both principal surfaces of each of the cathode 53 and the anode 54. Then, the dilution solvent is evaporated and the electrolyte layer 56 is formed.

When the coating solution is heated and applied, electrolytes comprising solid particles can be impregnated into a recess between adjacent anode active material particles positioned on the outermost surface of the anode active material layer 54B and the deep region C inside the anode active material layer 54B. In this case, when solid particles are filtered in the recess between adjacent particles, a concentration of particles in the recess impregnation region A of the anode side increases. Accordingly, it is possible to set a difference of concentrations of particles between the recess impregnation region A and the deep region C. Similarly, when the coating solution is heated and applied, electrolytes comprising solid particles can be impregnated into a recess between adjacent cathode active material particles positioned on the outermost surface of the cathode active material layer 53B and the deep region C inside the cathode active material layer 53B. In this case, when solid particles are filtered in the recess between adjacent particles, a concentration of particles in the recess impregnation region A of the cathode side increases. Accordingly, it is possible to set a difference of concentrations of particles between the recess impregnation region A and the deep region C.

When the excess coating solution is scraped off after the coating solution is applied, it is possible to prevent a distance between electrodes from extending unintentionally. In addition, by scraping a surface of the coating solution, it is possible to dispose more solid particles in the recess between adjacent active material particles, and a ratio of solid particles of the top coat region B decreases. Accordingly, most of the solid particles are intensively disposed in the recess impregnation region A, and the additive can further accumulate in the recess impregnation region A.

Note that solution coating may be performed in the following manner. A coating solution (a coating solution excluding particles) comprising a non-aqueous electrolyte solution, a matrix polymer compound, and a dilution solvent (for example, dimethyl carbonate) is applied to both principal surfaces of the cathode 53, and the electrolyte layer 56 comprising no solid particles may be formed. In addition, no electrolyte layer 56 is formed on one principal surface or both principal surfaces of the cathode 53, and the electrolyte layer 56 comprising the same solid particles may be formed only on both principal surfaces of the anode 54. A coating solution (a coating solution excluding particles) comprising a non-aqueous electrolyte solution, a matrix polymer compound, and a dilution solvent (for example, dimethyl carbonate) is applied to both principal surfaces of the anode 54, and the electrolyte layer 56 comprising no solid particles may be formed. In addition, no electrolyte layer 56 is formed on one principal surface or both principal surfaces of the anode 54, and the electrolyte layer 56 comprising the same solid particles may be formed only on both principal surfaces of the cathode 53.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 on which the electrolyte layer 56 is formed and the anode 54 on which the electrolyte layer 56 is formed are laminated through the separator 55 to prepare a laminated body. Then, the laminated body is wound in a longitudinal direction, the protection tape 57 is adhered to the outermost peripheral portion and the wound electrode body 50 is formed.

Finally, for example, the wound electrode body 50 is inserted into the package member 60, and outer periphery portions of the package member 60 are enclosed in close contact with each other by thermal fusion bonding. In this case, the adhesive film 61 is inserted between the package member 60 and each of the cathode lead 51 and the anode lead 52. Accordingly, the non-aqueous electrolyte battery shown in FIG. 1 and FIG. 2 is completed.

[Modification Example 10-1]

The non-aqueous electrolyte battery according to the tenth embodiment may also be fabricated as follows. The fabrication method is the same as the method of manufacturing an exemplary non-aqueous electrolyte battery described above except that, in the solution coating process of the method of manufacturing an exemplary non-aqueous electrolyte battery, in place of applying the coating solution to both surfaces of at least one electrode of the cathode 53 and the anode 54, the coating solution is formed on at least one principal surface of both principal surfaces of the separator 55, and then a heating and pressing process is additionally performed.

[Method of Manufacturing a Non-aqueous Electrolyte Battery of Modification Example 10-1]

(Fabrication of a Cathode, an Anode, and a Separator, and Preparation of a Non-aqueous Electrolyte Solution)

In the same manner as in the method of manufacturing an exemplary non-aqueous electrolyte battery, the cathode 53, the anode 54 and the separator 55 are fabricated and the non-aqueous electrolyte solution is prepared.

(Solution Coating)

A coating solution comprising a non-aqueous electrolyte solution, a resin, solid particles, and a dilution solvent (for example, dimethyl carbonate) is applied to at least one surface of both surfaces of the separator 55. Then, the dilution solvent is evaporated and the electrolyte layer 56 is formed.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54, and the electrolyte layer 56 are laminated through the formed separator 55 to prepare a laminated body. Then, the laminated body is wound in a longitudinal direction, the protection tape 57 is adhered to the outermost peripheral portion, and the wound electrode body 50 is formed.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Finally, a depression portion is formed by deep drawing the package member 60 formed of a laminated film, the wound electrode body 50 is inserted into the depression portion, an unprocessed part of the package member 60 is folded at an upper part of the depression portion, and a peripheral portion of the depression portion is thermally welded. In this case, the adhesive film 61 is inserted between the package member 60 and each of the cathode lead 51 and the anode lead 52. In this manner, the desired non-aqueous electrolyte battery can be obtained.

[Modification Example 10-2]

While the configuration using gel-like electrolytes has been exemplified in the tenth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 10-2]

(Preparation of a Cathode, an Anode, and a Non-aqueous Electrolyte Solution)

In the same manner as in the method of manufacturing an exemplary non-aqueous electrolyte battery, the cathode 53 and the anode 54 are fabricated and the non-aqueous electrolyte solution is prepared.

(Coating and Formation of a Solid Particle Layer)

Next, paint is applied to at least one principal surface of both principal surfaces of the anode 54 by a coating method, the solvent is then removed by drying and a solid particle layer is formed. As the paint, for example, a mixture of solid particles, a binder polymer compound (a resin) and a solvent can be used. On the outermost surface of the anode active material layer 54B on which the solid particle layer is applied and formed, solid particles are filtered in the recess between adjacent anode active material particles positioned on the outermost surface of the anode active material layer 54B, and a concentration of particles of the recess impregnation region A of the anode side increases. Similarly, the same paint as described above is applied to both principal surfaces of the cathode 53 by a coating method, the solvent is then removed by drying, and a solid particle layer is formed. On the outermost surface of the cathode active material layer 53B on which the solid particle layer is applied and formed, solid particles are filtered in the recess between adjacent cathode active material particles positioned on the outermost surface of the cathode active material layer 54B, and a concentration of particles of the recess impregnation region A of the cathode side increases. For example, solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval between particles at a bottom of the recess is filled with solid particles having a large particle size and solid particles can be easily filtered.

Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of solid particles of the top coat region B decreases. Accordingly, most of the solid particles are intensively disposed in the recess impregnation region, and at least one kind of the aromatic compounds represented by Formula (1B) to Formula (4B) can further accumulate in the recess impregnation region A.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54 are laminated through the separator 55 and wound, the protection tape 57 is adhered to the outermost peripheral portion, and a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the non-aqueous electrolyte solution is injected into the package member 60, and the wound body is impregnated with the non-aqueous electrolyte solution. Then, an opening of the package member 60 is sealed by thermal fusion bonding under a vacuum atmosphere. In this manner, the desired non-electrolyte secondary battery can be obtained.

[Modification Example 10-3]

The non-aqueous electrolyte battery according to the tenth embodiment may be fabricated as follows.

[Method of Manufacturing a Non-aqueous Electrolyte Battery of Modification Example 10-3]

(Fabrication of a Cathode and an Anode)

In the same manner as in the method of manufacturing an exemplary non-aqueous electrolyte battery, the cathode 53 and the anode 54 are fabricated.

(Coating and Formation of a Solid Particle Layer)

Next, in the same manner as in Modification Example 10-2, a solid particle layer is formed on at least one principal surface of both principal surfaces of the anode. In the same manner, a solid particle layer is formed on at least one principal surface of both principal surfaces of the cathode.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Assembly of the Non-aqueous Electrolyte Battery)

Next, in the same manner as in Modification Example 10-2, a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 10-4]

The non-aqueous electrolyte battery according to the tenth embodiment may be fabricated as follows.

[Method of Manufacturing a Non-aqueous Electrolyte Battery of Modification Example 10-4]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated and the non-aqueous electrolyte solution is prepared.

(Formation of a Solid Particle Layer)

Next, in the same manner as in Modification Example 10-2, a solid particle layer is formed on at least one principal surface of both principal surfaces of the anode 54. Similarly, a solid particle layer is formed on at least one principal surface of both principal surfaces of the cathode 53.

(Coating and Formation of a Matrix Resin Layer)

Next, a coating solution comprising a non-aqueous electrolyte solution, a matrix polymer compound, and a dispersing solvent such as N-methyl-2-pyrrolidone is applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 10-5]

While the configuration using gel-like electrolytes has been exemplified in the tenth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 10-5]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated, and the non-aqueous electrolyte solution is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, the cathode 53 and the anode 54 are laminated and wound through the separator 55, the protection tape 57 is adhered to the outermost peripheral portion, and a wound body serving as a precursor of the wound electrode body 50 is formed.

(Heating and Pressing Process)

Next, before the electrolyte solution is injected into the package member 60, the wound body is put into a packaging material such as a latex tube and sealed, and subjected to warm pressing under hydrostatic pressure. Accordingly, solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape. Next, the non-aqueous electrolyte solution is prepared and injected into the package member 60. The wound body is impregnated with the non-aqueous electrolyte solution, and an opening of the package member 60 is then sealed by thermal fusion bonding under a vacuum atmosphere. In this manner, the desired non-aqueous electrolyte battery can be obtained.

[Modification Example 10-6]

The non-aqueous electrolyte battery according to the tenth embodiment may be fabricated as follows.

[Method of Manufacturing a Non-aqueous Electrolyte Battery of Modification Example 10-6]

(Fabrication of a Cathode and an Anode)

First, in the same manner as in the method of manufacturing an exemplary non-aqueous electrolyte battery, the cathode 53 and the anode 54 are fabricated.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, in the same manner as in Modification Example 10-2, a wound body serving as a precursor of the wound electrode body 50 is formed.

(Heating and Pressing Process)

Next, before the non-aqueous electrolyte solution is injected into the package member 60, the wound body is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 10-7]

The non-aqueous electrolyte battery according to the tenth embodiment may be fabricated as follows.

[Method of Manufacturing a Non-aqueous Electrolyte Battery of Modification Example 10-7]

(Fabrication of a Cathode and an Anode)

First, in the same manner as in the method of manufacturing an exemplary non-aqueous electrolyte battery, the cathode 53 and the anode 54 are fabricated. Next, solid particles and the matrix polymer compound are applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 10-8]

In the example of the tenth embodiment and Modification Example 10-1 to Modification Example 10-7 described above, the non-aqueous electrolyte battery in which the wound electrode body 50 is packaged with the package member 60 has been described. However, as shown in FIGS. 4A to 4C, a stacked electrode body 70 may be used in place of the wound electrode body 50. FIG. 4A is an external view of the non-aqueous electrolyte battery in which the stacked electrode body 70 is housed. FIG. 4B is a dissembled perspective view showing a state in which the stacked electrode body 70 is housed in the package member 60. FIG. 4C is an external view showing an exterior of the non-aqueous electrolyte battery shown in FIG. 4A seen from a bottom side.

As the stacked electrode body 70, the stacked electrode body 70 in which a rectangular cathode 73 and a rectangular anode 74 are laminated through a rectangular separator 75, and fixed by a fixing member 76 is used. Although not shown, when the electrolyte layer is formed, the electrolyte layer is provided in contact with the cathode 73 and the anode 74. For example, the electrolyte layer (not shown) is provided between the cathode 73 and the separator 75, and between the anode 74 and the separator 75. The electrolyte layer is the same as the electrolyte layer 56 described above. A cathode lead 71 connected to the cathode 73 and an anode lead 72 connected to the anode 74 are led out from the stacked electrode body 70. The adhesive film 61 is provided between the package member 60 and each of the cathode lead 71 and the anode lead 72.

Note that a method of manufacturing a non-aqueous electrolyte battery is the same as the method of manufacturing a non-aqueous electrolyte battery in the example of the tenth embodiment and Modification Example 10-1 to Modification Example 10-7 described above except that a stacked electrode body is fabricated in place of the wound electrode body 70, and a laminated body (having a configuration in which the electrolyte layer is removed from the stacked electrode body 70) is fabricated in place of the wound body.

11. Eleventh Embodiment

In the eleventh embodiment of the present technology, a cylindrical non-aqueous electrolyte battery (a battery) will be described. The non-aqueous electrolyte battery is, for example, a non-aqueous electrolyte secondary battery in which charging and discharging are possible. Also, a lithium ion secondary battery is exemplified.

(11-1) Configuration of an Example of the Non-aqueous Electrolyte Battery

FIG. 5 is a cross-sectional view of an example of the non-aqueous electrolyte battery according to the eleventh embodiment. The non-aqueous electrolyte battery is, for example, a non-aqueous electrolyte secondary battery in which charging and discharging are possible. The non-aqueous electrolyte battery, which is a so-called cylindrical type, includes non-aqueous liquid electrolytes, which are not shown, (hereinafter, appropriately referred to as the non-aqueous electrolyte solution) and a wound electrode body 90 in which a band-like cathode 91 and a band-like anode 92 are wound through a separator 93 inside a substantially hollow cylindrical battery can 81.

The battery can 81 is made of, for example, nickel-plated iron, and includes one end that is closed and the other end that is opened. A pair of insulating plates 82*a* and 82*b* perpendicular to a winding peripheral surface are disposed inside the battery can 81 so as to interpose the wound electrode body 90 therebetween.

Exemplary materials of the battery can 81 include iron (Fe), nickel (Ni), stainless steel (SUS), aluminum (Al), and titanium (Ti). In order to prevent electrochemical corrosion by the non-aqueous electrolyte solution according to charge and discharge of the non-aqueous electrolyte battery, the battery can 81 may be subjected to plating of, for example, nickel. At an open end of the battery can 81, a battery lid 83 serving as a cathode lead plate, a safety valve mechanism, and a positive temperature coefficient (PTC) element 87 provided inside the battery lid 83 are attached by being caulked through a gasket 88 for insulation sealing.

The battery lid 83 is made of, for example, the same material as that of the battery can 81, and an opening for discharging a gas generated inside the battery is provided. In the safety valve mechanism, a safety valve 84, a disk holder 85 and a blocking disk 86 are sequentially stacked. A protrusion part 84*a* of the safety valve 84 is connected to a cathode lead 95 that is led out from the wound electrode body 90 through a sub disk 89 disposed to cover a hole 86*a* provided at a center of the blocking disk 86. Since the safety valve 84 and the cathode lead 95 are connected through the sub disk 89, the cathode lead 95 is prevented from being drawn from the hole 86*a* when the safety valve 84 is reversed. In addition, the safety valve mechanism is electrically connected to the battery lid 83 through the positive temperature coefficient element 87.

When an internal pressure of the non-aqueous electrolyte battery becomes a predetermined level or more due to an internal short circuit of the battery or heat from the outside of the battery, the safety valve mechanism reverses the safety valve 84, and disconnects an electrical connection of the protrusion part 84*a*, the battery lid 83 and the wound electrode body 90. That is, when the safety valve 84 is reversed, the cathode lead 95 is pressed by the blocking disk 86, and a connection of the safety valve 84 and the cathode lead 95 is released. The disk holder 85 is made of an insulating material. When the safety valve 84 is reversed, the safety valve 84 and the blocking disk 86 are insulated.

In addition, when a gas is additionally generated inside the battery and an internal pressure of the battery further increases, a part of the safety valve 84 is broken and a gas can be discharged to the battery lid 83 side.

In addition, for example, a plurality of gas vent holes (not shown) are provided in the vicinity of the hole 86*a* of the blocking disk 86. When a gas is generated from the wound electrode body 90, the gas can be effectively discharged to the battery lid 83 side.

When a temperature increases, the positive temperature coefficient element 87 increases a resistance value, disconnects an electrical connection of the battery lid 83 and the wound electrode body 90 to block a current, and therefore prevents abnormal heat generation due to an excessive current. The gasket 88 is made of, for example, an insulating material, and has a surface to which asphalt is applied.

The wound electrode body 90 housed inside the non-aqueous electrolyte battery is wound around a center pin 94. In the wound electrode body 90, the cathode 91 and the anode 92 are sequentially laminated and wound through the separator 93 in a longitudinal direction. The cathode lead 95 is connected to the cathode 91. An anode lead 96 is connected to the anode 92. As described above, the cathode lead 95 is welded to the safety valve 84 and electrically connected to the battery lid 83, and the anode lead 96 is welded and electrically connected to the battery can 81.

FIG. 6 shows an enlarged part of the wound electrode body 90 shown in FIG. 5.

Hereinafter, the cathode 91, the anode 92, and the separator 93 will be described in detail.

[Cathode]

In the cathode 91, a cathode active material layer 91B comprising a cathode active material is formed on both surfaces of a cathode current collector 91A. As the cathode current collector 91A, for example, a metal foil such as aluminum (Al) foil, nickel (Ni) foil or stainless steel (SUS) foil, can be used.

The cathode active material layer 91B is configured to comprise one, two or more kinds of cathode materials that can occlude and release lithium as cathode active materials, and may comprise another material such as a binder or a conductive agent as necessary. Note that the same cathode active material, conductive agent and binder used in the tenth embodiment can be used.

The cathode 91 includes the cathode lead 95 connected to one end portion of the cathode current collector 91A by spot welding or ultrasonic welding. The cathode lead 95 is preferably formed of net-like metal foil, but there is no problem when a non-metal material is used as long as an electrochemically and chemically stable material is used and an electric connection is obtained. Examples of materials of the cathode lead 95 include aluminum (Al) and nickel (Ni).

[Anode]

The anode 92 has, for example, a structure in which an anode active material layer 92B is provided on both surfaces of an anode current collector 92A having a pair of opposed surfaces. Although not shown, the anode active material layer 92B may be provided only on one surface of the anode current collector 92A. The anode current collector 92A is formed of, for example, a metal foil such as copper foil.

The anode active material layer 92B is configured to comprise one, two or more kinds of anode materials that can occlude and release lithium as anode active materials, and may be configured to comprise another material such as a binder or a conductive agent, which is the same as in the cathode active material layer 91B, as necessary. Note that the same anode active material, conductive agent and binder used in the tenth embodiment can be used.

[Separator]

The separator 93 is the same as the separator 55 of the tenth embodiment.

[Non-aqueous Electrolyte Solution]

The non-aqueous electrolyte solution is the same as in the tenth embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the tenth embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B of the anode side and the deep region C of the anode side, which are only on the anode side, may be formed or the recess impregnation region A of the cathode side, the top coat region B of the cathode side and the deep region C of the cathode side, which are only on the cathode side, may be formed.

(11-2) Method of Manufacturing a Non-aqueous Electrolyte Battery (Method of Manufacturing a Cathode and Method of Manufacturing an Anode)

In the same manner as in the tenth embodiment, the cathode 91 and the anode 92 are fabricated.

(Formation of a Solid Particle Layer)

Next, paint is applied to at least one principal surface of both principal surfaces of the anode 92 by a coating method, the solvent is then removed by drying and a solid particle layer is formed. As the paint, for example, a mixture of solid particles, a binder polymer compound and a solvent can be used. On the outermost surface of the anode active material layer 92B on which the solid particle layer is applied and formed, solid particles are filtered in the recess between adjacent anode active material particles positioned on the outermost surface of the anode active material layer 92B, and a concentration of particles of the recess impregnation region A of the anode side increases. Similarly, the solid particle layer is formed on both principal surfaces of the cathode 91 by a coating method. On the outermost surface of the cathode active material layer 91B on which the solid particle layer is applied and formed, solid particles are filtered in the recess between adjacent cathode active material particles positioned on the outermost surface of the cathode active material layer 91B, and a concentration of particles of the recess impregnation region A of the cathode side increases. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval at a bottom of the recess is filled with particles having a large solid particle size, and solid particles can be easily filtered.

Note that, when the solid particle layer is applied and formed, if extra paint is scraped off, it is possible to prevent a distance between electrodes from extending unintentionally. In addition, by scraping a surface of the paint, more solid particles are sent to the recess between adjacent active material particles, and a ratio of the top coat region B decreases. Accordingly, most of the solid particles are intensively disposed in the recess impregnation region and at least one kind of the aromatic compounds represented by Formula (1B) to Formula (4B) can further accumulate in the recess impregnation region A.

(Method of Manufacturing a Separator)

Next, the separator 93 is prepared.

(Preparation of a Non-aqueous Electrolyte Solution)

An electrolyte salt is dissolved in a non-aqueous solvent to prepare the non-aqueous electrolyte solution.

(Assembly of the Non-aqueous Electrolyte Battery)

The cathode lead 95 is attached to the cathode current collector 91A by welding and the anode lead 96 is attached to the anode current collector 92A by welding. Then, the cathode 91 and the anode 92 are wound through the separator 93 to prepare the wound electrode body 90.

A distal end portion of the cathode lead 95 is welded to the safety valve mechanism and a distal end portion of the anode lead 96 is welded to the battery can 81. Then, a winding surface of the wound electrode body 90 is inserted between a pair of insulating plates 82*a* and 82*b* and accommodated inside the battery can 81. The wound electrode body 90 is accommodated inside the battery can 81, and the non-aqueous electrolyte solution is then injected into the battery can 81 and impregnated into the separator 93. Then, at the opened end of the battery can 81, the safety valve mechanism including the battery lid 83, the safety valve 84 and the like, and the positive temperature coefficient element 87 are caulked and fixed through the gasket 88. Accordingly, the non-aqueous electrolyte battery of the present technology shown in FIG. 5 is formed.

In the non-aqueous electrolyte battery, when charge is performed, for example, lithium ions are released from the cathode active material layer 91B, and occluded in the anode active material layer 92B through the non-aqueous electrolyte solution impregnated into the separator 93. In addition, when discharge is performed, for example, lithium ions are released from the anode active material layer 92B, and occluded in the cathode active material layer 91B through the non-aqueous electrolyte solution impregnated into the separator 93.

[Modification Example 11-1]

The non-aqueous electrolyte battery according to the eleventh embodiment may be fabricated as follows.

(Fabrication of a Cathode and an Anode)

First, in the same manner as in the example of the non-aqueous electrolyte battery, the cathode 91 and the anode 92 are fabricated.

(Formation of a Solid Particle Layer)

Next, paint is applied to at least one principal surface of both principal surfaces of the separator 93 by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 90 is formed.

(Heating and Pressing Process)

Before the wound electrode body 90 is accommodated inside the battery can 81, the wound electrode body 90 is put into a packaging material such as a latex tube and sealed, and subjected to warm pressing under hydrostatic pressure. Accordingly, solid particles move to the recess between adjacent anode active material particles positioned on the outermost surface of the anode active material layer 92B, and the concentration of the solid particles of the recess impregnation region A of the anode side increases. The solid particles move to the recess between adjacent cathode active material particles positioned on the outermost surface of the cathode active material layer 91B and the concentration of the solid particles of the recess impregnation region A of the cathode side increases.

Processes thereafter are the same as those in the example described above, and the desired non-aqueous electrolyte battery can be obtained.

12. Twelfth Embodiment

In the twelfth embodiment, a rectangular non-aqueous electrolyte battery will be described.

(12-1) Configuration of an Example of the Non-aqueous Electrolyte Battery

FIG. 7 shows a configuration of an example of the non-aqueous electrolyte battery according to the twelfth embodiment. The non-aqueous electrolyte battery is a so-called rectangular battery, and a wound electrode body 120 is housed inside a rectangular exterior can 111.

The non-aqueous electrolyte battery includes the rectangular exterior can 111, the wound electrode body 120 serving as a power generation element accommodated inside the exterior can 111, a battery lid 112 configured to close an opening of the exterior can 111, an electrode pin 113 provided at substantially the center of the battery lid 112, and the like.

The exterior can 111 is formed as a hollow rectangular tubular body with a bottom using, for example, a metal having conductivity such as iron (Fe). The exterior can 111 preferably has a configuration in which, for example, nickel-plating is performed on or a conductive paint is applied to an inner surface so that conductivity of the exterior can 111 increases. In addition, an outer peripheral surface of the exterior can 111 is covered with an exterior label formed by, for example, a plastic sheet or paper, and an insulating paint may be applied thereto for protection. The battery lid 112 is made of, for example, a metal having conductivity such as iron (Fe), the same as in the exterior can 111.

The cathode and the anode are laminated and wound through the separator in an elongated oval shape, and therefore the wound electrode body 120 is obtained. Since the cathode, the anode, the separator and the non-aqueous electrolyte solution are the same as those in the tenth embodiment, detailed descriptions thereof will be omitted.

In the wound electrode body 120 having such a configuration, a plurality of cathode terminals 121 connected to the cathode current collector and a plurality of anode terminals connected to the anode current collector are provided. All of the cathode terminals 121 and the anode terminals are led out to one end of the wound electrode body 120 in an axial direction. Then, the cathode terminals 121 are connected to a lower end of the electrode pin 113 by a fixing method such as welding. In addition, the anode terminals are connected to an inner surface of the exterior can 111 by a fixing method such as welding.

The electrode pin 113 is made of a conductive shaft member, and is maintained by an insulator 114 while a head thereof protrudes from an upper end. The electrode pin 113 is fixed to substantially the center of the battery lid 112 through the insulator 114. The insulator 114 is formed of a high insulating material, and is engaged with a through-hole 115 provided at a surface side of the battery lid 112. In addition, the electrode pin 113 passes through the through-hole 115, and a distal end portion of the cathode terminal 121 is fixed to a lower end surface thereof.

The battery lid 112 to which the electrode pin 113 or the like is provided is engaged with the opening of the exterior can 111, and a contact surface of the exterior can 111 and the battery lid 112 are bonded by a fixing method such as welding. Accordingly, the opening of the exterior can 111 is sealed by the battery lid 112 and is in an air tight and liquid tight state. At the battery lid 112, an internal pressure release mechanism 116 configured to release (dissipate) an internal pressure to the outside by breaking a part of the battery lid 112 when a pressure inside the exterior can 111 increases to a predetermined value or more is provided.

The internal pressure release mechanism 116 includes two first opening grooves 116*a* (one of the first opening grooves 116*a* is not shown) that linearly extend in a longitudinal direction on an inner surface of the battery lid 112 and a second opening groove 116*b* that extends in a width direction perpendicular to a longitudinal direction on the same inner surface of the battery lid 112 and whose both ends communicate with the two first opening grooves 116*a*. The two first opening grooves 116*a* are provided in parallel to each other along a long side outer edge of the battery lid 112 in the vicinity of an inner side of two sides of a long side positioned to oppose the battery lid 112 in a width direction.

In addition, the second opening groove 116*b* is provided to be positioned at substantially the center between one short side outer edge in one side in a longitudinal direction of the electrode pin 113 and the electrode pin 113.

The first opening groove 116*a* and the second opening groove 116*b* have, for example, a V-shape whose lower surface side is opened in a cross sectional shape. Note that the shape of the first opening groove 116*a* and the second opening groove 116*b* is not limited to the V-shape shown in this embodiment. For example, the shape of the first opening groove 116*a* and the second opening groove 116*b* may be a U-shape or a semicircular shape.

An electrolyte solution inlet 117 is provided to pass through the battery lid 112. After the battery lid 112 and the exterior can 111 are caulked, the electrolyte solution inlet 117 is used to inject the non-aqueous electrolyte solution, and is sealed by a sealing member 118 after the non-aqueous electrolyte solution is injected. For this reason, when gel electrolytes are formed between the separator and each of the cathode and the anode in advance to fabricate the wound electrode body, the electrolyte solution inlet 117 and the sealing member 118 may not be provided.

[Separator]

As the separator, the same separator as in the tenth embodiment is used.

[Non-aqueous Electrolyte Solution]

The non-aqueous electrolyte solution is the same as in the tenth embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the first embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B and the deep region C, which are only on the anode side, may be formed or the recess impregnation region A of the cathode side, the top coat region B of the cathode side and the deep region C of the cathode side, which are only on the cathode side, may be formed.

(12-2) Method of Manufacturing a Non-aqueous Electrolyte Battery

The non-aqueous electrolyte battery can be manufactured, for example, as follows.

[Method of Manufacturing a Cathode and an Anode]

The cathode and the anode can be fabricated by the same method as in the tenth embodiment.

(Formation of a Solid Particle Layer)

Next, paint is applied to at least one principal surface of both principal surfaces of the anode by a coating method, the solvent is then removed by drying and a solid particle layer is formed. As the paint, for example, a mixture of solid particles, a binder polymer compound and a solvent can be used. On the outermost surface of the anode active material layer on which the solid particle layer is applied and formed, solid particles are filtered in the recess between adjacent anode active material particles positioned on the outermost surface of the anode active material layer, and a concentration of particles of the recess impregnation region A of the anode side increases. Similarly, a solid particle layer is formed on both principal surfaces of the cathode by a coating method. On the outermost surface of the cathode active material layer on which the solid particle layer is applied and formed, solid particles are filtered in the recess between adjacent cathode active material particles positioned on the outermost surface of the cathode active material layer, and a concentration of particles of the recess impregnation region A of the cathode side increases. Solid particles having a particle size D95 that is adjusted to be a predetermined times a particle size D50 or more are preferably used as the solid particles. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of the top coat region B decreases. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of particles of the top coat region B decreases. Accordingly, most of the solid particles are intensively disposed in the recess impregnation region A, and at least one kind of the aromatic compounds represented by Formula (1B) to Formula (4B) can further accumulate in the recess impregnation region A.

(Assembly of the Non-aqueous Electrolyte Battery)

The cathode, the anode, and the separator (in which a particle-comprising resin layer is formed on at least one surface of a base material) are sequentially laminated and wound to fabricate the wound electrode body 120 that is wound in an elongated oval shape. Next, the wound electrode body 120 is housed in the exterior can 111.

Then, the electrode pin 113 provided in the battery lid 112 and the cathode terminal 121 led out from the wound electrode body 120 are connected. Also, although not shown, the anode terminal led out from the wound electrode body 120 and the battery can are connected. Then, the exterior can 111 and the battery lid 112 are engaged, the non-aqueous electrolyte solution is injected though the electrolyte solution inlet 117, for example, under reduced pressure and sealing is performed by the sealing member 118. In this manner, the non-aqueous electrolyte battery can be obtained.

[Modification Example 12-1]

The non-aqueous electrolyte battery according to the twelfth embodiment may be fabricated as follows.

(Fabrication of a Cathode and an Anode)

First, in the same manner as in the example of the non-aqueous electrolyte battery, the cathode and the anode are fabricated.

(Formation of a Solid Particle Layer)

Next, paint is applied to at least one principal surface of both principal surfaces of the separator by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 120 is formed. Next, before the wound electrode body 120 is housed inside the exterior can 111, the wound electrode body 120 is put into a packaging material such as a latex tube and sealed, and subjected to warm pressing under hydrostatic pressure. Accordingly, solid particles move (are pushed) to the recess between adjacent anode active material particles positioned on the outermost surface of the anode active material layer, and the concentration of the solid particles of the recess impregnation region A of the anode side increases. The solid particles move to the recess between adjacent cathode active material particles positioned on the outermost surface of the cathode active material layer, and the concentration of the solid particles of the recess impregnation region A of the cathode side increases.

Then, similarly to the example described above, the desired non-aqueous electrolyte battery can be obtained.

<Thirteenth Embodiment to Fifteenth Embodiment>

(Overview of the Present Technology)

First, in order to facilitate understanding of the present technology, an overview of the present technology will be described. A high capacity battery having no internal short circuit fault, and particularly, having an excellent resistance to a short circuit due to precipitation of a contamination metal is necessary for a smart phone, a tablet, an electric tool, and an electric vehicle.

When metal particles are mixed inside the battery, the metal is passivated by an additive in order to suppress dissolution, and a distance between electrodes is set to be longer so that a short circuit is less likely to occur. However, in this case, a capacity of the battery decreases. In recent years, in order to address such a decrease in the battery capacity, a high charge voltage has been used to compensate for the battery capacity. However, compatibility with a high capacity is difficult because metal particles or metal ions inside the cathode are eluted, large dendritic precipitates are formed, a distance between electrodes becomes shorter due to large expansion of the electrode, and heat is generated due to a short circuit in severe cases.

When metal ions are precipitated in the vicinity of the separator, thin dendritic precipitates that just began to grow strike the separator, are broken due to expansion and contraction between electrodes during charging and discharging, and do not grow very large. On the other hand, metals precipitated in the recess of a valley between adjacent active material particles of the outmost layer of the electrode can be protected by active materials and can grow very large. Eventually, the thick dendritic precipitates proceed to grow, penetrate through the separator, and cause a short circuit.

The thick dendritic precipitates are likely to be generated in the recess between adjacent active material particles of the outermost surface of the anode. That is, since the separator is in contact with the vicinity of the apex of the active material, the precipitates are less likely to be thicker but because the recess is distant from the separator, the precipitates are likely to be thick and grow in the recess.

The inventors have conducted extensive studies and found that, when a nitrile-based additive is used at a high concentration, it reacts with an active site "kink" at a growth tip of precipitates and is deactivated, and the growth of the precipitates in a counter electrode direction is suppressed. As the concentration becomes higher, the effect becomes stronger. However, there are problems in that a film is formed on a surface of the active material, a resistance of lithium ion permeability increases, and cycle performance decreases. Selectively disposing the nitrile-based additive in the recess part, and preferably, disposing the nitrile-based additive at a necessary minimum amount, are effective in addressing such problems.

The inventors found that solid particles such as boehmite have a property of strongly attracting the dinitrile compound. In the present technology, at least one kind of the dinitrile compounds represented by Formula (1C) is added (preferably, a small amount is added) and solid particles are disposed in the recess between adjacent active material particles on a surface of the electrode. Accordingly, at least one kind of the dinitrile compounds represented by Formula (1C) of the present technology is concentrated at the recess, metal precipitates are controlled only in a surface direction, the precipitates are housed inside the recess, and therefore it is possible to suppress a short circuit. It is possible to suppress a short circuit of a high capacity battery at a high charge voltage at which a short circuit is likely to occur, and it is possible to provide a high capacity battery in which a short circuit is less likely to occur at a high charge voltage. Further, it is possible to obtain an effect of suppressing a negative influence on a cycle by retaining at least one kind of the dinitrile compounds represented by Formula (1C) in the recess. Cycle performance can be compatible with a resistance to a short circuit due to metal precipitation, which was not achieved in the related art.

The recess between cathode active material particles of the cathode side is also available as a part in which solid particles are disposed. Since the recess of the cathode side is opposed to a surface of the anode in close proximity, when at least one kind of the dinitrile compounds represented by Formula (1C) is attracted to the recess between cathode active material particles of the cathode side, at least one kind of the dinitrile compounds represented by Formula (1C) can also be passively supplied to the recess of the anode side opposed in close proximity. Therefore, solid particles may be disposed only in the recess of the cathode side, disposed only in the recess of the anode side, or disposed in both recesses of the cathode side and the anode side.

Hereinbelow, embodiments of the present technology are described with reference to the drawings. The description is given in the following order.

13. Thirteenth embodiment (example of a laminated film-type battery)
14. Fourteenth embodiment (example of a cylindrical battery)
15. Fifteenth embodiment (example of a rectangular battery)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

13. Thirteenth Embodiment

In a thirteenth embodiment of the present technology, an example of a laminated film-type battery is described. The battery is, for example, a non-aqueous electrolyte battery, a secondary battery in which charging and discharging are possible, or a lithium-ion secondary battery.

(13-1) Configuration Example of the Non-Aqueous Electrolyte Battery

FIG. 1 shows the configuration of a non-aqueous electrolyte battery according to the thirteenth embodiment. The non-aqueous electrolyte battery is of what is called a laminated film type; and in the battery, a wound electrode body 50 equipped with a cathode lead 51 and an anode lead 52 is housed in a film-shaped package member 60.

Each of the cathode lead 51 and the anode lead 52 is led out from the inside of the package member 60 toward the outside in the same direction, for example. The cathode lead 51 and the anode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the cathode lead 51 and the anode lead 52 for the purpose of increasing the adhesion between the inner resin layer of the package member 60 and each of the cathode lead 51 and the anode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

FIG. 2 shows a cross-sectional structure along line I-I of the wound electrode body 50 shown in FIG. 1. As shown in FIG. 1, the wound electrode body 50 is a body in which a band-like cathode 53 and a band-like anode 54 are stacked and wound via a band-like separator 55 and an electrolyte layer 56, and the outermost peripheral portion is protected by a protection tape 57 as necessary.

(Cathode)

The cathode 53 has a structure in which a cathode active material layer 53B is provided on one surface or both surfaces of a cathode current collector 53A.

The cathode 53 is an electrode in which the cathode active material layer 53B comprising a cathode active material is formed on both surfaces of the cathode current collector 53A. Note that, although not shown, the cathode active material layer 53B may be provided only on one surface of the cathode current collector 53A. The anode current collector 54A is formed of, for example, a metal foil such as copper foil.

As the cathode current collector 53A, for example, a metal foil such as aluminum (Al) foil, nickel (Ni) foil or stainless steel (SUS) foil can be used.

The cathode active material layer 53B is configured to comprise, for example, a cathode active material, an electrically conductive agent, and a binder. As the cathode active material, one or more cathode materials that can occlude and release lithium may be used, and another material such as a binder or an electrically conductive agent may be comprised as necessary.

As the cathode material that can occlude and release lithium, for example, a lithium-comprising compound is preferable. This is because a high energy density is obtained. As the lithium-comprising compound, for example, a composite oxide comprising lithium and a transition metal element, a phosphate compound comprising lithium and a transition metal element, or the like is given. Of them, a material comprising at least one of the group consisting of cobalt (Co), nickel (Ni), manganese (Mn), and iron (Fe) as a transition metal element is preferable. This is because a higher voltage is obtained.

As the cathode material, for example, a lithium-comprising compound expressed by $Li_xM1O_2$ or $Li_yM2PO_4$ may be used. In the formula, M1 and M2 represent one or more transition metal elements. The values of x and y vary with the charging and discharging state of the battery, and are usually $0.05 \le x \le 1.10$ and $0.05 \le y \le 1.10$. As the composite oxide comprising lithium and a transition metal element, for example, a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ ($0<z<1$)), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}Ni_tO_4$ ($0<t<2$)) having the spinel structure, or the like is given. Of them, a composite oxide comprising cobalt is preferable. This is because a high capacity is obtained and also excellent cycle characteristics are obtained. As the phosphate compound comprising lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-comprising compounds mentioned above is coated with minute particles made of another of the lithium-comprising compounds may be used.

Other than these, as the cathode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not comprising lithium such as niobium diselenide ($NbSe_2$) (in particular, a layered compound or a spinel-type compound), and a lithium-comprising compound comprising lithium, and also an electrically conductive polymer such as sulfur, polyaniline, polythiophene, polyacetylene, or polypyrrole are given. The cathode material that can occlude and release lithium may be a material other than the above as a matter of course. The cathode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The cathode 53 includes a cathode lead 51 connected to an end portion of the cathode current collector 53A by spot welding or ultrasonic welding. The cathode lead 51 is preferably formed of net-like metal foil, but there is no problem when a non-metal material is used as long as an electrochemically and chemically stable material is used and an electric connection is obtained. Examples of materials of the cathode lead 51 include aluminum (Al), nickel (Ni), and the like.

(Anode)

The anode 54 has a structure in which an anode active material layer 54B is provided on one of or both surfaces of an anode current collector 54A, and is disposed such that the anode active material layer 54B is opposed to the cathode active material layer 53B.

Although not shown, the anode active material layer 54B may be provided only on one surface of the anode current collector 54A. The anode current collector 54A is formed of, for example, a metal foil such as copper foil.

The anode active material layer 54B is configured to comprise, as the anode active material, one or more anode materials that can occlude and release lithium, and may be configured to comprise another material such as a binder or an electrically conductive agent similar to that of the cathode active material layer 53B, as necessary.

In the non-aqueous electrolyte battery, the electrochemical equivalent of the anode material that can occlude and release lithium is set larger than the electrochemical equivalent of the cathode 53, and theoretically lithium metal is prevented from being precipitated on the anode 54 in the course of charging.

In the non-aqueous electrolyte battery, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the anode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the cathode active material is the same; and thus the amounts of the cathode active material and the anode active material are adjusted accordingly. Thereby, a high energy density is obtained.

As the anode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another anode material that can occlude and release lithium and can be increased in capacity, a material that can occlude and release lithium and comprises at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The anode material may be a simple substance, an alloy, or a compound of a metal element or a semi-metal element, or may be a material that includes a phase of one or more of them at least partly. Note that in the present technology, the alloy includes a material formed with two or more kinds of metal elements and a material comprising one or more kinds of metal elements and one or more kinds of semi-metal elements. Further, the alloy may comprise a non-metal element. Examples of its texture include a solid solution, a eutectic (eutectic mixture), an intermetallic compound, and one in which two or more kinds thereof coexist.

Examples of the metal element or semi-metal element comprised in this anode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the anode material, it is preferable to use a material comprising, as a constituent element, a metal element or a semi-metal element of 4B group in the short periodical table. It is more preferable to use a material comprising at least one of silicon (Si) and tin (Sn) as a constituent element. It is even more preferable to use a material comprising at least silicon. This is because silicon (Si) and tin (Sn) each have a high capability of occluding and releasing lithium, so that a high energy density can be obtained. Examples of the anode material comprising at least one of silicon and tin include a simple substance, an alloy, or a compound of silicon, a simple substance, an alloy, or a compound of tin, and a material comprising, at least partly, a phase of one or more kinds thereof.

Examples of the alloy of silicon include alloys comprising, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys comprising, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds comprising oxygen (O) or carbon (C), which may comprise any of the above-described second constituent elements in addition to tin (Sn) or silicon (Si).

Among them, as the anode material, an SnCoC-comprising material is preferable which comprises cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-comprising material may also comprise another constituent element as necessary. For example, it is preferable to comprise, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be comprised. This is because the capacity characteristics or cycling characteristics can be further increased.

Note that the SnCoC-comprising material has a phase comprising tin (Sn), cobalt (Co), and carbon (C), and this phase preferably has a low crystalline structure or an amorphous structure. Further, in the SnCoC-comprising material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-comprising material appears in a region lower than 284.5 eV, at least a part of carbon comprised in the SnCoC-comprising material is bound to a metal element or a semi-metal element, which is another constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-comprising material, the peak of the surface contamination carbon and the peak of the carbon in the SnCoC-comprising material are separated from each other by means of analysis using, for example, a commercially available software program. In the analysis of the waveform, the position of a main peak existing on the lowest binding energy side is used as an energy reference (284.8 eV).

As the anode material that can occlude and release lithium, for example, also a metal oxide, a polymer compound, or other materials that can occlude and release lithium are given. As the metal oxide, for example, a lithium titanium oxide comprising titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

(Separator)

The separator 55 is a porous membrane formed of an insulating membrane that has a large ion permeability and a prescribed mechanical strength. A non-aqueous electrolyte solution is retained in the pores of the separator 55.

The separator 55 is a porous membrane made of, for example, a resin. The porous membrane made of the resin is a membrane obtained by stretching a material such as a resin to be thinner and has a porous structure. For example, the porous membrane made of a resin is obtained when a material such as a resin is formed by a stretching and perforating method, a phase separation method, or the like. For example, in a stretching and opening method, first, a melt polymer is extruded from a T-die or a circular die and additionally subjected to heat treatment, and a crystal structure having high regularity is formed. Then, stretching is performed at low temperatures, and further high temperature stretching is performed. A crystal interface is detached to create an interval part between lamellas, and a porous structure is formed. In the phase separation method, a homogeneous solution prepared by mixing a polymer and a solvent at high temperature is used to form a film by a T-die method, an inflation method or the like, the solvent is then extracted by another volatile solvent, and therefore the porous membrane made of a resin can be obtained. Note that a method of preparing the porous membrane made of a resin is not limited to such methods, and methods proposed in the related art can be widely used. As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material comprising a porous membrane made of a polyolefin resin has good separability between the cathode 53 and the anode 54, and can further reduce the possibility of an internal short circuit.

The separator 55 may be a nonwoven fabric. The nonwoven fabric is a structure made by bonding or entangling or bonding and entangling fibers using a mechanical method, a chemical method and a solvent, or in a combination thereof, without weaving or knitting fibers. Most substances that can be processed into fibers can be used as a source material of the nonwoven fabric. By adjusting a shape such as a length and a thickness, the fiber can have a function according to an object and an application. A method of manufacturing the nonwoven fabric typically includes two processes, a process in which a laminate layer of fibers, which is a so-called fleece, is formed, and a bonding process in which fibers of the fleece are bonded. In each of the processes, various manufacturing methods are used and selected according to a source material, an object, and an application of the nonwoven fabric. For example, in the process in which the fleece is formed, a dry method, a wet method, a spun bond method, a melt blow method, and the like can be used. In the bonding process in which fibers of the fleece are bonded, a thermal bond method, a chemical bond method, a needle punching method, a spunlace method (a hydroentanglement method), a stitch bond method, and a steam jet method can be used.

As the nonwoven fabric, for example, a polyethylene terephthalate permeable membrane (a polyethylene terephthalate nonwoven fabric) using a polyethylene terephthalate (PET) fiber is used. Note that the permeable membrane refers to a membrane having permeability. Additionally, nonwoven fabrics using an aramid fiber, a glass fiber, a cellulose fiber, a polyolefin fiber, or a nylon fiber may be exemplified. The nonwoven fabric may be a fabric using two or more kinds of fibers.

Any thickness can be set as the thickness of the separator 55 to the extent that it is not less than the thickness that can keep necessary strength. The separator 55 is preferably set to such a thickness that the separator 55 provides insulation between the cathode 53 and the anode 54 to prevent a short circuit etc., has ion permeability for producing battery reaction via the separator 55 favorably, and can make the volumetric efficiency of the active material layer that contributes to battery reaction in the battery as high as possible. Specifically, the thickness of the separator 55 is preferably not less than 4 μm and not more than 20 μm, for example.

(Electrolyte Layer)

The electrolyte layer 56 includes a matrix polymer compound, a non-aqueous electrolyte solution and solid particles. The electrolyte layer 56 is a layer in which the non-aqueous electrolyte solution is retained by, for example, the matrix polymer compound, and is, for example, a layer formed of so-called gel-like electrolytes. Note that the solid particles may be comprised inside the anode active material layer 54B and/or inside a cathode active material layer 53B.

In addition, while details will be described in the following modification examples, a non-aqueous electrolyte solution, which comprises liquid electrolytes, may be used in place of the electrolyte layer 56. In this case, the non-aqueous electrolyte battery includes a wound body having a configuration in which the electrolyte layer 56 is removed from the wound electrode body 50 in place of the wound electrode body 50. The wound body is impregnated with the non-aqueous electrolyte solution, which comprises liquid electrolytes filled in the package member 60.

(Matrix Polymer Compound)

A resin having the property of compatibility with the solvent, or the like may be used as the matrix polymer compound (resin) that retains the electrolyte solution. As such a matrix polymer compound, a fluorine-comprising resin such as polyvinylidene difluoride or polytetrafluoroethylene, a fluorine-comprising rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C. or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

(Non-aqueous Electrolyte Solution)

The non-aqueous electrolyte solution comprises an electrolyte salt, a non-aqueous solvent in which the electrolyte salt is dissolved, and an additive.

(Electrolyte Salt)

The electrolyte salt comprises, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

(Non-aqueous Solvent)

As the non-aqueous solvent, for example, a lactone-based solvent such as γ-butyrolactone, γ-valerolactone, δ-valerolactone or ε-caprolactone, a carbonate ester-based solvent such as ethylene carbonate, propylene carbonate, butylene carbonate, vinylene carbonate, dimethyl carbonate, ethyl methyl carbonate or diethyl carbonate, an ether-based solvent such as 1,2-dimethoxyethane, 1-ethoxy-2-methoxy ethane, 1,2-diethoxyethane, tetrahydrofuran or 2-methyltetrahydrofuran, a nitrile-based solvent such as acetonitrile, a sulfolane-based solvent, a phosphoric acids solvent, a phosphate ester solvent, or a non-aqueous solvent such as a pyrrolidone may be used. As the solvent, any one kind may be used alone or a mixture of two or more kinds may be used.

(Additive)

The non-aqueous electrolyte solution comprises at least one kind of the dinitrile compounds represented by the following Formula (1C).

[Chem. 14]

$$NC—R61\text{-}CN \qquad (1C)$$

(in the formula, R61 represents a divalent hydrocarbon group or a divalent halogenated hydrocarbon group.)

The dinitrile compound represented by Formula (1C) is a compound including a nitrile group (referred to as a cyano group: —C≡N) at both terminals.

A kind of R61 is not particularly limited as long as it is a divalent hydrocarbon group or a divalent halogenated hydrocarbon group. This is because it is possible to obtain the above-described advantage without depending on the kind of R61 when the nitrile group is included at both terminals.

The divalent hydrocarbon group is, for example, an alkylene group having 1 to 12 carbon atoms, an alkenylene group having 2 to 12 carbon atoms, an alkynylene group having 2 to 12 carbon atoms, an arylene group having 6 to 18 carbon atoms, a cycloalkylene group having 3 to 18 carbon atoms, a group in which two or more thereof are bound, or a group in which at least some of hydrogen groups thereof are substituted with a halogen group. This is because it is possible to obtain the above-described advantage while ensuring the solubility and compatibility of the dinitrile compound. Among them, the alkylene group, the alkenylene group or the alkynylene group having the number of carbon atoms of 6 or less is more preferable. This is because it is possible to obtain excellent solubility and compatibility.

More specifically, the alkylene group is, for example, a methylene group ($—CH_2—$), an ethylene group ($—C_2H_4—$), a propylene group ($—C_3H_6—$) or a butylene group ($—C_4H_8—$). The alkenylene group is, for example, a vinylene group (—CH═CH—). The alkylene group is, for example, an ethynylene group (—C≡C—). The alkynylene group is, for example, a phenylene group. The cycloalkylene group is, for example, a cyclopropylene group or a cyclobutylene group.

The term "group in which two or more kinds are bound" refers to, for example, a group in which two or more kinds of the above-described alkylene groups are bound to be divalent as a whole. A group in which an alkylene group and an arylene group are bound is exemplified.

The term "divalent halogenated hydrocarbon group" refers to a group in which the above-described divalent hydrocarbon group is halogenated. More specifically, a group in which an alkylene group is halogenated is, for example, a difluoromethylene group ($—CF_2—$).

Here, specific examples of the dinitrile compounds represented by Formula (1C) include compounds represented by the following Formula (1C-1) to Formula (1C-11). However, the specific examples of the dinitrile compounds represented by Formula (1C) are not limited to the following listed examples.

[Chem. 15]

$$NC—CH_2—CN \qquad (1C\text{-}1)$$

$$NC—C_2H_4—CN \qquad (1C\text{-}2)$$

-continued (1C-3)
NC—$C_3H_6$—CN (1C-4)
NC—$C_4H_8$—CN (1C-5)
NC—$CF_2$—CN (1C-6)
NC—CH=CH—CN (1C-7)
NC—CF=CF—CN (1C-8)
NC—C≡C—CN (1C-9)
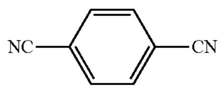

(1C-10)
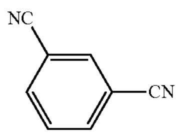

(1C-11)
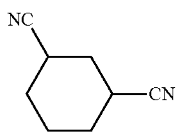

(Content of a Dinitrile Compound)

In view of obtaining a more excellent effect, with respect to the non-aqueous electrolyte solution, as a content of the dinitrile compounds represented by Formula (1C), 0.01 mass % or more and 10 mass % or less is preferable, 0.02 mass % or more and 9 mass % or less is more preferable, and 0.03 mass % or more and 5 mass % or less is most preferable.

(Solid Particles)

As the solid particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide ($Al(OH)_3$, (bayerite or gibbsite)), zinc hydroxide ($Zn(OH)_2$), or the like, an oxide hydroxide or a hydrated oxide such as boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), or magnesium oxide hydrate ($MgO_a.mH_2O$ (a=0.8 to 1.2, m=0.5 to 10)), a hydroxide hydrate such as magnesium hydroxide octahydrate, or the like may be preferably used. As the metal carbide, boron carbide ($B_4C$) or the like may be preferably used. As the metal nitride, silicon nitride ($Si_3N_4$), boron nitride (BN), aluminum nitride (AlN), titanium nitride (TIN), or the like may be preferably used.

As the metal fluoride, lithium fluoride (LiF), aluminum fluoride ($AlF_3$), calcium fluoride ($CaF_2$), barium fluoride ($BaF_2$), magnesium fluoride, or the like may be preferably used. As the phosphate compound, trilithium phosphate ($Li_3PO_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ($[SiO_4]^{4-}$). As the nesosilicate mineral, one that falls under olivines or garnets, or the like is given. As the nesosilicate mineral, more specifically, an olivine (a continuous solid solution of $Mg_2SiO_4$ (forsterite) and $Fe_2SiO_4$ (fayalite)), magnesium silicate (forsterite, $Mg_2SiO_4$), aluminum silicate ($Al_2SiO_5$; sillimanite, andalusite, or kyanite), zinc silicate (willemite, $Zn_2SiO_4$), zirconium silicate (zircon, $ZrSiO_4$), mullite ($3Al_2O_3.2SiO_2$ to $2Al_2O_3.SiO_2$), or the like is given.

The sorosilicate mineral is a group-structured silicate mineral formed of composite bond groups of Si—O tetrahedrons ($[Si_2O_7]^{6-}$ or $[Si_5O_{16}]^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ($[Si_3O_9]^{6-}$, $[Si_4O_{12}]^{8-}$, or $[Si_6O_{18}]^{12-}$). As the cyclosilicate mineral, beryl, tourmalines, or the like is given.

The inosilicate mineral is a fibrous silicate mineral having a chain-like form ($[Si_2O_6]^{4-}$) and a band-like form ($[Si_3O_9]^{6-}$, $[Si_4O_{11}]^{6-}$, $[Si_5O_{15}]^{10-}$, or $[Si_7O_{21}]^{4-}$) in which the linkage of Si—O tetrahedrons extends infinitely. As the inosilicate mineral, for example, one that falls under pyroxenes such as calcium silicate (wollastonite, $CaSiO_3$), one that falls under amphiboles, or the like is given.

The layered silicate mineral is a layer-like silicate mineral having network bonds of Si—O tetrahedrons ($[SiO_4]^{4-}$). Specific examples of the layered silicate mineral are described later.

The tectosilicate mineral is a silicate mineral of a three-dimensional network structure in which Si—O tetrahedrons ($[SiO_4]^{4-}$) form three-dimensional network bonds. As the tectosilicate mineral, quartz, feldspars, zeolites, or the like, an aluminosilicate ($aM_2O.bAl_2O_3.cSiO_2.dH_2O$; M being a metal element; a, b, c, and d each being an integer of 1 or more) such as a zeolite ($M_{2/n}O.Al_2O_3.xSiO_2.yH_2O$; M being a metal element; n being the valence of M; x≤2; y≥0), or the like is given.

As the asbestos, chrysotile, amosite, anthophyllite, or the like is given.

As the carbonate mineral, dolomite ($CaMg(CO_3)_2$), hydrotalcite ($Mg_6Al_2(CO_3)(OH)_{16}.4(H_2O)$), or the like is given.

As the oxide mineral, spinel ($MgAl_2O_4$) or the like is given.

As other minerals, strontium titanate ($SrTiO_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral comprises a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite ($Al_2Si_2O_5(OH)_4$), dickite, or the like is given. As one that falls under the pyrophyllite-talc group, for example, talc ($Mg_3Si_4O_{10}(OH)_2$), willemseite, pyrophyllite ($Al_2Si_4O_{10}(OH)_2$), or the like is given. As one that falls under the smectite group, for example, saponite [$(Ca/2,Na)_{0.33}(Mg,Fe^{2+})_3(Si,Al)_4O_{10}(OH)_2.4H_2O$], hectorite, sauconite, montmorillonite {$(Na,Ca)_{0.33}(Al,Mg)2Si_4O_{10}(OH)_2.nH_2O$; a clay comprising montmorillonite as a main component is called bentonite}, beidellite, nontronite, or the like is given. As one that falls under the mica group, for example, muscovite ($KAl_2(AlSi_3)O_{10}(OH)_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite ($Mg_9Si_{12}O_{30}(OH)_6(OH_2)_4.6H_2O$), palygorskite, or the like is given.

As other silicate minerals, a porous aluminosilicate such as a zeolite ($M_{2/n}O.Al_2O_3.xSiO_2.yH_2O$; M being a metal element; n being the valence of M; x≥2; y≥0), attapulgite [$(Mg,Al)2Si_4O_{10}(OH).6H_2O$], or the like is given.

As the layered carbonate mineral, hydrotalcite ($Mg_6Al_2(CO_3)(OH)_{16}.4(H_2O)$) or the like is given.

As the amorphous or quasicrystalline clay mineral, hisingerite, imogolite ($Al_2SiO_3(OH)$), allophane, or the like is given.

These inorganic particles may be used singly, or two or more of them may be mixed for use. The inorganic particle has also oxidation resistance; and when the electrolyte layer 56 is provided between the cathode 53 and the separator 55, the inorganic particle has strong resistance to the oxidizing environment near the cathode during charging.

The solid particle may be also an organic particle. As the material that forms the organic particle, melamine, melamine cyanurate, melamine polyphosphate, cross-linked polymethyl methacrylate (cross-linked PMMA), polyolefin, polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

In view of obtaining a more excellent effect, among such solid particles, particles of boehmite, aluminum hydroxide, magnesium hydroxide, and a silicate salt are preferable. In such solid particles, a deviation in the battery due to —O—H arranged in a sheet form in the crystal structure strongly selectively attracts the additive. Accordingly, it is possible to intensively accumulate the additive at the recess between active material particles more effectively.

(Configuration of an Inside of a Battery)

FIG. 3A and FIG. 3B are schematic cross-sectional views of an enlarged part of an inside of the non-aqueous electrolyte battery according to the thirteenth embodiment of the present technology. Note that the binder, the conductive agent and the like comprised in the active material layer are not shown.

As shown in FIG. 3A, the non-aqueous electrolyte battery according to the thirteenth embodiment of the present technology has a configuration in which particles 10, which are the solid particles described above, are disposed between the separator 55 and the anode active material layer 54B and inside the anode active material layer 54B at an appropriate concentration in appropriate regions. In such a configuration, three regions divided into a recess impregnation region A of an anode side, a top coat region B of an anode side and a deep region C of an anode side are formed.

Also, similarly, as shown in FIG. 3B, the non-aqueous electrolyte battery according to the thirteenth embodiment of the present technology has a configuration in which particles 10, which are the solid particles described above, are disposed between the separator 55 and the cathode active material layer 53B and inside the cathode active material layer 53B at an appropriate concentration in appropriate regions. In such a configuration, three regions divided into a recess impregnation region A of a cathode side, a top coat region B of a cathode side and a deep region C of a cathode side are formed.

(Recess Impregnation Region A, Top Coat Region B, and Deep Region C)

For example, the recess impregnation regions A of the anode side and the cathode side, the top coat regions B of the anode side and the cathode side, and the deep regions C of the anode side and the cathode side are formed as follows.

(Recess Impregnation Region A)

(Recess Impregnation Region of an Anode Side)

The recess impregnation region A of the anode side refers to a region including a recess between the adjacent anode active material particles 11 positioned on the outermost surface of the anode active material layer 54B comprising anode active material particles 11 serving as anode active materials. The recess impregnation region A is impregnated with the particles 10 and electrolytes comprising at least one kind of the dinitrile compounds represented by Formula (1C). Accordingly, the recess impregnation region A of the anode side is filled with the electrolytes comprising at least one kind of the dinitrile compounds represented by Formula (1C). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the anode active material particles 11 inside a region between two parallel lines L1 and L2 shown in FIG. 3A is classified as the recess impregnation region A of the anode side including the recess in which the electrolytes and the particles 10 are disposed. The two parallel lines L1 and L2 are drawn as follows. Within a predetermined visual field width (typically, a visual field width of 50 μm) shown in FIG. 3A, cross sections of the separator 55, the anode active material layer 54B, and a region between the separator 55 and the anode active material layer 54B are observed. In this observation field of view, the two parallel lines L1 and L2 perpendicular to a thickness direction of the separator 55 are drawn. The parallel line L1 is a line that passes through a position closest to the separator 55 in a cross-sectional image of the anode active material particles 11. The parallel line L2 is a line that passes through the deepest part in a cross-sectional image of the particles 10 included in the recess between the adjacent anode active material particles 11. The deepest part refers to a position farthest from the separator 55 in a thickness direction of the separator 55. Also, the cross section can be observed using, for example, a scanning electron microscope (SEM).

(Recess Impregnation Region of a Cathode Side)

The recess impregnation region A of the cathode side refers to a region including a recess between the adjacent cathode active material particles 12 positioned on the outermost surface of the cathode active material layer 53B comprising cathode active material particles 12 serving as cathode active materials. The recess impregnation region A is impregnated with the particles 10 serving as solid particles and the electrolytes comprising at least one kind of the dinitrile compounds represented by Formula (1C). Accordingly, the recess impregnation region A of the cathode side is filled with the electrolytes comprising at least one kind of the dinitrile compounds represented by Formula (1C). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the cathode active material particles 12 inside a region between two parallel lines L1 and L2 shown in FIG. 3B is classified as the recess impregnation region A of the cathode side including the recess in which the electrolytes and the particles 10 are disposed. The two parallel lines L1 and L2 are drawn as follows. Within a predetermined visual field width (typically, a visual field width of 50 μm) shown in FIG. 3B, cross sections of the separator 55, the cathode active material layer 53B and a region between the separator 55 and the cathode active material layer 53B are observed. In this observation field of view, the two parallel lines L1 and L2 perpendicular to a thickness direction of the separator 55 are drawn. The parallel line L1 is a line that passes through a position closest to the separator 55 in a cross-sectional image of the cathode active material particles 12. The parallel line L2 is a line that passes through the deepest part in a cross-sectional image of the particles 10 included in the recess between the adjacent cathode active material particles 12. Note that the deepest part refers to a position farthest from the separator 55 in a thickness direction of the separator 55.

(Top Coat Region B)

(Top Coat Region of an Anode Side)

The top coat region B of the anode side refers to a region between the recess impregnation region A of the anode side and the separator 55. The top coat region B is filled with the electrolytes comprising at least one kind of the dinitrile compounds represented by Formula (1C). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3A is classified as the top coat region B of the anode side.

(Top Coat Region of a Cathode Side)

The top coat region B of the cathode side refers to a region between the recess impregnation region A of the cathode side and the separator 55. The top coat region B is filled with the electrolytes comprising at least one kind of the dinitrile compounds represented by Formula (1C). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3B is classified as the top coat region B of the cathode side.

(Deep Region C)

(Deep Region of an Anode Side)

The deep region C of the anode side refers to a region inside the anode active material layer 54B, which is deeper than the recess impregnation region A of the anode side. The gap between the anode active material particles 11 of the deep region C is filled with the electrolytes comprising at least one kind of the dinitrile compounds represented by Formula (1C). The particles 10 to be included in the electrolytes are comprised in the deep region C. Note that the particles 10 may not be comprised in the deep region C.

A region of the anode active material layer 54B other than the recess impregnation region A and the top coat region B within the same predetermined observation field of view shown in FIG. 3A is classified as the deep region C of the anode side. For example, a region between the above-described parallel line L2 and anode current collector 54A within the same predetermined observation field of view shown in FIG. 3A is classified as the deep region C of the anode side.

(Deep Region of a Cathode Side)

The deep region C of the cathode side refers to a region inside the cathode active material layer 53B, which is deeper than the recess impregnation region A of the cathode side. The gap between the cathode active material particles 12 of the deep region C of the cathode side is filled with the electrolytes comprising at least one kind of the dinitrile compounds represented by Formula (1C). The particles 10 to be included in the electrolytes are comprised in the deep region C. Note that the particles 10 may not be comprised in the deep region C.

A region of the cathode active material layer 53B other than the recess impregnation region A and the top coat region B within the same predetermined observation field of view shown in FIG. 3B is classified as the deep region C of the cathode side. For example, a region between the above-described parallel line L2 and cathode current collector 53A within the same predetermined observation field of view shown in FIG. 3B is classified as the deep region C of the cathode side.

(Concentration of Solid Particles)

The concentration of the solid particles of the recess impregnation region A of the anode side is 30 volume % or more. Furthermore, 30 volume % or more and 90 volume % or less is preferable, and 40 volume % or more and 80 volume % or less is more preferable. When the concentration of the solid particles of the recess impregnation region A of the anode side is in the above range, more solid particles are disposed in the recess between adjacent particles positioned on the outermost surface of the anode active material layer. Accordingly, at least one kind of the dinitrile compounds represented by Formula (1C) is captured by the solid particles, and the additive is likely to be retained in the recess between adjacent active material particles. For this reason, an abundance ratio of the additive in the recess between adjacent particles can be higher than in the other parts. At least one kind of the dinitrile compounds represented by Formula (1C) of the present technology is concentrated at the recess, metal precipitates are controlled only in a surface direction, the precipitates are housed inside the recess, and therefore it is possible to provide a high capacity battery in which a short circuit fault is less likely to occur at a high charge voltage. In addition, an effect of suppressing a negative influence on a cycle is obtained by retaining at least one kind of the dinitrile compounds represented by Formula (1C) in the recess. Cycle performance can be compatible with a precipitation resistance, which was not achieved in the related art.

For the same reason as above, the concentration of the solid particles of the recess impregnation region A of the cathode side is 30 volume % or more. Furthermore, 30 volume % or more and 90 volume % or less is preferable, and 40 volume % or more and 80 volume % or less is more preferable. Since the recess of the cathode side is opposed to a surface of the anode in close proximity, when at least one kind of the dinitrile compounds represented by Formula (1C) is concentrated at the recess of the cathode side, at least one kind of the nitrile compounds represented by Formula (1C) is passively supplied to the recess of the anode side. Accordingly, at least one kind of the dinitrile compounds represented by Formula (1C) is concentrated at the recess, metal precipitates are controlled only in a surface direction, the precipitates are housed inside the recess, and it is possible to suppress a short circuit from occurring.

The concentration of the solid particles of the recess impregnation region A of the anode side is preferably 10 times the concentration of the solid particles of the deep region C of the anode side or more. A concentration of the particles of the deep region C of the anode side is preferably 3 volume % or less. When the concentration of the solid particles of the deep region C of the anode side is too high, since too many solid particles are between active material particles, the solid particles cause a resistance, the captured additive causes a side reaction, and an internal resistance increases.

For the same reason, the concentration of the solid particles of the recess impregnation region A of the cathode side is preferably 10 times the concentration of the solid particles of the deep region C of the cathode side or more. The concentration of particles of the deep region C of the cathode side is preferably 3 volume % or less. When the concentration of the solid particles of the deep region C of the cathode side is too high, since too many solid particles are between active material particles, the solid particles cause a resistance, the captured additive causes a side reaction, and an internal resistance increases.

(Concentration of Solid Particles)

The concentration of solid particles described above refers to a volume concentration (volume %) of solid particles, which is defined as an area percentage ((“total area of particle cross section”÷“area of observation field of view”)×100)(%) of a total area of cross sections of particles when an observation field of view is 2 μm×2 μm. Note that, when a concentration of solid particles of the recess impregnation region A is defined, the observation field of view is set, for example, in the vicinity of a center of a recess formed between adjacent particles in a width direction. Observation is performed using, for example, the SEM, an image obtained by photography is processed, and therefore it is possible to calculate the above areas.

(Thickness of the Recess Impregnation Region A, the Top Coat Region B, and the Deep Region C)

The thickness of the recess impregnation region A of the anode side is preferably 10% or more and 40% or less of the thickness of the anode active material layer 54B. When the thickness of the recess impregnation region A of the anode side is in the above range, it is possible to ensure an amount of necessary solid particles to be disposed in the recess and maintain a state in which an excess of the solid particles and the additive do not enter the deep region C. Further, more preferably, the thickness of the recess impregnation region A of the anode side is in the above range, and is twice the thickness of the top coat region B of the anode side or more. This is because it is possible to prevent a distance between electrodes from increasing and further improve an energy density. In addition, for the same reason, the thickness of the recess impregnation region A of the cathode side is more preferably twice the thickness of the top coat region B of the cathode side or more.

(Method of Measuring a Thickness of Regions)

When the thickness of the recess impregnation region A is defined, an average value of thicknesses of the recess impregnation region A in four different observation fields of view is set as the thickness of the recess impregnation region A. When the thickness of the top coat region B is defined, an average value of thicknesses of the top coat region B in four different observation fields of view is set as the thickness of the top coat region B. When the thickness of the deep region C is defined, an average value of thicknesses of the deep region C in four different observation fields of view is set as the thickness of the deep region C.

(Particle Size of Solid Particles)

As a particle size of solid particles, a particle size D50 is preferably “$2/\sqrt{3}-1$” times a particle size D50 of active material particles or less. In addition, as the particle size of the solid particles, a particle size D50 is more preferably 0.1 μm or more. As the particle size of the solid particles, a particle size D95 is preferably “$2/\sqrt{3}-1$” times a particle size D50 of active material particles or more. Particles having a large particle size block an interval between adjacent active material particles at a bottom of the recess and it is possible to suppress too many of the solid particles from entering the deep region C and a negative influence on a battery characteristic.

(Measurement of a Particle Size)

A particle size D50 of solid particles is, for example, a particle size at which 50% of particles having a smaller particle size are cumulated (a cumulative volume of 50%) in a particle size distribution in which solid particles after components other than solid particles are removed from electrolytes comprising solid particles are measured by a laser diffraction method. In addition, based on the measured particle size distribution, it is possible to obtain a value of a particle size D95 at a cumulative volume 95%. A particle size D50 of active materials is a particle size at which 50% of particles having a smaller particle size are cumulated (a cumulative volume of 50%) in a particle size distribution in which active material particles after components other than active material particles are removed from an active material layer comprising active material particles are measured by a laser diffraction method.

(Specific Surface Area of Solid Particles)

The specific surface area ($m^2/g$) is a BET specific surface area ($m^2/g$) measured by a BET method, which is a method of measuring a specific surface area. The BET specific surface area of solid particles is preferably 1 $m^2/g$ or more and 60 $m^2/g$ or less. When the BET specific surface area is in the above numerical range, an action of solid particles capturing at least one kind of the dinitrile compounds represented by Formula (1C) increases, which is preferable. On the other hand, when the BET specific surface area is too large, since lithium ions are also captured, an output characteristic tends to decrease. Note that the specific surface area of the solid particles can be measured using, for example, solid particles after components other than solid particles are removed from electrolytes comprising solid particles in the same manner as described above.

(Amount of Solid Particles Added)

In view of obtaining a more excellent effect, with respect to electrolytes, as an amount of solid particles added, 1 mass % or more and 60 mass % or less is preferable, 2 mass % or more and 50 mass % or less is more preferable, and 5 mass % or more and 40 mass % or less is most preferable.

(Configuration Including the Recess Impregnation Region A, the Top Coat Region B, and the Deep Region C, which are Only on the Anode Side or the Cathode Side)

Note that the electrolyte layer 56 comprising solid particles may be formed only on both principal surfaces of the anode 54. In addition, the electrolyte layer 56 comprising no solid particles may be applied to and formed on both principal surfaces of the cathode 53. Similarly, the electrolyte layer 56 comprising solid particles may be formed only on both principal surfaces of the cathode 53. In addition, the electrolyte layer 56 without solid particles may be applied to and formed on both principal surfaces of the anode 54. In such cases, only the recess impregnation region A of the anode side, the top coat region B of the anode side, and the deep region C of the anode side are formed, and these regions are not formed on the cathode side or only the recess impregnation region A of the cathode side, the top coat region B of the cathode side, and the deep region C of the cathode side are formed, and these regions are not formed on the anode side.

(13-2) Method of Manufacturing an Exemplary Non-aqueous Electrolyte Battery

An exemplary non-aqueous electrolyte battery can be manufactured, for example, as follows.

(Method of Manufacturing a Cathode)

Cathode active materials, the conductive agent, and the binder are mixed to prepare a cathode mixture. The cathode mixture is dispersed in a solvent such as N-methyl-2-pyrrolidone to prepare a cathode mixture slurry in a paste form. Next, the cathode mixture slurry is applied to the cathode current collector 53A, the solvent is dried, and compression molding is performed by, for example, a roll press device. Therefore, the cathode active material layer 53B is formed and the cathode 53 is fabricated.

(Method of Manufacturing an Anode)

Anode active materials and the binder are mixed to prepare an anode mixture. The anode mixture is dispersed in a solvent such as N-methyl-2-pyrrolidone to prepare an anode mixture slurry in a paste form. Next, the anode mixture slurry is applied to the anode current collector 54A, the solvent is dried, and compression molding is performed by, for example, a roll press device. Therefore, the anode active material layer 54B is formed and the anode 54 is fabricated.

(Preparation of a Non-aqueous Electrolyte Solution)

An electrolyte salt is dissolved in a non-aqueous solvent and at least one kind of the dinitrile compounds represented by Formula (1C) is added to prepare the non-aqueous electrolyte solution.

(Solution Coating)

A coating solution comprising a non-aqueous electrolyte solution, a matrix polymer compound, solid particles, and a dilution solvent (for example, dimethyl carbonate) is heated and applied to both principal surfaces of each of the cathode 53 and the anode 54. Then, the dilution solvent is evaporated and the electrolyte layer 56 is formed.

When the coating solution is heated and applied, electrolytes comprising solid particles can be impregnated into a recess between adjacent anode active material particles positioned on the outermost surface of the anode active material layer 54B and the deep region C inside the anode active material layer 54B. In this case, when solid particles are filtered in the recess between adjacent particles, a concentration of particles in the recess impregnation region A of the anode side increases. Accordingly, it is possible to set a difference of concentrations of particles between the recess impregnation region A and the deep region C. Similarly, when the coating solution is heated and applied, electrolytes comprising solid particles can be impregnated into a recess between adjacent cathode active material particles positioned on the outermost surface of the cathode active material layer 53B and the deep region C inside the cathode active material layer 53B. In this case, when solid particles are filtered in the recess between adjacent particles, a concentration of particles in the recess impregnation region A of the cathode side increases. Accordingly, it is possible to set a difference of concentrations of particles between the recess impregnation region A and the deep region C.

When the excess coating solution is scraped off after the coating solution is applied, it is possible to prevent a distance between electrodes from extending unintentionally. In addition, by scraping a surface of the coating solution, it is possible to dispose more solid particles in the recess between adjacent active material particles, and a ratio of solid particles of the top coat region B decreases. Accordingly, most of the solid particles are intensively disposed in the recess impregnation region A, and the additive can further accumulate in the recess impregnation region A.

Note that solution coating may be performed in the following manner. A coating solution (a coating solution excluding particles) comprising a non-aqueous electrolyte solution, a matrix polymer compound, and a dilution solvent (for example, dimethyl carbonate) is applied to both principal surfaces of the cathode 53, and the electrolyte layer 56 comprising no solid particles may be formed. In addition, no electrolyte layer 56 is formed on one principal surface or both principal surfaces of the cathode 53, and the electrolyte layer 56 comprising the same solid particles may be formed only on both principal surfaces of the anode 54. A coating solution (a coating solution excluding particles) comprising a non-aqueous electrolyte solution, a matrix polymer compound, and a dilution solvent (for example, dimethyl carbonate) is applied to both principal surfaces of the anode 54, and the electrolyte layer 56 comprising no solid particles may be formed. In addition, no electrolyte layer 56 is formed on one principal surface or both principal surfaces of the anode 54, and the electrolyte layer 56 comprising the same solid particles may be formed only on both principal surfaces of the cathode 53.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 on which the electrolyte layer 56 is formed and the anode 54 on which the electrolyte layer 56 is formed are laminated through the separator 55 to prepare a laminated body. Then, the laminated body is wound in a longitudinal direction, the protection tape 57 is adhered to the outermost peripheral portion and the wound electrode body 50 is formed.

Finally, for example, the wound electrode body 50 is inserted into the package member 60, and outer periphery portions of the package member 60 are enclosed in close contact with each other by thermal fusion bonding. In this case, the adhesive film 61 is inserted between the package member 60 and each of the cathode lead 51 and the anode lead 52. Accordingly, the non-aqueous electrolyte battery shown in FIG. 1 and FIG. 2 is completed.

[Modification Example 13-1]

The non-aqueous electrolyte battery according to the thirteenth embodiment may also be fabricated as follows. The fabrication method is the same as the method of manufacturing an exemplary non-aqueous electrolyte battery described above except that, in the solution coating process of the method of manufacturing an exemplary non-aqueous electrolyte battery, in place of applying the coating solution to both surfaces of at least one electrode of the cathode 53 and the anode 54, the coating solution is formed on at least one principal surface of both principal surfaces of the separator 55, and then a heating and pressing process is additionally performed.

[Method of Manufacturing a Non-aqueous Electrolyte Battery of Modification Example 13-1]

(Fabrication of a Cathode, an Anode, and a Separator, and Preparation of a Non-aqueous Electrolyte Solution)

In the same manner as in the method of manufacturing an exemplary non-aqueous electrolyte battery, the cathode 53, the anode 54 and the separator 55 are fabricated and the non-aqueous electrolyte solution is prepared.

(Solution Coating)

A coating solution comprising a non-aqueous electrolyte solution, a resin, solid particles, and a dilution solvent (for example, dimethyl carbonate) is applied to at least one surface of both surfaces of the separator 55. Then, the dilution solvent is evaporated and the electrolyte layer 56 is formed.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54, and the electrolyte layer 56 are laminated through the formed separator 55 to prepare a laminated body. Then, the laminated body is wound in a longitudinal direction, the protection tape 57 is adhered to the outermost peripheral portion, and the wound electrode body 50 is formed.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Finally, a depression portion is formed by deep drawing the package member 60 formed of a laminated film, the wound electrode body 50 is inserted into the depression portion, an unprocessed part of the package member 60 is folded at an upper part of the depression portion, and a peripheral portion of the depression portion is thermally welded. In this case, the adhesive film 61 is inserted between the package member 60 and each of the cathode lead 51 and the anode lead 52. In this manner, the desired non-aqueous electrolyte battery can be obtained.

[Modification Example 13-2]

While the configuration using gel-like electrolytes has been exemplified in the thirteenth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 13-2]

(Preparation of a Cathode, an Anode, and a Non-aqueous Electrolyte Solution)

In the same manner as in the method of manufacturing an exemplary non-aqueous electrolyte battery, the cathode 53 and the anode 54 are fabricated and the non-aqueous electrolyte solution is prepared.

(Coating and Formation of a Solid Particle Layer)

Next, paint is applied to at least one principal surface of both principal surfaces of the anode 54 by a coating method, the solvent is then removed by drying and a solid particle layer is formed. As the paint, for example, a mixture of solid particles, a binder polymer compound (a resin) and a solvent can be used. On the outermost surface of the anode active material layer 54B on which the solid particle layer is applied and formed, solid particles are filtered in the recess between adjacent anode active material particles positioned on the outermost surface of the anode active material layer 54B, and a concentration of particles of the recess impregnation region A of the anode side increases. Similarly, the same paint as described above is applied to both principal surfaces of the cathode 53 by a coating method, the solvent is then removed by drying, and a solid particle layer is formed. On the outermost surface of the cathode active material layer 53B on which the solid particle layer is applied and formed, solid particles are filtered in the recess between adjacent cathode active material particles positioned on the outermost surface of the cathode active material layer 54B, and a concentration of particles of the recess impregnation region A of the cathode side increases. For example, solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval between particles at a bottom of the recess is filled with solid particles having a large particle size and solid particles can be easily filtered.

Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of solid particles of the top coat region B decreases. Accordingly, most of the solid particles are intensively disposed in the recess impregnation region, and at least one kind of the dinitrile compounds represented by Formula (1C) can further accumulate in the recess impregnation region A.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54 are laminated through the separator 55 and wound, the protection tape 57 is adhered to the outermost peripheral portion, and a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the non-aqueous electrolyte solution is injected into the package member 60, and the wound body is impregnated with the non-aqueous electrolyte solution. Then, an opening of the package member 60 is sealed by thermal fusion bonding under a vacuum atmosphere. In this manner, the desired non-electrolyte secondary battery can be obtained.

[Modification Example 13-3]

The non-aqueous electrolyte battery according to the thirteenth embodiment may be fabricated as follows.

[Method of Manufacturing a Non-aqueous Electrolyte Battery of Modification Example 13-3]

(Fabrication of a Cathode and an Anode)

In the same manner as in the method of manufacturing an exemplary non-aqueous electrolyte battery, the cathode 53 and the anode 54 are fabricated.

(Coating and Formation of a Solid Particle Layer)

Next, in the same manner as in Modification Example 13-2, a solid particle layer is formed on at least one principal surface of both principal surfaces of the anode. In the same manner, a solid particle layer is formed on at least one principal surface of both principal surfaces of the cathode.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Assembly of the Non-aqueous Electrolyte Battery)

Next, in the same manner as in Modification Example 13-2, a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 13-4]

The non-aqueous electrolyte battery according to the thirteenth embodiment may be fabricated as follows.

[Method of Manufacturing a Non-aqueous Electrolyte Battery of Modification Example 13-4]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated and the non-aqueous electrolyte solution is prepared.

(Formation of a Solid Particle Layer)

Next, in the same manner as in Modification Example 13-2, a solid particle layer is formed on at least one principal surface of both principal surfaces of the anode 54. In the same manner, a solid particle layer is formed on at least one principal surface of both principal surfaces of the cathode 53.

(Coating and Formation of a Matrix Resin Layer)

Next, a coating solution comprising a non-aqueous electrolyte solution, a matrix polymer compound, and a dispersing solvent such as N-methyl-2-pyrrolidone is applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 13-5]

While the configuration using gel-like electrolytes has been exemplified in the thirteenth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 13-5]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated, and the non-aqueous electrolyte solution is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, the cathode 53 and the anode 54 are laminated and wound through the separator 55, the protection tape 57 is adhered to the outermost peripheral portion, and a wound body serving as a precursor of the wound electrode body 50 is formed.

(Heating and Pressing Process)

Next, before the electrolyte solution is injected into the package member 60, the wound body is put into a packaging material such as a latex tube and sealed, and subjected to warm pressing under hydrostatic pressure. Accordingly, solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape. Next, the non-aqueous electrolyte solution is prepared and injected into the package member 60. The wound body is impregnated with the non-aqueous electrolyte solution, and an opening of the package member 60 is then sealed by thermal fusion bonding under a vacuum atmosphere. In this manner, the desired non-aqueous electrolyte battery can be obtained.

[Modification Example 13-6]

The non-aqueous electrolyte battery according to the thirteenth embodiment may be fabricated as follows.

[Method of Manufacturing a Non-aqueous Electrolyte Battery of Modification Example 13-6]

(Fabrication of a Cathode and an Anode)

First, in the same manner as in the method of manufacturing an exemplary non-aqueous electrolyte battery, the cathode 53 and the anode 54 are fabricated.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, in the same manner as in Modification Example 13-2, a wound body serving as a precursor of the wound electrode body 50 is formed.

(Heating and Pressing Process)

Next, before the non-aqueous electrolyte solution is injected into the package member 60, the wound body is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 13-7]

The non-aqueous electrolyte battery according to the thirteenth embodiment may be fabricated as follows.

[Method of Manufacturing a Non-aqueous Electrolyte Battery of Modification Example 13-7]

(Fabrication of a Cathode and an Anode)

First, in the same manner as in the method of manufacturing an exemplary non-aqueous electrolyte battery, the cathode 53 and the anode 54 are fabricated. Next, solid particles and the matrix polymer compound are applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 13-8]

In the example of the thirteenth embodiment and Modification Example 13-1 to Modification Example 13-7 described above, the non-aqueous electrolyte battery in which the wound electrode body 50 is packaged with the package member 60 has been described. However, as shown in FIGS. 4A to 4C, a stacked electrode body 70 may be used in place of the wound electrode body 50. FIG. 4A is an external view of the non-aqueous electrolyte battery in which the stacked electrode body 70 is housed. FIG. 4B is a dissembled perspective view showing a state in which the stacked electrode body 70 is housed in the package member 60. FIG. 4C is an external view showing an exterior of the non-aqueous electrolyte battery shown in FIG. 4A seen from a bottom side.

As the stacked electrode body 70, the stacked electrode body 70 in which a rectangular cathode 73 and a rectangular anode 74 are laminated through a rectangular separator 75, and fixed by a fixing member 76 is used. Although not shown, when the electrolyte layer is formed, the electrolyte layer is provided in contact with the cathode 73 and the anode 74. For example, the electrolyte layer (not shown) is provided between the cathode 73 and the separator 75, and between the anode 74 and the separator 75. The electrolyte layer is the same as the electrolyte layer 56 described above. A cathode lead 71 connected to the cathode 73 and an anode lead 72 connected to the anode 74 are led out from the stacked electrode body 70. The adhesive film 61 is provided between the package member 60 and each of the cathode lead 71 and the anode lead 72.

Note that a method of manufacturing a non-aqueous electrolyte battery is the same as the method of manufacturing a non-aqueous electrolyte battery in the example of the thirteenth embodiment and Modification Example 13-1 to Modification Example 13-7 described above except that a stacked electrode body is fabricated in place of the wound electrode body 70, and a laminated body (having a configuration in which the electrolyte layer is removed from the stacked electrode body 70) is fabricated in place of the wound body.

14. Fourteenth Embodiment

In the fourteenth embodiment of the present technology, a cylindrical non-aqueous electrolyte battery (a battery) will be described. The non-aqueous electrolyte battery is, for example, a non-aqueous electrolyte secondary battery in which charging and discharging are possible. Also, a lithium ion secondary battery is exemplified.

(14-1) Configuration of an Example of the Non-aqueous Electrolyte Battery

FIG. 5 is a cross-sectional view of an example of the non-aqueous electrolyte battery according to the fourteenth embodiment. The non-aqueous electrolyte battery is, for example, a non-aqueous electrolyte secondary battery in which charging and discharging are possible. The non-aqueous electrolyte battery, which is a so-called cylindrical type, includes non-aqueous liquid electrolytes, which are not shown, (hereinafter, appropriately referred to as the non-aqueous electrolyte solution) and a wound electrode body 90 in which a band-like cathode 91 and a band-like anode 92 are wound through a separator 93 inside a substantially hollow cylindrical battery can 81.

The battery can 81 is made of, for example, nickel-plated iron, and includes one end that is closed and the other end that is opened. A pair of insulating plates 82*a* and 82*b* perpendicular to a winding peripheral surface are disposed inside the battery can 81 so as to interpose the wound electrode body 90 therebetween.

Exemplary materials of the battery can 81 include iron (Fe), nickel (Ni), stainless steel (SUS), aluminum (Al), and titanium (Ti). In order to prevent electrochemical corrosion by the non-aqueous electrolyte solution according to charge and discharge of the non-aqueous electrolyte battery, the battery can 81 may be subjected to plating of, for example, nickel. At an open end of the battery can 81, a battery lid 83 serving as a cathode lead plate, a safety valve mechanism, and a positive temperature coefficient (PTC) element 87 provided inside the battery lid 83 are attached by being caulked through a gasket 88 for insulation sealing.

The battery lid 83 is made of, for example, the same material as that of the battery can 81, and an opening for discharging a gas generated inside the battery is provided. In the safety valve mechanism, a safety valve 84, a disk holder 85 and a blocking disk 86 are sequentially stacked. A protrusion part 84*a* of the safety valve 84 is connected to a cathode lead 95 that is led out from the wound electrode body 90 through a sub disk 89 disposed to cover a hole 86*a* provided at a center of the blocking disk 86. Since the safety valve 84 and the cathode lead 95 are connected through the sub disk 89, the cathode lead 95 is prevented from being drawn from the hole 86*a* when the safety valve 84 is reversed. In addition, the safety valve mechanism is electrically connected to the battery lid 83 through the positive temperature coefficient element 87.

When an internal pressure of the non-aqueous electrolyte battery becomes a predetermined level or more due to an internal short circuit of the battery or heat from the outside of the battery, the safety valve mechanism reverses the safety valve 84, and disconnects an electrical connection of the protrusion part 84*a*, the battery lid 83 and the wound electrode body 90. That is, when the safety valve 84 is reversed, the cathode lead 95 is pressed by the blocking disk 86, and a connection of the safety valve 84 and the cathode lead 95 is released. The disk holder 85 is made of an insulating material. When the safety valve 84 is reversed, the safety valve 84 and the blocking disk 86 are insulated.

In addition, when a gas is additionally generated inside the battery and an internal pressure of the battery further increases, a part of the safety valve 84 is broken and a gas can be discharged to the battery lid 83 side.

In addition, for example, a plurality of gas vent holes (not shown) are provided in the vicinity of the hole 86*a* of the blocking disk 86. When a gas is generated from the wound electrode body 90, the gas can be effectively discharged to the battery lid 83 side.

When a temperature increases, the positive temperature coefficient element 87 increases a resistance value, disconnects an electrical connection of the battery lid 83 and the wound electrode body 90 to block a current, and therefore prevents abnormal heat generation due to an excessive current. The gasket 88 is made of, for example, an insulating material, and has a surface to which asphalt is applied.

The wound electrode body 90 housed inside the non-aqueous electrolyte battery is wound around a center pin 94. In the wound electrode body 90, the cathode 91 and the anode 92 are sequentially laminated and wound through the separator 93 in a longitudinal direction. The cathode lead 95 is connected to the cathode 91. An anode lead 96 is connected to the anode 92. As described above, the cathode lead 95 is welded to the safety valve 84 and electrically connected to the battery lid 83, and the anode lead 96 is welded and electrically connected to the battery can 81.

FIG. 6 shows an enlarged part of the wound electrode body 90 shown in FIG. 5.

Hereinafter, the cathode 91, the anode 92, and the separator 93 will be described in detail.

[Cathode]

In the cathode 91, a cathode active material layer 91B comprising a cathode active material is formed on both surfaces of a cathode current collector 91A. As the cathode current collector 91A, for example, a metal foil such as aluminum (Al) foil, nickel (Ni) foil or stainless steel (SUS) foil, can be used.

The cathode active material layer 91B is configured to comprise one, two or more kinds of cathode materials that can occlude and release lithium as cathode active materials, and may comprise another material such as a binder or a conductive agent as necessary. Note that the same cathode active material, conductive agent and binder used in the thirteenth embodiment can be used.

The cathode 91 includes the cathode lead 95 connected to one end portion of the cathode current collector 91A by spot welding or ultrasonic welding. The cathode lead 95 is preferably formed of net-like metal foil, but there is no problem when a non-metal material is used as long as an electrochemically and chemically stable material is used and an electric connection is obtained. Examples of materials of the cathode lead 95 include aluminum (Al) and nickel (Ni).

[Anode]

The anode 92 has, for example, a structure in which an anode active material layer 92B is provided on both surfaces of an anode current collector 92A having a pair of opposed surfaces. Although not shown, the anode active material layer 92B may be provided only on one surface of the anode current collector 92A. The anode current collector 92A is formed of, for example, a metal foil such as copper foil.

The anode active material layer 92B is configured to comprise one, two or more kinds of anode materials that can occlude and release lithium as anode active materials, and may be configured to comprise another material such as a binder or a conductive agent, which is the same as in the cathode active material layer 91B, as necessary. Note that the same anode active material, conductive agent and binder used in the thirteenth embodiment can be used.

[Separator]

The separator 93 is the same as the separator 55 of the thirteenth embodiment

[Non-aqueous Electrolyte Solution]

The non-aqueous electrolyte solution is the same as in the thirteenth embodiment (Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the thirteenth embodiment. That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B of the anode side and the deep region C of the anode side, which are only on the anode side, may be formed or the recess impregnation region A of the cathode side, the top coat region B of the cathode side and the deep region C of the cathode side, which are only on the cathode side, may be formed.

(14-2) Method of Manufacturing a Non-aqueous Electrolyte Battery (Method of Manufacturing a Cathode and Method of Manufacturing an Anode)

In the same manner as in the thirteenth embodiment, the cathode 91 and the anode 92 are fabricated.

(Formation of a Solid Particle Layer)

Next, paint is applied to at least one principal surface of both principal surfaces of the anode 92 by a coating method, the solvent is then removed by drying and a solid particle layer is formed. As the paint, for example, a mixture of solid particles, a binder polymer compound and a solvent can be used. On the outermost surface of the anode active material layer 92B on which the solid particle layer is applied and formed, solid particles are filtered in the recess between adjacent anode active material particles positioned on the outermost surface of the anode active material layer 92B, and a concentration of particles of the recess impregnation region A of the anode side increases. Similarly, the solid particle layer is formed on both principal surfaces of the cathode 91 by a coating method. On the outermost surface of the cathode active material layer 91B on which the solid particle layer is applied and formed, solid particles are filtered in the recess between adjacent cathode active material particles positioned on the outermost surface of the cathode active material layer 91B, and a concentration of particles of the recess impregnation region A of the cathode side increases. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval at a bottom of the recess is filled with particles having a large solid particle size, and solid particles can be easily filtered.

Note that, when the solid particle layer is applied and formed, if extra paint is scraped off, it is possible to prevent a distance between electrodes from extending unintentionally. In addition, by scraping a surface of the paint, more solid particles are sent to the recess between adjacent active material particles, and a ratio of the top coat region B decreases. Accordingly, most of the solid particles are intensively disposed in the recess impregnation region, and at least one kind of the dinitrile compounds represented by Formula (1C) can further accumulate in the recess impregnation region A.

(Method of Manufacturing a Separator)

Next, the separator 93 is prepared.

(Preparation of a Non-aqueous Electrolyte Solution)

An electrolyte salt is dissolved in a non-aqueous solvent to prepare the non-aqueous electrolyte solution.

(Assembly of the Non-aqueous Electrolyte Battery)

The cathode lead 95 is attached to the cathode current collector 91A by welding and the anode lead 96 is attached to the anode current collector 92A by welding. Then, the cathode 91 and the anode 92 are wound through the separator 93 to prepare the wound electrode body 90.

A distal end portion of the cathode lead 95 is welded to the safety valve mechanism and a distal end portion of the anode lead 96 is welded to the battery can 81. Then, a winding surface of the wound electrode body 90 is inserted between a pair of insulating plates 82*a* and 82*b* and accommodated inside the battery can 81. The wound electrode body 90 is accommodated inside the battery can 81, and the non-aqueous electrolyte solution is then injected into the battery can 81 and impregnated into the separator 93. Then, at the opened end of the battery can 81, the safety valve mechanism including the battery lid 83, the safety valve 84 and the like, and the positive temperature coefficient element 87 are caulked and fixed through the gasket 88. Accordingly, the non-aqueous electrolyte battery of the present technology shown in FIG. 5 is formed.

In the non-aqueous electrolyte battery, when charge is performed, for example, lithium ions are released from the cathode active material layer 91B, and occluded in the anode active material layer 92B through the non-aqueous electrolyte solution impregnated into the separator 93. In addition, when discharge is performed, for example, lithium ions are released from the anode active material layer 92B, and occluded in the cathode active material layer 91B through the non-aqueous electrolyte solution impregnated into the separator 93.

[Modification Example 14-1]

The non-aqueous electrolyte battery according to the fourteenth embodiment may be fabricated as follows.

(Fabrication of a Cathode and an Anode)

First, in the same manner as in the example of the non-aqueous electrolyte battery, the cathode 91 and the anode 92 are fabricated.

(Formation of a Solid Particle Layer)

Next, paint is applied to at least one principal surface of both principal surfaces of the separator 93 by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 90 is formed.

(Heating and Pressing Process)

Before the wound electrode body 90 is accommodated inside the battery can 81, the wound electrode body 90 is put into a packaging material such as a latex tube and sealed, and subjected to warm pressing under hydrostatic pressure. Accordingly, solid particles move to the recess between adjacent anode active material particles positioned on the outermost surface of the anode active material layer 92B, and the concentration of the solid particles of the recess impregnation region A of the anode side increases. The solid particles move to the recess between adjacent cathode active material particles positioned on the outermost surface of the cathode active material layer 91B and the concentration of the solid particles of the recess impregnation region A of the cathode side increases.

Processes thereafter are the same as those in the example described above, and the desired non-aqueous electrolyte battery can be obtained.

15. Fifteenth Embodiment

In the fifteenth embodiment, a rectangular non-aqueous electrolyte battery will be described.

(15-1) Configuration of an Example of the Non-aqueous Electrolyte Battery

FIG. 7 shows a configuration of an example of the non-aqueous electrolyte battery according to the fifteenth embodiment. The non-aqueous electrolyte battery is a so-called rectangular battery, and a wound electrode body 120 is housed inside a rectangular exterior can 111.

The non-aqueous electrolyte battery includes the rectangular exterior can 111, the wound electrode body 120 serving as a power generation element accommodated inside the exterior can 111, a battery lid 112 configured to close an opening of the exterior can 111, an electrode pin 113 provided at substantially the center of the battery lid 112, and the like.

The exterior can 111 is formed as a hollow rectangular tubular body with a bottom using, for example, a metal having conductivity such as iron (Fe). The exterior can 111 preferably has a configuration in which, for example, nickel-plating is performed on or a conductive paint is applied to an inner surface so that conductivity of the exterior can 111 increases. In addition, an outer peripheral surface of the exterior can 111 is covered with an exterior label formed by, for example, a plastic sheet or paper, and an insulating paint may be applied thereto for protection. The battery lid 112 is made of, for example, a metal having conductivity such as iron (Fe), the same as in the exterior can 111.

The cathode and the anode are laminated and wound through the separator in an elongated oval shape, and therefore the wound electrode body 120 is obtained. Since the cathode, the anode, the separator and the non-aqueous electrolyte solution are the same as those in the thirteenth embodiment, detailed descriptions thereof will be omitted.

In the wound electrode body 120 having such a configuration, a plurality of cathode terminals 121 connected to the cathode current collector and a plurality of anode terminals connected to the anode current collector are provided. All of the cathode terminals 121 and the anode terminals are led out to one end of the wound electrode body 120 in an axial direction. Then, the cathode terminals 121 are connected to a lower end of the electrode pin 113 by a fixing method such as welding. In addition, the anode terminals are connected to an inner surface of the exterior can 111 by a fixing method such as welding.

The electrode pin 113 is made of a conductive shaft member, and is maintained by an insulator 114 while a head thereof protrudes from an upper end. The electrode pin 113 is fixed to substantially the center of the battery lid 112 through the insulator 114. The insulator 114 is formed of a high insulating material, and is engaged with a through-hole 115 provided at a surface side of the battery lid 112. In addition, the electrode pin 113 passes through the through-hole 115, and a distal end portion of the cathode terminal 121 is fixed to a lower end surface thereof.

The battery lid 112 to which the electrode pin 113 or the like is provided is engaged with the opening of the exterior can 111, and a contact surface of the exterior can 111 and the battery lid 112 are bonded by a fixing method such as welding. Accordingly, the opening of the exterior can 111 is sealed by the battery lid 112 and is in an air tight and liquid tight state. At the battery lid 112, an internal pressure release mechanism 116 configured to release (dissipate) an internal pressure to the outside by breaking a part of the battery lid 112 when a pressure inside the exterior can 111 increases to a predetermined value or more is provided.

The internal pressure release mechanism 116 includes two first opening grooves 116*a* (one of the first opening grooves 116*a* is not shown) that linearly extend in a longitudinal direction on an inner surface of the battery lid 112 and a second opening groove 116*b* that extends in a width direction perpendicular to a longitudinal direction on the same inner surface of the battery lid 112 and whose both ends communicate with the two first opening grooves 116*a*. The two first opening grooves 116*a* are provided in parallel to each other along a long side outer edge of the battery lid 112 in the vicinity of an inner side of two sides of a long side positioned to oppose the battery lid 112 in a width direction. In addition, the second opening groove 116*b* is provided to be positioned at substantially the center between one short side outer edge in one side in a longitudinal direction of the electrode pin 113 and the electrode pin 113.

The first opening groove 116*a* and the second opening groove 116*b* have, for example, a V-shape whose lower surface side is opened in a cross sectional shape. Note that the shape of the first opening groove 116*a* and the second opening groove 116*b* is not limited to the V-shape shown in this embodiment. For example, the shape of the first opening groove 116*a* and the second opening groove 116*b* may be a U-shape or a semicircular shape.

An electrolyte solution inlet 117 is provided to pass through the battery lid 112. After the battery lid 112 and the exterior can 111 are caulked, the electrolyte solution inlet 117 is used to inject the non-aqueous electrolyte solution, and is sealed by a sealing member 118 after the non-aqueous electrolyte solution is injected. For this reason, when gel electrolytes are formed between the separator and each of the cathode and the anode in advance to fabricate the wound electrode body, the electrolyte solution inlet 117 and the sealing member 118 may not be provided.

[Separator]

As the separator, the same separator as in the thirteenth embodiment is used.

[Non-aqueous Electrolyte Solution]

The non-aqueous electrolyte solution is the same as in the thirteenth embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the first embodiment That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B and the deep region C, which are only on the anode side, may be formed or the recess impregnation region A of the cathode side, the top coat region B of the cathode side and the deep region C of the cathode side, which are only on the cathode side, may be formed.

(15-2) Method of Manufacturing a Non-aqueous Electrolyte Battery

The non-aqueous electrolyte battery can be manufactured, for example, as follows.

[Method of Manufacturing a Cathode and an Anode]

The cathode and the anode can be fabricated by the same method as in the thirteenth embodiment (Formation of a Solid Particle Layer)

Next, paint is applied to at least one principal surface of both principal surfaces of the anode by a coating method, the solvent is then removed by drying and a solid particle layer is formed. As the paint, for example, a mixture of solid particles, a binder polymer compound and a solvent can be used. On the outermost surface of the anode active material layer on which the solid particle layer is applied and formed, solid particles are filtered in the recess between adjacent anode active material particles positioned on the outermost surface of the anode active material layer, and a concentration of particles of the recess impregnation region A of the anode side increases. Similarly, a solid particle layer is formed on both principal surfaces of the cathode by a coating method. On the outermost surface of the cathode active material layer on which the solid particle layer is applied and formed, solid particles are filtered in the recess between adjacent cathode active material particles positioned on the outermost surface of the cathode active material layer, and a concentration of particles of the recess impregnation region A of the cathode side increases. Solid particles having a particle size D95 that is adjusted to be a predetermined times a particle size D50 or more are preferably used as the solid particles. For example, some solid particles having a particle size of $2/\sqrt{3}-1$ times a particle size D50 or more are added, and a particle size D95 of solid particles is adjusted to be $2/\sqrt{3}-1$ times a particle size D50 of solid particles or more, which are preferably used as the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of the top coat region B decreases. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval at a bottom of the recess is filled with solid particles having a large particle size and solid particles can be easily filtered. Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of particles of the top coat region B decreases. Accordingly, most of the solid particles are intensively disposed in the recess impregnation region A, and at least one kind of the dinitrile compounds represented by Formula (1C) can further accumulate in the recess impregnation region A.

(Assembly of the Non-aqueous Electrolyte Battery)

The cathode, the anode, and the separator (in which a particle-comprising resin layer is formed on at least one surface of a base material) are sequentially laminated and wound to fabricate the wound electrode body 120 that is wound in an elongated oval shape. Next, the wound electrode body 120 is housed in the exterior can 111.

Then, the electrode pin 113 provided in the battery lid 112 and the cathode terminal 121 led out from the wound electrode body 120 are connected. Also, although not shown, the anode terminal led out from the wound electrode body 120 and the battery can are connected. Then, the exterior can 111 and the battery lid 112 are engaged, the non-aqueous electrolyte solution is injected though the electrolyte solution inlet 117, for example, under reduced pressure and sealing is performed by the sealing member 118. In this manner, the non-aqueous electrolyte battery can be obtained.

[Modification Example 15-1]

The non-aqueous electrolyte battery according to the fifteenth embodiment may be fabricated as follows.

(Fabrication of a Cathode and an Anode)

First, in the same manner as in the example of the non-aqueous electrolyte battery, the cathode and the anode are fabricated.

(Formation of a Solid Particle Layer)

Next, paint is applied to at least one principal surface of both principal surfaces of the separator by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 120 is formed. Next, before the wound electrode body 120 is housed inside the exterior can 111, the wound electrode body 120 is put into a packaging material such as a latex tube and sealed, and subjected to warm pressing under hydrostatic pressure. Accordingly, solid particles move (are pushed) to the recess between adjacent anode active material particles positioned on the outermost surface of the anode active material layer, and the concentration of the solid particles of the recess impregnation region A of the anode side increases. The solid particles move to the recess between adjacent cathode active material particles positioned on the outermost surface of the cathode active material layer, and the concentration of the solid particles of the recess impregnation region A of the cathode side increases.

Then, similarly to the example described above, the desired non-aqueous electrolyte battery can be obtained.

<Sixteenth Embodiment to Eighteenth Embodiment>

(Overview of the Present Technology)

First, in order to facilitate understanding of the present technology, an overview of the present technology will be described. In recent years, use of a secondary battery for high voltage charge and rapid charge to provide a high capacity has been demanded. Although safety is ensured not to exceed a limit using a protection circuit module, a margin of the battery itself becomes lower, and it is necessary to improve an overcharge limit.

During overcharge, lithium dendritic precipitates in the anode grow toward the cathode. However, in worst cases, these precipitates break through the separator, and cause a short circuit fault. Since the separator has a function of curbing the progress of the dendritic precipitates, increasing a strength, decreasing pores, decreasing porosity, and increasing a thickness are performed. However, such procedures decrease an output of the battery and decrease the capacity.

Precipitates generated in the vicinity of the separator are broken by the separator before they grow and a growth thereof is curbed. However, precipitates generated in the recess between active material particles positioned on the outermost surface of the electrode are protected by surrounding active materials and can become a thick trunk of a precipitation body that breaks through the separator.

The inventors have conducted extensive studies and found that, when an electrolyte salt comprising at least one kind of the metal salts represented by Formula (1D) to Formula (7D) is used, a growth of lithium dendritic precipitates to a counter electrode side is suppressed, and a growth direction can be changed to a surface direction of the electrode.

However, there is a problem in that, when such metal salts are used as a main component of the electrolyte salt, a side reaction occurs in the mixture layer, and an internal resistance increases. In the present technology, it has been found that, when at least one kind of the metal salts represented by Formula (1D) to Formula (7D) is dissolved in the electrolyte solution (when a small amount is preferably dissolved in view of further suppressing a side reaction), solid particles selectively attract such metal salts. Accordingly, by selectively disposing solid particles in the recess between adjacent active material particles of the anode side, precipitates effectively successfully remain in the recess.

When solid particles are disposed in the recess between adjacent active material particles of the outermost surface of the cathode, since most of the lithium ions emitted from the cathode pass through this part, it is more efficient to provide at least one kind of anions of the metal salts represented by Formula (1D) to Formula (7D) at a great amount. Therefore, when solid particles are disposed only in the recess of the cathode side and when solid particles are disposed in both recesses of the anode side and the cathode side, it is possible to flatten lithium precipitates by at least one kind of the metal salts represented by Formula (1D) to Formula (7D), and suppress a side reaction. Preferably, by adding a small amount, it is possible to minimize a side reaction. In the present technology having the above-described actions, it is possible to increase a limit voltage at which a short circuit is caused during overcharge.

Hereinbelow, embodiments of the present technology are described with reference to the drawings. The description is given in the following order.

16. Sixteenth embodiment (example of a laminated film-type battery)
17. Seventeenth embodiment (example of a cylindrical battery)
18. Eighteenth embodiment (example of a rectangular battery)

The embodiments etc. described below are preferred specific examples of the present technology, and the subject matter of the present technology is not limited to these embodiments etc. Further, the effects described in the present specification are only examples and are not limitative ones, and the existence of effects different from the illustrated effects is not denied.

16. Sixteenth Embodiment

In a sixteenth embodiment of the present technology, an example of a laminated film-type battery is described. The battery is, for example, a non-aqueous electrolyte battery, a secondary battery in which charging and discharging are possible, or a lithium-ion secondary battery.

(16-1) Configuration Example of the Non-aqueous Electrolyte Battery

FIG. 1 shows the configuration of a non-aqueous electrolyte battery according to the sixteenth embodiment. The non-aqueous electrolyte battery is of what is called a laminated film type; and in the battery, a wound electrode body 50 equipped with a cathode lead 51 and an anode lead 52 is housed in a film-shaped package member 60.

Each of the cathode lead 51 and the anode lead 52 is led out from the inside of the package member 60 toward the outside in the same direction, for example. The cathode lead 51 and the anode lead 52 are each formed using, for example, a metal material such as aluminum, copper, nickel, or stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to be melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. An adhesive film 61 is provided between the package member 60 and each of the cathode lead 51 and the anode lead 52 for the purpose of increasing the adhesion between the inner resin layer of the package member 60 and each of the cathode lead 51 and the anode lead 52 which are formed using metal materials. This adhesive film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

FIG. 2 shows a cross-sectional structure along line I-I of the wound electrode body 50 shown in FIG. 1. As shown in FIG. 1, the wound electrode body 50 is a body in which a band-like cathode 53 and a band-like anode 54 are stacked and wound via a band-like separator 55 and an electrolyte layer 56, and the outermost peripheral portion is protected by a protection tape 57 as necessary.

(Cathode)

The cathode 53 has a structure in which a cathode active material layer 53B is provided on one surface or both surfaces of a cathode current collector 53A.

In the cathode 53, the cathode active material layer 53B comprising a cathode active material is formed on both surfaces of the cathode current collector 53A. Also, although not shown, the cathode active material layer 53B may be provided only on one surface of the cathode current collector 53A. As the cathode current collector 53A, for example, a metal foil such as aluminum (Al) foil, nickel (Ni) foil or stainless steel (SUS) foil can be used.

The cathode active material layer 53B is configured to comprise, for example, a cathode active material, an electrically conductive agent, and a binder. As the cathode active material, one or more cathode materials that can occlude and release lithium may be used, and another material such as a binder or an electrically conductive agent may be comprised as necessary.

As the cathode material that can occlude and release lithium, for example, a lithium-comprising compound is preferable. This is because a high energy density is obtained. As the lithium-comprising compound, for example, a composite oxide comprising lithium and a transition metal element, a phosphate compound comprising lithium and a transition metal element, or the like is given. Of them, a material comprising at least one of the group consisting of cobalt (Co), nickel (Ni), manganese (Mn), and iron (Fe) as a transition metal element is preferable. This is because a higher voltage is obtained.

As the cathode material, for example, a lithium-comprising compound expressed by $Li_xM1O_2$ or $Li_yM2PO_4$ may be used. In the formula, M1 and M2 represent one or more transition metal elements. The values of x and y vary with the charging and discharging state of the battery, and are usually $0.05 \le x \le 1.10$ and $0.05 \le y \le 1.10$. As the composite oxide comprising lithium and a transition metal element, for example, a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ ($0<z<1$)), a lithium nickel cobalt manganese composite oxide ($Li_xNi_{(1-v-w)}Co_vMn_wO_2$ ($0<v+w<1$, $v>0$, $w>0$)), a lithium manganese composite oxide ($LiMn_2O_4$) or a lithium manganese nickel composite oxide ($LiMn_{2-t}Ni_tO_4$ ($0<t<2$)) having the spinel structure, or the like is given. Of them, a composite oxide comprising cobalt is preferable. This is because a high capacity is obtained and also excellent cycle characteristics are obtained. As the phosphate compound comprising lithium and a transition metal element, for example, a lithium iron phosphate compound ($LiFePO_4$), a lithium iron manganese phosphate compound ($LiFe_{1-u}Mn_uPO_4$ ($0<u<1$)), or the like is given.

As such a lithium composite oxide, specifically, lithium cobaltate ($LiCoO_2$), lithium nickelate ($LiNiO_2$), lithium manganate ($LiMn_2O_4$), or the like is given. Also a solid solution in which part of the transition metal element is substituted with another element may be used. For example, a nickel cobalt composite lithium oxide ($LiNi_{0.5}Co_{0.5}O_2$, $LiNi_{0.8}Co_{0.2}O_2$, etc.) is given as an example thereof. These lithium composite oxides can generate a high voltage, and have an excellent energy density.

From the viewpoint of higher electrode fillability and cycle characteristics being obtained, also a composite particle in which the surface of a particle made of any one of the lithium-comprising compounds mentioned above is coated with minute particles made of another of the lithium-comprising compounds may be used.

Other than these, as the cathode material that can occlude and release lithium, for example, an oxide such as vanadium oxide ($V_2O_5$), titanium dioxide ($TiO_2$), or manganese dioxide ($MnO_2$), a disulfide such as iron disulfide ($FeS_2$), titanium disulfide ($TiS_2$), or molybdenum disulfide ($MoS_2$), a chalcogenide not comprising lithium such as niobium diselenide ($NbSe_2$) (in particular, a layered compound or a spinel-type compound), and a lithium-comprising compound comprising lithium, and also an electrically conductive polymer such as sulfur, polyaniline, polythiophene, polyacetylene, or polypyrrole are given. The cathode material that can occlude and release lithium may be a material other than the above as a matter of course. The cathode materials mentioned above may be mixed in an arbitrary combination of two or more.

As the electrically conductive agent, for example, a carbon material such as carbon black or graphite, or the like is used. As the binder, for example, at least one selected from a resin material such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component, and the like is used.

The cathode 53 includes a cathode lead 51 connected to an end portion of the cathode current collector 53A by spot welding or ultrasonic welding. The cathode lead 51 is preferably formed of net-like metal foil, but there is no problem when a non-metal material is used as long as an electrochemically and chemically stable material is used and an electric connection is obtained. Examples of materials of the cathode lead 51 include aluminum (Al), nickel (Ni), and the like.

(Anode)

The anode 54 has a structure in which an anode active material layer 54B is provided on one of or both surfaces of an anode current collector 54A, and is disposed such that the anode active material layer 54B is opposed to the cathode active material layer 53B.

Although not shown, the anode active material layer 54B may be provided only on one surface of the anode current collector 54A. The anode current collector 54A is formed of, for example, a metal foil such as copper foil.

The anode active material layer 54B is configured to comprise, as the anode active material, one or more anode materials that can occlude and release lithium, and may be configured to comprise another material such as a binder or an electrically conductive agent similar to that of the cathode active material layer 53B, as necessary.

In the non-aqueous electrolyte battery, the electrochemical equivalent of the anode material that can occlude and release lithium is set larger than the electrochemical equivalent of the cathode 53, and theoretically lithium metal is prevented from being precipitated on the anode 54 in the course of charging.

In the non-aqueous electrolyte battery, the open circuit voltage (that is, the battery voltage) in the full charging state is designed to be in the range of, for example, not less than 2.80 V and not more than 6.00 V. In particular, when a material that becomes a lithium alloy at near 0 V with respect to $Li/Li^+$ or a material that occludes lithium at near 0 V with respect to $Li/Li^+$ is used as the anode active material, the open circuit voltage in the full charging state is designed to be in the range of, for example, not less than 4.20 V and not more than 6.00 V. In this case, the open circuit voltage in the full charging state is preferably set to not less than 4.25 V and not more than 6.00 V. When the open circuit voltage in the full charging state is set to 4.25 V or more, the amount of lithium released per unit mass is larger than in a battery of 4.20 V, provided that the cathode active material is the same; and thus the amounts of the cathode active material and the anode active material are adjusted accordingly. Thereby, a high energy density is obtained.

As the anode material that can occlude and release lithium, for example, a carbon material such as non-graphitizable carbon, graphitizable carbon, graphite, pyrolytic carbons, cokes, glassy carbons, organic polymer compound fired materials, carbon fibers, or activated carbon is given. Of them, the cokes include pitch coke, needle coke, petroleum coke, or the like. The organic polymer compound fired material refers to a material obtained by carbonizing a polymer material such as a phenol resin or a furan resin by firing at an appropriate temperature, and some of them are categorized into non-graphitizable carbon or graphitizable carbon. These carbon materials are preferable because there is very little change in the crystal structure occurring during charging and discharging, high charging and discharging capacities can be obtained, and good cycle characteristics can be obtained. In particular, graphite is preferable because the electrochemical equivalent is large and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of a lithium metal, because the battery can obtain a higher energy density easily.

As another anode material that can occlude and release lithium and can be increased in capacity, a material that can occlude and release lithium and comprises at least one of a metal element and a semi-metal element as a constituent element is given. This is because a high energy density can be obtained by using such a material. In particular, using the material together with a carbon material is more preferable because a high energy density can be obtained and also excellent cycle characteristics can be obtained. The anode material may be a simple substance, an alloy, or a compound of a metal element or a semi-metal element, or may be a material that includes a phase of one or more of them at least partly. Note that in the present technology, the alloy includes a material formed with two or more kinds of metal elements and a material comprising one or more kinds of metal elements and one or more kinds of semi-metal elements. Further, the alloy may comprise a non-metal element. Examples of its texture include a solid solution, a eutectic (eutectic mixture), an intermetallic compound, and one in which two or more kinds thereof coexist.

Examples of the metal element or semi-metal element comprised in this anode material include a metal element or a semi-metal element capable of forming an alloy together with lithium. Specifically, such examples include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

As the anode material, it is preferable to use a material comprising, as a constituent element, a metal element or a semi-metal element of 4B group in the short periodical table. It is more preferable to use a material comprising at least one of silicon (Si) and tin (Sn) as a constituent element. It is even more preferable to use a material comprising at least silicon. This is because silicon (Si) and tin (Sn) each have a high capability of occluding and releasing lithium, so that a high energy density can be obtained. Examples of the anode material comprising at least one of silicon and tin include a simple substance, an alloy, or a compound of silicon, a simple substance, an alloy, or a compound of tin, and a material comprising, at least partly, a phase of one or more kinds thereof.

Examples of the alloy of silicon include alloys comprising, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys comprising, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds comprising oxygen (O) or carbon (C), which may comprise any of the above-described second constituent elements in addition to tin (Sn) or silicon (Si).

Among them, as the anode material, an SnCoC-comprising material is preferable which comprises cobalt (Co), tin (Sn), and carbon (C) as constituent elements, the content of carbon is higher than or equal to 9.9 mass % and lower than or equal to 29.7 mass %, and the ratio of cobalt in the total of tin (Sn) and cobalt (Co) is higher than or equal to 30 mass % and lower than or equal to 70 mass %. This is because the high energy density and excellent cycling characteristics can be obtained in these composition ranges.

The SnCoC-comprising material may also comprise another constituent element as necessary. For example, it is preferable to comprise, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be comprised. This is because the capacity characteristics or cycling characteristics can be further increased.

Note that the SnCoC-comprising material has a phase comprising tin (Sn), cobalt (Co), and carbon (C), and this phase preferably has a low crystalline structure or an amorphous structure. Further, in the SnCoC-comprising material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-comprising material appears in a region lower than 284.5 eV, at least a part of carbon comprised in the SnCoC-comprising material is bound to a metal element or a semi-metal element, which is another constituent element In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-comprising material, the peak of the surface contamination carbon and the peak of the carbon in the SnCoC-comprising material are separated from each other by means of analysis using, for example, a commercially available software program. In the analysis of the waveform, the position of a main peak existing on the lowest binding energy side is used as an energy reference (284.8 eV).

As the anode material that can occlude and release lithium, for example, also a metal oxide, a polymer compound, or other materials that can occlude and release lithium are given. As the metal oxide, for example, a lithium titanium oxide comprising titanium and lithium such as lithium titanate ($Li_4Ti_5O_{12}$), iron oxide, ruthenium oxide, molybdenum oxide, or the like is given. As the polymer compound, for example, polyacetylene, polyaniline, polypyrrole, or the like is given.

(Separator)

The separator 55 is a porous membrane formed of an insulating membrane that has a large ion permeability and a prescribed mechanical strength. A non-aqueous electrolyte solution is retained in the pores of the separator 55.

The separator 55 is a porous membrane made of, for example, a resin. The porous membrane made of the resin is a membrane obtained by stretching a material such as a resin to be thinner and has a porous structure. For example, the porous membrane made of a resin is obtained when a material such as a resin is formed by a stretching and perforating method, a phase separation method, or the like. For example, in a stretching and opening method, first, a melt polymer is extruded from a T-die or a circular die and additionally subjected to heat treatment, and a crystal structure having high regularity is formed. Then, stretching is performed at low temperatures, and further high temperature stretching is performed. A crystal interface is detached to create an interval part between lamellas, and a porous structure is formed. In the phase separation method, a homogeneous solution prepared by mixing a polymer and a solvent at high temperature is used to form a film by a T-die method, an inflation method or the like, the solvent is then extracted by another volatile solvent, and therefore the porous membrane made of a resin can be obtained. Note that a method of preparing the porous membrane made of a resin is not limited to such methods, and methods proposed in the related art can be widely used. As the resin material that forms the separator 55 like this, for example, a polyolefin resin such as polypropylene or polyethylene, an acrylic resin, a styrene resin, a polyester resin, a nylon resin, or the like is preferably used. In particular, a polyolefin resin such as a polyethylene such as low-density polyethylene, high-density polyethylene, or linear polyethylene, a low molecular weight wax component thereof, or polypropylene is preferably used because it has a suitable melting temperature and is easily available. Also a structure in which two or more kinds of these porous membranes are stacked or a porous membrane formed by melt-kneading two or more resin materials is possible. A material comprising a porous membrane made of a polyolefin resin has good separability between the cathode 53 and the anode 54, and can further reduce the possibility of an internal short circuit.

The separator 55 may be a nonwoven fabric. The nonwoven fabric is a structure made by bonding or entangling or bonding and entangling fibers using a mechanical method, a chemical method and a solvent, or in a combination thereof, without weaving or knitting fibers. Most substances that can be processed into fibers can be used as a source material of the nonwoven fabric. By adjusting a shape such as a length and a thickness, the fiber can have a function according to an object and an application. A method of manufacturing the nonwoven fabric typically includes two processes, a process in which a laminate layer of fibers, which is a so-called fleece, is formed, and a bonding process in which fibers of the fleece are bonded. In each of the processes, various manufacturing methods are used and selected according to a source material, an object, and an application of the nonwoven fabric. For example, in the process in which the fleece is formed, a dry method, a wet method, a spun bond method, a melt blow method, and the like can be used. In the bonding process in which fibers of the fleece are bonded, a thermal bond method, a chemical bond method, a needle punching method, a spunlace method (a hydroentanglement method), a stitch bond method, and a steam jet method can be used.

As the nonwoven fabric, for example, a polyethylene terephthalate permeable membrane (a polyethylene terephthalate nonwoven fabric) using a polyethylene terephthalate (PET) fiber is used. Note that the permeable membrane refers to a membrane having permeability. Additionally, nonwoven fabrics using an aramid fiber, a glass fiber, a cellulose fiber, a polyolefin fiber, or a nylon fiber may be exemplified. The nonwoven fabric may be a fabric using two or more kinds of fibers.

Any thickness can be set as the thickness of the separator 55 to the extent that it is not less than the thickness that can keep necessary strength. The separator 55 is preferably set to such a thickness that the separator 55 provides insulation between the cathode 53 and the anode 54 to prevent a short circuit etc., has ion permeability for producing battery reaction via the separator 55 favorably, and can make the volumetric efficiency of the active material layer that contributes to battery reaction in the battery as high as possible. Specifically, the thickness of the separator 55 is preferably not less than 4 μm and not more than 20 μm, for example.

(Electrolyte Layer)

The electrolyte layer 56 includes a matrix polymer compound, a non-aqueous electrolyte solution and solid particles. The electrolyte layer 56 is a layer in which the non-aqueous electrolyte solution is retained by, for example, the matrix polymer compound, and is, for example, a layer formed of so-called gel-like electrolytes. Note that the solid particles may be comprised inside the anode active material layer 54B and/or inside a cathode active material layer 53B. In addition, while details will be described in the following modification examples, a non-aqueous electrolyte solution, which comprises liquid electrolytes, may be used in place of the electrolyte layer 56. In this case, the non-aqueous electrolyte battery includes a wound body having a configuration in which the electrolyte layer 56 is removed from the wound electrode body 50 in place of the wound electrode body 50. The wound body is impregnated with the non-aqueous electrolyte solution, which comprises liquid electrolytes filled in the package member 60.

(Matrix Polymer Compound)

A resin having the property of compatibility with the solvent, or the like may be used as the matrix polymer compound (resin) that retains the electrolyte solution. As such a matrix polymer compound, a fluorine-comprising resin such as polyvinylidene difluoride or polytetrafluoroethylene, a fluorine-comprising rubber such as a vinylidene fluoride-tetrafluoroethylene copolymer or an ethylene-tetrafluoroethylene copolymer, a rubber such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene-propylene rubber, polyvinyl alcohol, or polyvinyl acetate, a cellulose derivative such as ethyl cellulose, methyl cellulose, hydroxyethyl cellulose, or carboxymethyl cellulose, a resin of which at least one of the melting point and the glass transition temperature is 180° C. or more such as polyphenylene ether, a polysulfone, a polyethersulfone, polyphenylene sulfide, a polyetherimide, a polyimide, a polyamide (in particular, an aramid), a polyamide-imide, polyacrylonitrile, polyvinyl alcohol, a polyether, an acrylic acid resin, or a polyester, polyethylene glycol, or the like is given.

(Non-aqueous Electrolyte Solution)

The non-aqueous electrolyte solution comprises an electrolyte salt and a non-aqueous solvent in which the electrolyte salt is dissolved.

(Electrolyte Salt)

An electrolyte salt comprises at least one kind of the metal salts represented by Formula (1D) to Formula (7D).

[Chem. 16]

(1D)

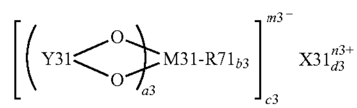

(in the formula, X31 represents a Group 1 element or a Group 2 element in a long-period type periodic table, or A1. M31 represents a transition metal, or a Group 13 element, a Group 14 element or a Group 15 element in the long-period type periodic table. R71 represents a halogen group. Y31 represents —C(═O)—R72-C(═O)—, —C(═O)—$CR73_2$-, or —C(═O)—C(═O)—, where R72 represents an alkylene group, a halogenated alkylene group, an arylene group or a halogenated arylene group, and R73 represents an alkyl group, a halogenated alkyl group, an aryl group or a halogenated aryl group. Note that a3 is an integer of 1 to 4, b3 is an integer of 0, 2 or 4, and c3, d3, m3 and n3 each are an integer of 1 to 3)

[Chem. 17]

(2D)

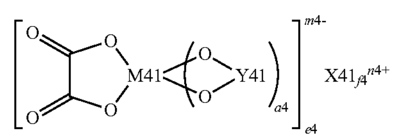

(in the formula, X41 represents a Group 1 element or a Group 2 element in the long-period type periodic table. M41 represents a transition metal, or a Group 13 element, a Group 14 element or a Group 15 element in the long-period type periodic table. Y41 represents —C(=O)—$(CR81_2)_{b4}$-C(=O)—, —$R83_2C$—$(CR82_2)_{c4}$-C(=O)—, —$R83_2C$—$(CR82_2)_{c4}$-$CR83_2$-, —$R83_2C$—$(CR82_2)_{c4}$-S$(=O)_2$—, —S$(=O)_2$—$(CR82_2)_{d4}$-S$(=O)_2$—, or —C(=O)—$(CR82_2)_{d4}$-S$(=O)_2$—, where R81 and R83 represent a hydrogen group, an alkyl group, a halogen group or a halogenated alkyl group, and at least one thereof is a halogen group or a halogenated alkyl group, and R82 represents a hydrogen group, an alkyl group, a halogen group or a halogenated alkyl group. Note that a4, e4 and n4 each are an integer of 1 or 2, b4 and d4 each are an integer of 1 to 4, c4 is an integer of 0 to 4, and f4 and m4 each are an integer of 1 to 3)

[Chem. 18]

(3D)

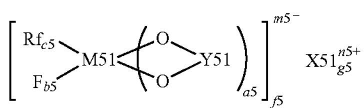

(in the formula, X51 represents a Group 1 element or a Group 2 element in the long-period type periodic table. M51 represents a transition metal, or a Group 13 element, a Group 14 element or a Group 15 element in the long-period type periodic table. Rf represents a fluorinated alkyl group or a fluorinated aryl group, each having 1 to 10 carbon atoms. Y51 represents —C(=O)—$(CR91_2)_{d5}$-C(=O)—, —$R92_2C$—$(CR91_2)_{d5}$-C(=O)—, —$R92_2C$—$(CR91_2)_{d5}$-$CR92_2$-, —$R92_2C$—$(CR91_2)_{d5}$-S$(=O)_2$—, —S$(=O)_2$—$(CR91_2)_{e5}$-S$(=O)_2$—, or —C(=O)—$(CR91_2)_{e5}$-S$(=O)_2$—, where R91 represents a hydrogen group, an alkyl group, a halogen group or a halogenated alkyl group, R92 represents a hydrogen group, an alkyl group, a halogen group or a halogenated alkyl group, and at least one thereof is a halogen group or a halogenated alkyl group. Note that a5, f5 and n5 each are an integer of 1 or 2, b5, c5 and e5 each are an integer of 1 to 4, d5 is an integer of 0 to 4, and g5 and m5 each are an integer of 1 to 3.)

The metal salts represented by Formula (1D) include, for example, lithium salts represented by Formula (1D-1) to Formula (1D-6). The metal salts represented by Formula (2D) include, for example, lithium salts represented by Formula (2D-1) to Formula (2D-8). The metal salts represented by Formula (3D) include lithium salts represented by Formula (3D-1).

[Chem. 19]

(1D-1)

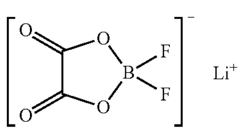

(1D-2)

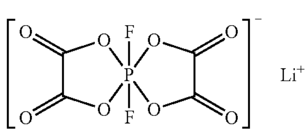

(1D-3)

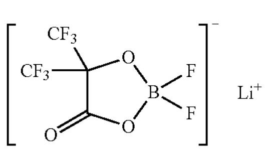

-continued (1D-4)

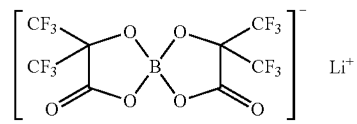

(1D-5)

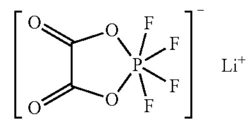

(1D-6)

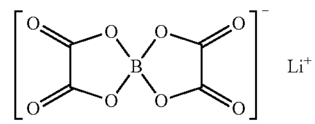

[Chem. 20]

(2D-1)

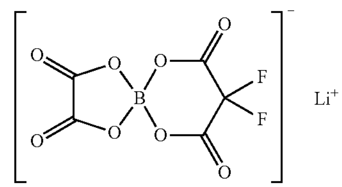

(2D-2)

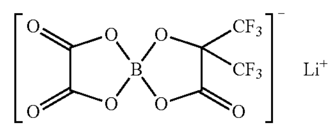

(2D-3)

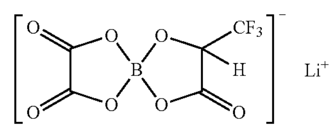

(2D-4)

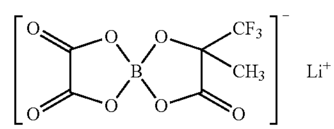

(2D-5)

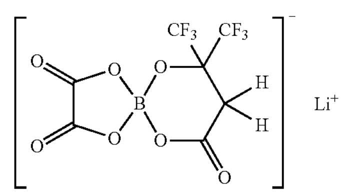

(2D-6)

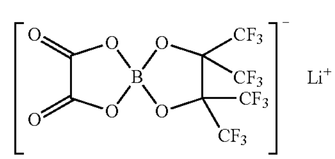

(2D-7)

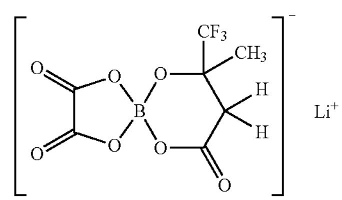

-continued (2D-8)

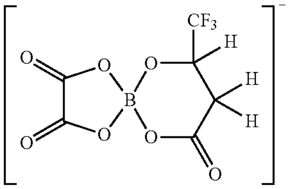

[Chem. 21]

(3D-1)

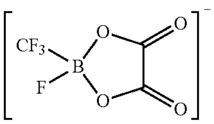

[Chem. 22]

(4D)

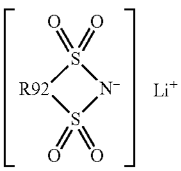

(in the formula, R92 represents a divalent halogenated hydrocarbon group.)

The metal salts represented by Formula (4D) include, for example, lithium salts represented by Formula (4D-1) to Formula (4D-4).

[Chem. 23]

(4D-1)

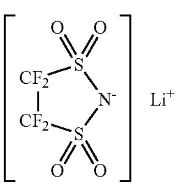

(4D-2)

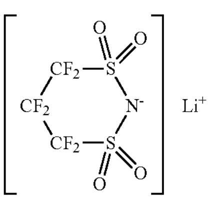

(4D-3)

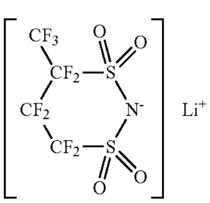

(4D-4)

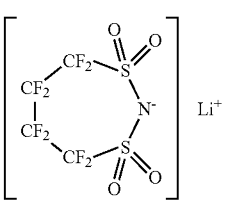

-continued

[Chem. 24]

$$M^{+}[(ZY)_2N]^{-} \quad (5D)$$

(in the formula, $M^+$ represents a monovalent cation, Y represents $SO_2$ or CO, and Z each independently represent a halogen group or an organic group.)

Examples of the organic group include a monovalent hydrocarbon group, a monovalent halogenated hydrocarbon group, a monovalent oxygen-comprising hydrocarbon group or a monovalent halogenated oxygen-comprising hydrocarbon group. The halogen group refers to a fluorine group, a chlorine group, a bromine group or an iodine group. Examples of cations constituting $M^+$ include alkali metal ions such as lithium ions ($Li^+$), sodium ions ($Na^+$), and potassium ions ($K^+$), other metal element ions, ammonium cations, and phosphonium cations. Among them, lithium ions are preferable.

Examples of the compounds represented by Formula (5D) include the compound represented by Formula (5a).

$$Li[N(SO_2R93)(SO_2R94)] \quad \text{Formula (5a)}$$

(in the formula, R93 and R94 represent a halogen group, a monovalent hydrocarbon group, or a monovalent halogenated hydrocarbon group, and at least one of R93 and R94 is a halogen group or a monovalent halogenated hydrocarbon group.)

The monovalent hydrocarbon group, the monovalent halogenated hydrocarbon group, the monovalent oxygen-comprising hydrocarbon group or the monovalent halogenated oxygen-comprising hydrocarbon group is, for example, an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, and an alkoxy group having 1 to 12 carbon atoms, a group in which two or more thereof are bound, or a group in which at least some hydrogen groups thereof are substituted with a halogen group. The divalent hydrocarbon group or the divalent halogenated hydrocarbon group is an alkylene group having 1 to 12 carbon atoms, an alkenylene group having 2 to 12 carbon atoms, an alkynylene group having 2 to 12 carbon atoms, an arylene group having 6 to 18 carbon atoms, and a cycloalkylene group having 3 to 18 carbon atoms, a group in which two or more thereof are bound, or a group in which at least some hydrogen groups are substituted with a halogen group.

Examples of the compound represented by Formula (5a) include the compound represented by Formula (5b) and the compound represented by Formula (5c).

$$LiN(C_mF_{2m+1}SO_2)(C_nF_{2n+1}SO_2) \quad \text{Formula (5b)}$$

(in the formula, m and n each are an integer of 1 or more)

$$LiN(C_jF_{2j+1}SO_2)(C_kF_{2k+1}SO_2) \quad \text{Formula (5c)}$$

(in the formula, j and k each are an integer of 0 or more. At least one of j and k is 0.)

The compounds represented by Formula (5D) include lithium bis(trifluoromethanesulfonyl)imide ($LiN(CF_3SO_2)_2$), lithium bis(pentafluoroethanesulfonyl)imide ($LiN(C_2FsSO_2)_2$), lithium(trifluoromethanesulfonylXpentafluoroethanesulfonyl)imide ($LiN(CF_3SO_2)(C_2FsSO_2)$), lithium (trifluoromethanesulfonylXheptafluoropropanesulfonyl) imide ($LiN(CF_3SO_2)(C_3F_7SO_2)$), or lithium (trifluoromethanesulfonylXnonafluorobutanesulfonyl)imide ($LiN(CF_3SO_2)(C_4F_9SO_2)$) represented by Formula (5D-1) as the compound represented by Formula (5b) and lithium bis (fluorosulfonyl)imide ($LiN(FSO_2)_2$) represented by Formula (5D-2) and lithium(fluorosulfonyl) (trifluoromethanesulfonyl)imide ($LiN(CF_3SO_2)(FSO_2)$) represented by Formula (5D-3) as the compound represented by Formula (5c).

[Chem. 25]

(5D-1)

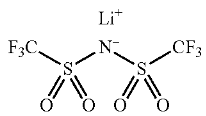

(5D-2)

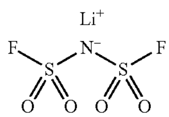

(5D-3)

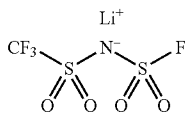

Formula (6D)

$$LiC(C_pF_{2p+1}SO_2)(C_qF_{2q+1}SO_2)(C_rF_{2r+1}SO_2)$$

(in the formula, p, q and r each are an integer of 1 or more.)

The compound represented by Formula (6D) is a chain methide compound, and includes, for example, lithium tris(trifluoromethanesulfonyl) methide represented by Formula (6D-1).

[Chem. 26]

(6D-1)

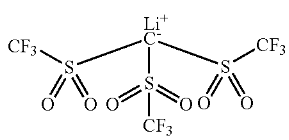

[Chem. 27]

(7D)

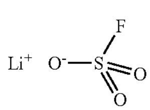

The electrolyte salt may include one, two or more kinds of metal salts such as a lithium salt other than the metal salts represented by Formula (1D) to Formula (7D) described above. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

(Content of Metal Salts Represented by Formula (1D) to Formula (7D))

In view of obtaining a more excellent effect, with respect to the non-aqueous electrolyte solution, as a content of the metal salts represented by Formula (1D) to Formula (7D), 0.01 mass % or more and 2.0 mass % or less is preferable, 0.02 mass % or more and 1.8 mass % or less is more preferable, and 0.03 mass % or more and 1.0 mass % or less is most preferable.

(Non-aqueous Solvent)

As the non-aqueous solvent, for example, a lactone-based solvent such as γ-butyrolactone, γ-valerolactone, δ-valerolactone or ε-caprolactone, a carbonate ester-based solvent such as ethylene carbonate, propylene carbonate, butylene carbonate, vinylene carbonate, dimethyl carbonate, ethyl methyl carbonate or diethyl carbonate, an ether-based solvent such as 1,2-dimethoxyethane, 1-ethoxy-2-methoxy ethane, 1,2-diethoxyethane, tetrahydrofuran or 2-methyltetrahydrofuran, a nitrile-based solvent such as acetonitrile, a sulfolane-based solvent, a phosphoric acids solvent, a phosphate ester solvent, or a non-aqueous solvent such as a pyrrolidone may be used. As the solvent, any one kind may be used alone or a mixture of two or more kinds may be used.

(Solid Particles)

As the solid particles, for example, at least one of inorganic particles and organic particles, etc. may be used. As the inorganic particle, for example, a particle of a metal oxide, a sulfate compound, a carbonate compound, a metal hydroxide, a metal carbide, a metal nitride, a metal fluoride, a phosphate compound, a mineral, or the like may be given. As the particle, a particle having electrically insulating properties is typically used, and also a particle (minute particle) in which the surface of a particle (minute particle) of an electrically conductive material is subjected to surface treatment with an electrically insulating material or the like and is thus provided with electrically insulating properties may be used.

As the metal oxide, silicon oxide ($SiO_2$, silica (silica stone powder, quartz glass, glass beads, diatomaceous earth, a wet or dry synthetic product, or the like; colloidal silica being given as the wet synthetic product, and fumed silica being given as the dry synthetic product)), zinc oxide (ZnO), tin oxide (SnO), magnesium oxide (magnesia, MgO), antimony oxide ($Sb_2O_3$), aluminum oxide (alumina, $Al_2O_3$), or the like may be preferably used.

As the sulfate compound, magnesium sulfate ($MgSO_4$), calcium sulfate ($CaSO_4$), barium sulfate ($BaSO_4$), strontium sulfate ($SrSO_4$), or the like may be preferably used. As the carbonate compound, magnesium carbonate ($MgCO_3$, magnesite), calcium carbonate ($CaCO_3$, calcite), barium carbonate ($BaCO_3$), lithium carbonate ($Li_2CO_3$), or the like may be preferably used. As the metal hydroxide, magnesium hydroxide ($Mg(OH)_2$, brucite), aluminum hydroxide ($Al(OH)_3$, (bayerite or gibbsite)), zinc hydroxide ($Zn(OH)_2$), or the like, an oxide hydroxide or a hydrated oxide such as boehmite ($Al_2O_3H_2O$ or AlOOH, diaspore), white carbon ($SiO_2.nH_2O$, silica hydrate), zirconium oxide hydrate ($ZrO_2 nH_2O$ (n=0.5 to 10)), or magnesium oxide hydrate ($MgO_a.mH_2O$ (a=0.8 to 1.2, m=0.5 to 10)), a hydroxide hydrate such as magnesium hydroxide octahydrate, or the like may be preferably used. As the metal carbide, boron carbide ($B_4C$) or the like may be preferably used. As the metal nitride, silicon nitride ($Si_3N_4$), boron nitride (BN), aluminum nitride (AlN), titanium nitride (TIN), or the like may be preferably used.

As the metal fluoride, lithium fluoride (LiF), aluminum fluoride ($AlF_3$), calcium fluoride ($CaF_2$), barium fluoride ($BaF_2$), magnesium fluoride, or the like may be preferably used. As the phosphate compound, trilithium phosphate ($Li_3PO_4$), magnesium phosphate, magnesium hydrogen phosphate, ammonium polyphosphate, or the like may be preferably used.

As the mineral, a silicate mineral, a carbonate mineral, an oxide mineral, or the like is given. The silicate mineral is categorized on the basis of the crystal structure into nesosilicate minerals, sorosilicate minerals, cyclosilicate minerals, inosilicate minerals, layered (phyllo) silicate minerals, and tectosilicate minerals. There are also minerals categorized as fibrous silicate minerals called asbestos according to a different categorization criterion from the crystal structure.

The nesosilicate mineral is an isolated tetrahedral silicate mineral formed of independent Si—O tetrahedrons ($[SiO_4]^{4-}$). As the nesosilicate mineral, one that falls under olivines or garnets, or the like is given. As the nesosilicate mineral, more specifically, an olivine (a continuous solid solution of $Mg_2SiO_4$ (forsterite) and $Fe_2SiO_4$ (fayalite)), magnesium silicate (forsterite, $Mg_2SiO_4$), aluminum silicate ($Al_2SiO_5$; sillimanite, andalusite, or kyanite), zinc silicate (willemite, $Zn_2SiO_4$), zirconium silicate (zircon, $ZrSiO_4$), mullite ($3Al_2O_3.2SiO_2$ to $2Al_2O_3.SiO_2$), or the like is given.

The sorosilicate mineral is a group-structured silicate mineral formed of composite bond groups of Si—O tetrahedrons ($[Si_2O_7]^{6-}$ or $[Si_5O_{16}]^{12-}$). As the sorosilicate mineral, one that falls under vesuvianite or epidotes, or the like is given.

The cyclosilicate mineral is a ring-shaped silicate mineral formed of ring-shaped bodies of finite (3 to 6) bonds of Si—O tetrahedrons ($[Si_3O_9]^{6-}$, $[Si_4O_{12}]^{8-}$, or $[Si_6O_{18}]^{12-}$). As the cyclosilicate mineral, beryl, tourmalines, or the like is given.

The inosilicate mineral is a fibrous silicate mineral having a chain-like form ($[Si_2O_6]^{4-}$) and a band-like form ($[Si_3O_9]^{6-}$, $[Si_4O_{11}]^{6-}$, $[Si_5O_{15}]^{10-}$, or $[Si_7O_{21}]^{14-}$) in which the linkage of Si—O tetrahedrons extends infinitely. As the inosilicate mineral, for example, one that falls under pyroxenes such as calcium silicate (wollastonite, $CaSiO_3$), one that falls under amphiboles, or the like is given.

The layered silicate mineral is a layer-like silicate mineral having network bonds of Si—O tetrahedrons ($[SiO_4]^{4-}$). Specific examples of the layered silicate mineral are described later.

The tectosilicate mineral is a silicate mineral of a three-dimensional network structure in which Si—O tetrahedrons ($[SiO_4]^{4-}$) form three-dimensional network bonds. As the tectosilicate mineral, quartz, feldspars, zeolites, or the like, an aluminosilicate ($aM_2O.bAl_2O_3.cSiO_2.dH_2O$; M being a metal element; a, b, c, and d each being an integer of 1 or more) such as a zeolite ($M_{2/n}O.Al_2O_3.xSiO_2yH_2O$; M being a metal element; n being the valence of M; $x \geq 2$; $y \geq 0$), or the like is given.

As the asbestos, chrysotile, amosite, anthophyllite, or the like is given.

As the carbonate mineral, dolomite ($CaMg(CO_3)_2$), hydrotalcite ($Mg_6Al_2(CO_3)(OH)_{16}.4(H_2O)$), or the like is given.

As the oxide mineral, spinel ($MgAl_2O_4$) or the like is given.

As other minerals, strontium titanate ($SrTiO_3$), or the like is given. The mineral may be a natural mineral or an artificial mineral.

These minerals include those categorized as clay minerals. As the clay mineral, a crystalline clay mineral, an amorphous or quasicrystalline clay mineral, or the like is given. As the crystalline clay mineral, a silicate mineral such as a layered silicate mineral, one having a structure close to a layered silicate, or other silicate minerals, a layered carbonate mineral, or the like is given.

The layered silicate mineral comprises a tetrahedral sheet of Si—O and an octahedral sheet of Al—O, Mg—O, or the like combined with the tetrahedral sheet. The layered silicate is typically categorized by the numbers of tetrahedral sheets and octahedral sheets, the number of cations of the octahedrons, and the layer charge. The layered silicate mineral may be also one in which all or part of the metal ions between layers are substituted with an organic ammonium ion or the like, etc.

Specifically, as the layered silicate mineral, one that falls under the kaolinite-serpentine group of a 1:1-type structure, the pyrophyllite-talc group of a 2:1-type structure, the smectite group, the vermiculite group, the mica group, the brittle mica group, the chlorite group, or the like, etc. are given.

As one that falls under the kaolinite-serpentine group, for example, chrysotile, antigorite, lizardite, kaolinite ($Al_2Si_2O_5(OH)_4$), dickite, or the like is given. As one that falls under the pyrophyllite-talc group, for example, talc ($Mg_3Si_4O_{10}(OH)_2$), willemseite, pyrophyllite ($Al_2Si_4O_{10}(OH)_2$), or the like is given. As one that falls under the smectite group, for example, saponite $[(Ca/2,Na)_{0.33}(Mg,Fe^{2+})_3(Si,Al)_4O_{10}(OH)_2.4H_2O]$, hectorite, sauconite, montmorillonite {$(Na,Ca)_{0.33}(Al,Mg)2Si_4O_{10}(OH)_2.nH_2O$; a clay comprising montmorillonite as a main component is called bentonite}, beidellite, nontronite, or the like is given. As one that falls under the mica group, for example, muscovite ($KAl_2(AlSi_3)O_{10}(OH)_2$), sericite, phlogopite, biotite, lepidolite (lithia mica), or the like is given. As one that falls under the brittle mica group, for example, margarite, clintonite, anandite, or the like is given. As one that falls under the chlorite group, for example, cookeite, sudoite, clinochlore, chamosite, nimite, or the like is given.

As one having a structure close to the layered silicate, a hydrous magnesium silicate having a 2:1 ribbon structure in which a sheet of tetrahedrons arranged in a ribbon configuration is linked to an adjacent sheet of tetrahedrons arranged in a ribbon configuration while inverting the apices, or the like is given. As the hydrous magnesium silicate, sepiolite ($Mg_9Si_{12}O_{30}(OH)_6(OH_2)_4.6H_2O$), palygorskite, or the like is given.

As other silicate minerals, a porous aluminosilicate such as a zeolite ($M_{2/n}O.Al_2O_3.xSiO_2.yH_2O$; M being a metal element; n being the valence of M; $x \geq 2$; $y \geq 0$), attapulgite $[(Mg,Al)2Si_4O_{10}(OH).6H_2O]$, or the like is given.

As the layered carbonate mineral, hydrotalcite ($Mg_6Al_2(CO_3)(OH)_{16}.4(H_2O)$) or the like is given.

As the amorphous or quasicrystalline clay mineral, hisingerite, imogolite ($Al_2SiO_3(OH)$), allophane, or the like is given.

These inorganic particles may be used singly, or two or more of them may be mixed for use. The inorganic particle has also oxidation resistance; and when the electrolyte layer 56 is provided between the cathode 53 and the separator 55, the inorganic particle has strong resistance to the oxidizing environment near the cathode during charging.

The solid particle may be also an organic particle. As the material that forms the organic particle, melamine, melamine cyanurate, melamine polyphosphate, cross-linked polymethyl methacrylate (cross-linked PMMA), polyolefin, polyethylene, polypropylene, polystyrene, polytetrafluoroethylene, polyvinylidene difluoride, a polyamide, a polyimide, a melamine resin, a phenol resin, an epoxy resin, or the like is given. These materials may be used singly, or two or more of them may be mixed for use.

In view of obtaining a more excellent effect, among such solid particles, particles of boehmite, aluminum hydroxide, magnesium hydroxide, and a silicate salt are preferable. In such solid particles, a deviation in the battery due to —O—H arranged in a sheet form in a crystal structure selectively attracts at least one kind of the metal salts represented by Formula (1D) to Formula (7D). Accordingly, it is possible to intensively accumulate at least one kind of the metal salts represented by Formula (1D) to Formula (7D) at the recess between active material particles more effectively.

(Configuration of an Inside of a Battery)

FIG. 3A and FIG. 3B are schematic cross-sectional views of an enlarged part of an inside of the non-aqueous electrolyte battery according to the sixteenth embodiment of the present technology. Note that the binder, the conductive agent and the like comprised in the active material layer are not shown.

As shown in FIG. 3A, the non-aqueous electrolyte battery according to the sixteenth embodiment of the present technology has a configuration in which particles 10, which are the solid particles described above, are disposed between the separator 55 and the anode active material layer 54B and inside the anode active material layer 54B at an appropriate concentration in appropriate regions. In such a configuration, three regions divided into a recess impregnation region A of an anode side, a top coat region B of an anode side and a deep region C of an anode side are formed.

Also, similarly, as shown in FIG. 3B, the non-aqueous electrolyte battery according to the sixteenth embodiment of the present technology has a configuration in which particles 10, which are the solid particles described above, are disposed between the separator 55 and the cathode active material layer 53B and inside the cathode active material layer 53B at an appropriate concentration in appropriate regions. In such a configuration, three regions divided into a recess impregnation region A of a cathode side, a top coat region B of a cathode side and a deep region C of a cathode side are formed.

(Recess Impregnation Region A, Top Coat Region B, and Deep Region C)

For example, the recess impregnation regions A of the anode side and the cathode side, the top coat regions B of the anode side and the cathode side, and the deep regions C of the anode side and the cathode side are formed as follows.

(Recess Impregnation Region A)

(Recess Impregnation Region of an Anode Side)

The recess impregnation region A of the anode side refers to a region including a recess between the adjacent anode active material particles 11 positioned on the outermost surface of the anode active material layer 54B comprising anode active material particles 11 serving as anode active materials. The recess impregnation region A is impregnated with the particles 10 and electrolytes comprising at least one kind of the metal salts represented by Formula (1D) to Formula (7D). Accordingly, the recess impregnation region A of the anode side is filled with the electrolytes comprising at least one kind of the metal salts represented by Formula (1D) to Formula (7D). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the anode active material particles 11 inside a region between two parallel lines L1 and L2 shown in FIG. 3A is classified as the recess impregnation region A of the anode side including the recess in which the electrolytes and the particles 10 are disposed. The two parallel lines L1 and L2 are drawn as follows. Within a predetermined visual field width (typically, a visual field width of 50 μm) shown in FIG. 3A, cross sections of the separator 55, the anode active material layer 54B, and a region between the separator 55 and the anode active material layer 54B are observed. In this observation field of view, the two parallel lines L1 and L2 perpendicular to a thickness direction of the separator 55 are drawn. The parallel line L1 is a line that passes through a position closest to the separator 55 in a cross-sectional image of the anode active material particles 11. The parallel line L2 is a line that passes through the deepest part in a cross-sectional image of the particles 10 included in the recess between the adjacent anode active material particles 11. The deepest part refers to a position farthest from the separator 55 in a thickness direction of the separator 55. Also, the cross section can be observed using, for example, a scanning electron microscope (SEM).

(Recess Impregnation Region of a Cathode Side)

The recess impregnation region A of the cathode side refers to a region including a recess between the adjacent cathode active material particles 12 positioned on the outermost surface of the cathode active material layer 53B comprising cathode active material particles 12 serving as cathode active materials. The recess impregnation region A is impregnated with the particles 10 serving as solid particles and the electrolytes comprising at least one kind of the metal salts represented by Formula (1D) to Formula (7D). Accordingly, the recess impregnation region A of the cathode side is filled with the electrolytes comprising at least one kind of the metal salts represented by Formula (1D) to Formula (7D). In addition, the particles 10 are comprised in the recess impregnation region A of the anode side as solid particles to be included in the electrolytes. Note that the electrolytes may be gel-like electrolytes or liquid electrolytes including the non-aqueous electrolyte solution.

A region other than a cross section of the cathode active material particles 12 inside a region between two parallel lines L1 and L2 shown in FIG. 3B is classified as the recess impregnation region A of the cathode side including the recess in which the electrolytes and the particles 10 are disposed. The two parallel lines L1 and L2 are drawn as follows. Within a predetermined visual field width (typically, a visual field width of 50 μm) shown in FIG. 3B, cross sections of the separator 55, the cathode active material layer 53B and a region between the separator 55 and the cathode active material layer 53B are observed. In this observation field of view, the two parallel lines L1 and L2 perpendicular to a thickness direction of the separator 55 are drawn. The parallel line L1 is a line that passes through a position closest to the separator 55 in a cross-sectional image of the cathode active material particles 12. The parallel line L2 is a line that passes through the deepest part in a cross-sectional image of the particles 10 included in the recess between the adjacent cathode active material particles 12. Note that the deepest part refers to a position farthest from the separator 55 in a thickness direction of the separator 55.

(Top Coat Region B)

(Top Coat Region of an Anode Side)

The top coat region B of the anode side refers to a region between the recess impregnation region A of the anode side and the separator 55. The top coat region B is filled with the electrolytes comprising at least one kind of the metal salts represented by Formula (1D) to Formula (7D). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3A is classified as the top coat region B of the anode side.

(Top Coat Region of a Cathode Side)

The top coat region B of the cathode side refers to a region between the recess impregnation region A of the cathode side and the separator 55. The top coat region B is filled with the electrolytes comprising at least one kind of the metal salts represented by Formula (1D) to Formula (7D). The particles 10 serving as solid particles to be included in the electrolytes are comprised in the top coat region B. Note that the particles 10 may not be comprised in the top coat region B. A region between the above-described parallel line L1 and separator 55 within the same predetermined observation field of view shown in FIG. 3B is classified as the top coat region B of the cathode side.

(Deep Region C)

(Deep Region of an Anode Side)

The deep region C of the anode side refers to a region inside the anode active material layer 54B, which is deeper than the recess impregnation region A of the anode side. The gap between the anode active material particles 11 of the deep region C is filled with the electrolytes comprising at least one kind of the metal salts represented by Formula (1D) to Formula (7D). The particles 10 to be included in the electrolytes are comprised in the deep region C. Note that the particles 10 may not be comprised in the deep region C.

A region of the anode active material layer 54B other than the recess impregnation region A and the top coat region B within the same predetermined observation field of view shown in FIG. 3A is classified as the deep region C of the anode side. For example, a region between the above-described parallel line L2 and anode current collector 54A within the same predetermined observation field of view shown in FIG. 3A is classified as the deep region C of the anode side.

(Deep Region of a Cathode Side)

The deep region C of the cathode side refers to a region inside the cathode active material layer 53B, which is deeper than the recess impregnation region A of the cathode side. The gap between the cathode active material particles 12 of the deep region C of the cathode side is filled with the electrolytes comprising at least one kind of the metal salts represented by Formula (1D) to Formula (7D). The particles 10 to be included in the electrolytes are comprised in the deep region C. Note that the particles 10 may not be comprised in the deep region C.

A region of the cathode active material layer 53B other than the recess impregnation region A and the top coat region B within the same predetermined observation field of view shown in FIG. 3B is classified as the deep region C of the cathode side. For example, a region between the above-described parallel line L2 and cathode current collector 53A within the same predetermined observation field of view shown in FIG. 3B is classified as the deep region C of the cathode side.

(Concentration of Solid Particles)

The concentration of the solid particles of the recess impregnation region A of the anode side is 30 volume % or more. Furthermore, 30 volume % or more and 90 volume % or less is preferable, and 40 volume % or more and 80 volume % or less is more preferable. When the concentration of the solid particles of the recess impregnation region A of the anode side is in the above range, more solid particles are disposed in the recess between adjacent particles positioned on the outermost surface of the anode active material layer. Accordingly, at least one kind of the metal salts represented by Formula (1D) to Formula (7D) is captured by the solid particles, and the additive is likely to be retained in the recess between adjacent active material particles. For this reason, an abundance ratio of the additive in the recess between adjacent particles can be higher than in the other parts. At least one kind of the metal salts represented by Formula (1D) to Formula (7D) is concentrated at the recess, metal precipitates are controlled only in a surface direction, the precipitates are housed inside the recess, and therefore it is possible to provide a battery having an excellent overcharge resistance. In addition, an effect of suppressing a negative influence on a cycle is obtained by retaining at least one kind of the metal salts represented by Formula (1D) to Formula (7D) in the recess. Cycle performance can be compatible with an overcharge resistance, which was not achieved in the related art.

The concentration of the solid particles of the recess impregnation region A of the cathode side is 30 volume % or more. Furthermore, 30 volume % or more and 90 volume % or less is preferable, and 40 volume % or more and 80 volume % or less is more preferable. When solid particles are disposed in the recess between adjacent active material particles of the outermost surface of the cathode, since most of the lithium ions emitted from the cathode pass through this part, it is more efficient to provide at least one kind of anions of the metal salts represented by Formula (1D) to Formula (7D) at a great amount. Accordingly, at least one kind of the metal salts represented by Formula (1D) to Formula (7D) is concentrated at the recess, metal precipitates are controlled only in a surface direction, the precipitates are housed inside the recess, and therefore it is possible to improve an overcharge resistance.

The concentration of the solid particles of the recess impregnation region A of the anode side is preferably 10 times the concentration of the solid particles of the deep region C of the anode side or more. A concentration of the particles of the deep region C of the anode side is preferably 3 volume % or less. When the concentration of the solid particles of the deep region C of the anode side is too high, since too many solid particles are between active material particles, the solid particles cause a resistance, the captured metal salts causes a side reaction, and an internal resistance increases.

For the same reason, the concentration of the solid particles of the recess impregnation region A of the cathode side is preferably 10 times the concentration of the solid particles of the deep region C of the cathode side or more. The concentration of particles of the deep region C of the cathode side is preferably 3 volume % or less. When the concentration of the solid particles of the deep region C of the cathode side is too high, since too many solid particles are between active material particles, the solid particles cause a resistance, the captured metal salts causes a side reaction, and an internal resistance increases.

(Concentration of Solid Particles)

The concentration of solid particles described above refers to a volume concentration (volume %) of solid particles, which is defined as an area percentage ((“total area of particle cross section”÷“area of observation field of view”)×100)(%) of a total area of cross sections of particles when an observation field of view is 2 μm×2 μm. Note that, when a concentration of solid particles of the recess impregnation region A is defined, the observation field of view is set, for example, in the vicinity of a center of a recess formed between adjacent particles in a width direction. Observation is performed using, for example, the SEM, an image obtained by photography is processed, and therefore it is possible to calculate the above areas.

(Thickness of the Recess Impregnation Region A, the Top Coat Region B, and the Deep Region C)

The thickness of the recess impregnation region A of the anode side is preferably 10% or more and 40% or less of the thickness of the anode active material layer 54B. When the thickness of the recess impregnation region A of the anode side is in the above range, it is possible to ensure an amount of necessary solid particles to be disposed in the recess and maintain a state in which an excess of the solid particles and the additive do not enter the deep region C. Further, more preferably, the thickness of the recess impregnation region A of the anode side is in the above range, and is twice the thickness of the top coat region B of the anode side or more. This is because it is possible to prevent a distance between electrodes from increasing and further improve an energy density. In addition, for the same reason, the thickness of the recess impregnation region A of the cathode side is more preferably twice the thickness of the top coat region B of the cathode side or more.

(Method of Measuring a Thickness of Regions)

When the thickness of the recess impregnation region A is defined, an average value of thicknesses of the recess impregnation region A in four different observation fields of view is set as the thickness of the recess impregnation region A. When the thickness of the top coat region B is defined, an average value of thicknesses of the top coat region B in four different observation fields of view is set as the thickness of the top coat region B. When the thickness of the deep region C is defined, an average value of thicknesses of the deep region C in four different observation fields of view is set as the thickness of the deep region C.

(Particle Size of Solid Particles)

As a particle size of solid particles, a particle size D50 is preferably "$2/\sqrt{3}-1$" times a particle size D50 of active material particles or less. In addition, as the particle size of the solid particles, a particle size D50 is more preferably 0.1 μm or more. As the particle size of the solid particles, a particle size D95 is preferably "$2/\sqrt{3}-1$" times a particle size D50 of active material particles or more. Particles having a large particle size block an interval between adjacent active material particles at a bottom of the recess and it is possible to suppress too many of the solid particles from entering the deep region C and a negative influence on a battery characteristic.

(Measurement of a Particle Size)

A particle size D50 of solid particles is, for example, a particle size at which 50% of particles having a smaller particle size are cumulated (a cumulative volume of 50%) in a particle size distribution in which solid particles after components other than solid particles are removed from electrolytes comprising solid particles are measured by a laser diffraction method. In addition, based on the measured particle size distribution, it is possible to obtain a value of a particle size D95 at a cumulative volume 95%. A particle size D50 of active materials is a particle size at which 50% of particles having a smaller particle size are cumulated (a cumulative volume of 50%) in a particle size distribution in which active material particles after components other than active material particles are removed from an active material layer comprising active material particles are measured by a laser diffraction method.

(Specific Surface Area of Solid Particles)

The specific surface area ($m^2/g$) is a BET specific surface area ($m^2/g$) measured by a BET method, which is a method of measuring a specific surface area. The BET specific surface area of solid particles is preferably 1 $m^2/g$ or more and 60 $m^2/g$ or less. When the BET specific surface area is in the above numerical range, an action of solid particles capturing at least one kind of the metal salts represented by Formula (1D) to Formula (7D) increases, which is preferable. On the other hand, when the BET specific surface area is too large, since lithium ions are also captured, an output characteristic tends to decrease. Note that the specific surface area of the solid particles can be measured using, for example, solid particles after components other than solid particles are removed from electrolytes comprising solid particles in the same manner as described above.

(Amount of Solid Particles Added)

In view of obtaining a more excellent effect, with respect to electrolytes, as an amount of solid particles added, 1 mass % or more and 60 mass % or less is preferable, 2 mass % or more and 50 mass % or less is more preferable, and 5 mass % or more and 40 mass % or less is most preferable.

(Configuration Including the Recess Impregnation Region A, the Top Coat Region B, and the Deep Region C, which are Only on the Anode Side or the Cathode Side)

Note that the electrolyte layer 56 comprising solid particles may be formed only on both principal surfaces of the anode 54. In addition, the electrolyte layer 56 comprising no solid particles may be applied to and formed on both principal surfaces of the cathode 53. Similarly, the electrolyte layer 56 comprising solid particles may be formed only on both principal surfaces of the cathode 53. In addition, the electrolyte layer 56 without solid particles may be applied to and formed on both principal surfaces of the anode 54. In such cases, only the recess impregnation region A of the anode side, the top coat region B of the anode side, and the deep region C of the anode side are formed, and these regions are not formed on the cathode side or only the recess impregnation region A of the cathode side, the top coat region B of the cathode side, and the deep region C of the cathode side are formed, and these regions are not formed on the anode side.

(16-2) Method of Manufacturing an Exemplary Non-aqueous Electrolyte Battery

An exemplary non-aqueous electrolyte battery can be manufactured, for example, as follows.

(Method of Manufacturing a Cathode)

Cathode active materials, the conductive agent, and the binder are mixed to prepare a cathode mixture. The cathode mixture is dispersed in a solvent such as N-methyl-2-pyrrolidone to prepare a cathode mixture slurry in a paste form. Next, the cathode mixture slurry is applied to the cathode current collector 53A, the solvent is dried, and compression molding is performed by, for example, a roll press device. Therefore, the cathode active material layer 53B is formed and the cathode 53 is fabricated.

(Method of Manufacturing an Anode)

Anode active materials and the binder are mixed to prepare an anode mixture. The anode mixture is dispersed in a solvent such as N-methyl-2-pyrrolidone to prepare an anode mixture slurry in a paste form. Next, the anode mixture slurry is applied to the anode current collector 54A, the solvent is dried, and compression molding is performed by, for example, a roll press device. Therefore, the anode active material layer 54B is formed and the anode 54 is fabricated.

(Preparation of a Non-aqueous Electrolyte Solution)

An electrolyte salt is dissolved in a non-aqueous solvent and at least one kind of the metal salts represented by Formula (1D) to Formula (7D) is added to prepare the non-aqueous electrolyte solution.

(Solution Coating)

A coating solution comprising a non-aqueous electrolyte solution, a matrix polymer compound, solid particles, and a dilution solvent (for example, dimethyl carbonate) is heated and applied to both principal surfaces of each of the cathode 53 and the anode 54. Then, the dilution solvent is evaporated and the electrolyte layer 56 is formed.

When the coating solution is heated and applied, electrolytes comprising solid particles can be impregnated into a recess between adjacent anode active material particles positioned on the outermost surface of the anode active material layer 54B and the deep region C inside the anode active material layer 54B. In this case, when solid particles are filtered in the recess between adjacent particles, a concentration of particles in the recess impregnation region A of the anode side increases. Accordingly, it is possible to set a difference of concentrations of particles between the recess impregnation region A and the deep region C. Similarly, when the coating solution is heated and applied, electrolytes comprising solid particles can be impregnated into a recess between adjacent cathode active material particles positioned on the outermost surface of the cathode active material layer 53B and the deep region C inside the cathode active material layer 53B. In this case, when solid particles are filtered in the recess between adjacent particles, a concentration of particles in the recess impregnation region A of the cathode side increases. Accordingly, it is possible to set a difference of concentrations of particles between the recess impregnation region A and the deep region C.

When the excess coating solution is scraped off after the coating solution is applied, it is possible to prevent a distance between electrodes from extending unintentionally. In addition, by scraping a surface of the coating solution, it is possible to dispose more solid particles in the recess between adjacent active material particles, and a ratio of solid particles of the top coat region B decreases. Accordingly, most of the solid particles are intensively disposed in the recess impregnation region A, and the additive can further accumulate in the recess impregnation region A.

Note that solution coating may be performed in the following manner. A coating solution (a coating solution excluding particles) comprising a non-aqueous electrolyte solution, a matrix polymer compound, and a dilution solvent (for example, dimethyl carbonate) is applied to both principal surfaces of the cathode 53, and the electrolyte layer 56 comprising no solid particles may be formed. In addition, no electrolyte layer 56 is formed on one principal surface or both principal surfaces of the cathode 53, and the electrolyte layer 56 comprising the same solid particles may be formed only on both principal surfaces of the anode 54. A coating solution (a coating solution excluding particles) comprising a non-aqueous electrolyte solution, a matrix polymer compound, and a dilution solvent (for example, dimethyl carbonate) is applied to both principal surfaces of the anode 54, and the electrolyte layer 56 comprising no solid particles may be formed. In addition, no electrolyte layer 56 is formed on one principal surface or both principal surfaces of the anode 54, and the electrolyte layer 56 comprising the same solid particles may be formed only on both principal surfaces of the cathode 53.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 on which the electrolyte layer 56 is formed and the anode 54 on which the electrolyte layer 56 is formed are laminated through the separator 55 to prepare a laminated body. Then, the laminated body is wound in a longitudinal direction, the protection tape 57 is adhered to the outermost peripheral portion and the wound electrode body 50 is formed.

Finally, for example, the wound electrode body 50 is inserted into the package member 60, and outer periphery portions of the package member 60 are enclosed in close contact with each other by thermal fusion bonding. In this case, the adhesive film 61 is inserted between the package member 60 and each of the cathode lead 51 and the anode lead 52. Accordingly, the non-aqueous electrolyte battery shown in FIG. 1 and FIG. 2 is completed.

[Modification Example 16-1]

The non-aqueous electrolyte battery according to the sixteenth embodiment may also be fabricated as follows. The fabrication method is the same as the method of manufacturing an exemplary non-aqueous electrolyte battery described above except that, in the solution coating process of the method of manufacturing an exemplary non-aqueous electrolyte battery, in place of applying the coating solution to both surfaces of at least one electrode of the cathode 53 and the anode 54, the coating solution is formed on at least one principal surface of both principal surfaces of the separator 55, and then a heating and pressing process is additionally performed.

[Method of Manufacturing a Non-aqueous Electrolyte Battery of Modification Example 16-1]

(Fabrication of a Cathode, an Anode, and a Separator, and Preparation of a Non-aqueous Electrolyte Solution)

In the same manner as in the method of manufacturing an exemplary non-aqueous electrolyte battery, the cathode 53, the anode 54 and the separator 55 are fabricated and the non-aqueous electrolyte solution is prepared.

(Solution Coating)

A coating solution comprising a non-aqueous electrolyte solution, a resin, solid particles, and a dilution solvent (for example, dimethyl carbonate) is applied to at least one surface of both surfaces of the separator 55. Then, the dilution solvent is evaporated and the electrolyte layer 56 is formed.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54, and the electrolyte layer 56 are laminated through the formed separator 55 to prepare a laminated body. Then, the laminated body is wound in a longitudinal direction, the protection tape 57 is adhered to the outermost peripheral portion, and the wound electrode body 50 is formed.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Finally, a depression portion is formed by deep drawing the package member 60 formed of a laminated film, the wound electrode body 50 is inserted into the depression portion, an unprocessed part of the package member 60 is folded at an upper part of the depression portion, and a peripheral portion of the depression portion is thermally welded. In this case, the adhesive film 61 is inserted between the package member 60 and each of the cathode lead 51 and the anode lead 52. In this manner, the desired non-aqueous electrolyte battery can be obtained.

[Modification Example 16-2]

While the configuration using gel-like electrolytes has been exemplified in the sixteenth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 16-2]

(Preparation of a Cathode, an Anode, and a Non-aqueous Electrolyte Solution)

In the same manner as in the method of manufacturing an exemplary non-aqueous electrolyte battery, the cathode 53 and the anode 54 are fabricated and the non-aqueous electrolyte solution is prepared.

(Coating and Formation of a Solid Particle Layer)

Next, paint is applied to at least one principal surface of both principal surfaces of the anode 54 by a coating method, the solvent is then removed by drying and a solid particle layer is formed. As the paint, for example, a mixture of solid particles, a binder polymer compound (a resin) and a solvent can be used. On the outermost surface of the anode active material layer 54B on which the solid particle layer is applied and formed, solid particles are filtered in the recess between adjacent anode active material particles positioned on the outermost surface of the anode active material layer 54B, and a concentration of particles of the recess impregnation region A of the anode side increases. Similarly, the same paint as described above is applied to both principal surfaces of the cathode 53 by a coating method, the solvent is then removed by drying, and a solid particle layer is formed. On the outermost surface of the cathode active material layer 53B on which the solid particle layer is applied and formed, solid particles are filtered in the recess between adjacent cathode active material particles positioned on the outermost surface of the cathode active material layer 54B, and a concentration of particles of the recess impregnation region A of the cathode side increases. For example, solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval between particles at a bottom of the recess is filled with solid particles having a large particle size and solid particles can be easily filtered.

Note that, when the solid particle layer is applied and formed, if extra paint is scraped off, it is possible to prevent a distance between electrodes from extending unintentionally. In addition, by scraping a surface of the paint, it is possible to dispose more solid particles in the recess between adjacent active material particles, and a ratio of solid particles of the top coat region B decreases. Accordingly, most of the solid particles are intensively disposed in the recess impregnation region, and at least one kind of the metal salts represented by Formula (1D) to Formula (7D) can further accumulate in the recess impregnation region A.

(Assembly of the Non-aqueous Electrolyte Battery)

Next, the cathode lead 51 is attached to an end of the cathode current collector 53A by welding and the anode lead 52 is attached to an end of the anode current collector 54A by welding.

Next, the cathode 53 and the anode 54 are laminated through the separator 55 and wound, the protection tape 57 is adhered to the outermost peripheral portion, and a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the non-aqueous electrolyte solution is injected into the package member 60, and the wound body is impregnated with the non-aqueous electrolyte solution. Then, an opening of the package member 60 is sealed by thermal fusion bonding under a vacuum atmosphere. In this manner, the desired non-electrolyte secondary battery can be obtained.

[Modification Example 16-3]

The non-aqueous electrolyte battery according to the sixteenth embodiment may be fabricated as follows.

[Method of Manufacturing a Non-aqueous Electrolyte Battery of Modification Example 16-3]

(Fabrication of a Cathode and an Anode)

In the same manner as in the method of manufacturing an exemplary non-aqueous electrolyte battery, the cathode 53 and the anode 54 are fabricated.

(Coating and Formation of a Solid Particle Layer)

Next, in the same manner as in Modification Example 16-2, a solid particle layer is formed on at least one principal surface of both principal surfaces of the anode. In the same manner, a solid particle layer is formed on at least one principal surface of both principal surfaces of the cathode.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Assembly of the Non-aqueous Electrolyte Battery)

Next, in the same manner as in Modification Example 16-2, a wound body serving as a precursor of the wound electrode body 50 is formed. Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 16-4]

The non-aqueous electrolyte battery according to the sixteenth embodiment may be fabricated as follows.

[Method of Manufacturing a Non-aqueous Electrolyte Battery of Modification Example 16-4]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated and the non-aqueous electrolyte solution is prepared.

(Formation of a Solid Particle Layer)

Next, in the same manner as in Modification Example 16-2, a solid particle layer is formed on at least one principal surface of both principal surfaces of the anode 54. In the same manner, a solid particle layer is formed on at least one principal surface of both principal surfaces of the cathode 53.

(Coating and Formation of a Matrix Resin Layer)

Next, a coating solution comprising a non-aqueous electrolyte solution, a matrix polymer compound, and a dispersing solvent such as N-methyl-2-pyrrolidone is applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 16-5]

While the configuration using gel-like electrolytes has been exemplified in the sixteenth embodiment described above, an electrolyte solution, which includes liquid electrolytes, may be used in place of the gel-like electrolytes. In this case, the non-aqueous electrolyte solution is filled inside the package member 60, and a wound body having a configuration in which the electrolyte layer 56 is removed from the wound electrode body 50 is impregnated with the non-aqueous electrolyte solution. In this case, the non-aqueous electrolyte battery is fabricated by, for example, as follows.

[Method of Manufacturing a Non-aqueous Electrolyte Battery of Modification Example 16-5]

(Fabrication of a Cathode and an Anode, and Preparation of a Non-aqueous Electrolyte Solution)

First, in the same manner as in the method of manufacturing an exemplary non-aqueous electrolyte battery, the cathode 53 and the anode 54 are fabricated, and the non-aqueous electrolyte solution is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, the cathode 53 and the anode 54 are laminated and wound through the separator 55, the protection tape 57 is adhered to the outermost peripheral portion, and a wound body serving as a precursor of the wound electrode body 50 is formed.

(Heating and Pressing Process)

Next, before the electrolyte solution is injected into the package member 60, the wound body is put into a packaging material such as a latex tube and sealed, and subjected to warm pressing under hydrostatic pressure. Accordingly, solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape. Next, the non-aqueous electrolyte solution is prepared and injected into the package member 60. The wound body is impregnated with the non-aqueous electrolyte solution, and an opening of the package member 60 is then sealed by thermal fusion bonding under a vacuum atmosphere. In this manner, the desired non-aqueous electrolyte battery can be obtained.

[Modification Example 16-6]

The non-aqueous electrolyte battery according to the sixteenth embodiment may be fabricated as follows.

[Method of Manufacturing a Non-aqueous Electrolyte Battery of Modification Example 16-6]

(Fabrication of a Cathode and an Anode)

First, in the same manner as in the method of manufacturing an exemplary non-aqueous electrolyte battery, the cathode 53 and the anode 54 are fabricated.

(Preparation of an Electrolyte Composition)

Next, an electrolyte composition comprising a non-aqueous electrolyte solution, monomers serving as a source material of a polymer compound, a polymerization initiator, and other materials such as a polymerization inhibitor as necessary is prepared.

(Formation of a Solid Particle Layer)

Next, a solid particle layer is formed on at least one principal surface of both principal surfaces of the separator 55 by a coating method.

(Assembly of the Non-aqueous Electrolyte Battery)

Next, in the same manner as in Modification Example 16-2, a wound body serving as a precursor of the wound electrode body 50 is formed.

(Heating and Pressing Process)

Next, before the non-aqueous electrolyte solution is injected into the package member 60, the wound body is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, the wound body is inserted into the package member 60 and accommodated inside the package member 60 by performing thermal fusion bonding on outer peripheral edge parts except for one side to form a pouched shape.

Next, the electrolyte composition is injected into the package member 60 having a pouched shape, and the package member 60 is then sealed using a thermal fusion bonding method or the like. Then, the monomers are polymerized by thermal polymerization. Accordingly, since the polymer compound is formed, the electrolyte layer 56 is formed. In this manner, the desired non-aqueous electrolyte battery can be obtained.

[Modification Example 16-7]

The non-aqueous electrolyte battery according to the sixteenth embodiment may be fabricated as follows.

[Method of Manufacturing a Non-aqueous Electrolyte Battery of Modification Example 16-7]

(Fabrication of a Cathode and an Anode)

First, in the same manner as in the method of manufacturing an exemplary non-aqueous electrolyte battery, the cathode 53 and the anode 54 are fabricated. Next, solid particles and the matrix polymer compound are applied to at least one principal surface of both principal surfaces of the separator 55, and drying is then performed to form a matrix resin layer.

(Assembly of the Non-aqueous Electrolyte Battery)

Next, the cathode 53 and the anode 54 are laminated through the separator 55 to prepare a laminated body. Then, the laminated body is wound in a longitudinal direction, the protection tape 57 is adhered to the outermost peripheral portion, and the wound electrode body 50 is fabricated.

(Heating and Pressing Process)

Next, the wound electrode body 50 is put into a packaging material such as a latex tube and sealed, and subjected to warm pressing under hydrostatic pressure. Accordingly, the solid particles move to the recess between adjacent anode active material particles positioned on the outermost surface of the anode active material layer 54B, and the concentration of the solid particles of the recess impregnation region A of the anode side increases. The solid particles move to the recess between adjacent cathode active material particles positioned on the outermost surface of the cathode active material layer 53B, and the concentration of the solid particles of the recess impregnation region A of the cathode side increases.

Next, a depression portion is formed by deep drawing the package member 60 formed of a laminated film, the wound electrode body 50 is inserted into the depression portion, an unprocessed part of the package member 60 is folded at an upper part of the depression portion, and thermal welding is performed except for a part (for example, one side) of the peripheral portion of the depression portion. In this case, the adhesive film 61 is inserted between the package member 60 and each of the cathode lead 51 and the anode lead 52.

Next, the non-aqueous electrolyte solution is injected into the package member 60 from an unwelded portion and the unwelded portion of the package member 60 is then sealed by thermal fusion bonding or the like. In this case, when vacuum sealing is performed, the matrix resin layer is impregnated with the non-aqueous electrolyte solution, the matrix polymer compound is swollen, and the electrolyte layer 56 is formed. In this manner, the desired non-aqueous electrolyte battery can be obtained.

[Modification Example 16-8]

In the example of the sixteenth embodiment and Modification Example 16-1 to Modification Example 16-7 described above, the non-aqueous electrolyte battery in which the wound electrode body 50 is packaged with the package member 60 has been described. However, as shown in FIGS. 4A to 4C, a stacked electrode body 70 may be used in place of the wound electrode body 50. FIG. 4A is an external view of the non-aqueous electrolyte battery in which the stacked electrode body 70 is housed. FIG. 4B is a dissembled perspective view showing a state in which the stacked electrode body 70 is housed in the package member 60. FIG. 4C is an external view showing an exterior of the non-aqueous electrolyte battery shown in FIG. 4A seen from a bottom side.

As the stacked electrode body 70, the stacked electrode body 70 in which a rectangular cathode 73 and a rectangular anode 74 are laminated through a rectangular separator 75, and fixed by a fixing member 76 is used. Although not shown, when the electrolyte layer is formed, the electrolyte layer is provided in contact with the cathode 73 and the anode 74. For example, the electrolyte layer (not shown) is provided between the cathode 73 and the separator 75, and between the anode 74 and the separator 75. The electrolyte layer is the same as the electrolyte layer 56 described above. A cathode lead 71 connected to the cathode 73 and an anode lead 72 connected to the anode 74 are led out from the stacked electrode body 70. The adhesive film 61 is provided between the package member 60 and each of the cathode lead 71 and the anode lead 72.

Note that a method of manufacturing a non-aqueous electrolyte battery is the same as the method of manufacturing a non-aqueous electrolyte battery in the example of the sixteenth embodiment and Modification Example 16-1 to Modification Example 16-7 described above except that a stacked electrode body is fabricated in place of the wound electrode body 70, and a laminated body (having a configuration in which the electrolyte layer is removed from the stacked electrode body 70) is fabricated in place of the wound body.

17. Seventeenth Embodiment

In the seventeenth embodiment of the present technology, a cylindrical non-aqueous electrolyte battery (a battery) will be described. The non-aqueous electrolyte battery is, for example, a non-aqueous electrolyte secondary battery in which charging and discharging are possible. Also, a lithium ion secondary battery is exemplified.

(17-1) Configuration of an Example of the Non-aqueous Electrolyte Battery

FIG. 5 is a cross-sectional view of an example of the non-aqueous electrolyte battery according to the seventeenth embodiment. The non-aqueous electrolyte battery is, for example, a non-aqueous electrolyte secondary battery in which charging and discharging are possible. The non-aqueous electrolyte battery, which is a so-called cylindrical type, includes non-aqueous liquid electrolytes, which are not shown, (hereinafter, appropriately referred to as the non-aqueous electrolyte solution) and a wound electrode body 90 in which a band-like cathode 91 and a band-like anode 92 are wound through a separator 93 inside a substantially hollow cylindrical battery can 81.

The battery can 81 is made of, for example, nickel-plated iron, and includes one end that is closed and the other end that is opened. A pair of insulating plates 82*a* and 82*b* perpendicular to a winding peripheral surface are disposed inside the battery can 81 so as to interpose the wound electrode body 90 therebetween.

Exemplary materials of the battery can 81 include iron (Fe), nickel (Ni), stainless steel (SUS), aluminum (Al), and titanium (Ti). In order to prevent electrochemical corrosion by the non-aqueous electrolyte solution according to charge and discharge of the non-aqueous electrolyte battery, the battery can 81 may be subjected to plating of, for example, nickel. At an open end of the battery can 81, a battery lid 83 serving as a cathode lead plate, a safety valve mechanism, and a positive temperature coefficient (PTC) element 87 provided inside the battery lid 83 are attached by being caulked through a gasket 88 for insulation sealing.

The battery lid 83 is made of, for example, the same material as that of the battery can 81, and an opening for discharging a gas generated inside the battery is provided. In the safety valve mechanism, a safety valve 84, a disk holder 85 and a blocking disk 86 are sequentially stacked. A protrusion part 84*a* of the safety valve 84 is connected to a cathode lead 95 that is led out from the wound electrode body 90 through a sub disk 89 disposed to cover a hole 86*a* provided at a center of the blocking disk 86. Since the safety valve 84 and the cathode lead 95 are connected through the sub disk 89, the cathode lead 95 is prevented from being drawn from the hole 86*a* when the safety valve 84 is reversed. In addition, the safety valve mechanism is electrically connected to the battery lid 83 through the positive temperature coefficient element 87.

When an internal pressure of the non-aqueous electrolyte battery becomes a predetermined level or more due to an internal short circuit of the battery or heat from the outside of the battery, the safety valve mechanism reverses the safety valve 84, and disconnects an electrical connection of the protrusion part 84*a*, the battery lid 83 and the wound electrode body 90. That is, when the safety valve 84 is reversed, the cathode lead 95 is pressed by the blocking disk 86, and a connection of the safety valve 84 and the cathode lead 95 is released. The disk holder 85 is made of an insulating material. When the safety valve 84 is reversed, the safety valve 84 and the blocking disk 86 are insulated.

In addition, when a gas is additionally generated inside the battery and an internal pressure of the battery further increases, a part of the safety valve 84 is broken and a gas can be discharged to the battery lid 83 side.

In addition, for example, a plurality of gas vent holes (not shown) are provided in the vicinity of the hole 86*a* of the blocking disk 86. When a gas is generated from the wound electrode body 90, the gas can be effectively discharged to the battery lid 83 side.

When a temperature increases, the positive temperature coefficient element 87 increases a resistance value, disconnects an electrical connection of the battery lid 83 and the wound electrode body 90 to block a current, and therefore prevents abnormal heat generation due to an excessive current. The gasket 88 is made of, for example, an insulating material, and has a surface to which asphalt is applied.

The wound electrode body 90 housed inside the non-aqueous electrolyte battery is wound around a center pin 94. In the wound electrode body 90, the cathode 91 and the anode 92 are sequentially laminated and wound through the separator 93 in a longitudinal direction. The cathode lead 95 is connected to the cathode 91. An anode lead 96 is connected to the anode 92. As described above, the cathode lead 95 is welded to the safety valve 84 and electrically connected to the battery lid 83, and the anode lead 96 is welded and electrically connected to the battery can 81.

FIG. 6 shows an enlarged part of the wound electrode body 90 shown in FIG. 5.

Hereinafter, the cathode 91, the anode 92, and the separator 93 will be described in detail.

[Cathode]

In the cathode 91, a cathode active material layer 91B comprising a cathode active material is formed on both surfaces of a cathode current collector 91A. As the cathode current collector 91A, for example, a metal foil such as aluminum (Al) foil, nickel (Ni) foil or stainless steel (SUS) foil, can be used.

The cathode active material layer 91B is configured to comprise one, two or more kinds of cathode materials that can occlude and release lithium as cathode active materials, and may comprise another material such as a binder or a conductive agent as necessary. Note that the same cathode active material, conductive agent and binder used in the sixteenth embodiment can be used.

The cathode 91 includes the cathode lead 95 connected to one end portion of the cathode current collector 91A by spot welding or ultrasonic welding. The cathode lead 95 is preferably formed of net-like metal foil, but there is no problem when a non-metal material is used as long as an electrochemically and chemically stable material is used and an electric connection is obtained. Examples of materials of the cathode lead 95 include aluminum (Al) and nickel (Ni).

[Anode]

The anode 92 has, for example, a structure in which an anode active material layer 92B is provided on both surfaces of an anode current collector 92A having a pair of opposed surfaces. Although not shown, the anode active material layer 92B may be provided only on one surface of the anode current collector 92A. The anode current collector 92A is formed of, for example, a metal foil such as copper foil.

The anode active material layer 92B is configured to comprise one, two or more kinds of anode materials that can occlude and release lithium as anode active materials, and may be configured to comprise another material such as a binder or a conductive agent, which is the same as in the cathode active material layer 91B, as necessary. Note that the same anode active material, conductive agent and binder used in the sixteenth embodiment can be used.

[Separator]

The separator 93 is the same as the separator 55 of the sixteenth embodiment.

[Non-aqueous Electrolyte Solution]

The non-aqueous electrolyte solution is the same as in the sixteenth embodiment (Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the sixteenth embodiment That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B of the anode side and the deep region C of the anode side, which are only on the anode side, may be formed or the recess impregnation region A of the cathode side, the top coat region B of the cathode side and the deep region C of the cathode side, which are only on the cathode side, may be formed.

(17-2) Method of Manufacturing a Non-aqueous Electrolyte Battery (Method of Manufacturing a Cathode and Method of Manufacturing an Anode)

In the same manner as in the sixteenth embodiment, the cathode 91 and the anode 92 are fabricated.

(Formation of a Solid Particle Layer)

Next, paint is applied to at least one principal surface of both principal surfaces of the anode 92 by a coating method, the solvent is then removed by drying and a solid particle layer is formed. As the paint, for example, a mixture of solid particles, a binder polymer compound and a solvent can be used. On the outermost surface of the anode active material layer 92B on which the solid particle layer is applied and formed, solid particles are filtered in the recess between adjacent anode active material particles positioned on the outermost surface of the anode active material layer 92B, and a concentration of particles of the recess impregnation region A of the anode side increases. Similarly, the solid particle layer is formed on both principal surfaces of the cathode 91 by a coating method. On the outermost surface of the cathode active material layer 91B on which the solid particle layer is applied and formed, solid particles are filtered in the recess between adjacent cathode active material particles positioned on the outermost surface of the cathode active material layer 91B, and a concentration of particles of the recess impregnation region A of the cathode side increases. Solid particles having a particle size D95 that is adjusted to be a predetermined times a particle size D50 of active material particles or more are preferably used as the solid particles. For example, some solid particles having a particle size of $2/\sqrt{3}-1$ times a particle size D50 of active material particles or more are added, and a particle size D95 of solid particles is adjusted to be $2/\sqrt{3}-1$ times a particle size D50 of active material particles or more, which are preferably used as the solid particles. Accordingly, an interval at a bottom of the recess is filled with particles having a large solid particle size, and solid particles can be easily filtered.

Note that, when the solid particle layer is applied and formed, if extra paint is scraped off, it is possible to prevent a distance between electrodes from extending unintentionally. In addition, by scraping a surface of the paint, more solid particles are sent to the recess between adjacent active material particles, and a ratio of the top coat region B decreases. Accordingly, most of the solid particles are intensively disposed in the recess impregnation region and at least one kind of the metal salts represented by Formula (1D) to Formula (7D) can further accumulate in the recess impregnation region A.

(Method of Manufacturing a Separator)

Next, the separator 93 is prepared.

(Preparation of a Non-aqueous Electrolyte Solution)

An electrolyte salt is dissolved in a non-aqueous solvent to prepare the non-aqueous electrolyte solution.

(Assembly of the Non-aqueous Electrolyte Battery)

The cathode lead 95 is attached to the cathode current collector 91A by welding and the anode lead 96 is attached to the anode current collector 92A by welding. Then, the cathode 91 and the anode 92 are wound through the separator 93 to prepare the wound electrode body 90.

A distal end portion of the cathode lead 95 is welded to the safety valve mechanism and a distal end portion of the anode lead 96 is welded to the battery can 81. Then, a winding surface of the wound electrode body 90 is inserted between a pair of insulating plates 82*a* and 82*b* and accommodated inside the battery can 81. The wound electrode body 90 is accommodated inside the battery can 81, and the non-aqueous electrolyte solution is then injected into the battery can 81 and impregnated into the separator 93. Then, at the opened end of the battery can 81, the safety valve mechanism including the battery lid 83, the safety valve 84 and the like, and the positive temperature coefficient element 87 are caulked and fixed through the gasket 88. Accordingly, the non-aqueous electrolyte battery of the present technology shown in FIG. 5 is formed.

In the non-aqueous electrolyte battery, when charge is performed, for example, lithium ions are released from the cathode active material layer 91B, and occluded in the anode active material layer 92B through the non-aqueous electrolyte solution impregnated into the separator 93. In addition, when discharge is performed, for example, lithium ions are released from the anode active material layer 92B, and occluded in the cathode active material layer 91B through the non-aqueous electrolyte solution impregnated into the separator 93.

[Modification Example 17-1]

The non-aqueous electrolyte battery according to the seventeenth embodiment may be fabricated as follows.

(Fabrication of a Cathode and an Anode)

First, in the same manner as in the example of the non-aqueous electrolyte battery, the cathode 91 and the anode 92 are fabricated.

(Formation of a Solid Particle Layer)

Next, paint is applied to at least one principal surface of both principal surfaces of the separator 93 by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 90 is formed.

(Heating and Pressing Process)

Before the wound electrode body 90 is accommodated inside the battery can 81, the wound electrode body 90 is put into a packaging material such as a latex tube and sealed, and subjected to warm pressing under hydrostatic pressure. Accordingly, solid particles move to the recess between adjacent anode active material particles positioned on the outermost surface of the anode active material layer 92B, and the concentration of the solid particles of the recess impregnation region A of the anode side increases. The solid particles move to the recess between adjacent cathode active material particles positioned on the outermost surface of the cathode active material layer 91B and the concentration of the solid particles of the recess impregnation region A of the cathode side increases.

Processes thereafter are the same as those in the example described above, and the desired non-aqueous electrolyte battery can be obtained.

18. Eighteenth Embodiment

In the eighteenth embodiment, a rectangular non-aqueous electrolyte battery will be described.

(18-1) Configuration of an Example of the Non-aqueous Electrolyte Battery

FIG. 7 shows a configuration of an example of the non-aqueous electrolyte battery according to the eighteenth embodiment. The non-aqueous electrolyte battery is a so-called rectangular battery, and a wound electrode body 120 is housed inside a rectangular exterior can 111.

The non-aqueous electrolyte battery includes the rectangular exterior can 111, the wound electrode body 120 serving as a power generation element accommodated inside the exterior can 111, a battery lid 112 configured to close an opening of the exterior can 111, an electrode pin 113 provided at substantially the center of the battery lid 112, and the like.

The exterior can 111 is formed as a hollow rectangular tubular body with a bottom using, for example, a metal having conductivity such as iron (Fe). The exterior can 111 preferably has a configuration in which, for example, nickel-plating is performed on or a conductive paint is applied to an inner surface so that conductivity of the exterior can 111 increases. In addition, an outer peripheral surface of the exterior can 111 is covered with an exterior label formed by, for example, a plastic sheet or paper, and an insulating paint may be applied thereto for protection. The battery lid 112 is made of, for example, a metal having conductivity such as iron (Fe), the same as in the exterior can 111.

The cathode and the anode are laminated and wound through the separator in an elongated oval shape, and therefore the wound electrode body 120 is obtained. Since the cathode, the anode, the separator and the non-aqueous electrolyte solution are the same as those in the sixteenth embodiment, detailed descriptions thereof will be omitted.

In the wound electrode body 120 having such a configuration, a plurality of cathode terminals 121 connected to the cathode current collector and a plurality of anode terminals connected to the anode current collector are provided. All of the cathode terminals 121 and the anode terminals are led out to one end of the wound electrode body 120 in an axial direction. Then, the cathode terminals 121 are connected to a lower end of the electrode pin 113 by a fixing method such as welding. In addition, the anode terminals are connected to an inner surface of the exterior can 111 by a fixing method such as welding.

The electrode pin 113 is made of a conductive shaft member, and is maintained by an insulator 114 while a head thereof protrudes from an upper end. The electrode pin 113 is fixed to substantially the center of the battery lid 112 through the insulator 114. The insulator 114 is formed of a high insulating material, and is engaged with a through-hole 115 provided at a surface side of the battery lid 112. In addition, the electrode pin 113 passes through the through-hole 115, and a distal end portion of the cathode terminal 121 is fixed to a lower end surface thereof.

The battery lid 112 to which the electrode pin 113 or the like is provided is engaged with the opening of the exterior can 111, and a contact surface of the exterior can 111 and the battery lid 112 are bonded by a fixing method such as welding. Accordingly, the opening of the exterior can 111 is sealed by the battery lid 112 and is in an air tight and liquid tight state. At the battery lid 112, an internal pressure release mechanism 116 configured to release (dissipate) an internal pressure to the outside by breaking a part of the battery lid 112 when a pressure inside the exterior can 111 increases to a predetermined value or more is provided.

The internal pressure release mechanism 116 includes two first opening grooves 116*a* (one of the first opening grooves 116*a* is not shown) that linearly extend in a longitudinal direction on an inner surface of the battery lid 112 and a second opening groove 116*b* that extends in a width direction perpendicular to a longitudinal direction on the same inner surface of the battery lid 112 and whose both ends communicate with the two first opening grooves 116*a*. The two first opening grooves 116*a* are provided in parallel to each other along a long side outer edge of the battery lid 112 in the vicinity of an inner side of two sides of a long side positioned to oppose the battery lid 112 in a width direction. In addition, the second opening groove 116*b* is provided to be positioned at substantially the center between one short side outer edge in one side in a longitudinal direction of the electrode pin 113 and the electrode pin 113.

The first opening groove 116*a* and the second opening groove 116*b* have, for example, a V-shape whose lower surface side is opened in a cross sectional shape. Note that the shape of the first opening groove 116*a* and the second opening groove 116*b* is not limited to the V-shape shown in this embodiment. For example, the shape of the first opening groove 116*a* and the second opening groove 116*b* may be a U-shape or a semicircular shape.

An electrolyte solution inlet 117 is provided to pass through the battery lid 112. After the battery lid 112 and the exterior can 111 are caulked, the electrolyte solution inlet 117 is used to inject the non-aqueous electrolyte solution, and is sealed by a sealing member 118 after the non-aqueous electrolyte solution is injected. For this reason, when gel electrolytes are formed between the separator and each of the cathode and the anode in advance to fabricate the wound electrode body, the electrolyte solution inlet 117 and the sealing member 118 may not be provided.

[Separator]

As the separator, the same separator as in the sixteenth embodiment is used.

[Non-aqueous Electrolyte Solution]

The non-aqueous electrolyte solution is the same as in the sixteenth embodiment.

(Configuration of an Inside of the Non-aqueous Electrolyte Battery)

Although not shown, the inside of the non-aqueous electrolyte battery has the same configuration as a configuration in which the electrolyte layer 56 is removed from the configuration shown in FIG. 3A and FIG. 3B described in the first embodiment That is, the recess impregnation region A of the anode side, the top coat region B of the anode side, and the deep region C of the anode side are formed. The recess impregnation region A of the cathode side, the top coat region B of the cathode side, and the deep region C of the cathode side are formed. Note that the recess impregnation region A of the anode side, the top coat region B and the deep region C, which are only on the anode side, may be formed or the recess impregnation region A of the cathode side, the top coat region B of the cathode side and the deep region C of the cathode side, which are only on the cathode side, may be formed.

(18-2) Method of Manufacturing a Non-aqueous Electrolyte Battery

The non-aqueous electrolyte battery can be manufactured, for example, as follows.

[Method of Manufacturing a Cathode and an Anode]

The cathode and the anode can be fabricated by the same method as in the sixteenth embodiment.

(Assembly of the Non-aqueous Electrolyte Battery)

The cathode, the anode, and the separator (in which a particle-comprising resin layer is formed on at least one surface of a base material) are sequentially laminated and wound to fabricate the wound electrode body 120 that is wound in an elongated oval shape. Next, the wound electrode body 120 is housed in the exterior can 111.

Then, the electrode pin 113 provided in the battery lid 112 and the cathode terminal 121 led out from the wound electrode body 120 are connected. Also, although not shown, the anode terminal led out from the wound electrode body 120 and the battery can are connected. Then, the exterior can 111 and the battery lid 112 are engaged, the non-aqueous electrolyte solution is injected though the electrolyte solution inlet 117, for example, under reduced pressure and sealing is performed by the sealing member 118. In this manner, the non-aqueous electrolyte battery can be obtained.

[Modification Example 18-1]

The non-aqueous electrolyte battery according to the eighteenth embodiment may be fabricated as follows.

(Fabrication of a Cathode and an Anode)

First, in the same manner as in the example of the non-aqueous electrolyte battery, the cathode and the anode are fabricated.

(Formation of a Solid Particle Layer)

Next, paint is applied to at least one principal surface of both principal surfaces of the separator by a coating method, the solvent is then removed by drying, and a solid particle layer is formed. As the paint, for example, a mixture of solid particles, a binder polymer compound and a solvent can be used.

(Assembly of the Non-aqueous Electrolyte Battery)

Next, in the same manner as in the example of the non-aqueous electrolyte battery, the wound electrode body 120 is formed. Next, before the wound electrode body 120 is housed inside the exterior can 111, the wound electrode body 120 is put into a packaging material such as a latex tube and sealed, and subjected to warm pressing under hydrostatic pressure. Accordingly, solid particles move (are pushed) to the recess between adjacent anode active material particles positioned on the outermost surface of the anode active material layer, and the concentration of the solid particles of the recess impregnation region A of the anode side increases. The solid particles move to the recess between adjacent cathode active material particles positioned on the outermost surface of the cathode active material layer, and the concentration of the solid particles of the recess impregnation region A of the cathode side increases.

Then, similarly to the example described above, the desired non-aqueous electrolyte battery can be obtained.

<Nineteenth Embodiment to Twenty-First Embodiment>

Hereinafter, embodiments of the present technology will be described with reference to the drawings. The description will proceed in the following order.

19. Nineteenth embodiment (example of a battery pack)
20. Twentieth embodiment (example of a battery pack)
21. Twenty-First embodiment (example of a power storage system and the like)

19. Nineteenth Embodiment

Figure 8:
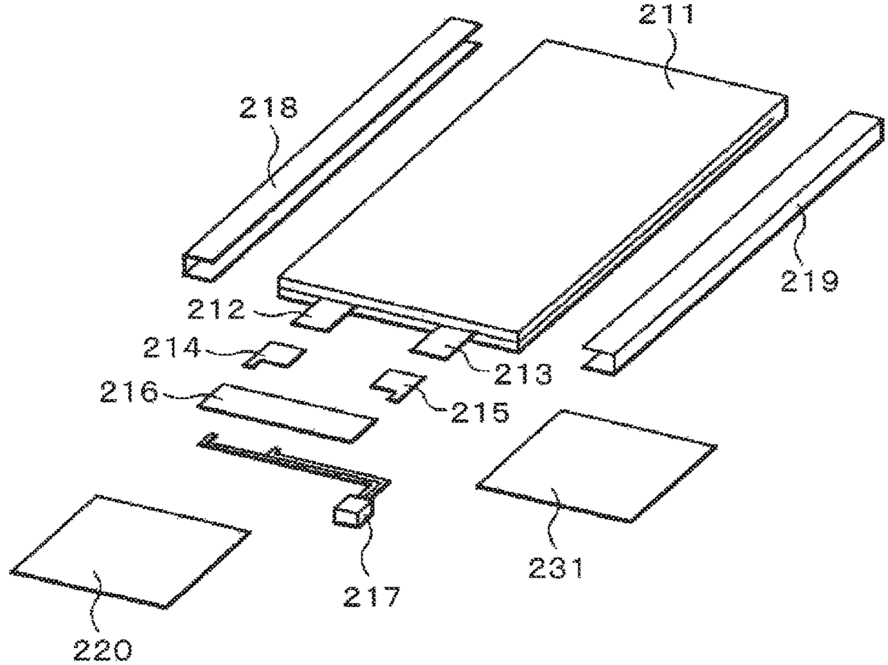
FIG. 8 is a perspective view showing a configuration of an application example (battery pack: single battery) of a secondary battery.
Figure 9:
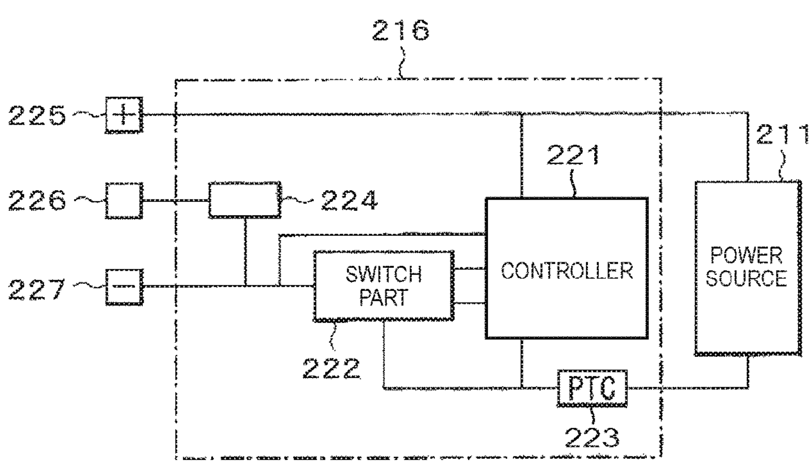
FIG. 9 is a block diagram showing a configuration of the battery pack shown in FIG. 8.

FIG. 8 shows a perspective configuration of a battery pack using a single battery. FIG. 9 shows a block configuration of the battery pack shown in FIG. 8. Also, FIG. 8 shows a state in which the battery pack is disassembled.

The battery pack described herein is a simple battery pack (a so-called soft pack) using one secondary battery, and built in electronic devices such as, for example, smart phones. As shown in FIG. 9, the battery pack includes, for example, a power source 211 serving as a laminated film type-secondary battery and a circuit board 216 connected to the power source 211. The laminated film type-secondary battery has the same configuration as the battery according to, for example, any of first, fourth, seventh, tenth, thirteenth and sixteenth embodiments.

A pair of adhesive tapes 218 and 219 are adhered to both side surfaces of the power source 211. A protection circuit module (PCM) is formed in the circuit board 216. The circuit board 216 is connected to a cathode lead 212 and an anode lead 213 of the power source 211 through a pair of tabs 214 and 215, and connected to a lead wire with connector 217 for an external connection. Note that, while the circuit board 216 is connected to the power source 211, the circuit board 216 is protected from above and below by a label 220 and an insulation sheet 231. When the label 220 is adhered, the circuit board 216 and the insulation sheet 231 are fixed.

In addition, the battery pack includes, for example, the power source 211 and the circuit board 216 as shown in FIG. 9. The circuit board 216 includes, for example, a controller 221, a switch part 222, a PTC 223, and a temperature sensing part 224. Since the power source 211 can be connected to the outside through a cathode terminal 225 and an anode terminal 227, the power source 211 is charged and discharged through the cathode terminal 225 and the anode terminal 227. The temperature sensing part 224 can detect a temperature using a temperature detection terminal (a so-called T terminal) 226.

The controller 221 controls overall operations (including a usage state of the power source 211) of the battery pack, and includes, for example, a central processing unit (CPU) and a memory.

For example, when the battery voltage reaches an overcharge detection voltage, the controller 221 disconnects the switch part 222, and causes a charge current not to flow through a current path of the power source 211. In addition, for example, when a high current flows during charging, the controller 221 disconnects the switch part 222 and blocks a charge current.

Furthermore, for example, when the battery voltage reaches an overdischarge detection voltage, the controller 221 disconnects the switch part 222 and causes a discharge current not to flow through a current path of the power source 211. In addition, for example, when a high current flows during discharging, the controller 221 disconnects the switch part 222 and blocks a discharge current.

Note that, in the secondary battery, the overcharge detection voltage is, for example, 4.20 V±0.05 V, and the overdischarge detection voltage is, for example, 2.4 V±0.1 V.

According to an instruction of the controller 221, the switch part 222 switches a usage state of the power source 211 (whether the power source 211 and an external device are connected). The switch part 222 includes, for example, a charge control switch and a discharge control switch. The charge control switch and the discharge control switch are, for example, a semiconductor switch such as a field effect transistor (MOSFET) using a metal oxide semiconductor. Note that the charge and discharge currents are detected based on, for example, an ON resistance of the switch part 222.

The temperature sensing part 224 measures a temperature of the power source 211, and outputs the measurement result to the controller 221, and includes, for example, a temperature sensing element such as a thermistor. Note that the measurement result obtained by the temperature sensing part 224 is used for the controller 221 to perform charge and discharge control when abnormal heat is generated or for the controller 221 to perform a correction process when the remaining capacity is calculated.

Note that the circuit board 216 may not include the PTC 223. In this case, separately, a PTC element may be additionally provided in the circuit board 216.

20. Twentieth Embodiment

Figure 10:
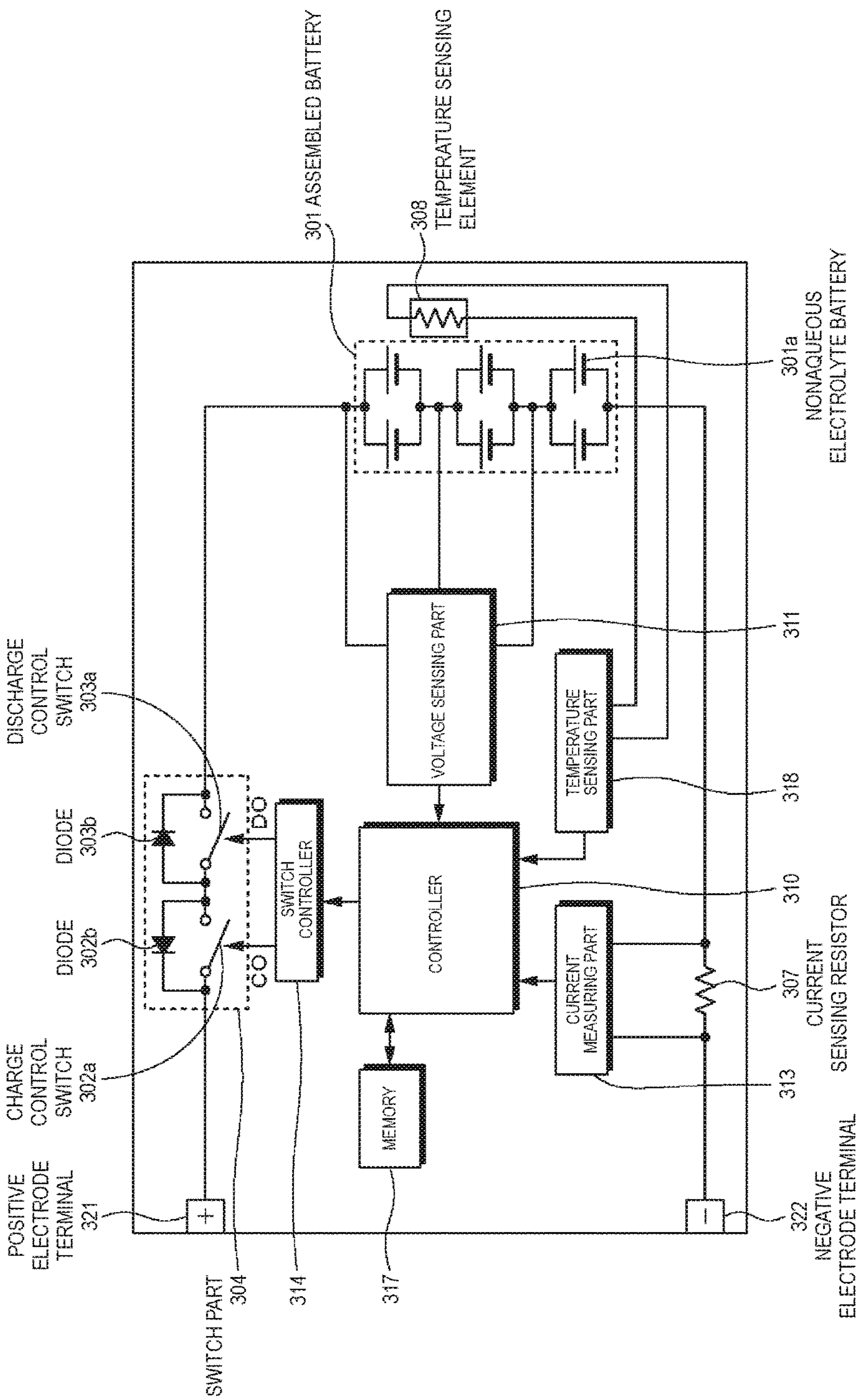
FIG. 10 is a block diagram showing a circuit configuration example of a battery pack according to an embodiment of the present technology.
Figure 11:
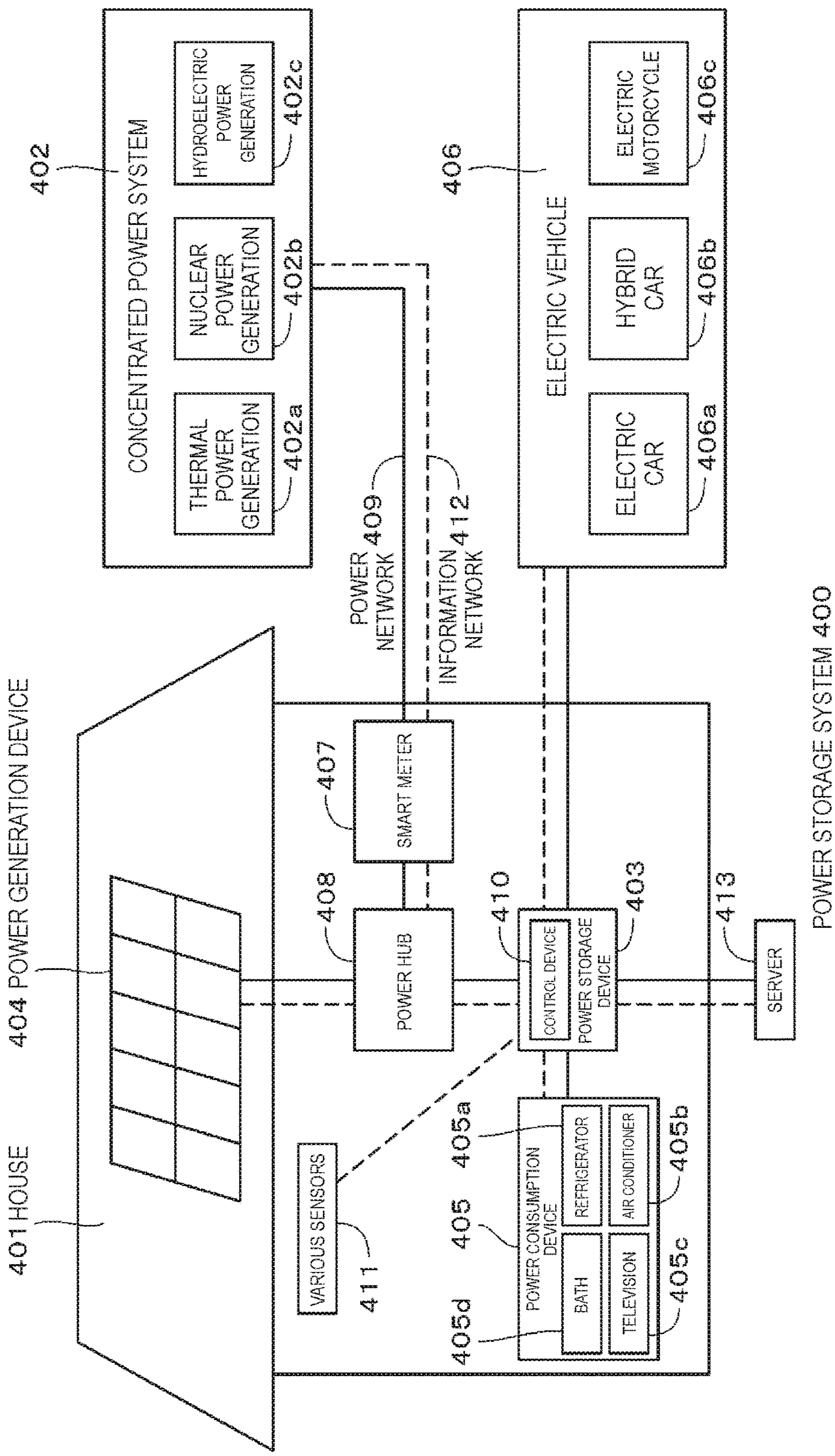
FIG. 11 is a schematic diagram showing an example of the application to a power storage system for a house using a non-aqueous electrolyte battery of the present technology.

FIG. 10 is a block diagram showing a circuit configuration example when the battery according to the first embodiment to the eighteenth embodiment of the present technology (hereinafter, referred to as a secondary battery as appropriate) is used for a battery pack. The battery pack includes an assembled battery 301, a package, a switch part 304 including a charge control switch 302*a* and a discharge control switch 303*a*, a current sensing resistor 307, a temperature sensing element 308, and a controller 310.

Further, the battery pack includes a cathode terminal 321 and an anode terminal 322, and at the time of charge, the cathode terminal 321 and the anode terminal 322 are connected to a cathode terminal and an anode terminal of a battery charger, respectively, and charge is performed. Further, at the time of using an electronic device, the cathode terminal 321 and the anode terminal 322 are connected to a cathode terminal and an anode terminal of the electronic device, respectively, and discharge is performed.

The assembled battery 301 is formed by connecting a plurality of secondary batteries 301*a* in series and/or in parallel. Each of the secondary batteries 301*a* is the secondary battery according to an embodiment of the present technology. Note that although FIG. 10 shows an example in which six secondary batteries 301*a* are connected so as to have two parallel connections and three series connections (2P3S), any other connection can be adopted such as n parallel and m series (n and m are integers) connections.

The switch part 304 includes the charge control switch 302*a*, a diode 302*b*, the discharge control switch 303*a*, and a diode 303*b*, and is controlled by the controller 310. The diode 302*b* has a polarity that is reverse to charge current flowing in the direction from the cathode terminal 321 to the assembled battery 301 and forward to discharge current flowing in the direction from the anode terminal 322 to the assembled battery 301. The diode 303*b* has a polarity that is forward to the charge current and reverse to the discharge current. Note that although an example is shown in which the switch part 304 is provided on a plus side, the switch part 304 may be provided on a minus side.

The charge control switch 302*a* is turned off when the battery voltage is an overcharge detection voltage and is controlled by a charge/discharge controller so that charge current does not flow into a current path of the assembled battery 301. After the charge control switch 302*a* is turned off, only discharge is possible via the diode 302*b*. Further, when overcurrent flows during charge, the charge control switch 302*a* is turned off and controlled by the controller 310 so that charge current flowing in the current path of the assembled battery 301 is cut off.

The discharge control switch 303*a* is turned off when the battery voltage is an overdischarge detection voltage and is controlled by the controller 310 so that discharge current does not flow into the current path of the assembled battery 301. After the discharge control switch 303*a* is turned off, only charge is possible via the diode 103*b*. Further, when overcurrent flows during discharge, the discharge control switch 303*a* is turned off and controlled by the controller 310 so that discharge current flowing in the current path of the assembled battery 301 is cut off.

The temperature sensing element 308 is a thermistor for example, and is provided near the assembled battery 301, measures the temperature of the assembled battery 301, and supplies the measured temperature to the controller 310. A voltage sensing part 311 measures the voltage of the assembled battery 301 and of each secondary battery 301*a* forming the assembled battery 301, A/D converts the measured voltage, and supplies the voltage to the controller 310. A current measuring part 313 measures current with the current sensing resistor 307, and supplies the measured current to the controller 310.

A switch controller 314 controls the charge control switch 302*a* and the discharge control switch 303*a* of the switch part 304, based on the voltage and current input from the voltage sensing part 311 and the current measuring part 313. When the voltage of any of the secondary batteries 301*a* is the overcharge detection voltage or higher or the overdischarge detection voltage or lower, or when overcurrent flows rapidly, the switch controller 314 transmits a control signal to the switch part 304 to prevent overcharge, overdischarge, and overcurrent charge/discharge.

Here, when, for example, the secondary battery is a lithium ion secondary battery, the overcharge detection voltage is set to, for example, 4.20 V±0.05 V, and the overdischarge detection voltage is set to, for example, 2.4 V±0.1 V.

As a charge/discharge switch, for example, a semiconductor switch such as a MOSFET can be used. In this case, a parasitic diode of the MOSFET serves as the diodes 302*b* and 303*b*. In a case where a p-channel FET is used as the charge/discharge switch, the switch controller 314 supplies a control signal DO and a control signal CO to a gate of the charge control switch 302*a* and a gate of the discharge control switch 303*a*, respectively. In the case of the p-channel type, the charge control switch 302*a* and the discharge control switch 303*a* are turned on at a gate potential which is lower than a source potential by a predetermined value or more. That is, in normal charge and discharge operations, the charge control switch 302*a* and the discharge control switch 303*a* are made to be in an ON state by setting the control signals CO and DO to low levels.

Further, when performing overcharge or overdischarge, for example, the charge control switch 302*a* and the discharge control switch 303*a* are made to be in an OFF state by setting the control signals CO and DO to high levels.

A memory 317 is formed of a RAM or ROM, and is formed of an erasable programmable read only memory (EPROM), which is a volatile memory, for example. The memory 317 stores, in advance, the value calculated in the controller 310, the internal resistance value of the battery in an initial state of each of the secondary batteries 301*a* measured at a stage in a manufacturing process, and the like, which are rewritable as necessary. Further, by storing a full charge capacity of the secondary battery 301*a*, the memory 317 can calculate the remaining capacity together with the controller 310, for example.

A temperature sensing part 318 measures the temperature with use of the temperature sensing element 308, controls charge/discharge at the time of abnormal heat generation, and corrects the calculation of the remaining capacity.

21. Twenty-First Embodiment

The battery according to the first embodiment to the eighteenth embodiment and the battery pack using the same according to the nineteenth embodiment to the twentieth embodiment of the present technology described above may be used in order to be installed in or supply power to a device such as, for example, an electronic device, an electric vehicle, or a power storage device.

Examples of the electronic device include a laptop personal computer, a PDA (mobile information device), a mobile phone, a cordless extension, a video movie, a digital still camera, an e-book reader, an electronic dictionary, a music player, a radio, a headphone, a game machine, a navigation system, a memory card, a pacemaker, a hearing aid, an electric tool, an electric razor, a refrigerator, an air conditioner, a television set, a stereo, a water heater, a microwave, a dishwasher, a washer, a drier, a lighting device, a toy, a medical device, a robot, a road conditioner, a traffic light, and the like.

Further, examples of the electric vehicle include a railway train, a golf cart, an electric cart, an electric car (including a hybrid car), and the like. The battery according to the first embodiment and the battery pack using the same according to the second embodiment and the third embodiment can be used as a power source for driving these vehicles or as a supplementary power source.

Examples of the power storage device include a power source for power storage for buildings such as houses or for power generation equipment, and the like.

From the above application examples, the following will show a specific example of a power storage system using the power storage device using the battery according to an embodiment of the present technology described above.

This power storage system can have the following structure for example. A first power storage system is a power storage system in which the power storage device is charged with a power generation device which generates power from renewable energy. A second power storage system is a power storage system which includes the power storage device and supplies power to an electronic device connected to the power storage device. A third power storage system is an electronic device which is supplied with power from the power storage device. These power storage systems are each implemented as a system to supply power efficiently in association with an external power supply network.

Further, a fourth power storage system is an electric vehicle including a conversion device which converts power supplied from the power storage device to driving force of a vehicle, and a control device which performs information processing about vehicle control based on information about the power storage device. A fifth power storage system is a power system including a power information transmitting/receiving part which transmits/receives signals to/from other devices via a network, and controls charge/discharge of the power storage device based on information received by the transmitting/receiving part.

(21-1) Home Power Storage System as Application Example

An example in which the power storage device using the battery according to an embodiment of the present technology is used for a home power storage system will be described with reference to FIG. 7. For example, in a power storage system 400 for a house 401, power is supplied to the power storage device 403 from a concentrated power system 402 including thermal power generation 402*a*, nuclear power generation 402*b*, hydroelectric power generation 402*c*, and the like, via a power network 409, an information network 412, a smart meter 407, a power hub 408, and the like. Further, power is supplied to the power storage device 403 from an independent power source such as a home power generation device 404. Power supplied to the power storage device 403 is stored, and power to be used in the house 401 is fed with use of the power storage device 403. The same power storage system can be used not only in the house 401 but also in a building.

The house 401 is provided with the power generation device 404, a power consumption device 405, the power storage device 403, a control device 410 which controls each device, the smart meter 407, and sensors 411 which acquires various pieces of information. The devices are connected to each other by the power network 409 and the information network 412. As the power generation device 404, a solar cell, a fuel cell, or the like is used, and generated power is supplied to the power consumption device 405 and/or the power storage device 403. Examples of the power consumption device 405 include a refrigerator 405*a*, an air conditioner 405*b*, a television receiver 405*c*, a bath 405*d*, and the like. Examples of the power consumption device 405 further include an electric vehicle 406 such as an electric car 406*a*, a hybrid car 406*b*, or an electric motorcycle 406*c*.

For the power storage device 403, the battery according to an embodiment of the present technology is used. The battery according to an embodiment of the present technology may be formed of the above-described lithium ion secondary battery for example. Functions of the smart meter 407 include measuring the used amount of commercial power and transmitting the measured used amount to a power company. The power network 409 may be any one or more of DC power supply, AC power supply, and contactless power supply.

Examples of the various sensors 411 include a motion sensor, an illumination sensor, an object detecting sensor, a power consumption sensor, a vibration sensor, a touch sensor, a temperature sensor, an infrared sensor, and the like. Information acquired by the various sensors 411 is transmitted to the control device 410. With the information from the sensors 411, weather conditions, people conditions, and the like are caught, and the power consumption device 405 is automatically controlled so as to make the energy consumption minimum. Further, the control device 410 can transmit information about the house 401 to an external power company via the Internet, for example.

The power hub 408 performs processes such as branching off power lines and DC/AC conversion. Examples of communication schemes of the information network 412 connected to the control device 410 include a method using a communication interface such as UART (Universal Asynchronous Receiver/Transceiver), and a method using a sensor network according to a wireless communication standard such as Bluetooth, ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 410 is connected to an external server 413. The server 413 may be managed by any of the house 401, an electric company, and a service provider. Examples of information transmitted and received by the server 413 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 410 controlling each part is configured with a CPU (Central Processing Unit), a RAM (Random Access Memory), a ROM (Read Only Memory), and the like, and is stored in the power storage device 403 in this example. The control device 410 is connected to the power storage device 403, the home power generation device 404, the power consumption device 405, the various sensors 411, and the server 413 via the information network 412, and has a function of adjusting the used amount of commercial power and the power generation amount, for example. Note that the control device 410 may further have a function of performing power trade in the power market.

As described above, power generated by not only the concentrated power system 402 such as the thermal power generation 402*a*, the nuclear power generation 402*b*, and the hydroelectric power generation 402*c*, but also the home power generation device 404 (solar power generation or wind power generation) can be stored in the power storage device 403. Therefore, even when the power generated by the home power generation device 404 varies, the amount of power supplied to the outside can be constant, or only necessary discharge can be controlled. For example, power generated by the solar power generation can be stored in the power storage device 403 and also inexpensive power at midnight can be stored in the power storage device 403 during nighttime, so that power stored in the power storage device 403 can be discharged and used when the power fee is expensive during daytime.

Note that although this example shows the control device 410 housed in the inside of the power storage device 403, the control device 410 may be housed in the inside of the smart meter 407 or configured independently. Further, the power storage system 400 may be used for a plurality of houses in a multiple dwelling house or a plurality of separate houses.

(21-2) Power Storage System in Vehicle as Application Example

Figure 12:
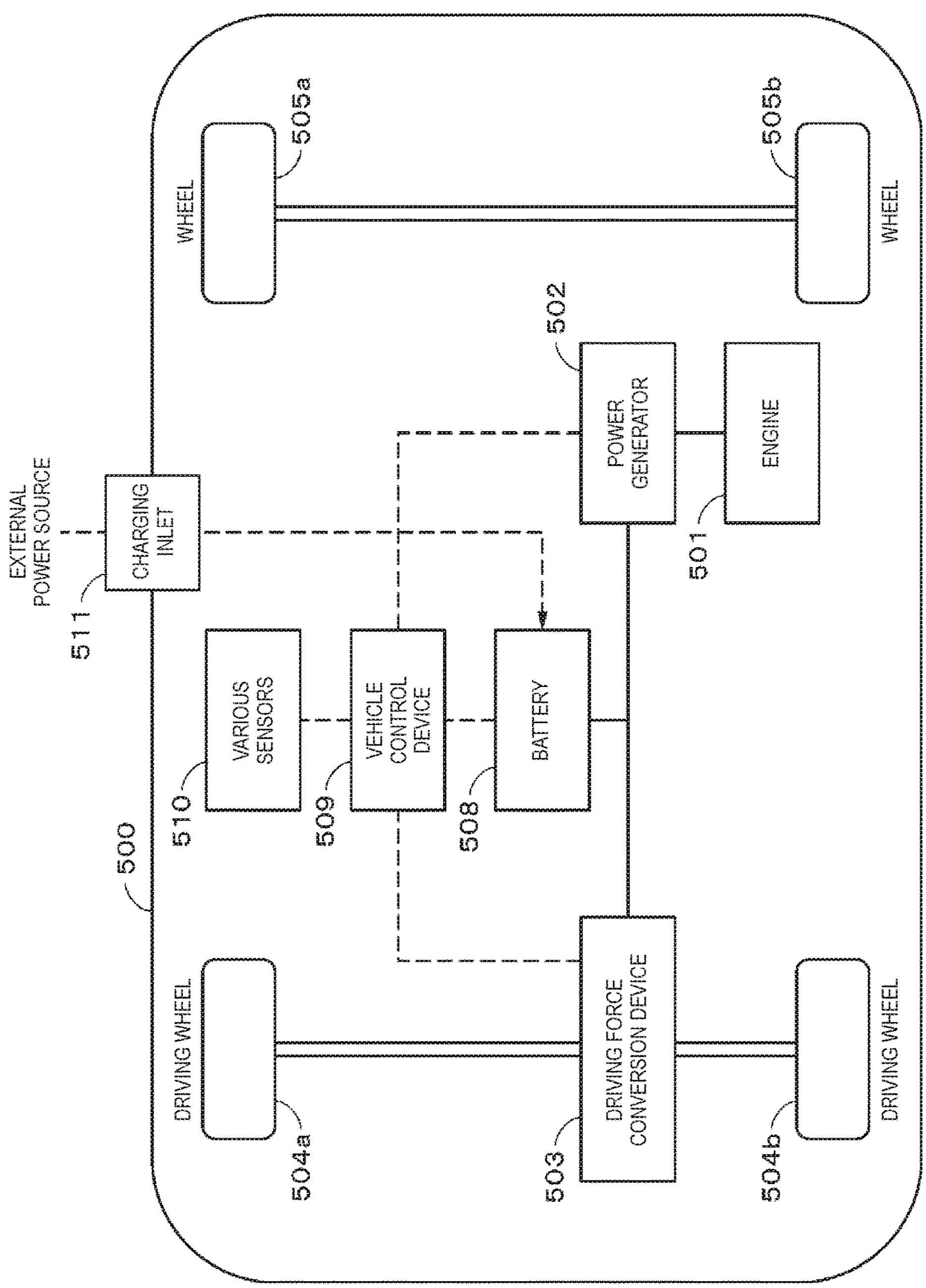
FIG. 12 is a schematic diagram schematically showing an example of the configuration of a hybrid vehicle employing a series hybrid system to which the present technology is applied.

An example in which an embodiment of the present technology is applied to a power storage system for vehicles will be described with reference to FIG. 12. FIG. 12 schematically shows an example of a structure of a hybrid vehicle employing a series hybrid system to which an embodiment of the present technology is applied. The series hybrid system is a car which runs with a power/driving force conversion device using power generated by a power generator driven by an engine or power obtained by storing the power in a battery.

A hybrid vehicle 500 incorporates an engine 501, a power generator 502, a power/driving force conversion device 503, a driving wheel 504*a*, a driving wheel 504*b*, a wheel 505*a*, a wheel 505*b*, a battery 508, a vehicle control device 509, various sensors 510, and a charging inlet 511. For the battery 508, the battery according to embodiments of the present technology is used.

The hybrid vehicle 500 runs by using the power/driving force conversion device 503 as a power source. One of examples of the power/driving force conversion device 503 is a motor. Power in the battery 508 drives the power/driving force conversion device 503, and the rotating power of the power/driving force conversion device 503 is transmitted to the driving wheels 504*a* and 504*b*. Note that by using DC/AC conversion or AC/DC conversion in a necessary portion, an alternate current motor or a direct current motor can be used for the power/driving force conversion device 503. The various sensors 510 control the number of engine rotation via the vehicle control device 509 and controls the aperture of an unshown throttle valve (throttle aperture). The various sensors 510 include a speed sensor, an acceleration sensor, a sensor of the number of engine rotation, and the like.

The rotating power of the engine 501 is transmitted to the power generator 502, and power generated by the power generator 502 with the rotating power can be stored in the battery 508.

When the hybrid vehicle 500 reduces the speed with an unshown brake mechanism, the resisting power at the time of the speed reduction is added to the power/driving force conversion device 503 as the rotating power, and regenerative power generated by the power/driving force conversion device 503 with this rotating power is stored in the battery 508.

The battery 508 can be connected to an external power source of the hybrid vehicle 500, and accordingly, power can be supplied from the external power source by using the charging inlet 511 as an input inlet, and the received power can be stored.

Although not shown, an information processing device which performs information processing about vehicle control based on information about the secondary battery may be provided. Examples of such an information processing device include an information processing device which displays the remaining battery based on information about the remaining battery.

Note that the above description is made by taking an example of the series hybrid car which runs with a motor using power generated by a power generator driven by an engine or power obtained by storing the power in a battery. However, an embodiment of the present technology can also be applied effectively to a parallel hybrid car which uses the output of an engine and a motor as the driving force source and switches three modes as appropriate: driving with the engine only; driving with the motor only; and driving with the engine and the motor. Further, an embodiment of the present technology can also be applied effectively to a so-called electric vehicle which runs by being driven with a driving motor only, without an engine.

EXAMPLES

The present technology will now be described in detail using Examples. The present technology, however, is not limited to the configurations of Examples below.

Example 1-1

[Fabrication of a Cathode]

91 mass % of lithium cobaltate ($LiCoO_2$) particles (particle size D50: 10 μm), which is the cathode active material, 6 mass % of carbon black, which is an electrically conductive agent, and 3 mass % of polyvinylidene difluoride (PVdF), which is a binder, were mixed together to prepare a cathode mixture, and the cathode mixture was dispersed in N-methyl-2-pyrrolidone (NMP), which is a dispersion medium, to prepare a cathode mixture slurry.

The cathode mixture slurry was applied to both surfaces of a cathode current collector formed of a band-like piece of aluminum foil with a thickness of 12 μm in such a manner that part of the cathode current collector was exposed. After that, the dispersion medium of the applied cathode mixture slurry was evaporated to dryness, and compression molding was performed by roll pressing; thereby, a cathode active material layer was formed. Finally, a cathode terminal was attached to the exposed portion of the cathode current collector; thus, a cathode was formed. Note that an area density of the cathode active material layer was adjusted to 30 $mg/cm^2$.

[Fabrication of an Anode]

96 mass % of granular graphite particle (particle size D50: 20 μm), which is the anode active material, 1.5 mass % of an acrylic acid-modified product of a styrene-butadiene copolymer as a binder, and 1.5 mass % of carboxymethyl cellulose as a thickener were mixed together to prepare an anode mixture, and an appropriate amount of water was added and stirring was performed to prepare an anode mixture slurry.

The anode mixture slurry was applied to both surfaces of an anode current collector formed of a band-like piece of copper foil with a thickness of 15 μm in such a manner that part of the anode current collector was exposed. After that, the dispersion medium of the applied anode mixture slurry was evaporated to dryness, and compression molding was performed by roll pressing; thereby, an anode active material layer was formed. Finally, an anode terminal was attached to the exposed portion of the anode current collector; thus, an anode was formed. Note that an area density of the anode active material layer was adjusted to 15 mg/cm$^2$.

[Fabrication of a Separator]

As the separator, a polyethylene (PE) microporous film (a polyethylene separator) having a thickness of 5 μm was prepared.

[Formation of an Electrolyte Layer]

In a non-aqueous solvent in which ethylene carbonate (EC) serving as a cyclic alkylene carbonate and diethyl carbonate (DEC) were mixed, lithium hexafluorophosphate ($LiPF_6$) serving as an electrolyte salt was dissolved and accordingly, the non-aqueous electrolyte solution was prepared. Note that a composition of the non-aqueous solvent had a mass ratio (EC:DEC) that was adjusted to 35:65. A composition of the non-aqueous electrolyte solution had a mass ratio (non-aqueous solvent: $LiPF_6$) of 90:10. The cyclic alkylene carbonate comprised in the non-aqueous electrolyte solution was EC, and a content thereof was 35 mass % based on a percentage by mass with respect to a total amount of the non-aqueous solvent.

Next, polyvinylidene fluoride (PVdF) was used as a matrix polymer compound (a resin) that retains the non-aqueous electrolyte solution. The non-aqueous electrolyte solution, the polyvinylidene fluoride, dimethyl carbonate (DMC) serving as a dilution solvent, and boehmite particles (particle size D50: 1 μm) serving as solid particles were mixed to prepare a sol-like coating solution. Note that a composition of the coating solution includes the solid particles at 10 mass %, the resin at 10 mass %, and the non-aqueous electrolyte solution at 80 mass %, based on a percentage by mass with respect to a total amount of the coating solution.

Next, the coating solution was heated and applied to both surfaces of each of the cathode and the anode, the dilution solvent was removed by drying, and a gel-like electrolyte layer having an area density of 3 mg/cm$^2$ per one surface was formed on the surfaces of the cathode and the anode. When the coating solution was heated and applied, electrolytes comprising boehmite particles serving as solid particles could be impregnated into the recess between adjacent active material particles positioned on the outermost surface of the anode active material layer or an inside of the active material layer. In this case, when the solid particles were filtered in the recess between adjacent particles, a concentration of the particles in the recess impregnation region A of the anode side increased. Accordingly, it is possible to set a difference of concentrations of particles between the recess impregnation region A and the deep region C. By partially scraping off the coating solution, the thickness of the recess impregnation region A and the top coat region B was adjusted as shown in Table 1, more solid particles were sent to the recess impregnation region A, and the solid particles remained in the recess impregnation region A. Note that some solid particles having a particle size of $2/\sqrt{3}-1$ times a particle size D50 of anode active materials or more were added, and a particle size D95 of solid particles was prepared to be $2/\sqrt{3}-1$ times a particle size D50 of anode active material particles or more (3.5 μm), which were used as the solid particles. Accordingly, an interval between particles at a bottom of the recess was filled with some solid particles having a large particle size and the solid particles could be easily filtered.

[Assembly of the Laminated Film-Type Battery]

The cathode and the anode each having both surfaces on which the electrolyte layer was formed and the separator were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1-2to Example 1-57

In Example 1-2 to Example 1-57, laminated film-type batteries were fabricated in the same manner as in Example 1-1 except that particles to be used were changed as shown in the following Table 1.

Example 1-58

In Example 1-58, a laminated film-type battery was fabricated in the same manner as in Example 1-1 except that, when a coating solution to be applied to an anode was prepared, a content of solid particles decreased to 7 mass %, and an amount of DMC for decrementing the solid particles increased.

Example 1-59

In Example 1-59, a laminated film-type battery was fabricated in the same manner as in Example 1-1 except that, when a coating solution to be applied to an anode was prepared, a content of solid particles increased to 20 mass % and an amount of DMC for incrementing solid particles decreased.

Example 1-60

In Example 1-60, a laminated film-type battery was fabricated in the same manner as in Example 1-1 except that, when a coating solution to be applied to an anode was prepared, a content of solid particles increased to 20 mass %, an amount of DMC for incrementing solid particles decreased.

Example 1-61

In Example 1-61, a laminated film-type battery was fabricated in the same manner as in Example 1-1 except that, when a gel electrolyte layer was formed on an anode, a coating solution was slightly scraped off.

Example 1-62

In Example 1-62, a laminated film-type battery was fabricated in the same manner as in Example 1-1 except that some solid particles having a particle size of 2/√3−1 or more times a particle size D50 of anode active materials were added, and a particle size D95 of solid particles was prepared to be 2/√3−1 or more times a particle size D50 of anode active material particles (3.1 μm), which were used as the solid particles.

Example 1-63

In Example 1-63, a laminated film-type battery was fabricated in the same manner as in Example 1-1 except that a content of the cyclic alkylene carbonate (EC) was changed to 25 mass %.

Comparative Example 1-1

A laminated film-type battery was fabricated in the same manner as in Example 1-1 except that a gel-like electrolyte layer was formed on both principal surfaces of a separator in place of formation of a gel-like electrolyte layer on an electrode. Note that, in this example, since most of the solid particles comprised in the electrolyte layer formed on the surfaces of the separator do not enter the recess between adjacent active material particles positioned on the outermost surface of the active material layer, a concentration of solid particles of the recess impregnation region A decreased.

Comparative Example 1-2

A laminated film-type battery was fabricated in the same manner as in Example 1-1 except that solid particles were added to a cathode mixture and an anode mixture rather than a coating solution.

Comparative Example 1-3

A laminated film-type battery was fabricated in the same manner as in Example 1-1 except that no boehmite particles were added to a coating solution.

Comparative Example 1-4

In Comparative Example 1-4, a laminated film-type battery was fabricated in the same manner as in Example 1-1 except that, without adding some solid particles having a particle size of 2/√3−1 or more times a particle size D50 of anode active materials, solid particles having a particle size D95 that was prepared to be 2/√3−1 or less times a particle size D50 of the anode active material particles (2.0 μm) were used as the solid particles.

Comparative Example 1-5

In Comparative Example 1-5, a laminated film-type battery was fabricated in the same manner as in Example 1-1 except that, when a gel electrolyte layer was formed on an anode, the coating solution was not scraped, and in this case, since a distance between electrodes increased, the electrode was adjusted by winding it to become shorter in the length direction without changing the outer diameter. Note that, in this example, while a low temperature characteristic is ordinary, since a length of the electrode that contributes to a battery capacity was shorter than in other examples, the battery capacity decreased.

(Measurement of a Particle Size of Particles and Measurement of a BET Specific Surface Area)

In the above-described examples and comparative examples, a particle size of particles and a BET specific surface area were measured or evaluated as follows (the same in the following examples)

(Measurement of a Particle Size)

In a particle size distribution in which solid particles after electrolyte components and the like were removed from the electrolyte layer were measured by a laser diffraction method, a particle size at which 50% of particles having a smaller particle size were cumulated (a cumulative volume of 50%) was set as a particle size D50 of particles. Note that, as necessary, a value of a particle size D95 at a cumulative volume of 95% was also obtained from the measured particle size distribution. Similarly, in active material particles, particles in which components other than active materials were removed from the active material layer were measured in the same manner.

(Measurement of a BET Specific Surface Area)

In solid particles after electrolyte components and the like were removed from the electrolyte layer, a BET specific surface area was obtained using a BET specific surface area measurement device.

(Measurement of a Concentration of Solid Particles, and the Recess Impregnation Region A, the Top Coat Region B, and the Deep Region C)

Observation was performed in four observation fields of view with a visual field width of 50 μm using an SEM. In each of the observation fields of view, the thickness of the recess impregnation region A, the top coat region B, and the deep region C and a concentration of particles of the regions were measured. In an observation field of view of 2 μm×2 μm in the regions, an area percentage (("total area of particle cross section"÷"area of observation field of view")×100%) of a total area of a particle cross section was obtained and therefore the concentration of the particles was obtained.

(Battery Evaluation: Evaluation of a Low Temperature Characteristic)

The following charge and discharge test was performed on the fabricated batteries under a low temperature environment. At 23° C., a charge voltage of 4.2 V and a current of 1 A, a constant current and constant voltage charge was performed before the total charge time of 5 hours had elapsed, and then a constant current discharge was performed to 3.0 V at a constant current of 0.5 A. A discharge capacity at that time was set as an initial discharge capacity of the battery.

Next, at 23° C., a charge voltage of 4.2 V and a current of 1 A, a constant current and constant voltage charge was performed and then a constant current discharge was performed to 3.0 V at a constant current of 0.5 A at −20° C. A discharge capacity at that time was set as a discharge capacity (a low temperature discharge capacity) during discharging under a low temperature environment. Then, [low temperature discharge capacity/initial discharge capacity]×100(%) was obtained as a capacity retention rate.

According to a level of the capacity retention rate, determination was performed as follows.

Fail: less than 55%
Passable: 55% or more and less than 60%
Satisfactory: 60% or more and less than 70%
Good: 70% or more and less than 80%
Excellent: 80% or more and 100% or less The evaluation results are shown in Table 1.

TABLE 1

| | Solid particles | | Solid particle concentration Negative electrode | | Solid particle concentration Positive electrode | | Thickness of regions Negative electrode side | | | Thickness of regions Positive electrode side | | | Cyclic alkylene carbonate | | Battery evaluation | |
|---|---|---|---|---|---|---|---|---|---|---|---|---|---|---|---|---|
| | Material type | Amount added [mass %] | Recess impreg-nation region [volume %] | Deep region [volume %] | Recess impreg-nation region [volume %] | Deep region [volume %] | Recess impreg-nation region [μm] | Top coat region [μm] | Deep region [μm] | Recess impreg-nation region [μm] | Top coat region [μm] | Deep region [μm] | Mate-rial kind | Content [mass %] | Capacity retention rate [%] | Determi-nation |
| Example 1-1 | Boehmite | 10 | 40 | 2 | 40 | 2 | 10 | 2 | 30 | 5 | 2 | 45 | EC | 35 | 85 | Excellent |
| Example 1-2 | Talc | | 40 | 2 | 40 | 2 | 10 | 2 | 30 | 5 | 2 | 45 | | | 85 | Excellent |
| Example 1-3 | Zinc oxide | | 40 | 2 | 40 | 2 | 10 | 2 | 30 | 5 | 2 | 45 | | | 65 | Satisfactory |
| Example 1-4 | Tin oxide | | 40 | 2 | 40 | 2 | 10 | 2 | 30 | 5 | 2 | 45 | | | 65 | Satisfactory |
| Example 1-5 | Silicon oxide | | 40 | 2 | 40 | 2 | 10 | 2 | 30 | 5 | 2 | 45 | | | 65 | Satisfactory |
| Example 1-6 | Magnesium oxide | | 40 | 2 | 40 | 2 | 10 | 2 | 30 | 5 | 2 | 45 | | | 65 | Satisfactory |
| Example 1-7 | Antimony oxide | | 40 | 2 | 40 | 2 | 10 | 2 | 30 | 5 | 2 | 45 | | | 65 | Satisfactory |
| Example 1-8 | Aluminum oxide | | 40 | 2 | 40 | 2 | 10 | 2 | 30 | 5 | 2 | 45 | | | 65 | Satisfactory |
| Example 1-9 | Magnesium sulfate | | 40 | 2 | 40 | 2 | 10 | 2 | 30 | 5 | 2 | 45 | | | 65 | Satisfactory |
| Example 1-10 | Calcium sulfate | | 40 | 2 | 40 | 2 | 10 | 2 | 30 | 5 | 2 | 45 | | | 65 | Satisfactory |
| Example 1-11 | Barium sulfate | | 40 | 2 | 40 | 2 | 10 | 2 | 30 | 5 | 2 | 45 | | | 65 | Satisfactory |
| Example 1-12 | Strontium sulfate | | 40 | 2 | 40 | 2 | 10 | 2 | 30 | 5 | 2 | 45 | | | 65 | Satisfactory |
| Example 1-13 | Magnesium carbonate | | 40 | 2 | 40 | 2 | 10 | 2 | 30 | 5 | 2 | 45 | | | 65 | Satisfactory |
| Example 1-14 | Calcium carbonate | | 40 | 2 | 40 | 2 | 10 | 2 | 30 | 5 | 2 | 45 | | | 65 | Satisfactory |
| Example 1-15 | Barium carbonate | | 40 | 2 | 40 | 2 | 10 | 2 | 30 | 5 | 2 | 45 | | | 65 | Satisfactory |
| Example 1-16 | Lithium carbonate | | 40 | 2 | 40 | 2 | 10 | 2 | 30 | 5 | 2 | 45 | | | 65 | Satisfactory |
| Example 1-17 | Magnesium hydroxide | | 40 | 2 | 40 | 2 | 10 | 2 | 30 | 5 | 2 | 45 | | | 85 | Excellent |
| Example 1-18 | Aluminum hydroxide | | 40 | 2 | 40 | 2 | 10 | 2 | 30 | 5 | 2 | 45 | | | 85 | Excellent |
| Example 1-19 | Zinc hydroxide | | 40 | 2 | 40 | 2 | 10 | 2 | 30 | 5 | 2 | 45 | | | 85 | Excellent |

TABLE 1-continued

| | Solid particles: Material type | Solid particles: Amount added [mass %] | Solid particle concentration, Negative electrode: Recess impregnation region [volume %] | Solid particle concentration, Negative electrode: Deep region [volume %] | Solid particle concentration, Positive electrode: Recess impregnation region [volume %] | Solid particle concentration, Positive electrode: Deep region [volume %] | Thickness of regions, Negative electrode side: Recess impregnation region [μm] | Thickness of regions, Negative electrode side: Top coat region [μm] | Thickness of regions, Negative electrode side: Deep region [μm] | Thickness of regions, Positive electrode side: Recess impregnation region [μm] | Thickness of regions, Positive electrode side: Top coat region [μm] | Thickness of regions, Positive electrode side: Deep region [μm] | Cyclic alkylene carbonate: Material kind | Cyclic alkylene carbonate: Content [mass %] | Battery evaluation: Capacity retention rate [%] | Battery evaluation: Determination |
|---|---|---|---|---|---|---|---|---|---|---|---|---|---|---|---|---|
| Example 1-20 | Boron carbide | | 40 | 2 | 40 | 2 | 10 | 2 | 30 | 5 | 2 | 45 | | | 75 | Good |
| Example 1-21 | Silicon carbide | | 40 | 2 | 40 | 2 | 10 | 2 | 30 | 5 | 2 | 45 | | | 85 | Excellent |
| Example 1-22 | Silicon nitride | | 40 | 2 | 40 | 2 | 10 | 2 | 30 | 5 | 2 | 45 | | | 75 | Good |
| Example 1-23 | Boron nitride | | 40 | 2 | 40 | 2 | 10 | 2 | 30 | 5 | 2 | 45 | | | 85 | Excellent |
| Example 1-24 | Aluminum nitride | | 40 | 2 | 40 | 2 | 10 | 2 | 30 | 5 | 2 | 45 | | | 85 | Excellent |
| Example 1-25 | Titanium nitride | | 40 | 2 | 40 | 2 | 10 | 2 | 30 | 5 | 2 | 45 | | | 75 | Good |
| Example 1-26 | Lithium flouride | | 40 | 2 | 40 | 2 | 10 | 2 | 30 | 5 | 2 | 45 | | | 75 | Good |
| Example 1-27 | Aluminum flouride | | 40 | 2 | 40 | 2 | 10 | 2 | 30 | 5 | 2 | 45 | | | 75 | Good |
| Example 1-28 | Calcium flouride | | 40 | 2 | 40 | 2 | 10 | 2 | 30 | 5 | 2 | 45 | | | 75 | Good |
| Example 1-29 | Barium flouride | | 40 | 2 | 40 | 2 | 10 | 2 | 30 | 5 | 2 | 45 | | | 75 | Good |
| Example 1-30 | Magnesium flouride | 10 | 40 | 2 | 40 | 2 | 10 | 2 | 30 | 5 | 2 | 45 | EC | 35 | 75 | Good |
| Example 1-31 | Diamond | | 40 | 2 | 40 | 2 | 10 | 2 | 30 | 5 | 2 | 45 | | | 85 | Excellent |
| Example 1-32 | Trilithium phosphate | | 40 | 2 | 40 | 2 | 10 | 2 | 30 | 5 | 2 | 45 | | | 75 | Good |
| Example 1-33 | Magnesium phosphate | | 40 | 2 | 40 | 2 | 10 | 2 | 30 | 5 | 2 | 45 | | | 75 | Good |
| Example 1-34 | Magnesium hydrogen phosphate | | 40 | 2 | 40 | 2 | 10 | 2 | 30 | 5 | 2 | 45 | | | 75 | Good |
| Example 1-35 | Calcium silicate | | 40 | 2 | 40 | 2 | 10 | 2 | 30 | 5 | 2 | 45 | | | 75 | Good |
| Example 1-36 | Zinc silicate | | 40 | 2 | 40 | 2 | 10 | 2 | 30 | 5 | 2 | 45 | | | 75 | Good |
| Example 1-37 | Zirconium silicate | | 40 | 2 | 40 | 2 | 10 | 2 | 30 | 5 | 2 | 45 | | | 75 | Good |
| Example 1-38 | Aluminum silicate | | 40 | 2 | 40 | 2 | 10 | 2 | 30 | 5 | 2 | 45 | | | 75 | Good |
| Example 1-39 | Magnesium silicate | | 40 | 2 | 40 | 2 | 10 | 2 | 30 | 5 | 2 | 45 | | | 75 | Good |

TABLE 1-continued

| | Solid particles | | Solid particle concentration Negative electrode | | Solid particle concentration Positive electrode | | Thickness of regions Negative electrode side | | | Thickness of regions Positive electrode side | | | Cyclic alkylene carbonate | | Battery evaluation | |
|---|---|---|---|---|---|---|---|---|---|---|---|---|---|---|---|---|
| | Material type | Amount added [mass %] | Recess impreg-nation region [volume %] | Deep region [volume %] | Recess impreg-nation region [volume %] | Deep region [volume %] | Recess impreg-nation region [μm] | Top coat region [μm] | Deep region [μm] | Recess impreg-nation region [μm] | Top coat region [μm] | Deep region [μm] | Mate-rial kind | Content [mass %] | Capacity retention rate [%] | Determi-nation |
| Example 1-40 | Spinel | | 40 | 2 | 40 | 2 | 10 | 2 | 30 | 5 | 2 | 45 | | | 75 | Good |
| Example 1-41 | Hydrotalcite | | 40 | 2 | 40 | 2 | 10 | 2 | 30 | 5 | 2 | 45 | | | 85 | Excellent |
| Example 1-42 | Dolomite | | 40 | 2 | 40 | 2 | 10 | 2 | 30 | 5 | 2 | 45 | | | 85 | Excellent |
| Example 1-43 | Kaolinite | | 40 | 2 | 40 | 2 | 10 | 2 | 30 | 5 | 2 | 45 | | | 85 | Excellent |
| Example 1-44 | Sepiolite | | 40 | 2 | 40 | 2 | 10 | 2 | 30 | 5 | 2 | 45 | | | 85 | Excellent |
| Example 1-45 | Imogolite | | 40 | 2 | 40 | 2 | 10 | 2 | 30 | 5 | 2 | 45 | | | 85 | Excellent |
| Example 1-46 | Sericite | | 40 | 2 | 40 | 2 | 10 | 2 | 30 | 5 | 2 | 45 | | | 85 | Excellent |
| Example 1-47 | Pyrophyllite | | 40 | 2 | 40 | 2 | 10 | 2 | 30 | 5 | 2 | 45 | | | 85 | Excellent |
| Example 1-48 | Mica | | 40 | 2 | 40 | 2 | 10 | 2 | 30 | 5 | 2 | 45 | | | 85 | Excellent |
| Example 1-49 | Zeolite | | 40 | 2 | 40 | 2 | 10 | 2 | 30 | 5 | 2 | 45 | | | 85 | Excellent |
| Example 1-50 | Mullite | | 40 | 2 | 40 | 2 | 10 | 2 | 30 | 5 | 2 | 45 | | | 85 | Excellent |
| Example 1-51 | Saponite | | 40 | 2 | 40 | 2 | 10 | 2 | 30 | 5 | 2 | 45 | | | 85 | Excellent |
| Example 1-52 | Attapulgite | | 40 | 2 | 40 | 2 | 10 | 2 | 30 | 5 | 2 | 45 | | | 85 | Excellent |
| Example 1-53 | Montmo-rillonite | | 40 | 2 | 40 | 2 | 10 | 2 | 30 | 5 | 2 | 45 | | | 85 | Excellent |
| Example 1-54 | Ammonium polyphos-phate | | 40 | 2 | 40 | 2 | 10 | 2 | 30 | 5 | 2 | 45 | | | 75 | Good |
| Example 1-55 | Melamine | | 40 | 2 | 40 | 2 | 10 | 2 | 30 | 5 | 2 | 45 | | | 75 | Good |
| Example 1-56 | Melamine polyphos-phate | | 40 | 2 | 40 | 2 | 10 | 2 | 30 | 5 | 2 | 45 | | | 75 | Good |
| Example 1-57 | Polyolefin bead | | 40 | 2 | 40 | 2 | 10 | 2 | 30 | 5 | 2 | 45 | | | 65 | Satisfactory |
| Example 1-58 | Boehmite | 7 | 40 | 2 | 40 | 2 | 16 | 2 | 24 | 8 | 2 | 42 | | | 75 | Good |
| Example 1-59 | Boehmite | 20 | 80 | 3 | 80 | 3 | 10 | 2 | 30 | 5 | 2 | 45 | EC | 35 | 90 | Excellent |
| Example 1-60 | Boehmite | 20 | 90 | 3 | 90 | 3 | 10 | 2 | 30 | 5 | 2 | 45 | EC | 35 | 75 | Good |
| Example 1-61 | Boehmite | 10 | 40 | 2 | 40 | 2 | 4 | 2 | 36 | 5 | 2 | 45 | EC | 35 | 75 | Good |
| Example 1-62 | Boehmite | 10 | 30 | 3 | 30 | 2 | 10 | 2 | 30 | 5 | 2 | 45 | EC | 35 | 85 | Excellent |
| Example 1-63 | Boehmite | 10 | 40 | 2 | 40 | 2 | 10 | 2 | 30 | 5 | 2 | 45 | EC | 25 | 55 | Passable |
| Comparative Example 1-1 | Boehmite (disposed only a surface of a separator) | 10 | — | — | — | — | 0 | 20 | 40 | 0 | 20 | 50 | EC | 35 | 10 | Fail |

TABLE 1-continued

| | Solid particles | | Solid particle concentration Negative electrode | | Solid particle concentration Positive electrode | | Thickness of regions Negative electrode side | | | Thickness of regions Positive electrode side | | | Cyclic alkylene carbonate | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material kind | Content [mass %] | Capacity retention rate [%] | Determination |
| Comparative Example 1-2 | Boehmite (added to an electrode mixture) | 10 | 20 | 20 | 20 | 20 | Without boundary | Without top coat layer | Without boundary | Without boundary | Without top coat layer | Without boundary | EC | 35 | 20 | Fail |
| Comparative Example 1-3 | Not disposed | — | — | — | — | — | — | — | — | — | — | — | EC | 35 | 30 | Fail |
| Comparative Example 1-4 | Boehmite | 10 | 10 | 10 | 10 | 10 | Indistinguishable | 2 | Indistinguishable | Indistinguishable | 2 | Indistinguishable | EC | 35 | 10 | Fail |
| Comparative Example 1-5 | Boehmite | 10 | 18 | 2 | 18 | 2 | 3 | 20 | 37 | 3 | 20 | 45 | EC | 35 | 55 | Passable |

As shown in Table 1, in Example 1-1 to Example 1-63, since solid particles were disposed at an appropriate concentration in an appropriate region inside the battery, the low temperature characteristic was outstanding.

Example 2-1

In the same manner as in Example 1-1, a laminated film-type battery was fabricated.

Example 2-2 to Example 2-45

In Example 2-2 to Example 2-45, laminated film-type batteries were fabricated in the same manner as in Example 2-1 except that a composition of the non-aqueous solvent was changed as shown in the following Table 2 when an electrolyte layer was formed.

(Battery Evaluation: Evaluation of a Low Temperature Characteristic)

In the same manner as in Example 1-1, a low temperature characteristic evaluation was performed on the fabricated laminated film-type batteries according to the examples.

The evaluation results are shown in Table 2.

TABLE 2

| | Solid particles | | Nonaqueous solvent composition [mass %] | | | | | Cyclic alkylene carbonate | | Battery evaluation | |
|---|---|---|---|---|---|---|---|---|---|---|---|
| | Material type | Amount added [mass %] | EC | PC | DEC | EMC | DMC | Material type | Content [mass %] | Capacity retention rate [%] | Determination |
| Example 2-1 | Boehmite | 10 | 40 | — | 60 | — | — | EC | 40 | 85 | Excellent |
| Example 2-2 | | | 40 | — | — | 60 | — | EC | | 85 | Excellent |
| Example 2-3 | | | 40 | — | — | — | 60 | EC | | 85 | Excellent |
| Example 2-4 | | | — | 40 | 60 | — | — | EC | | 85 | Excellent |
| Example 2-5 | | | — | 40 | — | 60 | — | EC | | 85 | Excellent |
| Example 2-6 | | | — | 40 | — | — | 60 | EC | | 85 | Excellent |
| Example 2-7 | | | 20 | 20 | 60 | — | — | EC PC | | 85 | Excellent |
| Example 2-8 | | | 20 | 20 | — | 60 | — | EC PC | | 85 | Excellent |
| Example 2-9 | | | 20 | 20 | — | — | 60 | EC PC | | 85 | Excellent |
| Example 2-10 | | | 60 | — | 40 | — | — | EC | 60 | 80 | Excellent |
| Example 2-11 | | | 60 | — | — | 40 | — | EC | | 80 | Excellent |
| Example 2-12 | | | 60 | — | — | — | 40 | EC | | 80 | Excellent |
| Example 2-13 | | | — | 60 | 40 | — | — | EC | | 80 | Excellent |
| Example 2-14 | | | — | 60 | — | 40 | — | EC | | 80 | Excellent |
| Example 2-15 | | | — | 60 | — | — | 40 | EC | | 80 | Excellent |
| Example 2-16 | | | 30 | 30 | 40 | — | — | EC PC | | 80 | Excellent |
| Example 2-17 | | | 30 | 30 | — | 40 | — | EC PC | | 80 | Excellent |
| Example 2-18 | | | 30 | 30 | — | — | 40 | EC PC | | 80 | Excellent |
| Example 2-19 | | | 70 | — | 30 | — | — | EC | 70 | 75 | Good |
| Example 2-20 | | | 70 | — | — | 30 | — | EC | | 75 | Good |
| Example 2-21 | | | 70 | — | — | — | 30 | EC | | 75 | Good |
| Example 2-22 | | | — | 70 | 30 | — | — | EC | | 75 | Good |
| Example 2-23 | | | — | 70 | — | 30 | — | EC | | 75 | Good |
| Example 2-24 | | | — | 70 | — | — | 30 | EC | | 75 | Good |
| Example 2-25 | | | 35 | 35 | 30 | — | — | EC PC | | 75 | Good |
| Example 2-26 | | | 35 | 35 | — | 30 | — | EC PC | | 75 | Good |
| Example 2-27 | | | 35 | 35 | — | — | 30 | EC PC | | 75 | Good |
| Example 2-28 | | | 80 | — | 20 | — | — | EC | 80 | 70 | Good |
| Example 2-29 | | | 80 | — | — | 20 | — | EC | | 70 | Good |
| Example 2-30 | | | 80 | — | — | — | 20 | EC | | 70 | Good |
| Example 2-31 | | | — | 80 | 20 | — | — | EC | | 70 | Good |
| Example 2-32 | | | — | 80 | — | 20 | — | EC | | 70 | Good |
| Example 2-33 | | | — | 80 | — | — | 20 | EC | | 70 | Good |
| Example 2-34 | | | 40 | 40 | 20 | — | — | EC PC | | 70 | Good |
| Example 2-35 | | | 40 | 40 | — | 20 | — | EC PC | | 70 | Good |
| Example 2-36 | | | 40 | 40 | — | — | 20 | EC PC | | 70 | Good |
| Example 2-37 | | | 100 | — | — | — | — | EC | 100 | 65 | Satisfactory |
| Example 2-38 | | | 100 | — | — | — | — | EC | | 65 | Satisfactory |
| Example 2-39 | | | 100 | — | — | — | — | EC | | 65 | Satisfactory |
| Example 2-40 | | | — | 100 | — | — | — | EC | | 65 | Satisfactory |
| Example 2-41 | | | — | 100 | — | — | — | EC | | 65 | Satisfactory |
| Example 2-42 | | | — | 100 | — | — | — | EC | | 65 | Satisfactory |
| Example 2-43 | | | 50 | 50 | — | — | — | EC PC | | 65 | Satisfactory |
| Example 2-44 | | | 50 | 50 | — | — | — | EC PC | | 65 | Satisfactory |
| Example 2-45 | | | 50 | 50 | — | — | — | EC PC | | 65 | Satisfactory |

As shown in Table 2, in Example 2-1 to Example 2-45, since solid particles were disposed at an appropriate concentration in an appropriate region inside the battery, the low temperature characteristic was outstanding.

Example 3-1 to Example 3-9

In Example 3-1 to Example 3-9, as shown in the following Table 3, laminated film-type batteries were fabricated in the same manner as in Example 1-1 except that a volume percentage of solid particles with respect to electrolytes was changed as shown in the following Table 3.

(Battery Evaluation: Evaluation of a Low Temperature Characteristic)

In the same manner as in Example 1-1, a low temperature characteristic evaluation was performed on the fabricated laminated film-type batteries according to the examples.

The evaluation results are shown in Table 3.

TABLE 3

| | Solid particles | | Cyclic alkylene | Content | Battery evaluation | |
|---|---|---|---|---|---|---|
| | Material type | [volume %] | carbonate | [mass %] | Capacity retention rate [%] | Determination |
| Example 3-1 | Boehmite | 1 | EC | 35 | 65 | Satisfactory |
| Example 3-2 | | 2 | | | 75 | Good |
| Example 3-3 | | 3 | | | 80 | Excellent |
| Example 3-4 | | 5 | | | 90 | Excellent |
| Example 3-5 | | 10 | | | 90 | Excellent |
| Example 3-6 | | 20 | | | 85 | Excellent |
| Example 3-7 | | 30 | | | 80 | Excellent |
| Example 3-8 | | 40 | | | 75 | Good |
| Example 3-9 | | 50 | | | 65 | Satisfactory |

As shown in Table 3, in Example 3-1 to Example 3-9, since solid particles were disposed at an appropriate concentration in an appropriate region inside the battery, the low temperature characteristic was outstanding.

Example 4-1 to Example 4-11

In Example 4-1 to Example 4-11, laminated film-type batteries were fabricated in the same manner as in Example 1-1 except that a particle size and a specific surface area of boehmite particles serving as solid particles were changed as shown in the following Table 4.

(Battery Evaluation: Evaluation of a Low Temperature Characteristic)

In the same manner as in Example 1-1, a low temperature characteristic evaluation was performed on the fabricated laminated film-type batteries according to the examples.

The evaluation results are shown in Table 4.

TABLE 4

| | Solid particles | | | | Cyclic alkylene carbonate | | Battery evaluation | |
|---|---|---|---|---|---|---|---|---|
| | Material type | Particle size [μm] | BET specific surface area [$m^2/g$] | Amount added [mass %] | Material type | Content [mass %] | Capacity retention rate [%] | Determination |
| Example 4-1 | Boehmite | 1 | 6 | 10 | EC | 35 | 90 | Excellent |
| Example 4-2 | | 0.1 | 60 | | | | 65 | Satisfactory |
| Example 4-3 | | 0.2 | 40 | | | | 75 | Good |
| Example 4-4 | | 0.3 | 20 | | | | 80 | Excellent |
| Example 4-5 | | 0.5 | 15 | | | | 85 | Excellent |
| Example 4-6 | | 0.7 | 12 | | | | 90 | Excellent |
| Example 4-7 | | 2 | 3 | | | | 90 | Excellent |
| Example 4-8 | | 3 | 2 | | | | 85 | Excellent |
| Example 4-9 | | 5 | 1.5 | | | | 80 | Excellent |
| Example 4-10 | | 7 | 1.2 | | | | 75 | Good |
| Example 4-11 | | 10 | 1 | | | | 65 | Satisfactory |

As shown in Table 4, in Example 4-1 to Example 4-11, since solid particles were disposed at an appropriate concentration in an appropriate region inside the battery, the low temperature characteristic was outstanding.

Example 5-1

In the same manner as in Example 1-1, a laminated film-type battery was fabricated.

Example 5-2

First, in the same manner as in Example 5-1, a cathode and an anode were fabricated, and a separator was prepared.

Next, in the same manner as in Example 1-1, the same coating solution as in Example 1-1 was applied to both surfaces of the separator, a dilution solvent (DMC) was removed by drying, and a gel-like electrolyte layer was formed on the surfaces of the separator.

Then, the cathode, the anode, and the separator having both surfaces on which the gel-like electrolyte layer was formed were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 5-3

First, in the same manner as in Example 5-1, a cathode and an anode were fabricated, and a separator was prepared.

(Formation of a Solid Particle Layer)

Next, paint prepared by mixing solid particles at 22 mass %, PVdF at 3 mass % serving as a binder polymer compound, and NMP at 75 mass % serving as a solvent was applied to both surfaces of the separator and the solvent was then removed by drying. Accordingly, a solid particle layer was formed such that an area density became 0.5 $mg/cm^2$ per one surface.

Next, the cathode, the anode, and the separator having both surfaces on which the solid particle layer was formed were laminated in the order of the cathode, the separator, the anode, and the separator, and then wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 5-4

In the same manner as in Example 5-1, a cathode and an anode were fabricated and a separator was prepared.

A coating solution was applied to both surfaces of the separator, and then dried to form a matrix resin layer as follows.

First, boehmite particles, and vinylidene fluoride (PVdF) serving as a matrix polymer compound were dispersed in N-methyl-2-pyrrolidone (NMP) to prepare the coating solution. In this case, a content of the boehmite particles was 10 mass % with respect to a total amount of paint, a content of the PVdF was 10 mass % with respect to a total amount of paint, and a content of the NMP was 80 mass % with respect to a total amount of paint.

Next, the coating solution was applied to both surfaces of the separator and then passed through a dryer to remove the NMP. Accordingly, the separator on which a matrix resin layer was formed was obtained.

[Assembly of the Laminated Film-Type Battery]

Next, the cathode, the anode and the separator having both surfaces on which the matrix resin layer was formed were laminated in the order of the cathode, the separator, the anode, and the separator, and wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess of the outermost surface of the cathode active material layer and the recess of the outermost surface of the anode active material layer.

Next, the wound electrode body was inserted into the package member, and three sides were subjected to thermal fusion bonding. Note that, in the package member, a laminated film having a soft aluminum layer was used.

Then, an electrolyte solution was injected thereinto and the remaining one side was subjected to thermal fusion bonding under reduced pressure and sealed. In this case, the electrolyte solution was impregnated into a particle-comprising resin layer, and the matrix polymer compound was swollen to form gel-like electrolytes (a gel electrolyte layer). Note that, the same electrolyte solution as in Example 1-1 was used. Thus, the laminated film-type battery shown in FIG. 1 with a battery shape of 4.5 mm in thickness, 30 mm in width, and 50 mm in height was fabricated.

Example 5-5

First, in the same manner as in Example 5-1, a cathode and an anode were fabricated, and a separator was prepared.

(Formation of a Solid Particle Layer)

Paint prepared by mixing solid particles at 22 mass %, PVdF at 3 mass % serving as a binder polymer compound, and NMP at 75 mass % serving as a solvent was applied to both surfaces of each of the cathode and the anode and then the surfaces were scraped. Accordingly, the solid particles were put into the recess impregnation region A of each of the cathode side and the anode side, and the thickness of the recess impregnation region A was set to be twice the thickness of the top coat region B or more. Then, the NMP was removed by drying and a solid particle layer was formed such that an area density became 0.5 mg/cm$^2$ per one surface.

Next, the cathode and the anode each having both surfaces on which the solid particle layer was formed and the separator were laminated in the order of the cathode, the separator, the anode, and the separator, and then wound in a flat shape multiple times in a longitudinal direction. Then, a winding end portion was fixed by an adhesive tape to form a wound body.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 5-6

A laminated film-type battery was fabricated in the same manner as in Example 5-1 except that a gel-like electrolyte layer was formed only on both surfaces of the cathode.

Example 5-7

A laminated film-type battery was fabricated in the same manner as in Example 5-1 except that a gel-like electrolyte layer was formed only on both surfaces of the anode.

(Battery Evaluation: Evaluation of a Low Temperature Characteristic)

In the same manner as in Example 1-1, a low temperature characteristic evaluation was performed on the fabricated laminated film-type batteries according to the examples.

The evaluation results are shown in Table 5.

TABLE 5

| | Solid particles | | Cyclic alkylene carbonate | | Overview of method of disposing solid particles | | | Battery evaluation | |
|---|---|---|---|---|---|---|---|---|---|
| | Material type | Amount added [mass %] | Material type | Content [mass %] | Results formed through coating | Coating target | *Remarks | Capacity retention rate [%] | Determination |
| Example 5-1 | Boehmite | 10 | EC | 35 | Gel electrolytes containing solid particles | Positive electrode and negative electrode | Gel electrolytes are heated and applied and some of the applied gel electrolytes are scraped off | 90 | Excellent |
| Example 5-2 | | | | | Gel electrolytes containing solid particles | Separator | Heating and pressing process (isostatic pressing) is provided | 85 | Satisfactory |
| Example 5-3 | | | | | Solid particle layer | Separator | Heating and pressing process (isostatic pressing) is provided | 75 | Good |
| Example 5-4 | | | | | Matix resin layer | Separator | Heating and pressing process (isostatic pressing) is provided | 75 | Good |
| Example 5-5 | | | | | Solid particle layer | Positive electrode and negative electrode | After application, a solid particle layer is partially scraped off | 75 | Good |
| Example 5-6 | | | | | Gel electrolytes containing solid particles | Positive electrode | Gel electrolytes are heated and applied and some of the applied gel electrolytes are scraped off | 85 | Satisfactory |
| Example 5-7 | | | | | Gel electrolytes containing solid particles | Negative electrode | Gel electrolytes are heated and applied and some of the applied gel electrolytes are scraped off | 75 | Good |

As shown in Table 5, in Example 5-1 to Example 5-7, since solid particles were disposed at an appropriate concentration in an appropriate region inside the battery, the low temperature characteristic was outstanding.

Example 6-1

Next, a rectangular cathode, a rectangular anode, and a rectangular separator whose configurations were the same as those in Example 1-1 were fabricated except for their rectangular shapes.

(Formation of a Solid Particle Layer)

Next, in the same manner as in Example 5-3, a solid particle layer was formed on both surfaces of the separator.

(Formation of a Stacked Electrode Body)

Next, the cathode, the separator, the anode, and the separator were sequentially laminated to form a stacked electrode body.

Next, the packed stacked electrode body was put into heated oil and subjected to isostatic pressing. Accordingly, the solid particles were pushed to the recess of the outermost surface of the cathode active material layer and the recess of the outermost surface of the anode active material layer.

Next, the stacked electrode body was packaged with a laminated film having a soft aluminum layer, three sides around the stacked electrode body were sealed up and closed tight by thermal fusion bonding. Then, the same electrolyte solution as in Example 1-1 was injected thereinto and the remaining one side was sealed by thermal fusion bonding under reduced pressure. Accordingly, the laminated film-type battery shown in FIG. 4A to FIG. 4C with a battery shape of 4.5 mm in thickness, 30 mm in width, and 50 mm in height was fabricated.

Example 6-2

In the same manner as in Example 6-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

Next, a cathode terminal was combined with a safety valve with which a battery lid was combined, and an anode terminal was connected to an anode can. The stacked electrode body was inserted between a pair of insulating plates and accommodated inside a battery can.

Next, the non-aqueous electrolyte solution was injected into the cylindrical battery can from the top of the insulating plate. Finally, at an opening of the battery can, a battery lid was caulked and closed tight through an insulation sealing gasket. Accordingly, a cylindrical battery with a battery shape of 18 mm in diameter and 65 mm in height (ICR18650 size) was fabricated.

Example 6-3

In the same manner as in Example 6-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

[Assembly of the Rectangular Battery]

Next, the stacked electrode body was housed in a rectangular battery can. Subsequently, an electrode pin provided at a battery lid and a cathode terminal led out from the stacked electrode body were connected. Then, the battery can was sealed by the battery lid, the non-aqueous electrolyte solution was injected through an electrolyte solution inlet, and sealed up and closed tight by a sealing member. Accordingly, the rectangular battery with a battery shape of 4.5 mm in thickness, 30 mm in width and 50 mm in height (453050 size) was fabricated.

Example 6-4

In Example 6-4, the same laminated film-type battery as in Example 1-1 was used to fabricate a simple battery pack (a soft pack) shown in FIG. 8 and FIG. 9.

(Battery Evaluation: Evaluation of a Low Temperature Characteristic)

In the same manner as in Example 1-1, a low temperature characteristic evaluation was performed on the fabricated laminated film-type batteries according to the examples.

The evaluation results are shown in Table 6.

TABLE 6

| | Solid particles | | Cyclic alkylene carbonate | | | Battery evaluation | |
|---|---|---|---|---|---|---|---|
| | Material type | Amount added [mass %] | Material type | Content [mass %] | Battery form | Capacity retention rate [%] | Determination |
| Example 6-1 | Boehmite | 10 | EC | 35 | Stacked laminated film-type battery | 90 | Excellent |
| Example 6-2 | | | | | Cylindrical battery in which a stacked electrode body is housed is a cylindrical can | 90 | Excellent |
| Example 6-3 | | | | | Rectangular battery in which a stacked electrode body is housed is a rectangular can | 90 | Excellent |
| Example 6-4 | | | | | Battery pack of a liminated film-type battery | 90 | Excellent |

As shown in Table 6, in Example 6-1 to Example 6-4, since solid particles were disposed at an appropriate concentration in an appropriate region inside the battery, the low temperature characteristic was outstanding.

Example 1A-1

[Fabrication of a Cathode]

91 mass % of lithium cobaltate ($LiCoO_2$) particles (particle size D50: 10 μm), which is the cathode active material, 6 mass % of carbon black, which is an electrically conductive agent, and 3 mass % of polyvinylidene difluoride (PVdF), which is a binder, were mixed together to prepare a cathode mixture, and the cathode mixture was dispersed in N-methyl-2-pyrrolidone (NMP), which is a dispersion medium, to prepare a cathode mixture slurry.

The cathode mixture slurry was applied to both surfaces of a cathode current collector formed of a band-like piece of aluminum foil with a thickness of 12 μm in such a manner that part of the cathode current collector was exposed. After that, the dispersion medium of the applied cathode mixture slurry was evaporated to dryness, and compression molding was performed by roll pressing; thereby, a cathode active material layer was formed. Finally, a cathode terminal was attached to the exposed portion of the cathode current collector; thus, a cathode was formed. Note that an area density of the cathode active material layer was adjusted to 30 mg/cm$^2$.

[Fabrication of an Anode]

96 mass % of granular graphite particle (particle size D50: 20 μm), which is the anode active material, 1.5 mass % of an acrylic acid-modified product of a styrene-butadiene copolymer as a binder, and 1.5 mass % of carboxymethyl cellulose as a thickener were mixed together to prepare an anode mixture, and an appropriate amount of water was added and stirring was performed to prepare an anode mixture slurry.

The anode mixture slurry was applied to both surfaces of an anode current collector formed of a band-like piece of copper foil with a thickness of 15 μm in such a manner that part of the anode current collector was exposed. After that, the dispersion medium of the applied anode mixture slurry was evaporated to dryness, and compression molding was performed by roll pressing; thereby, an anode active material layer was formed. Finally, an anode terminal was attached to the exposed portion of the cathode current collector, thus, an anode was formed. Note that an area density of the anode active material layer was adjusted to 15 mg/cm$^2$.

[Fabrication of a Separator]

As the separator, a polyethylene (PE) microporous film (a polyethylene separator) having a thickness of 5 μm was prepared.

[Formation of an Electrolyte Layer]

In a non-aqueous solvent in which ethylene carbonate (EC) and diethyl carbonate (DEC) were mixed, lithium hexafluorophosphate ($LiPF_6$) serving as an electrolyte salt was dissolved, the compound represented by Formula (1-1) was added as an unsaturated cyclic carbonate ester, and accordingly the non-aqueous electrolyte solution was prepared. Note that a composition of the non-aqueous electrolyte solution had a mass ratio that was adjusted to EC/DEC/the compound represented by Formula (1-1)/$LiPF_6$=20/69/1/10. A content of the compound represented by Formula (1-1) in the non-aqueous electrolyte solution was 1 mass % based on a percentage by mass with respect to a total amount of the non-aqueous electrolyte solution.

Next, polyvinylidene fluoride (PVdF) was used as a matrix polymer compound (a resin) that retains the non-aqueous electrolyte solution. The non-aqueous electrolyte solution, the polyvinylidene fluoride, dimethyl carbonate (DMC) serving as a dilution solvent, and boehmite particles (particle size D50: 1 μm) serving as solid particles were mixed to prepare a sol-like coating solution. Note that a composition of the coating solution includes the solid particles at 10 mass %, the resin at 5 mass %, the non-aqueous electrolyte solution at 35 mass %, and the dilution solvent at 50 mass %, based on a percentage by mass with respect to a total amount of the coating solution.

Next, the coating solution was heated and applied to both surfaces of each of the cathode and the anode, the dilution solvent (DMC) was removed by drying, and a gel-like electrolyte layer having an area density of 3 mg/cm$^2$ per one surface was formed on the surfaces of the cathode and the anode. When the coating solution was heated and applied, electrolytes comprising boehmite particles serving as solid particles could be impregnated into the recess between adjacent active material particles positioned on the outermost surface of the anode active material layer or an inside of the active material layer. In this case, when the solid particles were filtered in the recess between adjacent particles, a concentration of the particles in the recess impregnation region A of the anode side increased. Accordingly, it is possible to set a difference of concentrations of particles between the recess impregnation region A and the deep region C. By partially scraping off the coating solution, the thickness of the recess impregnation region A and the top coat region B was adjusted as shown in Table 7, more solid particles were sent to the recess impregnation region A, and the solid particles remained in the recess impregnation region A. Note that some solid particles having a particle size of $2/\sqrt{3}-1$ times a particle size D50 of anode active materials or more were added, and a particle size D95 of solid particles was prepared to be $2/\sqrt{3}-1$ times a particle size D50 of anode active material particles or more (3.5 μm), which were used as the solid particles. Accordingly, an interval between particles at a bottom of the recess was filled with some solid particles having a large particle size and the solid particles could be easily filtered.

[Assembly of the Laminated Film-Type Battery]

The cathode and the anode each having both surfaces on which the electrolyte layer was formed and the separator were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packaged with a laminated film including a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1A-2to Example 1A-57

In Example 1A-2 to Example 1A-57, laminated film-type batteries were fabricated in the same manner as in Example 1A-1 except that particles to be used were changed as shown in the following Table 7.

Example 1A-58

In Example 1A-58, a laminated film-type battery was fabricated in the same manner as in Example 1A-1 except that, when a coating solution to be applied to an anode was prepared, a content of solid particles decreased to 7 mass %, and an amount of DMC for decrementing the solid particles increased.

Example 1A-59

In Example 1A-59, a laminated film-type battery was fabricated in the same manner as in Example 1A-1 except that, when a coating solution to be applied to an anode was prepared, a content of solid particles increased to 18 mass % and an amount of DMC for incrementing solid particles decreased.

Example 1A-60

In Example 1A-60, a laminated film-type battery was fabricated in the same manner as in Example 1A-1 except that, when a coating solution to be applied to an anode was prepared, a content of solid particles increased to 20 mass %, an amount of DMC for incrementing solid particles decreased.

Example 1A-61

In Example 1A-61, a laminated film-type battery was fabricated in the same manner as in Example 1A-1 except that, when a gel electrolyte layer was formed on an anode, a coating solution was slightly scraped off.

Example 1 A-62

In Example 1A-62, a laminated film-type battery was fabricated in the same manner as in Example 1A-1 except that some solid particles having a particle size of $2/\sqrt{3}-1$ or more times a particle size D50 of anode active materials were added, and a particle size D95 of solid particles was prepared to be $2/\sqrt{3}-1$ or more times a particle size D50 of anode active material particles (3.1 μm), which were used as the solid particles.

Example 1 A-63 to Example 1 A-124

In Example 1A-63 to Example 1A-124, laminated film-type batteries were fabricated in the same manner as in Example 1A-1 to Example 1A-62 except that compounds shown in the following Table 7 were added as a halogenated carbonate ester in place of the unsaturated cyclic carbonate ester when an electrolyte layer was formed.

Comparative Example 1A-1

A laminated film-type battery was fabricated in the same manner as in Example 1A-1 except that no compound represented by Formula (1-1) was added to the non-aqueous electrolyte solution.

Comparative Example 1A-2

A laminated film-type battery was fabricated in the same manner as in Example 1A-1 except that vinyl ethylene carbonate (VEC) was added to the non-aqueous electrolyte solution in place of the compound represented by Formula (1-1).

Comparative Example 1A-3

A laminated film-type battery was fabricated in the same manner as in Example 1A-1 except that no boehmite particles were added to a coating solution.

Comparative Example 1A-4

A laminated film-type battery was fabricated in the same manner as in Example 1A-1 except that a gel-like electrolyte layer was formed on both principal surfaces of a separator in place of formation of a gel-like electrolyte layer on an electrode. Note that, in this example, since most of the solid particles comprised in the electrolyte layer formed on the surfaces of the separator do not enter the recess between adjacent active material particles positioned on the outermost surface of the active material layer, a concentration of solid particles of the recess impregnation region A decreased.

Comparative Example 1A-5

A laminated film-type battery was fabricated in the same manner as in Example 1A-1 except that no boehmite particles were added to a coating solution, and no compound represented by Formula (1-1) was added to the non-aqueous electrolyte solution.

Comparative Example 1A-6

In Comparative Example 1A-6, a laminated film-type battery was fabricated in the same manner as in Example 1A-1 except that, without adding some solid particles having a particle size of $2/\sqrt{3}-1$ or more times a particle size D50 of anode active materials, solid particles having a particle size D95 that was prepared to be $2/\sqrt{3}-1$ or less times a particle size D50 of the anode active material particles (2.0 μm) were used as the solid particles.

Comparative Example 1A-7

In Comparative Example 1A-7, a laminated film-type battery was fabricated in the same manner as in Example 1 A-1 except that, when a gel electrolyte layer was formed on an anode, the coating solution was not scraped, and in this case, since a distance between electrodes increased, the electrode was adjusted by winding it to become shorter in the length direction without changing the outer diameter.

Comparative Example 1A-8 to Comparative Example 1A-11

In Comparative Example 1A-8 to Comparative Example 1A-11, laminated film-type batteries were fabricated in the same manner as in Comparative Example 1A-3 to Comparative Example 1A-4, and Comparative Example 1A-6 to Comparative Example 1A-7 except that the compound represented by Formula (2-1) was added as a halogenated carbonate ester in place of the unsaturated cyclic carbonate ester when an electrolyte layer was formed.

(Measurement of a Particle Size of Particles and Measurement of a BET Specific Surface Area)

In the above-described examples and comparative examples, a particle size of particles and a BET specific surface area were measured or evaluated as follows (the same in the following examples)

(Measurement of a Particle Size)

In a particle size distribution in which solid particles after electrolyte components and the like were removed from the electrolyte layer were measured by a laser diffraction method, a particle size at which 50% of particles having a smaller particle size were cumulated (a cumulative volume of 50%) was set as a particle size D50 of particles. Note that, as necessary, a value of a particle size D95 at a cumulative volume of 95% was also obtained from the measured particle size distribution. Similarly, in active material particles, particles in which components other than active materials were removed from the active material layer were measured in the same manner.

(Measurement of a BET Specific Surface Area)

In solid particles after electrolyte components and the like were removed from the electrolyte layer, a BET specific surface area was obtained using a BET specific surface area measurement device.

(Measurement of a Concentration of Solid Particles, and the Recess Impregnation Region A, the Top Coat Region B, and the Deep Region C)

Observation was performed in four observation fields of view with a visual field width of 50 μm using an SEM. In each of the observation fields of view, the thickness of the recess impregnation region A, the top coat region B, and the deep region C and a concentration of particles of the regions were measured. In an observation field of view of 2 μm×2 μm in the regions, an area percentage ((“total area of particle cross section”÷“area of observation field of view”)×100%) of a total area of a particle cross section was obtained and therefore the concentration of the particles was obtained.

(Battery Evaluation: A High Output Cycle Test and Measurement of a Battery Capacity)

The following high output cycle test was performed on the fabricated batteries. At 23° C., a charge voltage of 4.2 V and a current of 1 A, a constant current and constant voltage charge was performed before the total charge time of 5 hours had elapsed, and then a constant current discharge was performed to 3.0 V at a constant current of 0.5 A. A discharge capacity at that time was set as an initial capacity of the battery. In addition, this capacity was used as the battery capacity.

At 23° C., a charge voltage of 4.2 V and a current of 1 A, a constant current and constant voltage charge was performed. Then, a charge and discharge in which a constant current discharge was performed to 3.0 V at a constant current of 10 A and was performed 500 cycles. A discharge capacity of the 500th cycle was measured. Then, [capacity after 500 cycles/initial discharge capacity]×100(%) was obtained as a capacity retention rate.

According to a level of the capacity retention rate, determination was performed as follows.

Fail: less than 60%

Satisfactory: 60% or more and less than 70%

Good: 70% or more and less than 80%

Excellent: 80% or more and 100% or less

The evaluation results are shown in Table 7.

TABLE 7

| | Solid particles | | Solid particles concentration, Negative electrode | | Solid particle concentration, Positive electrode | | Thickness of region, Negative electrode side | | | Thickness of region, Positive electode side | | | Additive compound | | Battery evaluation | | |
|---|---|---|---|---|---|---|---|---|---|---|---|---|---|---|---|---|---|
| | Material type | Amount added [mass %] | Recess impreg-nation region [volume %] | Deep region [volume %] | Recess impreg-nation region [volume %] | Deep region [volume %] | Recess impreg-nation region [μm] | Top coat region [μm] | Deep region [μm] | Recess impreg-nation region [μm] | Top coat region [μm] | Deep region [μm] | Material type | Amount added [mass %] | Capacity retention rate [%] | Deter-mination | Battery capac-ity [mAh] |
| Example 1A-1 | Boehmite | 10 | 40 | 2 | 40 | 2 | 10 | 2 | 30 | 5 | 2 | 45 | Formula (1-1) | 1 | 90 | Excellent | 1050 |
| Example 1A-2 | Talc | | 40 | 2 | 40 | 2 | 10 | 2 | 30 | 5 | 2 | 45 | Formula (1-1) | | 90 | Excellent | 1050 |
| Example 1A-3 | Zinc oxide | | 40 | 2 | 40 | 2 | 10 | 2 | 30 | 5 | 2 | 45 | Formula (1-1) | | 65 | Satisfactory | 1000 |
| Example 1A-4 | Tin oxide | | 40 | 2 | 40 | 2 | 10 | 2 | 30 | 5 | 2 | 45 | Formula (1-1) | | 65 | Satisfactory | 1000 |
| Example 1A-5 | Silicon oxide | | 40 | 2 | 40 | 2 | 10 | 2 | 30 | 5 | 2 | 45 | Formula (1-1) | | 65 | Satisfactory | 1000 |
| Example 1A-6 | Magnesium oxide | | 40 | 2 | 40 | 2 | 10 | 2 | 30 | 5 | 2 | 45 | Formula (1-1) | | 65 | Satisfactory | 1000 |
| Example 1A-7 | Antimony oxide | | 40 | 2 | 40 | 2 | 10 | 2 | 30 | 5 | 2 | 45 | Formula (1-1) | | 65 | Satisfactory | 1000 |
| Example 1A-8 | Aluminum oxide | | 40 | 2 | 40 | 2 | 10 | 2 | 30 | 5 | 2 | 45 | Formula (1-1) | | 75 | Good | 1020 |
| Example 1A-9 | Magnesium sulfate | | 40 | 2 | 40 | 2 | 10 | 2 | 30 | 5 | 2 | 45 | Formula (1-1) | | 65 | Satisfactory | 1000 |
| Example 1A-10 | Calsium sulfate | | 40 | 2 | 40 | 2 | 10 | 2 | 30 | 5 | 2 | 45 | Formula (1-1) | | 65 | Satisfactory | 1000 |
| Example 1A-11 | Barium sulfate | | 40 | 2 | 40 | 2 | 10 | 2 | 30 | 5 | 2 | 45 | Formula (1-1) | | 65 | Satisfactory | 1000 |
| Example 1A-12 | Strontium sulfate | | 40 | 2 | 40 | 2 | 10 | 2 | 30 | 5 | 2 | 45 | Formula (1-1) | | 65 | Satisfactory | 1000 |
| Example 1A-13 | Magnesium carbonate | | 40 | 2 | 40 | 2 | 10 | 2 | 30 | 5 | 2 | 45 | Formula (1-1) | | 65 | Satisfactory | 1000 |
| Example 1A-14 | Calcium carbonate | | 40 | 2 | 40 | 2 | 10 | 2 | 30 | 5 | 2 | 45 | Formula (1-1) | | 65 | Satisfactory | 1000 |
| Example 1A-15 | Barium carbonate | | 40 | 2 | 40 | 2 | 10 | 2 | 30 | 5 | 2 | 45 | Formula (1-1) | | 65 | Satisfactory | 1000 |
| Example 1A-16 | Lithium carbonate | | 40 | 2 | 40 | 2 | 10 | 2 | 30 | 5 | 2 | 45 | Formula (1-1) | | 65 | Satisfactory | 1000 |
| Example 1A-17 | Magnesium hydroxide | | 40 | 2 | 40 | 2 | 10 | 2 | 30 | 5 | 2 | 45 | Formula (1-1) | | 90 | Excellent | 1050 |
| Example 1A-18 | Aluminum hydroxide | | 40 | 2 | 40 | 2 | 10 | 2 | 30 | 5 | 2 | 45 | Formula (1-1) | | 90 | Excellent | 1050 |
| Example 1A-19 | Zinc hydroxide | | 40 | 2 | 40 | 2 | 10 | 2 | 30 | 5 | 2 | 45 | Formula (1-1) | | 85 | Excellent | 1040 |

TABLE 7-continued

| | Solid particles | | Solid particles concentration Negative electrode Recess | | Solid particle concentration Positive electrode Recess | | Thickness of region Negative electrode side Recess | | | Thickness of region Positive electode side Recess | | | Additive compound | | Battery evaluation | | |
|---|---|---|---|---|---|---|---|---|---|---|---|---|---|---|---|---|---|
| | Material type | Amount added [mass %] | impreg-nation region [volume %] | Deep region [volume %] | impreg-nation region [volume %] | Deep region [volume %] | impreg-nation region [μm] | Top coat region [μm] | Deep region [μm] | impreg-nation region [μm] | Top coat region [μm] | Deep region [μm] | Material type | Amount added [mass %] | Capacity retention rate [%] | Deter-mination | Battery capac-ity [mAh] |
| Example 1A-20 | Boron cabide | | 40 | 2 | 40 | 2 | 10 | 2 | 30 | 5 | 2 | 45 | Formula (1-1) | | 75 | Good | 1020 |
| Example 1A-21 | Silicon carbide | | 40 | 2 | 40 | 2 | 10 | 2 | 30 | 5 | 2 | 45 | Formula (1-1) | | 85 | Excellent | 1040 |
| Example 1A-22 | Silicon nitride | | 40 | 2 | 40 | 2 | 10 | 2 | 30 | 5 | 2 | 45 | Formula (1-1) | | 75 | Good | 1020 |
| Example 1A-23 | Boron nitride | | 40 | 2 | 40 | 2 | 10 | 2 | 30 | 5 | 2 | 45 | Formula (1-1) | | 85 | Excellent | 1040 |
| Example 1A-24 | Aluminum nitride | | 40 | 2 | 40 | 2 | 10 | 2 | 30 | 5 | 2 | 45 | Formula (1-1) | | 85 | Excellent | 1040 |
| Example 1A-25 | Titanium nitride | | 40 | 2 | 40 | 2 | 10 | 2 | 30 | 5 | 2 | 45 | Formula (1-1) | | 75 | Good | 1020 |
| Example 1A-26 | Lithium fluoride | | 40 | 2 | 40 | 2 | 10 | 2 | 30 | 5 | 2 | 45 | Formula (1-1) | | 75 | Good | 1020 |
| Example 1A-27 | Aluminum fluoride | | 40 | 2 | 40 | 2 | 10 | 2 | 30 | 5 | 2 | 45 | Formula (1-1) | | 75 | Good | 1020 |
| Example 1A-28 | Calcium flouride | | 40 | 2 | 40 | 2 | 10 | 2 | 30 | 5 | 2 | 45 | Formula (1-1) | | 75 | Good | 1020 |
| Example 1A-29 | Barium flouride | | 40 | 2 | 40 | 2 | 10 | 2 | 30 | 5 | 2 | 45 | Formula (1-1) | | 75 | Good | 1020 |
| Example 1A-30 | Magnesium fluoride | 10 | 40 | 2 | 40 | 2 | 10 | 2 | 30 | 5 | 2 | 45 | Formula (1-1) | 1 | 75 | Good | 1020 |
| Example 1A-31 | Diamond | | 40 | 2 | 40 | 2 | 10 | 2 | 30 | 5 | 2 | 45 | Formula (1-1) | | 85 | Excellent | 1040 |
| Example 1A-32 | Trilithium phosphate | | 40 | 2 | 40 | 2 | 10 | 2 | 30 | 5 | 2 | 45 | Formula (1-1) | | 75 | Good | 1020 |
| Example 1A-33 | Magnesium phosphate | | 40 | 2 | 40 | 2 | 10 | 2 | 30 | 5 | 2 | 45 | Formula (1-1) | | 75 | Good | 1020 |
| Example 1A-34 | Magnesium hydrogen phosphate | | 40 | 2 | 40 | 2 | 10 | 2 | 30 | 5 | 2 | 45 | Formula (1-1) | | 75 | Good | 1020 |
| Example 1A-35 | Calcium silicate | | 40 | 2 | 40 | 2 | 10 | 2 | 30 | 5 | 2 | 45 | Formula (1-1) | | 75 | Good | 1020 |
| Example 1A-36 | Zirc silicate | | 40 | 2 | 40 | 2 | 10 | 2 | 30 | 5 | 2 | 45 | Formula (1-1) | | 75 | Good | 1020 |
| Example 1A-37 | Zirconium silicate | | 40 | 2 | 40 | 2 | 10 | 2 | 30 | 5 | 2 | 45 | Formula (1-1) | | 75 | Good | 1020 |
| Example 1A 38 | Aluminum silicate | | 40 | 2 | 40 | 2 | 10 | 2 | 30 | 5 | 2 | 45 | Formula (1-1) | | 75 | Good | 1020 |
| Example 1A-39 | Magnesium silicate | | 40 | 2 | 40 | 2 | 10 | 2 | 30 | 5 | 2 | 45 | Formula (1-1) | | 75 | Good | 1020 |

TABLE 7-continued

| | Solid particles | | Solid particles concentration Negative electrode Recess | | Solid particle concentration Positive electrode Recess | | Thickness of region Negative electrode side Recess | | | Thickness of region Positive electode side Recess | | | Additive compound | | Battery evaluation | | |
|---|---|---|---|---|---|---|---|---|---|---|---|---|---|---|---|---|---|
| | Material type | Amount added [mass %] | impreg-nation region [volume %] | Deep region [volume %] | impreg-nation region [volume %] | Deep region [volume %] | impreg-nation region [μm] | Top coat region [μm] | Deep region [μm] | impreg-nation region [μm] | Top coat region [μm] | Deep region [μm] | Material type | Amount added [mass %] | Capacity retention rate [%] | Deter-mination | Battery capac-ity [mAh] |
| Example 1A-40 | Spinel | | 40 | 2 | 40 | 2 | 10 | 2 | 30 | 5 | 2 | 45 | Formula (1-1) | | 75 | Good | 1020 |
| Example 1A-41 | Hydrotalcite | | 40 | 2 | 40 | 2 | 10 | 2 | 30 | 5 | 2 | 45 | Formula (1-1) | | 85 | Excellent | 1040 |
| Example 1A-42 | Dolomite | | 40 | 2 | 40 | 2 | 10 | 2 | 30 | 5 | 2 | 45 | Formula (1-1) | | 85 | Excellent | 1040 |
| Example 1A-43 | Kaofinite | | 40 | 2 | 40 | 2 | 10 | 2 | 30 | 5 | 2 | 45 | Formula (1-1) | | 85 | Excellent | 1040 |
| Example 1A-44 | Sepiolite | | 40 | 2 | 40 | 2 | 10 | 2 | 30 | 5 | 2 | 45 | Formula (1-1) | | 85 | Excellent | 1040 |
| Example 1A-45 | Imogolite | | 40 | 2 | 40 | 2 | 10 | 2 | 30 | 5 | 2 | 45 | Formula (1-1) | | 85 | Excellent | 1040 |
| Example 1A-46 | Sericite | | 40 | 2 | 40 | 2 | 10 | 2 | 30 | 5 | 2 | 45 | Formula (1-1) | | 85 | Excellent | 1040 |
| Example 1A-47 | Pyrophyllite | | 40 | 2 | 40 | 2 | 10 | 2 | 30 | 5 | 2 | 45 | Formula (1-1) | | 85 | Excellent | 1040 |
| Example 1A-48 | Mica | | 40 | 2 | 40 | 2 | 10 | 2 | 30 | 5 | 2 | 45 | Formula (1-1) | | 85 | Excellent | 1040 |
| Example 1A-49 | Zeolite | | 40 | 2 | 40 | 2 | 10 | 2 | 30 | 5 | 2 | 45 | Formula (1-1) | | 85 | Excellent | 1040 |
| Example 1A-50 | Mullite | | 40 | 2 | 40 | 2 | 10 | 2 | 30 | 5 | 2 | 45 | Formula (1-1) | | 85 | Excellent | 1040 |
| Example 1A-51 | Saponite | | 40 | 2 | 40 | 2 | 10 | 2 | 30 | 5 | 2 | 45 | Formula (1-1) | | 85 | Excellent | 1040 |
| Example 1A-52 | Attapulgite | | 40 | 2 | 40 | 2 | 10 | 2 | 30 | 5 | 2 | 45 | Formula (1-1) | | 85 | Excellent | 1040 |
| Example 1A-53 | Montmonillnite | | 40 | 2 | 40 | 2 | 10 | 2 | 30 | 5 | 2 | 45 | Formula (1-1) | | 85 | Excellent | 1040 |
| Example 1A-54 | Ammonium polyphosphate | | 40 | 2 | 40 | 2 | 10 | 2 | 30 | 5 | 2 | 45 | Formula (1-1) | | 75 | Good | 1020 |
| Example 1A-55 | Melamine cyanurate | | 40 | 2 | 40 | 2 | 10 | 2 | 30 | 5 | 2 | 45 | Formula (1-1) | | 75 | Good | 1020 |
| Example 1A-56 | Melamine polyphosphate | | 40 | 2 | 40 | 2 | 10 | 2 | 30 | 5 | 2 | 45 | Formula (1-1) | | 75 | Good | 1020 |
| Example 1A-57 | Polyolefin bead | | 40 | 2 | 40 | 2 | 10 | 2 | 30 | 5 | 2 | 45 | Formula (1-1) | | 65 | Satisfactory | 1020 |
| Example 1A-58 | Boehmite | 7 | 30 | 2 | 40 | 2 | 16 | 2 | 24 | 5 | 2 | 42 | Formula (1-1) | | 75 | Good | 1020 |
| Example 1A-59 | Boehmite | 18 | 80 | 3 | 40 | 2 | 10 | 2 | 30 | 5 | 2 | 45 | Formula (1-1) | 1 | 90 | Excellent | 1050 |

TABLE 7-continued

| | Solid particles | | Solid particles concentration — Negative electrode | | Solid particle concentration — Positive electrode | | Thickness of region — Negative electrode side | | | Thickness of region — Positive electrode side | | | Additive compound | | Battery evaluation | | |
|---|---|---|---|---|---|---|---|---|---|---|---|---|---|---|---|---|---|
| | Material type | Amount added [mass %] | Recess impreg-nation region [volume %] | Deep region [volume %] | Recess impreg-nation region [volume %] | Deep region [volume %] | Recess impreg-nation region [μm] | Top coat region [μm] | Deep region [μm] | Recess impreg-nation region [μm] | Top coat region [μm] | Deep region [μm] | Material type | Amount added [mass %] | Capacity retention rate [%] | Deter-mination | Battery capac-ity [mAh] |
| Example 1A-60 | Boehmite | 20 | 90 | 3 | 40 | 2 | 10 | 2 | 30 | 5 | 2 | 45 | Formula (1-1) | 1 | 75 | Good | 1020 |
| Example 1A-61 | Boehmite | 10 | 40 | 2 | 40 | 2 | 4 | 2 | 36 | 5 | 2 | 45 | Formula (1-1) | 1 | 75 | Good | 1020 |
| Example 1A-62 | Boehmite | 10 | 30 | 3 | 40 | 2 | 10 | 2 | 30 | 5 | 2 | 45 | Formula (1-1) | 1 | 75 | Good | 1020 |
| Comparative Example 1A-1 | Boehmite | 10 | 40 | 2 | 40 | 2 | 10 | 2 | 30 | 5 | 2 | 45 | Additive-free | 1 | 10 | Fail | 800 |
| Comparative Example 1A-2 | Boehmite | | 40 | 2 | 40 | 2 | 10 | 2 | 30 | 5 | 2 | 45 | VEC | 1 | 20 | Fail | 1000 |
| Comparative Example 1A-3 | Not disposed | — | — | — | — | — | — | — | — | — | — | — | Formula (1-1) | — | 30 | Fail | 1000 |
| Comparative Example 1A-4 | Boehmite (disposed only a surface of a separator) | 10 | 3 | 0 | 3 | 0 | 0 | 20 | 40 | 0 | 20 | 50 | Formula (1-1) | 1 | 30 | Fail | 1000 |
| Comparative Example 1A-5 | Not disposed | — | — | — | — | — | — | — | — | — | — | — | Additive-free | — | 10 | Fail | 800 |
| Comparative Example 1A-6 | Boehmite | 10 | 10 | 10 | 10 | 10 | Indistingui-shable | 2 | Indistingui-shable | Indistingui-shable | 2 | Indistingui-shable | Formula (1-1) | 1 | 10 | Fail | 1000 |
| Comparative Example 1A-7 | Boehmite | 10 | 18 | 2 | 40 | 2 | 3 | 20 | 37 | 5 | 2 | 45 | Formula (1-1) | 1 | 55 | Fail | 800 |
| Example 1A-63 | Boehmite | 10 | 40 | 2 | 40 | 2 | 10 | 2 | 30 | 5 | 2 | 45 | Formula (2-1) | 1 | 86 | Excellent | 998 |
| Example 1A-64 | Talc | | 40 | 2 | 40 | 2 | 10 | 2 | 30 | 5 | 2 | 45 | Formula (2-1) | | 86 | Excellent | 998 |
| Example 1A-65 | Zinc oxide | | 40 | 2 | 40 | 2 | 10 | 2 | 30 | 5 | 2 | 45 | Formula (2-1) | | 62 | Satisfactory | 950 |
| Example 1A-66 | Tin oxide | | 40 | 2 | 40 | 2 | 10 | 2 | 30 | 5 | 2 | 45 | Formula (2-1) | | 62 | Satisfactory | 950 |
| Example 1A-67 | Silicon oxide | | 40 | 2 | 40 | 2 | 10 | 2 | 30 | 5 | 2 | 45 | Formula (2-1) | | 62 | Satisfactory | 950 |
| Example 1A-68 | Magnesium oxide | | 40 | 2 | 40 | 2 | 10 | 2 | 30 | 5 | 2 | 45 | Formula (2-1) | | 62 | Satisfactory | 950 |

TABLE 7-continued

| | Solid particles | | Solid particles concentration Negative electrode | | Solid particle concentration Positive electrode | | Thickness of region Negative electrode side | | | Thickness of region Positive electode side | | | Additive compound | | Battery evaluation | | |
|---|---|---|---|---|---|---|---|---|---|---|---|---|---|---|---|---|---|
| | | | Recess | | Recess | | Recess | | | Recess | | | | | | | |
| | Material type | Amount added [mass %] | impreg-nation region [volume %] | Deep region [volume %] | impreg-nation region [volume %] | Deep region [volume %] | impreg-nation region [μm] | Top coat region [μm] | Deep region [μm] | impreg-nation region [μm] | Top coat region [μm] | Deep region [μm] | Material type | Amount added [mass %] | Capacity retention rate [%] | Deter-mination | Battery capac-ity [mAh] |
| Example 1A-69 | Antimony oxide | | 40 | 2 | 40 | 2 | 10 | 2 | 30 | 5 | 2 | 45 | Formula (2-1) | | 62 | Satisfactory | 950 |
| Example 1A-70 | Aluminum oxide | | 40 | 2 | 40 | 2 | 10 | 2 | 30 | 5 | 2 | 45 | Formula (2-1) | | 71 | Good | 950 |
| Example 1A-71 | Magnesium sulfate | | 40 | 2 | 40 | 2 | 10 | 2 | 30 | 5 | 2 | 45 | Formula (2-1) | | 62 | Satisfactory | 969 |
| Example 1A-72 | Calsium sulfate | | 40 | 2 | 40 | 2 | 10 | 2 | 30 | 5 | 2 | 45 | Formula (2-1) | | 62 | Satisfactory | 950 |
| Example 1A-73 | Barium sulfate | | 40 | 2 | 40 | 2 | 10 | 2 | 30 | 5 | 2 | 45 | Formula (2-1) | | 62 | Satisfactory | 950 |
| Example 1A-74 | Strontium sulfate | | 40 | 2 | 40 | 2 | 10 | 2 | 30 | 5 | 2 | 45 | Formula (2-1) | | 62 | Satisfactory | 950 |
| Example 1A-75 | Magnesium carbonate | | 40 | 2 | 40 | 2 | 10 | 2 | 30 | 5 | 2 | 45 | Formula (2-1) | | 62 | Satisfactory | 950 |
| Example 1A-76 | Calcium carbonate | | 40 | 2 | 40 | 2 | 10 | 2 | 30 | 5 | 2 | 45 | Formula (2-1) | | 62 | Satisfactory | 950 |
| Example 1A-77 | Barium carbonate | | 40 | 2 | 40 | 2 | 10 | 2 | 30 | 5 | 2 | 45 | Formula (2-1) | | 62 | Satisfactory | 950 |
| Example 1A-78 | Lithium carbonate | | 40 | 2 | 40 | 2 | 10 | 2 | 30 | 5 | 2 | 45 | Formula (2-1) | | 62 | Satisfactory | 950 |
| Example 1A-79 | Magnesium hydroxide | | 40 | 2 | 40 | 2 | 10 | 2 | 30 | 5 | 2 | 45 | Formula (2-1) | | 86 | Excellent | 998 |
| Example 1A-80 | Aluminum hydroxide | | 40 | 2 | 40 | 2 | 10 | 2 | 30 | 5 | 2 | 45 | Formula (2-1) | | 86 | Excellent | 998 |
| Example 1A-81 | Zinc hydroxide | | 40 | 2 | 40 | 2 | 10 | 2 | 30 | 5 | 2 | 45 | Formula (2-1) | | 81 | Excellent | 988 |
| Example 1A-82 | Boron cabide | | 40 | 2 | 40 | 2 | 10 | 2 | 30 | 5 | 2 | 45 | Formula (2-1) | | 71 | Good | 969 |
| Example 1A-83 | Silicon carbide | | 40 | 2 | 40 | 2 | 10 | 2 | 30 | 5 | 2 | 45 | Formula (2-1) | | 81 | Excellent | 988 |
| Example 1A-84 | Silicon nitride | | 40 | 2 | 40 | 2 | 10 | 2 | 30 | 5 | 2 | 45 | Formula (2-1) | | 71 | Good | 969 |
| Example 1A-85 | Boron nitride | | 40 | 2 | 40 | 2 | 10 | 2 | 30 | 5 | 2 | 45 | Formula (2-1) | | 81 | Excellent | 988 |
| Example 1A-86 | Aluminum nitride | | 40 | 2 | 40 | 2 | 10 | 2 | 30 | 5 | 2 | 45 | Formula (2-1) | | 81 | Excellent | 988 |
| Example 1A-87 | Titanium nitride | | 40 | 2 | 40 | 2 | 10 | 2 | 30 | 5 | 2 | 45 | Formula (2-1) | | 71 | Good | 969 |
| Example 1A-88 | Lithium fluoride | | 40 | 2 | 40 | 2 | 10 | 2 | 30 | 5 | 2 | 45 | Formula (2-1) | | 71 | Good | 969 |

TABLE 7-continued

| | Solid particles | | Solid particles concentration Negative electrode Recess | | Solid particle concentration Positive electrode Recess | | Thickness of region Negative electrode side Recess | | | Thickness of region Positive electode side Recess | | | Additive compound | | Battery evaluation | | |
|---|---|---|---|---|---|---|---|---|---|---|---|---|---|---|---|---|---|
| | Material type | Amount added [mass %] | impreg-nation region [volume %] | Deep region [volume %] | impreg-nation region [volume %] | Deep region [volume %] | impreg-nation region [µm] | Top coat region [µm] | Deep region [µm] | impreg-nation region [µm] | Top coat region [µm] | Deep region [µm] | Material type | Amount added [mass %] | Capacity retention rate [%] | Deter-mination | Battery capac-ity [mAh] |
| Example 1A-89 | Aluminum fluoride | | 40 | 2 | 40 | 2 | 10 | 2 | 30 | 5 | 2 | 45 | Formula (2-1) | | 71 | Good | 969 |
| Example 1A-90 | Calcium flouride | | 40 | 2 | 40 | 2 | 10 | 2 | 30 | 5 | 2 | 45 | Formula (2-1) | | 71 | Good | 969 |
| Example 1A-91 | Barium flouride | | 40 | 2 | 40 | 2 | 10 | 2 | 30 | 5 | 2 | 45 | Formula (2-1) | | 71 | Good | 969 |
| Example 1A-92 | Magnesium fluoride | 10 | 40 | 2 | 40 | 2 | 10 | 2 | 30 | 5 | 2 | 45 | Formula (2-1) | 1 | 71 | Good | 969 |
| Example 1A-93 | Diamond | | 40 | 2 | 40 | 2 | 10 | 2 | 30 | 5 | 2 | 45 | Formula (2-1) | | 81 | Excellent | 998 |
| Example 1A-94 | Trilithium phosphate | | 40 | 2 | 40 | 2 | 10 | 2 | 30 | 5 | 2 | 45 | Formula (2-1) | | 71 | Good | 969 |
| Example 1A-95 | Magnesium phosphate | | 40 | 2 | 40 | 2 | 10 | 2 | 30 | 5 | 2 | 45 | Formula (2-1) | | 71 | Good | 969 |
| Example 1A-96 | Magnesium hydrogen phosphate | | 40 | 2 | 40 | 2 | 10 | 2 | 30 | 5 | 2 | 45 | Formula (2-1) | | 71 | Good | 969 |
| Example 1A-97 | Calcium silicate | | 40 | 2 | 40 | 2 | 10 | 2 | 30 | 5 | 2 | 45 | Formula (2-1) | | 71 | Good | 969 |
| Example 1A-98 | Zirc silicate | | 40 | 2 | 40 | 2 | 10 | 2 | 30 | 5 | 2 | 45 | Formula (2-1) | | 71 | Good | 969 |
| Example 1A-99 | Zirconium silicate | | 40 | 2 | 40 | 2 | 10 | 2 | 30 | 5 | 2 | 45 | Formula (2-1) | | 71 | Good | 969 |
| Example 1A-100 | Aluminum silicate | | 40 | 2 | 40 | 2 | 10 | 2 | 30 | 5 | 2 | 45 | Formula (2-1) | | 71 | Good | 969 |
| Example 1A-101 | Magnesium silicate | | 40 | 2 | 40 | 2 | 10 | 2 | 30 | 5 | 2 | 45 | Formula (2-1) | | 71 | Good | 969 |
| Example 1A-102 | Spinel | | 40 | 2 | 40 | 2 | 10 | 2 | 30 | 5 | 2 | 45 | Formula (2-1) | | 71 | Good | 969 |
| Example 1A-103 | Hydrotalcite | | 40 | 2 | 40 | 2 | 10 | 2 | 30 | 5 | 2 | 45 | Formula (2-1) | | 81 | Excellent | 988 |
| Example 1A-104 | Dolomite | | 40 | 2 | 40 | 2 | 10 | 2 | 30 | 5 | 2 | 45 | Formula (2-1) | | 81 | Excellent | 988 |
| Example 1A-105 | Kaofinite | | 40 | 2 | 40 | 2 | 10 | 2 | 30 | 5 | 2 | 45 | Formula (2-1) | | 81 | Excellent | 988 |
| Example 1A-106 | Sepiolite | | 40 | 2 | 40 | 2 | 10 | 2 | 30 | 5 | 2 | 45 | Formula (2-1) | | 81 | Excellent | 988 |
| Example 1A-107 | Imogolite | | 40 | 2 | 40 | 2 | 10 | 2 | 30 | 5 | 2 | 45 | Formula (2-1) | | 81 | Excellent | 988 |

TABLE 7-continued

| | Solid particles | | Solid particles concentration Negative electrode Recess | | Solid particle concentration Positive electrode Recess | | Thickness of region Negative electrode side Recess | | | Thickness of region Positive electode side Recess | | | Additive compound | | Battery evaluation | | |
|---|---|---|---|---|---|---|---|---|---|---|---|---|---|---|---|---|---|
| | Material type | Amount added [mass %] | impreg-nation region [volume %] | Deep region [volume %] | impreg-nation region [volume %] | Deep region [volume %] | impreg-nation region [μm] | Top coat region [μm] | Deep region [μm] | impreg-nation region [μm] | Top coat region [μm] | Deep region [μm] | Material type | Amount added [mass %] | Capacity retention rate [%] | Deter-mination | Battery capac-ity [mAh] |
| Example 1A-108 | Sericite | | 40 | 2 | 40 | 2 | 10 | 2 | 30 | 5 | 2 | 45 | Formula (2-1) | | 81 | Excellent | 988 |
| Example 1A-109 | Pyrophyllite | | 40 | 2 | 40 | 2 | 10 | 2 | 30 | 5 | 2 | 45 | Formula (2-1) | | 81 | Excellent | 988 |
| Example 1A-110 | Mica | | 40 | 2 | 40 | 2 | 10 | 2 | 30 | 5 | 2 | 45 | Formula (2-1) | | 81 | Excellent | 988 |
| Example 1A-111 | Zeolite | | 40 | 2 | 40 | 2 | 10 | 2 | 30 | 5 | 2 | 45 | Formula (2-1) | | 81 | Excellent | 988 |
| Example 1A-112 | Mullite | | 40 | 2 | 40 | 2 | 10 | 2 | 30 | 5 | 2 | 45 | Formula (2-1) | | 81 | Excellent | 988 |
| Example 1A-113 | Saponite | | 40 | 2 | 40 | 2 | 10 | 2 | 30 | 5 | 2 | 45 | Formula (2-1) | | 81 | Excellent | 988 |
| Example 1A-114 | Attapulgite | | 40 | 2 | 40 | 2 | 10 | 2 | 30 | 5 | 2 | 45 | Formula (2-1) | | 81 | Excellent | 988 |
| Example 1A-115 | Montmonillnite | | 40 | 2 | 40 | 2 | 10 | 2 | 30 | 5 | 2 | 45 | Formula (2-1) | | 81 | Excellent | 988 |
| Example 1A-116 | Ammonium polyphosphate | | 40 | 2 | 40 | 2 | 10 | 2 | 30 | 5 | 2 | 45 | Formula (2-1) | | 71 | Good | 969 |
| Example 1A-117 | Melamine cyanurate | | 40 | 2 | 40 | 2 | 10 | 2 | 30 | 5 | 2 | 45 | Formula (2-1) | | 71 | Good | 969 |
| Example 1A-118 | Melamine polyphosphate | | 40 | 2 | 40 | 2 | 10 | 2 | 30 | 5 | 2 | 45 | Formula (2-1) | | 71 | Good | 969 |
| Example 1A-119 | Polyolefin bead | | 40 | 2 | 40 | 2 | 10 | 2 | 30 | 5 | 2 | 45 | Formula (2-1) | | 62 | Satisfactory | 950 |
| Example 1A-120 | Boehmite | 7 | 30 | 2 | 40 | 2 | 16 | 2 | 24 | 5 | 2 | 45 | Formula (2-1) | 1 | 71 | Good | 969 |
| Example 1A-121 | Boehmite | 18 | 80 | 3 | 40 | 2 | 10 | 2 | 30 | 5 | 2 | 45 | Formula (2-1) | 1 | 86 | Excellent | 998 |
| Example 1A-122 | Boehmite | 20 | 90 | 3 | 40 | 2 | 10 | 2 | 30 | 5 | 2 | 45 | Formula (2-1) | 1 | 71 | Good | 969 |
| Example 1A-123 | Boehmite | 10 | 40 | 2 | 40 | 2 | 4 | 2 | 36 | 5 | 2 | 45 | Formula (2-1) | 1 | 71 | Good | 969 |
| Example 1A-124 | Boehmite | 10 | 30 | 3 | 40 | 2 | 10 | 2 | 30 | 5 | 2 | 45 | Formula (2-1) | 1 | 71 | Good | 988 |
| Comparative Example 1A-8 | Not disposed | — | — | — | — | — | — | — | — | — | — | — | Formula (2-1) | 1 | 29 | Fail | 950 |

TABLE 7-continued

| | Solid particles | | Solid particles concentration Negative electrode | | Solid particle concentration Positive electrode | | Thickness of region Negative electrode side | | | Thickness of region Positive electode side | | | Additive compound | | Battery evaluation | | |
|---|---|---|---|---|---|---|---|---|---|---|---|---|---|---|---|---|---|
| | Material type | Amount added [mass %] | Recess impreg-nation region [volume %] | Deep region [volume %] | Recess impreg-nation region [volume %] | Deep region [volume %] | Recess impreg-nation region [μm] | Top coat region [μm] | Deep region [μm] | Recess impreg-nation region [μm] | Top coat region [μm] | Deep region [μm] | Material type | Amount added [mass %] | Capacity retention rate [%] | Deter-mination | Battery capac-ity [mAh] |
| Comparative Example 1A-9 | Boehmite (disposed only a surface of a separator) | 10 | 3 | 0 | 3 | 0 | 0 | 20 | 40 | 0 | 20 | 50 | Formula (2-1) | | 29 | Fail | 950 |
| Comparative Example 1A-10 | Boehmite | 10 | 10 | 10 | 10 | 10 | Indistingui-shable | 2 | Indistingui-shable | Indistingui-shable | 2 | Indistingui-shable | Formula (2-1) | 1 | 10 | Fail | 950 |
| Comparative Example 1A-11 | Boehmite | 10 | 18 | 2 | 40 | 2 | 3 | 20 | 37 | 5 | 2 | 45 | Formula (1-1) | 1 | 55 | Fail | 760 |

As shown in Table 7, in Example 1A-1 to Example 1A-124, since solid particles were disposed at an appropriate concentration in an appropriate region inside the battery, a cycle characteristic of high output discharge was outstanding. In addition, the battery capacity was also sufficient.

Example 2A-1

In the same manner as in Example 1A-1, a laminated film-type battery was fabricated.

Example 2A-2 to Example 2A-56

In Example 2A-2 to Example 2A-56, laminated film-type batteries were fabricated in the same manner as in Example 2A-1 except that compounds shown in the following Table 8 were added as an unsaturated cyclic carbonate ester in place of the compound represented by Formula (1-1) when an electrolyte layer was formed.

Example 2A-57

In the same manner as in Example 1A-63, a laminated film-type battery was fabricated.

Example 2A-58 to Example 2A-77

In Example 2A-58 to Example 2A-77, laminated film-type batteries were fabricated in the same manner as in Example 2A-57 except that compounds shown in the following Table 8 were added as a halogenated carbonate ester in place of the compound represented by Formula (2-1) when an electrolyte layer was formed.

(Battery Evaluation: A High Output Cycle Test and Measurement of a Battery Capacity)

In the same manner as in Example 1A-1, a high output cycle test and measurement of a battery capacity were performed on the fabricated laminated film-type batteries according to the examples.

The evaluation results are shown in Table 8.

TABLE 8

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 2A-1 | Boehmite | 10 | Formula (1-1) | 1 | 90 | Excellent | 1050 |
| Example 2A-2 | | | Formula (1-2) | | 85 | Excellent | 1040 |
| Example 2A-3 | | | Formula (1-3) | | 85 | Excellent | 1040 |
| Example 2A-4 | | | Formula (1-4) | | 75 | Good | 1020 |
| Example 2A-5 | | | Formula (1-5) | | 75 | Good | 1020 |
| Example 2A-6 | | | Formula (1-6) | | 75 | Good | 1020 |
| Example 2A-7 | | | Formula (1-7) | | 75 | Good | 1020 |
| Example 2A-8 | | | Formula (1-8) | | 75 | Good | 1020 |
| Example 2A-9 | | | Formula (1-9) | | 75 | Good | 1020 |
| Example 2A-10 | | | Formula (1-10) | | 75 | Good | 1020 |
| Example 2A-11 | | | Formula (1-11) | | 65 | Satisfactory | 1000 |
| Example 2A-12 | | | Formula (1-12) | | 65 | Satisfactory | 1000 |
| Example 2A-13 | | | Formula (1-13) | | 65 | Satisfactory | 1000 |
| Example 2A-14 | | | Formula (1-14) | | 65 | Satisfactory | 1000 |
| Example 2A-15 | | | Formula (1-15) | | 65 | Satisfactory | 1000 |
| Example 2A-16 | | | Formula (1-16) | | 65 | Satisfactory | 1000 |
| Example 2A-17 | | | Formula (1-17) | | 65 | Satisfactory | 1000 |
| Example 2A-18 | | | Formula (1-18) | | 65 | Satisfactory | 1000 |
| Example 2A-19 | | | Formula (1-19) | | 65 | Satisfactory | 1000 |
| Example 2A-20 | | | Formula (1-20) | | 65 | Satisfactory | 1000 |
| Example 2A-21 | | | Formula (1-21) | | 65 | Satisfactory | 1000 |
| Example 2A-22 | | | Formula (1-22) | | 65 | Satisfactory | 1000 |
| Example 2A-23 | | | Formula (1-23) | | 65 | Satisfactory | 1000 |
| Example 2A-24 | | | Formula (1-24) | | 65 | Satisfactory | 1000 |
| Example 2A-25 | | | Formula (1-25) | | 65 | Satisfactory | 1000 |
| Example 2A-26 | | | Formula (1-26) | | 65 | Satisfactory | 1000 |
| Example 2A-27 | | | Formula (1-27) | | 65 | Satisfactory | 1000 |
| Example 2A-28 | | | Formula (1-28) | | 65 | Satisfactory | 1000 |
| Example 2A-29 | | | Formula (1-29) | | 65 | Satisfactory | 1000 |
| Example 2A-30 | | | Formula (1-30) | | 65 | Satisfactory | 1000 |
| Example 2A-31 | | | Formula (1-31) | | 85 | Excellent | 1040 |
| Example 2A-32 | | | Formula (1-32) | | 85 | Excellent | 1040 |
| Example 2A-33 | | | Formula (1-33) | | 85 | Excellent | 1040 |
| Example 2A-34 | | | Formula (1-34) | | 85 | Excellent | 1040 |
| Example 2A-35 | | | Formula (1-35) | | 75 | Good | 1020 |
| Example 2A-36 | | | Formula (1-36) | | 75 | Good | 1020 |
| Example 2A-37 | | | Formula (1-37) | | 75 | Good | 1020 |
| Example 2A-38 | | | Formula (1-38) | | 75 | Good | 1020 |
| Example 2A-39 | | | Formula (1-39) | | 75 | Good | 1020 |
| Example 2A-40 | Boehmite | 10 | Formula (1-40) | 1 | 75 | Good | 1020 |
| Example 2A-41 | | | Formula (1-41) | | 65 | Satisfactory | 1000 |
| Example 2A-42 | | | Formula (1-42) | | 65 | Satisfactory | 1000 |
| Example 2A-43 | | | Formula (1-43) | | 65 | Satisfactory | 1000 |
| Example 2A-44 | | | Formula (1-44) | | 65 | Satisfactory | 1000 |
| Example 2A-45 | | | Formula (1-45) | | 65 | Satisfactory | 1000 |
| Example 2A-46 | | | Formula (1-46) | | 65 | Satisfactory | 1000 |
| Example 2A-47 | | | Formula (1-47) | | 65 | Satisfactory | 1000 |
| Example 2A-48 | | | Formula (1-48) | | 65 | Satisfactory | 1000 |
| Example 2A-49 | | | Formula (1-49) | | 65 | Satisfactory | 1000 |

TABLE 8-continued

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 2A-50 | | | Formula (1-50) | | 65 | Satisfactory | 1000 |
| Example 2A-51 | | | Formula (1-51) | | 65 | Satisfactory | 1000 |
| Example 2A-52 | | | Formula (1-52) | | 65 | Satisfactory | 1000 |
| Example 2A-53 | | | Formula (1-53) | | 85 | Excellent | 1040 |
| Example 2A-54 | | | Formula (1-54) | | 85 | Excellent | 1040 |
| Example 2A-55 | | | Formula (1-55) | | 85 | Excellent | 1040 |
| Example 2A-56 | | | Formula (1-56) | | 85 | Excellent | 1040 |
| Example 2A-57 | Boehmite | 10 | Formula (2-1) | 1 | 86 | Excellent | 998 |
| Example 2A-58 | | | Formula (2-2) | | 74 | Good | 1000 |
| Example 2A-59 | | | Formula (2-3) | | 83 | Excellent | 1019 |
| Example 2A-60 | | | Formula (2-4) | | 83 | Excellent | 1019 |
| Example 2A-61 | | | Formula (2-5) | | 74 | Good | 1000 |
| Example 2A-62 | | | Formula (2-6) | | 74 | Good | 1000 |
| Example 2A-63 | | | Formula (2-7) | | 74 | Good | 1000 |
| Example 2A-64 | | | Formula (2-8) | | 83 | Excellent | 1019 |
| Example 2A-65 | | | Formula (2-9) | | 83 | Excellent | 1019 |
| Example 2A-66 | | | Formula (2-10) | | 74 | Good | 1000 |
| Example 2A-67 | | | Formula (2-11) | | 74 | Good | 1000 |
| Example 2A-68 | | | Formula (2-12) | | 74 | Good | 1000 |
| Example 2A-69 | | | Formula (2-13) | | 74 | Good | 1000 |
| Example 2A-70 | | | Formula (2-14) | | 64 | Satisfactory | 980 |
| Example 2A-71 | | | Formula (2-15) | | 64 | Satisfactory | 980 |
| Example 2A-72 | | | Formula (2-16) | | 64 | Satisfactory | 980 |
| Example 2A-73 | | | Formula (2-17) | | 64 | Satisfactory | 980 |
| Example 2A-74 | | | Formula (2-18) | | 64 | Satisfactory | 980 |
| Example 2A-75 | | | Formula (2-19) | | 64 | Satisfactory | 980 |
| Example 2A-76 | | | Formula (2-20) | | 64 | Satisfactory | 980 |
| Example 2A-77 | | | Formula (2-21) | | 64 | Satisfactory | 980 |

As shown in Table 8, in Example 2A-1 to Example 2A-77, since solid particles were disposed at an appropriate concentration in an appropriate region inside the battery, a cycle characteristic of high output discharge was outstanding. In addition, the battery capacity was also sufficient.

Example 3A-1 to Example 3A-9

In Example 3A-1 to Example 3A-9, laminated film-type batteries were fabricated in the same manner as in Example 1A-1 except that an amount of the compounds represented by Formula (1-1) added was changed as shown in the following Table 9.

Example 3A-10 to Example 3A-18

In Example 3A-10 to Example 3A-18, laminated film-type batteries were fabricated in the same manner as in Example 1A-63 except that an amount of the compounds represented by Formula (2-1) added was changed as shown in the following Table 9.

(Battery Evaluation: A High Output Cycle Test and Measurement of a Battery Capacity)

In the same manner as in Example 1A-1, a high output cycle test and measurement of a battery capacity were performed on the fabricated laminated film-type batteries according to the examples.

The evaluation results are shown in Table 9.

TABLE 9

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 3A-1 | Boehmite | 10 | Formula (1-1) | 0.01 | 65 | Satisfactory | 1000 |
| Example 3A-2 | | | | 0.02 | 75 | Good | 1020 |
| Example 3A-3 | | | | 0.03 | 80 | Excellent | 1040 |
| Example 3A-4 | | | | 1 | 90 | Excellent | 1050 |
| Example 3A-5 | | | | 2 | 90 | Excellent | 1040 |
| Example 3A-6 | | | | 5 | 85 | Excellent | 1040 |
| Example 3A-7 | | | | 8 | 80 | Excellent | 1040 |
| Example 3A-8 | | | | 9 | 75 | Good | 1020 |
| Example 3A-9 | | | | 10 | 65 | Satisfactory | 1000 |
| Example 3A-10 | Boehmite | 10 | Formula (2-1) | 0.01 | 62 | Satisfactory | 950 |
| Example 3A-11 | | | | 0.02 | 71 | Good | 969 |
| Example 3A-12 | | | | 0.03 | 76 | Excellent | 988 |
| Example 3A-13 | | | | 1 | 86 | Excellent | 998 |
| Example 3A-14 | | | | 5 | 86 | Excellent | 988 |
| Example 3A-15 | | | | 10 | 81 | Excellent | 988 |

TABLE 9-continued

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 3A-16 | | | | 15 | 76 | Good | 988 |
| Example 3A-17 | | | | 25 | 71 | Good | 969 |
| Example 3A-18 | | | | 50 | 62 | Satisfactory | 950 |

As shown in Table 9, in Example 3A-1 to Example 3A-18, since solid particles were disposed at an appropriate concentration in an appropriate region inside the battery, a cycle characteristic of high output discharge was outstanding.

Example 4A-1 to Example 4A-11

In Example 4A-1 to Example 4A-11, laminated film-type batteries were fabricated in the same manner as in Example 1 A-1 except that a particle size and a specific surface area of boehmite particles serving as solid particles were changed as shown in the following Table 10.

Example 4A-12 to Example 4A-22

In Example 4A-12 to Example 4A-22, laminated film-type batteries were fabricated in the same manner as in Example 1A-63 except that a particle size and a specific surface area of boehmite particles serving as solid particles were changed as shown in the following Table 10.

(Battery Evaluation: A High Output Cycle Test and Measurement of a Battery Capacity)

In the same manner as in Example 1A-1, a high output cycle test and measurement of a battery capacity were performed on the fabricated laminated film-type batteries according to the examples.

The evaluation results are shown in Table 10.

As shown in Table 10, in Example 4A-1 to Example 4A-22, since solid particles were disposed at an appropriate concentration in an appropriate region inside the battery, a cycle characteristic of high output discharge was outstanding. In addition, the battery capacity was also sufficient.

Example 5A-1

In the same manner as in Example 1A-1, a laminated film-type battery was fabricated.

Example 5A-2

First, in the same manner as in Example 5A-1, a cathode and an anode were fabricated, and a separator was prepared.

Next, in the same manner as in Example 1A-1, the same coating solution as in Example 1A-1 was applied to both surfaces of the separator, a dilution solvent (DMC) was removed by drying, and a gel-like electrolyte layer was formed on the surfaces of the separator.

Then, the cathode, the anode, and the separator having both surfaces on which the gel-like electrolyte layer was formed were laminated in the order of the cathode, the separator, the anode, and the separator, and then wound in a flat shape multiple times in a longitudinal direction. Then, a winding end portion was fixed by an adhesive tape to form a wound electrode body.

TABLE 10

| | Solid particles | | | | Additive component | | Battery evaluation | | |
|---|---|---|---|---|---|---|---|---|---|
| | Material type | Particle size [μm] | BET specfic surface area [$m^2$/g] | Amount added [mass %] | Material type | Amount added [mass %] | Capacity retention rate [%] | Determination | Battery capacity [mAh] |
| Example 4A-1 | Boehmite | 1 | 6 | 10 | Formula (1-1) | 1 | 90 | Excellent | 1050 |
| Example 4A-2 | | 0.1 | 60 | | | | 65 | Satisfactory | 1000 |
| Example 4A-3 | | 0.2 | 40 | | | | 75 | Good | 1020 |
| Example 4A-4 | | 0.3 | 20 | | | | 80 | Excellent | 1040 |
| Example 4A-5 | | 0.5 | 15 | | | | 85 | Excellent | 1040 |
| Example 4A-6 | | 0.7 | 12 | | | | 90 | Excellent | 1040 |
| Example 4A-7 | | 2 | 3 | | | | 90 | Excellent | 1040 |
| Example 4A-8 | | 3 | 2 | | | | 85 | Excellent | 1040 |
| Example 4A-9 | | 5 | 1.5 | | | | 80 | Excellent | 1040 |
| Example 4A-10 | | 7 | 1.2 | | | | 75 | Good | 1020 |
| Example 4A-11 | | 10 | 1 | | | | 65 | Satisfactory | 1000 |
| Example 4A-12 | Boehmite | 1 | 6 | 10 | Formula (2-1) | 1 | 86 | Excellent | 998 |
| Example 4A-13 | | 0.1 | 60 | | | | 62 | Satisfactory | 950 |
| Example 4A-14 | | 0.2 | 40 | | | | 71 | Good | 969 |
| Example 4A-15 | | 0.3 | 20 | | | | 76 | Excellent | 988 |
| Example 4A-16 | | 0.5 | 15 | | | | 81 | Excellent | 988 |
| Example 4A-17 | | 0.7 | 12 | | | | 35 | Excellent | 988 |
| Example 4A-18 | | 2 | 3 | | | | 86 | Excellent | 988 |
| Example 4A-19 | | 3 | 2 | | | | 81 | Excellent | 988 |
| Example 4A-20 | | 5 | 1.5 | | | | 76 | Excellent | 988 |
| Example 4A-21 | | 7 | 1.2 | | | | 71 | Good | 969 |
| Example 4A-22 | | 10 | 1 | | | | 62 | Satisfactory | 950 |

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 5A-3

First, in the same manner as in Example 5A-1, a cathode and an anode were fabricated, and a separator was prepared.

(Formation of a Solid Particle Layer)

Next, paint prepared by mixing solid particles at 22 mass %, PVdF at 3 mass serving as a binder polymer compound, and NMP at 75 mass % serving as a solvent was applied to both surfaces of the separator and the solvent was then removed by drying. Accordingly, a solid particle layer was formed such that a solid component became 0.5 mg/cm$^2$ per one surface.

Next, the cathode, the anode, and the separator having both surfaces on which the solid particle layer was formed were laminated in the order of the cathode, the separator, the anode, and the separator, and then wound in a flat shape multiple times in a longitudinal direction. Then, a winding end portion was fixed by an adhesive tape to form a wound body.

Next, the packed wound body was put into heated oil and subjected to isostatic pressing. Accordingly, the solid particles were pushed to the recess between adjacent cathode active material particles positioned on the outermost surface of the cathode active material layer and the recess between adjacent anode active material particles positioned on the outermost surface of the anode active material layer.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 5A-4

In the same manner as in Example 5A-1, a cathode and an anode were fabricated and a separator was prepared.

A coating solution was applied to both surfaces of the separator, and then dried to form a matrix resin layer as follows.

First, boehmite particles, and polyvinylidene fluoride (PVdF) serving as a matrix polymer compound were dispersed in N-methyl-2-pyrrolidone (NMP) to prepare the coating solution. In this case, a content of the boehmite particles was 10 mass % with respect to a total amount of paint, a content of the PVdF was 10 mass % with respect to a total amount of paint, and a content of the NMP was 80 mass % with respect to a total amount of paint.

Next, the coating solution was applied to both surfaces of the separator and then passed through a dryer to remove the NMP. Accordingly, the separator on which a matrix resin layer was formed was obtained.

[Assembly of the Laminated Film-Type Battery]

Next, the cathode, the anode and the separator having both surfaces on which the matrix resin layer was formed were laminated in the order of the cathode, the separator, the anode, and the separator, and wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess of the outermost surface of the cathode active material layer and the recess of the outermost surface of the anode active material layer.

Next, the wound electrode body was inserted into the package member, and three sides were subjected to thermal fusion bonding. Note that, in the package member, a laminated film having a soft aluminum layer was used.

Then, an electrolyte solution was injected thereinto and the remaining one side was subjected to thermal fusion bonding under reduced pressure and sealed. In this case, the electrolyte solution was impregnated into a particle-comprising resin layer, and the matrix polymer compound was swollen to form gel-like electrolytes (a gel electrolyte layer). Note that, the same electrolyte solution as in Example 1A-1 was used. Thus, the laminated film-type battery shown in FIG. 1 with a battery shape of 4.5 mm in thickness, 30 mm in width, and 50 mm in height was fabricated.

Example 5A-5

First, in the same manner as in Example 5A-1, a cathode and an anode were fabricated, and a separator was prepared.

(Formation of a Solid Particle Layer)

Paint prepared by mixing solid particles at 22 mass %, PVdF at 3 mass % serving as a binder polymer compound, and NMP at 75 mass % serving as a solvent was applied to both surfaces of each of the cathode and the anode and then the surfaces were scraped. Accordingly, the solid particles were put into the recess impregnation region A of each of the cathode side and the anode side, and the thickness of the recess impregnation region A was set to be twice the thickness of the top coat region B or more. Then, the NMP was removed by drying and a solid particle layer was formed such that a solid component became 0.5 mg/cm$^2$ per one surface.

Next, the cathode and the anode each having both surfaces on which the solid particle layer was formed and the separator were laminated in the order of the cathode, the separator, the anode, and the separator, and then wound in a flat shape multiple times in a longitudinal direction. Then, a winding end portion was fixed by an adhesive tape to form a wound body.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 5A-6

A laminated film-type battery was fabricated in the same manner as in Example 5A-1 except that a gel-like electrolyte layer was formed only on both surfaces of the anode.

Example 5A-7 to Example 5A-8, Example 5A-10, Example 5A-12, and Example 5A-14 to Example 5A-15

In Example 5A-7 to Example 5A-8, Example 5A-10, Example 5A-12, and Example 5A-14 to Example 5A-15, laminated film-type batteries were fabricated in the same manner as in Example 5A-1 to Example 5A-6 except that the compound represented by Formula (2-1) was added in place of the compound represented by Formula (1-1) when an electrolyte layer was formed.

Example 5A-9, Example 5A-11, and Example 5A-13

In Example 5A-9, Example 5A-1 and Example 5A-13, laminated film-type batteries were fabricated in the same manner as in Example 5A-7 to Example 5A-8, Example 5A-10, Example 5A-12, and Example 5A-14 to Example 5A-15 except that a nonwoven fabric was used in place of the separator (the polyethylene separator).

Example 5A-1

A laminated film-type battery was fabricated in the same manner as in Example 5A-1 except that a gel-like electrolyte layer was formed only on both surfaces of the cathode.

Example 5A-2

A laminated film-type battery was fabricated in the same manner as in Example 5A-7 except that a gel-like electrolyte layer was formed only on both surfaces of the cathode.

(Battery Evaluation: A High Output Cycle Test and Measurement of a Battery Capacity)

In the same manner as in Example 1A-1, a high output cycle test and measurement of a battery capacity were performed on the fabricated laminated film-type batteries according to the examples.

The evaluation results are shown in Table 11.

TABLE 11

| | Solid particle | | Additive component | | Overview of method of disposing solid particles | | | Battery evaluation | | |
|---|---|---|---|---|---|---|---|---|---|---|
| | Material type | Amount added [mass %] | Material type | Amount added [mass %] | Results formed through coating | Coating target | *Remarks | Capacity retention rate [%] | Determination | Battery capacity [mAh] |
| Example 5A-1 | Boehmite | 10 | Formula (1-1) | 1 | Gel electrolytes containing solid particles | Positive electrode and negative electrode | Gel electrolytes are heated and applied and some of the applied gel electrolytes are scraped off | 90 | Excellent | 1050 |
| Example 5A-2 | | | | | Gel electrolytes containing solid particles | Polyethylene separator | Heating and pressing process (isostatic pressing) is provided | 65 | Satisfactory | 1000 |
| Example 5A-3 | | | | | Solid particle layer | Polyethylene separator | Heating and pressing process (isostatic pressing) is provided | 75 | Good | 1020 |
| Example 5A-4 | | | | | Matrix resin layer | Polyethylene separator | Heating and pressing process (isostatic pressing) is provided | 75 | Good | 1020 |
| Example 5A-5 | | | | | Solid particle layer | Positive electrode and negative electrode | After application, a solid particle layer is partially scraped off | 75 | Good | 1020 |
| Example 5A-6 | | | | | Gel electrolytes containing solid particles | Negative electrode | Gel electrolytes are heated and applied and some of the applied gel electrolytes are scraped off | 75 | Good | 1020 |
| Comparative Example 5A-1 | Boehmite | 10 | Formula (1-1) | 1 | Gel electrolytes containing solid particles | Positive electrode | Gel electrolytes are heated and applied and some of the applied gel electrolytes are scraped off | 50 | Fail | 1000 |
| Example 5A-7 | Boehmite | 10 | Formula (2-1) | 1 | Gel electrolytes containing solid particles | Positive electrode and negative electrode | Gel electrolytes are heated and applied and some of the applied gel electrolytes are scraped off | 86 | Excellent | 998 |
| Example 5A-8 | | | | | Gel electrolytes containing solid particles | Polyethylene separator | Heating and pressing process (isostatic pressing) is provided | 62 | Satisfactory | 950 |

TABLE 11-continued

| | Solid particle | | Additive component | | Overview of method of disposing solid particles | | | Battery evaluation | | |
|---|---|---|---|---|---|---|---|---|---|---|
| | Material type | Amount added [mass %] | Material type | Amount added [mass %] | Results formed through coating | Coating target | *Remarks | Capacity retention rate [%] | Deter-mination | Battery capacity [mAh] |
| Example 5A-9 | | | | | Gel electrolytes containing solid particles | Nonwoven fabric | Heating and pressing process (isostatic pressing) is provided | 71 | Satisfactory | 969 |
| Example 5A-10 | | | | | Solid particle layer | Polyethylene separater | Heating and pressing process (isostatic pressing) is provided | 71 | Good | 969 |
| Example 5A-11 | | | | | Solid particle layer | Nonwoven fabric | After application, a solid particle layer is partially scraped off | 71 | Good | 969 |
| Example 5A-12 | | | | | Matrix resin layer | Polyethylene separator | Gel electrolytes are heated and applied and some of the applied gel electrolytes are scraped off | 71 | Good | 969 |
| Example 5A-13 | | | | | Matrix resin layer | Nonwoven fabric | Gel electrolytes are heated and applied and some of the applied gel electrolytes are scraped off | 71 | Good | 969 |
| Example 5A-14 | | | | | Solid particle layer | Positive electrode and negative electrode | After application, a solid particle layer is partially scraped off | 71 | Good | 969 |
| Example 5A-15 | | | | | Gel electrolytes containing solid particles | Negative electrode | Gel electrolytes are heated and applied and some of the applied gel electrolytes are scraped off | 71 | Good | 969 |
| Comparative Example 5A-2 | Boehmite | 10 | Formula (2-1) | 1 | Gel electrolytes containing solid particles | Positive electrode | Gel electrolytes are heated and applied and some of the applied gel electrolytes are scraped off | 48 | Fail | 950 |

As shown in Table 11, in Example 5A-1 to Example 5A-16, since solid particles were disposed at an appropriate concentration in an appropriate region inside the battery, a cycle characteristic of high output discharge was outstanding. In addition, the battery capacity was also sufficient.

Example 6A-1

Next, a rectangular cathode, a rectangular anode, and a rectangular separator whose configurations were the same as those in Example 1A-1 were fabricated except for their rectangular shapes.

(Formation of a Solid Particle Layer)

Next, in the same manner as in Example 5A-3, a solid particle layer was formed on both surfaces of the separator.

(Formation of a Stacked Electrode Body)

Next, the cathode, the separator, the anode, and the separator were sequentially laminated to form a stacked electrode body.

Next, the packed stacked electrode body was put into heated oil and subjected to isostatic pressing. Accordingly, the solid particles were pushed to the recess between adjacent cathode active material particles positioned on the outermost surface of the cathode active material layer and the recess between adjacent anode active material particles positioned on the outermost surface of the anode active material layer.

Next, the stacked electrode body was packaged with a laminated film having a soft aluminum layer, three sides around the stacked electrode body were sealed up and closed tight by thermal fusion bonding. Then, the same electrolyte solution as in Example 1A-1 was injected thereinto and the remaining one side was sealed by thermal fusion bonding under reduced pressure. Accordingly, the laminated film-type battery shown in FIG. 4A to FIG. 4C with a battery shape of 4.5 mm in thickness, 30 mm in width, and 50 mm in height was fabricated.

Example 6A-2

In the same manner as in Example 6A-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

Next, a cathode terminal was combined with a safety valve with which a battery lid was combined, and an anode terminal was connected to an anode can. The stacked electrode body was inserted between a pair of insulating plates and accommodated inside a battery can.

Next, the non-aqueous electrolyte solution was injected into the cylindrical battery can from the top of the insulating plate. Finally, at an opening of the battery can, a battery lid was caulked and closed tight through an insulation sealing gasket. Accordingly, a cylindrical battery with a battery shape of 18 mm in diameter and 65 mm in height (ICR18650 size) was fabricated.

Example 6A-3

In the same manner as in Example 6A-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

[Assembly of the Rectangular Battery]

Next, the stacked electrode body was housed in a rectangular battery can. Subsequently, an electrode pin provided at a battery lid and a cathode terminal led out from the stacked electrode body were connected. Then, the battery can was sealed by the battery lid, the non-aqueous electrolyte solution was injected through an electrolyte solution inlet, and sealed up and closed tight by a sealing member. Accordingly, the rectangular battery with a battery shape of 4.5 mm in thickness, 30 mm in width and 50 mm in height (453050 size) was fabricated.

Example 6A-4

In Example 6A-4, the same laminated film-type battery as in Example 1-1 was used to fabricate a simple battery pack (a soft pack) shown in FIG. 8 and FIG. 9.

Example 6A-5 to Example 6A-8

In Example 6A-5 to Example 6A-8, laminated film-type batteries were fabricated in the same manner as in Example 6A-1 to Example 6A-4 except that the compound represented by Formula (2-1) was added in place of the compound represented by Formula (1-1) when an electrolyte layer was formed.

(Battery Evaluation: High Output Cycle Test)

In the same manner as in Example 1A-1, a high output cycle test was performed on the fabricated laminated film-type batteries according to the examples.

The evaluation results are shown in Table 12.

TABLE 12

| | Solid particles | | Additive component | | | Battery evaluation | | |
|---|---|---|---|---|---|---|---|---|
| | Material type | Amount added [mass %] | Material type | Amount added [mass %] | Battery form | Capacity retention rate [%] | Determination | Battery capacity [mAh] |
| Example 6A-1 | Boehmite | 10 | Formula (1-1) | 1 | Stacked laminated film-type battery | 90 | Excellent | 1050 |
| Example 6A-2 | | | Formula (1-1) | | Cylindrical battery in which a stacked electrode body is housed in a cylindrical can | 90 | Excellent | 2600 |
| Example 6A-3 | | | Formula (1-1) | | Rectangular battery in which a stacked electrode body is house is a rectangular can | 90 | Excellent | 1050 |
| Example 6A-4 | | | Formula (1-1) | | Battery pack of a liminated film-type battery | 90 | Excellent | 1050 |
| Example 6A-5 | Boehmite | 10 | Formula (2-1) | 1 | Stacked laminated film-type battery | 85.5 | Excellent | 997.5 |
| Example 6A-6 | | | Formula (2-1) | | Cylindrical battery in which a stacked electrode body is housed in a cylindrical can | 85.5 | Excellent | 2470 |
| Example 6A-7 | | | Formula (2-1) | | Rectangular battery in which a stacked electrode body is housed in a rectangular can | 85.5 | Excellent | 997.5 |
| Example 6A-8 | | | Formula (2-1) | | Battery pack of a liminated film-type battery | 85.5 | Excellent | 997.5 |

As shown in Table 12, in Example 6A-1 to Example 6A-8, since solid particles were disposed at an appropriate concentration in an appropriate region inside the battery, a cycle characteristic of high output discharge was outstanding. In addition, the battery capacity was also sufficient.

In the above-described examples and comparative examples (Table 7 to Table 12), even when a halogenated chain carbonate ester such as fluoromethyl methyl carbonate, bis(fluoromethyl) carbonate or difluoromethyl methyl carbonate was used as an additive component, the same result tends to be obtained.

Example 1B-1

[Fabrication of a Cathode]

91 mass % of lithium cobaltate ($LiCoO_2$) particles (particle size D50: 10 μm), which is the cathode active material, 6 mass % of carbon black, which is an electrically conductive agent, and 3 mass % of polyvinylidene difluoride (PVdF), which is a binder, were mixed together to prepare a cathode mixture, and the cathode mixture was dispersed in N-methyl-2-pyrrolidone (NMP), which is a dispersion medium, to prepare a cathode mixture slurry.

The cathode mixture slurry was applied to both surfaces of a cathode current collector formed of a band-like piece of aluminum foil with a thickness of 12 μm in such a manner that part of the cathode current collector was exposed. After that, the dispersion medium of the applied cathode mixture slurry was evaporated to dryness, and compression molding was performed by roll pressing; thereby, a cathode active material layer was formed. Finally, a cathode terminal was attached to the exposed portion of the cathode current collector; thus, a cathode was formed. Note that an area density of the cathode active material layer was adjusted to 30 mg/cm$^2$.

[Fabrication of an Anode]

96 mass % of granular graphite particle (particle size D50: 20 μm), which is the anode active material, 1.5 mass % of an acrylic acid-modified product of a styrene-butadiene copolymer as a binder, and 1.5 mass % of carboxymethyl cellulose as a thickener were mixed together to prepare an anode mixture, and an appropriate amount of water was added and stirring was performed to prepare an anode mixture slurry.

The anode mixture slurry was applied to both surfaces of an anode current collector formed of a band-like piece of copper foil with a thickness of 15 μm in such a manner that part of the anode current collector was exposed. After that, the dispersion medium of the applied anode mixture slurry was evaporated to dryness, and compression molding was performed by roll pressing; thereby, an anode active material layer was formed. Finally, an anode terminal was attached to the exposed portion of the cathode current collector, thus, an anode was formed. Note that an area density of the anode active material layer was adjusted to 15 mg/cm$^2$.

[Fabrication of a Separator]

As the separator, a polyethylene (PE) microporous film (a polyethylene separator) having a thickness of 5 μm was prepared.

[Formation of an Electrolyte Layer]

In a non-aqueous solvent in which ethylene carbonate (EC) and diethyl carbonate (DEC) were mixed, lithium hexafluorophosphate ($LiPF_6$) serving as an electrolyte salt was dissolved, the compound represented by Formula (4A-2) was added as sulfonyl compounds, and accordingly the non-aqueous electrolyte solution was prepared. Note that a composition of the non-aqueous electrolyte solution had a mass ratio that was adjusted to EC/DEC/the compound represented by Formula (4A-2)/$LiPF_6$=20/69/1/10. A content of the compound represented by Formula (4A-2) in the non-aqueous electrolyte solution was 1 mass % based on a percentage by mass with respect to a total amount of the non-aqueous electrolyte solution.

Next, polyvinylidene fluoride (PVdF) was used as a matrix polymer compound (a resin) that retains the non-aqueous electrolyte solution. The non-aqueous electrolyte solution, the polyvinylidene fluoride, dimethyl carbonate (DMC) serving as a dilution solvent, and boehmite particles (particle size D50: 1 μm) serving as solid particles were mixed to prepare a sol-like coating solution. Note that a composition of the coating solution includes the solid particles at 10 mass %, the resin at 5 mass %, the non-aqueous electrolyte solution at 35 mass %, and the dilution solvent at 50 mass %, based on a percentage by mass with respect to a total amount of the coating solution.

Next, the coating solution was heated and applied to both surfaces of each of the cathode and the anode, the dilution solvent (DMC) was removed by drying, and a gel-like electrolyte layer having an area density of 3 mg/cm$^2$ per one surface was formed on the surfaces of the cathode and the anode. When the coating solution was heated and applied, electrolytes comprising boehmite particles serving as solid particles could be impregnated into the recess between adjacent active material particles positioned on the outermost surface of the anode active material layer or an inside of the active material layer. In this case, when the solid particles were filtered in the recess between adjacent particles, a concentration of the particles in the recess impregnation region A of the anode side increased. Accordingly, it is possible to set a difference of concentrations of particles between the recess impregnation region A and the deep region C. By partially scraping off the coating solution, the thickness of the recess impregnation region A and the top coat region B was adjusted as shown in Table 13, more solid particles were sent to the recess impregnation region A, and the solid particles remained in the recess impregnation region A. Note that some solid particles having a particle size of $2/\sqrt{3}-1$ times a particle size D50 of anode active materials or more were added, and a particle size D95 of solid particles was prepared to be $2/\sqrt{3}-1$ times a particle size D50 of anode active material particles or more (3.5 μm), which were used as the solid particles. Accordingly, an interval between particles at a bottom of the recess was filled with some solid particles having a large particle size and the solid particles could be easily filtered.

[Assembly of the Laminated Film-Type Battery]

The cathode and the anode each having both surfaces on which the electrolyte layer was formed and the separator were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1B-2to Example 1B-57

In Example 1B-2 to Example 1B-57, laminated film-type batteries were fabricated in the same manner as in Example 1B-1 except that particles to be used were changed as shown in the following Table 13.

Example 1B-58

In Example 1B-58, a laminated film-type battery was fabricated in the same manner as in Example 1B-1 except that, when a coating solution to be applied to an anode was prepared, a content of solid particles decreased to 7 mass %, and an amount of DMC for decrementing the solid particles increased.

Example 1B-59

In Example 1B-59, a laminated film-type battery was fabricated in the same manner as in Example 1B-1 except that, when a coating solution to be applied to an anode was prepared, a content of solid particles increased to 18 mass % and an amount of DMC for incrementing solid particles decreased.

Example 1B-60

In Example 1B-60, a laminated film-type battery was fabricated in the same manner as in Example 1B-1 except that, when a coating solution to be applied to an anode was prepared, a content of solid particles increased to 20 mass %, an amount of DMC for incrementing solid particles decreased.

Example 1B-61

In Example 1B-61, a laminated film-type battery was fabricated in the same manner as in Example 1B-1 except that, when a gel electrolyte layer was formed on an anode, a coating solution was slightly scraped off.

Example 1B-62

In Example 1B-62, a laminated film-type battery was fabricated in the same manner as in Example 1B-1 except that some solid particles having a particle size of $2/\sqrt{3}-1$ or more times a particle size D50 of anode active materials were added, and a particle size D95 of solid particles was prepared to be $2/\sqrt{3}-1$ or more times a particle size D50 of anode active material particles (3.1 μm), which were used as the solid particles.

Comparative Example 1B-1

A laminated film-type battery was fabricated in the same manner as in Example 1B-1 except that no compound represented by Formula (4A-2) was added to the non-aqueous electrolyte solution.

Comparative Example 1B-2

A laminated film-type battery was fabricated in the same manner as in Example 1B-1 except that vinyl ethylene carbonate (VEC) was added to the non-aqueous electrolyte solution in place of the compound represented by Formula (4A-2).

Comparative Example 1B-3

A laminated film-type battery was fabricated in the same manner as in Example 1B-1 except that no boehmite particles were added to a coating solution.

Comparative Example 1B-4

A laminated film-type battery was fabricated in the same manner as in Example 1B-1 except that a gel-like electrolyte layer was formed on both principal surfaces of a separator in place of formation of a gel-like electrolyte layer on an electrode. Note that, in this example, since most of the solid particles comprised in the electrolyte layer formed on the surfaces of the separator do not enter the recess between adjacent active material particles positioned on the outermost surface of the active material layer, a concentration of solid particles of the recess impregnation region A decreased.

Comparative Example 1B-5

A laminated film-type battery was fabricated in the same manner as in Example 1B-1 except that no boehmite particles were added to a coating solution, and no compound represented by Formula (4A-2) was added to the non-aqueous electrolyte solution.

Comparative Example 1B-6

In Comparative Example 1B-6, a laminated film-type battery was fabricated in the same manner as in Example 1B-1 except that, without adding some solid particles having a particle size of $2/\sqrt{3}-1$ or more times a particle size D50 of anode active materials, solid particles having a particle size D95 that was prepared to be $2/\sqrt{3}-1$ or less times a particle size D50 of the anode active material particles (2.0 μm) were used as the solid particles.

Comparative Example 1B-7

In Comparative Example 1B-7, a laminated film-type battery was fabricated in the same manner as in Example 1B-1 except that, when a gel electrolyte layer was formed on an anode, the coating solution was not scraped, and in this case, since a distance between electrodes increased, the electrode was adjusted by winding it to become shorter in the length direction without changing the outer diameter.

(Measurement of a Particle Size of Particles and Measurement of a BET Specific Surface Area)

In the above-described examples and comparative examples, a particle size of particles and a BET specific surface area were measured or evaluated as follows (the same in the following examples)

(Measurement of a Particle Size)

In a particle size distribution in which solid particles after electrolyte components and the like were removed from the electrolyte layer were measured by a laser diffraction method, a particle size at which 50% of particles having a smaller particle size were cumulated (a cumulative volume of 50%) was set as a particle size D50 of particles. Note that, as necessary, a value of a particle size D95 at a cumulative volume of 95% was also obtained from the measured particle size distribution. Similarly, in active material particles, particles in which components other than active materials were removed from the active material layer were measured in the same manner.

(Measurement of a BET Specific Surface Area)

In solid particles after electrolyte components and the like were removed from the electrolyte layer, a BET specific surface area was obtained using a BET specific surface area measurement device.

(Measurement of a Concentration of Solid Particles, and the Recess Impregnation Region A, the Top Coat Region B, and the Deep Region C)

Observation was performed in four observation fields of view with a visual field width of 50 μm using an SEM. In each of the observation fields of view, the thickness of the recess impregnation region A, the top coat region B, and the deep region C and a concentration of particles of the regions were measured. In an observation field of view of 2 μm×2 μm in the regions, an area percentage ((“total area of particle cross section”÷“area of observation field of view”)×100%) of a total area of a particle cross section was obtained and therefore the concentration of the particles was obtained.

(Battery Evaluation: A Rapid Charge Capacity Test and Measurement of a Battery Capacity)

The following rapid charge capacity test was performed on the fabricated batteries. At 23° C., a charge voltage of 4.2 V and a current of 1 A, a constant current and constant voltage charge was performed before the total charge time of 5 hours had elapsed, and then a constant current discharge was performed to 3.0 V at a constant current of 0.5 A. A discharge capacity at that time was set as an initial capacity of the battery. In addition, this capacity was used as the battery capacity.

Then, a constant current and constant voltage charge was performed on the discharged battery for 15 minutes at 23° C., a charge voltage of 4.2 V, and a current of 5 A, and a rapid charge capacity was measured. Then, [rapid charge capacity/initial discharge capacity]×100(%) was obtained as a capacity retention rate.

According to a level of the capacity retention rate, determination was performed as follows.

Fail: less than 60%
Satisfactory: 60% or more and less than 70%
Good: 70% or more and less than 80%
Excellent: 80% or more and 100% or less The evaluation results are shown in Table 13.

TABLE 13

| | Solid particles | | Solid particles concentration Negative electrode | | Solid particle concentration Positive electrode | | Thickness of region Negative electrode side | | | Thickness of region Positive electode side | | | Additive compound | | Battery evaluation | | |
|---|---|---|---|---|---|---|---|---|---|---|---|---|---|---|---|---|---|
| | | | Recess | | Recess | | Recess | | | Recess | | | | | | | |
| | Material type | Amount added [mass %] | impreg-nation region [volume %] | Deep region [volume %] | impreg-nation region [volume %] | Deep region [volume %] | impreg-nation region [μm] | Top coat region [μm] | Deep region [μm] | impreg-nation region [μm] | Top coat region [μm] | Deep region [μm] | Material type | Amount added [mass %] | Capacity retention rate [%] | Deter-mination | Battery capac-ity [mAh] |
| Example 1B-1 | Boehmite | 10 | 40 | 2 | 40 | 2 | 10 | 2 | 30 | 5 | 2 | 45 | Function (4A-2) | 1 | 90 | Excellent | 1050 |
| Example 1B-2 | Talc | | 40 | 2 | 40 | 2 | 10 | 2 | 30 | 5 | 2 | 45 | Function (4A-2) | | 90 | Excellent | 1050 |
| Example 1B-3 | Zinc oxide | | 40 | 2 | 40 | 2 | 10 | 2 | 30 | 5 | 2 | 45 | Function (4A-2) | | 65 | Satisfactory | 1000 |
| Example 1B-4 | Tin oxide | | 40 | 2 | 40 | 2 | 10 | 2 | 30 | 5 | 2 | 45 | Function (4A-2) | | 65 | Satisfactory | 1000 |
| Example 1B-5 | Silicon oxide | | 40 | 2 | 40 | 2 | 10 | 2 | 30 | 5 | 2 | 45 | Function (4A-2) | | 65 | Satisfactory | 1000 |
| Example 1B-6 | Magnesium oxide | | 40 | 2 | 40 | 2 | 10 | 2 | 30 | 5 | 2 | 45 | Function (4A-2) | | 65 | Satisfactory | 1000 |
| Example 1B-7 | Antimony oxide | | 40 | 2 | 40 | 2 | 10 | 2 | 30 | 5 | 2 | 45 | Function (4A-2) | | 65 | Satisfactory | 1000 |
| Example 1B-8 | Aluminum oxide | | 40 | 2 | 40 | 2 | 10 | 2 | 30 | 5 | 2 | 45 | Function (4A-2) | | 75 | Good | 1020 |
| Example 1B-9 | Magnesium sulfate | | 40 | 2 | 40 | 2 | 10 | 2 | 30 | 5 | 2 | 45 | Function (4A-2) | | 65 | Satisfactory | 1000 |
| Example 1B-10 | Calsium sulfate | | 40 | 2 | 40 | 2 | 10 | 2 | 30 | 5 | 2 | 45 | Function (4A-2) | | 65 | Satisfactory | 1000 |
| Example 1B-11 | Barium sulfate | | 40 | 2 | 40 | 2 | 10 | 2 | 30 | 5 | 2 | 45 | Function (4A-2) | | 65 | Satisfactory | 1000 |
| Example 1B-12 | Strontium sulfate | | 40 | 2 | 40 | 2 | 10 | 2 | 30 | 5 | 2 | 45 | Function (4A-2) | | 65 | Satisfactory | 1000 |
| Example 1B-13 | Magnesium carbonate | | 40 | 2 | 40 | 2 | 10 | 2 | 30 | 5 | 2 | 45 | Function (4A-2) | | 65 | Satisfactory | 1000 |
| Example 1B-14 | Calcium carbonate | | 40 | 2 | 40 | 2 | 10 | 2 | 30 | 5 | 2 | 45 | Function (4A-2) | | 65 | Satisfactory | 1000 |
| Example 1B-15 | Barium carbonate | | 40 | 2 | 40 | 2 | 10 | 2 | 30 | 5 | 2 | 45 | Function (4A-2) | | 65 | Satisfactory | 1000 |
| Example 1B-16 | Lithium carbonate | | 40 | 2 | 40 | 2 | 10 | 2 | 30 | 5 | 2 | 45 | Function (4A-2) | | 65 | Satisfactory | 1000 |
| Example 1B-17 | Magnesium hydroxide | | 40 | 2 | 40 | 2 | 10 | 2 | 30 | 5 | 2 | 45 | Function (4A-2) | | 90 | Excellent | 1050 |
| Example 1B-18 | Aluminum hydroxide | | 40 | 2 | 40 | 2 | 10 | 2 | 30 | 5 | 2 | 45 | Function (4A-2) | | 90 | Excellent | 1050 |
| Example 1B-19 | Zinc hydroxide | | 40 | 2 | 40 | 2 | 10 | 2 | 30 | 5 | 2 | 45 | Function (4A-2) | | 85 | Excellent | 1040 |

TABLE 13-continued

| | Solid particles | | Solid particles concentration Negative electrode Recess | | Solid particle concentration Positive electrode Recess | | Thickness of region Negative electrode side Recess | | | Thickness of region Positive electode side Recess | | | Additive compound | | Battery evaluation | | |
|---|---|---|---|---|---|---|---|---|---|---|---|---|---|---|---|---|---|
| | Material type | Amount added [mass %] | impreg-nation region [volume %] | Deep region [volume %] | impreg-nation region [volume %] | Deep region [volume %] | impreg-nation region [μm] | Top coat region [μm] | Deep region [μm] | impreg-nation region [μm] | Top coat region [μm] | Deep region [μm] | Material type | Amount added [mass %] | Capacity retention rate [%] | Deter-mination | Battery capac-ity [mAh] |
| Example 1B-20 | Boron cabide | | 40 | 2 | 40 | 2 | 10 | 2 | 30 | 5 | 2 | 45 | Function (4A-2) | | 75 | Good | 1020 |
| Example 1B-21 | Silicon carbide | | 40 | 2 | 40 | 2 | 10 | 2 | 30 | 5 | 2 | 45 | Function (4A-2) | | 85 | Excellent | 1040 |
| Example 1B-22 | Silicon nitride | | 40 | 2 | 40 | 2 | 10 | 2 | 30 | 5 | 2 | 45 | Function (4A-2) | | 75 | Good | 1020 |
| Example 1B-23 | Boron nitride | | 40 | 2 | 40 | 2 | 10 | 2 | 30 | 5 | 2 | 45 | Function (4A-2) | | 85 | Excellent | 1040 |
| Example 1B-24 | Aluminum nitride | | 40 | 2 | 40 | 2 | 10 | 2 | 30 | 5 | 2 | 45 | Function (4A-2) | | 85 | Excellent | 1040 |
| Example 1B-25 | Titanium nitride | | 40 | 2 | 40 | 2 | 10 | 2 | 30 | 5 | 2 | 45 | Function (4A-2) | | 75 | Good | 1020 |
| Example 1B-26 | Lithium fluoride | | 40 | 2 | 40 | 2 | 10 | 2 | 30 | 5 | 2 | 45 | Function (4A-2) | | 75 | Good | 1020 |
| Example 1B-27 | Aluminum fluoride | | 40 | 2 | 40 | 2 | 10 | 2 | 30 | 5 | 2 | 45 | Function (4A-2) | | 75 | Good | 1020 |
| Example 1B-28 | Calcium flouride | | 40 | 2 | 40 | 2 | 10 | 2 | 30 | 5 | 2 | 45 | Function (4A-2) | | 75 | Good | 1020 |
| Example 1B-29 | Barium flouride | | 40 | 2 | 40 | 2 | 10 | 2 | 30 | 5 | 2 | 45 | Function (4A-2) | | 75 | Good | 1020 |
| Example 1B-30 | Magnesium fluoride | 10 | 40 | 2 | 40 | 2 | 10 | 2 | 30 | 5 | 2 | 45 | Function (4A-2) | 1 | 75 | Good | 1020 |
| Example 1B-31 | Diamond | | 40 | 2 | 40 | 2 | 10 | 2 | 30 | 5 | 2 | 45 | Function (4A-2) | | 85 | Excellent | 1040 |
| Example 1B-32 | Trilithium phosphate | | 40 | 2 | 40 | 2 | 10 | 2 | 30 | 5 | 2 | 45 | Function (4A-2) | | 75 | Good | 1020 |
| Example 1B-33 | Magnesium phosphate | | 40 | 2 | 40 | 2 | 10 | 2 | 30 | 5 | 2 | 45 | Function (4A-2) | | 75 | Good | 1020 |
| Example 1B-34 | Magnesium hydrogen phosphate | | 40 | 2 | 40 | 2 | 10 | 2 | 30 | 5 | 2 | 45 | Function (4A-2) | | 75 | Good | 1020 |
| Example 1B-35 | Calcium silicate | | 40 | 2 | 40 | 2 | 10 | 2 | 30 | 5 | 2 | 45 | Function (4A-2) | | 75 | Good | 1020 |
| Example 1B-36 | Zirc silicate | | 40 | 2 | 40 | 2 | 10 | 2 | 30 | 5 | 2 | 45 | Function (4A-2) | | 75 | Good | 1020 |
| Example 1B-37 | Zirconium silicate | | 40 | 2 | 40 | 2 | 10 | 2 | 30 | 5 | 2 | 45 | Function (4A-2) | | 75 | Good | 1020 |
| Example 1B 38 | Aluminum silicate | | 40 | 2 | 40 | 2 | 10 | 2 | 30 | 5 | 2 | 45 | Function (4A-2) | | 75 | Good | 1020 |
| Example 1B-39 | Magnesium silicate | | 40 | 2 | 40 | 2 | 10 | 2 | 30 | 5 | 2 | 45 | Function (4A-2) | | 75 | Good | 1020 |

TABLE 13-continued

| | Solid particles | | Solid particles concentration, Negative electrode, Recess | | Solid particle concentration, Positive electrode, Recess | | Thickness of region, Negative electrode side, Recess | | | Thickness of region, Positive electode side, Recess | | | Additive compound | | Battery evaluation | | |
|---|---|---|---|---|---|---|---|---|---|---|---|---|---|---|---|---|---|
| | Material type | Amount added [mass %] | impreg-nation region [volume %] | Deep region [volume %] | impreg-nation region [volume %] | Deep region [volume %] | impreg-nation region [µm] | Top coat region [µm] | Deep region [µm] | impreg-nation region [µm] | Top coat region [µm] | Deep region [µm] | Material type | Amount added [mass %] | Capacity retention rate [%] | Deter-mination | Battery capac-ity [mAh] |
| Example 1B-40 | Spinel | | 40 | 2 | 40 | 2 | 10 | 2 | 30 | 5 | 2 | 45 | Function (4A-2) | | 75 | Good | 1020 |
| Example 1B-41 | Hydrotalcite | | 40 | 2 | 40 | 2 | 10 | 2 | 30 | 5 | 2 | 45 | Function (4A-2) | | 85 | Excellent | 1040 |
| Example 1B-42 | Dolomite | | 40 | 2 | 40 | 2 | 10 | 2 | 30 | 5 | 2 | 45 | Function (4A-2) | | 85 | Excellent | 1040 |
| Example 1B-43 | Kaofinite | | 40 | 2 | 40 | 2 | 10 | 2 | 30 | 5 | 2 | 45 | Function (4A-2) | | 85 | Excellent | 1040 |
| Example 1B-44 | Sepiolite | | 40 | 2 | 40 | 2 | 10 | 2 | 30 | 5 | 2 | 45 | Function (4A-2) | | 85 | Excellent | 1040 |
| Example 1B-45 | Imogolite | | 40 | 2 | 40 | 2 | 10 | 2 | 30 | 5 | 2 | 45 | Function (4A-2) | | 85 | Excellent | 1040 |
| Example 1B-46 | Sericite | | 40 | 2 | 40 | 2 | 10 | 2 | 30 | 5 | 2 | 45 | Function (4A-2) | | 85 | Excellent | 1040 |
| Example 1B-47 | Pyrophyllite | | 40 | 2 | 40 | 2 | 10 | 2 | 30 | 5 | 2 | 45 | Function (4A-2) | | 85 | Excellent | 1040 |
| Example 1B-48 | Mica | | 40 | 2 | 40 | 2 | 10 | 2 | 30 | 5 | 2 | 45 | Function (4A-2) | | 85 | Excellent | 1040 |
| Example 1B-49 | Zeolite | | 40 | 2 | 40 | 2 | 10 | 2 | 30 | 5 | 2 | 45 | Function (4A-2) | | 85 | Excellent | 1040 |
| Example 1B-50 | Mullite | | 40 | 2 | 40 | 2 | 10 | 2 | 30 | 5 | 2 | 45 | Function (4A-2) | | 85 | Excellent | 1040 |
| Example 1B-51 | Saponite | | 40 | 2 | 40 | 2 | 10 | 2 | 30 | 5 | 2 | 45 | Function (4A-2) | | 85 | Excellent | 1040 |
| Example 1B-52 | Attapulgite | | 40 | 2 | 40 | 2 | 10 | 2 | 30 | 5 | 2 | 45 | Function (4A-2) | | 85 | Excellent | 1040 |
| Example 1B-53 | Montmonillnite | | 40 | 2 | 40 | 2 | 10 | 2 | 30 | 5 | 2 | 45 | Function (4A-2) | | 85 | Excellent | 1040 |
| Example 1B-54 | Ammonium polyphosphate | | 40 | 2 | 40 | 2 | 10 | 2 | 30 | 5 | 2 | 45 | Function (4A-2) | | 75 | Good | 1020 |
| Example 1B-55 | Melamine cyanurate | | 40 | 2 | 40 | 2 | 10 | 2 | 30 | 5 | 2 | 45 | Function (4A-2) | | 75 | Good | 1020 |
| Example 1B-56 | Melamine polyphosphate | | 40 | 2 | 40 | 2 | 10 | 2 | 30 | 5 | 2 | 45 | Function (4A-2) | | 75 | Good | 1020 |
| Example 1B-57 | Polyolefin bead | | 40 | 2 | 40 | 2 | 10 | 2 | 30 | 5 | 2 | 45 | Function (4A-2) | | 65 | Satisfactory | 1020 |
| Example 1B-58 | Boehmite | 7 | 30 | 2 | 40 | 2 | 16 | 2 | 24 | 5 | 2 | 42 | Function (4A-2) | | 75 | Good | 1020 |
| Example 1B-59 | Boehmite | 18 | 80 | 3 | 40 | 2 | 10 | 2 | 30 | 5 | 2 | 45 | Function (4A-2) | 1 | 90 | Excellent | 1050 |

TABLE 13-continued

| | Solid particles | | Solid particles concentration Negative electrode | | Solid particle concentration Positive electrode | | Thickness of region Negative electrode side | | | Thickness of region Positive electrode side | | | Additive compound | | Battery evaluation | | |
|---|---|---|---|---|---|---|---|---|---|---|---|---|---|---|---|---|---|
| | Material type | Amount added [mass %] | Recess impreg-nation region [volume %] | Deep region [volume %] | Recess impreg-nation region [volume %] | Deep region [volume %] | Recess impreg-nation region [μm] | Top coat region [μm] | Deep region [μm] | Recess impreg-nation region [μm] | Top coat region [μm] | Deep region [μm] | Material type | Amount added [mass %] | Capacity retention rate [%] | Deter-mination | Battery capac-ity [mAh] |
| Example 1B-60 | Boehmite | 20 | 90 | 3 | 40 | 2 | 10 | 2 | 30 | 5 | 2 | 45 | Function (4A-2) | 1 | 75 | Good | 1020 |
| Example 1B-61 | Boehmite | 10 | 40 | 2 | 40 | 2 | 4 | 2 | 36 | 5 | 2 | 45 | Function (4A-2) | 1 | 75 | Good | 1020 |
| Example 1B-62 | Boehmite | 10 | 30 | 3 | 40 | 2 | 10 | 2 | 30 | 5 | 2 | 45 | Function (4A-2) | 1 | 75 | Good | 1020 |
| Comparative Example 1B-1 | Boehmite | 10 | 40 | 2 | 40 | 2 | 10 | 2 | 30 | 5 | 2 | 45 | Additive-free | 1 | 10 | Fail | 800 |
| Comparative Example 1B-2 | Boehmite | | 40 | 2 | 40 | 2 | 10 | 2 | 30 | 5 | 2 | 45 | VEC | 1 | 20 | Fail | 1000 |
| Comparative Example 1B-3 | Not disposed | — | — | — | — | — | — | — | — | — | — | — | Function (4A-2) | — | 30 | Fail | 1000 |
| Comparative Example 1B-4 | Boehmite (disposed only a surface of a separator) | 10 | 3 | 0 | 3 | 0 | 0 | 20 | 40 | 0 | 20 | 50 | Function (4A-2) | 1 | 30 | Fail | 1000 |
| Comparative Example 1B-5 | Not disposed | — | — | — | — | — | — | — | — | — | — | — | Additive-free | — | 10 | Fail | 800 |
| Comparative Example 1B-6 | Boehmite | 10 | 10 | 10 | 10 | 10 | Indistingui-shable | 2 | Indistingui-shable | Indistingui-shable | 2 | Indistingui-shable | Function (4A-2) | 1 | 10 | Fail | 1000 |
| Comparative Example 1B-7 | Boehmite | 10 | 18 | 2 | 40 | 2 | 3 | 20 | 37 | 5 | 2 | 45 | Function (4A-2) | 1 | 55 | Fail | 800 |

As shown in Table 13, in Example 1B-1 to Example 62, since solid particles were disposed at an appropriate concentration in an appropriate region inside the battery, a rapid charge characteristic was outstanding. In addition, the battery capacity was also sufficient.

Example 2B-1

In the same manner as in Example 1B-1, a laminated film-type battery was fabricated.

Example 2B-2 to Example 2B-79

In Example 2B-2 to Example 2B-79, laminated film-type batteries were fabricated in the same manner as in Example 2B-1 except that compounds shown in the following Table 14 were added as sulfinyl or sulfonyl compounds in place of the compound represented by Formula (4A-2) when an electrolyte layer was formed.

(Battery Evaluation: A Rapid Charge Capacity Test and Measurement of a Battery Capacity)

In the same manner as in Example 1B-1, a rapid charge capacity test and measurement of a battery capacity were performed on the fabricated laminated film-type batteries according to the examples.

The evaluation results are shown in Table 14.

TABLE 14

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 2B-1 | Boehmite | 10 | Formula (1A-1) | 1 | 90 | Excellent | 1000 |
| Example 2B-2 | | | Formula (1A-2) | | 65 | Satisfactory | 1000 |
| Example 2B-3 | | | Formula (1A-3) | | 65 | Satisfactory | 1000 |
| Example 2B-4 | | | Formula (1A-4) | | 65 | Satisfactory | 1000 |
| Example 2B-5 | | | Formula (1A-5) | | 65 | Satisfactory | 1000 |
| Example 2B-6 | | | Formula (1A-6) | | 65 | Satisfactory | 1000 |
| Example 2B-7 | | | Formula (1A-7) | | 65 | Satisfactory | 1000 |
| Example 2B-8 | | | Formula (1A-8) | | 65 | Satisfactory | 1000 |
| Example 2B-9 | | | Formula (1A-9) | | 65 | Satisfactory | 1000 |
| Example 2B-10 | | | Formula (1A-10) | | 65 | Satisfactory | 1000 |
| Example 2B-11 | | | Formula (2A-1) | | 90 | Excellent | 1000 |
| Example 2B-12 | | | Formula (2A-2) | | 80 | Excellent | 1000 |
| Example 2B-13 | | | Formula (2A-3) | | 80 | Excellent | 1000 |
| Example 2B-14 | | | Formula (2A-4) | | 90 | Excellent | 1000 |
| Example 2B-15 | | | Formula (2A-5) | | 80 | Excellent | 1000 |
| Example 2B-16 | | | Formula (2A-6) | | 80 | Excellent | 1000 |
| Example 2B-17 | | | Formula (3A-1) | | 65 | Satisfactory | 1000 |
| Example 2B-18 | | | Formula (3A-2) | | 65 | Satisfactory | 1000 |
| Example 2B-19 | | | Formula (3A-3) | | 65 | Satisfactory | 1000 |
| Example 2B-20 | | | Formula (3A-4) | | 65 | Satisfactory | 1000 |
| Example 2B-21 | | | Formula (3A-5) | | 65 | Satisfactory | 1000 |
| Example 2B-22 | | | Formula (4A-1) | | 85 | Excellent | 1000 |
| Example 2B-23 | | | Formula (4A-2) | | 90 | Excellent | 1000 |
| Example 2B-24 | | | Formula (4A-3) | | 85 | Excellent | 1000 |
| Example 2B-25 | | | Formula (4A-4) | | 85 | Excellent | 1000 |
| Example 2B-26 | | | Formula (4A-5) | | 85 | Excellent | 1000 |
| Example 2B-27 | | | Formula (4A-6) | | 85 | Excellent | 1000 |
| Example 2B-28 | | | Formula (4A-7) | | 85 | Excellent | 1000 |
| Example 2B-29 | | | Formula (4A-8) | | 85 | Excellent | 1000 |
| Example 2B-30 | | | Formula (4A-9) | | 85 | Excellent | 1000 |
| Example 2B-31 | | | Formula (4A-10) | | 85 | Excellent | 1000 |
| Example 2B-32 | | | Formula (4A-11) | | 85 | Excellent | 1000 |
| Example 2B-33 | | | Formula (4A-12) | | 85 | Excellent | 1000 |
| Example 2B-34 | | | Formula (4A-13) | | 75 | Good | 1000 |
| Example 2B-35 | | | Formula (4A-14) | | 75 | Good | 1000 |
| Example 2B-36 | | | Formula (4A-15) | | 75 | Good | 1000 |
| Example 2B-37 | | | Formula (4A-16) | | 75 | Good | 1000 |
| Example 2B-38 | | | Formula (4A-17) | | 75 | Good | 1000 |
| Example 2B-39 | | | Formula (5A-1) | | 75 | Good | 1000 |
| Example 2B-40 | | | Formula (5A-2) | | 90 | Excellent | 1000 |
| Example 2B-41 | | | Formula (5A-3) | | 75 | Good | 1000 |
| Example 2B-42 | | | Formula (5A-4) | | 75 | Good | 1000 |
| Example 2B-43 | | | Formula (5A-5) | | 75 | Good | 1000 |
| Example 2B-44 | | | Formula (5A-6) | | 75 | Good | 1000 |
| Example 2B-45 | | | Formula (5A-7) | | 75 | Good | 1000 |
| Example 2B-46 | | | Formula (5A-8) | | 75 | Good | 1000 |
| Example 2B-47 | | | Formula (5A-9) | | 75 | Good | 1000 |
| Example 2B-48 | | | Formula (5A-10) | | 75 | Good | 1000 |
| Example 2B-49 | | | Formula (5A-11) | | 75 | Good | 1000 |
| Example 2B-50 | | | Formula (5A-12) | | 75 | Good | 1000 |
| Example 2B-51 | Boehmite | 10 | Formula (5A-13) | 1 | 65 | Satisfactory | 1000 |
| Example 2B-52 | | | Formula (5A-14) | | 65 | Satisfactory | 1000 |
| Example 2B-53 | | | Formula (5A-15) | | 65 | Satisfactory | 1000 |
| Example 2B-54 | | | Formula (5A-16) | | 65 | Satisfactory | 1000 |
| Example 2B-55 | | | Formula (5A-17) | | 65 | Satisfactory | 1000 |

TABLE 14-continued

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 2B-56 | | | Formula (5A-18) | | 65 | Satisfactory | 1000 |
| Example 2B-57 | | | Formula (6A-1) | | 75 | Good | 1000 |
| Example 2B-58 | | | Formula (6A-2) | | 75 | Good | 1000 |
| Example 2B-59 | | | Formula (6A-3) | | 75 | Good | 1000 |
| Example 2B-60 | | | Formula (6A-4) | | 75 | Good | 1000 |
| Example 2B-61 | | | Formula (6A-5) | | 75 | Good | 1000 |
| Example 2B-62 | | | Formula (6A-6) | | 90 | Excellent | 1000 |
| Example 2B-63 | | | Formula (6A-7) | | 75 | Good | 1000 |
| Example 2B-64 | | | Formula (6A-8) | | 75 | Good | 1000 |
| Example 2B-65 | | | Formula (6A-9) | | 75 | Good | 1000 |
| Example 2B-66 | | | Formula (7A-1) | | 75 | Good | 1000 |
| Example 2B-67 | | | Formula (7A-2) | | 90 | Excellent | 1000 |
| Example 2B-68 | | | Formula (7A-3) | | 75 | Good | 1000 |
| Example 2B-69 | | | Formula (7A-4) | | 75 | Good | 1000 |
| Example 2B-70 | | | Formula (7A-5) | | 75 | Good | 1000 |
| Example 2B-71 | | | Formula (7A-6) | | 75 | Good | 1000 |
| Example 2B-72 | | | Formula (7A-7) | | 75 | Good | 1000 |
| Example 2B-73 | | | Formula (7A-8) | | 75 | Good | 1000 |
| Example 2B-74 | | | Formula (7A-9) | | 75 | Good | 1000 |
| Example 2B-75 | | | Formula (7A-10) | | 75 | Good | 1000 |
| Example 2B-76 | | | Formula (7A-11) | | 65 | Satisfactory | 1000 |
| Example 2B-77 | | | Formula (7A-12) | | 65 | Satisfactory | 1000 |
| Example 2B-78 | | | Formula (7A-13) | | 65 | Satisfactory | 1000 |
| Example 2B-79 | | | Formula (7A-14) | | 65 | Satisfactory | 1000 |

As shown in Table 14, in Example 2B-1 to Example 2B-79, since solid particles were disposed at an appropriate concentration in an appropriate region inside the battery, a rapid charge characteristic was outstanding. In addition, the battery capacity was also sufficient.

Example 3B-1 to Example 3B-9

In Example 3B-1 to Example 3B-9, laminated film-type batteries were fabricated in the same manner as in Example 1B-1 except that an amount of the compounds represented by Formula (4A-2) added was changed as shown in the following Table 15.

(Battery Evaluation: A Rapid Charge Capacity Test and Measurement of a Battery Capacity)

In the same manner as in Example 1B-1, a rapid charge capacity test and measurement of a battery capacity were performed on the fabricated laminated film-type batteries according to the examples.

The evaluation results are shown in Table 15.

TABLE 15

| | Solid particles | | Additive component | | Battery evaluation | | |
|---|---|---|---|---|---|---|---|
| | Material type | Amount added [mass %] | Material type | Amount added [mass %] | Capacity retention rate [%] | Determination | Battery capacity [mAh] |
| Example 3B-1 | Boehmite | 10 | Formula (4A-2) | 0.01 | 65 | Satisfactory | 1000 |
| Example 3B-2 | | | | 0.02 | 75 | Good | 1000 |
| Example 3B-3 | | | | 0.03 | 80 | Excellent | 1000 |
| Example 3B-4 | | | | 1 | 90 | Excellent | 1000 |
| Example 3B-5 | | | | 2 | 90 | Excellent | 1000 |
| Example 3B-6 | | | | 5 | 85 | Excellent | 1000 |
| Example 3B-7 | | | | 8 | 80 | Excellent | 1000 |
| Example 3B-8 | | | | 9 | 75 | Good | 1000 |
| Example 3B-9 | | | | 10 | 65 | Satisfactory | 1000 |

As shown in Table 15, in Example 3B-1 to Example 3B-9, since solid particles were disposed at an appropriate concentration in an appropriate region inside the battery, a rapid charge characteristic was outstanding.

Example 4B-1 to Example 4B-11

In Example 4B-1 to Example 4B-11, laminated film-type batteries were fabricated in the same manner as in Example 1B-1 except that a particle size and a specific surface area of boehmite particles serving as solid particles were changed as shown in the following Table 16.

(Battery Evaluation: A Rapid Charge Capacity Test and Measurement of a Battery Capacity)

In the same manner as in Example 1B-1, a rapid charge capacity test and measurement of a battery capacity were performed on the fabricated laminated film-type batteries according to the examples.

The evaluation results are shown in Table 16.

TABLE 16

| | Solid particles | | | | Cyclic alkylene carbonate | | Battery evaluation | | |
|---|---|---|---|---|---|---|---|---|---|
| | Material type | Particle size D50 [μm] | BET specific surface area [$m^2$/g] | Amount added [mass %] | Material type | Amount added [mass %] | Capacity retention rate [%] | Determination | Battery capacity [mAh] |
| Example 4B-1 | Boehmite | 1 | 6 | 10 | Function (4A-2) | 1 | 90 | Excellent | 1000 |
| Example 4B-2 | | 0.1 | 60 | | | | 65 | Satisfactory | 1000 |
| Example 4B-3 | | 0.2 | 40 | | | | 75 | Good | 1000 |
| Example 4B-4 | | 0.3 | 20 | | | | 80 | Excellent | 1000 |
| Example 4B-5 | | 0.5 | 15 | | | | 85 | Excellent | 1000 |
| Example 4B-6 | | 0.7 | 12 | | | | 90 | Excellent | 1000 |
| Example 4B-7 | | 2 | 3 | | | | 90 | Excellent | 1000 |
| Example 4B-8 | | 3 | 2 | | | | 85 | Excellent | 1000 |
| Example 4B-9 | | 5 | 1.5 | | | | 80 | Excellent | 1000 |
| Example 4B-10 | | 7 | 1.2 | | | | 75 | Good | 1000 |
| Example 4B-11 | | 10 | 1 | | | | 65 | Satisfactory | 1000 |

As shown in Table 16, in Example 4B-1 to Example 4B-11, since solid particles were disposed at an appropriate concentration in an appropriate region inside the battery, a rapid charge characteristic was outstanding. In addition, the battery capacity was also sufficient.

Example 5B-1

In the same manner as in Example 1B-1, a laminated film-type battery was fabricated.

Example 5B-2

First, in the same manner as in Example 5B-1, a cathode and an anode were fabricated, and a separator was prepared.

Next, in the same manner as in Example 1B-1, the same coating solution as in Example 1B-1 was applied to both surfaces of the separator, a dilution solvent was removed by drying, and a gel-like electrolyte layer was formed on the surfaces of the separator.

Then, the cathode, the anode, and the separator having both surfaces on which the gel-like electrolyte layer was formed were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Example 5B-3

First, in the same manner as in Example 5B-1, a cathode and an anode were fabricated, and a separator was prepared.

(Formation of a Solid Particle Layer)

Next, paint prepared by mixing solid particles at 22 mass %, PVdF at 3 mass % serving as a binder polymer compound, and NMP at 75 mass % serving as a solvent was applied to both surfaces of the separator and the solvent was then removed by drying. Accordingly, a solid particle layer was formed such that a solid component became 0.5 mg/$cm^2$ per one surface.

Next, the cathode, the anode, and the separator having both surfaces on which the solid particle layer was formed were laminated in the order of the cathode, the separator, the anode, and the separator, and then wound in a flat shape multiple times in a longitudinal direction. Then, a winding end portion was fixed by an adhesive tape to form a wound body.

Next, the packed wound conductor was put into heated oil and subjected to isostatic pressing. Accordingly, the solid particles were pushed to the recess between adjacent cathode active material particles positioned on the outermost surface of the cathode active material layer and the recess between adjacent anode active material particles positioned on the outermost surface of the anode active material layer.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 5A-4

In the same manner as in Example 5A-1, a cathode and an anode were fabricated and a separator was prepared.

A coating solution was applied to both surfaces of the separator, and then dried to form a matrix resin layer as follows.

First, boehmite particles, and polyvinylidene fluoride (PVdF) serving as a matrix polymer compound were dispersed in N-methyl-2-pyrrolidone (NMP) to prepare the coating solution. In this case, a content of the boehmite particles was 10 mass % with respect to a total amount of paint, a content of the PVdF was 10 mass % with respect to a total amount of paint, and a content of the NMP was 80 mass % with respect to a total amount of paint.

Next, the coating solution was applied to both surfaces of the separator and then passed through a dryer to remove the NMP. Accordingly, the separator on which a matrix resin layer was formed was obtained.

[Assembly of the Laminated Film-Type Battery]

Next, the cathode, the anode and the separator having both surfaces on which the matrix resin layer was formed were laminated in the order of the cathode, the separator, the anode, and the separator, and wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess of the outermost surface of the cathode active material layer and the recess of the outermost surface of the anode active material layer.

Next, the wound electrode body was inserted into the package member, and three sides were subjected to thermal fusion bonding. Note that, in the package member, a laminated film having a soft aluminum layer was used.

Then, an electrolyte solution was injected thereinto and the remaining one side was subjected to thermal fusion bonding under reduced pressure and sealed. In this case, the electrolyte solution was impregnated into a particle-comprising resin layer, and the matrix polymer compound was swollen to form gel-like electrolytes (a gel electrolyte layer). Note that, the same electrolyte solution as in Example 1B-1 was used. Thus, the laminated film-type battery shown in FIG. 1 with a battery shape of 4.5 mm in thickness, 30 mm in width, and 50 mm in height was fabricated.

Example 5B-5

First, in the same manner as in Example 5B-1, a cathode and an anode were fabricated, and a separator was prepared.

(Formation of a Solid Particle Layer)

Paint prepared by mixing solid particles at 22 mass %, PVdF at 3 mass % serving as a binder polymer compound, and NMP at 75 mass % serving as a solvent was applied to both surfaces of each of the cathode and the anode and then the surfaces were scraped. Accordingly, the solid particles were put into the recess impregnation region A of each of the cathode side and the anode side, and the thickness of the recess impregnation region A was set to be twice the thickness of the top coat region B or more. Then, the NMP was removed by drying and a solid particle layer was formed such that a solid component became 0.5 mg/cm$^2$ per one surface.

Next, the cathode and the anode each having both surfaces on which the solid particle layer was formed and the separator were laminated in the order of the cathode, the separator, the anode, and the separator, and then wound in a flat shape multiple times in a longitudinal direction. Then, a winding end portion was fixed by an adhesive tape to form a wound body.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 5B-6

A laminated film-type battery was fabricated in the same manner as in Example 5B-1 except that a gel-like electrolyte layer was formed only on both surfaces of the cathode.

Example 5B-7

A laminated film-type battery was fabricated in the same manner as in Example 5B-1 except that a gel-like electrolyte layer was formed only on both surfaces of the anode.

(Battery Evaluation: A Rapid Charge Capacity Test and Measurement of a Battery Capacity)

In the same manner as in Example 1B-1, a rapid charge capacity test and measurement of a battery capacity were performed on the fabricated laminated film-type batteries according to the examples.

The evaluation results are shown in Table 17.

TABLE 17

| | Solid particles | | Additive component | | Overview of method of disposing solid particles | | | Battery evaluation | | |
|---|---|---|---|---|---|---|---|---|---|---|
| | Material type | Amount added [mass %] | Material type | Amount added [mass %] | Results formed through coating | Coating target | *Remarks | Capacity retention rate [%] | Determination | Battery capacity [mAh] |
| Example 5B-1 | Boehmite | 10 | Formula (4A-2) | 1 | Gel electrolytes containing solid particles | Positive electrode and negative electrode | Gel electrolytes are heated and applied, and some of the applied gel electrolytes are scraped off | 90 | Excellent | 1050 |
| Example 5B-2 | | | | | Gel electrolytes containing solid particles | Separator | Heating and pressing process (isostatic pressing) is provided | 65 | Satisfactory | 1000 |
| Example 5B-3 | | | | | Solid particle layer | Separator | Heating and pressing process (isostatic pressing) is provided | 75 | Good | 1020 |
| Example 5B-4 | | | | | Matrix resin layer | Separator | Heating and pressing process (isostatic pressing) is provided | 75 | Good | 1020 |

TABLE 17-continued

| | Solid particles | | Additive component | | Overview of method of disposing solid particles | | | Battery evaluation | | |
|---|---|---|---|---|---|---|---|---|---|---|
| | Material type | Amount added [mass %] | Material type | Amount added [mass %] | Results formed through coating | Coating target | *Remarks | Capacity retention rate [%] | Deter-mination | Battery capacity [mAh] |
| Example 5B-5 | | | | | Solid particle layer | Positive electrode and negative electrode | After application, a solid particle layer is partially scraped off | 75 | Good | 1020 |
| Example 5B-6 | | | | | Gel electrolytes containing solid particles | Positive electrode | Gel electrolytes are heated and applied, and some of the applied gel electrolytes are scraped off | 65 | Satis-factory | 1020 |
| Example 5B-7 | | | | | Gel electrolytes containing solid particles | Negative electrode | Gel electrolytes are heated and applied, and some of the applied gel electrolytes are scraped off | 75 | Good | 1000 |

As shown in Table 17, in Example 5B-1 to Example 5B-7, since solid particles were disposed at an appropriate concentration in an appropriate region inside the battery, a rapid charge characteristic was outstanding. In addition, the battery capacity was also sufficient.

Example 6B-1

Next, a rectangular cathode, a rectangular anode, and a rectangular separator whose configurations were the same as those in Example 1B-1 were fabricated except for their rectangular shapes.

(Formation of a Solid Particle Layer)

Next, in the same manner as in Example 5B-3, a solid particle layer was formed on both surfaces of the separator.

(Formation of a Stacked Electrode Body)

Next, the cathode, the separator, the anode, and the separator were sequentially laminated to form a stacked electrode body.

Next, the packed stacked electrode body was put into heated oil and subjected to isostatic pressing. Accordingly, the solid particles were pushed to the recess of the outermost surface of the cathode active material layer and the recess of the outermost surface of the anode active material.

Next, the stacked electrode body was packaged with a laminated film having a soft aluminum layer, three sides around the stacked electrode body were sealed up and closed tight by thermal fusion bonding. Then, the same electrolyte solution as in Example 1B-1 was injected thereinto and the remaining one side was sealed by thermal fusion bonding under reduced pressure. Accordingly, the laminated film-type battery shown in FIG. 4A to FIG. 4C with a battery shape of 4.5 mm in thickness, 30 mm in width, and 50 mm in height was fabricated.

Example 6B-2

In the same manner as in Example 6B-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

Next, a cathode terminal was combined with a safety valve with which a battery lid was combined, and an anode terminal was connected to an anode can. The stacked electrode body was inserted between a pair of insulating plates and accommodated inside a battery can.

Next, the non-aqueous electrolyte solution was injected into the cylindrical battery can from the top of the insulating plate. Finally, at an opening of the battery can, a battery lid was caulked and closed tight through an insulation sealing gasket. Accordingly, a cylindrical battery with a battery shape of 18 mm in diameter and 65 mm in height (ICR18650 size) was fabricated.

Example 6B-3

In the same manner as in Example 6B-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

[Assembly of the Rectangular Battery]

Next, the stacked electrode body was housed in a rectangular battery can. Subsequently, an electrode pin provided at a battery lid and a cathode terminal led out from the stacked electrode body were connected. Then, the battery can was sealed by the battery lid, the non-aqueous electrolyte solution was injected through an electrolyte solution inlet, and sealed up and closed tight by a sealing member. Accordingly, the rectangular battery with a battery shape of 4.5 mm in thickness, 30 mm in width and 50 mm in height (453050 size) was fabricated.

Example 6B-4

In Example 6B-4, the same laminated film-type battery as in Example 1-1 was used to fabricate a simple battery pack (a soft pack) shown in FIG. 8 and FIG. 9.

(Battery Evaluation: A Rapid Charge Capacity Test)

In the same manner as in Example 1B-1, a rapid charge capacity test was performed on the fabricated laminated film-type batteries according to the examples.

The evaluation results are shown in Table 18.

TABLE 18

| | Solid particles | | Additive component | | | Battery evaluation | | |
|---|---|---|---|---|---|---|---|---|
| | Material type | Amount added [mass %] | Material type | Amount added [mass %] | Battery form | Capacity retention rate [%] | Determination | Battery capacity [mAh] |
| Example 6B-1 | Boehmite | 10 | Formula (4A-2) | 1 | Stacked laminated film-type battery | 90 | Excellent | 1000 |
| Example 6B-2 | | | Formula (4A-2) | | Cylindrical battery in which a stacked electrode body is housed in a cylindrical cam | 90 | Excellent | 1000 |
| Example 6B-3 | | | Formula (4A-2) | | Rectangular battery in which a stacked electrode body is housed in a rectangular cam | 90 | Excellent | 1000 |
| Example 6B-4 | | | Formula (4A-2) | | Battery pack of a laminated film-type battery | 90 | Excellent | 1000 |

As shown in Table 18, in Example 6B-1 to Example 6B-4, since solid particles were disposed at an appropriate concentration in an appropriate region inside the battery, a rapid charge characteristic was outstanding. In addition, the battery capacity was also sufficient.

Example 1C-1

<Fabrication of a Cathode>

91 mass % of lithium cobaltate ($LiCoO_2$) particles (particle size D50: 10 μm), which is the cathode active material, 6 mass % of carbon black, which is an electrically conductive agent, and 3 mass % of polyvinylidene difluoride (PVdF), which is a binder, were mixed together to prepare a cathode mixture, and the cathode mixture was dispersed in N-methyl-2-pyrrolidone (NMP), which is a dispersion medium, to prepare a cathode mixture slurry.

The cathode mixture slurry was applied to both surfaces of a cathode current collector formed of a band-like piece of aluminum foil with a thickness of 12 μm in such a manner that part of the cathode current collector was exposed. After that, the dispersion medium of the applied cathode mixture slurry was evaporated to dryness, and compression molding was performed by roll pressing; thereby, a cathode active material layer was formed. Finally, a cathode terminal was attached to the exposed portion of the cathode current collector; thus, a cathode was formed. Note that an area density of the cathode active material layer was adjusted to 30 mg/cm$^2$.

[Fabrication of an Anode]

96 mass % of granular graphite particle (particle size D50: 20 μm), which is the anode active material, 1.5 mass % of an acrylic acid-modified product of a styrene-butadiene copolymer as a binder, and 1.5 mass % of carboxymethyl cellulose as a thickener were mixed together to prepare an anode mixture, and an appropriate amount of water was added and stirring was performed to prepare an anode mixture slurry.

The anode mixture slurry was applied to both surfaces of an anode current collector formed of a band-like piece of copper foil with a thickness of 15 μm in such a manner that part of the anode current collector was exposed. After that, the dispersion medium of the applied anode mixture slurry was evaporated to dryness, and compression molding was performed by roll pressing; thereby, an anode active material layer was formed. Finally, an anode terminal was attached to the exposed portion of the cathode current collector, thus, an anode was formed. Note that an area density of the anode active material layer was adjusted to 15 mg/cm$^2$.

[Fabrication of a Separator]

As the separator, a polyethylene (PE) microporous film (a polyethylene separator) having a thickness of 5 μm was prepared.

[Formation of an Electrolyte Layer]

In a non-aqueous solvent in which ethylene carbonate (EC) and diethyl carbonate (DEC) were mixed, lithium hexafluorophosphate ($LiPF_6$) serving as an electrolyte salt was dissolved, the compound represented by Formula (1B-3) was added as aromatic compounds, and accordingly the non-aqueous electrolyte solution was prepared. Note that a composition of the non-aqueous electrolyte solution had a mass ratio that was adjusted to EC/DEC/the compound represented by Formula (1B-3)/$LiPF_6$=20/69/1/10. A content of the compound represented by Formula (1B-3) in the non-aqueous electrolyte solution was 1 mass % based on a percentage by mass with respect to a total amount of the non-aqueous electrolyte solution.

Next, polyvinylidene fluoride (PVdF) was used as a matrix polymer compound (a resin) that retains the non-aqueous electrolyte solution. The non-aqueous electrolyte solution, the polyvinylidene fluoride, dimethyl carbonate (DMC) serving as a dilution solvent, and boehmite particles (particle size D50: 1 μm) serving as solid particles were mixed to prepare a sol-like coating solution. Note that a composition of the coating solution includes the solid particles at 10 mass %, the resin at 5 mass %, the non-aqueous electrolyte solution at 35 mass %, and the dilution solvent at 50 mass %, based on a percentage by mass with respect to a total amount of the coating solution.

Next, the coating solution was heated and applied to both surfaces of each of the cathode and the anode, the dilution solvent (DMC) was removed by drying, and a gel-like electrolyte layer having an area density of 3 mg/cm$^2$ per one surface was formed on the surfaces of the cathode and the anode. When the coating solution was heated and applied, electrolytes comprising boehmite particles serving as solid particles could be impregnated into the recess between adjacent active material particles positioned on the outermost surface of the anode active material layer or an inside of the active material layer. In this case, when the solid particles were filtered in the recess between adjacent particles, a concentration of the particles in the recess impregnation region A of the anode side increased. Accordingly, it is possible to set a difference of concentrations of particles between the recess impregnation region A and the deep region C. By partially scraping off the coating solution, the thickness of the recess impregnation region A and the top coat region B was adjusted as shown in Table 19, more solid particles were sent to the recess impregnation region A, and the solid particles remained in the recess impregnation region A. Note that some solid particles having a particle size of $2/\sqrt{3}-1$ times a particle size D50 of anode active materials or more were added, and a particle size D95 of solid particles was prepared to be $2/\sqrt{3}-1$ times a particle size D50 of anode active material particles or more (3.5 μm), which were used as the solid particles. Accordingly, an interval between particles at a bottom of the recess was filled with some solid particles having a large particle size and the solid particles could be easily filtered.

[Assembly of the Laminated Film-type Battery]

The cathode and the anode each having both surfaces on which the electrolyte layer was formed and the separator were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1C-2to Example 1C-57

In Example 1C-2 to Example 1C-57, laminated film-type batteries were fabricated in the same manner as in Example 1C-1 except that particles to be used were changed as shown in the following Table 19.

Example 1C-58

In Example 1C-58, a laminated film-type battery was fabricated in the same manner as in Example 1C-1 except that, when a coating solution to be applied to an anode was prepared, a content of solid particles decreased to 7 mass %, and an amount of DMC for decrementing the solid particles increased.

Example 1C-59

In Example 1-59, a laminated film-type battery was fabricated in the same manner as in Example 1C-1 except that, when a coating solution to be applied to an anode was prepared, a content of solid particles increased to 18 mass % and an amount of DMC for incrementing solid particles decreased.

Example 1C-60

In Example 1C-60, a laminated film-type battery was fabricated in the same manner as in Example 1C-1 except that, when a coating solution to be applied to an anode was prepared, a content of solid particles increased to 20 mass %, an amount of DMC for incrementing solid particles decreased.

Example 1C-61

In Example 1C-61, a laminated film-type battery was fabricated in the same manner as in Example 1C-1 except that, when a gel electrolyte layer was formed on an anode, a coating solution was slightly scraped off.

Example 1C-62

In Example 1C-62, a laminated film-type battery was fabricated in the same manner as in Example 1C-1 except that some solid particles having a particle size of $2/\sqrt{3}-1$ or more times a particle size D50 of anode active materials were added, and a particle size D95 of solid particles was prepared to be $2/\sqrt{3}-1$ or more times a particle size D50 of anode active material particles (3.1 μm), which were used as the solid particles.

Comparative Example 1C-1

A laminated film-type battery was fabricated in the same manner as in Example 1C-1 except that no compound represented by Formula (1B-3) was added to the non-aqueous electrolyte solution.

Comparative Example 1C-2

A laminated film-type battery was fabricated in the same manner as in Example 1C-1 except that vinyl ethylene carbonate (VEC) was added to the non-aqueous electrolyte solution in place of the compound represented by Formula (1B-3).

Comparative Example 1C-3

A laminated film-type battery was fabricated in the same manner as in Example 1C-1 except that no boehmite particles were added to a coating solution.

Comparative Example 1C-4

A laminated film-type battery was fabricated in the same manner as in Example 1C-1 except that a gel-like electrolyte layer was formed on both principal surfaces of a separator in place of formation of a gel-like electrolyte layer on an electrode. Note that, in this example, since most of the solid particles comprised in the electrolyte layer formed on the surfaces of the separator do not enter the recess between adjacent active material particles positioned on the outermost surface of the active material layer, a concentration of solid particles of the recess impregnation region A decreased.

Comparative Example 1C-5

A laminated film-type battery was fabricated in the same manner as in Example 1C-1 except that no boehmite particles were added to a coating solution, and no compound represented by Formula (1B-3) was added to the non-aqueous electrolyte solution.

(Measurement of a Particle Size of Particles and Measurement of a BET Specific Surface Area)

In the above-described examples and comparative examples, a particle size of particles and a BET specific surface area were measured or evaluated as follows (the same in the following examples)

(Measurement of a Particle Size)

In a particle size distribution in which solid particles after electrolyte components and the like were removed from the electrolyte layer were measured by a laser diffraction method, a particle size at which 50% of particles having a smaller particle size were cumulated (a cumulative volume of 50%) was set as a particle size D50 of particles. Note that, as necessary, a value of a particle size D95 at a cumulative volume of 95% was also obtained from the measured particle size distribution. Similarly, in active material particles, particles in which components other than active materials were removed from the active material layer were measured in the same manner.

(Measurement of a BET Specific Surface Area)

In solid particles after electrolyte components and the like were removed from the electrolyte layer, a BET specific surface area was obtained using a BET specific surface area measurement device.

(Measurement of a Concentration of Solid Particles, and the Recess Impregnation Region A, the Top Coat Region B, and the Deep Region C)

Observation was performed in four observation fields of view with a visual field width of 50 μm using an SEM. In each of the observation fields of view, the thickness of the impregnation region A, the top coat region B, and the deep region C and a concentration of particles of the regions were measured. In an observation field of view of 2 μm×2 μm in the regions, an area percentage (("total area of particle cross section"÷"area of observation field of view")×100%) of a total area of a particle cross section was obtained and therefore the concentration of the particles was obtained.

(Battery Evaluation: A High Output Capacity Test)

The following high output capacity test was performed on the fabricated batteries. At 23° C., a charge voltage of 4.2 V and a current of 1 A, a constant current and constant voltage charge was performed before the total charge time of 5 hours had elapsed, and then a constant current discharge was performed to 3.0 V at a constant current of 0.5 A. A discharge capacity at that time was set as an initial capacity of the battery.

At 23° C., a charge voltage of 4.2 V and a current of 1 A, a constant current and constant voltage charge was performed before the total charge time of 5 hours had elapsed, and then a constant current discharge was performed to 3.0 V at a constant current of 20 A. A percentage of a discharge capacity at that time with respect to the initial capacity ([discharge capacity/initial capacity]×100(%)) was obtained as a discharge capacity retention rate at the time of 20 A.

According to a level of the capacity retention rate, determination was performed as follows.

Fail: less than 60%
Satisfactory: 60% or more and less than 70%
Good: 70% or more and less than 80%
Excellent: 80% or more and 100% or less The evaluation results are shown in Table 19.

TABLE 19

| | Solid particles | | Solid particle concentration Negative electrode | | Solid particle concentration Positive electrode | | Thickness of region Negative electrode side | | | Thickness of region Positive electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Capacity retention rate [%] during discharging at 20A | Determination |
| Example 1C-1 | Boehmite | 10 | 40 | 2 | 40 | 2 | 10 | 2 | 30 | 5 | 2 | 45 | Function (1B-3) | 1 | 85 | Excellent |
| Example 1C-2 | Talc | | 40 | 2 | 40 | 2 | 10 | 2 | 30 | 5 | 2 | 45 | Function (1B-3) | | 85 | Excellent |
| Example 1C-3 | Zinc oxide | | 40 | 2 | 40 | 2 | 10 | 2 | 30 | 5 | 2 | 45 | Function (1B-3) | | 65 | Satisfactory |
| Example 1C-4 | Tin oxide | | 40 | 2 | 40 | 2 | 10 | 2 | 30 | 5 | 2 | 45 | Function (1B-3) | | 65 | Satisfactory |
| Example 1C-5 | Silicon oxide | | 40 | 2 | 40 | 2 | 10 | 2 | 30 | 5 | 2 | 45 | Function (1B-3) | | 65 | Satisfactory |
| Example 1C-6 | Magnesium oxide | | 40 | 2 | 40 | 2 | 10 | 2 | 30 | 5 | 2 | 45 | Function (1B-3) | | 65 | Satisfactory |
| Example 1C-7 | Antimony oxide | | 40 | 2 | 40 | 2 | 10 | 2 | 30 | 5 | 2 | 45 | Function (1B-3) | | 65 | Satisfactory |
| Example 1C-8 | Aluminum oxide | | 40 | 2 | 40 | 2 | 10 | 2 | 30 | 5 | 2 | 45 | Function (1B-3) | | 75 | Good |
| Example 1C-9 | Magnesium sulfate | | 40 | 2 | 40 | 2 | 10 | 2 | 30 | 5 | 2 | 45 | Function (1B-3) | | 65 | Satisfactory |
| Example 1C-10 | Calcium sulfate | | 40 | 2 | 40 | 2 | 10 | 2 | 30 | 5 | 2 | 45 | Function (1B-3) | | 65 | Satisfactory |
| Example 1C-11 | Barium sulfate | | 40 | 2 | 40 | 2 | 10 | 2 | 30 | 5 | 2 | 45 | Function (1B-3) | | 65 | Satisfactory |
| Example 1C-12 | Stronium sulfate | | 40 | 2 | 40 | 2 | 10 | 2 | 30 | 5 | 2 | 45 | Function (1B-3) | | 65 | Satisfactory |
| Example 1C-13 | Magnesium carbonate | | 40 | 2 | 40 | 2 | 10 | 2 | 30 | 5 | 2 | 45 | Function (1B-3) | | 65 | Satisfactory |
| Example 1C-14 | Calcium carbonate | | 40 | 2 | 40 | 2 | 10 | 2 | 30 | 5 | 2 | 45 | Function (1B-3) | | 65 | Satisfactory |
| Example 1C-15 | Barium carbonate | | 40 | 2 | 40 | 2 | 10 | 2 | 30 | 5 | 2 | 45 | Function (1B-3) | | 65 | Satisfactory |
| Example 1C-16 | Lithium carbonate | | 40 | 2 | 40 | 2 | 10 | 2 | 30 | 5 | 2 | 45 | Function (1B-3) | | 65 | Satisfactory |
| Example 1C-17 | Magnesium hydroxide | | 40 | 2 | 40 | 2 | 10 | 2 | 30 | 5 | 2 | 45 | Function (1B-3) | | 85 | Excellent |
| Example 1C-18 | Aluminum hydroxide | | 40 | 2 | 40 | 2 | 10 | 2 | 30 | 5 | 2 | 45 | Function (1B-3) | | 85 | Excellent |
| Example 1C-19 | Zinc hydroxide | | 40 | 2 | 40 | 2 | 10 | 2 | 30 | 5 | 2 | 45 | Function (1B-3) | | 85 | Excellent |
| Example 1C-20 | Boron carbide | | 40 | 2 | 40 | 2 | 10 | 2 | 30 | 5 | 2 | 45 | Function (1B-3) | | 75 | Good |
| Example 1C-21 | Silicon carbide | | 40 | 2 | 40 | 2 | 10 | 2 | 30 | 5 | 2 | 45 | Function (1B-3) | | 85 | Excellent |

TABLE 19-continued

| | Solid particles | | Solid particle concentration Negative electrode | | Solid particle concentration Positive electrode | | Thickness of region Negative electrode side | | | Thickness of region Positive electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Capacity retention rate [%] during discharging at 20A | Determination |
| Example 1C-22 | Silicon nitride | | 40 | 2 | 40 | 2 | 10 | 2 | 30 | 5 | 2 | 45 | Function (1B-3) | | 75 | Good |
| Example 1C-23 | Boron nitride | | 40 | 2 | 40 | 2 | 10 | 2 | 30 | 5 | 2 | 45 | Function (1B-3) | | 85 | Excellent |
| Example 1C-24 | Aluminum nitride | | 40 | 2 | 40 | 2 | 10 | 2 | 30 | 5 | 2 | 45 | Function (1B-3) | | 85 | Excellent |
| Example 1C-25 | Titanium nitride | | 40 | 2 | 40 | 2 | 10 | 2 | 30 | 5 | 2 | 45 | Function (1B-3) | | 75 | Good |
| Example 1C-26 | Lithium fluoride | | 40 | 2 | 40 | 2 | 10 | 2 | 30 | 5 | 2 | 45 | Function (1B-3) | | 75 | Good |
| Example 1C-27 | Aluminum fluoride | | 40 | 2 | 40 | 2 | 10 | 2 | 30 | 5 | 2 | 45 | Function (1B-3) | | 75 | Good |
| Example 1C-28 | Calcium fluoride | | 40 | 2 | 40 | 2 | 10 | 2 | 30 | 5 | 2 | 45 | Function (1B-3) | | 75 | Good |
| Example 1C-29 | Barium fluoride | | 40 | 2 | 40 | 2 | 10 | 2 | 30 | 5 | 2 | 45 | Function (1B-3) | | 75 | Good |
| Example 1C-30 | Magnesium fluoride | 10 | 40 | 2 | 40 | 2 | 10 | 2 | 30 | 5 | 2 | 45 | Function (1B-3) | 1 | 75 | Good |
| Example 1C-31 | Diamond | | 40 | 2 | 40 | 2 | 10 | 2 | 30 | 5 | 2 | 45 | Function (1B-3) | | 85 | Excellent |
| Example 1C-32 | Trilithium phosphate | | 40 | 2 | 40 | 2 | 10 | 2 | 30 | 5 | 2 | 45 | Function (1B-3) | | 75 | Good |
| Example 1C-33 | Magnesium phosphate | | 40 | 2 | 40 | 2 | 10 | 2 | 30 | 5 | 2 | 45 | Function (1B-3) | | 75 | Good |
| Example 1C-34 | Magnesium hydrogen phosphate | | 40 | 2 | 40 | 2 | 10 | 2 | 30 | 5 | 2 | 45 | Function (1B-3) | | 75 | Good |
| Example 1C-35 | Calcium silicate | | 40 | 2 | 40 | 2 | 10 | 2 | 30 | 5 | 2 | 45 | Function (1B-3) | | 75 | Good |
| Example 1C-36 | Zinc silicate | | 40 | 2 | 40 | 2 | 10 | 2 | 30 | 5 | 2 | 45 | Function (1B-3) | | 75 | Good |
| Example 1C-37 | Zirconium silicate | | 40 | 2 | 40 | 2 | 10 | 2 | 30 | 5 | 2 | 45 | Function (1B-3) | | 75 | Good |
| Example 1C-38 | Aluminum silicate | | 40 | 2 | 40 | 2 | 10 | 2 | 30 | 5 | 2 | 45 | Function (1B-3) | | 75 | Good |
| Example 1C-39 | Magnesium silicate | | 40 | 2 | 40 | 2 | 10 | 2 | 30 | 5 | 2 | 45 | Function (1B-3) | | 75 | Good |
| Example 1C-40 | Spinel | | 40 | 2 | 40 | 2 | 10 | 2 | 30 | 5 | 2 | 45 | Function (1B-3) | | 75 | Good |
| Example 1C-41 | Hydro-calcite | | 40 | 2 | 40 | 2 | 10 | 2 | 30 | 5 | 2 | 45 | Function (1B-3) | | 85 | Excellent |
| Example 1C-42 | Dolomite | | 40 | 2 | 40 | 2 | 10 | 2 | 30 | 5 | 2 | 45 | Function (1B-3) | | 85 | Excellent |
| Example 1C-43 | Kaolinite | | 40 | 2 | 40 | 2 | 10 | 2 | 30 | 5 | 2 | 45 | Function (1B-3) | | 85 | Excellent |
| Example 1C-44 | Sepiolite | | 40 | 2 | 40 | 2 | 10 | 2 | 30 | 5 | 2 | 45 | Function (1B-3) | | 85 | Excellent |

TABLE 19-continued

| | Solid particles | | Solid particle concentration Negative electrode | | Solid particle concentration Positive electrode | | Thickness of region Negative electrode side | | | Thickness of region Positive electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Capacity retention rate [%] during discharging at 20A | Determination |
| Example 1C-45 | Imogolite | | 40 | 2 | 40 | 2 | 10 | 2 | 30 | 5 | 2 | 45 | Function (1B-3) | | 85 | Excellent |
| Example 1C-46 | Sericite | | 40 | 2 | 40 | 2 | 10 | 2 | 30 | 5 | 2 | 45 | Function (1B-3) | | 85 | Excellent |
| Example 1C-47 | Pyrophylate | | 40 | 2 | 40 | 2 | 10 | 2 | 30 | 5 | 2 | 45 | Function (1B-3) | | 85 | Excellent |
| Example 1C-48 | Mica | | 40 | 2 | 40 | 2 | 10 | 2 | 30 | 5 | 2 | 45 | Function (1B-3) | | 85 | Excellent |
| Example 1C-49 | Zealite | | 40 | 2 | 40 | 2 | 10 | 2 | 30 | 5 | 2 | 45 | Function (1B-3) | | 85 | Excellent |
| Example 1C-50 | Mullite | | 40 | 2 | 40 | 2 | 10 | 2 | 30 | 5 | 2 | 45 | Function (1B-3) | | 85 | Excellent |
| Example 1C-51 | Saponite | | 40 | 2 | 40 | 2 | 10 | 2 | 30 | 5 | 2 | 45 | Function (1B-3) | | 85 | Excellent |
| Example 1C-52 | Attapulgite | | 40 | 2 | 40 | 2 | 10 | 2 | 30 | 5 | 2 | 45 | Function (1B-3) | | 85 | Excellent |
| Example 1C-53 | Monmo-flourite | | 40 | 2 | 40 | 2 | 10 | 2 | 30 | 5 | 2 | 45 | Function (1B-3) | | 85 | Excellent |
| Example 1C-54 | Ammonium poly-phosphate | | 40 | 2 | 40 | 2 | 10 | 2 | 30 | 5 | 2 | 45 | Function (1B-3) | | 75 | Good |
| Example 1C-55 | Melamine cyanurate | | 40 | 2 | 40 | 2 | 10 | 2 | 30 | 5 | 2 | 45 | Function (1B-3) | | 75 | Good |
| Example 1C-56 | Melamine poly-phosphate | | 40 | 2 | 40 | 2 | 10 | 2 | 30 | 5 | 2 | 45 | Function (1B-3) | | 75 | Good |
| Example 1C-57 | Polyolefin head | | 40 | 2 | 40 | 2 | 10 | 2 | 30 | 5 | 2 | 45 | Function (1B-3) | | 65 | Satisfactory |
| Example 1C-58 | Boehmite | 7 | 30 | 2 | 40 | 2 | 16 | 2 | 24 | 8 | 2 | 42 | Function (1B-3) | | 75 | Good |
| Example 1C-59 | Boehmite | 18 | 80 | 3 | 80 | 3 | 10 | 2 | 30 | 5 | 2 | 45 | Function (1B-3) | 1 | 85 | Excellent |
| Example 1C-60 | Boehmite | 20 | 90 | 3 | 90 | 3 | 10 | 2 | 30 | 5 | 2 | 45 | Function (1B-3) | 1 | 75 | Good |
| Example 1C-61 | Boehmite | 10 | 40 | 2 | 40 | 2 | 4 | 2 | 36 | 5 | 2 | 45 | Function (1B-3) | 1 | 75 | Good |
| Example 1C-62 | Boehmite | 10 | 30 | 3 | 30 | 3 | 10 | 2 | 30 | 5 | 2 | 45 | Function (1B-3) | 1 | 75 | Good |
| Comparative Example 1C-1 | Boehmite | 10 | 40 | 2 | 40 | 2 | 10 | 2 | 30 | 5 | 2 | 45 | Additive-tree | 1 | 20 | Fail |
| Comparative Example 1C-2 | Boehmite | | 40 | 2 | 40 | 2 | 10 | 2 | 30 | 5 | 2 | 45 | VEC | 1 | 20 | Fail |
| Comparative Example 1C-3 | Not disposed | — | — | — | — | — | — | — | — | — | — | — | Function (1B-3) | 1 | 30 | Fail |
| Comparative Example 1C-4 | Boehmite (disposed only a surface of a separator) | 10 | 3 | 0 | 3 | 0 | 0 | 20 | 40 | 0 | 20 | 50 | Function (1B-3) | | 10 | Fail |
| Comparative Example 1C-5 | Not disposed | — | — | — | — | — | — | — | — | — | — | — | Additive-tree | — | 10 | Fail |

As shown in Table 19, in Example 1C-1 to Example 1C-57, since solid particles were disposed at an appropriate concentration in an appropriate region inside the battery, a discharge capacity retention rate during high output was outstanding.

Example 2C-3

In the same manner as in Example 1C-1, a laminated film-type battery was fabricated.

Example 2C-1 to Example 2C-2, and Example 2C-4 to Example 2C-16

In Example 2C-1 to Example 2C-2, and Example 2C-4 to Example 2C-16, laminated film-type batteries were fabricated in the same manner as in Example 2C-3 except that compounds shown in the following Table 20 were added as an aromatic compound in place of the compound represented by Formula (1B-3) when an electrolyte layer was formed.

(Battery Evaluation: A High Output Capacity Test)

In the same manner as in Example 1C-1, a high output capacity test and measurement of a battery capacity were performed on the fabricated laminated film-type batteries according to the examples.

The evaluation results are shown in Table 20.

TABLE 20

| | Solid particles | | Additive component | | Battery evaluation | |
|---|---|---|---|---|---|---|
| | Material type | Amount added [mass %] | Material type | Amount added [mass %] | Capacity retention rate [%] during discharging at 20A | Determination |
| Example 2C-1 | Boehmite | 10 | Formula (1B-1) | 1 | 65 | Satisfactory |
| Example 2C-2 | | | Formula (1B-2) | | 65 | Satisfactory |
| Example 2C-3 | | | Formula (1B-3) | | 85 | Excellent |
| Example 2C-4 | | | Formula (1B-4) | | 90 | Excellent |
| Example 2C-5 | | | Formula (1B-5) | | 65 | Satisfactory |
| Example 2C-6 | | | Formula (1B-6) | | 65 | Satisfactory |
| Example 2C-7 | | | Formula (1B-7) | | 65 | Satisfactory |
| Example 2C-8 | | | Formula (1B-8) | | 65 | Satisfactory |
| Example 2C-9 | | | Formula (1B-9) | | 65 | Satisfactory |
| Example 2C-10 | | | Formula (1B-10) | | 65 | Satisfactory |
| Example 2C-11 | | | Formula (1B-11) | | 65 | Satisfactory |
| Example 2C-12 | | | Formula (1B-12) | | 65 | Satisfactory |
| Example 2C-13 | | | Formula (1B-13) | | 65 | Satisfactory |
| Example 2C-14 | | | Formula (1B-14) | | 65 | Satisfactory |
| Example 2C-15 | | | Formula (2B-1) | | 75 | Good |
| Example 2C-16 | | | Formula (3B-1) | | 75 | Good |

As shown in Table 20, in Example 2C-1 to Example 2C-16, since solid particles were disposed at an appropriate concentration in an appropriate region inside the battery, a discharge capacity retention rate during high output was outstanding.

Example 3C-1 to Example 3C-9

In Example 3C-1 to Example 3C-9, laminated film-type batteries were fabricated in the same manner as in Example 1C-1 except that an amount of the compounds represented by Formula (1B-3) added was changed as shown in the following Table 21.

(Battery Evaluation: A High Output Capacity Test)

In the same manner as in Example 1C-1, a high output capacity test was performed on the fabricated laminated film-type batteries according to the examples.

The evaluation results are shown in Table 21.

TABLE 21

| | Solid particles | | Additive component | | Battery evaluation | |
|---|---|---|---|---|---|---|
| | Material type | Amount added [mass %] | Material type | Amount added [mass %] | Capacity retention rate [%] during discharging at 20A | Determination |
| Example 3C-1 | Boehmite | 10 | Formula (1B-3) | 0.01 | 65 | Satisfactory |
| Example 3C-2 | | | | 0.02 | 75 | Good |
| Example 3C-3 | | | | 0.03 | 80 | Excellent |
| Example 3C-4 | | | | 1 | 90 | Excellent |

TABLE 21-continued

| | Solid particles | | Additive component | | Battery evaluation | |
|---|---|---|---|---|---|---|
| | Material type | Amount added [mass %] | Material type | Amount added [mass %] | Capacity retention rate [%] during discharging at 20A | Determination |
| Example 3C-5 | | | | 2 | 90 | Excellent |
| Example 3C-6 | | | | 5 | 85 | Excellent |
| Example 3C-7 | | | | 8 | 80 | Excellent |
| Example 3C-8 | | | | 9 | 75 | Good |
| Example 3C-9 | | | | 10 | 65 | Satisfactory |

As shown in Table 21, in Example 3C-1 to Example 3C-9, since solid particles were disposed at an appropriate concentration in an appropriate region inside the battery, a discharge capacity retention rate during high output was outstanding.

Example 4C-1 to Example 4C-9

In Example 4C-1 to Example 4C-9, laminated film-type batteries were fabricated in the same manner as in Example 1C-1 except that an amount of solid particles added with respect to electrolytes was changed as shown in the following Table 22.

(Battery Evaluation: A High Output Capacity Test)

In the same manner as in Example 1C-1, a high output capacity test was performed on the fabricated laminated film-type batteries according to the examples.

The evaluation results are shown in Table 22.

TABLE 22

| | Solid particles | | Additive component | | Battery evaluation | |
|---|---|---|---|---|---|---|
| | Material type | Amount added [mass %] | Material type | Amount added [mass %] | Capacity retention rate [%] during discharging at 20A | Determination |
| Example 4C-1 | Boehmite | 1 | Formula (1B-3) | 1 | 65 | Satisfactory |
| Example 4C-2 | | 2 | Formula (1B-3) | | 75 | Good |
| Example 4C-3 | | 5 | Formula (1B-3) | | 80 | Excellent |
| Example 4C-4 | | 10 | Formula (1B-3) | | 90 | Excellent |
| Example 4C-5 | | 20 | Formula (1B-3) | | 90 | Excellent |
| Example 4C-6 | | 30 | Formula (1B-3) | | 85 | Excellent |
| Example 4C-7 | | 40 | Formula (1B-3) | | 80 | Excellent |
| Example 4C-8 | | 50 | Formula (1B-3) | | 75 | Good |
| Example 4C-9 | | 60 | Formula (1B-3) | | 65 | Satisfactory |

As shown in Table 22, in Example 4C-1 to Example 4C-9, since solid particles were disposed at an appropriate concentration in an appropriate region inside the battery, a discharge capacity retention rate during high output was outstanding. In addition, the battery capacity was also sufficient.

Example 5C-1 to Example 5C-11

In Example 5C-1 to Example 5C-11, laminated film-type batteries were fabricated in the same manner as in Example 1C-1 except that a particle size and a specific surface area of boehmite particles serving as solid particles were changed as shown in the following Table 23.

(Battery Evaluation: A High Output Capacity Test)

In the same manner as in Example 1C-1, a rapid charge capacity test and measurement of a battery capacity were performed on the fabricated laminated film-type batteries according to the examples.

The evaluation results are shown in Table 23.

TABLE 23

| | Solid particles | | | | Cyclic alkylene carbonate | | Battery evaluation | |
|---|---|---|---|---|---|---|---|---|
| | Material type | Particle size D50 [μm] | BET specific surface area [$m^2/g$] | Amount added [mass %] | Material type | Amount added [mass %] | Capacity retention rate [%] during discharging at 20A | Determination |
| Example 5C-1 | Boehmite | 1 | 6 | 10 | Function (1B-3) | 1 | 90 | Excellent |
| Example 5C-2 | | 0.1 | 60 | | | | 65 | Satisfactory |

TABLE 23-continued

| | Solid particles | | | | Cyclic alkylene carbonate | | Battery evaluation | |
|---|---|---|---|---|---|---|---|---|
| | Material type | Particle size D50 [μm] | BET specific surface area [$m^2/g$] | Amount added [mass %] | Material type | Amount added [mass %] | Capacity retention rate [%] during discharging at 20A | Determination |
| Example 5C-3 | | 0.2 | 40 | | | | 75 | Good |
| Example 5C-4 | | 0.3 | 20 | | | | 80 | Excellent |
| Example 5C-5 | | 0.5 | 15 | | | | 85 | Excellent |
| Example 5C-6 | | 0.7 | 12 | | | | 90 | Excellent |
| Example 5C-7 | | 2 | 3 | | | | 90 | Excellent |
| Example 5C-8 | | 3 | 2 | | | | 85 | Excellent |
| Example 5C-9 | | 5 | 1.5 | | | | 80 | Excellent |
| Example 5C-10 | | 7 | 1.2 | | | | 75 | Good |
| Example 5C-11 | | 10 | 1 | | | | 65 | Satisfactory |

As shown in Table 23, in Example 5C-1 to Example 5C-11, since solid particles were disposed at an appropriate concentration in an appropriate region inside the battery, a discharge capacity retention rate during high output was outstanding. In addition, the battery capacity was also sufficient.

Example 6C-1

In the same manner as in Example 1C-1, a laminated film-type battery was fabricated.

Example 6C-2

First, in the same manner as in Example 5C-1, a cathode and an anode were fabricated, and a separator was prepared.

Next, in the same manner as in Example 1C-1, the same coating solution as in Example 1C-1 was applied to both surfaces of the separator, a dilution solvent was removed by drying, and a gel-like electrolyte layer was formed on the surfaces of the separator.

Then, the cathode, the anode, and the separator having both surfaces on which the gel-like electrolyte layer was formed were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 6C-3

A laminated film-type battery was fabricated in the same manner as in Example 6C-2 except that a nonwoven fabric was prepared in place of a polyethylene separator, the same coating solution as in Example 1C-1 was applied to both surfaces of the nonwoven fabric, a dilution solvent was removed by drying, and a gel-like electrolyte layer was formed on a surface of the nonwoven fabric.

Example 6C-4

First, in the same manner as in Example 6C-1, a cathode and an anode were fabricated, and a separator was prepared.

(Formation of a Solid Particle Layer)

Next, paint prepared by mixing solid particles at 22 mass %, PVdF at 3 mass serving as a binder polymer compound, and NMP at 75 mass % serving as a solvent was applied to both surfaces of the separator and the solvent was then removed by drying. Accordingly, a solid particle layer was formed such that a solid component became 0.5 mg/$cm^2$ per one surface.

Next, the cathode, the anode, and the separator having both surfaces on which the solid particle layer was formed were laminated in the order of the cathode, the separator, the anode, and the separator, and then wound in a flat shape multiple times in a longitudinal direction. Then, a winding end portion was fixed by an adhesive tape to form a wound body.

Next, the packed wound conductor was put into heated oil and subjected to isostatic pressing. Accordingly, the solid particles were pushed to the recess between adjacent cathode active material particles positioned on the outermost surface of the cathode active material layer and the recess between adjacent anode active material particles positioned on the outermost surface of the anode active material layer.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 6C-5

Laminated film-type batteries were fabricated in the same manner as in Example 6C-4 except that a nonwoven fabric was prepared in place of a polyethylene separator, the same coating solution as in Example 6C-4 was applied to both surfaces of the nonwoven fabric, the solvent was then removed by drying, and accordingly a solid particle layer was formed such that a solid component became 0.5 $mg/cm^2$ per one surface.

Example 6C-6

First, in the same manner as in Example 6C-1, a cathode and an anode were fabricated, and a separator was prepared.

A coating solution was applied to both surfaces of the separator, and then dried to form a matrix resin layer as follows.

First, boehmite particles, and polyvinylidene fluoride (PVdF) serving as a matrix polymer compound were dispersed in N-methyl-2-pyrrolidone (NMP) to prepare the coating solution. In this case, a content of the boehmite particles was 10 mass % with respect to a total amount of paint, a content of the PVdF was 10 mass % with respect to a total amount of paint, and a content of the NMP was 80 mass % with respect to a total amount of paint.

Next, the coating solution was applied to both surfaces of the separator and then passed through a dryer to remove the NMP. Accordingly, the separator on which a matrix resin layer was formed was obtained.

[Assembly of the Laminated Film-Type Battery]

Next, the cathode, the anode and the separator having both surfaces on which the matrix resin layer was formed were laminated in the order of the cathode, the separator, the anode, and the separator, and wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess of the outermost surface of the cathode active material layer and the recess of the outermost surface of the anode active material layer.

Next, the wound electrode body was inserted into the package member, and three sides were subjected to thermal fusion bonding. Note that, in the package member, a laminated film having a soft aluminum layer was used.

Then, an electrolyte solution was injected thereinto and the remaining one side was subjected to thermal fusion bonding under reduced pressure and sealed. In this case, the electrolyte solution was impregnated into a particle-comprising resin layer, and the matrix polymer compound was swollen to form gel-like electrolytes (a gel electrolyte layer). Note that, the same electrolyte solution as in Example 1C-1 was used. Thus, the laminated film-type battery shown in FIG. 1 with a battery shape of 4.5 mm in thickness, 30 mm in width, and 50 mm in height was fabricated.

Example 6C-7

A laminated film-type battery was fabricated in the same manner as in Example 6C-6 except that a nonwoven fabric was prepared in place of a polyethylene separator, and the same coating solution as in Example 5C-6 was applied to both surfaces of the nonwoven fabric, and then passed through a dryer to remove NMP. Accordingly, the nonwoven fabric on which a matrix resin layer was formed was obtained.

Example 6C-8

First, in the same manner as in Example 6C-1, a cathode and an anode were fabricated, and a separator was prepared.

(Formation of a Solid Particle Layer)

Paint prepared by mixing solid particles at 22 mass %, PVdF at 3 mass % serving as a binder polymer compound, and NMP at 75 mass % serving as a solvent was applied to both surfaces of each of the cathode and the anode and then the surfaces were scraped. Accordingly, the solid particles were put into the recess impregnation region A of each of the cathode side and the anode side, and the thickness of the recess impregnation region A was set to be twice the thickness of the top coat region B or more. Then, the NMP was removed by drying and a solid particle layer was formed such that a solid component became 0.5 $mg/cm^2$ per one surface.

Next, the cathode and the anode each having both surfaces on which the solid particle layer was formed and the separator were laminated in the order of the cathode, the separator, the anode, and the separator, and then wound in a flat shape multiple times in a longitudinal direction. Then, a winding end portion was fixed by an adhesive tape to form a wound body.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 6C-9

A laminated film-type battery was fabricated in the same manner as in Example 6C-1 except that a gel-like electrolyte layer was formed only on both surfaces of the cathode.

Example 6C-10

A laminated film-type battery was fabricated in the same manner as in Example 6C-1 except that a gel-like electrolyte layer was formed only on both surfaces of the anode.

(Battery Evaluation: A High Output Capacity Test)

In the same manner as in Example 1C-1, a high output capacity test was performed on the fabricated laminated film-type batteries according to the examples.

The evaluation results are shown in Table 24.

TABLE 24

| | Solid particles | | Additive component | | Overview of method of disposing solid particles | | | Battery evaluation | |
|---|---|---|---|---|---|---|---|---|---|
| | Material type | Amount added [mass %] | Material type | Amount added [mass %] | Results formed through coating | Coating target | *Remarks | Capacity retention rate [%] during discharging at 20A | Determination |
| Example 6C-1 | Boehmite | 10 | Formula (1B-3) | 1 | Gel electrolytes containing solid particles | Positive electrode and negative electrode | Gel electrolytes are heated and applied, and some of the applied ge lelectrolytes are scraped off | 90 | Excellent |
| Example 6C-2 | | | | | Gel electrolytes containing solid particles | Polyethylene separator | Heating and pressing process (isostatic pressing) is provided | 65 | Satisfactory |
| Example 6C-3 | | | | | Gel electrolytes containing solid particles | Nonwoven fabric | Heating and pressing process (isostatic pressing) is provided | 65 | Satisfactory |
| Example 6C-4 | | | | | Solid particle layer | Polyethylene separator | Heating and pressing process (isostatic pressing) is provided | 75 | Good |
| Example 6C-5 | | | | | Solid particle layer | Nonwoven fabric | Heating and pressing process (isostatic pressing) is provided | 75 | Good |
| Example 6C-6 | | | | | Matrix resin layer | Polyethylene separator | Heating and pressing process (isostatic pressing) is provided | 75 | Good |
| Example 6C-7 | | | | | Matrix resin layer | Nonwoven fabric | Heating and pressing process (isostatic pressing) is provided | 75 | Good |
| Example 6C-8 | | | | | Solid particle layer | Positive electrode and negative electrode | After application, a solid particle layer is partially scraped off | 75 | Good |
| Example 6C-9 | | | | | Gel electrolytes containing solid particles | Positive electrode | Gel electrolytes are heated and applied, and some of the applied gel electrolytes are scraped off | 65 | Satisfactory |
| Example 6C-10 | | | | | Gel electrolytes containing solid particles | Negative electrode | Gel electrolytes are heated and applied, and some of the applied gel electrolytes are scraped off | 75 | Satisfactory |

As shown in Table 24, in Example 6C-1 to Example 6C-10, since solid particles were disposed at an appropriate concentration in an appropriate region inside the battery, a discharge capacity retention rate during high output was outstanding.

Example 7C-1

Next, a rectangular cathode, a rectangular anode, and a rectangular separator whose configurations were the same as those in Example 1C-1 were fabricated except for their rectangular shapes.

(Formation of a Solid Particle Layer)

Next, in the same manner as in Example 5C-3, a solid particle layer was formed on both surfaces of the separator.

(Formation of a Stacked Electrode Body)

Next, the cathode, the separator, the anode, and the separator were sequentially laminated to form a stacked electrode body.

Next, the packed stacked electrode body was put into heated oil and subjected to isostatic pressing. Accordingly, the solid particles were pushed to the recess of the outermost surface of the cathode active material layer and the recess of the outermost surface of the anode active material.

Next, the stacked electrode body was packaged with a laminated film having a soft aluminum layer, three sides around the stacked electrode body were sealed up and closed tight by thermal fusion bonding. Then, the same electrolyte solution as in Example 1C-1 was injected thereinto and the remaining one side was sealed by thermal fusion bonding under reduced pressure. Accordingly, the laminated film-type battery shown in FIG. 4A to FIG. 4C with a battery shape of 4.5 mm in thickness, 30 mm in width, and 50 mm in height was fabricated.

Example 7C-2

In the same manner as in Example 7C-1, a stacked electrode body was formed and the packed stacked electrode body was put into heated oil and subjected to isostatic pressing. Accordingly, the solid particles were pushed to the recess of the outermost surface of the cathode active material layer and the recess of the outermost surface of the anode active material layer.

Next, a cathode terminal was combined with a safety valve with which a battery lid was combined, and an anode terminal was connected to an anode can. The stacked electrode body was inserted between a pair of insulating plates and accommodated inside a battery can.

Next, the non-aqueous electrolyte solution was injected into the cylindrical battery can from the top of the insulating plate. Finally, at an opening of the battery can, a battery lid was caulked and closed tight through an insulation sealing gasket. Accordingly, a cylindrical battery with a battery shape of 18 mm in diameter and 65 mm in height (ICR18650 size) was fabricated.

Example 7C-3

In the same manner as in Example 7C-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

[Assembly of the Rectangular Battery]

Next, the stacked electrode body was housed in a rectangular battery can. Subsequently, an electrode pin provided at a battery lid and a cathode terminal led out from the stacked electrode body were connected. Then, the battery can was sealed by the battery lid, the non-aqueous electrolyte solution was injected through an electrolyte solution inlet, and sealed up and closed tight by a sealing member. Accordingly, the rectangular battery with a battery shape of 4.5 mm in thickness, 30 mm in width and 50 mm in height (453050 size) was fabricated.

Example 7C-4

In Example 7C-4, the same laminated film-type battery as in Example 1-1 was used to fabricate a simple battery pack (a soft pack) shown in FIG. 8 and FIG. 9.

(Battery Evaluation: A High Output Capacity Test)

In the same manner as in Example 1C-1, a high output capacity test was performed on the fabricated laminated film-type batteries according to the examples. Note that, in Example 7C-4, a voltage was adjusted assuming that a voltage was actually applied to the battery included in the battery pack.

The evaluation results are shown in Table 25.

aluminum foil with a thickness of 12 μm in such a manner that part of the cathode current collector was exposed. After that, the dispersion medium of the applied cathode mixture slurry was evaporated to dryness, and compression molding was performed by roll pressing; thereby, a cathode active material layer was formed. Finally, a cathode terminal was attached to the exposed portion of the cathode current collector; thus, a cathode was formed. Note that an area density of the cathode active material layer was adjusted to 30 mg/cm$^2$.

[Fabrication of an Anode]

96 mass % of granular graphite particle (particle size D50: 20 μm), which is the anode active material, 1.5 mass % of an acrylic acid-modified product of a styrene-butadiene copolymer as a binder, and 1.5 mass % of carboxymethyl cellulose as a thickener were mixed together to prepare an anode mixture, and an appropriate amount of water was added and stirring was performed to prepare an anode mixture slurry.

The anode mixture slurry was applied to both surfaces of an anode current collector formed of a band-like piece of copper foil with a thickness of 15 μm in such a manner that part of the anode current collector was exposed. After that, the dispersion medium of the applied anode mixture slurry was evaporated to dryness, and compression molding was performed by roll pressing; thereby, an anode active material layer was formed. Finally, an anode terminal was attached to the exposed portion of the cathode current collector, thus, an anode was formed. Note that an area density of the anode active material layer was adjusted to 15 mg/cm$^2$.

TABLE 25

| | Solid particles | | Additive component | | | Battery evaluation | |
|---|---|---|---|---|---|---|---|
| | Material type | Amount added [mass %] | Material type | Amount added [mass %] | Battery form | Capacity retention rate [%] during discharging at 20A | Determination |
| Example 7C-1 | Boehmite | 10 | Formula (1B-3) | 1 | Stacked laminated film-type battery | 90 | Excellent |
| Example 7C-2 | | | | | Cylindrical battery in which a stacked electrode body is housed in a cylindrical cam | 90 | Excellent |
| Example 7C-3 | | | | | Rectangular battery in which a stacked electrode body is housed in a rectangular cam | 90 | Excellent |
| Example 7C-4 | | | | | Battery pack of a laminated film-type battery | 90 | Excellent |

As shown in Table 25, in Example 7C-1 to Example 7C-4, since solid particles were disposed at an appropriate concentration in an appropriate region inside the battery, a discharge capacity retention rate during high output was outstanding.

Example 1D-1

[Fabrication of a Cathode]

91 mass % of lithium cobaltate ($LiCoO_2$) particles (particle size D50: 10 μm), which is the cathode active material, 6 mass % of carbon black, which is an electrically conductive agent, and 3 mass % of polyvinylidene difluoride (PVdF), which is a binder, were mixed together to prepare a cathode mixture, and the cathode mixture was dispersed in N-methyl-2-pyrrolidone (NMP), which is a dispersion medium, to prepare a cathode mixture slurry.

The cathode mixture slurry was applied to both surfaces of a cathode current collector formed of a band-like piece of

[Fabrication of a Separator]

As the separator, a polyethylene (PE) microporous film (a polyethylene separator) having a thickness of 5 μm was prepared.

[Formation of an Electrolyte Layer]

In a non-aqueous solvent in which ethylene carbonate (EC) and diethyl carbonate (DEC) were mixed, lithium hexafluorophosphate ($LiPF_6$) serving as an electrolyte salt was dissolved, the compound represented by Formula (1C-1) was added as a dinitrile compound, and accordingly the non-aqueous electrolyte solution was prepared. Note that a composition of the non-aqueous electrolyte solution had a mass ratio that was adjusted to EC/DEC/the compound represented by Formula (1C-2)/$LiPF_6$=20/69/1/10. A content of the compound represented by Formula (1C-2) in the non-aqueous electrolyte solution was 1 mass % based on a percentage by mass with respect to a total amount of the non-aqueous electrolyte solution.

Next, polyvinylidene fluoride (PVdF) was used as a matrix polymer compound (a resin) that retains the non-aqueous electrolyte solution. The non-aqueous electrolyte solution, the polyvinylidene fluoride, dimethyl carbonate (DMC) serving as a dilution solvent, and boehmite particles (particle size D50: 1 μm) serving as solid particles were mixed to prepare a sol-like coating solution. Note that a composition of the coating solution includes the solid particles at 10 mass %, the resin at 5 mass %, the non-aqueous electrolyte solution at 35 mass %, and the dilution solvent at 50 mass %, based on a percentage by mass with respect to a total amount of the coating solution.

Next, the coating solution was heated and applied to both surfaces of each of the cathode and the anode, the dilution solvent was removed by drying, and a gel-like electrolyte layer having an area density of 3 $mg/cm^2$ per one surface was formed on the surfaces of the cathode and the anode. When the coating solution was heated and applied, electrolytes comprising boehmite particles serving as solid particles could be impregnated into the recess between adjacent active material particles positioned on the outermost surface of the anode active material layer or an inside of the active material layer. In this case, when the solid particles were filtered in the recess between adjacent particles, a concentration of the particles in the recess impregnation region A of the anode side increased. Accordingly, it is possible to set a difference of concentrations of particles between the recess impregnation region A and the deep region C. By partially scraping off the coating solution, the thickness of the recess impregnation region A and the top coat region B was adjusted as shown in Table 26, more solid particles were sent to the recess impregnation region A, and the solid particles remained in the recess impregnation region A. Note that some solid particles having a particle size of $2/\sqrt{3}-1$ times a particle size D50 of anode active materials or more were added, and a particle size D95 of solid particles was prepared to be $2/\sqrt{3}-1$ times a particle size D50 of anode active material particles or more (3.5 μm), which were used as the solid particles. Accordingly, an interval between particles at a bottom of the recess was filled with some solid particles having a large particle size and the solid particles could be easily filtered.

[Assembly of the Laminated Film-Type Battery]

The cathode and the anode each having both surfaces on which the electrolyte layer was formed and the separator were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1D-2to Example 1D-57

In Example 1D-2 to Example 1D-57, laminated film-type batteries were fabricated in the same manner as in Example 1D-1 except that particles to be used were changed as shown in the following Table 26.

Example 1D-58

In Example 1D-58, a laminated film-type battery was fabricated in the same manner as in Example 1D-1 except that, when a coating solution to be applied to an anode was prepared, a content of solid particles decreased to 7 mass %, and an amount of DMC for decrementing the solid particles increased.

Example 1D-59

In Example 1D-59, a laminated film-type battery was fabricated in the same manner as in Example 1D-1 except that, when a coating solution to be applied to an anode was prepared, a content of solid particles increased to 18 mass % and an amount of DMC for incrementing solid particles decreased.

Example 1D-60

In Example 1D-60, a laminated film-type battery was fabricated in the same manner as in Example 1D-1 except that, when a coating solution to be applied to an anode was prepared, a content of solid particles increased to 20 mass %, an amount of DMC for incrementing solid particles decreased.

Example 1D-61

In Example 1D-61, a laminated film-type battery was fabricated in the same manner as in Example 1D-1 except that, when a gel electrolyte layer was formed on an anode, a coating solution was slightly scraped off.

Example 1 D-62

In Example 1D-62, a laminated film-type battery was fabricated in the same manner as in Example 1D-1 except that some solid particles having a particle size of $2/\sqrt{3}-1$ or more times a particle size D50 of anode active materials were added, and a particle size D95 of solid particles was prepared to be $2/\sqrt{3}-1$ or more times a particle size D50 of anode active material particles (3.1 μm), which were used as the solid particles.

Comparative Example 1D-1

A laminated film-type battery was fabricated in the same manner as in Example 1D-1 except that no compound represented by Formula (1C-2) was added to the non-aqueous electrolyte solution.

Comparative Example 1D-2

A laminated film-type battery was fabricated in the same manner as in Example 1D-1 except that vinyl ethylene carbonate (VEC) was added to the non-aqueous electrolyte solution in place of the compound represented by Formula (1C-2).

Comparative Example 1D-3

A laminated film-type battery was fabricated in the same manner as in Example 1D-1 except that no boehmite particles were added to a coating solution.

Comparative Example 1D-4

A laminated film-type battery was fabricated in the same manner as in Example 1D-1 except that a gel-like electrolyte layer was formed on both principal surfaces of a separator in place of formation of a gel-like electrolyte layer on an electrode. Note that, in this example, since most of the solid particles comprised in the electrolyte layer formed on the surfaces of the separator do not enter the recess between adjacent active material particles positioned on the outermost surface of the active material layer, a concentration of solid particles of the recess impregnation region A decreased.

Comparative Example 1D-5

A laminated film-type battery was fabricated in the same manner as in Example 1D-1 except that no boehmite particles were added to a coating solution, and no compound represented by Formula (1C-2) was added to the non-aqueous electrolyte solution.

(Measurement of a Particle Size of Particles and Measurement of a BET Specific Surface Area)

In the above-described examples and comparative examples, a particle size of particles and a BET specific surface area were measured or evaluated as follows (the same in the following examples)

(Measurement of a Particle Size)

In a particle size distribution in which solid particles after electrolyte components and the like were removed from the electrolyte layer were measured by a laser diffraction method, a particle size at which 50% of particles having a smaller particle size were cumulated (a cumulative volume of 50%) was set as a particle size D50 of particles. Note that, as necessary, a value of a particle size D95 at a cumulative volume of 95% was also obtained from the measured particle size distribution. Similarly, in active material particles, particles in which components other than active materials were removed from the active material layer were measured in the same manner.

(Measurement of a BET Specific Surface Area)

In solid particles after electrolyte components and the like were removed from the electrolyte layer, a BET specific surface area was obtained using a BET specific surface area measurement device.

(Measurement of a Concentration of Solid Particles, and the Recess Impregnation Region A, the Top Coat Region B, and the Deep Region C)

Observation was performed in four observation fields of view with a visual field width of 50 μm using an SEM. In each of the observation fields of view, the thickness of the impregnation region A, the top coat region B, and the deep region C and a concentration of particles of the regions were measured. In an observation field of view of 2 μm×2 μm in the regions, an area percentage ((“total area of particle cross section”÷“area of observation field of view”)×100%) of a total area of a particle cross section was obtained and therefore the concentration of the particles was obtained.

(Battery Evaluation: A Metal-Contaminated Precipitation Resistance Test)

The following metal-contaminated precipitation resistance test was performed on the fabricated batteries. The same battery as in the above-described examples and comparative examples was fabricated except that iron particles of 050 μm were added at 0.1% to a cathode mixture layer in advance. Then, a constant current/constant voltage charge was performed to 4.2 V at 1 A for 5 hours. When a short circuit was not caused, an additional charge was further performed by increasing a voltage 0.05 V each hour, and the additional charge was performed to a maximum of 4.40 V.

In the above operation, when a short circuit was caused up to less than 4.25 V, it was determined to have failed. When it was cleared up to 4.25 V (it was not short-circuited) and it was not cleared up to 4.30 V, it was determined as satisfactory. When it was cleared up to 4.30 V and it was not cleared up to 4.40 V, it was determined as good. When it was cleared up to 4.40 V, it was determined as excellent.

The evaluation results are shown in Table 26.

TABLE 26

| | Solid particles | | Solid particle concentration: Negative electrode | | Solid particle concentration: Positive electrode | | Thickness of region: Negative electrode side | | | Thickness of region: Positive electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Chemical abort circuit resistance test limit voltage [V] | Determination |
| Example 1D-1 | Boehmite | 10 | 40 | 2 | 40 | 2 | 10 | 2 | 30 | 5 | 2 | 45 | Function (1C-2) | 1 | 4.40 | Excellent |
| Example 1D-2 | Talc | | 40 | 2 | 40 | 2 | 10 | 2 | 30 | 5 | 2 | 45 | Function (1C-2) | | 4.40 | Excellent |
| Example 1D-3 | Zinc oxide | | 40 | 2 | 40 | 2 | 10 | 2 | 30 | 5 | 2 | 45 | Function (1C-2) | | 4.25 | Satisfactory |
| Example 1D-4 | Tin oxide | | 40 | 2 | 40 | 2 | 10 | 2 | 30 | 5 | 2 | 45 | Function (1C-2) | | 4.25 | Satisfactory |
| Example 1D-5 | Silicon oxide | | 40 | 2 | 40 | 2 | 10 | 2 | 30 | 5 | 2 | 45 | Function (1C-2) | | 4.25 | Satisfactory |
| Example 1D-6 | Magnesium oxide | | 40 | 2 | 40 | 2 | 10 | 2 | 30 | 5 | 2 | 45 | Function (1C-2) | | 4.25 | Satisfactory |
| Example 1D-7 | Antimony oxide | | 40 | 2 | 40 | 2 | 10 | 2 | 30 | 5 | 2 | 45 | Function (1C-2) | | 4.25 | Satisfactory |
| Example 1D-8 | Aluminum oxide | | 40 | 2 | 40 | 2 | 10 | 2 | 30 | 5 | 2 | 45 | Function (1C-2) | | 4.30 | Good |
| Example 1D-9 | Mag- nesium sulfate | | 40 | 2 | 40 | 2 | 10 | 2 | 30 | 5 | 2 | 45 | Function (1C-2) | | 4.25 | Satisfactory |
| Example 1D-10 | Calcium sulfate | | 40 | 2 | 40 | 2 | 10 | 2 | 30 | 5 | 2 | 45 | Function (1C-2) | | 4.25 | Satisfactory |
| Example 1D-11 | Barium sulfate | | 40 | 2 | 40 | 2 | 10 | 2 | 30 | 5 | 2 | 45 | Function (1C-2) | | 4.25 | Satisfactory |
| Example 1D-12 | Stronium sulfate | | 40 | 2 | 40 | 2 | 10 | 2 | 30 | 5 | 2 | 45 | Function (1C-2) | | 4.25 | Satisfactory |
| Example 1D-13 | Mag- nesium carbonate | | 40 | 2 | 40 | 2 | 10 | 2 | 30 | 5 | 2 | 45 | Function (1C-2) | | 4.25 | Satisfactory |
| Example 1D-14 | Calcium carbonate | | 40 | 2 | 40 | 2 | 10 | 2 | 30 | 5 | 2 | 45 | Function (1C-2) | | 4.25 | Satisfactory |
| Example 1D-15 | Barium carbonate | | 40 | 2 | 40 | 2 | 10 | 2 | 30 | 5 | 2 | 45 | Function (1C-2) | | 4.25 | Satisfactory |
| Example 1D-16 | Lithium carbonate | | 40 | 2 | 40 | 2 | 10 | 2 | 30 | 5 | 2 | 45 | Function (1C-2) | | 4.25 | Satisfactory |
| Example 1D-17 | Magnesium hydroxide | | 40 | 2 | 40 | 2 | 10 | 2 | 30 | 5 | 2 | 45 | Function (1C-2) | | 4.40 | Excellent |
| Example 1D-18 | Aluminum hydroxide | | 40 | 2 | 40 | 2 | 10 | 2 | 30 | 5 | 2 | 45 | Function (1C-2) | | 4.40 | Excellent |
| Example 1D-19 | Zinc hydroxide | | 40 | 2 | 40 | 2 | 10 | 2 | 30 | 5 | 2 | 45 | Function (1C-2) | | 4.40 | Excellent |
| Example 1D-20 | Boron carbide | | 40 | 2 | 40 | 2 | 10 | 2 | 30 | 5 | 2 | 45 | Function (1C-2) | | 4.30 | Good |
| Example 1D-21 | Silicon carbide | | 40 | 2 | 40 | 2 | 10 | 2 | 30 | 5 | 2 | 45 | Function (1C-2) | | 4.40 | Excellent |

TABLE 26-continued

| | Solid particles | | Solid particle concentration, Negative electrode | | Solid particle concentration, Positive electrode | | Thickness of region, Negative electrode side | | | Thickness of region, Positive electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Chemical abort circuit resistance test limit voltage [V] | Determination |
| Example 1D-22 | Silicon nitride | | 40 | 2 | 40 | 2 | 10 | 2 | 30 | 5 | 2 | 45 | Function (1C-2) | | 4.30 | Good |
| Example 1D-23 | Boron nitride | | 40 | 2 | 40 | 2 | 10 | 2 | 30 | 5 | 2 | 45 | Function (1C-2) | | 4.40 | Excellent |
| Example 1D-24 | Aluminum nitride | | 40 | 2 | 40 | 2 | 10 | 2 | 30 | 5 | 2 | 45 | Function (1C-2) | | 4.40 | Excellent |
| Example 1D-25 | Titanium nitride | | 40 | 2 | 40 | 2 | 10 | 2 | 30 | 5 | 2 | 45 | Function (1C-2) | | 4.30 | Good |
| Example 1D-26 | Lithium fluoride | | 40 | 2 | 40 | 2 | 10 | 2 | 30 | 5 | 2 | 45 | Function (1C-2) | | 4.30 | Good |
| Example 1D-27 | Aluminum fluoride | | 40 | 2 | 40 | 2 | 10 | 2 | 30 | 5 | 2 | 45 | Function (1C-2) | | 4.30 | Good |
| Example 1D-28 | Calcium fluoride | | 40 | 2 | 40 | 2 | 10 | 2 | 30 | 5 | 2 | 45 | Function (1C-2) | | 4.30 | Good |
| Example 1D-29 | Barium fluoride | | 40 | 2 | 40 | 2 | 10 | 2 | 30 | 5 | 2 | 45 | Function (1C-2) | | 4.30 | Good |
| Example 1D-30 | Mag-nesium fluoride | 10 | 40 | 2 | 40 | 2 | 10 | 2 | 30 | 5 | 2 | 45 | Function (1C-2) | 1 | 4.30 | Good |
| Example 1D-31 | Diamond | | 40 | 2 | 40 | 2 | 10 | 2 | 30 | 5 | 2 | 45 | Function (1C-2) | | 4.40 | Excellent |
| Example 1D-32 | Trilithium phosphate | | 40 | 2 | 40 | 2 | 10 | 2 | 30 | 5 | 2 | 45 | Function (1C-2) | | 4.30 | Good |
| Example 1D-33 | Magnesium phosphate | | 40 | 2 | 40 | 2 | 10 | 2 | 30 | 5 | 2 | 45 | Function (1C-2) | | 4.30 | Good |
| Example 1D-34 | Magnesium hydrogen phosphate | | 40 | 2 | 40 | 2 | 10 | 2 | 30 | 5 | 2 | 45 | Function (1C-2) | | 4.30 | Good |
| Example 1D-35 | Calcium silicate | | 40 | 2 | 40 | 2 | 10 | 2 | 30 | 5 | 2 | 45 | Function (1C-2) | | 4.30 | Good |
| Example 1D-36 | Zinc silicate | | 40 | 2 | 40 | 2 | 10 | 2 | 30 | 5 | 2 | 45 | Function (1C-2) | | 4.30 | Good |
| Example 1D-37 | Zirconium silicate | | 40 | 2 | 40 | 2 | 10 | 2 | 30 | 5 | 2 | 45 | Function (1C-2) | | 4.30 | Good |
| Example 1D-38 | Aluminum silicate | | 40 | 2 | 40 | 2 | 10 | 2 | 30 | 5 | 2 | 45 | Function (1C-2) | | 4.30 | Good |
| Example 1D-39 | Magnesium silicate | | 40 | 2 | 40 | 2 | 10 | 2 | 30 | 5 | 2 | 45 | Function (1C-2) | | 4.30 | Good |
| Example 1D-40 | Spinel | | 40 | 2 | 40 | 2 | 10 | 2 | 30 | 5 | 2 | 45 | Function (1C-2) | | 4.30 | Good |
| Example 1D-41 | Hydro-calcite | | 40 | 2 | 40 | 2 | 10 | 2 | 30 | 5 | 2 | 45 | Function (1C-2) | | 4.40 | Excellent |
| Example 1D-42 | Dolomite | | 40 | 2 | 40 | 2 | 10 | 2 | 30 | 5 | 2 | 45 | Function (1C-2) | | 4.40 | Excellent |
| Example 1D-43 | Kaolinite | | 40 | 2 | 40 | 2 | 10 | 2 | 30 | 5 | 2 | 45 | Function (1C-2) | | 4.40 | Excellent |

TABLE 26-continued

| | Solid particles | | Solid particle concentration Negative electrode | | Solid particle concentration Positive electrode | | Thickness of region Negative electrode side | | | Thickness of region Positive electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Chemical abort circuit resistance test limit voltage [V] | Determination |
| Example 1D-44 | Sepiolite | | 40 | 2 | 40 | 2 | 10 | 2 | 30 | 5 | 2 | 45 | Function (1C-2) | | 4.40 | Excellent |
| Example 1D-45 | Imogolite | | 40 | 2 | 40 | 2 | 10 | 2 | 30 | 5 | 2 | 45 | Function (1C-2) | | 4.40 | Excellent |
| Example 1D-46 | Sericite | | 40 | 2 | 40 | 2 | 10 | 2 | 30 | 5 | 2 | 45 | Function (1C-2) | | 4.40 | Excellent |
| Example 1D-47 | Pyro-phylate | | 40 | 2 | 40 | 2 | 10 | 2 | 30 | 5 | 2 | 45 | Function (1C-2) | | 4.40 | Excellent |
| Example 1D-48 | Mica | | 40 | 2 | 40 | 2 | 10 | 2 | 30 | 5 | 2 | 45 | Function (1C-2) | | 4.40 | Excellent |
| Example 1D-49 | Zealite | | 40 | 2 | 40 | 2 | 10 | 2 | 30 | 5 | 2 | 45 | Function (1C-2) | | 4.40 | Excellent |
| Example 1D-50 | Mullite | | 40 | 2 | 40 | 2 | 10 | 2 | 30 | 5 | 2 | 45 | Function (1C-2) | | 4.40 | Excellent |
| Example 1D-51 | Saponite | | 40 | 2 | 40 | 2 | 10 | 2 | 30 | 5 | 2 | 45 | Function (1C-2) | | 4.40 | Excellent |
| Example 1D-52 | Attapulgite | | 40 | 2 | 40 | 2 | 10 | 2 | 30 | 5 | 2 | 45 | Function (1C-2) | | 4.40 | Excellent |
| Example 1D-53 | Monmo-flourite | | 40 | 2 | 40 | 2 | 10 | 2 | 30 | 5 | 2 | 45 | Function (1C-2) | | 4.40 | Excellent |
| Example 1D-54 | Ammonium poly-phosphate | | 40 | 2 | 40 | 2 | 10 | 2 | 30 | 5 | 2 | 45 | Function (1C-2) | | 4.30 | Good |
| Example 1D-55 | Melamine cyanurate | | 40 | 2 | 40 | 2 | 10 | 2 | 30 | 5 | 2 | 45 | Function (1C-2) | | 4.30 | Good |
| Example 1D-56 | Melamine poly-phosphate | | 40 | 2 | 40 | 2 | 10 | 2 | 30 | 5 | 2 | 45 | Function (1C-2) | | 4.30 | Good |
| Example 1D-57 | Polyolefin head | | 40 | 2 | 40 | 2 | 10 | 2 | 30 | 5 | 2 | 45 | Function (1C-2) | | 4.25 | Satisfactory |
| Example 1D-58 | Boehmite | 7 | 30 | 2 | 40 | 2 | 16 | 2 | 24 | 8 | 2 | 42 | Function (1C-2) | | 4.30 | Good |
| Example 1D-59 | Boehmite | 18 | 80 | 3 | 80 | 3 | 10 | 2 | 30 | 5 | 2 | 45 | Function (1C-2) | 1 | 4.40 | Excellent |
| Example 1D-60 | Boehmite | 20 | 90 | 3 | 90 | 3 | 10 | 2 | 30 | 5 | 2 | 45 | Function (1C-2) | 1 | 4.30 | Good |
| Example 1D-61 | Boehmite | 10 | 40 | 2 | 40 | 2 | 4 | 2 | 36 | 5 | 2 | 45 | Function (1C-2) | 1 | 4.30 | Good |
| Example 1D-62 | Boehmite | 10 | 30 | 3 | 30 | 3 | 10 | 2 | 30 | 5 | 2 | 45 | Function (1C-2) | 1 | 4.30 | Good |
| Comparative Example 1D-1 | Boehmite | 10 | 40 | 2 | 40 | 2 | 10 | 2 | 30 | 5 | 2 | 45 | Additive-tree | 1 | 4.15 | Fail |
| Comparative Example 1D-2 | Boehmite | | 40 | 2 | 40 | 2 | 10 | 2 | 30 | 5 | 2 | 45 | VEC | 1 | 4.15 | Fail |
| Comparative Example 1D-3 | Not disposed | — | — | — | — | — | — | — | — | — | — | — | Function (1C-2) | 1 | 4.15 | Fail |
| Comparative Example 1D-4 | Boehmite (disposed only a surface of a separator) | 10 | 3 | 0 | 3 | 0 | 0 | 20 | 40 | 0 | 20 | 50 | Function (1C-2) | | 4.15 | Fail |
| Comparative Example 1D-5 | Not disposed | — | — | — | — | — | — | — | — | — | — | — | Additive-tree | — | 4.15 | Fail |

As shown in Table 26, in Example 1D-1 to Example 1D-62, since solid particles were disposed at an appropriate concentration in an appropriate region inside the battery, a resistance to a chemical short circuit was outstanding.

Example 2D-2

In the same manner as in Example 1D-1, a laminated film-type battery was fabricated.

Example 2D-1, and Example 2D-3 to Example 2D-11

In Example 2D-1, and Example 2D-3 to Example 2D-11, laminated film-type batteries were fabricated in the same manner as in Example 2D-2 except that compounds shown in the following Table 27 were added as a dinitrile compound in place of the compound represented by Formula (1C-2) when an electrolyte layer was formed.

(Battery Evaluation: A Metal-Contaminated Precipitation Resistance Test)

In the same manner as in Example 1D-1, a metal-contaminated precipitation resistance test was performed on the fabricated laminated film-type batteries according to the examples.

The evaluation results are shown in Table 27.

1D-1 except that an amount of the compounds represented by Formula (1C-2) added was changed as shown in the following Table 28.

Comparative Example 3D-1

A laminated film-type battery was fabricated in the same manner as in Example 3D-9 except that no boehmite particles were added to a coating solution.

(Battery Evaluation: A Metal-Contaminated Precipitation Resistance Test)

In the same manner as in Example 1D-1, a metal-contaminated precipitation resistance test was performed on the fabricated laminated film-type batteries according to the examples.

(Battery Evaluation: A Charge and Discharge Cycle Test)

The following charge and discharge cycle test was performed on the fabricated laminated film-type batteries according to the examples. At 23° C., a charge voltage of 4.2 V and a current of 1 A, a constant current and constant voltage charge was performed before the total charge time of 5 hours had elapsed, and then a constant current discharge was performed to 3.0 V at a constant current of 0.5 A. A discharge capacity at that time was set as an initial capacity of the battery. Then, a charge and discharge was repeated 500 times under the same conditions, and [discharge capacity of the 500th cycle/initial discharge capacity]×100%) was obtained as a capacity retention rate.

TABLE 27

| | Solid particles | | Additive component | | Battery evaluation | |
|---|---|---|---|---|---|---|
| | Material type | Amount added [mass %] | Material type | Amount added [mass %] | Chemical short circuit resistance test limit voltage [V] | Determination |
| Example 2D-1 | Boehmite | 10 | Formula (1C-1) | 1 | 4.25 | Satisfactory |
| Example 2D-2 | | | Formula (1C-2) | | 4.40 | Excellent |
| Example 2D-3 | | | Formula (1C-3) | | 4.25 | Satisfactory |
| Example 2D-4 | | | Formula (1C-4) | | 4.40 | Excellent |
| Example 2D-5 | | | Formula (1C-5) | | 4.25 | Satisfactory |
| Example 2D-6 | | | Formula (1C-6) | | 4.25 | Satisfactory |
| Example 2D-7 | | | Formula (1C-7) | | 4.25 | Satisfactory |
| Example 2D-8 | | | Formula (1C-8) | | 4.25 | Satisfactory |
| Example 2D-9 | | | Formula (1C-9) | | 4.25 | Satisfactory |
| Example 2D-10 | | | Formula (1C-10) | | 4.25 | Satisfactory |
| Example 2D-11 | | | Formula (1C-11) | | 4.25 | Satisfactory |

As shown in Table 27, in Example 2D-1 to Example 2D-11, since solid particles were disposed at an appropriate concentration in an appropriate region inside the battery, a resistance to a chemical short circuit was outstanding.

Example 3D-1 to Example 3D-9

In Example 3D-1 to Example 3D-9, laminated film-type batteries were fabricated in the same manner as in Example According to a level of the capacity retention rate, determination was performed as follows.

Fail: less than 40%

Satisfactory: 40% or more and less than 50%

Good: 50% or more and less than 60%

Excellent: 60% or more and 100% or less

The evaluation results are shown in Table 28.

TABLE 28

| | Solid particles | | Additive component | | Battery evaluation | | | |
|---|---|---|---|---|---|---|---|---|
| | Material type | Amount added [mass %] | Material type | Amount added [mass %] | Chemical short circuit resistance test limit voltage [V] | Determination | Capacity retention rate after 500 cycles [%] | Determination |
| Example 3D-1 | Boehmite | 10 | Function (1C-2) | 0.01 | 4.25 | Satisfactory | 75 | Excellent |
| Example 3D-2 | | | | 0.02 | 4.30 | Good | 74 | Excellent |
| Example 3D-3 | | | | 0.03 | 4.40 | Excellent | 73 | Excellent |

TABLE 28-continued

| | Solid particles | | Additive component | | Battery evaluation | | | |
|---|---|---|---|---|---|---|---|---|
| | | | | | Chemical short | | Capacity | |
| | Material type | Amount added [mass %] | Material type | Amount added [mass %] | circuit resistance test limit voltage [V] | Determination | retention rate after 500 cycles [%] | Determination |
| Example 3D-4 | | | | 1 | 4.40 | Excellent | 72 | Excellent |
| Example 3D-5 | | | | 2 | 4.40 | Excellent | 70 | Excellent |
| Example 3D-6 | | | | 5 | 4.40 | Excellent | 69 | Excellent |
| Example 3D-7 | | | | 8 | 4.40 | Excellent | 55 | Good |
| Example 3D-8 | | | | 9 | 4.40 | Excellent | 52 | Good |
| Example 3D-9 | | | | 10 | 4.40 | Excellent | 42 | Satisfactory |
| Comparative Example 3D-1 | — | — | Function (1C-2) | 10 | 4.20 | Fail | 18 | Fail |

As shown in Table 28, in Example 3D-1 to Example 3D-9, since solid particles were disposed at an appropriate concentration in an appropriate region inside the battery, a resistance to a chemical short circuit was outstanding.

Example 4D-1 to Example 4D-9

In Example 4D-1 to Example 4D-9, laminated film-type batteries were fabricated in the same manner as in Example 1D-1 except that an amount of solid particles added with respect to electrolytes was changed as shown in the following Table 29.

(Battery Evaluation: A Metal-Contaminated Precipitation Resistance Test)

In the same manner as in Example 1D-1, a metal-contaminated precipitation resistance test was performed on the fabricated laminated film-type batteries according to the examples.

The evaluation results are shown in Table 29.

TABLE 29

| | Solid particles | | Additive component | | Battery evaluation | |
|---|---|---|---|---|---|---|
| | | | | | Chemical short | |
| | Material type | Amount added [mass %] | Material type | Amount added [mass %] | circuit resistance test limit voltage [V] | Determination |
| Example 4D-1 | Boehmite | 1 | Formula (1C-2) | 1 | 4.25 | Satisfactory |
| Example 4D-2 | | 2 | Formula (1C-2) | | 4.30 | Good |
| Example 4D-3 | | 5 | Formula (1C-2) | | 4.30 | Good |
| Example 4D-4 | | 10 | Formula (1C-2) | | 4.40 | Excellent |
| Example 4D-5 | | 20 | Formula (1C-2) | | 4.40 | Excellent |
| Example 4D-6 | | 30 | Formula (1C-2) | | 4.40 | Excellent |
| Example 4D-7 | | 40 | Formula (1C-2) | | 4.40 | Excellent |
| Example 4D-8 | | 50 | Formula (1C-2) | | 4.40 | Excellent |
| Example 4D-9 | | 60 | Formula (1C-2) | | 4.40 | Excellent |

As shown in Table 29, in Example 4D-1 to Example 4D-9, since solid particles were disposed at an appropriate concentration in an appropriate region inside the battery, a resistance to a chemical short circuit was outstanding.

Example 5D- to Example 5D-11

In Example 5D-1 to Example 5D-11, laminated film-type batteries were fabricated in the same manner as in Example 1D-1 except that a particle size and a specific surface area of boehmite particles serving as solid particles were changed as shown in the following Table 30.

(Battery Evaluation: A Metal-Contaminated Precipitation Resistance Test)

In the same manner as in Example 1D-1, a metal-contaminated precipitation resistance test was performed on the fabricated laminated film-type batteries according to the examples.

The evaluation results are shown in Table 30.

TABLE 30

| | Solid particles | | | | Additive component | | Battery evaluation | |
|---|---|---|---|---|---|---|---|---|
| | Material type | Particle size D50 [μm] | BET specific surface area [$m^2$/g] | Amount added [mass %] | Material type | Amount added [mass %] | Chemical short circuit resistance test limit voltage [V] | Determination |
| Example 5D-1 | Boehmite | 1 | 6 | 10 | Formula (1C-2) | 1 | 4.40 | Satisfactory |
| Example 5D-2 | | 0.1 | 60 | | | | 4.25 | Good |
| Example 5D-3 | | 0.2 | 40 | | | | 4.30 | Good |
| Example 5D-4 | | 0.3 | 20 | | | | 4.40 | Excellent |
| Example 5D-5 | | 0.5 | 15 | | | | 4.40 | Excellent |
| Example 5D-6 | | 0.7 | 12 | | | | 4.40 | Excellent |
| Example 5D-7 | | 2 | 3 | | | | 4.40 | Excellent |
| Example 5D-8 | | 3 | 2 | | | | 4.40 | Excellent |
| Example 5D-9 | | 5 | 1.5 | | | | 4.40 | Excellent |
| Example 5D-10 | | 7 | 1.2 | | | | 4.30 | Good |
| Example 5D-11 | | 10 | 1 | | | | 4.25 | Satisfactory |

As shown in Table 30, in Example 5D-1 to Example 5D-11, since solid particles were disposed at an appropriate concentration in an appropriate region inside the battery, a resistance to a chemical short circuit was outstanding.

Example 6D-1

In the same manner as in Example 1D-1, a laminated film-type battery was fabricated.

Example 6D-2

First, in the same manner as in Example 6D-1, a cathode and an anode were fabricated, and a separator was prepared.

Next, in the same manner as in Example 1D-1, the same coating solution as in Example 1D-1 was applied to both surfaces of the separator, a dilution solvent was removed by drying, and a gel-like electrolyte layer was formed on the surfaces of the separator.

Then, the cathode, the anode, and the separator having both surfaces on which the gel-like electrolyte layer was formed were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 6D-3

First, in the same manner as in Example 6D-1, a cathode and an anode were fabricated, and a separator was prepared.

(Formation of a Solid Particle Layer)

Next, paint prepared by mixing solid particles at 22 mass %, PVdF at 3 mass serving as a binder polymer compound, and NMP at 75 mass % serving as a solvent was applied to both surfaces of the separator and the solvent was then removed by drying. Accordingly, a solid particle layer was formed such that a solid component became 0.5 mg/$cm^2$ per one surface.

Next, the cathode, the anode, and the separator having both surfaces on which the solid particle layer was formed were laminated in the order of the cathode, the separator, the anode, and the separator, and then wound in a flat shape multiple times in a longitudinal direction. Then, a winding end portion was fixed by an adhesive tape to form a wound body.

Next, the packed wound conductor was put into heated oil and subjected to isostatic pressing. Accordingly, the solid particles were pushed to the recess between adjacent cathode active material particles positioned on the outermost surface of the cathode active material layer and the recess between adjacent anode active material particles positioned on the outermost surface of the anode active material layer.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 6D-4

First, in the same manner as in Example 6D-1, a cathode and an anode were fabricated, and a separator was prepared.

A coating solution was applied to both surfaces of the separator, and then dried to form a matrix resin layer as follows.

First, boehmite particles, and polyvinylidene fluoride (PVdF) serving as a matrix polymer compound were dispersed in N-methyl-2-pyrrolidone (NMP) to prepare the coating solution. In this case, a content of the boehmite particles was 10 mass % with respect to a total amount of paint, a content of the PVdF was 10 mass % with respect to a total amount of paint, and a content of the NMP was 80 mass % with respect to a total amount of paint.

Next, the coating solution was applied to both surfaces of the separator and then passed through a dryer to remove the NMP. Accordingly, the separator on which a matrix resin layer was formed was obtained.

[Assembly of the Laminated Film-type Battery]

Next, the cathode, the anode and the separator having both surfaces on which the matrix resin layer was formed were laminated in the order of the cathode, the separator, the anode, and the separator, and wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess of the outermost surface of the cathode active material layer and the recess of the outermost surface of the anode active material layer.

Next, the wound electrode body was inserted into the package member, and three sides were subjected to thermal fusion bonding. Note that, in the package member, a laminated film having a soft aluminum layer was used.

Then, an electrolyte solution was injected thereinto and the remaining one side was subjected to thermal fusion bonding under reduced pressure and sealed. In this case, the electrolyte solution was impregnated into a particle-comprising resin layer, and the matrix polymer compound was swollen to form gel-like electrolytes (a gel electrolyte layer). Note that, the same electrolyte solution as in Example 1D-1 was used. Thus, the laminated film-type battery shown in FIG. 1 with a battery shape of 4.5 mm in thickness, 30 mm in width, and 50 mm in height was fabricated.

Example 6D-5

First, in the same manner as in Example 6D-1, a cathode and an anode were fabricated, and a separator was prepared.

(Formation of a Solid Particle Layer)

Paint prepared by mixing solid particles at 22 mass %, PVdF at 3 mass % serving as a binder polymer compound, and NMP at 75 mass % serving as a solvent was applied to both surfaces of each of the cathode and the anode and then the surfaces were scraped. Accordingly, the solid particles were put into the recess impregnation region A of each of the cathode side and the anode side, and the thickness of the recess impregnation region A was set to be twice the thickness of the top coat region B or more. Then, the NMP was removed by drying and a solid particle layer was formed such that a solid component became 0.5 $mg/cm^2$ per one surface.

Next, the cathode and the anode each having both surfaces on which the solid particle layer was formed and the separator were laminated in the order of the cathode, the separator, the anode, and the separator, and then wound in a flat shape multiple times in a longitudinal direction. Then, a winding end portion was fixed by an adhesive tape to form a wound body.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 6D-6

A laminated film-type battery was fabricated in the same manner as in Example 6D-1 except that a gel-like electrolyte layer was formed only on both surfaces of the cathode.

Example 6D-7

A laminated film-type battery was fabricated in the same manner as in Example 6D-1 except that a gel-like electrolyte layer was formed only on both surfaces of the anode.

(Battery Evaluation: A Metal-Contaminated Precipitation Resistance Test)

In the same manner as in Example 1D-1, a metal-contaminated precipitation resistance test was performed on the fabricated laminated film-type batteries according to the examples.

The evaluation results are shown in Table 31.

TABLE 31

| | Solid particles | | Additive component | | Overview of method of disposing solid particles | | | Battery evaluation | |
|---|---|---|---|---|---|---|---|---|---|
| | Material type | Amount added [mass %] | Material type | Amount added [mass %] | Results formed through coating | Coating target | *Remarks | Chemical short circuit resistance test limit voltage [V] | Determination |
| Example 6D-1 | Boehmite | 10 | Formula (1C-2) | 1 | Gel electrolytes containing solid particles | Positive electrode and negative electrode | Gel electrolytes are heated and applied, and some of the applied gel electrolytes are scraped off | 4.40 | Excellent |
| Example 6D-2 | | | | | Gel electrolytes containing solid particles | Separator | Heating and pressing process (isostatic pressing) is provided | 4.25 | Satisfactory |
| Example 6D-3 | | | | | Solid particle layer | Separator | Heating and pressing process (isostatic pressing) is provided | 4.40 | Excellent |

TABLE 31-continued

| | Solid particles: Material type | Solid particles: Amount added [mass %] | Additive component: Material type | Additive component: Amount added [mass %] | Overview of method of disposing solid particles: Results formed through coating | Overview of method of disposing solid particles: Coating target | Overview of method of disposing solid particles: *Remarks | Battery evaluation: Chemical short circuit resistance test limit voltage [V] | Battery evaluation: Determination |
|---|---|---|---|---|---|---|---|---|---|
| Example 6D-4 | | | | | Matrix resin layer | Separator | Heating and pressing process (isostatic pressing) is provided | 4.40 | Excellent |
| Example 6D-5 | | | | | Solid particle layer | Positive electrode and negative electrode | After application, a solid particle layer is partially scraped off | 4.40 | Excellent |
| Example 6D-6 | | | | | Gel electrolytes containing solid particles | Positive electrode | Gel electrolytes are heated and applied, and some of the applied gel electrolytes are scraped off | 4.30 | Good |
| Example 6D-7 | | | | | Gel electrolytes containing solid particles | Negative electrode | Gel electrolytes are heated and applied, and some of the applied gel electrolytes are scraped off | 4.30 | Good |

As shown in Table 31, in Example 6D-1 to Example 6D-7, since solid particles were disposed at an appropriate concentration in an appropriate region inside the battery, a resistance to a chemical short circuit was outstanding.

Example 7D-1

Next, a rectangular cathode, a rectangular anode, and a rectangular separator whose configurations were the same as those in Example 1D-1 were fabricated except for their rectangular shapes.

(Formation of a Solid Particle Layer)

Next, in the same manner as in Example 6D-3, a solid particle layer was formed on both surfaces of the separator.

(Formation of a Stacked Electrode Body)

Next, the cathode, the separator, the anode, and the separator were sequentially laminated to form a stacked electrode body.

Next, the packed stacked electrode body was put into heated oil and subjected to isostatic pressing. Accordingly, the solid particles were pushed to the recess of the outermost surface of the cathode active material layer and the recess of the outermost surface of the anode active material.

Next, the stacked electrode body was packaged with a laminated film having a soft aluminum layer, three sides around the stacked electrode body were sealed up and closed tight by thermal fusion bonding. Then, the same electrolyte solution as in Example 1D-1 was injected thereinto and the remaining one side was sealed by thermal fusion bonding under reduced pressure. Accordingly, the laminated film-type battery shown in FIG. 4A to FIG. 4C with a battery shape of 4.5 mm in thickness, 30 mm in width, and 50 mm in height was fabricated.

Example 7D-2

In the same manner as in Example 6D-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

Next, a cathode terminal was combined with a safety valve with which a battery lid was combined, and an anode terminal was connected to an anode can. The stacked electrode body was inserted between a pair of insulating plates and accommodated inside a battery can.

Next, the non-aqueous electrolyte solution was injected into the cylindrical battery can from the top of the insulating plate. Finally, at an opening of the battery can, a battery lid was caulked and closed tight through an insulation sealing gasket. Accordingly, a cylindrical battery with a battery shape of 18 mm in diameter and 65 mm in height (ICR18650 size) was fabricated.

Example 7D-3

In the same manner as in Example 7D-1, a stacked electrode body was formed and the packed stacked electrode body was put into heated oil and subjected to isostatic pressing. Accordingly, the solid particles were pushed to the recess of the outermost surface of the cathode active material layer and the recess of the outermost surface of the anode active material layer.

[Assembly of the Rectangular Battery]

Next, the stacked electrode body was housed in a rectangular battery can. Subsequently, an electrode pin provided at a battery lid and a cathode terminal led out from the stacked electrode body were connected. Then, the battery can was sealed by the battery lid, the non-aqueous electrolyte solution was injected through an electrolyte solution inlet, and sealed up and closed tight by a sealing member. Accordingly, the rectangular battery with a battery shape of 4.5 mm in thickness, 30 mm in width and 50 mm in height (453050 size) was fabricated.

Example 7D-4 to Example 7D-6

Laminated film-type batteries were fabricated in the same manner as in Example 7D-1 to Example 7D-3 except that a nonwoven fabric was prepared in place of a polyethylene separator, the same coating solution as in Example 7D-1 was applied to both surfaces of the nonwoven fabric, the solvent was then removed by drying, and accordingly a solid particle layer was formed such that an area density became 0.5 mg/cm$^2$ per one surface.

Example 7D-7

In Example 7D-7, the same laminated film-type battery as in Example 1D-1 was used to fabricate a simple battery pack (a soft pack) shown in FIG. 8 and FIG. 9.

(Battery Evaluation: A Metal-contaminated Precipitation Resistance Test)

In the same manner as in Example 1D-1, a metal-contaminated precipitation resistance test was performed on the fabricated laminated film-type batteries according to the examples. Note that, in Example 7D-7, a voltage was adjusted assuming that a voltage was actually applied to the battery included in the battery pack.

The evaluation results are shown in Table 32.

N-methyl-2-pyrrolidone (NMP), which is a dispersion medium, to prepare a cathode mixture slurry.

The cathode mixture slurry was applied to both surfaces of a cathode current collector formed of a band-like piece of aluminum foil with a thickness of 12 μm in such a manner that part of the cathode current collector was exposed. After that, the dispersion medium of the applied cathode mixture slurry was evaporated to dryness, and compression molding was performed by roll pressing; thereby, a cathode active material layer was formed. Finally, a cathode terminal was attached to the exposed portion of the cathode current collector; thus, a cathode was formed. Note that an area density of the cathode active material layer was adjusted to 30 mg/cm$^2$.

[Fabrication of an Anode]

96 mass % of granular graphite particle (particle size D50: 20 μm), which is the anode active material, 1.5 mass % of an acrylic acid-modified product of a styrene-butadiene copolymer as a binder, and 1.5 mass % of carboxymethyl cellulose as a thickener were mixed together to prepare an

TABLE 32

| | Solid particles | | Additive component | | | | Battery evaluation | |
|---|---|---|---|---|---|---|---|---|
| | Material type | Amount added [mass %] | Material type | Amount added [mass %] | Battery form | | Chemical short circuit resistance test limit voltage [V] | Determination |
| Example 7D-1 | Boehmite | 10 | Function (1C-2) | 1 | Form a solid particle layer on a polyethylene separator | Stacked lamininated film-type battery | 4.40 | Excellent |
| Example 7D-2 | | | Function (1C-2) | | Form a solid particle layer on a polyethylene separator | Cylindrical battery in which a stacked electrode body is housed in a cylindrical can | 4.40 | Excellent |
| Example 7D-3 | | | Function (1C-2) | | Form a solid particle layer on a polyethylene separator | Rectangular battery in which a stacked electrode body is housed is a rectangular can | 4.40 | Excellent |
| Example 7D-4 | | | Function (1C-2) | | Form a solid particle layer on a nonwoven fabric | Stacked lamininated film-type battery | 4.40 | Excellent |
| Example 7D-5 | | | Function (1C-2) | | Form a solid particle layer on a nonwoven fabric | Cylindrical battery in which a stacked electrode body is housed in a cylindrical can | 4.40 | Excellent |
| Example 7D-6 | | | Function (1C-2) | | Form a solid particle layer on a nonwoven fabric | Rectangular battery in which a stacked electrode body is housed is a rectangular can | 4.40 | Excellent |
| Example 7D-7 | | | Function (1C-2) | | Form a solid particle layer on a polyethylene separator | Battery pack of a liminated film-type battery | 4.40 | Excellent |

As shown in Table 32, in Example 7D-1 to Example 7D-7, since solid particles were disposed at an appropriate concentration in an appropriate region inside the battery, a resistance to a chemical short circuit was outstanding.

Example 1E-1

[Fabrication of a Cathode]

91 mass % of lithium cobaltate ($LiCoO_2$) particles (particle size D50: 10 μm), which is the cathode active material, 6 mass % of carbon black, which is an electrically conductive agent, and 3 mass % of polyvinylidene difluoride (PVdF), which is a binder, were mixed together to prepare a cathode mixture, and the cathode mixture was dispersed in anode mixture, and an appropriate amount of water was added and stirring was performed to prepare an anode mixture slurry.

The anode mixture slurry was applied to both surfaces of an anode current collector formed of a band-like piece of copper foil with a thickness of 15 μm in such a manner that part of the anode current collector was exposed. After that, the dispersion medium of the applied anode mixture slurry was evaporated to dryness, and compression molding was performed by roll pressing; thereby, an anode active material layer was formed. Finally, an anode terminal was attached to the exposed portion of the cathode current collector, thus, an anode was formed. Note that an area density of the anode active material layer was adjusted to 15 mg/cm$^2$.

[Fabrication of a Separator]

As the separator, a polyethylene (PE) microporous film (a polyethylene separator) having a thickness of 5 μm was prepared.

[Formation of an Electrolyte Layer]

In a non-aqueous solvent in which ethylene carbonate (EC) and diethyl carbonate (DEC) were mixed, the compound represented by Formula (5D-1) (an additive component) and lithium hexafluorophosphate ($LiPF_6$) were dissolved as electrolyte salts, and accordingly the non-aqueous electrolyte solution was prepared. Note that a composition of the non-aqueous electrolyte solution had a mass ratio that was adjusted to EC/DEC/the compound represented by Formula (5D-1)/$LiPF_6$=20/70/0.1/9.9. A content of the compound represented by Formula (5D-1) in the non-aqueous electrolyte solution was 0.1 mass % based on a percentage by mass with respect to a total amount of the non-aqueous electrolyte solution.

Next, polyvinylidene fluoride (PVdF) was used as a matrix polymer compound (a resin) that retains the non-aqueous electrolyte solution. The non-aqueous electrolyte solution, the polyvinylidene fluoride, dimethyl carbonate (DMC) serving as a dilution solvent, and boehmite particles (particle size D50: 1 μm) serving as solid particles were mixed to prepare a sol-like coating solution. Note that a composition of the coating solution includes the solid particles at 10 mass %, the resin at 5 mass %, the non-aqueous electrolyte solution at 35 mass %, and the dilution solvent at 50 mass %, based on a percentage by mass with respect to a total amount of the coating solution.

Next, the coating solution was heated and applied to both surfaces of each of the cathode and the anode, the dilution solvent (DMC) was removed by drying, and a gel-like electrolyte layer having an area density of 3 mg/cm$^2$ per one surface was formed on the surfaces of the cathode and the anode. When the coating solution was heated and applied, electrolytes comprising boehmite particles serving as solid particles could be impregnated into the recess between adjacent active material particles positioned on the outermost surface of the anode active material layer or an inside of the active material layer. In this case, when the solid particles were filtered in the recess between adjacent particles, a concentration of the particles in the recess impregnation region A of the anode side increased. Accordingly, it is possible to set a difference of concentrations of particles between the recess impregnation region A and the deep region C. By partially scraping off the coating solution, the thickness of the recess impregnation region A and the top coat region B was adjusted as shown in Table 33, more solid particles were sent to the recess impregnation region A, and the solid particles remained in the recess impregnation region A. Note that some solid particles having a particle size of $2/\sqrt{3}-1$ times a particle size D50 of anode active materials or more were added, and a particle size D95 of solid particles was prepared to be $2/\sqrt{3}-1$ times a particle size D50 of anode active material particles or more (3.5 μm), which were used as the solid particles. Accordingly, an interval between particles at a bottom of the recess was filled with some solid particles having a large particle size and the solid particles could be easily filtered.

[Assembly of the Laminated Film-type Battery]

The cathode and the anode each having both surfaces on which the electrolyte layer was formed and the separator were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 1E-2to Example 1E-57

In Example 1E-2 to Example 1E-57, laminated film-type batteries were fabricated in the same manner as in Example 1E-1 except that particles to be used were changed as shown in the following Table 33.

Example 1E-58

In Example 1E-58, a laminated film-type battery was fabricated in the same manner as in Example 1E-1 except that, when a coating solution to be applied to an anode was prepared, a content of solid particles decreased to 7 mass %, and an amount of DMC for decrementing the solid particles increased.

Example 1E-59

In Example 1E-59, a laminated film-type battery was fabricated in the same manner as in Example 1E-1 except that, when a coating solution to be applied to an anode was prepared, a content of solid particles increased to 18 mass % and an amount of DMC for incrementing solid particles decreased.

Example 1E-60

In Example 1E-60, a laminated film-type battery was fabricated in the same manner as in Example 1E-1 except that, when a coating solution to be applied to an anode was prepared, a content of solid particles increased to 20 mass %, an amount of DMC for incrementing solid particles decreased.

Example 1E-61

In Example 1E-61, a laminated film-type battery was fabricated in the same manner as in Example 1E-1 except that, when a gel electrolyte layer was formed on an anode, a coating solution was slightly scraped off.

Example 1E-62

In Example 1E-62, a laminated film-type battery was fabricated in the same manner as in Example 1E-1 except that some solid particles having a particle size of $2/\sqrt{3}-1$ or more times a particle size D50 of anode active materials were added, and a particle size D95 of solid particles was prepared to be $2/\sqrt{3}-1$ or more times a particle size D50 of anode active material particles (3.1 μm), which were used as the solid particles.

Comparative Example 1E-1

A laminated film-type battery was fabricated in the same manner as in Example 1E-1 except that no compound represented by Formula (5D-1) was added to the non-aqueous electrolyte solution.

Comparative Example 1E-2

A laminated film-type battery was fabricated in the same manner as in Example 1E-1 except that vinyl ethylene carbonate (VEC) in place of the compound represented by Formula (5D-1) was added at 1 mass % to the non-aqueous electrolyte solution.

Comparative Example 1E-3

A laminated film-type battery was fabricated in the same manner as in Example 1E-1 except that no boehmite particles were added to a coating solution.

Comparative Example 1E-4

A laminated film-type battery was fabricated in the same manner as in Example 1E-1 except that a gel-like electrolyte layer was formed on both principal surfaces of a separator in place of formation of a gel-like electrolyte layer on an electrode. Note that, in this example, since most of the solid particles comprised in the electrolyte layer formed on the surfaces of the separator do not enter the recess between adjacent active material particles positioned on the outermost surface of the active material layer, a concentration of solid particles of the recess impregnation region A decreased.

Comparative Example 1E-5

A laminated film-type battery was fabricated in the same manner as in Example 1E-1 except that no boehmite particles were added to a coating solution, and no compound represented by Formula (5D-1) was added to the non-aqueous electrolyte solution.

(Measurement of a Particle Size of Particles and Measurement of a BET Specific Surface Area)

In the above-described examples and comparative examples, a particle size of particles and a BET specific surface area were measured or evaluated as follows (the same in the following examples)

(Measurement of a Particle Size)

In a particle size distribution in which solid particles after electrolyte components and the like were removed from the electrolyte layer were measured by a laser diffraction method, a particle size at which 50% of particles having a smaller particle size were cumulated (a cumulative volume of 50%) was set as a particle size D50 of particles. Note that, as necessary, a value of a particle size D95 at a cumulative volume of 95% was also obtained from the measured particle size distribution. Similarly, in active material particles, particles in which components other than active materials were removed from the active material layer were measured in the same manner.

(Measurement of a BET Specific Surface Area)

In solid particles after electrolyte components and the like were removed from the electrolyte layer, a BET specific surface area was obtained using a BET specific surface area measurement device.

(Measurement of a Concentration of Solid Particles, and the Recess Impregnation Region A, the Top Coat Region B, and the Deep Region C)

Observation was performed in four observation fields of view with a visual field width of 50 μm using an SEM. In each of the observation fields of view, the thickness of the impregnation region A, the top coat region B, and the deep region C and a concentration of particles of the regions were measured. In an observation field of view of 2 μm×2 μm in the regions, an area percentage ((“total area of particle cross section”÷“area of observation field of view”)×100%) of a total area of a particle cross section was obtained and therefore the concentration of the particles was obtained.

(Battery Evaluation: An Overcharge Limit Test)

The following overcharge limit test was performed on the fabricated batteries. A constant current/constant voltage charge of 1 A/4.2 V was performed for 5 hours. Then, a charge equivalent to 50% (30 minutes) of the capacity was added at a constant current of 1 A. A battery in which no internal short circuit was caused and a voltage can be maintained was determined as pass. An additional charge was performed by 50% to a maximum of 150% on the battery that has passed. A battery in which a voltage was not maintained due to an internal short circuit was not subjected to an additional charge. It was determined to have failed when the additional charge did not reach 50% (overcharge resistance test limit capacity<150%), it was determined as satisfactory when the additional charge reached 50% (150%≤overcharge resistance test limit capacity<200%), it was determined as good when the additional charge reached 100% (200%≤overcharge resistance test limit capacity<250%), and it was determined as excellent when the additional charge reached 150% (250%≤overcharge resistance test limit capacity). Note that “above 250%” in the table indicates 250% or more.

The evaluation results are shown in Table 33.

TABLE 33

| | Solid particles | | Solid particle concentration Negative electrode | | Solid particle concentration Positve electrode | | Thickness of regions Negative electrode side | | | Thickness of regions Positve electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Overcharge resistance test limit capacity | Determination |
| Example 1E-1 | Boehmite | 10 | 40 | 2 | 40 | 2 | 10 | 2 | 30 | 5 | 2 | 45 | Function (5D-1) | 0.1 | Above 250% | Excellent |
| Example 1E-2 | Talc | | 40 | 2 | 40 | 2 | 10 | 2 | 30 | 5 | 2 | 45 | Function (5D-1) | | Above 250% | Excellent |
| Example 1E-3 | Zinc oxide | | 40 | 2 | 40 | 2 | 10 | 2 | 30 | 5 | 2 | 45 | Function (5D-1) | | 180% | Satisfactory |
| Example 1E-4 | Tin oxide | | 40 | 2 | 40 | 2 | 10 | 2 | 30 | 5 | 2 | 45 | Function (5D-1) | | 180% | Satisfactory |
| Example 1E-5 | Silicon oxide | | 40 | 2 | 40 | 2 | 10 | 2 | 30 | 5 | 2 | 45 | Function (5D-1) | | 180% | Satisfactory |
| Example 1E-6 | Magnesium oxide | | 40 | 2 | 40 | 2 | 10 | 2 | 30 | 5 | 2 | 45 | Function (5D-1) | | 180% | Satisfactory |
| Example 1E-7 | Antimony oxide | | 40 | 2 | 40 | 2 | 10 | 2 | 30 | 5 | 2 | 45 | Function (5D-1) | | 180% | Satisfactory |
| Example 1E-8 | Aluminum oxide | | 40 | 2 | 40 | 2 | 10 | 2 | 30 | 5 | 2 | 45 | Function (5D-1) | | 230% | Good |
| Example 1E-9 | Magnesium sulfate | | 40 | 2 | 40 | 2 | 10 | 2 | 30 | 5 | 2 | 45 | Function (5D-1) | | 180% | Satisfactory |
| Example 1E-10 | Calcium sulfate | | 40 | 2 | 40 | 2 | 10 | 2 | 30 | 5 | 2 | 45 | Function (5D-1) | | 180% | Satisfactory |
| Example 1E-11 | Barium sulfate | | 40 | 2 | 40 | 2 | 10 | 2 | 30 | 5 | 2 | 45 | Function (5D-1) | | 180% | Satisfactory |
| Example 1E-12 | Strontium sulfate | | 40 | 2 | 40 | 2 | 10 | 2 | 30 | 5 | 2 | 45 | Function (5D-1) | | 180% | Satisfactory |
| Example 1E-13 | Magnesium carbonate | | 40 | 2 | 40 | 2 | 10 | 2 | 30 | 5 | 2 | 45 | Function (5D-1) | | 180% | Satisfactory |
| Example 1E-14 | Calcium carbonate | | 40 | 2 | 40 | 2 | 10 | 2 | 30 | 5 | 2 | 45 | Function (5D-1) | | 180% | Satisfactory |
| Example 1E-15 | Barium carbonate | | 40 | 2 | 40 | 2 | 10 | 2 | 30 | 5 | 2 | 45 | Function (5D-1) | | 180% | Satisfactory |
| Example 1E-16 | Lithium carbonate | | 40 | 2 | 40 | 2 | 10 | 2 | 30 | 5 | 2 | 45 | Function (5D-1) | | 180% | Satisfactory |
| Example 1E-17 | Magnesium hydroxide | | 40 | 2 | 40 | 2 | 10 | 2 | 30 | 5 | 2 | 45 | Function (5D-1) | | Above 250% | Excellent |
| Example 1E-18 | Aluminum hydroxide | | 40 | 2 | 40 | 2 | 10 | 2 | 30 | 5 | 2 | 45 | Function (5D-1) | | Above 250% | Excellent |
| Example 1E-19 | Zinc hydroxide | | 40 | 2 | 40 | 2 | 10 | 2 | 30 | 5 | 2 | 45 | Function (5D-1) | | Above 250% | Excellent |
| Example 1E-20 | Boron carbide | | 40 | 2 | 40 | 2 | 10 | 2 | 30 | 5 | 2 | 45 | Function (5D-1) | | 230% | Good |

TABLE 33-continued

| | Solid particles | | Solid particle concentration Negative electrode | | Solid particle concentration Positve electrode | | Thickness of regions Negative electrode side | | | Thickness of regions Positve electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [μm] | Top coat region [μm] | Deep region [μm] | Recess impregnation region [μm] | Top coat region [μm] | Deep region [μm] | Material type | Amount added [mass %] | Overcharge resistance test limit capacity | Determination |
| Example 1E-21 | Silicon carbide | | 40 | 2 | 40 | 2 | 10 | 2 | 30 | 5 | 2 | 45 | Function (5D-1) | | Above 250% | Excellent |
| Example 1E-22 | Silicon nitride | | 40 | 2 | 40 | 2 | 10 | 2 | 30 | 5 | 2 | 45 | Function (5D-1) | | 230% | Good |
| Example 1E-23 | Boron nitride | | 40 | 2 | 40 | 2 | 10 | 2 | 30 | 5 | 2 | 45 | Function (5D-1) | | Above 250% | Excellent |
| Example 1E-24 | Aluminum nitride | | 40 | 2 | 40 | 2 | 10 | 2 | 30 | 5 | 2 | 45 | Function (5D-1) | | Above 250% | Excellent |
| Example 1E-25 | Titanium nitride | | 40 | 2 | 40 | 2 | 10 | 2 | 30 | 5 | 2 | 45 | Function (5D-1) | | 230% | Good |
| Example 1E-26 | Lithium fluoride | | 40 | 2 | 40 | 2 | 10 | 2 | 30 | 5 | 2 | 45 | Function (5D-1) | | 230% | Good |
| Example 1E-27 | Aluminum fluoride | | 40 | 2 | 40 | 2 | 10 | 2 | 30 | 5 | 2 | 45 | Function (5D-1) | | 230% | Good |
| Example 1E-28 | Calcium fluoride | | 40 | 2 | 40 | 2 | 10 | 2 | 30 | 5 | 2 | 45 | Function (5D-1) | | 230% | Good |
| Example 1E-29 | Barium fluoride | | 40 | 2 | 40 | 2 | 10 | 2 | 30 | 5 | 2 | 45 | Function (5D-1) | | 230% | Good |
| Example 1E-30 | Magnesium fluoride | 10 | 40 | 2 | 40 | 2 | 10 | 2 | 30 | 5 | 2 | 45 | Function (5D-1) | 0.1 | 230% | Good |
| Example 1E-31 | Diamond | | 40 | 2 | 40 | 2 | 10 | 2 | 30 | 5 | 2 | 45 | Function (5D-1) | | Above 250% | Excellent |
| Example 1E-32 | Trilithium phosphate | | 40 | 2 | 40 | 2 | 10 | 2 | 30 | 5 | 2 | 45 | Function (5D-1) | | 230% | Good |
| Example 1E-33 | Magnesium phosphate | | 40 | 2 | 40 | 2 | 10 | 2 | 30 | 5 | 2 | 45 | Function (5D-1) | | 230% | Good |
| Example 1E-34 | Magnesium hydrogen phosphate | | 40 | 2 | 40 | 2 | 10 | 2 | 30 | 5 | 2 | 45 | Function (5D-1) | | 230% | Good |
| Example 1E-35 | Calcium silicate | | 40 | 2 | 40 | 2 | 10 | 2 | 30 | 5 | 2 | 45 | Function (5D-1) | | 230% | Good |
| Example 1E-36 | Zinc silicate | | 40 | 2 | 40 | 2 | 10 | 2 | 30 | 5 | 2 | 45 | Function (5D-1) | | 230% | Good |
| Example 1E-37 | Zirconium silicate | | 40 | 2 | 40 | 2 | 10 | 2 | 30 | 5 | 2 | 45 | Function (5D-1) | | 230% | Good |
| Example 1E-38 | Aluminum silicate | | 40 | 2 | 40 | 2 | 10 | 2 | 30 | 5 | 2 | 45 | Function (5D-1) | | 230% | Good |
| Example 1E-39 | Magnesium silicate | | 40 | 2 | 40 | 2 | 10 | 2 | 30 | 5 | 2 | 45 | Function (5D-1) | | 230% | Good |
| Example 1E-40 | Spinel | | 40 | 2 | 40 | 2 | 10 | 2 | 30 | 5 | 2 | 45 | Function (5D-1) | | 230% | Good |

TABLE 33-continued

| | Solid particles | | Solid particle concentration Negative electrode Recess | | Solid particle concentration Positve electrode Recess | | Thickness of regions Negative electrode side Recess | Top | | Positve electrode side Recess | Top | | Additive component | | Battery evaluation Overcharge | |
|---|---|---|---|---|---|---|---|---|---|---|---|---|---|---|---|---|
| | Material type | Amount added [mass %] | impregnation region [volume %] | Deep region [volume %] | impregnation region [volume %] | Deep region [volume %] | impregnation region [μm] | coat region [μm] | Deep region [μm] | impregnation region [μm] | coat region [μm] | Deep region [μm] | Material type | Amount added [mass %] | resistance test limit capacity | Determination |
| Example 1E-41 | Hydrotalcite | | 40 | 2 | 40 | 2 | 10 | 2 | 30 | 5 | 2 | 45 | Function (5D-1) | | Above 250% | Excellent |
| Example 1E-42 | Dolomite | | 40 | 2 | 40 | 2 | 10 | 2 | 30 | 5 | 2 | 45 | Function (5D-1) | | Above 250% | Excellent |
| Example 1E-43 | Kaolinite | | 40 | 2 | 40 | 2 | 10 | 2 | 30 | 5 | 2 | 45 | Function (5D-1) | | Above 250% | Excellent |
| Example 1E-44 | Sepiolite | | 40 | 2 | 40 | 2 | 10 | 2 | 30 | 5 | 2 | 45 | Function (5D-1) | | Above 250% | Excellent |
| Example 1E-45 | Imogolite | | 40 | 2 | 40 | 2 | 10 | 2 | 30 | 5 | 2 | 45 | Function (5D-1) | | Above 250% | Excellent |
| Example 1E-46 | Sericite | | 40 | 2 | 40 | 2 | 10 | 2 | 30 | 5 | 2 | 45 | Function (5D-1) | | Above 250% | Excellent |
| Example 1E-47 | Pyrophyllite | | 40 | 2 | 40 | 2 | 10 | 2 | 30 | 5 | 2 | 45 | Function (5D-1) | | Above 250% | Excellent |
| Example 1E-48 | Mica | | 40 | 2 | 40 | 2 | 10 | 2 | 30 | 5 | 2 | 45 | Function (5D-1) | | Above 250% | Excellent |
| Example 1E-49 | Zeolite | | 40 | 2 | 40 | 2 | 10 | 2 | 30 | 5 | 2 | 45 | Function (5D-1) | | Above 250% | Excellent |
| Example 1E-50 | Mullite | | 40 | 2 | 40 | 2 | 10 | 2 | 30 | 5 | 2 | 45 | Function (5D-1) | | Above 250% | Excellent |
| Example 1E-51 | Saponite | | 40 | 2 | 40 | 2 | 10 | 2 | 30 | 5 | 2 | 45 | Function (5D-1) | | Above 250% | Excellent |
| Example 1E-52 | Attapulgite | | 40 | 2 | 40 | 2 | 10 | 2 | 30 | 5 | 2 | 45 | Function (5D-1) | | Above 250% | Excellent |
| Example 1E-53 | Montmorillonite | | 40 | 2 | 40 | 2 | 10 | 2 | 30 | 5 | 2 | 45 | Function (5D-1) | | Above 250% | Excellent |
| Example 1E-54 | Ammonium polyphosphate | | 40 | 2 | 40 | 2 | 10 | 2 | 30 | 5 | 2 | 45 | Function (5D-1) | | 230% | Good |
| Example 1E-55 | Melamine cyanurate | | 40 | 2 | 40 | 2 | 10 | 2 | 30 | 5 | 2 | 45 | Function (5D-1) | | 230% | Good |
| Example 1E-56 | Melamine polyphophate | | 40 | 2 | 40 | 2 | 10 | 2 | 30 | 5 | 2 | 45 | Function (5D-1) | | 230% | Good |
| Example 1E-57 | Polyolefin bead | | 40 | 2 | 40 | 2 | 10 | 2 | 30 | 5 | 2 | 45 | Function (5D-1) | | 180% | Satisfactory |
| Example 1E-58 | Boehmite | 7 | 40 | 2 | 40 | 2 | 16 | 2 | 24 | 8 | 2 | 42 | Function (5D-1) | | 230% | Good |
| Example 1E-59 | Boehmite | 18 | 80 | 3 | 80 | 3 | 10 | 2 | 30 | 5 | 2 | 45 | Function (5D-1) | 0.1 | Above 250% | Excellent |
| Example 1E-60 | Boehmite | 20 | 90 | 3 | 90 | 3 | 10 | 2 | 30 | 5 | 2 | 45 | Function (5D-1) | 0.1 | 230% | Good |
| Example 1E-61 | Boehmite | 10 | 40 | 2 | 40 | 2 | 4 | 2 | 36 | 5 | 2 | 45 | Function (5D-1) | 0.1 | 230% | Good |

TABLE 33-continued

| | Solid particles | | Solid particle concentration Negative electrode | | Solid particle concentration Positve electrode | | Thickness of regions Negative electrode side | | | Thickness of regions Positve electrode side | | | Additive component | | Battery evaluation | |
|---|---|---|---|---|---|---|---|---|---|---|---|---|---|---|---|---|
| | Material type | Amount added [mass %] | Recess impregnation region [volume %] | Deep region [volume %] | Recess impregnation region [volume %] | Deep region [volume %] | Recess impregnation region [µm] | Top coat region [µm] | Deep region [µm] | Recess impregnation region [µm] | Top coat region [µm] | Deep region [µm] | Material type | Amount added [mass %] | Overcharge resistance test limit capacity | Determination |
| Example 1E-62 | Boehmite | 10 | 30 | 3 | 30 | 3 | 10 | 2 | 30 | 5 | 2 | 45 | Function (5D-1) | 0.1 | 230% | Good |
| Comparative Example 1D-1 | Boehmite | 10 | 40 | 2 | 40 | 2 | 10 | 2 | 30 | 5 | 2 | 45 | Additive-free | — | 120% | Fail |
| Comparative Example 1D-2 | Boehmite | | 40 | 2 | 40 | 2 | 10 | 2 | 30 | 5 | 2 | 45 | VEC | 1 | 120% | Fail |
| Comparative Example 1D-3 | Not disposed | — | — | — | — | — | — | — | — | — | — | — | Function (5D-1) | 0.1 | 120% | Fail |
| Comparative Example 1D-4 | Boehmite (disposed only a surface of a separator) | 10 | 3 | 0 | 3 | 0 | 0 | 20 | 40 | 0 | 20 | 50 | Function (5D-1) | | 120% | Fail |
| Comparative Example 1D-5 | Not disposed | — | — | — | — | — | — | — | — | — | — | — | Additive-free | — | 120% | Fail |

As shown in Table 33, in Example 1E-1 to Example 1E-62, since solid particles were disposed at an appropriate concentration in an appropriate region inside the battery, an overcharge resistance was outstanding.

Example 2E-20

In the same manner as in Example 1E-1, a laminated film-type battery was fabricated.

Example 2E-1 to Example 2E-19, and Example 2E-21 to Example 2E-24

In Example 2E-1 to Example 2E-19, and Example 2E-21 to Example 2E-24, laminated film-type batteries were fabricated in the same manner as in Example 2E-20 except that compounds shown in the following Table 34 were added as an electrolyte salt in place of the compound represented by Formula (5D-1) when an electrolyte layer was formed.

(Battery Evaluation: An Overcharge Limit Test)

In the same manner as in Example 1E-1, an overcharge limit test was performed on the fabricated laminated film type-batteries according to the examples.

The evaluation results are shown in Table 34.

1E-1 except that an amount of the compounds represented by Formula (5D-1) added was changed as shown in the following Table 35.

Comparative Example 3E-1

A laminated film-type battery was fabricated in the same manner as in Example 3E-9 except that no boehmite particles were added to a coating solution.

(Battery Evaluation: An Overcharge Limit Test)

In the same manner as in Example 1E-1, an overcharge limit test was performed on the fabricated laminated film type-batteries according to the examples.

(Battery Evaluation: A Charge and Discharge Cycle Test)

The following charge and discharge cycle test was performed on the fabricated laminated film-type batteries according to the examples. At 23° C., a charge voltage of 4.2 V and a current of 1 A, a constant current and constant voltage charge was performed before the total charge time of 5 hours had elapsed, and then a constant current discharge was performed to 3.0 V at a constant current of 0.5 A. A discharge capacity at that time was set as an initial capacity of the battery. Then, a charge and discharge was repeated 500 times under the same conditions, and [discharge capacity of the 500th cycle/initial discharge capacity]×100(%) was obtained as a capacity retention rate.

According to a level of the capacity retention rate, determination was performed as follows.

Fail: less than 40%

Satisfactory: 40% or more and less than 50%

Good: 50% or more and less than 60%

Excellent: 60% or more and 100% or less

TABLE 34

| | Solid particles | | Additive component | | Battery evaluation | |
|---|---|---|---|---|---|---|
| | Material type | Amount added [mass %] | Material type | Amount added [mass %] | Overcharge resistance test limit capacity | Determination |
| Example 2E-1 | Boehmite | 10 | Function (1D-1) | 0.1 | Above 250% | Excellent |
| Example 2E-2 | | | Function (1D-2) | | 220% | Good |
| Example 2E-3 | | | Function (1D-3) | | 220% | Good |
| Example 2E-4 | | | Function (1D-4) | | 220% | Good |
| Example 2E-5 | | | Function (1D-5) | | 220% | Good |
| Example 2E-6 | | | Function (1D-6) | | Above 250% | Excellent |
| Example 2E-7 | | | Function (2D-1) | | 180% | Satisfactory |
| Example 2E-8 | | | Function (2D-2) | | 180% | Satisfactory |
| Example 2E-9 | | | Function (2D-3) | | 180% | Satisfactory |
| Example 2E-10 | | | Function (2D-4) | | 180% | Satisfactory |
| Example 2E-11 | | | Function (2D-5) | | 180% | Satisfactory |
| Example 2E-12 | | | Function (2D-6) | | 180% | Satisfactory |
| Example 2E-13 | | | Function (2D-7) | | 180% | Satisfactory |
| Example 2E-14 | | | Function (2D-8) | | 180% | Satisfactory |
| Example 2E-15 | | | Function (3D-1) | | 160% | Satisfactory |
| Example 2E-16 | | | Function (4D-1) | | 190% | Satisfactory |
| Example 2E-17 | | | Function (4D-2) | | 190% | Satisfactory |
| Example 2E-18 | | | Function (4D-3) | | 190% | Satisfactory |
| Example 2E-19 | | | Function (4D-4) | | 190% | Satisfactory |
| Example 2E-20 | | | Function (5D-1) | | Above 250% | Excellent |
| Example 2E-21 | | | Function (5D-2) | | Above 250% | Excellent |
| Example 2E-22 | | | Function (5D-3) | | Above 250% | Excellent |
| Example 2E-23 | | | Function (6D-1) | | 220% | Good |
| Example 2E-24 | | | Function (7D) | | 220% | Good |

As shown in Table 34, in Example 2E-1 to Example 2E-24, since solid particles were disposed at an appropriate concentration in an appropriate region inside the battery, an overcharge resistance was outstanding.

Example 3E-1 to Example 3E-9

In Example 3E-1 to Example 3E-9, laminated film-type batteries were fabricated in the same manner as in Example The evaluation results are shown in Table 35.

TABLE 35

| | Solid particles | | Additive component | | Battery evaluation | | | |
|---|---|---|---|---|---|---|---|---|
| | Material type | Amount added [mass %] | Material type | Amount added [mass %] | Overcharge resistance test limit capacity | Determination | Capacity retention rate after 500 cycles [%] | Determination |
| Example 3E-1 | Boehmite | 10 | Function (5D-1) | 0.01 | 180% | Satisfactory | 73 | Excellent |
| Example 3E-2 | | | | 0.02 | 230% | Good | 72 | Excellent |
| Example 3E-3 | | | | 0.03 | Above 250% | Excellent | 71 | Excellent |
| Example 3E-4 | | | | 0.1 | Above 250% | Excellent | 70 | Excellent |
| Example 3E-5 | | | | 0.5 | Above 250% | Excellent | 68 | Excellent |
| Example 3E-6 | | | | 1 | Above 250% | Excellent | 67 | Excellent |
| Example 3E-7 | | | | 1.5 | Above 250% | Excellent | 53 | Good |
| Example 3E-8 | | | | 1.8 | Above 250% | Excellent | 51 | Good |
| Example 3E-9 | | | | 2 | Above 250% | Excellent | 41 | Satisfactory |
| Comparative Example 3E-1 | — | — | Function (5D-1) | 10 | 150% | Fail | 20 | Fail |

As shown in Table 35, in Example 3E-1 to Example 3E-9, since solid particles were disposed at an appropriate concentration in an appropriate region inside the battery, an overcharge resistance was outstanding.

Example 4E-1 to Example 4E-9

In Example 4E-1 to Example 4E-9, laminated film-type batteries were fabricated in the same manner as in Example 1E-1 except that an amount of solid particles added with respect to electrolytes was changed as shown in the following Table 36.

(Battery Evaluation: An Overcharge Limit Test)

In the same manner as in Example 1E-1, an overcharge limit test was performed on the fabricated laminated film type-batteries according to the examples.

The evaluation results are shown in Table 36.

TABLE 36

| | Solid particles | | Additive component | | Battery evaluation | |
|---|---|---|---|---|---|---|
| | Material type | Amount added [mass %] | Material type | Amount added [mass %] | Overcharge resistance test limit capacity | Determination |
| Example 4E-1 | Boehmite | 1 | Function (5D-1) | 0.1 | 180% | Satisfactory |
| Example 4E-2 | | 2 | Function (5D-1) | | 230% | Good |
| Example 4E-3 | | 5 | Function (5D-1) | | Above 250% | Excellent |
| Example 4E-4 | | 10 | Function (5D-1) | | Above 250% | Excellent |
| Example 4E-5 | | 20 | Function (5D-1) | | Above 250% | Excellent |
| Example 4E-6 | | 30 | Function (5D-1) | | Above 250% | Excellent |
| Example 4E-7 | | 40 | Function (5D-1) | | Above 250% | Excellent |
| Example 4E-8 | | 50 | Function (5D-1) | | 230% | Good |
| Example 4E-9 | | 60 | Function (5D-1) | | 180% | Satisfactory |

As shown in Table 36, in Example 4E-1 to Example 4E-9, since solid particles were disposed at an appropriate concentration in an appropriate region inside the battery, an overcharge resistance was outstanding.

Example 5E-1 to Example 5E-11

In Example 5E-1 to Example 5E-11, laminated film-type batteries were fabricated in the same manner as in Example 1E-1 except that a particle size and a specific surface area of boehmite particles serving as solid particles were changed as shown in the following Table 37.

(Battery Evaluation: An Overcharge Limit Test)

In the same manner as in Example 1E-1, an overcharge limit test was performed on the fabricated laminated film type-batteries according to the examples.

The evaluation results are shown in Table 37.

TABLE 37

| | Solid particles | | | | Additive component | | Battery evaluation | |
|---|---|---|---|---|---|---|---|---|
| | Material type | Particle size D50 [μm] | BET specific surface area [$m^2/g$] | Amount added [mass %] | Material type | Amount added [mass %] | Overcharge resistance test limit capacity | Determination |
| Example 5E-1 | Boehmite | 1 | 6 | 10 | Formula (5D-1) | 0.1 | Above 250% | Excellent |
| Example 5E-2 | | 0.1 | 60 | | | | 170% | Satisfactory |

TABLE 37-continued

| | Solid particles | | | | Additive component | | Battery evaluation | |
|---|---|---|---|---|---|---|---|---|
| | Material type | Particle size D50 [μm] | BET specific surface area [$m^2/g$] | Amount added [mass %] | Material type | Amount added [mass %] | Overcharge resistance test limit capacity | Determination |
| Example 5E-3 | | 0.2 | 40 | | | | 230% | Good |
| Example 5E-4 | | 0.3 | 20 | | | | Above 250% | Excellent |
| Example 5E-5 | | 0.5 | 15 | | | | Above 250% | Excellent |
| Example 5E-6 | | 0.7 | 12 | | | | Above 250% | Excellent |
| Example 5E-7 | | 2 | 3 | | | | Above 250% | Excellent |
| Example 5E-8 | | 3 | 2 | | | | Above 250% | Excellent |
| Example 5E-9 | | 5 | 1.5 | | | | Above 250% | Excellent |
| Example 5E-10 | | 7 | 1.2 | | | | 230% | Good |
| Example 5E-11 | | 10 | 1 | | | | 170% | Satisfactory |

As shown in Table 37, in Example 5E-1 to Example 5E-11, since solid particles were disposed at an appropriate concentration in an appropriate region inside the battery, an overcharge resistance was outstanding.

Example 6E-1

In the same manner as in Example 1E-1, a laminated film-type battery was fabricated.

Example 6E-2

First, in the same manner as in Example 6E-1, a cathode and an anode were fabricated, and a separator was prepared.

Next, in the same manner as in Example 1E-1, the same coating solution as in Example 1E-1 was applied to both surfaces of the separator, a dilution solvent was removed by drying, and a gel-like electrolyte layer was formed on the surfaces of the separator.

Then, the cathode, the anode, and the separator having both surfaces on which the gel-like electrolyte layer was formed were laminated in the order of the cathode, the separator, the anode, and the separator, and then wound in a flat shape multiple times in a longitudinal direction. Then, a winding end portion was fixed by an adhesive tape to form a wound electrode body.

Next, the wound electrode body was packed and subjected to isostatic pressing. Accordingly, the solid particles were pushed to the recess between adjacent cathode active material particles of the outermost surface of the cathode active material layer and the recess between adjacent anode active material particles of the outermost surface of the anode active material layer.

Next, the wound electrode body was packaged with a laminated film having a soft aluminum layer, and the led-out side of the cathode terminal and the anode terminal around the wound electrode body and the other two sides were sealed up and closed tight by thermal fusion bonding under reduced pressure. Thus, the laminated film-type battery shown in FIG. 1 with a battery shape of 4.5 mm in thickness, 30 mm in width, and 50 mm in height was fabricated.

Example 6E-3

First, in the same manner as in Example 6E-1, a cathode and an anode were fabricated, and a separator was prepared.

(Formation of a Solid Particle Layer)

Next, paint prepared by mixing solid particles at 22 mass %, PVdF at 3 mass serving as a binder polymer compound, and NMP at 75 mass % serving as a solvent was applied to both surfaces of the separator and the solvent was then removed by drying. Accordingly, a solid particle layer was formed such that a solid component became 0.5 $mg/cm^2$ per one surface.

Next, the cathode, the anode, and the separator having both surfaces on which the solid particle layer was formed were laminated in the order of the cathode, the separator, the anode, and the separator, and then wound in a flat shape multiple times in a longitudinal direction. Then, a winding end portion was fixed by an adhesive tape to form a wound body.

Next, the packed wound conductor was put into heated oil and subjected to isostatic pressing. Accordingly, the solid particles were pushed to the recess between adjacent cathode active material particles positioned on the outermost surface of the cathode active material layer and the recess between adjacent anode active material particles positioned on the outermost surface of the anode active material layer.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 6E-4

First, in the same manner as in Example 6E-1, a cathode and an anode were fabricated, and a separator was prepared.

A coating solution was applied to both surfaces of the separator, and then dried to form a matrix resin layer as follows.

First, boehmite particles, and polyvinylidene fluoride (PVdF) serving as a matrix polymer compound were dispersed in N-methyl-2-pyrrolidone (NMP) to prepare the coating solution. In this case, a content of the boehmite particles was 10 mass % with respect to a total amount of paint, a content of the PVdF was 10 mass % with respect to a total amount of paint, and a content of the NMP was 80 mass % with respect to a total amount of paint.

Next, the coating solution was applied to both surfaces of the separator and then passed through a dryer to remove the NMP. Accordingly, the separator on which a matrix resin layer was formed was obtained.

[Assembly of the Laminated Film-Type Battery]

Next, the cathode, the anode and the separator having both surfaces on which the matrix resin layer was formed were laminated in the order of the cathode, the separator, the anode, and the separator, and wound in a flat shape multiple times in a longitudinal direction. Then, a winding end portion was fixed by an adhesive tape to form a wound electrode body.

Next, the packed wound electrode body was put into heated oil and subjected to isostatic pressing. Accordingly, the solid particles were pushed to the recess of the outermost surface of the cathode active material layer and the recess of the outermost surface of the anode active material layer.

Next, the wound electrode body was inserted into the package member, and three sides were subjected to thermal fusion bonding. Note that, in the package member, a laminated film having a soft aluminum layer was used.

Then, an electrolyte solution was injected thereinto and the remaining one side was subjected to thermal fusion bonding under reduced pressure and sealed. In this case, the electrolyte solution was impregnated into a particle-comprising resin layer, and the matrix polymer compound was swollen to form gel-like electrolytes (a gel electrolyte layer). Note that, the same electrolyte solution as in Example 1E-1 was used. Thus, the laminated film-type battery shown in FIG. 1 with a battery shape of 4.5 mm in thickness, 30 mm in width, and 50 mm in height was fabricated.

Example 6E-5

First, in the same manner as in Example 6E-1, a cathode and an anode were fabricated, and a separator was prepared.

(Formation of a Solid Particle Layer)

Paint prepared by mixing solid particles at 22 mass %, PVdF at 3 mass % serving as a binder polymer compound, and NMP at 75 mass % serving as a solvent was applied to both surfaces of each of the cathode and the anode and then the surfaces were scraped. Accordingly, the solid particles were put into the recess impregnation region A of each of the cathode side and the anode side, and the thickness of the recess impregnation region A was set to be twice the thickness of the top coat region B or more. Then, the NMP was removed by drying and a solid particle layer was formed such that a solid component became 0.5 mg/cm$^2$ per one surface.

Next, the cathode and the anode each having both surfaces on which the solid particle layer was formed and the separator were laminated in the order of the cathode, the separator, the anode, and the separator, and then wound in a flat shape multiple times in a longitudinal direction. Then, a winding end portion was fixed by an adhesive tape to form a wound body.

Next, the wound body was inserted into a laminated film having a soft aluminum layer, and accommodated inside the laminated film by performing thermal fusion bonding on outer peripheral edge parts except for one side to form a pouched shape. Next, the non-aqueous electrolyte solution was injected into a package member, the non-aqueous electrolyte solution was impregnated into the wound body, and then an opening of the laminated film was sealed by thermal fusion bonding under a vacuum atmosphere. Thus, the laminated film-type battery shown in FIG. 1 with a battery shape of 4.5 mm in thickness, 30 mm in width, and 50 mm in height was fabricated.

Example 6E-7

A laminated film-type battery was fabricated in the same manner as in Example 6E-1 except that a gel-like electrolyte layer was formed only on both surfaces of the anode.

(Battery Evaluation: An Overcharge Limit Test)

In the same manner as in Example 1E-1, an overcharge limit test was performed on the fabricated laminated film type-batteries according to the examples.

The evaluation results are shown in Table 38.

TABLE 38

| | Solid particles | | Additive component | | Overview of method of disposing solid particles | | | Battery evaluation | |
|---|---|---|---|---|---|---|---|---|---|
| | Material type | Amount added [mass %] | Material type | Amount added [mass %] | Results formed through coating | Coating target | *Remarks | Overcharge resistance test limit capacity | Determination |
| Example 6E-1 | Boehmite | 10 | Formula (5D-1) | 1 | Gel electrolytes containing solid particles | Positive electrode and negative electrode | Gel electrolytes are heated and applied, and some of the applied gel electrolytes are scraped off | Above 250% | Excellent |
| Example 6E-2 | | | | | Gel electrolytes containing solid particles | Separator | Heating and pressing process (isostatic pressing) is provided | 170% | Satisfactory |
| Example 6E-3 | | | | | Solid particle layer | Separator | Heating and pressing process (isostatic pressing) is provided | Above 250% | Excellent |
| Example 6E-4 | | | | | Matrix resin layer | Separator | Heating and pressing process (isostatic pressing) is provided | Above 250% | Excellent |
| Example 6E-5 | | | | | Solid particle layer | Positive electrode and negative electrode | After application, a solid particle layer is partially scraped off | Above 250% | Excellent |

TABLE 38-continued

| | Solid particles | | Additive component | | Overview of method of disposing solid particles | | | Battery evaluation | |
|---|---|---|---|---|---|---|---|---|---|
| | Material type | Amount added [mass %] | Material type | Amount added [mass %] | Results formed through coating | Coating target | *Remarks | Overcharge resistance test limit capacity | Determination |
| Example 6E-6 | | | | | Gel electrolytes containing solid particles | Positive electrode | Gel electrolytes are heated and applied, and some of the applied gel electrolytes are scraped off | 220% | Good |
| Example 6E-7 | | | | | Gel electrolytes containing solid particles | Negative electrode | Gel electrolytes are heated and applied, and some of the applied gel electrolytes are scraped off | 240% | Good |

As shown in Table 38, in Example 6E-1 to Example 6E-7, since solid particles were disposed at an appropriate concentration in an appropriate region inside the battery, an overcharge resistance was outstanding.

Example 7E-1

A rectangular cathode, a rectangular anode, and a rectangular separator whose configurations were the same as those in Example 1E-1 were fabricated except for their rectangular shapes.

(Formation of a Solid Particle Layer)

Next, in the same manner as in Example 6E-3, a solid particle layer was formed on both surfaces of the separator.

(Formation of a Stacked Electrode Body)

Next, the cathode, the separator, the anode, and the separator were sequentially laminated to form a stacked electrode body.

Next, the packed stacked electrode body was put into heated oil and subjected to isostatic pressing. Accordingly, the solid particles were pushed to the recess of the outermost surface of the cathode active material layer and the recess of the outermost surface of the anode active material.

Next, the stacked electrode body was packaged with a laminated film having a soft aluminum layer, three sides around the stacked electrode body were sealed up and closed tight by thermal fusion bonding. Then, the same electrolyte solution as in Example 1E-1 was injected thereinto and the remaining one side was sealed by thermal fusion bonding under reduced pressure. Accordingly, the laminated film-type battery shown in FIG. 4A to FIG. 4C with a battery shape of 4.5 mm in thickness, 30 mm in width, and 50 mm in height was fabricated.

Example 7E-2

In the same manner as in Example 6E-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material.

Next, a cathode terminal was combined with a safety valve with which a battery lid was combined, and an anode terminal was connected to an anode can. The stacked electrode body was inserted between a pair of insulating plates and accommodated inside a battery can.

Next, the non-aqueous electrolyte solution was injected into the cylindrical battery can from the top of the insulating plate. Finally, at an opening of the battery can, a battery lid was caulked and closed tight through an insulation sealing gasket. Accordingly, a cylindrical battery with a battery shape of 18 mm in diameter and 65 mm in height (ICR18650 size) was fabricated.

Example 7E-3

In the same manner as in Example 7E-1, a stacked electrode body was formed, and the packed stacked electrode body was put into heated oil and subjected to isostatic pressing. Accordingly, the solid particles were pushed to the recess of the outermost surface of the cathode active material layer and the recess of the outermost surface of the anode active material layer.

[Assembly of the Rectangular Battery]

Next, the stacked electrode body was housed in a rectangular battery can. Subsequently, an electrode pin provided at a battery lid and a cathode terminal led out from the stacked electrode body were connected. Then, the battery can was sealed by the battery lid, the non-aqueous electrolyte solution was injected through an electrolyte solution inlet, and sealed up and closed tight by a sealing member. Accordingly, the rectangular battery with a battery shape of 4.5 mm in thickness, 30 mm in width and 50 mm in height (453050 size) was fabricated.

Example 7E-4 to Example 7E-6

Laminated film-type batteries were fabricated in the same manner as in Example 7E-1 to Example 7E-3 except that a nonwoven fabric was prepared in place of a polyethylene separator, the same coating solution as in Example 7E-1 was applied to both surfaces of the nonwoven fabric, the solvent was then removed by drying, and accordingly a solid particle layer was formed such that a solid component became 0.5 $mg/cm^2$ per one surface.

Example 7E-7

In Example 7E-7, the same laminated film-type battery as in Example 1E-1 was used to fabricate a simple battery pack (a soft pack) shown in FIG. 8 and FIG. 9.

(Battery Evaluation: An Overcharge Limit Test)

In the same manner as in Example 1E-1, an overcharge limit test was performed on the fabricated laminated film type-batteries according to the examples. Note that, in Example 7E-7, a voltage was adjusted assuming that a voltage was actually applied to the battery included in the battery pack.

The evaluation results are shown in Table 39.

TABLE 39

| | Solid particles | | Additive component | | | | Battery evaluation | |
|---|---|---|---|---|---|---|---|---|
| | Material type | Amount added [mass %] | Material type | Amount added [mass %] | Battery form | | Overcharge resistance test limit capacity | Determination |
| Example 7D-1 | Boehmite | 10 | Formula (5D-1) | 1 | Form a solid particle layer on a polyethylene separator | Stacked lamininated film-type battery | Above 250% | Excellent |
| Example 7D-2 | | | Formula (5D-1) | | Form a solid particle layer on a polyethylene separator | Cylindrical battery in which a stacked electrode body is housed in a cylindrical can | Above 250% | Excellent |
| Example 7D-3 | | | Formula (5D-1) | | Form a solid particle layer on a polyethylene separator | Rectangular battery in which a stacked electrode body is housed is a rectangular can | Above 250% | Excellent |
| Example 7D-4 | | | Formula (5D-1) | | Form a solid particle layer on a nonwoven fabric | Stacked lamininated film-type battery | Above 250% | Excellent |
| Example 7D-5 | | | Formula (5D-1) | | Form a solid particle layer on a nonwoven fabric | Cylindrical battery in which a stacked electrode body is housed in a cylindrical can | Above 250% | Excellent |
| Example 7D-6 | | | Formula (5D-1) | | Form a solid particle layer on a nonwoven fabric | Rectangular battery in which a stacked electrode body is housed is a rectangular can | Above 250% | Excellent |
| Example 7D-7 | | | Formula (5D-1) | | Form a solid particle layer on a polyethylene separator | Battery pack of a liminated film-type battery | Above 250% | Excellent |

As shown in Table 39, in Example 7E-1 to Example 7E-7, since solid particles were disposed at an appropriate concentration in an appropriate region inside the battery, an overcharge resistance was outstanding.

22. Other Embodiments

Embodiments of the present technology are not limited to the above-described embodiments of the present technology, but may be modified and applied in various ways within the scope of the present technology without departing from the gist of the present technology.

For example, the numerical values, the configurations, the shapes, the materials, the ingredients, the manufacturing processes, and the like exemplified in the above-described embodiments are merely examples. Numerical values, configurations, shapes, materials, ingredients, manufacturing processes, and the like different therefrom may be used, as necessary.

The configurations, the methods, the processes, the shapes, the additives, the metal salts, the materials, the numerical values, and the like in the above-described embodiments may be combined without departing from the gist of the present technology. For example, a non-aqueous electrolyte battery may be a primary battery.

The electrolyte layer of the present technology can be similarly used also in the case of having other battery structures such as a coin-like shape or button-like shape. In addition, in the above-described embodiments, a laminate type electrode body may be used in place of a winding type electrode body.

Additionally, the present technology may also be configured as below.

[1]

A battery including:

a cathode including a cathode active material layer comprising cathode active material particles;

an anode including an anode active material layer comprising anode active material particles;

a separator that is located between the cathode active material layer and the anode active material layer;

electrolytes comprising an electrolyte solution; and solid particles, wherein at least one of a recess impregnation region of an anode side and a recess impregnation region of a cathode side, and at least one of a deep region of the anode side and a deep region of the cathode side are included, wherein the recess impregnation region of the anode side refers to a region in which the electrolytes and the solid particles are disposed and that includes a recess that is located between adjacent anode active material particles positioned on the outermost surface of the anode active material layer, wherein the deep region of the anode side refers to a region in which the electrolytes or the electrolytes and the solid particles are disposed and that is inside the anode active material layer, which is deeper than the recess impregnation region of the anode side, wherein the recess impregnation region of the cathode side refers to a region in which the electrolytes and the solid particles are disposed and that includes a recess that is located between adjacent cathode active material particles positioned on the outermost surface of the cathode active material layer, wherein the deep region of the cathode side refers to a region in which the electrolytes or the electrolytes and the solid particles are disposed and that is inside the cathode active material layer, which is deeper than the recess impregnation region of the cathode side, and wherein the solid particles in the at least one of the recess impregnation regions have a concentration that is 30 volume % or more.

[2]

The battery according to [1], wherein the electrolyte solution comprises a non-aqueous solvent, and wherein a cyclic alkylene carbonate has a content that is 30 mass % or more with respect to the non-aqueous solvent.

[3]

The battery according to any of [1] to [2], wherein the recess impregnation region of the anode side and the deep region of the anode side and the recess impregnation region of the cathode side and the deep region of the cathode side are included.

[4]

The battery according to any of [1] to [2], wherein the recess impregnation region of the anode side and the deep region of the anode side or the recess impregnation region of the cathode side and the deep region of the cathode side are included.

[5]

The battery according to any of [1] to [4], wherein the solid particles of the at least one of the deep regions have a concentration that is 3 volume % or less.

[6]

The battery according to any of [1] to [5], wherein the solid particles of the at least one of the recess impregnation regions have a concentration that is 10 times a concentration of solid particles of the deep region that is on the same electrode side as the at least one of the recess impregnation regions or more.

[7]

The battery according to any of [1] to [6], wherein the recess impregnation region of the anode side has a thickness that is 10% or more and 40% or less of a thickness of the anode active material layer.

[8]

The battery according to any of [1] to [7], wherein the solid particles comprised in the at least one of the recess impregnation regions have a particle size D95 that is $2/\sqrt{3}-1$ times a particle size D50 of active materials or more.

[9]

The battery according to any of [1] to [8], wherein the solid particles comprised in the at least one of the recess impregnation regions have a particle size D50 that is $2/\sqrt{3}-1$ times a particle size D50 of active material particles or less.

[10]

The battery according to any of [1] to [10], wherein the solid particles have a BET specific surface area that is 1 $m^2/g$ or more and 60 $m^2/g$ or less.

[11]

The battery according to any of [1] to [10], wherein a volume percentage of the solid particles with respect to the electrolytes is 1 volume % or more and 50 volume % or less.

[12]

The battery according to any of [1] to [11], wherein the solid particles are at least one of inorganic particles and organic particles.

[13]

The battery according to [12], wherein the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and wherein the organic particles are particles of at least one selected from the group consisting of melamine, melamine cyanurate, melamine polyphosphate, cross-linked polymethyl methacrylate, polyolefin, polyethylene, polypropylene, polystyrene, polytetrafluoroethylene, polyvinylidene difluoride, a polyamide, a polyimide, a melamine resin, a phenol resin, and an epoxy resin.

[14]

The battery according to [13], wherein the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite, wherein the carbonate mineral is at least one selected from the group consisting of hydrotalcite and dolomite, and wherein the oxide mineral is spinel.

[15]

The battery according to any of [1] to [14], wherein the electrolytes further comprise a polymer compound that retains the electrolyte solution.

[16]

A battery pack including:

the battery according to any of [1] to [15];

a controller configured to control the battery; and a package that houses the battery.

[17]

An electronic device including:

the battery according to any of [1] to [15], wherein the electronic device is supplied with power from the battery.

[18]

An electric vehicle including:

the battery according to any of [1] to [15];

a conversion device configured to be supplied with power from the battery and convert the power to driving force of the vehicle; and a control device configured to perform information processing about vehicle control based on information about the battery.

[19-1]

A power storage device including:

the battery according to any of [1] to [15], wherein the power storage device supplies power to an electronic device connected to the battery.

[19-2]

The power storage device according to [19-1], including:

a power information control device configured to transmit/receive a signal to/from another device via a network, wherein the power storage device controls charge/discharge of the battery based on information received by the power information control device.

[20]

A power system that is supplied with power from the battery according to any of [1] to [15] or allows the battery to be supplied with power from a power generation device or a power network.

The present technology may also be configured as below.

[1]

A battery including:

a cathode including a cathode active material layer comprising cathode active material particles;

an anode including an anode active material layer comprising anode active material particles;

a separator that is located between the cathode active material layer and the anode active material layer;

electrolytes comprising an electrolyte solution; and solid particles, wherein a recess impregnation region of an anode side and a deep region of the anode side are included, or the recess impregnation region of the anode side and the deep region of the anode side and a recess impregnation region of a cathode side and a deep region of the cathode side are included, wherein the recess impregnation region of the anode side refers to a region in which the electrolytes and the solid particles are disposed and that includes a recess that is located between adjacent anode active material particles positioned on the outermost surface of the anode active material layer, wherein the deep region of the anode side refers to a region in which the electrolytes or the electrolytes and the solid particles are disposed and that is inside the anode active material layer, which is deeper than the recess impregnation region of the anode side, wherein the recess impregnation region of the cathode side refers to a region in which the electrolytes and the solid particles are disposed and that includes a recess that is located between adjacent cathode active material particles positioned on the outermost surface of the cathode active material layer, wherein the deep region of the cathode side refers to a region in which the electrolytes or the electrolytes and the solid particles are disposed and that is inside the cathode active material layer, which is deeper than the recess impregnation region of the cathode side, wherein the solid particles in the recess impregnation region of the anode side have a concentration that is 30 volume % or more, wherein the solid particles in the recess impregnation region of the cathode side have a concentration that is 30 volume % or more, and wherein the electrolyte solution comprises at least one kind of an unsaturated cyclic carbonate ester represented by Formula (1) and halogenated carbonate esters represented by Formula (2) and Formula (3).

[Chem. 28]

(1)

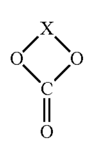

(where, in Formula (1), X represents any one divalent group selected from the group consisting of —C(═R1)-C(═R2)-, —C(═R1)-C(═R2)-C(═R3)-, —C(═R1)-C(R4)(R5)-, —C(═R1)-C(R4)(R5)-C(R6)(R7)-, —C(R4)(R5)-C(═R1)-C(R6)(R7)-, —C(═R1)-C(═R2)-C(R4)(R5)-, —C(═R1)-C(R4)(R5)-C(═R2)-, —C(═R1)-O—C(R4)(R5)-, —C(═R1)-O—C(═R2)-, —C(═R1)-C(═R8)-, and —C(═R1)-C(═R2)-C(═R8)-. R1, R2 and R3 each independently represent a divalent hydrocarbon group having one carbon atom or a divalent halogenated hydrocarbon group having one carbon atom. R4, R5, R6 and R7 each independently represent a monovalent hydrogen group (—H), a monovalent hydrocarbon group having 1 to 8 carbon atoms, a monovalent halogenated hydrocarbon group having 1 to 8 carbon atoms or a monovalent oxygen-comprising hydrocarbon group having 1 to 6 carbon atoms. R8 represents an alkylene group having 2 to 5 carbon atoms or a halogenated alkylene group having 2 to 5 carbon atoms)

(2)

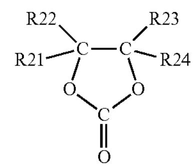

(where, in Formula (2), R21 to R24 each independently represent a hydrogen group, a halogen group, an alkyl group or a halogenated alkyl group, and at least one of R21 to R24 represents a halogen group or a halogenated alkyl group)

(3)

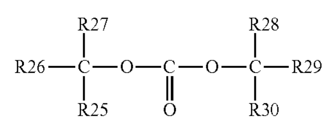

(where, in Formula (3), R25 to R30 each independently represent a hydrogen group, a halogen group, an alkyl group or a halogenated alkyl group, and at least one of R25 to R30 represents a halogen group or a halogenated alkyl group)

[2]

The battery according to [1], wherein the recess impregnation region of the anode side and the deep region of the anode side and the recess impregnation region of the cathode side and the deep region of the cathode side are included.

[3]

The battery according to [1], wherein only the recess impregnation region of the anode side and the deep region of the anode side are included.

[4]

The battery according to any of [1] to [3], wherein the solid particles of the at least one of the deep regions have a concentration that is 3 volume % or less.

[5]

The battery according to any of [1] to [4], wherein the solid particles of the at least one of the recess impregnation regions have a concentration that is 10 times a concentration of solid particles of the deep region that is on the same electrode side as the at least one of the recess impregnation regions or more.

[6]

The battery according to any of [1] to [5], wherein the recess impregnation region of the anode side has a thickness that is 10% or more and 40% or less of a thickness of the anode active material layer.

[7]

The battery according to any of [1] to [6], wherein the solid particles comprised in the at least one of the recess impregnation region have a particle size D95 that is $2/\sqrt{3}-1$ times a particle size D50 of active material particles or more.

[8]

The battery according to any of [1] to [7], wherein the solid particles comprised in the at least one of the recess impregnation regions have a particle size D50 that is $2/\sqrt{3}-1$ times a particle size D50 of active material particles or less.

[9]

The battery according to any of [1] to [8], wherein the solid particles have a BET specific surface area that is 1 $m^2/g$ or more and 60 $m^2/g$ or less.

[10]

The battery according to any of [1] to [9], wherein a content of the unsaturated cyclic carbonate ester represented by Formula (1) is 0.01 mass % or more and 10 mass % or less.

[11]

The battery according to any of [1] to [10], wherein a content of the halogenated carbonate esters represented by Formula (2) and Formula (3) is 0.01 mass % or more and 50 mass % or less.

[12]

The battery according to any of [1] to [11], wherein the solid particles are at least one of inorganic particles and organic particles.

[13]

The battery according to [12], wherein the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and the organic particles are particles of at least one selected from the group consisting of melamine, melamine cyanurate, melamine polyphosphate, cross-linked polymethyl methacrylate, polyolefin, polyethylene, polypropylene, polystyrene, polytetrafluoroethylene, polyvinylidene difluoride, a polyamide, a polyimide, a melamine resin, a phenol resin, and an epoxy resin.

[14]

The battery according to [13], wherein the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite, the carbonate mineral is at least one selected from the group consisting of hydrotalcite and dolomite, and the oxide mineral is spinel.

[15]

The battery according to any of [1] to [14], wherein the electrolytes further comprise a polymer compound that retains the electrolyte solution.

[16]

A battery pack including:

the battery according to any of [1] to [15];

a controller configured to control the battery; and a package that houses the battery.

[17]

An electronic device including:

the battery according to [1] to [15], wherein the electronic device is supplied with power from the battery.

[18]

An electric vehicle including:

the battery according to any of [1] to [14];

a conversion device configured to be supplied with power from the battery and convert the power into a driving force of the vehicle; and a control device configured to perform information processing about vehicle control based on information about the battery.

[19]

A power storage device including:

the battery according to any of [1] to [15], wherein the power storage device supplies power to an electronic device connected to the battery.

[20]

The power storage device according to [19], including a power information control device configured to transmit/receive a signal to/from another device via a network, wherein the power storage device controls charge/discharge of the battery based on information received by the power information control device.

[21]

A power system that is supplied with power from the battery according to any of [1] to [15] or allows the battery to be supplied with power from a power generation device or a power network.

The present technology may also be configured as below.

[1]

A battery including:

a cathode including a cathode active material layer comprising cathode active material particles;

an anode including an anode active material layer comprising anode active material particles;

a separator that is located between the cathode active material layer and the anode active material layer;

electrolytes comprising an electrolyte solution; and solid particles, wherein at least one of a recess impregnation region of an anode side and a recess impregnation region of a cathode side, and at least one of a deep region of the anode side and a deep region of the cathode side are included, wherein the recess impregnation region of the anode side refers to a region in which the electrolytes and the solid particles are disposed and that includes a recess that is located between adjacent anode active material particles positioned on the outermost surface of the anode active material layer, wherein the deep region of the anode side refers to a region in which the electrolytes or the electrolytes and the solid particles are disposed and that is inside the anode active material layer, which is deeper than the recess impregnation region of the anode side, wherein the recess impregnation region of the cathode side refers to a region in which the electrolytes and the solid particles are disposed and that includes a recess that is located between adjacent cathode active material particles positioned on the outermost surface of the cathode active material layer, wherein the deep region of the cathode side refers to a region in which the electrolytes or the electrolytes and the solid particles are disposed and that is inside the cathode active material layer, which is deeper than the recess impregnation region of the cathode side, wherein the solid particles in the recess impregnation region of the anode side have a concentration that is 30 volume % or more, wherein the solid particles in the recess impregnation region of the cathode side have a concentration that is 30 volume % or more, and wherein the electrolyte solution comprises at least one kind of sulfinyl or sulfonyl compounds represented by Formula (1A) to Formula (8A).

[Chem. 29]

(1A)

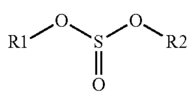

(2A)

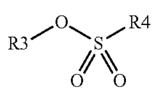

(3A)

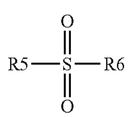

(4A)

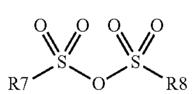

(5A)

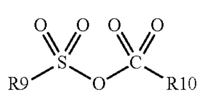

(6A)

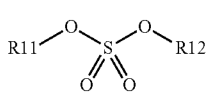

(7A)

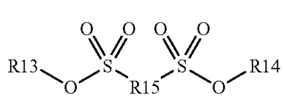

(8A)

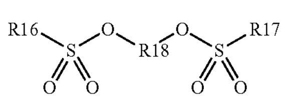

(R1 to R14, and R16 and R17 each independently represent a monovalent hydrocarbon group or a monovalent halogenated hydrocarbon group, R15 and R18 each independently represent a divalent hydrocarbon group or a divalent halogenated hydrocarbon group. R1 and R2, R3 and R4, R5 and R6, R7 and R8, R9 and R10, R11 and R12, and any two or more of R13 to R15 or any two or more of R16 to R18 may be bound to each other)

[2]

The battery according to [1], wherein the recess impregnation region of the anode side and the deep region of the anode side and the recess impregnation region of the cathode side and the deep region of the cathode side are included.

[3]

The battery according to [1], wherein the recess impregnation region of the anode side and the deep region of the anode side or the recess impregnation region of the cathode side and the deep region of the cathode side are included.

[4]

The battery according to any of [1] to [3], wherein the solid particles of the at least one of the deep regions have a concentration that is 3 volume % or less.

[5]

The battery according to any of [1] to [4], wherein the solid particles of the at least one of the recess impregnation regions have a concentration that is 10 times a concentration of solid particles of the deep region that is on the same electrode side as the at least one of the recess impregnation regions or more.

[6]

The battery according to any of [1] to [5], wherein the recess impregnation region of the anode side has a thickness that is 10% or more and 40% or less of a thickness of the anode active material layer.

[7]

The battery according to any of [1] to [6], wherein the solid particles comprised in the at least one of the recess impregnation regions have a particle size D95 that is $2/\sqrt{3}-1$ times a particle size D50 of active materials or more.

[8]

The battery according to any of [1] to [7], wherein the solid particles comprised in the at least one of the recess impregnation regions have a particle size D50 that is $2/\sqrt{3}-1$ times a particle size D50 of active material particles or less.

[9]

The battery according to any of [1] to [8], wherein the solid particles have a BET specific surface area that is 1 $m^2/g$ or more and 60 $m^2/g$ or less.

[10]

The battery according to any of [1] to [9], wherein a content of the sulfinyl or sulfonyl compounds represented by Formula (1A) to Formula (8A) is 0.01 mass % or more and 10 mass % or less.

[11]

The battery according to any of [1] to [10], wherein the solid particles are at least one of inorganic particles and organic particles.

[12]

The battery according to [11], wherein the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and wherein the organic particles are particles of at least one selected from the group consisting of melamine, melamine cyanurate, melamine polyphosphate, cross-linked polymethyl methacrylate, polyolefin, polyethylene, polypropylene, polystyrene, polytetrafluoroethylene, polyvinylidene difluoride, a polyamide, a polyimide, a melamine resin, a phenol resin, and an epoxy resin.

[13]

The battery according to [12], wherein the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite, wherein the carbonate mineral is at least one selected from the group consisting of hydrotalcite and dolomite, and wherein the oxide mineral is spinel.

[14]

The battery according to any of [1] to [13], wherein the electrolytes further comprise a polymer compound that retains the electrolyte solution.

[15]

A battery pack including:

the battery according to any of [1] to [14];

a controller configured to control the battery; and a package that houses the battery.

[16]

An electronic device including:

the battery according to any of [1] to [14], wherein the electronic device is supplied with power from the battery.

[17]

An electric vehicle including:

the battery according to any of [1] to [14];

a conversion device configured to be supplied with power from the battery and convert the power into a driving force of the vehicle; and a control device configured to perform information processing about vehicle control based on information about the battery.

[18]

A power storage device including:

the battery according to any of [1] to [14], wherein the power storage device supplies power to an electronic device connected to the battery.

[19]

The power storage device according to [18], including:

a power information control device configured to transmit/receive a signal to/from another device via a network, wherein the power storage device controls charge/discharge of the battery based on information received by the power information control device.

[20]

A power system that is supplied with power from the battery according to any of [1] to [14] or allows the battery to be supplied with power from a power generation device or a power network.

The present technology may also be configured as below.

[1]

A battery including:

a cathode including a cathode active material layer comprising cathode active material particles;

an anode including an anode active material layer comprising anode active material particles;

a separator that is located between the cathode active material layer and the anode active material layer;

electrolytes comprising an electrolyte solution; and solid particles, wherein at least one of a recess impregnation region of an anode side and a recess impregnation region of a cathode side, and at least one of a deep region of the anode side and a deep region of the cathode side are included, wherein the recess impregnation region of the anode side refers to a region in which the electrolytes and the solid particles are disposed and that includes a recess that is located between adjacent anode active material particles positioned on the outermost surface of the anode active material layer, wherein the deep region of the anode side refers to a region in which the electrolytes or the electrolytes and the solid particles are disposed and that is inside the anode active material layer, which is deeper than the recess impregnation region of the anode side, wherein the recess impregnation region of the cathode side refers to a region in which the electrolytes and the solid particles are disposed and that includes a recess that is located between adjacent cathode active material particles positioned on the outermost surface of the cathode active material layer, wherein the deep region of the cathode side refers to a region in which the electrolytes or the electrolytes and the solid particles are disposed and that is inside the cathode active material layer, which is deeper than the recess impregnation region of the cathode side, wherein the solid particles in the at least one of the recess impregnation regions have a concentration that is 30 volume % or more, and wherein the electrolyte solution comprises at least one kind of aromatic compounds represented by Formula (1B) to Formula (4B).

[Chem. 30]

(1B)

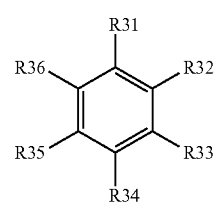

(2B)

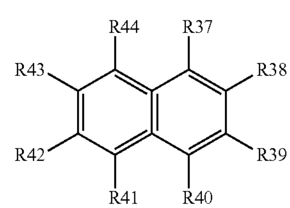

(3B)

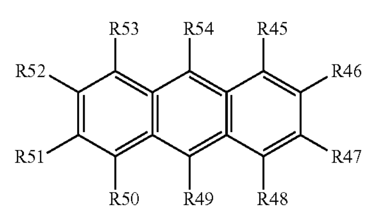

-continued (4B)

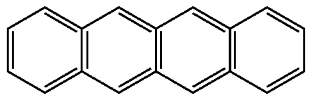

(in the formula, R31 to R54 each independently represent a hydrogen group, a halogen group, a monovalent hydrocarbon group, a monovalent halogenated hydrocarbon group, a monovalent oxygen-comprising hydrocarbon group or a monovalent halogenated oxygen-comprising hydrocarbon group, and any two or more of R31 to R36, any two or more of R37 to R44, or any two or more of R45 to R54 may be bound to each other. However, a total number of carbon atoms in each of the aromatic compounds represented by Formula (1) to Formula (4) is 7 to 18)

[2]

The battery according to [1], wherein the recess impregnation region of the anode side and the deep region of the anode side and the recess impregnation region of the cathode side and the deep region of the cathode side are included.

[3]

The battery according to [1], wherein the recess impregnation region of the anode side and the deep region of the anode side or the recess impregnation region of the cathode side and the deep region of the cathode side are included.

[4]

The battery according to any of [1] to [3], wherein the solid particles of the at least one of the deep regions have a concentration that is 3 volume % or less.

[5]

The battery according to any of [1] to [4], wherein the solid particles of the at least one of the recess impregnation regions have a concentration that is 10 times a concentration of solid particles of the deep region that is on the same electrode side as the at least one of the recess impregnation regions or more.

[6]

The battery according to any of [1] to [5], wherein the recess impregnation region of the anode side has a thickness that is 10% or more and 40% or less of a thickness of the anode active material layer.

[7]

The battery according to any of [1] to [6], wherein the solid particles comprised in the at least one of the recess impregnation regions have a particle size D95 that is $2/\sqrt{3}-1$ times a particle size D50 of active materials or more.

[8]

The battery according to any of [1] to [7], wherein the solid particles comprised in the at least one of the recess impregnation regions have a particle size D50 that is $2/\sqrt{3}-1$ times a particle size D50 of active material particles or less.

[9]

The battery according to any of [1] to [8], wherein the solid particles have a BET specific surface area that is 1 $m^2/g$ or more and 60 $m^2/g$ or less.

[10]

The battery according to any of [1] to [9], wherein a content of the aromatic compounds represented by Formula (1B) to Formula (4B) is 0.01 mass % or more and 10 mass % or less.

[11]

The battery according to any of [1] to [10], wherein the solid particles are at least one of inorganic particles and organic particles.

[12]

The battery according to [1], wherein the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and wherein the organic particles are particles of at least one selected from the group consisting of melamine, melamine cyanurate, melamine polyphosphate, cross-linked polymethyl methacrylate, polyolefin, polyethylene, polypropylene, polystyrene, polytetrafluoroethylene, polyvinylidene difluoride, a polyamide, a polyimide, a melamine resin, a phenol resin, and an epoxy resin.

[13]

The battery according to [12], wherein the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite, wherein the carbonate mineral is at least one selected from the group consisting of hydrotalcite and dolomite, and wherein the oxide mineral is spinel.

[14]

The battery according to any of [1] to [13], wherein the electrolytes further comprise a polymer compound that retains the electrolyte solution.

[15]

A battery pack including:

the battery according to any of [1] to [14];

a controller configured to control the battery; and a package that houses the battery.

[16]

An electronic device including:

the battery according to any of [1] to [14], wherein the electronic device is supplied with power from the battery.

[17]

An electric vehicle including:

the battery according to any of [1] to [14];

a conversion device configured to be supplied with power from the battery and convert the power to driving force of the vehicle; and a control device configured to perform information processing about vehicle control based on information about the battery.

[18]

A power storage device including:

the battery according to any of [1] to [14], wherein the power storage device supplies power to an electronic device connected to the battery.

[19]

The power storage device according to [18], including:

a power information control device configured to transmit/receive a signal to/from another device via a network, wherein the power storage device controls charge/discharge of the battery based on information received by the power information control device.

[20]

A power system that is supplied with power from the battery according to any of [1] to [14] or allows the battery to be supplied with power from a power generation device or a power network.

The present technology may also be configured as below.

[1]

A battery including:

a cathode including a cathode active material layer comprising cathode active material particles;

an anode including an anode active material layer comprising anode active material particles;

a separator that is located between the cathode active material layer and the anode active material layer;

electrolytes comprising an electrolyte solution; and solid particles, wherein at least one of a recess impregnation region of an anode side and a recess impregnation region of a cathode side, and at least one of a deep region of the anode side and a deep region of the cathode side are included, wherein the recess impregnation region of the anode side refers to a region in which the electrolytes and the solid particles are disposed and that includes a recess that is located between adjacent anode active material particles positioned on the outermost surface of the anode active material layer, wherein the deep region of the anode side refers to a region in which the electrolytes or the electrolytes and the solid particles are disposed and that is inside the anode active material layer, which is deeper than the recess impregnation region of the anode side, wherein the recess impregnation region of the cathode side refers to a region in which the electrolytes and the solid particles are disposed and that includes a recess that is located between adjacent cathode active material particles positioned on the outermost surface of the cathode active material layer, wherein the deep region of the cathode side refers to a region in which the electrolytes or the electrolytes and the solid particles are disposed and that is inside the cathode active material layer, which is deeper than the recess impregnation region of the cathode side, wherein the solid particles of the at least one of the recess impregnation regions have a concentration that is 30 volume % or more, and wherein the electrolyte solution comprises at least one kind of a dinitrile compound represented by Formula (1C).

[Chem. 31]

$$\text{NC—R61-CN} \tag{1C}$$

(where, in the formula, R61 represents a divalent hydrocarbon group or a divalent halogenated hydrocarbon group)

[2]

The battery according to [1], wherein the recess impregnation region of the anode side and the deep region of the anode side and the recess impregnation region of the cathode side and the deep region of the cathode side are included.

[3]

The battery according to [1], wherein the recess impregnation region of the anode side and the deep region of the anode side or the recess impregnation region of the cathode side and the deep region of the cathode side are included.

[4]

The battery according to any of [1] to [3], wherein the solid particles of the at least one of the deep regions have a concentration that is 3 volume % or less.

[5]

The battery according to any of [1] to [4], wherein the solid particles of the at least one of the recess impregnation regions have a concentration that is 10 times a concentration of solid particles of the deep region that is on the same electrode side as the at least one of the recess impregnation regions or more.

[6]

The battery according to any of [1] to [5], wherein the recess impregnation region of the anode side has a thickness that is 10% or more and 40% or less of a thickness of the anode active material layer.

[7]

The battery according to any of [1] to [6], wherein the solid particles comprised in the at least one of the recess impregnation regions have a particle size D95 that is $2/\sqrt{3}-1$ times a particle size D50 of active materials or more.

[8]

The battery according to any of [1] to [7], wherein the solid particles comprised in the at least one of the recess impregnation regions have a particle size D50 that is $2/\sqrt{3}-1$ times a particle size D50 of active material particles or less.

[9]

The battery according to any of [1] to [8], wherein the solid particles have a BET specific surface area that is 1 $m^2/g$ or more and 60 $m^2/g$ or less.

[10]

The battery according to any of [1] to [9], wherein a content of the dinitrile compounds represented by Formula (1C) is 0.01 mass % or more and 10 mass % or less.

[11]

The battery according to any of [1] to [10], wherein the solid particles are at least one of inorganic particles and organic particles.

[12]

The battery according to [11], wherein the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and wherein the organic particles are particles of at least one selected from the group consisting of melamine, melamine cyanurate, melamine polyphosphate, cross-linked polymethyl methacrylate, polyolefin, polyethylene, polypropylene, polystyrene, polytetrafluoroethylene, polyvinylidene difluoride, a polyamide, a polyimide, a melamine resin, a phenol resin, and an epoxy resin.

[13]

The battery according to [12], wherein the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite, wherein the carbonate mineral is at least one selected from the group consisting of hydrotalcite and dolomite, and wherein the oxide mineral is spinel.

[14]

The battery according to any of [1] to [13], wherein the electrolytes further comprise a polymer compound that retains the electrolyte solution.

[15]

A battery pack including:

the battery according to any of [1] to [14];

a controller configured to control the battery; and a package that houses the battery.

[16]

An electronic device including:

the battery according to any of [1] to [14], wherein the electronic device is supplied with power from the battery.

[17]

An electric vehicle including:

the battery according to any of [1] to [14];

a conversion device configured to be supplied with power from the battery and convert the power to driving force of the vehicle; and a control device configured to perform information processing about vehicle control based on information about the battery.

[18]

A power storage device including:

the battery according to any of [1] to [14], wherein the power storage device supplies power to an electronic device connected to the battery.

[19]

The power storage device according to [18], including:

a power information control device configured to transmit/receive a signal to/from another device via a network, wherein the power storage device controls charge/discharge of the battery based on information received by the power information control device.

[20]

A power system that is supplied with power from the battery according to any of [1] to [14] or allows the battery to be supplied with power from a power generation device or a power network.

The present technology may also be configured as below.

[1]

A battery including:

a cathode including a cathode active material layer comprising cathode active material particles;

an anode including an anode active material layer comprising anode active material particles;

a separator that is located between the cathode active material layer and the anode active material layer;

electrolytes comprising an electrolyte solution; and solid particles, wherein at least one of a recess impregnation region of an anode side and a recess impregnation region of a cathode side, and at least one of a deep region of the anode side and a deep region of the cathode side are included, wherein the recess impregnation region of the anode side refers to a region in which the electrolytes and the solid particles are disposed and that includes a recess that is located between adjacent anode active material particles positioned on the outermost surface of the anode active material layer, wherein the deep region of the anode side refers to a region in which the electrolytes or the electrolytes and the solid particles are disposed and that is inside the anode active material layer, which is deeper than the recess impregnation region of the anode side, wherein the recess impregnation region of the cathode side refers to a region in which the electrolytes and the solid particles are disposed and that includes a recess that is located between adjacent cathode active material particles positioned on the outermost surface of the cathode active material layer, wherein the deep region of the cathode side refers to a region in which the electrolytes or the electrolytes and the solid particles are disposed and that is inside the cathode active material layer, which is deeper than the recess impregnation region of the cathode side, wherein the solid particles of the at least one of the recess impregnation regions have a concentration that is 30 volume % or more, and wherein the electrolyte solution comprises at least one kind of metal salts represented by Formula (1D) to Formula (7D).

[Chem. 32]

(1D)

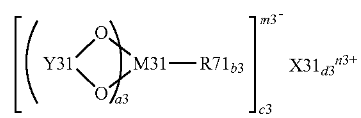

(where, in the formula, X31 represents a Group 1 element or a Group 2 element in a long-period type periodic table, or A1. M31 represents a transition metal, or a Group 13 element, a Group 14 element or a Group 15 element in the long-period type periodic table. R71 represents a halogen group. Y31 represents —C(═O)—R72-C(═O)—, —C(═O)—$CR73_2$-, or —C(═O)—C(═O)—, where R72 represents an alkylene group, a halogenated alkylene group, an arylene group or a halogenated arylene group, and R73 represents an alkyl group, a halogenated alkyl group, an aryl group or a halogenated aryl group. Note that a3 is an integer of 1 to 4, b3 is an integer of 0, 2 or 4, and c3, d3, m3 and n3 each are an integer of 1 to 3)

(2D)

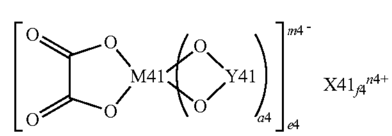

(where, in the formula, X41 represents a Group 1 element or a Group 2 element in the long-period type periodic table. M41 represents a transition metal, or a Group 13 element, a Group 14 element or a Group 15 element in the long-period type periodic table. Y41 represents —C(═O)—$(CR81_2)_{b4}$-C(═O)—, —$R83_2C$—$(CR82_2)_{c4}$-C(═O)—, —$R83_2C$—$(CR82_2)_{c4}$-$CR83_2$-, —$R83_2C$—$(CR82_2)_{c4}$-S(═O)$_2$—, —S(═O)$_2$—$(CR82_2)_{d4}$-S(═O)$_2$—, or —C(═O)—$(CR82_2)_{d4}$-S(═O)$_2$—, where R81 and R83 represent a hydrogen group, an alkyl group, a halogen group or a halogenated alkyl group, and at least one thereof is a halogen group or a halogenated alkyl group, and R82 represents a hydrogen group, an alkyl group, a halogen group or a halogenated alkyl group. Note that a4, e4 and n4 each are an integer of 1 or 2, b4 and d4 each are an integer of 1 to 4, c4 is an integer of 0 to 4, and f4 and m4 each are an integer of 1 to 3)

(3D)

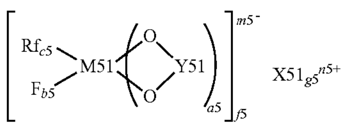

(where, in the formula, X51 represents a Group 1 element or a Group 2 element in the long-period type periodic table. M51 represents a transition metal, or a Group 13 element, a Group 14 element or a Group 15 element in the long-period type periodic table. Rf represents a fluorinated alkyl group or a fluorinated aryl group, each having 1 to 10 carbon atoms. Y51 represents —C(═O)—$(CR91_2)_{d5}$-C(═O)—, —$R92_2C$—$(CR91_2)_{d5}$-C(═O)—, —$R92_2C$—$(CR91_2)_{d5}$-$CR92_2$-, —$R92_2C$—$(CR91_2)_{d5}$-S(═O)$_2$—, —S(═O)$_2$—$(CR91_2)_{e5}$-S(═O)$_2$—, or —C(═O)—$(CR91_2)_{e5}$-S(═O)$_2$—, where R91 represents a hydrogen group, an alkyl group, a halogen group or a halogenated alkyl group, and R92 represents a hydrogen group, an alkyl group, a halogen group or a halogenated alkyl group, and at least one thereof is a halogen group or a halogenated alkyl group. Note that a5, f5 and n5 each are an integer of 1 or 2, b5, c5 and e5 each are an integer of 1 to 4, d5 is an integer of 0 to 4, and g5 and m5 each are an integer of 1 to 3)

(4D)

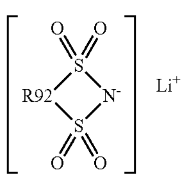

(in the formula, R92 represents a divalent halogenated hydrocarbon group)

$$M^+[(ZY)_2N]^- \quad (5D)$$

(in the formula, $M^+$ represents a monovalent cation, Y represents $SO_2$ or CO, and Z each independently represents a halogen group or an organic group)

$$LiC(C_pF_{2p+1}SO_2)(C_qF_{2q+1}SO_2)(C_rF_{2r+1}SO_2) \quad (6D)$$

(in the formula, p, q and r each are an integer of 1 or more)

(7D)

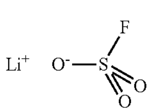

[2]

The battery according to any of [1], wherein the recess impregnation region of the anode side and the deep region of the anode side and the recess impregnation region of the cathode side and the deep region of the cathode side are included.

[3]

The battery according to [1], wherein the recess impregnation region of the anode side and the deep region of the anode side or the recess impregnation region of the cathode side and the deep region of the cathode side are included.

[4]

The battery according to any of [1] to [3], wherein the solid particles of the at least one of the deep regions have a concentration that is 3 volume % or less.

[5]

The battery according to any of [1] to [4], wherein the solid particles of the at least one of the recess impregnation regions have a concentration that is 10 times a concentration of solid particles of the deep region that is on the same electrode side as the at least one of the recess impregnation regions or more.

[6]

The battery according to any of [1] to [5], wherein the recess impregnation region of the anode side has a thickness that is 10% or more and 40% or less of a thickness of the anode active material layer.

[7]

The battery according to any of [1] to [6], wherein the solid particles comprised in the at least one of the recess impregnation region have a particle size D95 that is $2/\sqrt{3}-1$ times a particle size D50 of active material particles or more.

[8]

The battery according to any of [1] to [7], wherein the solid particles comprised in the at least one of the recess impregnation regions have a particle size D50 that is $2/\sqrt{3}-1$ times a particle size D50 of active material particles or less.

[9]

The battery according to any of [1] to [8], wherein the solid particles have a BET specific surface area that is 1 $m^2/g$ or more and 60 $m^2/g$ or less.

[10]

The battery according to any of [1] to [9], wherein a content of the metal salts represented by Formula (1D) to Formula (7D) is 0.01 mass % or more and 2 mass % or less.

[11]

The battery according to any of [1] to [10], wherein the solid particles are at least one of inorganic particles and organic particles.

[12]

The battery according to [11], wherein the inorganic particles are particles of at least one selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and the organic particles are particles of at least one selected from the group consisting of melamine, melamine cyanurate, melamine polyphosphate, cross-linked polymethyl methacrylate, polyolefin, polyethylene, polypropylene, polystyrene, polytetrafluoroethylene, polyvinylidene difluoride, a polyamide, a polyimide, a melamine resin, a phenol resin, and an epoxy resin.

[13]

The battery according to [12], wherein the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, a mica, a zeolite, mullite, saponite, attapulgite, and montmorillonite, the carbonate mineral is at least one selected from the group consisting of hydrotalcite and dolomite, and the oxide mineral is spinel.

[14]

The battery according to any of [1] to [13], wherein the electrolytes further comprise a polymer compound that retains the electrolyte solution.

[15]

A battery pack including:

the battery according to any of [1] to [14];

a controller configured to control the battery; and a package that houses the battery.

[16]

An electronic device including:

the battery according to [1] to [14], wherein the electronic device is supplied with power from the battery.

[17]

An electric vehicle including:

the battery according to any of [1] to [14];

a conversion device configured to be supplied with power from the battery and convert the power into a driving force of the vehicle; and a control device configured to perform information processing about vehicle control based on information about the battery.

[18]

A power storage device including:

the battery according to any of [1] to [14], wherein the power storage device supplies power to an electronic device connected to the battery.

[19]

The power storage device according to [18], including a power information control device configured to transmit/receive a signal to/from another device via a network, wherein the power storage device controls charge/discharge of the battery based on information received by the power information control device.

[20]

A power system that is supplied with power from the battery according to any of [1] to [14] or allows the battery to be supplied with power from a power generation device or a power network.

REFERENCE SIGNS LIST

50 wound electrode body
51 cathode lead
52 anode lead
53 cathode
53A cathode current collector
53B cathode active material layer
54 anode
54A anode current collector
54B anode active material layer
55 separator
56 electrolyte layer
57 protection tape
60 package member
61 adhesive film
70 stacked electrode body
71 cathode lead
72 anode lead
73 cathode
74 anode
75 separator
76 fixing member
81 battery can
82*a*, 82*b* insulating plate
83 battery lid
84 safety valve
84*a* protrusion part
85 disk holder
86 blocking disk
86*a* hole
87 positive temperature coefficient element
88 gasket
89 sub disk
90 wound electrode body
91 cathode
91A cathode current collector
91B cathode active material layer
92 anode
92A anode current collector
92B anode active material layer
93 separator
94 center pin
95 cathode lead
96 anode lead
111 exterior can
112 battery lid
113 electrode pin
114 insulator
115 through-hole
116 internal pressure release mechanism
116*a* first opening groove
116*b* second opening groove
117 electrolyte solution inlet
118 sealing member
120 wound electrode body
101 battery cell
101*a* terrace portion
102*a*, 102*b* lead
103*a* to 103*c* insulation tape
104 insulating plate
105 circuit board
106 connector
211 power source
212 cathode lead
213 anode lead
214, 215 tab
216 circuit board
217 lead wire with connector
218, 219 adhesive tape
220 label
221 controller
222 switch part

224 temperature sensing part
225 cathode terminal
227 anode terminal
231 insulation sheet
301 assembled battery
301*a* secondary battery
302*a* charge control switch
302*b* diode
303*a* discharge control switch
303*b* diode
304 switch part
307 current sensing resistor
308 temperature sensing element
310 controller
311 voltage sensing part
313 current measuring part
314 switch controller
317 memory
318 temperature sensing part
321 cathode terminal
322 anode terminal
400 power storage system
401 house
402 concentrated power system
402*a* thermal power generation
402*b* nuclear power generation
402*c* hydroelectric power generation
403 power storage device
404 power generation device
405 power consumption device
405*a* refrigerator
405*b* air conditioner
405*c* television receiver
405*d* bath
406 electric vehicle
406*a* electric car
406*b* hybrid car
406*c* electric motorcycle
407 smart meter
408 power hub
409 power network
410 control device
411 sensor
412 information network
413 server
500 hybrid vehicle
501 engine
502 power generator
503 power/driving force conversion device
504*a* driving wheel
504*b* driving wheel
505*a* wheel
505*b* wheel
508 battery
509 vehicle control device
510 sensor
511 charging inlet

The invention claimed is:

1. A non-aqueous electrolyte secondary battery comprising:

a cathode including a cathode active material layer comprising cathode active material particles;

an anode including an anode active material layer comprising anode active material particles;

a separator that is located between the cathode active material layer and the anode active material layer;

an electrolyte comprising an electrolyte solution; and solid particles having particle size smaller than the cathode active material particles or anode active material particles, wherein at least one of a recess impregnation region of an anode side and a recess impregnation region of a cathode side, and at least one of a deep region of the anode side and a deep region of the cathode side are included, wherein the recess impregnation region of the anode side refers to a region in which the electrolyte and the solid particles are disposed and that includes a recess that is located between adjacent anode active material particles positioned on the outermost surface of the anode active material layer, wherein the deep region of the anode side refers to a region in which the electrolyte or the electrolyte and the solid particles are disposed and that is inside the anode active material layer, which is deeper than the recess impregnation region of the anode side, wherein the recess impregnation region of the cathode side refers to a region in which the electrolyte and the solid particles are disposed and that includes a recess that is located between adjacent cathode active material particles positioned on the outermost surface of the cathode active material layer, wherein the deep region of the cathode side refers to a region in which the electrolyte or the electrolyte and the solid particles are disposed and that is inside the cathode active material layer, which is deeper than the recess impregnation region of the cathode side, wherein the solid particles of the at least one of the recess impregnation regions have a concentration that is 30 volume % or more with respect to a volume of the at least one of the recess impregnation regions, and wherein the electrolyte solution comprises at least one kind of a dinitrile compound represented by Formula (1C):

$$NC—R61\text{-}CN \quad (1C)$$

where R61 represents a divalent hydrocarbon group or a divalent halogenated hydrocarbon group.

2. A battery pack comprising:

the non-aqueous electrolyte secondary battery according to claim 1;

a controller configured to control the non-aqueous electrolyte secondary battery; and a package that houses the non-aqueous electrolyte secondary battery.

3. An electronic device comprising:

the non-aqueous electrolyte secondary battery according to claim 1, wherein the electronic device is supplied with power from the non-aqueous electrolyte secondary battery.

4. An electric vehicle comprising:

the non-aqueous electrolyte secondary battery according to claim 1;

a conversion device configured to be supplied with power from the non-aqueous electrolyte secondary battery and convert the power into a driving force of the vehicle; and a control device configured to perform information processing about vehicle control based on information about the non-aqueous electrolyte secondary battery.

5. A power storage device comprising:

the non-aqueous electrolyte secondary battery according to claim 1, wherein the power storage device supplies power to an electronic device connected to the non-aqueous electrolyte secondary battery.

6. A power system that is supplied with power from the non-aqueous electrolyte secondary battery according to claim 1 or allows the non-aqueous electrolyte secondary battery to be supplied with power from a power generation device or a power network.

* * * * *